US010992547B2

(12) United States Patent
Varney et al.

(10) Patent No.: US 10,992,547 B2
(45) Date of Patent: Apr. 27, 2021

(54) RENDEZVOUS SYSTEMS, METHODS, AND DEVICES

(71) Applicant: Level 3 Communications, LLC, Broomfield, CO (US)

(72) Inventors: Lewis Robert Varney, Oak Park, CA (US); Laurence R. Lipstone, Calabasas, CA (US); William Crowder, Camarillo, CA (US); Andrew Swart, Pennington, NJ (US); Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 561 days.

(21) Appl. No.: 13/802,406

(22) Filed: Mar. 13, 2013

(65) Prior Publication Data

US 2014/0173135 A1    Jun. 19, 2014

Related U.S. Application Data

(60) Provisional application No. 61/737,072, filed on Dec. 13, 2012.

(51) Int. Cl.
*H04L 12/24*    (2006.01)
*H04L 29/08*    (2006.01)
(Continued)

(52) U.S. Cl.
CPC ............ *H04L 41/50* (2013.01); *G06F 9/5055* (2013.01); *G06F 15/173* (2013.01);
(Continued)

(58) Field of Classification Search
CPC . H04L 61/1511; H04L 41/50; H04L 67/2885; H04L 41/0893; H04L 67/289;
(Continued)

(56) References Cited

U.S. PATENT DOCUMENTS 5,511,208 A    4/1996  Boyles et al.
5,805,837 A    9/1998  Hoover et al.
(Continued)

FOREIGN PATENT DOCUMENTS

GB          2427490 A      12/2006
WO    WO-200215014 A1     2/2002
(Continued)

OTHER PUBLICATIONS

Internet.com, Definition of Virtual IP Address, Aug. 14, 2005 Evidence by the WayBack Machine, retrieved Sep. 9, 2020 from https://www.webopedia.com/TERM/V/virtual_IP_address.html, p. 1-2 (Year: 2005).*

(Continued)

*Primary Examiner* — Tonia L Dollinger
*Assistant Examiner* — Joseph M Cousins

(57) ABSTRACT

A method includes maintaining first and second mapping data. The first mapping data is from canonical names (CNAMEs) to binding names (BNAMEs), and the second mapping data is from BNAMEs to address information. The method includes using the first mapping data to map a canonical name to a binding name; and then using the second mapping data to map the binding name to corresponding address information.

25 Claims, 133 Drawing Sheets

(51) Int. Cl.

| | |
|---|---|
| H04L 29/06 | (2006.01) |
| H04L 29/12 | (2006.01) |
| G06F 9/50 | (2006.01) |
| G06F 15/177 | (2006.01) |
| G06F 15/173 | (2006.01) |
| H04L 12/26 | (2006.01) |
| H04L 12/911 | (2013.01) |
| G06F 12/0808 | (2016.01) |

(52) U.S. Cl.
CPC ........ *G06F 15/177* (2013.01); *H04L 41/0816*
(2013.01); *H04L 41/0823* (2013.01); *H04L
41/0869* (2013.01); *H04L 41/0893* (2013.01);
*H04L 41/12* (2013.01); *H04L 41/509*
(2013.01); *H04L 41/5041* (2013.01); *H04L
43/04* (2013.01); *H04L 47/70* (2013.01);
*H04L 61/10* (2013.01); *H04L 61/2507*
(2013.01); *H04L 65/403* (2013.01); *H04L
65/60* (2013.01); *H04L 67/06* (2013.01);
*H04L 67/10* (2013.01); *H04L 67/1078*
(2013.01); *H04L 67/16* (2013.01); *H04L 67/26*
(2013.01); *H04L 67/289* (2013.01); *H04L
67/2842* (2013.01); *H04L 67/2852* (2013.01);
*H04L 67/2885* (2013.01); *H04L 67/32*
(2013.01); *H04L 67/42* (2013.01); *H04L 69/03*
(2013.01); *G06F 9/5083* (2013.01); *G06F
12/0808* (2013.01); *H04L 41/0813* (2013.01);
*H04L 43/08* (2013.01); *H04L 43/10* (2013.01);
*H04L 61/1511* (2013.01); *H04L 61/1535*
(2013.01); *H04L 61/6009* (2013.01)

(58) Field of Classification Search
CPC . H04L 67/1078; H04L 41/0816; H04L 43/08;
H04L 43/10; H04L 41/5041; H04L
67/2842; H04L 41/0869; H04L 61/2507;
H04L 41/12; H04L 43/04; H04L 47/70;
H04L 69/03; H04L 61/10; H04L 61/1535;
H04L 61/6009; H04L 41/0813; H04L
67/2852; G06F 9/5055; G06F 15/173;
G06F 12/0808; G06F 9/5083
USPC ......................................................... 709/245
See application file for complete search history.

(56) References Cited

U.S. PATENT DOCUMENTS

| | | | |
|---|---|---|---|
| 5,870,559 A | 2/1999 | Leshem et al. | |
| 5,951,694 A | 9/1999 | Choquier et al. | |
| 5,987,506 A | 11/1999 | Carter | |
| 6,173,322 B1 | 1/2001 | Hu | |
| 6,185,598 B1 | 2/2001 | Farber et al. | |
| 6,212,178 B1 | 4/2001 | Beck et al. | |
| 6,226,694 B1 | 5/2001 | Constant et al. | |
| 6,279,032 B1 | 8/2001 | Short et al. | |
| 6,484,143 B1 | 11/2002 | Swildens et al. | |
| 6,571,261 B1 | 5/2003 | Wang-Knop et al. | |
| 6,577,597 B1 | 6/2003 | Natarajan et al. | |
| 6,587,928 B1 | 7/2003 | Periyannan et al. | |
| 6,654,807 B2 | 11/2003 | Farber et al. | |
| 6,757,708 B1 | 6/2004 | Craig et al. | |
| 6,965,930 B1 | 11/2005 | Arrowood et al. | |
| 6,981,105 B2 | 12/2005 | Bourne | |
| 7,010,578 B1 | 3/2006 | Lewin et al. | |
| 7,054,935 B2 | 5/2006 | Farber et al. | |
| 7,062,556 B1 | 6/2006 | Chen et al. | |
| 7,076,608 B2 | 7/2006 | Arunagirinathan et al. | |
| 7,136,649 B2 | 11/2006 | Ying et al. | |
| 7,206,841 B2 | 4/2007 | Traversat et al. | |
| 7,320,085 B2 | 1/2008 | Bain | |
| 7,370,102 B1 | 5/2008 | Chu et al. | |
| 7,383,271 B2 | 6/2008 | Yip | |
| 7,395,346 B2 | 7/2008 | Pinder et al. | |
| 7,461,206 B2 | 12/2008 | Bhanoo et al. | |
| 7,512,702 B1 | 3/2009 | Srivastava et al. | |
| 7,512,707 B1 | 3/2009 | Manapragada et al. | |
| 7,523,181 B2 | 4/2009 | Swildens et al. | |
| 7,574,508 B1* | 8/2009 | Kommula ......... H04L 29/12066 709/226 |
| 7,797,426 B1 | 9/2010 | Lyon | |
| 7,822,871 B2 | 10/2010 | Stolorz et al. | |
| 7,840,667 B2 | 11/2010 | Weller et al. | |
| 7,860,964 B2 | 12/2010 | Stolorz et al. | |
| 7,945,693 B2 | 5/2011 | Farber et al. | |
| 7,949,779 B2 | 5/2011 | Farber et al. | |
| 7,978,631 B1 | 7/2011 | Abdelaziz | |
| 8,015,298 B2 | 9/2011 | Yevmenkin et al. | |
| 8,051,057 B2 | 11/2011 | Abu-Hakima | |
| 8,060,613 B2 | 11/2011 | Farber et al. | |
| 8,255,557 B2 | 8/2012 | Raciborski et al. | |
| 8,260,841 B1 | 9/2012 | Maity | |
| 8,275,816 B1 | 9/2012 | Pegg | |
| 8,281,035 B2 | 10/2012 | Farber et al. | |
| 8,281,349 B2 | 10/2012 | Takezawa | |
| 8,296,296 B2 | 10/2012 | Keith, Jr. | |
| 8,296,396 B2 | 10/2012 | Farber et al. | |
| 8,321,556 B1 | 11/2012 | Chatterjee et al. | |
| 8,396,970 B2 | 3/2013 | Black et al. | |
| 8,412,823 B1 | 4/2013 | Richardson et al. | |
| 8,458,290 B2 | 6/2013 | Black et al. | |
| 8,478,858 B2 | 7/2013 | Dunbar et al. | |
| 8,489,750 B2 | 7/2013 | Yevmenkin et al. | |
| 8,511,208 B1 | 8/2013 | Frazer | |
| 8,521,813 B2 | 8/2013 | Black et al. | |
| 8,543,702 B1 | 9/2013 | Marshall et al. | |
| 8,577,827 B1 | 11/2013 | Sehn et al. | |
| 8,601,090 B1 | 12/2013 | Richardson | |
| 8,615,577 B2 | 12/2013 | Black et al. | |
| 8,626,876 B1 | 1/2014 | Kokal et al. | |
| 8,626,878 B2 | 1/2014 | Wolber et al. | |
| 8,645,517 B2 | 2/2014 | Stolorz et al. | |
| 8,719,415 B1 | 5/2014 | Sirota | |
| 8,788,671 B2 | 7/2014 | Richardson et al. | |
| 8,819,283 B2 | 8/2014 | Richardson et al. | |
| 8,856,865 B1 | 10/2014 | Martini | |
| 8,868,701 B1 | 10/2014 | Peters | |
| 8,949,533 B2 | 2/2015 | Puthalath et al. | |
| 9,055,124 B1 | 6/2015 | Hill | |
| 9,077,580 B1 | 7/2015 | Randhawa | |
| 9,098,464 B2 | 8/2015 | Hajiaghayi et al. | |
| 9,246,965 B1 | 1/2016 | Stoica | |
| 2001/0029507 A1 | 10/2001 | Nojima | |
| 2001/0034752 A1 | 10/2001 | Kremien | |
| 2002/0010798 A1 | 1/2002 | Ben-Shaul et al. | |
| 2002/0049608 A1 | 4/2002 | Hartsell | |
| 2002/0059274 A1 | 5/2002 | Hartsell | |
| 2002/0062325 A1 | 5/2002 | Berger | |
| 2002/0065864 A1 | 5/2002 | Hartsell | |
| 2002/0081801 A1 | 6/2002 | Forster | |
| 2002/0091801 A1 | 7/2002 | Lewin | |
| 2002/0116583 A1 | 8/2002 | Copeland et al. | |
| 2002/0120717 A1 | 8/2002 | Giotta | |
| 2002/0161823 A1 | 10/2002 | Casati et al. | |
| 2002/0165727 A1 | 11/2002 | Greene et al. | |
| 2002/0174168 A1 | 11/2002 | Beukema et al. | |
| 2002/0174227 A1 | 11/2002 | Hartsell et al. | |
| 2002/0184357 A1 | 12/2002 | Traversat et al. | |
| 2002/0188740 A1* | 12/2002 | Tang ................. H04L 67/1002 709/230 |
| 2003/0028594 A1 | 2/2003 | Laschkewitsch et al. | |
| 2003/0033283 A1 | 2/2003 | Evans | |
| 2003/0115283 A1 | 6/2003 | Barbir et al. | |
| 2003/0115421 A1 | 6/2003 | McHenry et al. | |
| 2003/0135509 A1 | 7/2003 | Davis et al. | |
| 2003/0140111 A1 | 7/2003 | Pace et al. | |
| 2003/0154090 A1 | 8/2003 | Bernstein et al. | |
| 2003/0200283 A1 | 10/2003 | Suryanarayana et al. | |
| 2004/0068622 A1 | 4/2004 | Van Doren et al. | |
| 2004/0073596 A1 | 4/2004 | Kloninger et al. | |
| 2004/0136327 A1 | 7/2004 | Sitaraman | |

(56) References Cited

U.S. PATENT DOCUMENTS

| | | |
|---|---|---|
| 2004/0162871 A1 | 8/2004 | Pabla et al. |
| 2004/0193656 A1 | 9/2004 | Pizzo et al. |
| 2004/0215757 A1 | 10/2004 | Butler |
| 2004/0255048 A1 | 12/2004 | Lev Ran |
| 2005/0010653 A1 | 1/2005 | McCanne |
| 2005/0021771 A1 | 1/2005 | Kaehn |
| 2005/0086386 A1 | 4/2005 | Shen et al. |
| 2005/0114656 A1* | 5/2005 | Liu ................... H04L 12/185 713/163 |
| 2005/0160429 A1 | 7/2005 | Hameleers et al. |
| 2005/0177600 A1 | 8/2005 | Eilam et al. |
| 2005/0188073 A1 | 8/2005 | Nakamichi et al. |
| 2005/0190775 A1 | 9/2005 | Tonnby et al. |
| 2005/0192995 A1 | 9/2005 | Li et al. |
| 2005/0289388 A1 | 12/2005 | Black-Ziegelbein et al. |
| 2006/0047751 A1 | 3/2006 | Chen et al. |
| 2006/0064478 A1* | 3/2006 | Sirkin ............... H04L 29/12066 709/223 |
| 2006/0064485 A1 | 3/2006 | Baron et al. |
| 2006/0112176 A1 | 5/2006 | Liu et al. |
| 2006/0161392 A1 | 7/2006 | Sholl |
| 2006/0167704 A1 | 7/2006 | Nicholls et al. |
| 2006/0212524 A1 | 9/2006 | Wu et al. |
| 2006/0233310 A1 | 10/2006 | Adams et al. |
| 2006/0233311 A1 | 10/2006 | Adams et al. |
| 2006/0244818 A1 | 11/2006 | Majors et al. |
| 2007/0153691 A1 | 7/2007 | Halpern |
| 2007/0153782 A1* | 7/2007 | Fletcher ............... H04J 3/1617 370/389 |
| 2007/0156845 A1 | 7/2007 | Devanneaux et al. |
| 2007/0156876 A1 | 7/2007 | Sundarrajan et al. |
| 2007/0156965 A1 | 7/2007 | Sundarrajan et al. |
| 2007/0156966 A1 | 7/2007 | Sundarrajan et al. |
| 2007/0162434 A1 | 7/2007 | Alessi et al. |
| 2007/0192486 A1 | 8/2007 | Wilson et al. |
| 2007/0198678 A1 | 8/2007 | Dieberger et al. |
| 2007/0245090 A1 | 10/2007 | King et al. |
| 2007/0250468 A1 | 10/2007 | Pieper |
| 2007/0265978 A1 | 11/2007 | Kahn |
| 2007/0266414 A1 | 11/2007 | Kahn |
| 2007/0271385 A1 | 11/2007 | Davis et al. |
| 2008/0010387 A1 | 1/2008 | Curtis |
| 2008/0010590 A1 | 1/2008 | Curtis |
| 2008/0010609 A1 | 1/2008 | Curtis |
| 2008/0040661 A1 | 2/2008 | Curtis |
| 2008/0065769 A1 | 3/2008 | Curtis |
| 2008/0066073 A1 | 3/2008 | Sen |
| 2008/0108360 A1 | 5/2008 | Baarman et al. |
| 2008/0126944 A1 | 5/2008 | Curtis |
| 2008/0134165 A1 | 6/2008 | Anderson |
| 2008/0209036 A1 | 8/2008 | Sakamoto et al. |
| 2008/0215735 A1 | 9/2008 | Farber et al. |
| 2008/0222291 A1 | 9/2008 | Weller |
| 2008/0228864 A1 | 9/2008 | Plamondon |
| 2008/0256299 A1 | 10/2008 | Iyengar et al. |
| 2008/0256615 A1 | 10/2008 | Schlacht |
| 2008/0281915 A1 | 11/2008 | Elad |
| 2008/0301470 A1 | 12/2008 | Green et al. |
| 2008/0313267 A1 | 12/2008 | Desai et al. |
| 2008/0319845 A1 | 12/2008 | Adkins |
| 2009/0019228 A1 | 1/2009 | Brown et al. |
| 2009/0106447 A1 | 4/2009 | Lection |
| 2009/0125413 A1 | 5/2009 | Le Chevalier |
| 2009/0125758 A1 | 5/2009 | Anuszczyk et al. |
| 2009/0138601 A1 | 5/2009 | Hebert |
| 2009/0144800 A1 | 6/2009 | Black-Ziegelbein |
| 2009/0150319 A1 | 6/2009 | Matson et al. |
| 2009/0150548 A1 | 6/2009 | Smith |
| 2009/0157850 A1 | 6/2009 | Gagliardi et al. |
| 2009/0164269 A1 | 6/2009 | Gupta |
| 2009/0164621 A1 | 6/2009 | Kothari et al. |
| 2009/0165115 A1 | 6/2009 | Toumura et al. |
| 2009/0171752 A1 | 7/2009 | Galvin et al. |
| 2009/0178089 A1 | 7/2009 | Picco et al. |
| 2009/0187647 A1 | 7/2009 | Naoi |
| 2009/0210528 A1 | 8/2009 | Swildens |
| 2009/0248893 A1* | 10/2009 | Richardson ........... H04L 61/301 709/239 |
| 2009/0254661 A1 | 10/2009 | Fullagar et al. |
| 2009/0276842 A1* | 11/2009 | Yevmenkin ......... H04L 67/1002 726/13 |
| 2010/0042734 A1 | 2/2010 | Olafsson et al. |
| 2010/0064035 A1 | 3/2010 | Branca et al. |
| 2010/0077427 A1 | 3/2010 | Helms |
| 2010/0083281 A1 | 4/2010 | Malladi et al. |
| 2010/0088405 A1 | 4/2010 | Huang |
| 2010/0095008 A1* | 4/2010 | Joshi ................. H04L 29/12066 709/228 |
| 2010/0114857 A1 | 5/2010 | Edwards |
| 2010/0138540 A1 | 6/2010 | Tanaka |
| 2010/0142712 A1 | 6/2010 | Tang et al. |
| 2010/0145262 A1 | 6/2010 | Bengtsson |
| 2010/0158236 A1 | 6/2010 | Chang et al. |
| 2010/0169786 A1 | 7/2010 | O'Brien |
| 2010/0180105 A1 | 7/2010 | Asnaashari |
| 2010/0217869 A1 | 8/2010 | Esteban |
| 2010/0228874 A1 | 9/2010 | Rajan |
| 2010/0228962 A1 | 9/2010 | Simon et al. |
| 2010/0246797 A1 | 9/2010 | Chavez et al. |
| 2010/0257258 A1 | 10/2010 | Liu et al. |
| 2010/0274765 A1 | 10/2010 | Murphy et al. |
| 2010/0281224 A1 | 11/2010 | Ho et al. |
| 2010/0332595 A1 | 12/2010 | Fullagar et al. |
| 2011/0007745 A1 | 1/2011 | Schultz |
| 2011/0022471 A1 | 1/2011 | Brueck |
| 2011/0022812 A1 | 1/2011 | van der Linden et al. |
| 2011/0072073 A1 | 3/2011 | Curtis |
| 2011/0099290 A1 | 4/2011 | Swildens et al. |
| 2011/0099527 A1 | 4/2011 | Courchesne |
| 2011/0107364 A1 | 5/2011 | Lajoie et al. |
| 2011/0110377 A1* | 5/2011 | Alkhatib ............ H04L 61/2507 370/395.53 |
| 2011/0112909 A1 | 5/2011 | Singh et al. |
| 2011/0116376 A1 | 5/2011 | Pacella |
| 2011/0138064 A1 | 6/2011 | Rieger et al. |
| 2011/0153724 A1 | 6/2011 | Raja et al. |
| 2011/0161513 A1 | 6/2011 | Viers |
| 2011/0194681 A1 | 8/2011 | Fedorov et al. |
| 2011/0219108 A1 | 9/2011 | Lisiecki |
| 2011/0219109 A1 | 9/2011 | Zehavi |
| 2011/0238488 A1 | 9/2011 | Hahn et al. |
| 2011/0247084 A1 | 10/2011 | Kolbert et al. |
| 2011/0270880 A1 | 11/2011 | Jesse |
| 2011/0276640 A1 | 11/2011 | Jesse |
| 2011/0276679 A1 | 11/2011 | Newton et al. |
| 2011/0295983 A1 | 12/2011 | Medved |
| 2011/0296053 A1 | 12/2011 | Medved |
| 2012/0002717 A1 | 1/2012 | Ma et al. |
| 2012/0023530 A1 | 1/2012 | Xia |
| 2012/0030341 A1 | 2/2012 | Jensen |
| 2012/0066735 A1 | 3/2012 | Pham |
| 2012/0072541 A1* | 3/2012 | Carls ..................... H04L 67/10 709/219 |
| 2012/0079023 A1 | 3/2012 | Tejada-Gamero et al. |
| 2012/0079083 A1 | 3/2012 | Branca et al. |
| 2012/0089664 A1 | 4/2012 | Igelka |
| 2012/0113893 A1 | 5/2012 | Damola |
| 2012/0127183 A1 | 5/2012 | Vonog et al. |
| 2012/0150993 A1 | 6/2012 | Flack et al. |
| 2012/0159558 A1 | 6/2012 | Whyte et al. |
| 2012/0163203 A1 | 6/2012 | Wilkinson et al. |
| 2012/0166589 A1 | 6/2012 | Swildens et al. |
| 2012/0179771 A1 | 7/2012 | Ganti |
| 2012/0180041 A1 | 7/2012 | Fletcher |
| 2012/0191862 A1 | 7/2012 | Kovvali et al. |
| 2012/0198043 A1 | 8/2012 | Hesketh et al. |
| 2012/0209952 A1 | 8/2012 | Lotfallah et al. |
| 2012/0215779 A1 | 8/2012 | Lipstone |
| 2012/0221767 A1 | 8/2012 | Post et al. |
| 2012/0226734 A1 | 9/2012 | Poese |
| 2012/0233500 A1 | 9/2012 | Roettgermann |
| 2012/0239775 A1 | 9/2012 | Hubbard |
| 2012/0254421 A1 | 10/2012 | Gagliardi |
| 2012/0256915 A1 | 10/2012 | Jenkins |

(56) References Cited

U.S. PATENT DOCUMENTS

| | | |
|---|---|---|
| 2012/0284384 A1 | 11/2012 | Shi et al. |
| 2012/0290911 A1 | 11/2012 | Zhao |
| 2013/0041972 A1 | 2/2013 | Field et al. |
| 2013/0046664 A1 | 2/2013 | Kazerani et al. |
| 2013/0046883 A1 | 2/2013 | Lientz et al. |
| 2013/0080588 A1 | 3/2013 | Ibasco |
| 2013/0094445 A1 | 4/2013 | De Foy |
| 2013/0103791 A1 | 4/2013 | Gottdenker et al. |
| 2013/0104173 A1 | 4/2013 | Tjio et al. |
| 2013/0144727 A1 | 6/2013 | Morot-Gaudry et al. |
| 2013/0152187 A1 | 6/2013 | Strebe |
| 2013/0159472 A1 | 6/2013 | Newton et al. |
| 2013/0159473 A1 | 6/2013 | Newton et al. |
| 2013/0159500 A1 | 6/2013 | Reus et al. |
| 2013/0173769 A1 | 7/2013 | Seastrom et al. |
| 2013/0173877 A1 | 7/2013 | Guo |
| 2013/0174272 A1 | 7/2013 | le Chevalier et al. |
| 2013/0191499 A1* | 7/2013 | Ludin et al. .................. 709/217 |
| 2013/0304864 A1 | 11/2013 | Cadwell |
| 2013/0326032 A1 | 12/2013 | Duarte et al. |
| 2013/0332571 A1 | 12/2013 | Hoshing |
| 2013/0346534 A1* | 12/2013 | Richardson ............. H04L 67/18 709/213 |
| 2014/0006484 A1 | 1/2014 | Devanneaux |
| 2014/0019577 A1 | 1/2014 | Lobo |
| 2014/0047027 A1* | 2/2014 | Moyers ................... H04L 51/04 709/204 |
| 2014/0047085 A1 | 2/2014 | Peters et al. |
| 2014/0095537 A1 | 4/2014 | Park et al. |
| 2014/0101736 A1 | 4/2014 | Mays et al. |
| 2014/0108671 A1 | 4/2014 | Watson |
| 2014/0122725 A1 | 5/2014 | Batrouni et al. |
| 2014/0126370 A1 | 5/2014 | Xie |
| 2014/0173024 A1 | 6/2014 | Burba |
| 2014/0189069 A1 | 7/2014 | Gero |
| 2014/0198641 A1 | 7/2014 | Perkuhn et al. |
| 2014/0304590 A1 | 10/2014 | Zhang et al. |
| 2015/0066929 A1 | 3/2015 | Satzke |
| 2015/0067185 A1 | 3/2015 | Tamblin et al. |
| 2015/0074639 A1 | 3/2015 | Sanghvi |
| 2015/0088634 A1 | 3/2015 | Greenzeiger |
| 2015/0188823 A1* | 7/2015 | Williams .............. H04L 47/125 370/235 |
| 2015/0288647 A1 | 10/2015 | Chhabra |

FOREIGN PATENT DOCUMENTS

| | | |
|---|---|---|
| WO | WO-200225463 A1 | 3/2002 |
| WO | WO-2011115471 A1 | 9/2011 |

OTHER PUBLICATIONS

International Search Report, dated May 23, 2014, Int'l Appl. No. PCT/US13/074824, Int'l Filing Date Dec. 12, 2013; 9 pgs.
U.S. Appl. No. 14/302,865, filed Jun. 12, 2014, "Request-Response Processing in a Content Delivery Network".
U.S. Appl. No. 14/302,944, filed Jun. 12, 2014, "Customer-Specific Request-Response Processing in a content Delivery Network".
U.S. Appl. No. 14/303,314, filed Jun. 12, 2014, "Collector Mechanism in a Content Delivery Network".
U.S. Appl. No. 14/303,389, filed Jun. 12, 2014, "Collector Mechanisms in a Content Delivery Network".
U.S. Appl. No. 14/307,374, filed Jun. 17, 2014, "Invalidation Sequencing in a Content Delivery Framework".
U.S. Appl. No. 14/307,380, filed Jun. 17, 2014, "Automated Learning of Peering Policies for Popularity Driven Replication in Content Delivery Framework".
U.S. Appl. No. 14/307,389, filed Jun. 17, 2014, "Origin Server-Side Channel in a Content Delivery Framework".
U.S. Appl. No. 14/307,399, filed Jun. 17, 2014, "Beacon Services in a Content Delivery Framework".
U.S. Appl. No. 14/307,404, filed Jun. 17, 2014, "Geographic Location Determination in a Content Delivery Framework".
U.S. Appl. No. 14/307,411, filed Jun. 17, 2014, "Content Delivery Framework Having Fill Services".
U.S. Appl. No. 14/307,423, filed Jun. 17, 2014, "Content Delivery Framework Having Storage Services".
U.S. Appl. No. 14/307,429, filed Jun. 17, 2014, "Content Delivery Framework Having Origin Services".
Written Opinion of the International Searching Authority, dated May 23, 2014, Int'l Appl. No. PCT/US13/074824, Int'l Filing Date Dec. 12, 2013; 43 pgs.
Lipstone, et al., U.S. Appl. No. 14/578,402, filed Dec. 20, 2014, "Automatic Network Formation and Role Determination in a Content Delivery Framework".
Varney, et al., U.S. Appl. No. 14/579,640, filed Dec. 22, 2014, "Dynamic Fill Target Selection in a Content Delivery Framework".
Varney, et al., U.S. Appl. No. 14/580,038, filed Dec. 22, 2014, "Multi-Level Peering in a Content Delivery Framework".
Varney, et al., U.S. Appl. No. 14/580,086, filed Dec. 22, 2014, "Multi-Level Peering in a Content Delivery Framework".
Varney, et al., U.S. Appl. No. 14/583,718, filed Dec. 28, 2014, "Role-Specific Sub-Networks in a Content Delivery Framework".
Non-Final Office Action, dated Sep. 10, 2013, U.S. Appl. No. 13/837,821, filed Mar. 15, 2013; 9 pgs.
Non-Final Office Action, dated Sep. 23, 2013, U.S. Appl. No. 13/838,414, filed Mar. 15, 2013; 23 pgs.
Notice of Allowance, dated Sep. 13, 2013, U.S. Appl. No. 13/837,216, filed Mar. 15, 2013; 14 pgs.
U.S. Appl. No. 13/714,412, filed Dec. 14, 2012, "Content Delivery Framework".
U.S. Appl. No. 13/714,416, filed Dec. 14, 2012, "Request Processing in a Content Delivery Network".
U.S. Appl. No. 13/714,417, filed Dec. 14, 2012, Content Delivery Framework with Dynamic Service Network Topologies.
U.S. Appl. No. 13/714,475, filed Dec. 14, 2012, "Framework Supporting Content Delivery with Reducer Services Network".
U.S. Appl. No. 13/714,489, filed Dec. 14, 2012, "Framework Supporting Content Delivery with Collector Services Network".
U.S. Appl. No. 13/714,510, filed Dec. 14, 2012, "Framework Supporting Content Delivery with Rendezvous Services Network".
U.S. Appl. No. 13/714,537, filed Dec. 14, 2012, "Framework Supporting Content Delivery with Delivery Services Network".
U.S. Appl. No. 13/714,711, filed Dec. 14, 2012, "Framework Supporting Content Delivery with Hybrid Content Delivery Services".
U.S. Appl. No. 13/714,760, filed Dec. 14, 2012, "Framework Supporting Content Delivery with Content Delivery Services".
U.S. Appl. No. 13/714,956, filed Dec. 14, 2012, "Framework Supporting Content Delivery with Adaptation Services".
U.S. Appl. No. 13/715,109, filed Dec. 14, 2012, "Devices and Methods Supporting Content Delivery with Adaptation Services".
U.S. Appl. No. 13/715,270, filed Dec. 14, 2012, "Devices and Methods Supporting Content Delivery with Adaptation Services".
U.S. Appl. No. 13/715,304, filed Dec. 14, 2012, "Devices and Methods Supporting Content Delivery with Adaptation Services with Provisioning".
U.S. Appl. No. 13/715,345, filed Dec. 14, 2012, "Devices and Methods Supporting Content Delivery with Adaptation Services with Feedback".
U.S. Appl. No. 13/715,466, filed Dec. 14, 2012, "Devices and Methods Supporting Content Delivery with Adaptation Services with Feedback from Health Service".
U.S. Appl. No. 13/715,590, filed Dec. 14, 2012, "Devices and Methods Supporting Content Delivery with Dynamically Configurable Log Information".
U.S. Appl. No. 13/715,650, filed Dec. 14, 2012, "Devices and Methods Supporting Content Delivery with Delivery Services Having Dynamically Configurable Log Information".
U.S. Appl. No. 13/715,683, filed Dec. 14, 2012, "Devices and Methods Supporting Content Delivery with Rendezvous Services Having Dynamically Configurable Log Information".
U.S. Appl. No. 13/715,730, filed Dec. 14, 2012, "Devices and Methods Supporting Content Delivery with Delivery Services".

(56) References Cited

OTHER PUBLICATIONS

U.S. Appl. No. 13/715,747, filed Dec. 14, 2012, "Devices and Methods Supporting Content Delivery with Rendezvous Services".
U.S. Appl. No. 13/715,780, filed Dec. 14, 2012, "Devices and Methods Supporting Content Delivery with Reducer Services".
U.S. Appl. No. 13/802,051, filed Mar. 13, 2013, "Invalidation Systems, Methods, and Devices".
U.S. Appl. No. 13/802,093, filed Mar. 13, 2013, "Systems, Methods, and Devices for Gradual Invalidation of Resources".
U.S. Appl. No. 13/802,143, filed Mar. 13, 2013, "Maintaining Invalidation Information".
U.S. Appl. No. 13/802,291, filed Mar. 13, 2013, "Responsibility-Based Request Processing".
U.S. Appl. No. 13/802,335, filed Mar. 13, 2013, "Responsibility-Based Peering".
U.S. Appl. No. 13/802,366, filed Mar. 13, 2013, "Responsibility-Based Cache Peering".
U.S. Appl. No. 13/802,440, filed Mar. 13, 2013, "Event Stream Collector Systems, Methods, and Devices".
U.S. Appl. No. 13/802,470, filed Mar. 13, 2013, "Layered Request Processing in a Content Delivery Network (CDN)".
U.S. Appl. No. 13/802,489, filed Mar. 13, 2013, "Layered Request Processing with Redirection and Delegation in a Content Delivery Network (CDN)".
U.S. Appl. No. 13/837,216, filed Mar. 15, 2013, "Content Delivery Framework with Dynamic Service Network Topology".
U.S. Appl. No. 13/837,821, filed Mar. 15, 2013, "Framework Supporting Content Delivery with Content Delivery Services".
U.S. Appl. No. 13/838,414, filed Mar. 15, 2013, "Devices and Methods Supporting Content Delivery with Adaptation Services with Feedback".
U.S. Appl. No. 13/839,400, filed Mar. 15, 2013, "Devices and Methods Supporting Content Delivery with Adaptation Services with Feedback".
U.S. Appl. No. 13/841,023, filed Mar. 15, 2013, "Configuring a Content Delivery Network (CDN)".
U.S. Appl. No. 13/841,134, filed Mar. 15, 2013, "Configuring a Content Delivery Network (CDN)".
U.S. Appl. No. 14/094,868, filed Dec. 3, 2013, "Tracking Invalidation Completion in a Content Delivery Framework".
U.S. Appl. No. 14/088,362, filed Nov. 23, 2013, "Invalidation in a Content Delivery Framework".
U.S. Appl. No. 14/095,079, filed Dec. 3, 2013, "Dynamic Topology Transitions in a Content Delivery Framework".
U.S. Appl. No. 14/105,981, filed Dec. 13, 2013, "Content Delivery Framework with Autonomous CDN Partitioned Into Multiple Virtual CDNs".
U.S. Appl. No. 14/088,358, filed Nov. 23, 2013, "Verification and Auditing in a Content Delivery Framework".
U.S. Appl. No. 14/088,367, filed Nov. 23, 2013, "Rendezvous Optimization in a Content Delivery Framework".
U.S. Appl. No. 14/105,915, filed Dec. 13, 2013, "Content Delivery Framework Having Autonomous CDN Partitioned into Multiple Virtual CDNs to Implement CDN Interconnection, Delegation, and Federation".
U.S. Appl. No. 14/088,542, filed Nov. 25, 2013, "Selective Warm Up and Wind Down Strategies in a Content Delivery Network".
U.S. Appl. No. 14/088,356, filed Nov. 23, 2013, "Configuration and Control in Content Delivery Framework".
Non-Final Office Action, dated Apr. 16, 2015, U.S. Appl. No. 13/802,489, filed Mar. 13, 2013; 35 pgs.
Oracle Solaris Cluster Geographic Edition System Administration Guide, Oracle, Part No. E25231 , 144 pgs.
International Search Report, dated Feb. 20, 2013, Int'l Appl. No. PCT/US12/069712, Int'l Filing Date Dec. 14, 2012, 4 pgs.
Written Opinion, dated Feb. 20, 2013, Int'l Appl. No. PCT/US12/069712, Int'l Filing Date Dec. 14, 2012, 6 pgs.
Kostadinova, R., "Peer-to-Peer Video Streaming", [online; retrieved on Jan. 25, 2013]; Retrieved from the Internet <URL: http://www.ee.kth.se/php/modules/publications/reports/2008/XR-EE-LCN_2008_004.pdf>, especially section 5.4.1 2008, 1-53.
Advisory Action, dated Jan. 13, 2016, U.S. Appl. No. 13/715,466, filed Dec. 14, 2012; 3 pgs.
Advisory Action, dated Jan. 8, 2016, U.S. Appl. No. 13/802,291, filed Mar. 13, 2013; 3 pgs.
Final Office Action, dated Dec. 15, 2015, U.S. Appl. No. 13/802,366, filed Mar. 13, 2013; 31 pgs.
Final Office Action, dated Dec. 15, 2015, U.S. Appl. No. 13/802,489, filed Mar. 13, 2013; 28 pgs.
Final Office Action, dated Dec. 21, 2015, U.S. Appl. No. 13/715,590, filed Dec. 14, 2012; 10 pgs.
Final Office Action, dated Dec. 21, 2015, U.S. Appl. No. 13/715,747, filed Dec. 14, 2012; 6 pgs.
Final Office Action, dated Jan. 30, 2014, U.S. Appl. No. 13/837,821, filed Mar. 15, 2013; 7 pgs.
Final Office Action, dated Jul. 10, 2015, U.S. Appl. No. 13/802,470, filed Mar. 13, 2013; 30 pgs.
Final Office Action, dated Jun. 23, 2015, U.S. Appl. No. 13/715,590, filed Dec. 14, 2012; 9 pgs.
Final Office Action, dated Jun. 25, 2015, U.S. Appl. No. 13/715,466, filed Dec. 14, 2012; 9 pgs.
Final Office Action, dated Jun. 29, 2015, U.S. Appl. No. 13/715,345, filed Dec. 14, 2012; 31 pgs.
Final Office Action, dated May 22, 2015, U.S. Appl. No. 13/841,023, filed Mar. 15, 2013; 7 pgs.
Final Office Action, dated Nov. 17, 2015, U.S. Appl. No. 13/802,291, filed Mar. 13, 2013; 29 pgs.
Final Office Action, dated Nov. 25, 2015, U.S. Appl. No. 13/715,466, filed Dec. 14, 2012; 8 pgs.
Final Office Action, dated Oct. 1, 2015, U.S. Appl. No. 13/715,590, filed Dec. 14, 2012; 10 pgs.
Final Office Action, dated Oct. 22, 2015, U.S. Appl. No. 13/802,335, filed Mar. 13, 2013; 26 pgs.
Final Office Action, dated Oct. 30, 2015, U.S. Appl. No. 13/802,051, filed Mar. 13, 2013; 13 pgs.
Final Office Action, dated Sep. 11, 2015, U.S. Appl. No. 13/802,143, filed Mar. 13, 2013; 33 pgs.
Non-Final Office Action, dated Apr. 1, 2015, U.S. Appl. No. 13/714,412, filed Dec. 14, 2012; 11 pgs.
Non-Final Office Action, dated Aug. 14, 2015, U.S. Appl. No. 14/088,362, filed Nov. 23, 2013; 29 pgs.
Non-Final Office Action, dated Dec. 10, 2015, U.S. Appl. No. 14/105,981, filed Dec. 13, 2013; 17 pgs.
Non-Final Office Action, dated Dec. 19, 2014, U.S. Appl. No. 13/715,270, filed Dec. 14, 2012; 6 pgs.
Non-Final Office Action, dated Dec. 23, 2015, U.S. Appl. No. 13/802,143, filed Mar. 13, 2013; 33 pgs.
Non-Final Office Action, dated Dec. 3, 2015, U.S. Appl. No. 13/838,414, filed Mar. 15, 2013; 9 pgs.
Non-Final Office Action, dated Dec. 4, 2014, U.S. Appl. No. 13/715,345, filed Dec. 14, 2012; 30 pgs.
Non-Final Office Action, dated Dec. 4, 2014, U.S. Appl. No. 13/838,414, filed Mar. 15, 2013; 8 pgs.
Non-Final Office Action, dated Dec. 5, 2014, U.S. Appl. No. 13/839,400, filed Mar. 15, 2013; 20 pgs.
Non-Final Office Action, dated Feb. 12, 2015, U.S. Appl. No. 13/841,134, filed Mar. 15, 2013; 7 pgs.
Non-Final Office Action, dated Feb. 13, 2015, U.S. Appl. No. 13/841,023, filed Mar. 15, 2013; 6 pgs.
Non-Final Office Action, dated Feb. 26, 2015, U.S. Appl. No. 13/714,760, filed Dec. 14, 2012; 10 pgs.
Non-Final Office Action, dated Jan. 11, 2016, U.S. Appl. No. 14/088,542, filed Nov. 25, 2013; 30 pgs.
Non-Final Office Action, dated Jan. 15, 2016, U.S. Appl. No. 13/802,093, filed Mar. 13, 2013; 11 pgs.
Non-Final Office Action, dated Jan. 15, 2016, U.S. Appl. No. 14/307,374, filed Jun. 17, 2014; 22 pgs.
Non-Final Office Action, dated Jan. 22, 2015, U.S. Appl. No. 13/715,590, filed Dec. 14, 2012; 8 pgs.
Non-Final Office Action, dated Jan. 22, 2016, U.S. Appl. No. 13/715,345, filed Dec. 14, 2012; 22 pgs.

(56) References Cited

OTHER PUBLICATIONS

Non-Final Office Action, dated Jan. 26, 2015, U.S. Appl. No. 13/714,416, filed Dec. 14, 2012; 14 pgs.
Non-Final Office Action, dated Jan. 27, 2015, U.S. Appl. No. 13/715,455, filed Dec. 14, 2012; 10 pgs.
Non-Final Office Action, dated Jan. 4, 2016, U.S. Appl. No. 14/303,389, filed Jun. 12, 2014; 17 pgs.
Non-Final Office Action, dated Jan. 5, 2015, U.S. Appl. No. 13/715,304, filed Dec. 14, 2012; 6 pgs.
Non-Final Office Action, dated Jan. 5, 2015, U.S. Appl. No. 13/715,683, filed Dec. 14, 2012; 6 pgs.
Non-Final Office Action, dated Jan. 5, 2016, U.S. Appl. No. 14/088,358, filed Nov. 23, 2013; 18 pgs.
Non-Final Office Action, dated Jan. 5, 2016, U.S. Appl. No. 14/088,367, filed Nov. 23, 2013; 27 pgs.
Non-Final Office Action, dated Jan. 6, 2016, U.S. Appl. No. 13/802,335, filed Mar. 13, 2013; 26 pgs.
Non-Final Office Action, dated Jan. 7, 2015, U.S. Appl. No. 13/715,650, filed Dec. 14, 2012; 6 pgs.
Non-Final Office Action, dated Jan. 7, 2015, U.S. Appl. No. 13/802,470, filed Mar. 13, 2013; 37 pgs.
Non-Final Office Action, dated Jul. 10, 2015, U.S. Appl. No. 13/714,417, filed Dec. 14, 2012; 7 pgs.
Non-Final Office Action, dated Jul. 17, 2015, U.S. Appl. No. 13/802,440, Mar. 13, 2013; 22 pgs.
Non-Final Office Action, dated Jul. 20, 2015, U.S. Appl. No. 13/715,747, filed Dec. 14, 2012; 10 pgs.
Non-Final Office Action, dated Jul. 31, 2015, U.S. Appl. No. 14/580,086, filed Dec. 22, 2014; 23 pgs.
Non-Final Office Action, dated Jul. 8, 2015, U.S. Appl. No. 14/579,640, filed Dec. 22, 2014; 26 pgs.
Non-Final Office Action, dated Jun. 19, 2015, U.S. Appl. No. 14/580,038, filed Dec. 22, 2014; 21 pgs.
Non-Final Office Action, dated Jun. 2, 2015, U.S. Appl. No. 13/802,051, filed Mar. 13, 2013; 11 pgs.
Non-Final Office Action, dated Jun. 25, 2015, U.S. Appl. No. 13/839,400, filed Mar. 15, 2013; 19 pgs.
Non-Final Office Action, dated Jun. 26, 2015, U.S. Appl. No. 13/714,411, filed Dec. 14, 2012; 19 pgs.
Non-Final Office Action, dated Jun. 29, 2015, U.S. Appl. No. 13/714,410, filed Dec. 14, 2012; 19 pgs.
Non-Final Office Action, dated Jun. 4, 2015, U.S. Appl. No. 13/802,366, filed Mar. 13, 2013; 27 pgs.
Non-Final Office Action, dated May 12, 2015, U.S. Appl. No. 13/802,291, filed Mar. 13, 2013; 25 pgs.
Non-Final Office Action, dated May 21, 2015, U.S. Appl. No. 13/802,335, filed Mar. 13, 2013; 34 pgs.
Non-Final Office Action, dated May 6, 2015, U.S. Appl. No. 13/802,143, filed Mar. 13, 2013; 32 pgs.
Non-Final Office Action, dated May 7, 2015, U.S. Appl. No. 13/838,414, filed Mar. 15, 2013; 7 pgs.
Non-Final Office Action, dated Nov. 15, 2015, U.S. Appl. No. 13/715,780, filed Dec. 14, 2012; 9 pgs.
Non-Final Office Action, dated Nov. 20, 2014, U.S. Appl. No. 13/715,730, filed Dec. 14, 2012; 6 pgs.
Non-Final Office Action, dated Nov. 25, 2015, U.S. Appl. No. 13/714,760, filed Dec. 14, 2012; 8 pgs.
Non-Final Office Action, dated Nov. 5, 2015, U.S. Appl. No. 14/088,356, filed Nov. 23, 2013; 28 pgs.
Non-Final Office Action, dated Oct. 31, 2014, U.S. Appl. No. 13/802,051, filed Mar. 13, 2013; 12 pgs.
Non-Final Office Action, dated Sep. 12, 2014, U.S. Appl. No. 13/714,475, filed Dec. 14, 2012; 5 pgs.
Non-Final Office Action, dated Sep. 12, 2014, U.S. Appl. No. 13/714,489, filed Dec. 14, 2012; 5 pgs.
Non-Final Office Action, dated Sep. 12, 2014, U.S. Appl. No. 13/714,510, filed Dec. 14, 2012; 5 pgs.
Non-Final Office Action, dated Sep. 12, 2014, U.S. Appl. No. 13/714,537, filed Dec. 14, 2012; 5 pgs.
Non-Final Office Action, dated Sep. 12, 2014, U.S. Appl. No. 13/714,956, filed Dec. 14, 2012; 5 pgs.
Non-Final Office Action, dated Sep. 14, 2015, U.S. Appl. No. 13/802,406, filed Mar. 13, 2013; 17 pgs.
Non-Final Office Action, dated Sep. 18, 2014, U.S. Appl. No. 13/715,109, filed Dec. 14, 2012; 5 pgs.
Non-Final Office Action, dated Sep. 25, 2015, U.S. Appl. No. 14/094,868, filed Dec. 3, 2013; 17 pgs.
Notice of Allowance, dated Apr. 10, 2015, U.S. Appl. No. 13/714,510, filed Dec. 14, 2012; 11 pgs.
Notice of Allowance, dated Apr. 10, 2015, U.S. Appl. No. 13/841,134, filed Mar. 15, 2013; 8 pgs.
Notice of Allowance, dated Apr. 14, 2015, U.S. Appl. No. 13/714,537, filed Dec. 14, 2012; 12 pgs.
Notice of Allowance, dated Apr. 15, 2015, U.S. Appl. No. 13/714,489, filed Dec. 14, 2012; 11 pgs.
Notice of Allowance, dated Apr. 15, 2015, U.S. Appl. No. 13/714,956, filed Dec. 14, 2012; 11 pgs.
Notice of Allowance, dated Apr. 15, 2015, U.S. Appl. No. 13/715,270, filed Dec. 14, 2012; 9 pgs.
Notice of Allowance, dated Apr. 2, 2014, U.S. Appl. No. 13/838,414, filed Mar. 15, 2013; 17 pgs.
Notice of Allowance, dated Apr. 22, 2014, U.S. Appl. No. 13/837,821, filed Mar. 15, 2013; 7 pgs.
Notice of Allowance, dated Apr. 24, 2015, U.S. Appl. No. 13/715,109, filed Dec. 14, 2012; 10 pgs.
Notice of Allowance, dated Apr. 28, 2015, U.S. Appl. No. 13/715,304, filed Dec. 14, 2012; 9 pgs.
Notice of Allowance, dated Aug. 14, 2015, U.S. Appl. No. 13/714,510, filed Dec. 14, 2012; 10 pgs.
Notice of Allowance, dated Aug. 27, 2015, U.S. Appl. No. 13/715,650, filed Dec. 14, 2012; 4 pgs.
Notice of Allowance, dated Aug. 28, 2015, U.S. Appl. No. 13/714,489, filed Dec. 14, 2012; 11 pgs.
Notice of Allowance, dated Aug. 3, 2015, U.S. Appl. No. 13/714,537, filed Dec. 14, 2012; 11 pgs.
Notice of Allowance, dated Aug. 6, 2015, U.S. Appl. No. 13/841,134, filed Mar. 15, 2013; 8 pgs.
Notice of Allowance, dated Dec. 10, 2015, U.S. Appl. No. 13/714,711, filed Dec. 14, 2012; 11 pgs.
Notice of Allowance, dated Dec. 16, 2015, U.S. Appl. No. 13/714,412, filed Dec. 14, 2012; 5 pgs.
Notice of Allowance, dated Dec. 16, 2015, U.S. Appl. No. 13/714,416, filed Dec. 14, 2012; 7 pgs.
Notice of Allowance, dated Dec. 16, 2015, U.S. Appl. No. 13/715,109, filed Dec. 14, 2012; 10 pgs.
Notice of Allowance, dated Dec. 16, 2015, U.S. Appl. No. 13/715,683, filed Dec. 14, 2012; 5 pgs.
Notice of Allowance, dated Dec. 18, 2015, U.S. Appl. No. 13/714,475, filed Dec. 14, 2012; 11 pgs.
Notice of Allowance, dated Dec. 21, 2015, U.S. Appl. No. 13/715,304, filed Dec. 14, 2012; 5 pgs.
Notice of Allowance, dated Dec. 23, 2015, U.S. Appl. No. 13/714,489, filed Dec. 14, 2012; 12 pgs.
Notice of Allowance, dated Dec. 3, 2015, U.S. Appl. No. 13/715,270, filed Dec. 14, 2012; 5 pgs.
Notice of Allowance, dated Dec. 30, 2015, U.S. Appl. No. 13/841,023, filed Mar. 15, 2013; 9 pgs.
Notice of Allowance, dated Dec. 4, 2015, U.S. Appl. No. 13/715,650, filed Dec. 14, 2012; 5 pgs.
Notice of Allowance, dated Dec. 4, 2015, U.S. Appl. No. 13/837,821, filed Mar. 15, 2013; 7 pgs.
Notice of Allowance, dated Dec. 4, 2015, U.S. Appl. No. 13/841,134, filed Mar. 15, 2013; 8 pgs.
Notice of Allowance, dated Dec. 7, 2015, U.S. Appl. No. 13/714,956, filed Dec. 14, 2012; 11 pgs.
Notice of Allowance, dated Dec. 9, 2015, U.S. Appl. No. 13/715,730, filed Dec. 14, 2012; 5 pgs.
Notice of Allowance, dated Jan. 12, 2015, U.S. Appl. No. 13/837,821, filed Mar. 15, 2013; 7 pgs.
Notice of Allowance, dated Jan. 12, 2016, U.S. Appl. No. 13/714,410, filed Dec. 14, 2012; 6 pgs.

(56) References Cited

OTHER PUBLICATIONS

Notice of Allowance, dated Jan. 13, 2016, U.S. Appl. No. 13/714,537, filed Dec. 14, 2012; 11 pgs.
Notice of Allowance, dated Jan. 13, 2016, U.S. Appl. No. 13/714,411, filed Dec. 14, 2012; 5 pgs.
Notice of Allowance, dated Jan. 21, 2016, U.S. Appl. No. 13/714,510, filed Dec. 14, 2012; 10 pgs.
Notice of Allowance, dated Jan. 22, 2015, U.S. Appl. No. 13/714,711, filed Dec. 14, 2012; 6 pgs.
Notice of Allowance, dated Jul. 10, 2015, U.S. Appl. No. 13/715,109, filed Dec. 14, 2012; 9 pgs.
Notice of Allowance, dated Jul. 17, 2015, U.S. Appl. No. 13/714,711, filed Dec. 14, 2012; 11 pgs.
Notice of Allowance, dated Jul. 17, 2015, U.S. Appl. No. 13/715,270, filed Dec. 14, 2012; 5 pgs.
Notice of Allowance, dated Jul. 6, 2015, U.S. Appl. No. 13/715,650, filed Dec. 14, 2012; 5 pgs.
Notice of Allowance, dated Jun. 11, 2015, U.S. Appl. No. 13/714,510, filed Dec. 14, 2012; 10 pgs.
Notice of Allowance, dated Jun. 18, 2015, U.S. Appl. No. 13/715,304, filed Dec. 14, 2012; 5 pgs.
Notice of Allowance, dated Jun. 19, 2015, U.S. Appl. No. 13/714,475, filed Dec. 14, 2012; 11 pgs.
Notice of Allowance, dated Jun. 19, 2015, U.S. Appl. No. 13/715,683, filed Dec. 14, 2012; 5 pgs.
Notice of Allowance, dated Jun. 19, 2015, U.S. Appl. No. 13/715,730, filed Dec. 14, 2012; 5 pgs.
Notice of Allowance, dated Jun. 22, 2015, U.S. Appl. No. 13/714,489, filed Dec. 14, 2012; 11 pgs.
Notice of Allowance, dated Jun. 22, 2015, U.S. Appl. No. 13/714,956, filed Dec. 14, 2012; 11 pgs.
Notice of Allowance, dated Jun. 5, 2015, U.S. Appl. No. 13/714,537, filed Dec. 14, 2012; 11 pgs.
Notice of Allowance, dated Jun. 5, 2015, U.S. Appl. No. 13/715,270, filed Dec. 14, 2012; 5 pgs.
Notice of Allowance, dated Jun. 5, 2015, U.S. Appl. No. 13/715,650, filed Dec. 14, 2012; 5 pgs.
Notice of Allowance, dated May 1, 2015, U.S. Appl. No. 13/714,475, filed Dec. 14, 2012; 11 pgs.
Notice of Allowance, dated May 13, 2015, U.S. Appl. No. 13/714,711, filed Dec. 14, 2012; 10 pgs.
Notice of Allowance, dated May 5, 2015, U.S. Appl. No. 13/715,650, filed Dec. 14, 2012; 9 pgs.
Notice of Allowance, dated May 6, 2015, U.S. Appl. No. 13/715,683, filed Dec. 14, 2012; 9 pgs.
Notice of Allowance, dated May 6, 2015, U.S. Appl. No. 13/715,730, filed Dec. 14, 2012; 9 pgs.
Notice of Allowance, dated Nov. 21, 2014, U.S. Appl. No. 13/714,711, filed Dec. 14, 2012; 6 pgs.
Notice of Allowance, dated Nov. 24, 2014, U.S. Appl. No. 13/837,821, filed Mar. 15, 2013; 7 pgs.
Notice of Allowance, dated Nov. 24, 2015, U.S. Appl. No. 13/714,417, filed Dec. 14, 2012; 5 pgs.
Notice of Allowance, dated Nov. 9, 2015, U.S. Appl. No. 13/841,023, filed Mar. 15, 2013; 9 pgs.
Notice of Allowance, dated Nov. 9, 2015, U.S. Appl. No. 13/841,134, filed Mar. 15, 2013; 8 pgs.
Notice of Allowance, dated Oct. 22, 2015, U.S. Appl. No. 13/838,414, filed Mar. 15, 2013; 7 pgs.
Notice of Allowance, dated Sep. 12, 2014, U.S. Appl. No. 13/714,711, filed Dec. 14, 2012; 10 pgs.
Notice of Allowance, dated Sep. 14, 2015, U.S. Appl. No. 13/715,270, filed Dec. 14, 2012; 5 pgs.
Notice of Allowance, dated Sep. 14, 2015, U.S. Appl. No. 13/715,304, filed Dec. 14, 2012; 5 pgs.
Notice of Allowance, dated Sep. 14, 2015, U.S. Appl. No. 13/715,683, filed Dec. 14, 2012; 5 pgs.
Notice of Allowance, dated Sep. 14, 2015, U.S. Appl. No. 13/715,730, filed Dec. 14, 2012; 5 pgs.
Notice of Allowance, dated Sep. 16, 2015, U.S. Appl. No. 13/714,475, filed Dec. 14, 2012; 10 pgs.
Notice of Allowance, dated Sep. 17, 2015, U.S. Appl. No. 13/714,412, filed Dec. 14, 2012; 5 pgs.
Notice of Allowance, dated Sep. 17, 2015, U.S. Appl. No. 13/714,537, filed Dec. 14, 2012; 11 pgs.
Notice of Allowance, dated Sep. 18, 2015, U.S. Appl. No. 13/714,956, filed Dec. 14, 2012; 11 pgs.
Notice of Allowance, dated Sep. 18, 2015, U.S. Appl. No. 13/837,821, filed Mar. 15, 2013; 8 pgs.
Notice of Allowance, dated Sep. 22, 2015, U.S. Appl. No. 13/715,109, filed Dec. 14, 2012; 10 pgs.
Notice of Allowance, dated Sep. 25, 2015, U.S. Appl. No. 13/715,650, filed Dec. 14, 2012; 5 pgs.
Notice of Allowance, dated Sep. 28, 2015, U.S. Appl. No. 13/714,510, filed Dec. 14, 2012; 10 pgs.
Notice of Allowance, dated Sep. 30, 2015, U.S. Appl. No. 13/714,711, filed Dec. 14, 2012; 11 pgs.
Notice of Allowance, dated Sep. 4, 2015, U.S. Appl. No. 13/714,416, filed Dec. 14, 2012; 14 pgs.
Notice of Allowance, dated Sep. 5, 2014, U.S. Appl. No. 13/837,821, filed Mar. 15, 2013; 9 pgs.
Non-Final Office Action, dated Feb. 2, 2016, U.S. Appl. No. 14/303,314, filed Jun. 12, 2014; 18 pgs.
Non-Final Office Action, dated Feb. 2, 2016, U.S. Appl. No. 14/307,380, filed Jun. 17, 2014; 21 pgs.
Final Office Action, dated Feb. 1, 2016, U.S. Appl. No. 14/579,640, filed Dec. 22, 2014; 24 pgs.
Final Office Action, dated Feb. 26, 2016, U.S. Appl. No. 14/088,362, filed Nov. 23, 2013; 31 pgs.
Final Office Action, dated Feb. 26, 2016; U.S. Appl. No. 14/307,404, filed Jun. 17, 2014; 17 pgs.
Non-Final Office Action, dated Feb. 26, 2016, U.S. Appl. No. 14/580,086, filed Dec. 22, 2014; 27 pgs.
Non-Final Office Action, dated Mar. 14, 2016, U.S. Appl. No. 14/105,915, filed Dec. 13, 2013; 27 pgs.
Non-Final Office Action, dated Mar. 16, 2016, U.S. Appl. No. 13/839,400, filed Mar. 15, 2013; 21 pgs.
"Overview of recent changes in the IP interconnection ecosystem", Analysys Mason May 2011 , 47 pgs.
"What Every Service Provider Should Know About Federated CDNs", *Skytide* IP Video Management Analytics Jun. 19, 2011 , 12 pgs.
"Wholesale Content Delivery Networks: Unlocking New Revenue Streams and Content Relationships", Cisco—White Paper, Cisco and/or its affiliates 2012 , pp. 1-16.
Bartolini, N. et al., "A Walk Through Content Delivery Networks", MASCOTS 2003, LNCS 2965 2004 , pp. 1-25.
Buyya, R. et al., "Content Delivery Networks", Springer-Verlag Berlin Heidelberg; ISBN:978-3-540-77886-8 2008 , 429 pgs.
Pathan, A-M K. et al., "A Taxonomy and Survey of Content Delivery Networks", 2011 , pp. 1-44.
Puopolo, S. et al., "Content Delivery Network (CDN) Federations: How SPs Can Win the Battle for Content-Hungry Consumers", Cisco Internet Business Solutions Group (IBSG); Point of View 2011 , 9 pgs.
Sun, P. et al., "Identifying Performance Bottlenecks in CDNs through TCP—Level Monitoring", Dept. of Computer Science, Princeton University Aug. 19, 2011 , 6 pgs.
Extended European Search Report, dated Jun. 8, 2015, Application No. 12857282.3, filed Dec. 14, 2012; 13 pgs.
"NetServ Framework Design and Implementation 1.0", XML File, retrieved from Internet May 29, 2015 at http://academiccommons.columbia.edu/download/fedora_content/show_pretty/ac:135426/CONTENT/ac135426_description.xml?data=meta Nov. 16, 2011 , 4 pgs.
Lee, Jae W. et al., "NetServ Framework Design and Implementation 1.0", *Columbia University Computer Science Technical Reports* retrieved from Internet on May 29, 2015 Nov. 16, 2012 , pp. 1-15.
Yin, Hao et al., "Design and Deployment of a Hybrid CDN-P2P System for Live Video Streaming: Experiences with LiveSky", *Proceedings of the Seventeen ACM International Conference on Multimedia* Jan. 1, 2009 , pp. 25-34.

(56) References Cited

OTHER PUBLICATIONS

Final Office Action, dated Mar. 31, 2016, U.S. Appl. No. 13/715,466, filed Dec. 14, 2012; 9 pgs.
Non-Final Office Action, dated May 31, 2016, U.S. Appl. No. 13/715,590, filed Dec. 14, 2012; 9 pgs.
Non-Final Office Action, dated Mar. 24, 2016, U.S. Appl. No. 13/802,291, filed Mar. 13, 2013; 27 pgs.
Final Office Action, dated May 3, 2016, U.S. Appl. No. 13/802,440, filed Mar. 13, 2013; 29 pgs.
Final Office Action, dated Jun. 16, 2016, U.S. Appl. No. 13/838,414, filed Mar. 15, 2013; 8 pg.s.
Non-Final Office Action, dated Apr. 14, 2016, U.S. Appl. No. 13/841,023, filed Mar. 15, 2013; 16 pgs.
Non-Final Office Action, dated May 27, 2016, U.S. Appl. No. 14/088,362, filed Nov. 23, 2013; 38 pgs.
Non-Final Office Action, dated May 31, 2016, U.S. Appl. No. 14/095,079, filed Dec. 3, 2013; 13 pgs.
Final Office Action, dated May 26, 2016, Application No., filed Dec. 13, 2013; 26 pgs.
Non-Final Office Action, dated May 18, 2016, U.S. Appl. No. 14/307,374, filed Jun. 17, 2014; 21 pgs.
Non-Final Office Action, dated May 18, 2016, U.S. Appl. No. 14/307,380, filed Jun. 17, 2014; 21 pgs.
Non-Final Office Action, dated Apr. 7, 2016, U.S. Appl. No. 14/307,404, filed Jun. 17, 2014, 16 pgs.
Non-Final Office Action, dated Mar. 23, 2016, U.S. Appl. No. 14/578,402, filed Dec. 20, 2014; 15 pgs.
Final Office Action, dated Apr. 29, 2016, U.S. Appl. No. 14/579,640, filed Dec. 22, 2014; 22 pgs.
Final Office Action, dated May 6, 2016, U.S. Appl. No. 14/580,038, filed Dec. 22, 2014; 28 pgs.
Golaszewski, S., "Content Distribution Networks" *Communication Systems V*, Ch. 3, pp. 37-52, Aug. 2012, 89 pgs.
Oracle Solaris Cluster Geographic Edition System Administration Guide, Oracle, Part No. E25231, Mar. 2012, 144 pgs.
Final Office Action, dated Jul. 14, 2016, U.S. Appl. No. 13/802,143, filed Mar. 13, 2013; 38 pgs.
Extended European Search Report, dated Jul. 7, 2016, Application No. 13861539.8, filed Dec. 12, 2013; 7 pgs.
Final Office Action, dated Jul. 22, 2016, U.S. Appl. No. 13/715,345, filed Dec. 14, 2012; 27 pgs.
Non-Final Office Action, dated Aug. 16, 2016, U.S. Appl. No. 13/715,466, filed Dec. 14, 2012; 8 pgs.
Non-Final Office Action, dated Jul. 18, 2016, U.S. Appl. No. 13/715,747, filed Dec. 14, 2012; 10 pgs.
Final Office Action, dated Aug. 26, 2016, U.S. Appl. No. 13/802,093, filed Mar. 13, 2013; 12 pgs.
Final Office Action, dated Aug. 22, 2016, U.S. Appl. No. 13/802,291, filed Mar. 13, 2013; 33 pgs.
Final Office Action, dated Jul. 28, 2016, U.S. Appl. No. 13/802,335, filed Mar. 13, 2013; 26 pgs.
Non-Final Office Action, dated Sep. 23, 2016, U.S. Appl. No. 13/802,366, filed Mar. 23, 2013; 32 pgs.
Non-Final Office Action, dated Sep. 22, 2016, U.S. Appl. No. 13/802,440, filed Mar. 13, 2013; 26 pgs.
Non-Final Office Action, dated Sep. 22, 2016, U.S. Appl. No. 13/802,489, filed Mar. 13, 2013; 33 pgs.
Non-Final Office Action, dated Sep. 9, 2016, U.S. Appl. No. 13/838,414, filed Mar. 15, 2013; 24 pgs.
Final Office Action, dated Aug. 26, 2016, U.S. Appl. No. 14/088,356, filed Nov. 23, 2013; 36 pgs.
Final Office Action, dated Aug. 23, 2016, U.S. Appl. No. 14/088,358, filed Nov. 23, 2013; 18 pgs.
Final Office Action, dated Sep. 2, 2016, U.S. Appl. No. 14/088,367, filed Nov. 23, 2013; 26 pgs.
Final Office Action, dated Aug. 25, 2016, U.S. Appl. No. 14/088,542, filed Nov. 25, 2013; 33 pgs.
Final Office Action, dated Sep. 9, 2016, U.S. Appl. No. 14/303,314, filed Jun. 12, 2014; 11 pgs.
Final Office Action, dated Aug. 12, 2016, U.S. Appl. No. 14/303,389, filed Jun. 12, 2014; 12 pgs.
Non-Final Office Action, dated Aug. 1, 2016, U.S. Appl. No. 14/307,389, filed Jun. 17, 2014; 22 pgs.
Non-Final Office Action, dated Sep. 19, 2016, U.S. Appl. No. 14/307,399, filed Jun. 17, 2014; 17 pgs.
Final Office Action, dated Aug. 12, 2016, U.S. Appl. No. 14/578,402, filed Dec. 20, 2014; 15 pgs.
Non-Final Office Action, dated Sep. 9, 2016, U.S. Appl. No. 14/579,640, filed Dec. 22, 2014; 24 pgs.
Non-Final Office Action, dated Sep. 15, 2016, U.S. Appl. No. 14/580,038, filed Dec. 22, 2014; 20 pgs.
Non-Final Office Action, dated Oct. 20, 2016, U.S. Appl. No. 13/715,304, filed Dec. 14, 2012; 11 pgs.
Final office Action dated Oct. 21, 2016, U.S. Appl. No. 13/715,590, filed Dec. 14, 2012; 6 pgs.
Final Office Action, dated Oct. 6, 2016, U.S. Appl. No. 14/307,380, filed Jun. 17, 2014; 30 pgs.
Final Office Action, dated Oct. 21, 2016, U.S. Appl. No. 14/307,404, filed Jun. 17, 2014; 27 pgs.
Non-Final Office Action, dated Oct. 18, 2016, U.S. Appl. No. 14/307,411, filed Jun. 17, 2014; 33 pgs.
Final Office Action, dated Dec. 22, 2016, U.S. Appl. No. 13/715,747, filed Dec. 14, 2012; 7 pgs.
Final Office Action, dated Dec. 30, 2016, U.S. Appl. No. 14/307,389, filed Jul. 17, 2014; 31 pgs.
Final Office Action, dated Dec. 9, 2016, U.S. Appl. No. 14/088,362, filed Nov. 23, 2013; 34 pgs.
Final Office Action, dated Feb. 7, 2017, U.S. Appl. No. 14/307,399, filed Jun. 17, 2014; 22 pgs.
Final Office Action, dated Feb. 8, 2017, U.S. Appl. No. 14/095,079, filed Dec. 3, 2013; 20 pgs.
Final Office Action, dated Mar. 3, 2017, U.S. Appl. No. 14/579,640, filed Dec. 22, 2014; 31 pgs.
Non-Final Office Action, dated Dec. 16, 2016, U.S. Appl. No. 13/715,345, filed Dec. 14, 2012; 29 pgs.
Non-Final Office Action, dated Dec. 16, 2016, U.S. Appl. No. 14/105,981, filed Dec. 13, 2013; 16 pgs.
Non-Final Office Action, dated Dec. 20, 2016, U.S. Appl. No. 14/307,429, filed Jun. 17, 2014; 38 pgs.
Non-Final Office Action, dated Dec. 30, 2016, U.S. Appl. No. 14/307,423, filed Jun. 17, 2014; 39 pgs.
Non-Final Office Action, dated Dec. 30, 2016, U.S. Appl. No. 14/583,718, filed Dec. 28, 2014; 20 pgs.
Non-Final Office Action, dated Nov. 21, 2016, U.S. Appl. No. 14/105,915, filed Dec. 13, 2013; 29 pgs.
European Examination Report, dated Aug. 23, 2019, Application No. 13861539.8, filed Dec. 12, 2013; 6 pgs.

\* cited by examiner

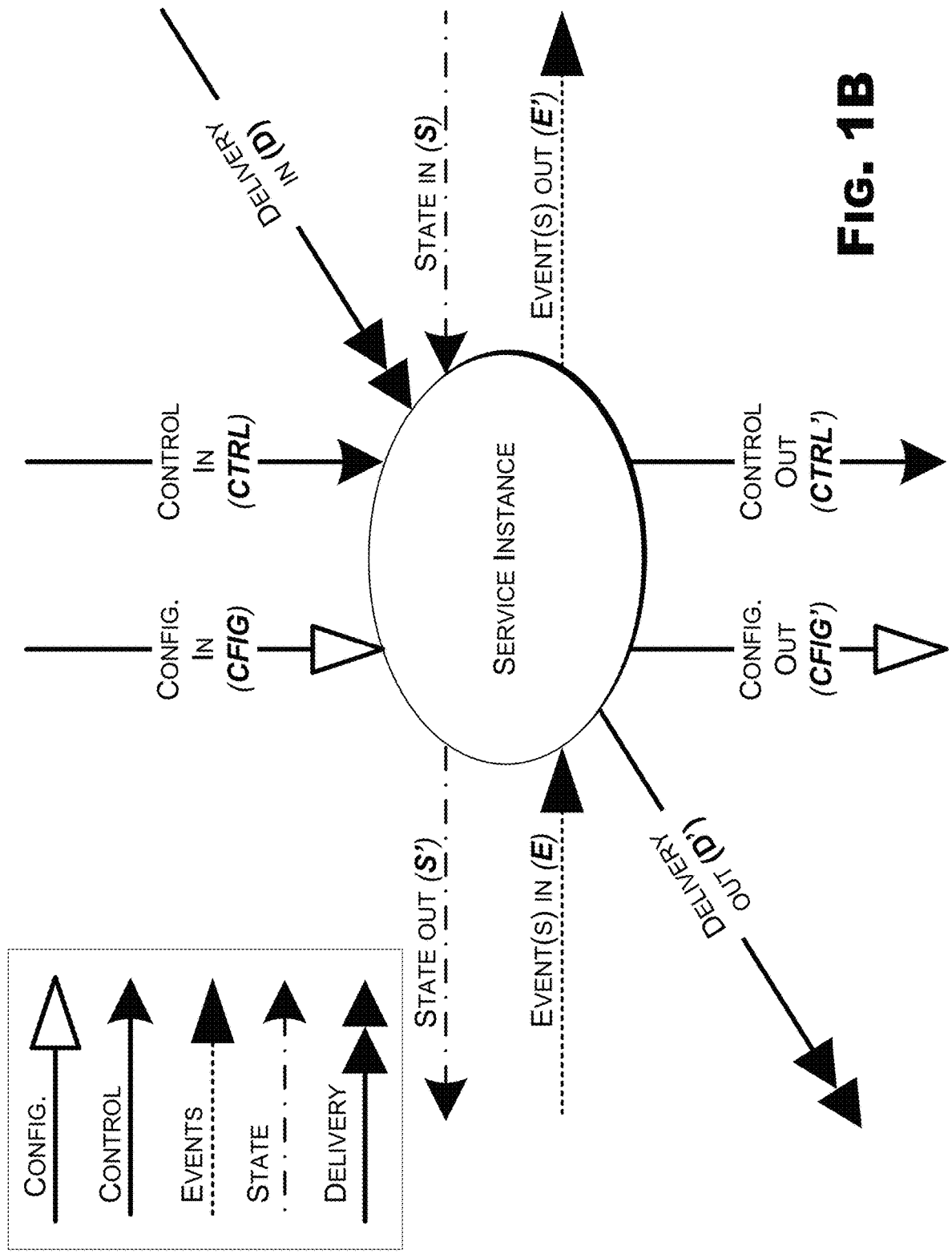

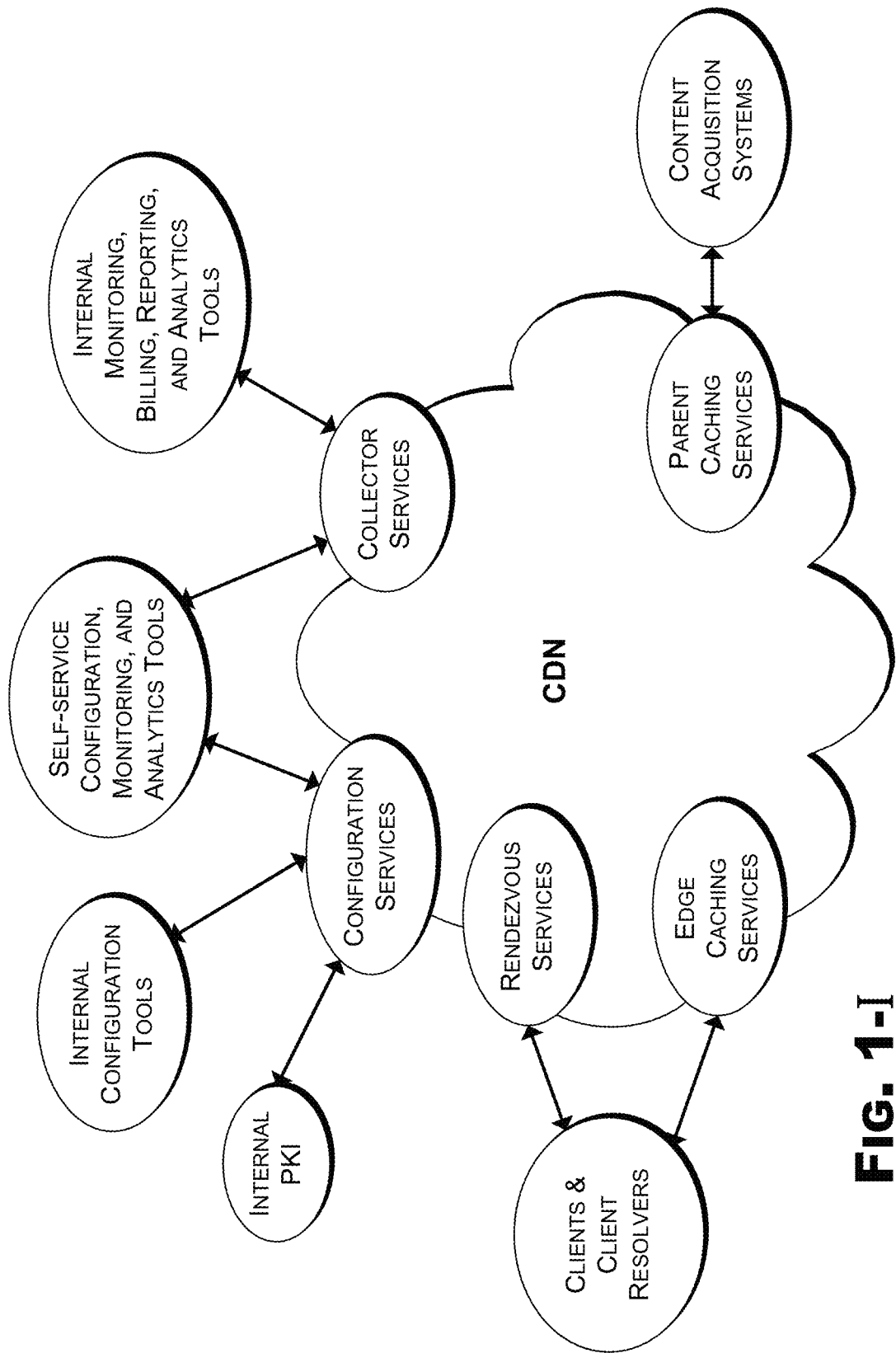
FIG. 1-I

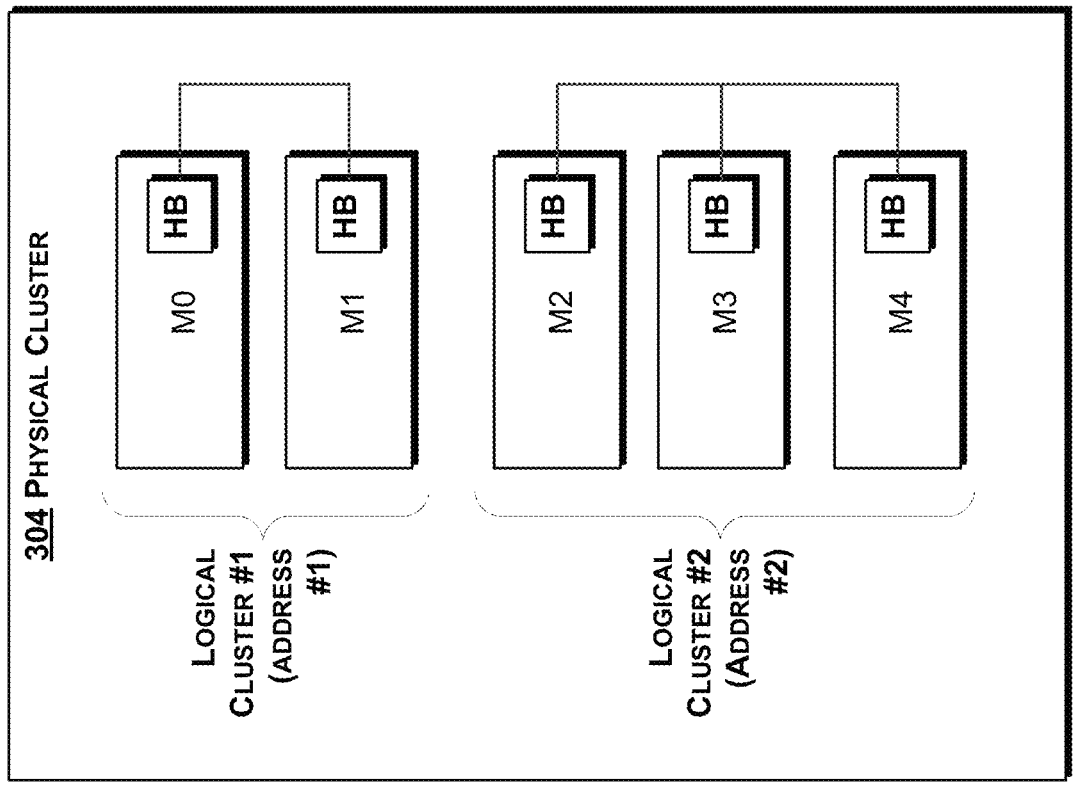
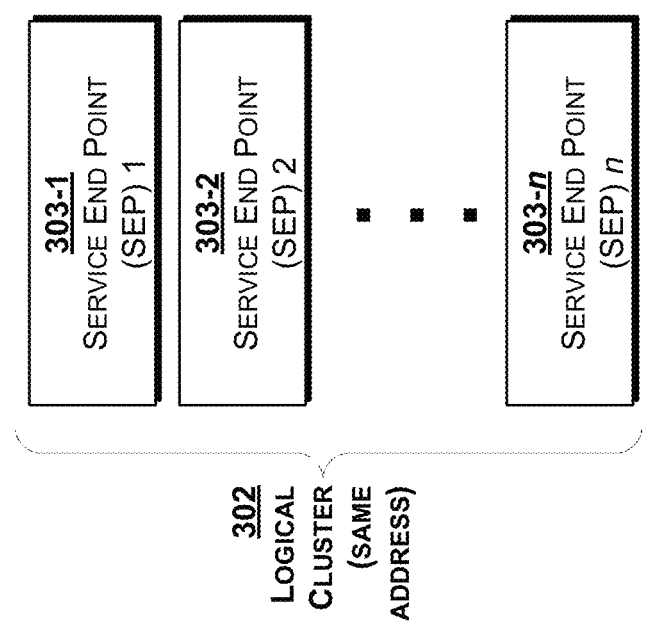
FIG. 3B
FIG. 3A

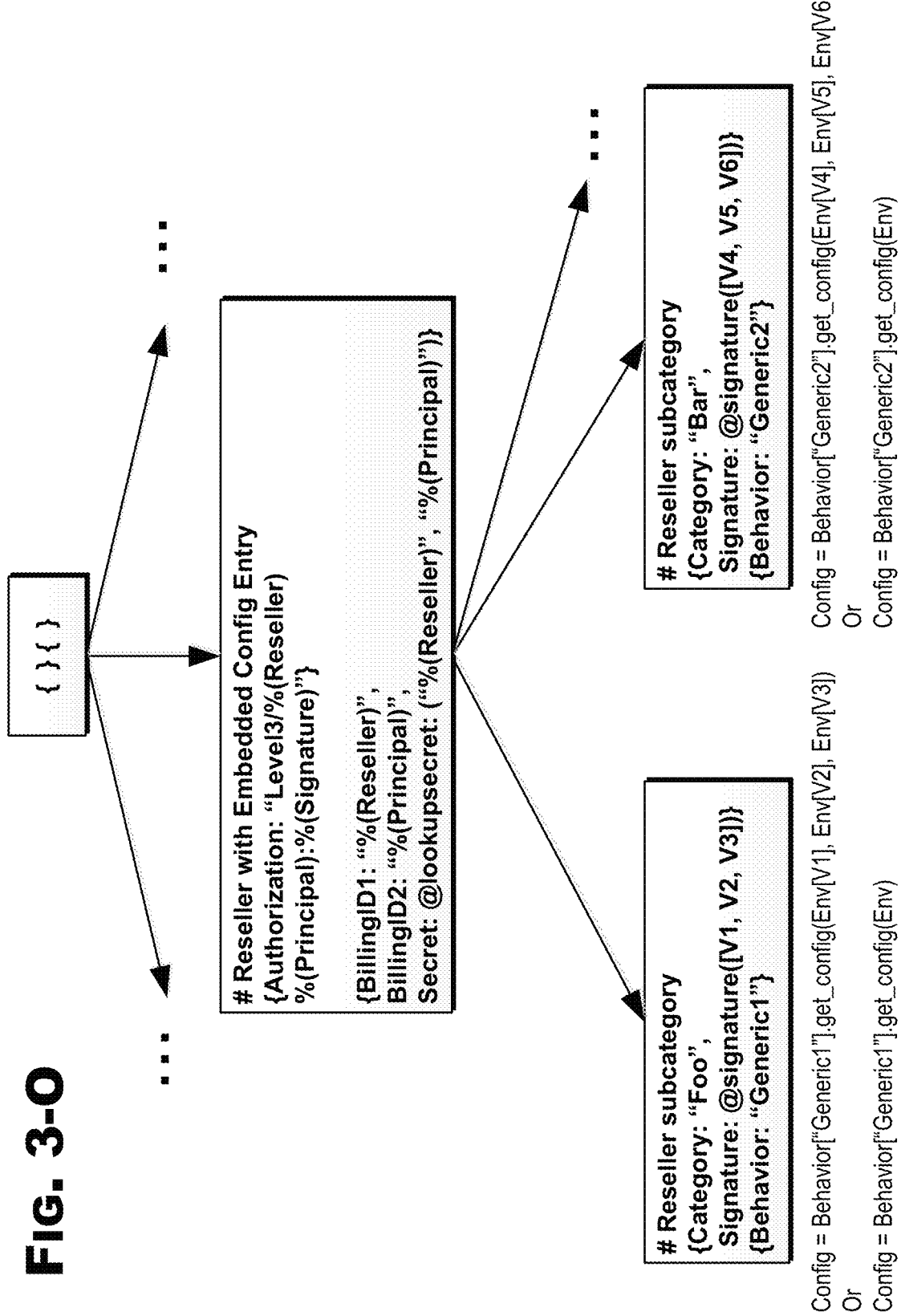
FIG. 3-O

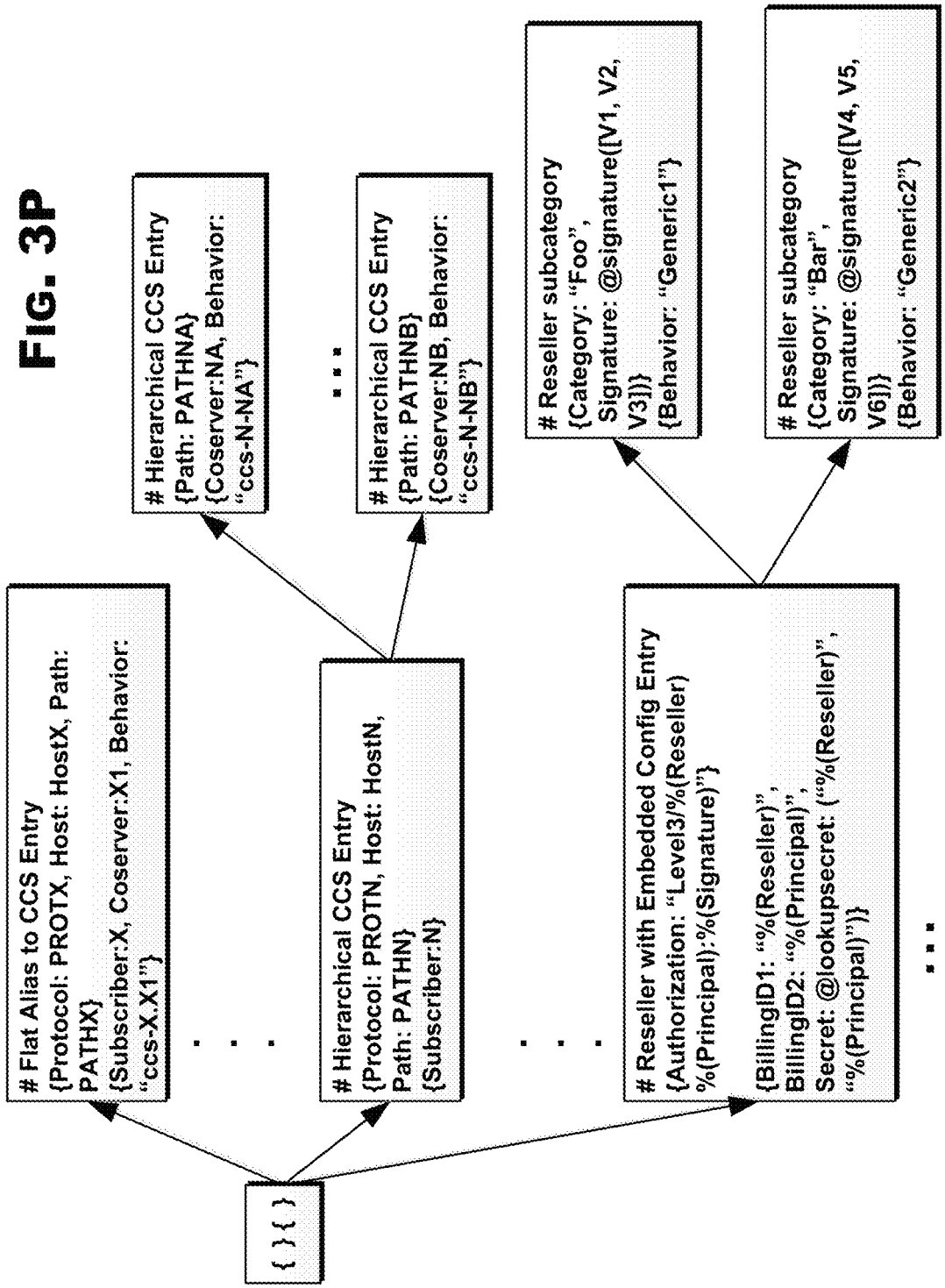

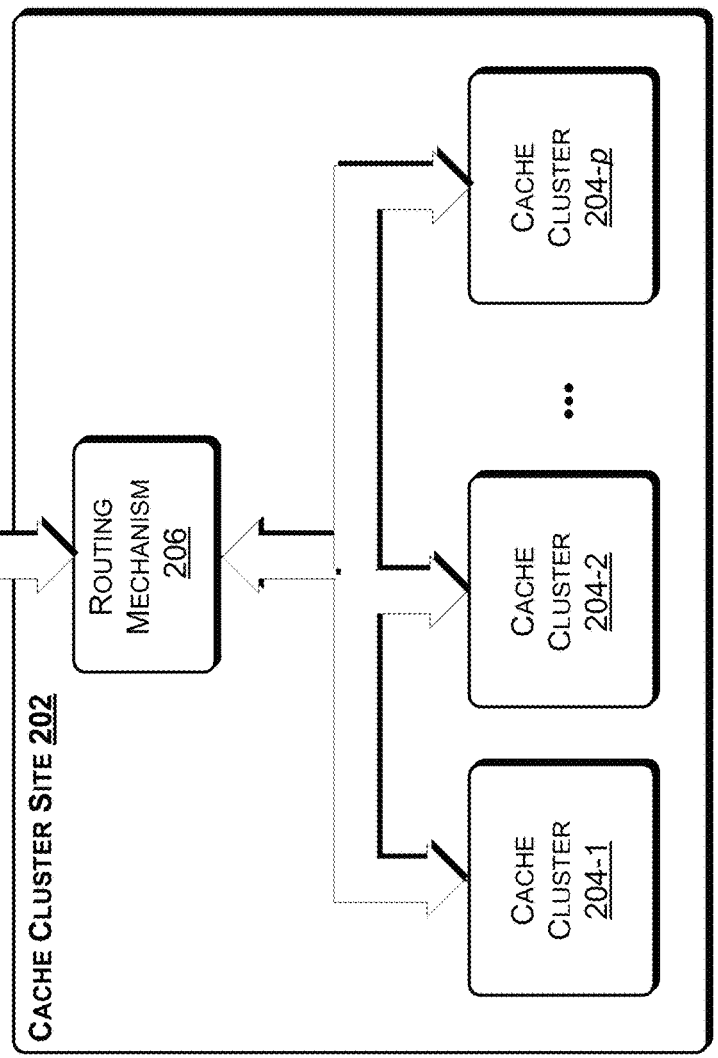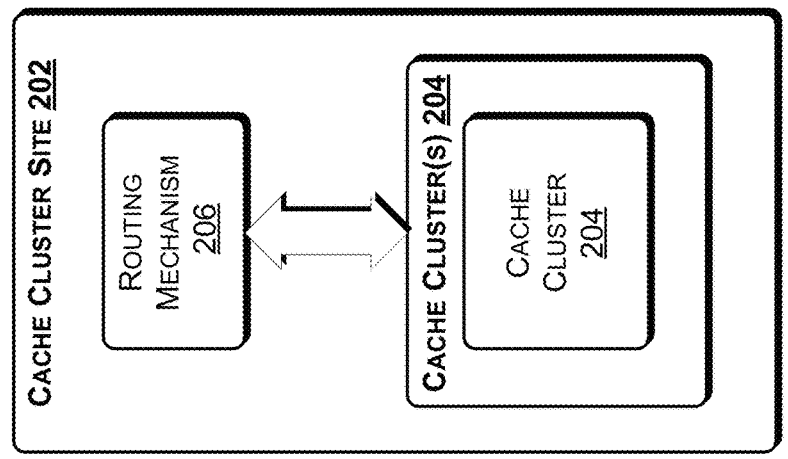

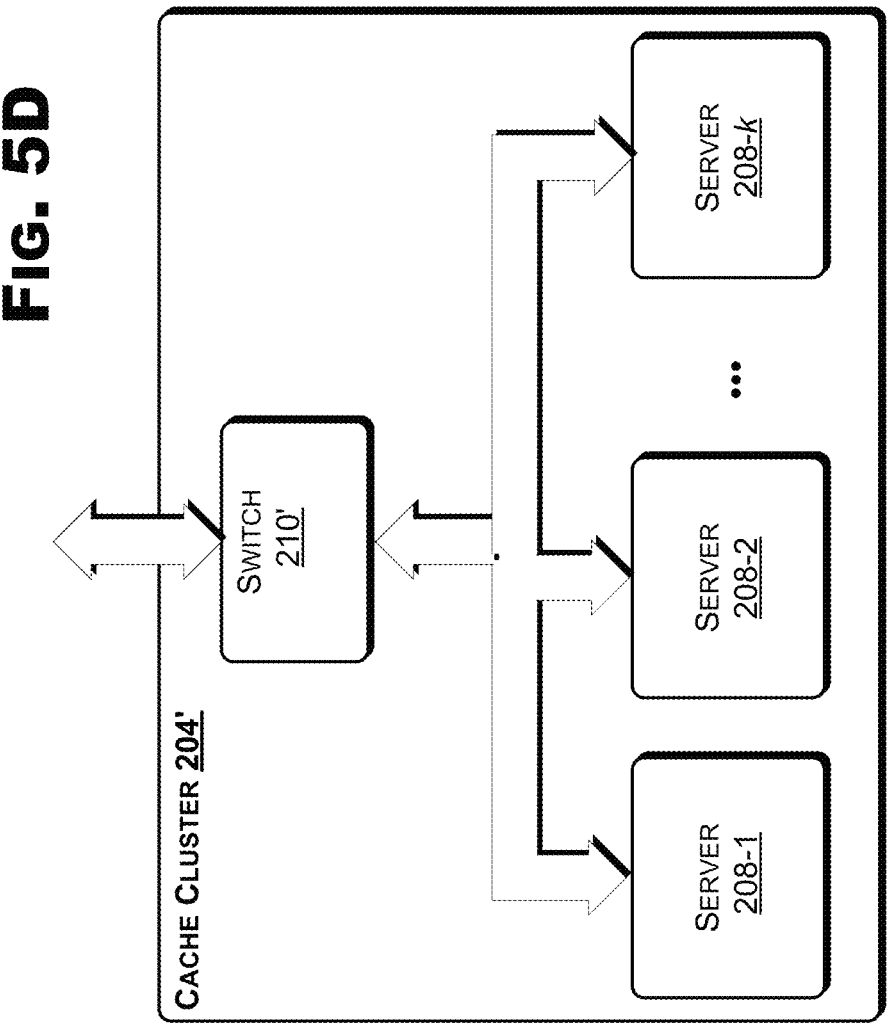
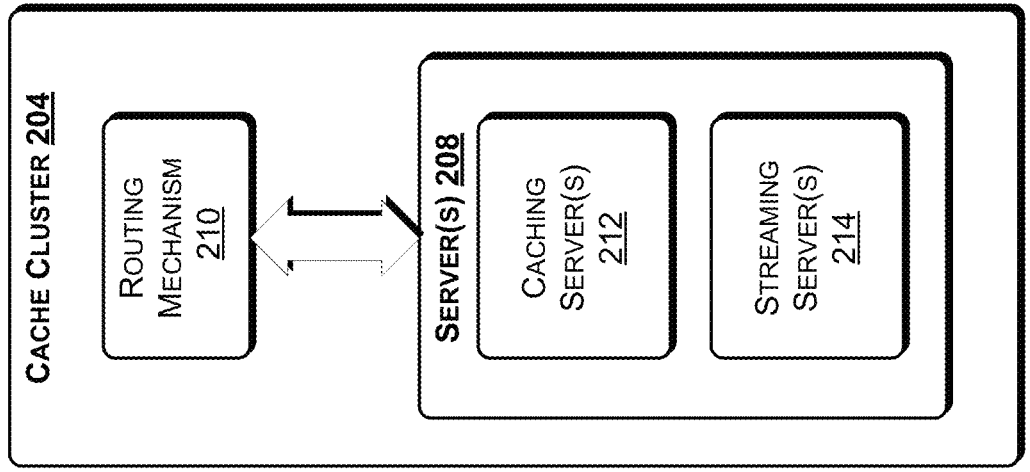

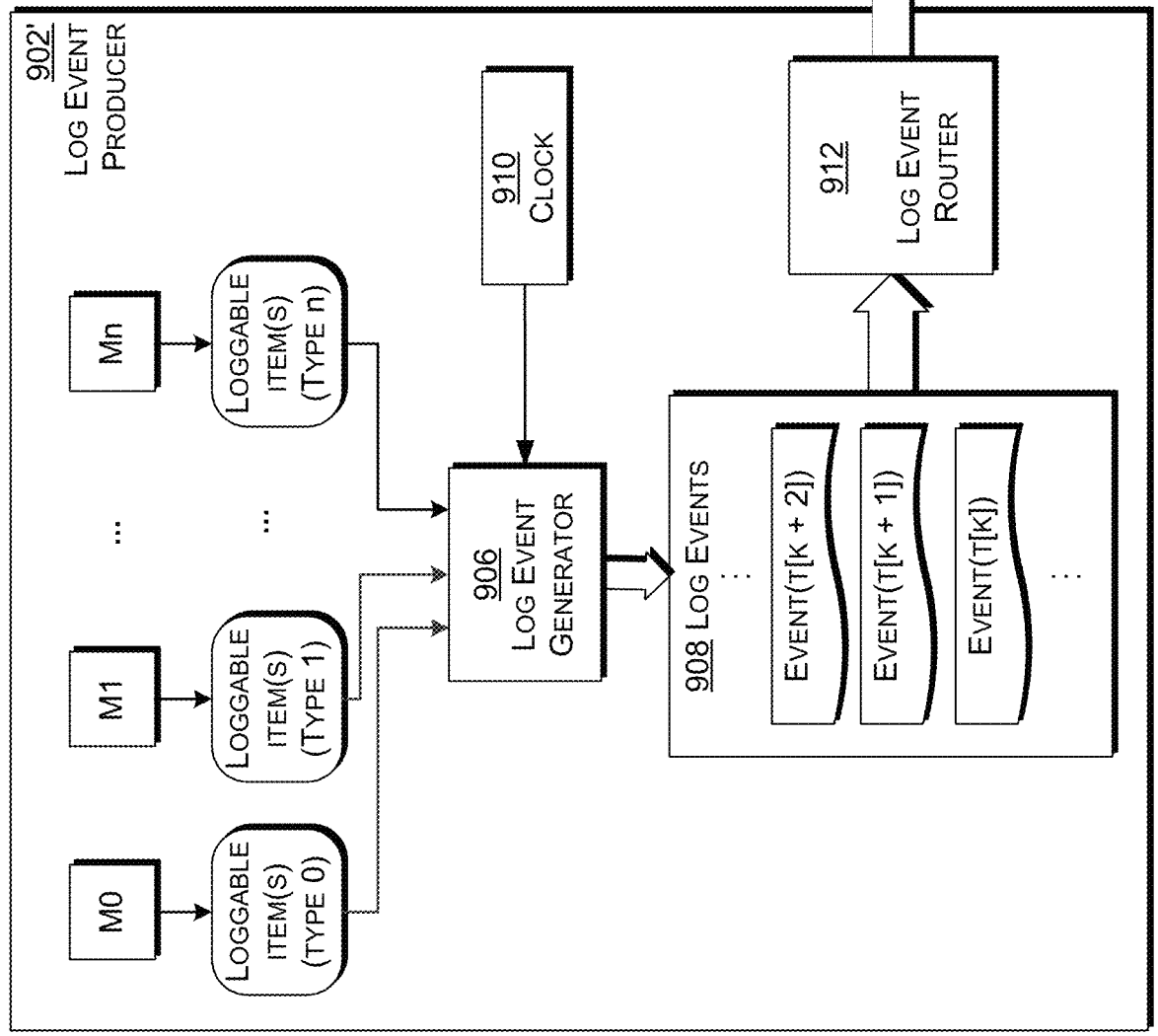

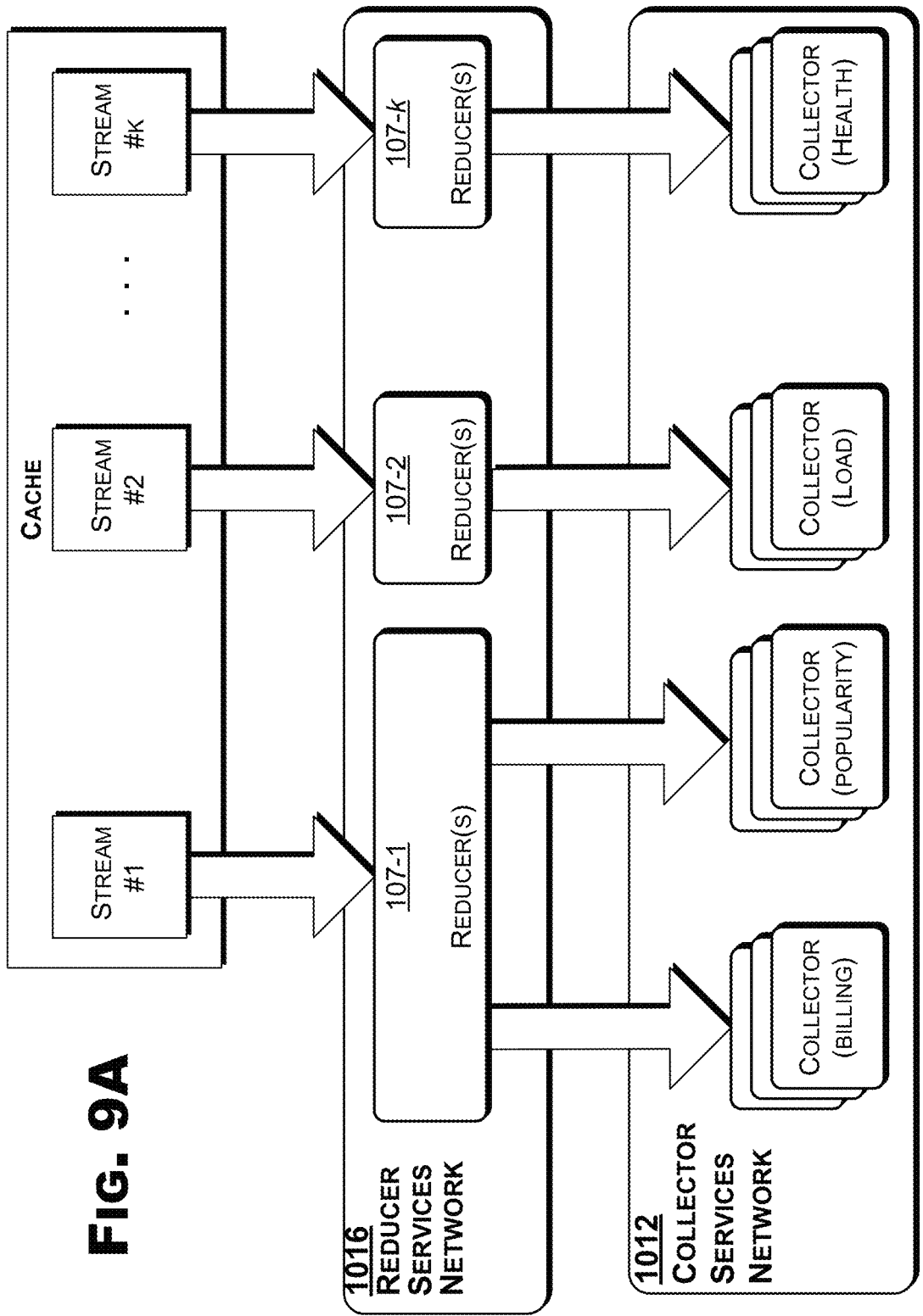

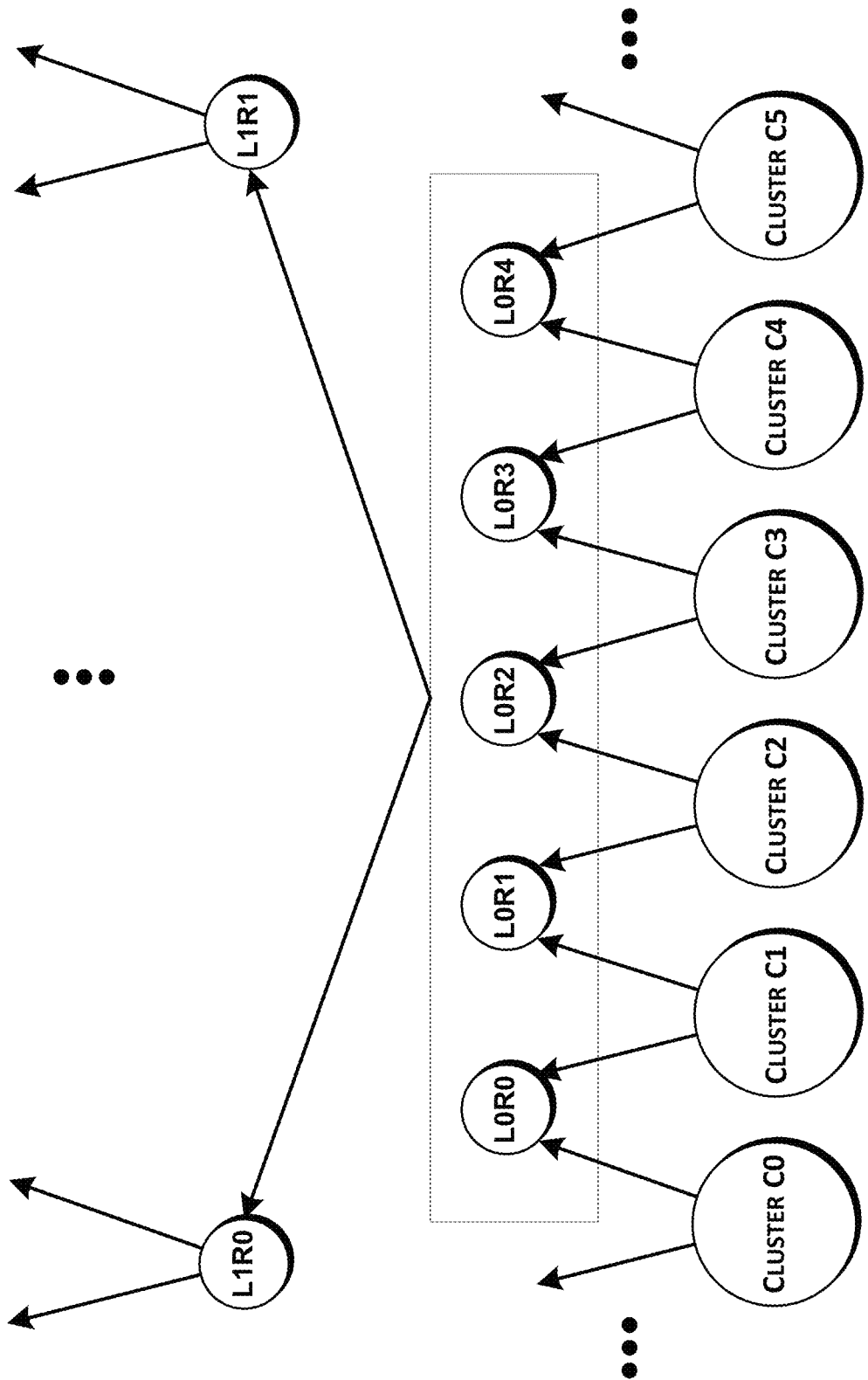

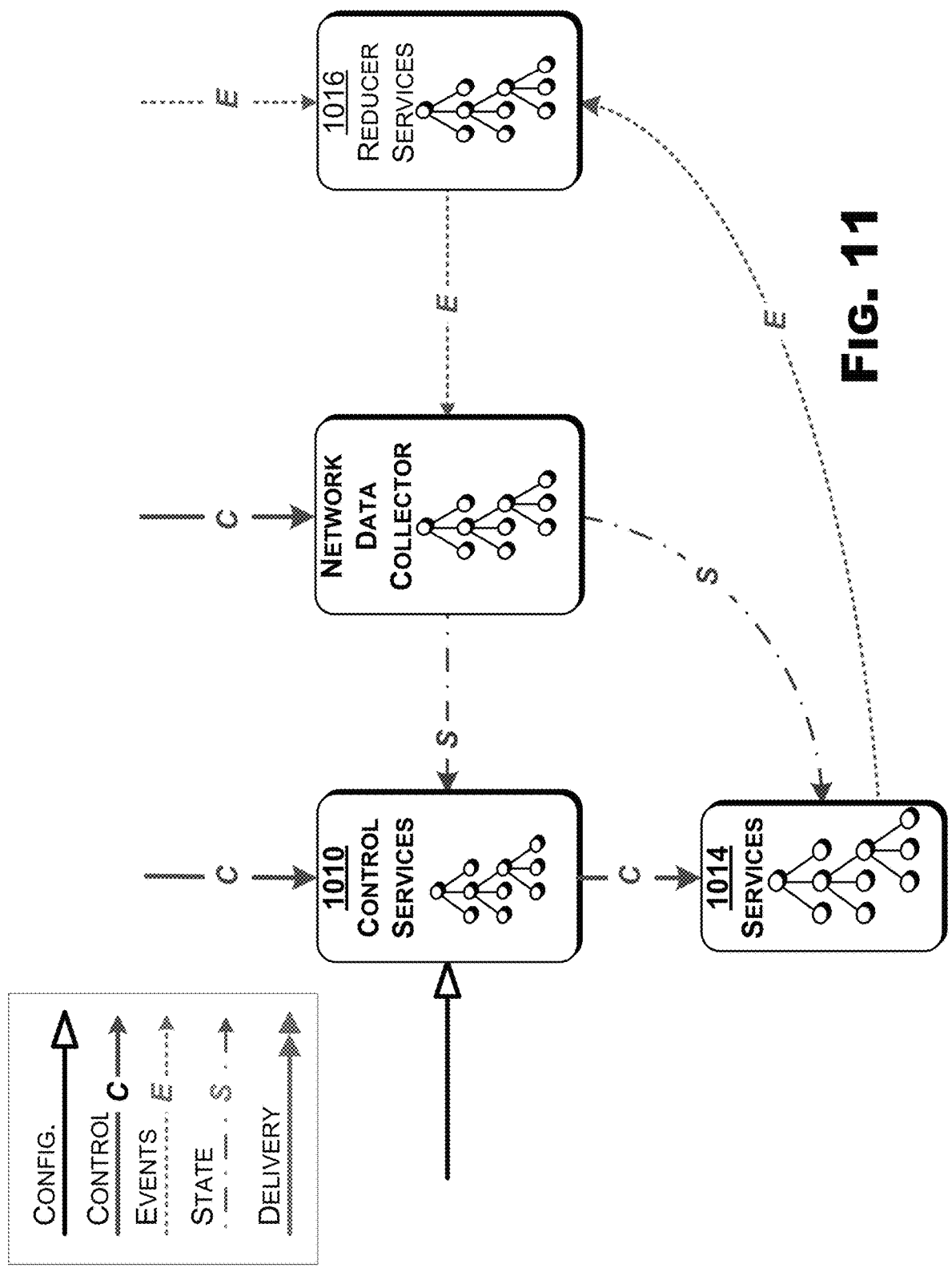

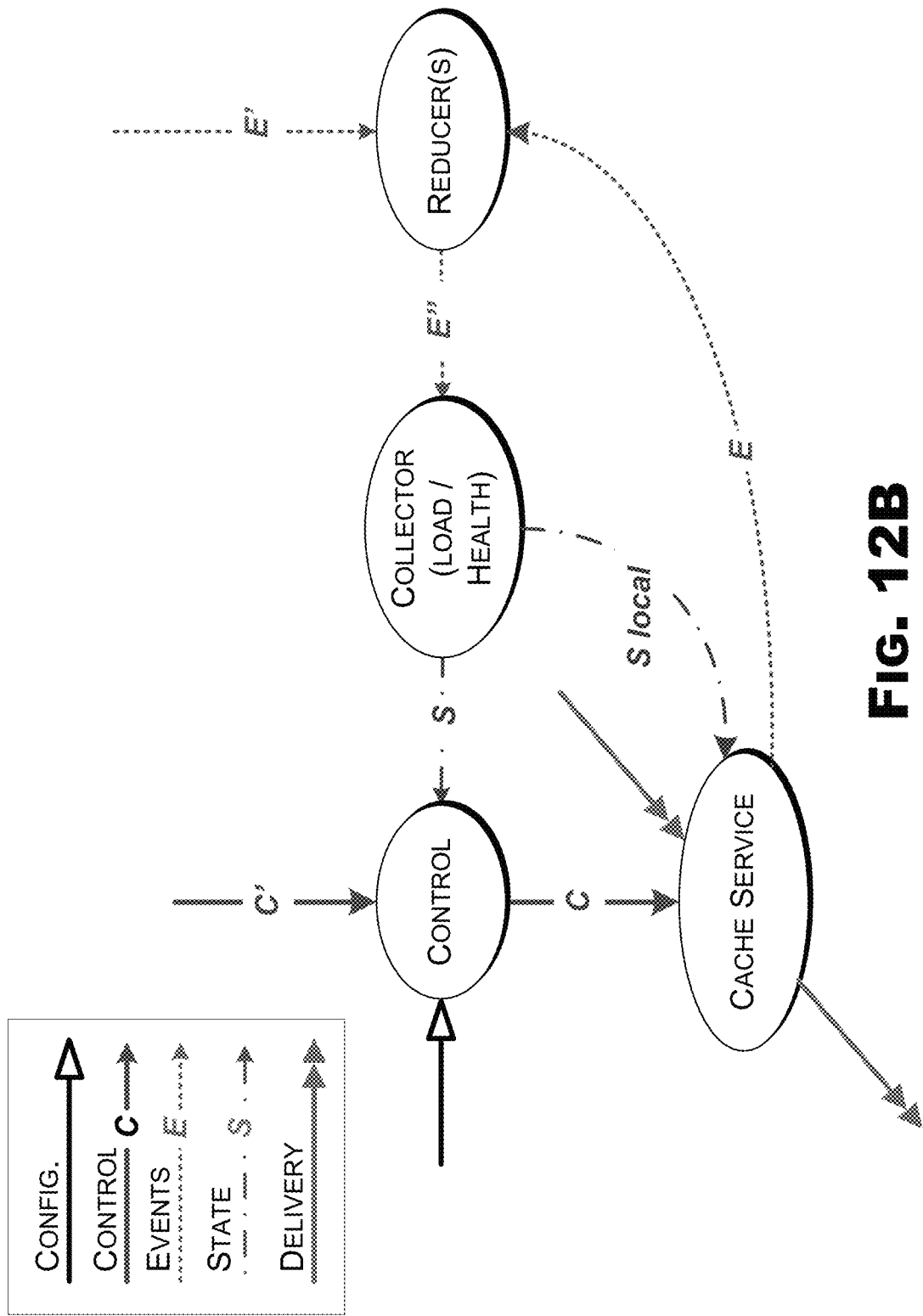

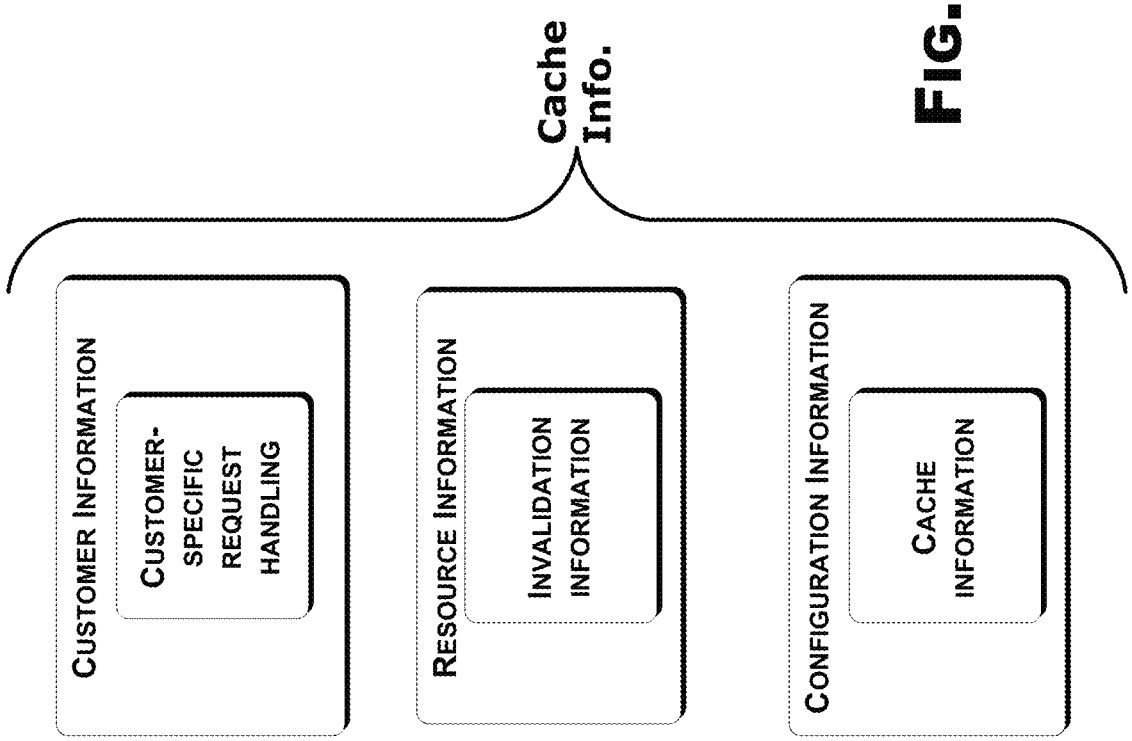

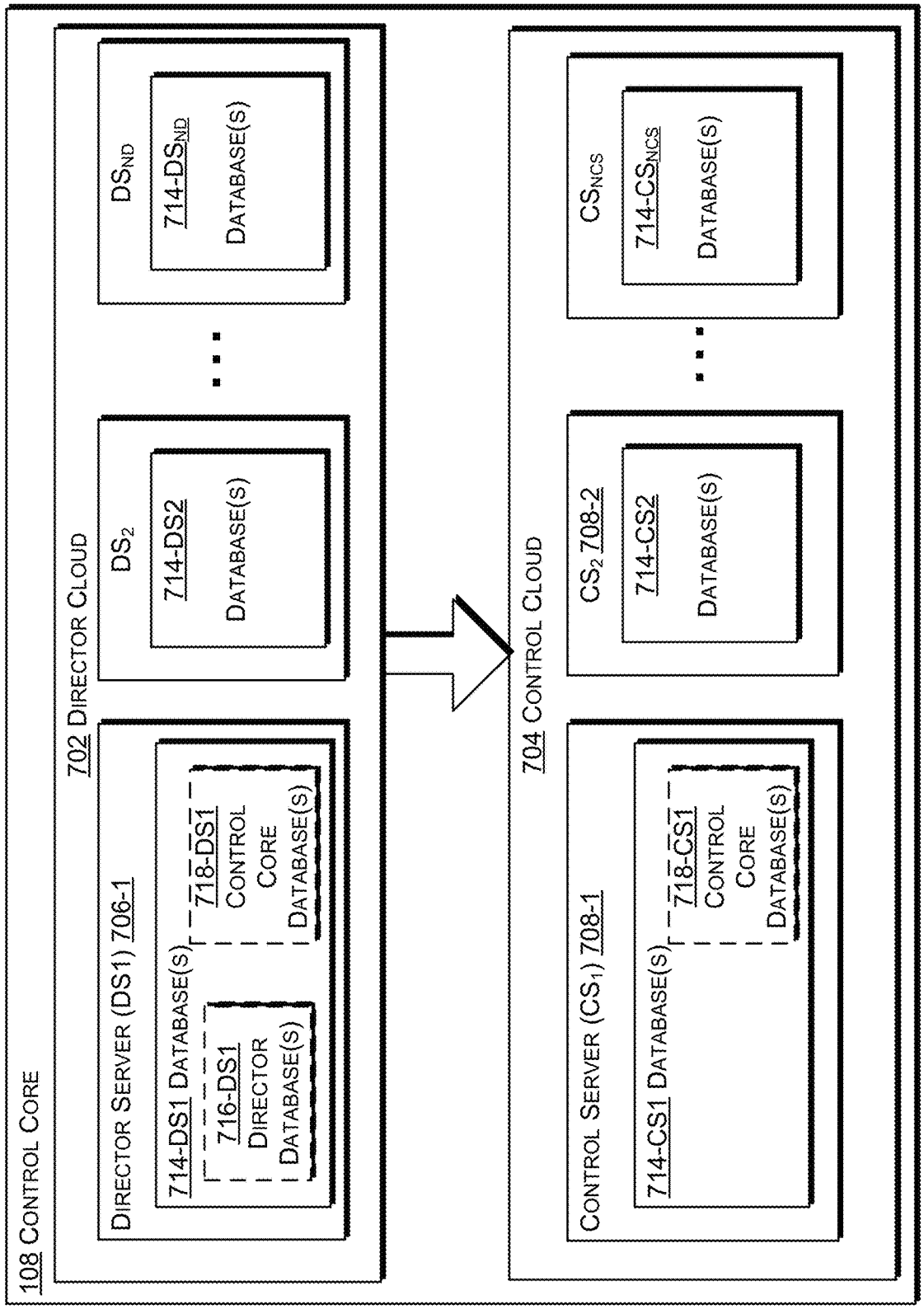

FIG. 14E

| Master Journal List | | | |
|---|---|---|---|
| | Sectors | | |
| Sector No. | Sector Sequence No. | Cohorts | |
| 0 | $S_0$ | Cohort List$_0$ | |
| 1 | $S_1$ | Cohort List$_1$ | |
| ... | ... | ... | |
| NS - 1 | $S_{NS-1}$ | Cohort List$_{NS-1}$ | |
| | Control Sites | | |
| No. | Control Sequence No. | Neighborhood | |
| 0 | $S_0$ | Neighborhood List$_0$ | |
| 1 | $S_1$ | Neighborhood List$_1$ | |
| ... | ... | ... | |

FIG. 14F

| Sector Journal | |
|---|---|
| Property | Property Sequence No. |
| PID0 | PS0 |
| PID1 | PS1 |
| ... | ... |
| PIDk | PSk |

FIG. 15A

| 1204 NOTES OBJECT | |
|---|---|
| KEY | VALUE |
| KEY | VALUE |
| ... | ... |
| KEY | VALUE |

FIG. 15B

| 1206 SESSION OBJECT (SXN) | |
|---|---|
| KEY | VALUE |
| KEY | VALUE |
| ... | ... |
| KEY | VALUE |

FIG. 15C

| 1208 TRANSACTION OBJECT (TXN) | |
|---|---|
| KEY | VALUE |
| KEY | VALUE |
| ... | ... |
| KEY | VALUE |

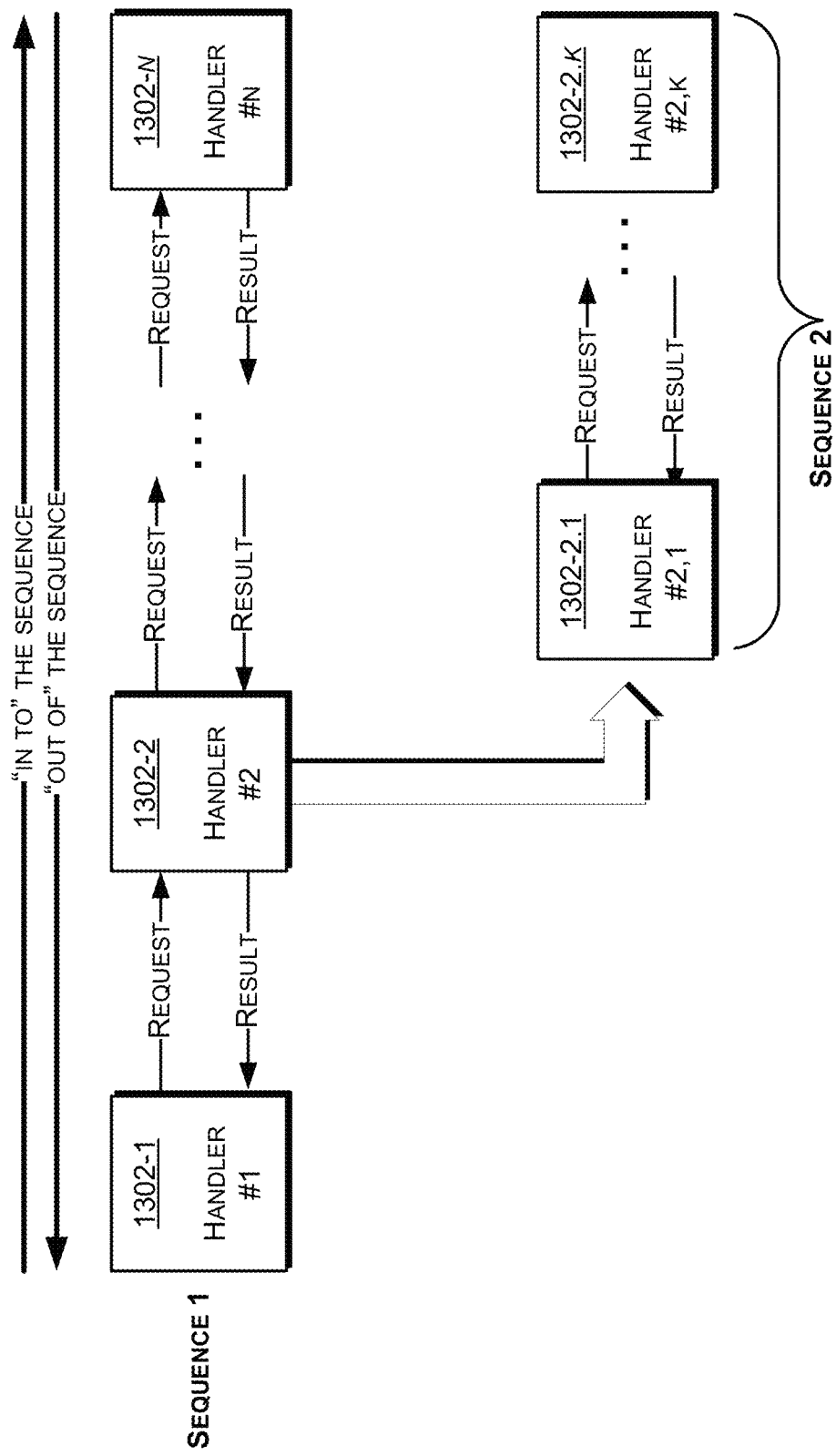

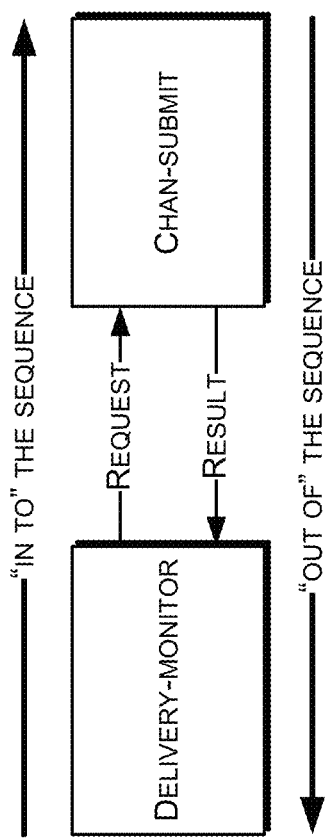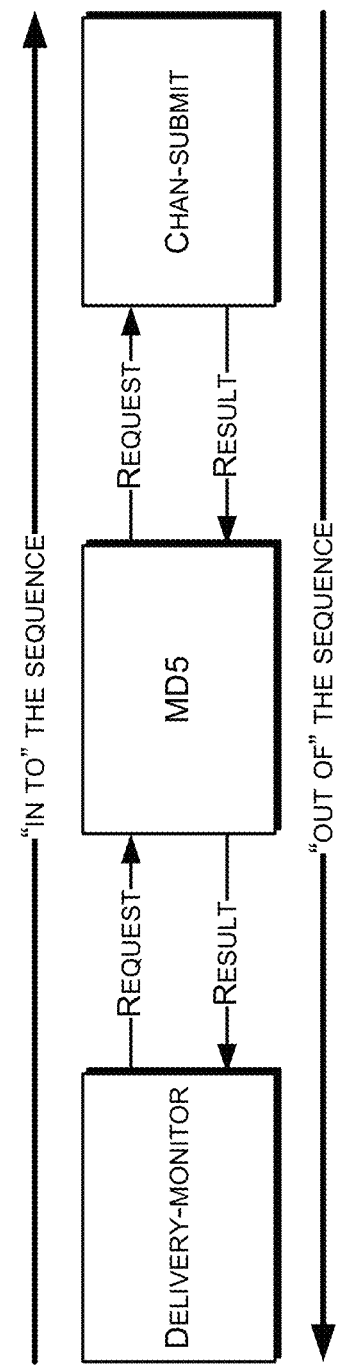

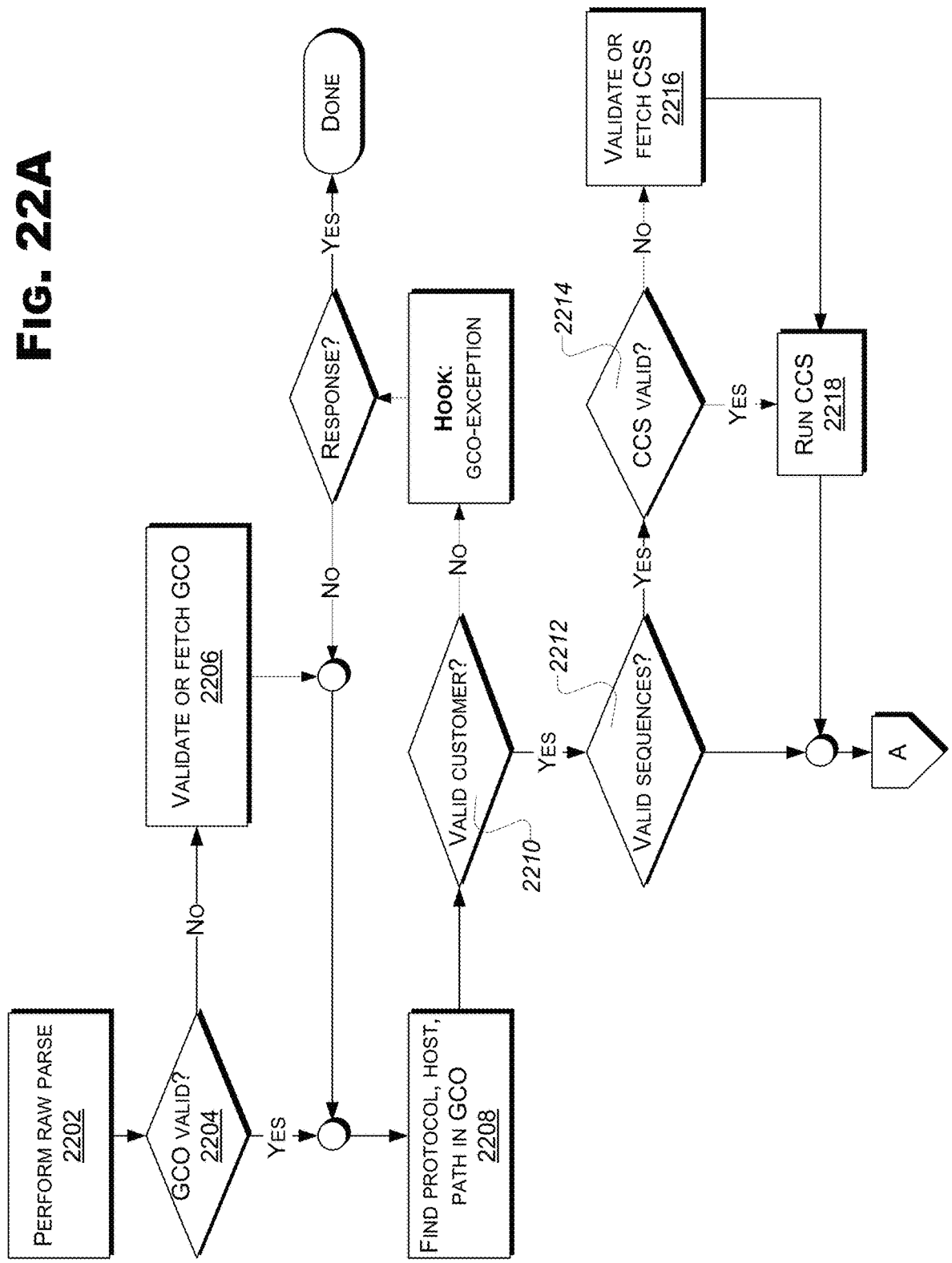

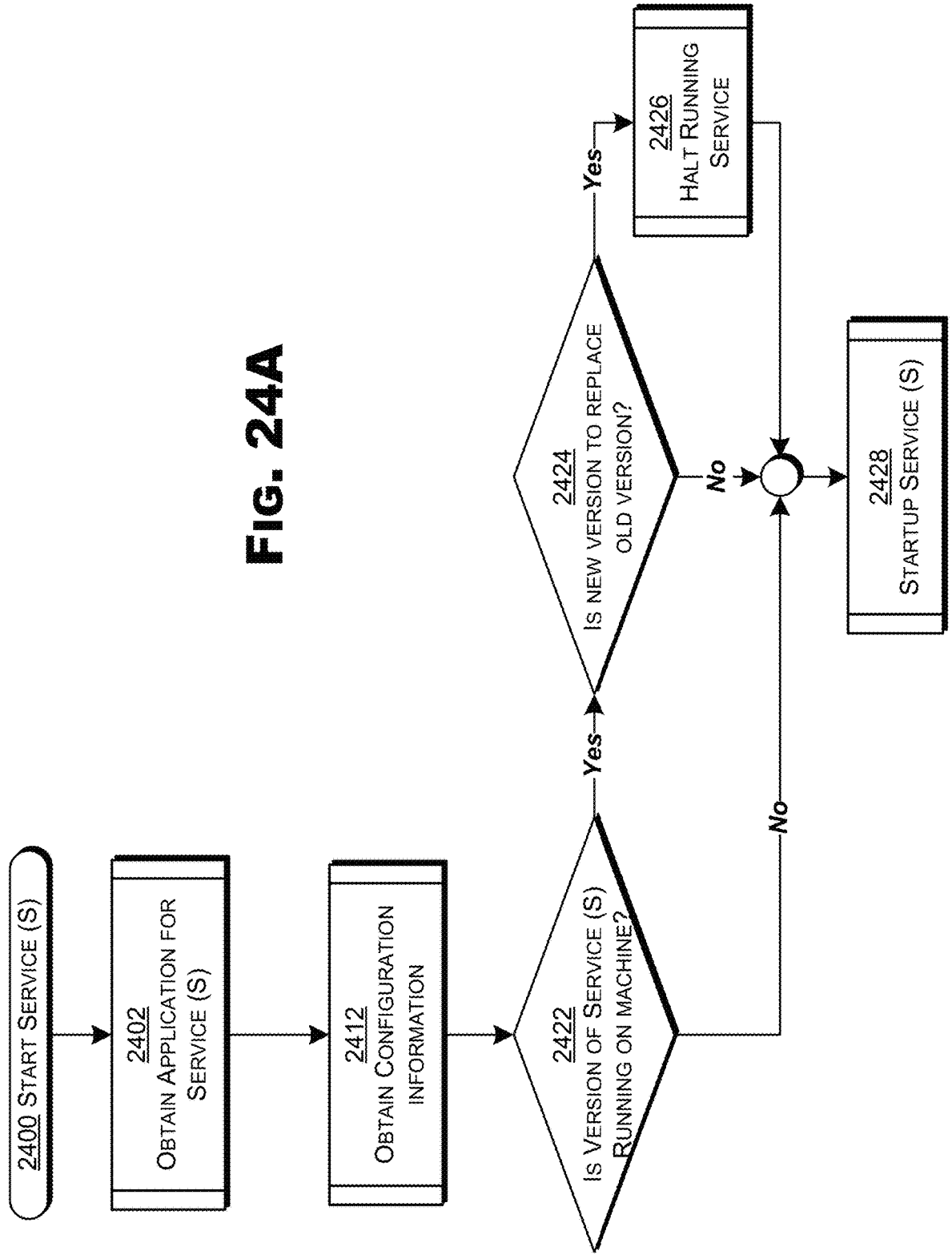

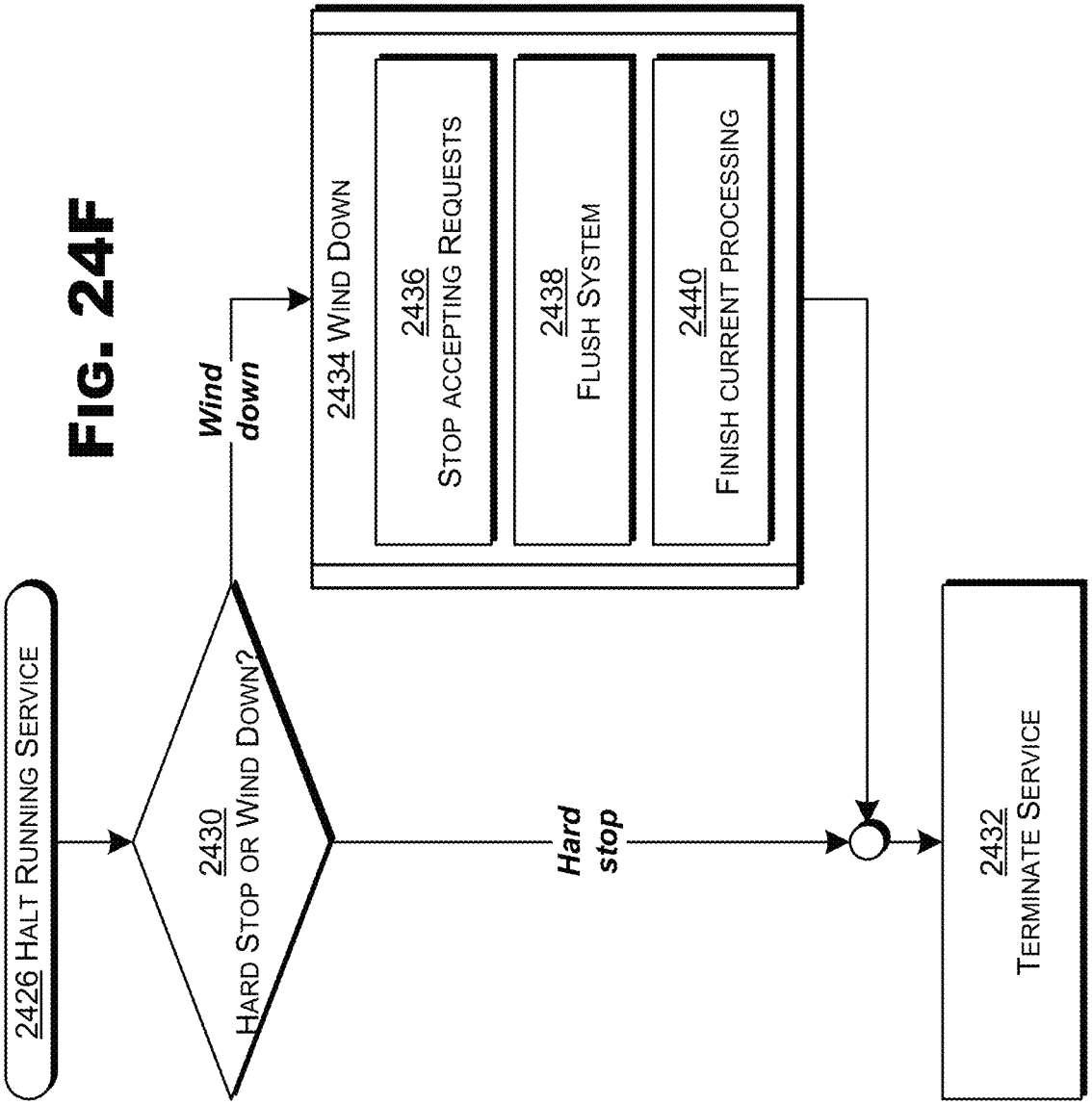

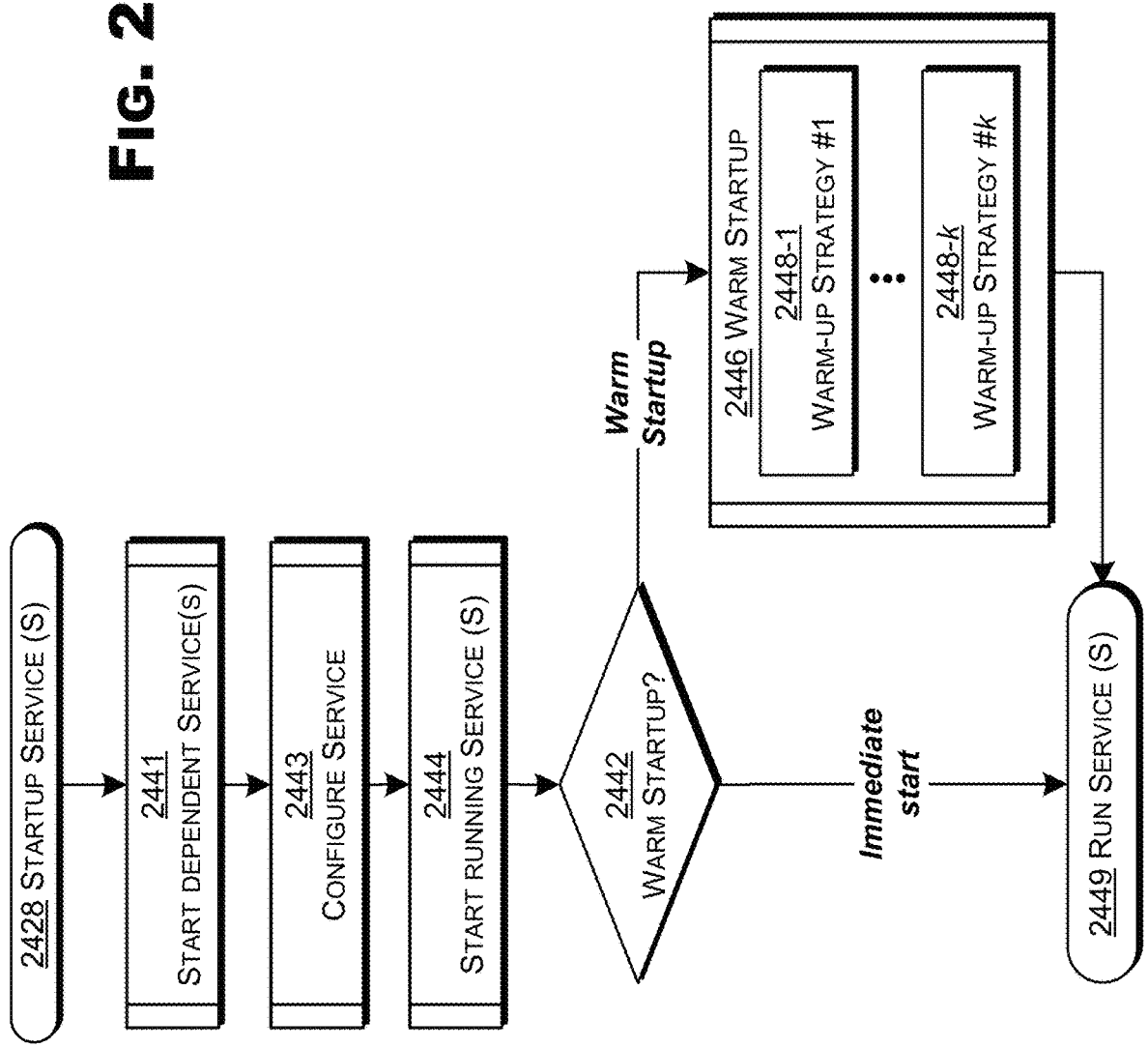

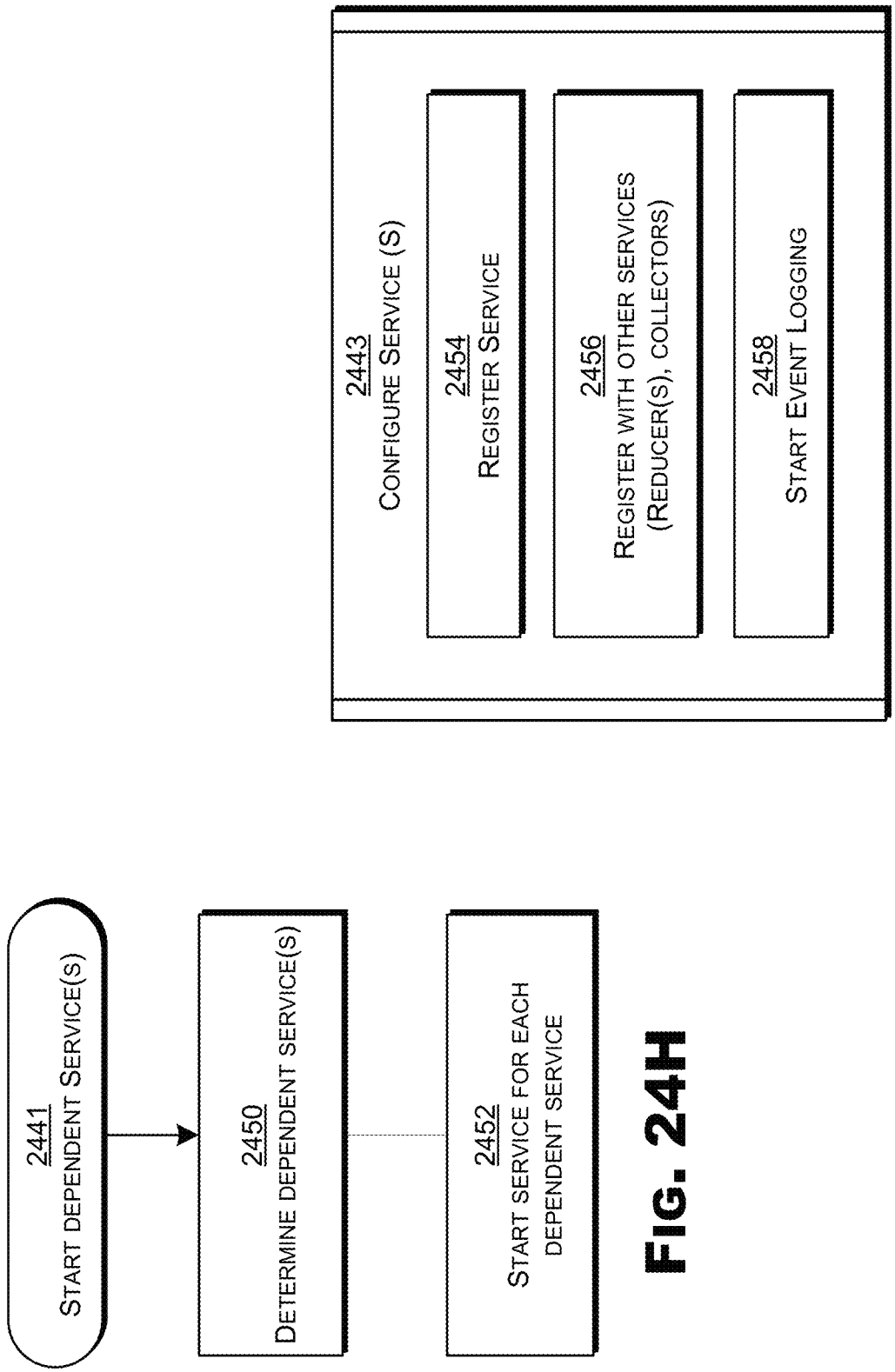

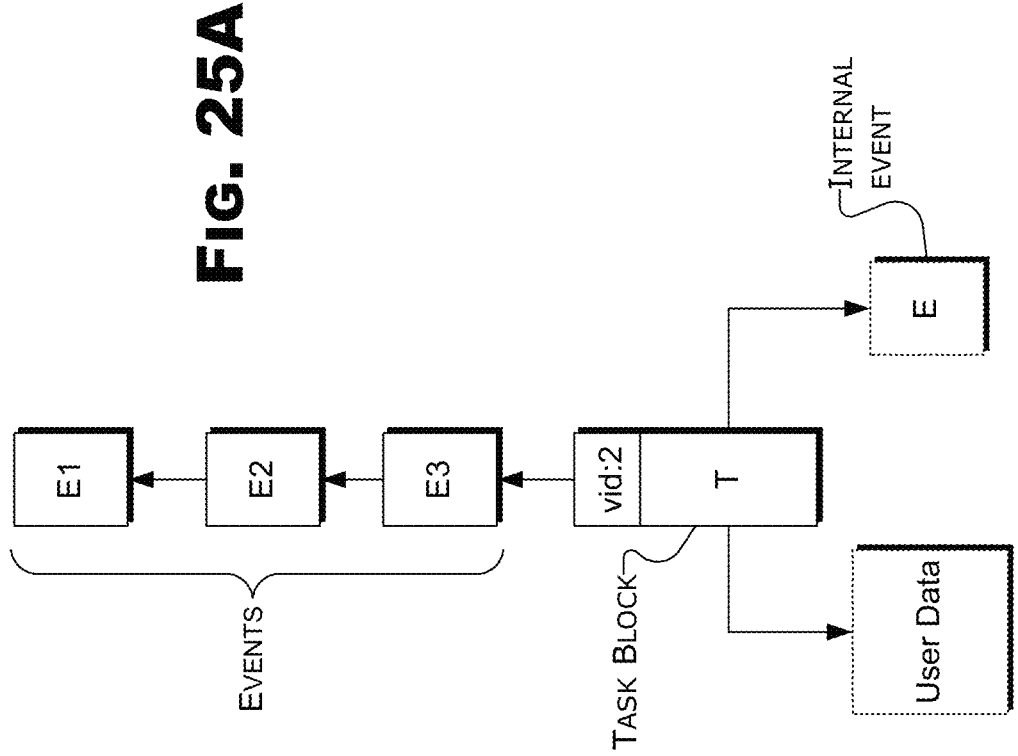

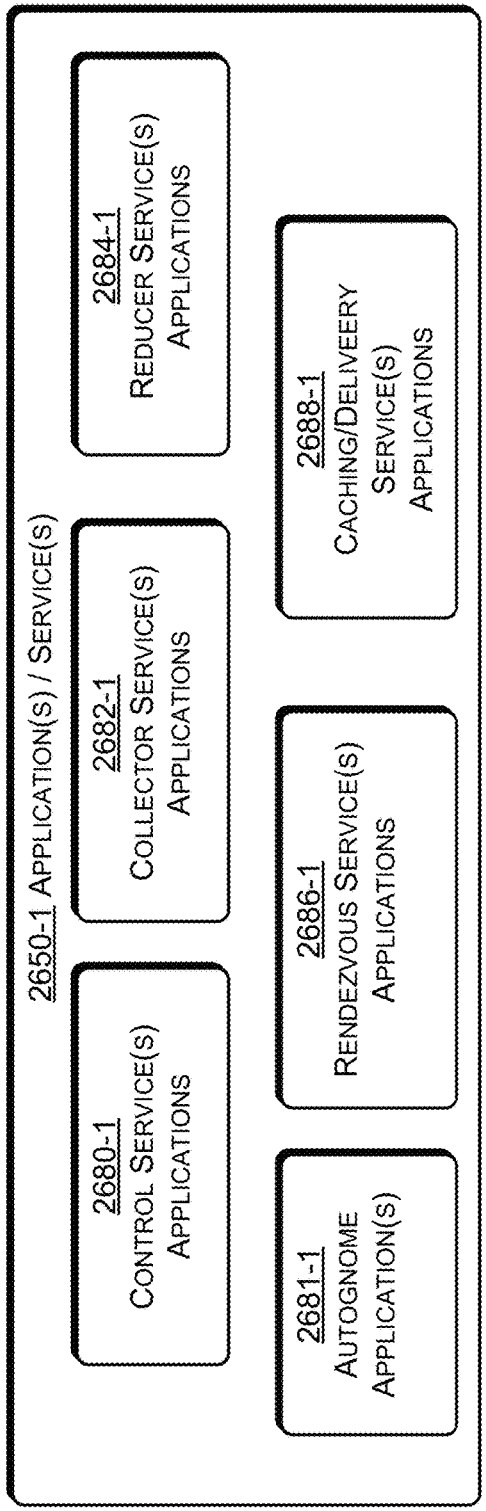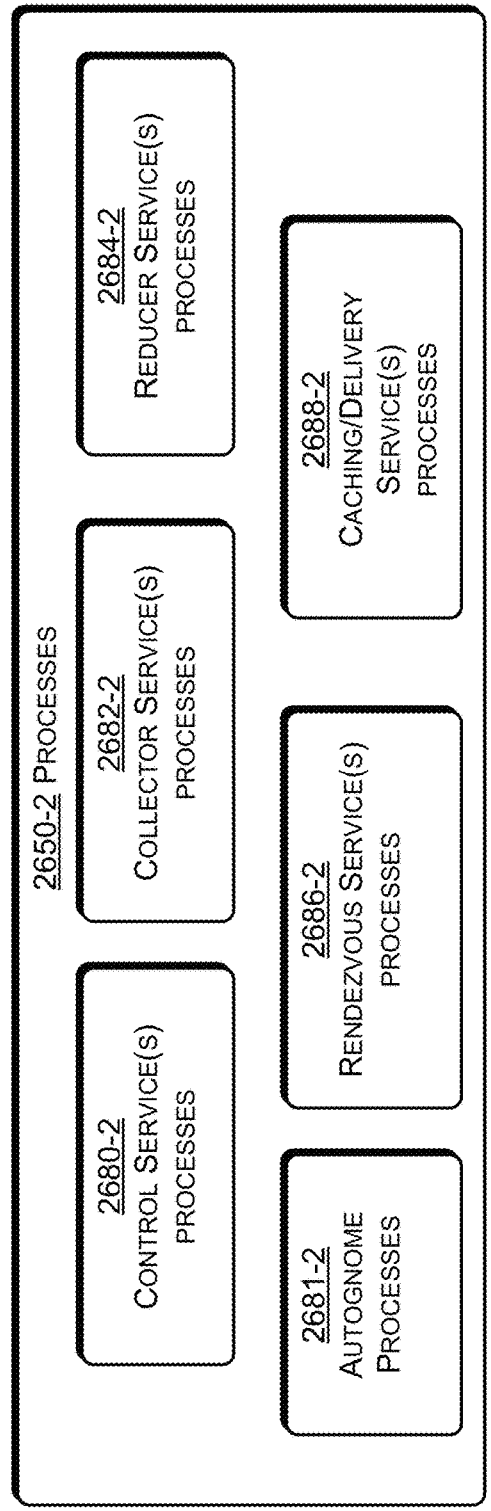

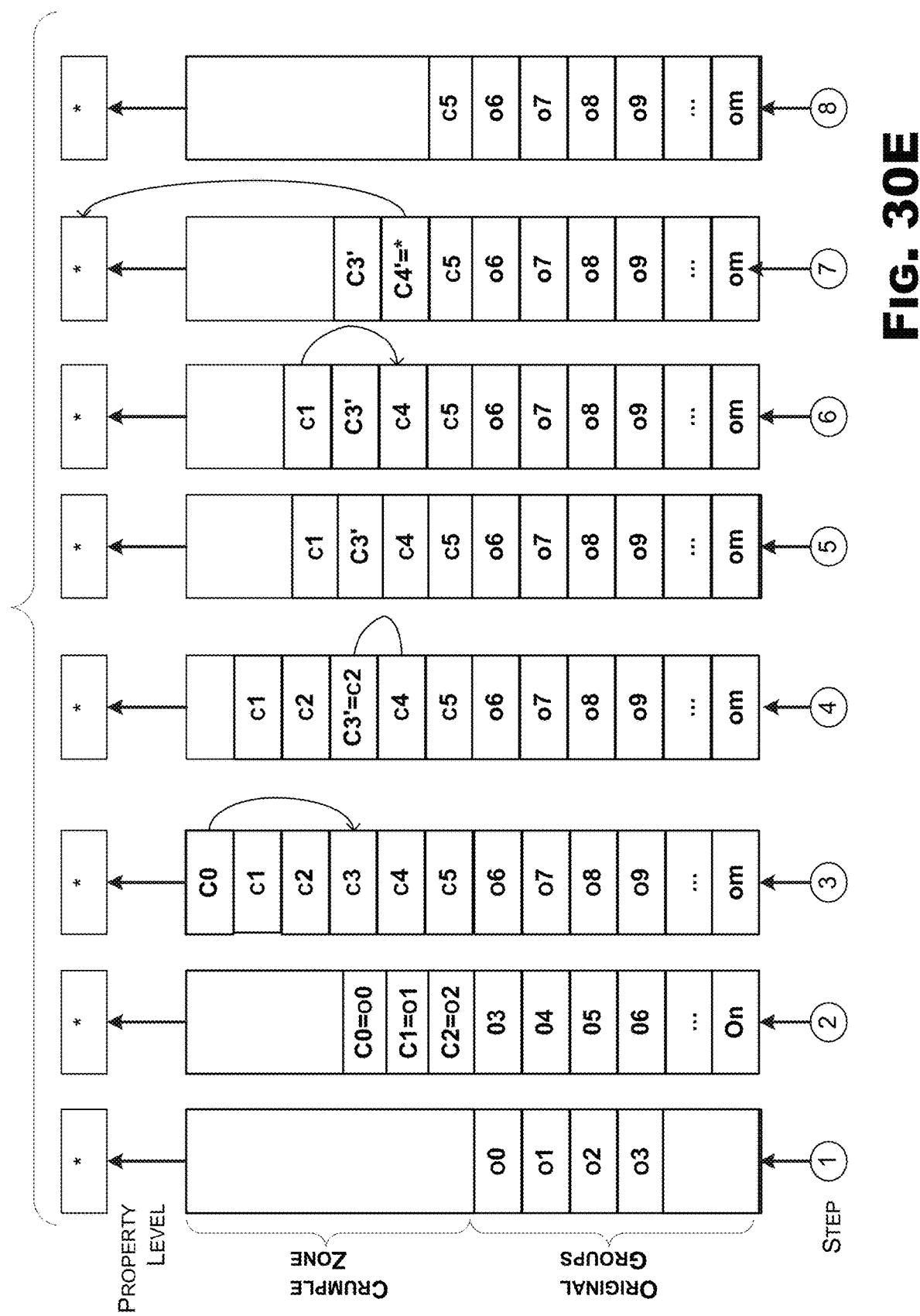

RENDEZVOUS SYSTEMS, METHODS, AND DEVICES

RELATED APPLICATION

This application is related to and claims priority from and co-owned U.S. Provisional Patent Application No. 61/737,072, filed Dec. 13, 2012, and titled "Content Delivery Framework," the entire contents of which are hereby fully incorporated herein by reference for all purposes.

INCORPORATION BY REFERENCE

The following U.S. patents and U.S. patent applications are hereby fully incorporated herein by reference for all purposes:

1. U.S. Pat. No. 7,822,871 titled "Configurable Adaptive Global Traffic Control And Management," filed Sep. 30, 2002, issued Oct. 26, 2010.
2. U.S. Pat. No. 7,860,964 titled "Policy-Based Content Delivery Network Selection," filed Oct. 26, 2007, issued Dec. 28, 2010.
3. U.S. Pat. No. 6,185,598 titled "Optimized Network Resource Location," filed Feb. 10, 1998, issued Feb. 6, 2001.
4. U.S. Pat. No. 6,654,807 titled "Internet Content Delivery Network," filed Dec. 6, 2001, issued Nov. 25, 2003.
5. U.S. Pat. No. 7,949,779 titled "Controlling Subscriber Information Rates In A Content Delivery Network," filed Oct. 31, 2007, issued May 24, 2011.
6. U.S. Pat. No. 7,945,693 titled "Controlling Subscriber Information Rates In A Content Delivery Network," filed Oct. 31, 2007, issued May 17, 2011.
7. U.S. Pat. No. 7,054,935 titled "Internet Content Delivery Network," filed Mar. 13, 2002, issued May 30, 2006.
8. U.S. Published Patent Application No. 2009-0254661 titled "Handling Long-Tail Content In A Content Delivery Network (CDN)," filed Mar. 21, 2009.
9. U.S. Published Patent Application No. 2010-0332595 titled "Handling Long-Tail Content In A Content Delivery Network (CDN)," filed Sep. 13, 2010.
10. U.S. Pat. No. 8,015,298 titled "Load-Balancing Cluster," filed Feb. 23, 2009, issued Sep. 6, 2011.
11. U.S. Published Patent Application No. 2010-0332664 titled "Load-Balancing Cluster," filed Sep. 13, 2010.
12. U.S. Published Patent Application No. 2012-0198043, titled "Customized Domain Names In A Content Delivery Network (CDN)," filed Jan. 11, 2012, published Aug. 2, 2012.
13. U.S. Pat. No. 8,060,613 titled "Resource Invalidation In A Content Delivery Network," filed Oct. 31, 2007, issued Nov. 15, 2011.
14. application Ser. No. 13/714,410, titled "Content Delivery Network," filed Dec. 14, 2012, U.S. Published Patent Application No. 2013-0159472 A1, which claimed priority to U.S. provisional applications Nos. 61/570,448 and 61/570,486, and
15. application Ser. No. 13/714,411, titled "Content Delivery Network," filed Dec. 14, 2012, U.S. Published Patent Application No. 2013-0159473 A1, which claimed priority to U.S. provisional applications Nos. 61/570,448 and 61/570,486.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to content delivery and content delivery networks. More specifically, to content delivery networks and systems, frameworks, devices and methods supporting content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 1B shows a generic service endpoint in an exemplary CDN in accordance with an embodiment;

FIG. 1I depicts aspects of an exemplary CDN infrastructure in accordance with an embodiment;

FIGS. 3A to 3B depict aspects of clusters of service endpoints in an exemplary CDN in accordance with an embodiment;

FIG. 3-O shows an exemplary request collection lattice with parameterized generic behaviors FIG. 3P shows an exemplary request collection lattice with mixed parameterization styles in accordance with an embodiment;

FIGS. 5A and 5B depict cache cluster sites in an exemplary CDN in accordance with an embodiment;

FIGS. 5C and 5D depict cache clusters in the cache cluster sites of FIGS. 5A and 5B in accordance with an embodiment;

FIGS. 7A to 7C depict aspects of event logging in exemplary CDNs in accordance with an embodiment;

FIGS. 8A to 8D, 9A to 9B, and 10A to 10E depict aspects of reducers and collectors in exemplary CDNs in accordance with an embodiment;

FIG. 11 shows interactions between component services of an exemplary CDN in accordance with an embodiment;

FIGS. 12A to 12E depict exemplary uses of feedback in exemplary CDNs in accordance with an embodiment;

FIGS. 13A to 13F depict logical aspects of information used by various services in exemplary CDNs in accordance with an embodiment;

FIGS. 14A to 14F depict aspects of exemplary control mechanisms in exemplary CDNs in accordance with an embodiment;

FIGS. 15A to 15I show aspects of sequences and sequence processing

FIG. 16A to 16D show examples of sequencers and handlers in accordance with an embodiment;

FIGS. 22A to 22C is a flow chart describing exemplary request-response processing flow in exemplary CDNs in accordance with an embodiment;

FIGS. 24A to 24K are flow charts depicts aspects of starting and running services in exemplary CDNs in accordance with an embodiment;

FIGS. 25A to 25F describe aspects of an executive system of exemplary CDNs in accordance with an embodiment;

FIG. 26A to 26C depict aspects of computing in exemplary CDNs in accordance with an embodiment;

FIGS. 30A to 30H relate to aspects of invalidation in accordance with an embodiment.

DETAILED DESCRIPTION OF THE PRESENTLY PREFERRED EXEMPLARY EMBODIMENTS

Glossary

Figure 1A:
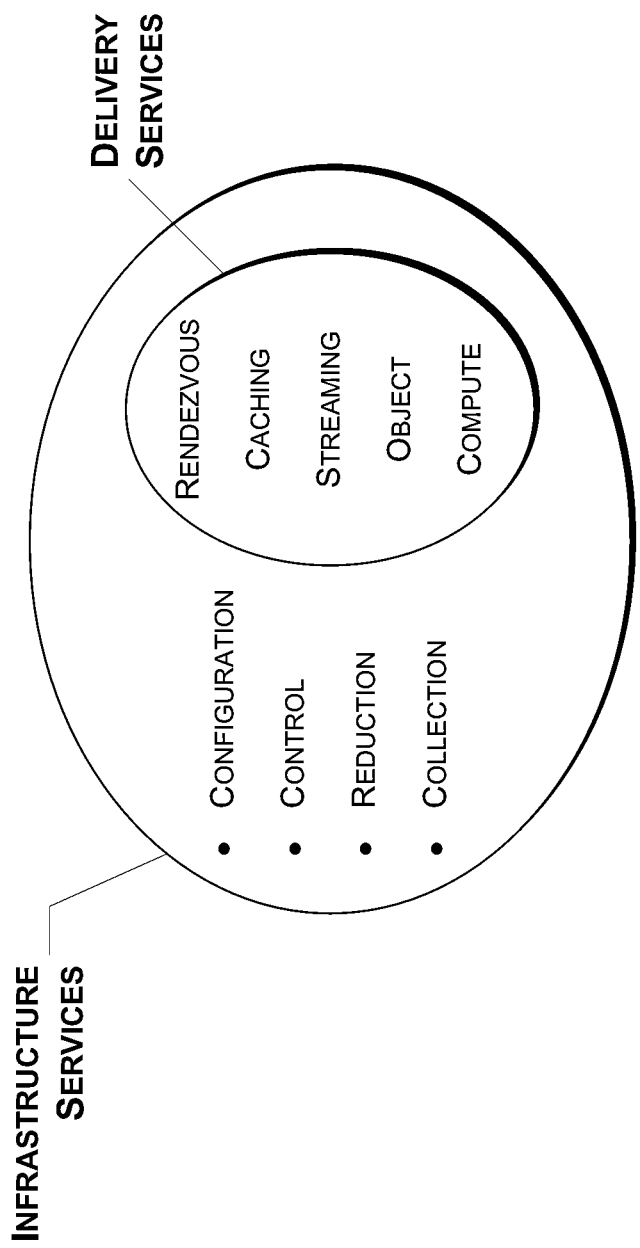
FIG. 1A shows an exemplary categorization of services types in a content delivery network (CDN) in accordance with an embodiment.

As used herein, unless used otherwise, the following terms or abbreviations have the following meanings:
API means Application Program(ing) Interface;
CCS means Customer Configuration Script;
CD means Content Delivery;
CDN means Content Delivery Network;
CNAME means Canonical Name;
DNS means Domain Name System;
FQDN means Fully Qualified Domain Name;
FTP means File Transfer Protocol;
GCO means Global Configuration Object;
HTTP means Hyper Text Transfer Protocol;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
LCO means layer configuration object;
LRU means Least Recently Used;
LVM means layered virtual machine;
NDC means Network of Data Collectors;
NDP means Neighbor Discovery Protocol;
NDR means network of data reducers;
NIC means network interface card/controller;
NS means Name Server;
NTP means Network Time Protocol;
PKI means Public Key Infrastructure;
QoS means quality of service;
RCL means request collection lattice;
SSL means Secure Sockets Layer;
SVM means service virtual machine;

TCP means Transmission Control Protocol;
TRC means terminal request collection;
TTL means time to live;
URI means Uniform Resource Identifier;
URL means Uniform Resource Locator; and
UTC means coordinated universal time.

Background and Overview

A content delivery network (CDN) distributes content (e.g., resources) efficiently to clients on behalf of one or more content providers, preferably via a public Internet. Content providers provide their content (e.g., resources) via origin sources (origin servers or origins), and a CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

End Users and Subscribers

In the following description, an end user is an entity (e.g., person or organization) that ultimately consumes some Internet service (e.g., a web site, streaming service, etc.) provided by a service provider entity. This provider entity is sometimes referred to as a subscriber in this description because they subscribe to CDN services in order to efficiently deliver their content, e.g., from their origins to their consumers. A CDN may provide value-added mediation (e.g., caching, transformation, etc.) between its subscribers and their end-users.

Clients and Origins

As used herein, clients are agents (e.g., browsers, set-top boxes, or other applications) used, e.g., by end users to issue requests (e.g., DNS and HTTP requests) within the system. When no CDN or other intermediaries are in use, such requests may go directly to the subscriber's own servers (e.g., their origin servers) or to other components in the Internet. When a content provider subscribes to CD services (described below), various requests may go to intermediate CD services that may map the end-user requests to origin requests, possibly transforming and caching content along the way.

Typically, each distinct origin (e.g., origin server) is associated with one subscriber, but a subscriber may be associated with any number of origins, including subscriber-owned and CDN provided origins.

The physical origins with which the CDN interacts may actually be intermediaries that acquire content from a chain of intermediaries, perhaps, e.g., elements of a separate content acquisition system that ultimately terminates at a subscriber's actual origin servers. As far as the internals of the CDN are concerned, however, the origin is that service outside the system boundary from which content is directly acquired.

Logical Organization

Services, Service Instances, and Machines

As used herein, a "service instance" refers to a process or set of processes (e.g., long-running or interrupt driven) running on a single machine. As used herein, the term "machine" refers to any general purpose or special purpose computer device including one or more processors, memory, etc. Those of ordinary skill in the art will realize and understand, upon reading this description, that the term "machine" is not intended to limit the scope of anything described herein in any way.

One or more service instances (of the same or different service types) may run on single machine, but a service instance is the execution of a single service implementation. As used herein, "service implementation" refers to a particular version of the software and fixed data that implement the single service instance. A service or service implementation may be considered to be a mechanism (e.g., software and/or hardware, alone or in combination) that runs on a machine and that provides one or more functionalities or pieces of functionality.

A service may be a component and may run on one or more processors or machines. Multiple distinct services may run, entirely or in part, on the same processor or machine. The various CD services may thus also be referred to as CD components.

Those of ordinary skill in the art will realize and understand, upon reading this description, that the term "service" may refer to a "service instance" of that kind of service.

In some cases, it may be useful or necessary to distinguish between the code (e.g., software) for a service and an actual running version of the service. For the sake of this description, the code corresponding to a service is sometimes referred to as an application or application code for that service. Those of ordinary skill in the art will realize and understand, upon reading this description, that a machine may have code for a particular service (e.g., in a local storage of that machine) without having that service running on that machine. Thus, e.g., a machine may have the application code (software) for a collector service even though that machine does not have an instance of the collector service running. The application code for a service may be CDN resource (i.e., a resource for which the CDN is the origin).

There is no requirement that services running on a particular machine be of the same type. There is also no requirement that the services running on a particular machine, even if of the same type, be configured in the same manner, or be the same version. Thus, e.g., a particular machine may run two collector services, each configured differently. As another example, a particular machine may run a reducer service and a collector service.

Categorizing Services

A CDN may, in some aspects, be considered to consist of a collection of mutually interconnected services of various types. FIG. 1A depicts an exemplary categorization of major service types, and divides them into two overlapping categories, namely infrastructure services and delivery services. Infrastructure services may include, e.g., services for configuration and control (to command and control aspects of the CDN), and services for data reduction and collection (to observe aspects of the CDN). These services support the existence of the delivery services, whose existence may be considered to be a primary purpose of the overall CDN. In accordance with an embodiment, the delivery services are themselves also used as implementation mechanisms in support of infrastructure services.

Although not required, in preferred CDN implementations, it will likely be the case that, for most service types, service instances will not be isolated but will, instead, be grouped in some manner (e.g., into hierarchies or lattices) containing multiple instances of that service type. Thus, e.g., a CDN may comprise groupings of the various types of services (e.g., a grouping of control services, a grouping of reduction services, etc.) These homogenous groupings may include homogenous sub-groupings of services of the same type. Generally, these homogenous groupings form networks, generally comprising subnetworks.

Typical interaction patterns and peering relationships between services of the same and different types impose not only structure on the topology of a local service neighborhood but also on the topology of interactions between the homogenous subnetworks. These subnetworks may be internally connected or consist of isolated smaller subnetworks. In general, for service type T, this description will refer to the T network as that subnetwork of the CDN consisting of all service instances of type T, regardless of whether or not the corresponding subnetworks of type T are actually interconnected. Thus, e.g., the rendezvous network (for the rendezvous service type) refers to the subnetwork of the CDN consisting of all rendezvous service instances, regardless of whether or not the corresponding rendezvous service subnetworks are actually interconnected.

In general, for service type T, as used herein, the "T service(s)" or "T system" refers to the collection of services of type T, regardless of whether or how those services are connected. Thus, e.g., the "reducer services" refers to the collection of CD services of the CDN consisting of all reducer service instances, regardless of whether or not the corresponding reducer services (or service instances) are actually connected, and, if connected, regardless of how they are connected. Similarly, e.g., the "collector system" refers to the collection of CD services of the CDN consisting of all collector service instances, regardless of whether or not the corresponding collector services (or service instances) are actually connected, and, if connected, regardless of how they are connected; etc.

As used herein, a particular service of type T running on one or more machines may also be referred to as a "T" or a "T mechanism." Thus a rendezvous service instance running on one or more machines may also be referred to as a rendezvous mechanism; a control service instance running on one or more machines may also be referred to as a controller or control mechanism; a collecting (or collector) service instance running on one or more machines may also be referred to as a collector or collector mechanism; and a reducer service instance running on one or more machines may also be referred to as a reducer or reducer mechanism.

It should be appreciated that as a particular machine may be running more than one kind of service, the naming of a service instance on a particular machine does not limit the machine from running other types of services.

Information Types

Each service or kind of service may consume and/or produce data, and, in addition to being categorized by CDN functionality (e.g., namely infrastructure services and delivery services above), a service type may be defined or categorized by the kind(s) of information it produces and/or consumes. In one exemplary high-level categorization of services, services are categorized based on five different kinds of information that services might produce or consume are defined, as shown in the following table (Table 1):

TABLE 1

Service Categorization

| | Category | Description |
|---|---|---|
| 1 | (Abstract) Delivery | Any information that can be delivered from server to client. |
| 2 | Configuration | Relatively static policies and parameter settings that typically originate from outside the network and constrain the acceptable behavior of the network. |
| 3 | Control | Time-varying instructions, typically generated within the network, to command specific service behaviors within the network. |

TABLE 1-continued

Service Categorization

| | Category | Description |
|---|---|---|
| 4 | Events | Streams (preferably, continuous) of data that capture observations, measurements and actual actions performed by services at specific points in time and/or space in or around the network. |
| 5 | State | Cumulative snapshots of stored information collected over some interval of time and/or space in or around the network. |

Each service or kind of service may consume and/or produce various kinds of data. Operation of each service or kind of service may depend on control information that service receives. As part of the operation (normal or otherwise) of each service or kind of service, a service may produce information corresponding to events relating to that service (e.g., an event sequence corresponding to events relating to that service). For some services or kinds of services, the data they consume and/or produce may be or include event data. Each service or kind of service may obtain state information from other CDN services or components and may generate state information for use by other CDN services or components. Each service may interact with other services or kinds of services.

FIG. 1B shows a generic CD service instance for each kind of service in a CDN along with a possible set of information flows (based on the service categorization in Table 1 above).

As shown in FIG. 1B, each service instance in a CDN may consume (take in) control information (denoted CTRL in the drawing) and may produce (e.g., emit or provide) control information as an output (denoted CTRL' in the drawing). Each service instance may consume state information (denoted S in the drawing) and may produce state information (denoted S' in the drawing) as an output. Each service instance may consume events (denoted E in the drawing) and may produce events (denoted E' in the drawing). Each service instance may consume configuration information (denoted CFIG in the drawing) and may produce configuration information (denoted CFIG' in the drawing). Each service instance may consume delivery information (denoted D in the drawing) and may produce delivery information (denoted D' in the drawing).

It should be appreciated that not every service instance or kind of service instance needs to consume each kind of input (control, state, events, config, etc.) or to produce each kind of output. Furthermore, it should be appreciated that not every service instance needs to use or transform or modify any/all of its inputs (e.g., a service endpoint may pass information through without transformation of that information). So, e.g., with reference to FIG. 1B, in some cases CTRL=CTRL' and/or S=S' and/or E=E', etc.

As used herein, in the context of data consumed or produced by a service, the term "state" refers to "state information," the term "events" refers to "events information," the term "config." (or "configuration") refers to "configuration information," and the term "control" refers to "control information." When used in the context of configuration information, the word "configuration" is sometimes abbreviated herein to "config" (without a period at the end of the word).

A producer of a certain kind of information is referred to as a "source" of that kind of information, and a consumer of a certain kind of information is referred to as a "sink" of that kind of information. Thus, e.g., a producer of state (or state information) may be referred to as a "state source," a producer of configuration information may be referred to as a "config source," etc.; a consumer of state may be referred to as a "state sink," a consumer of configuration information may be referred to as a "config sink," and so on.

Figure 1C:
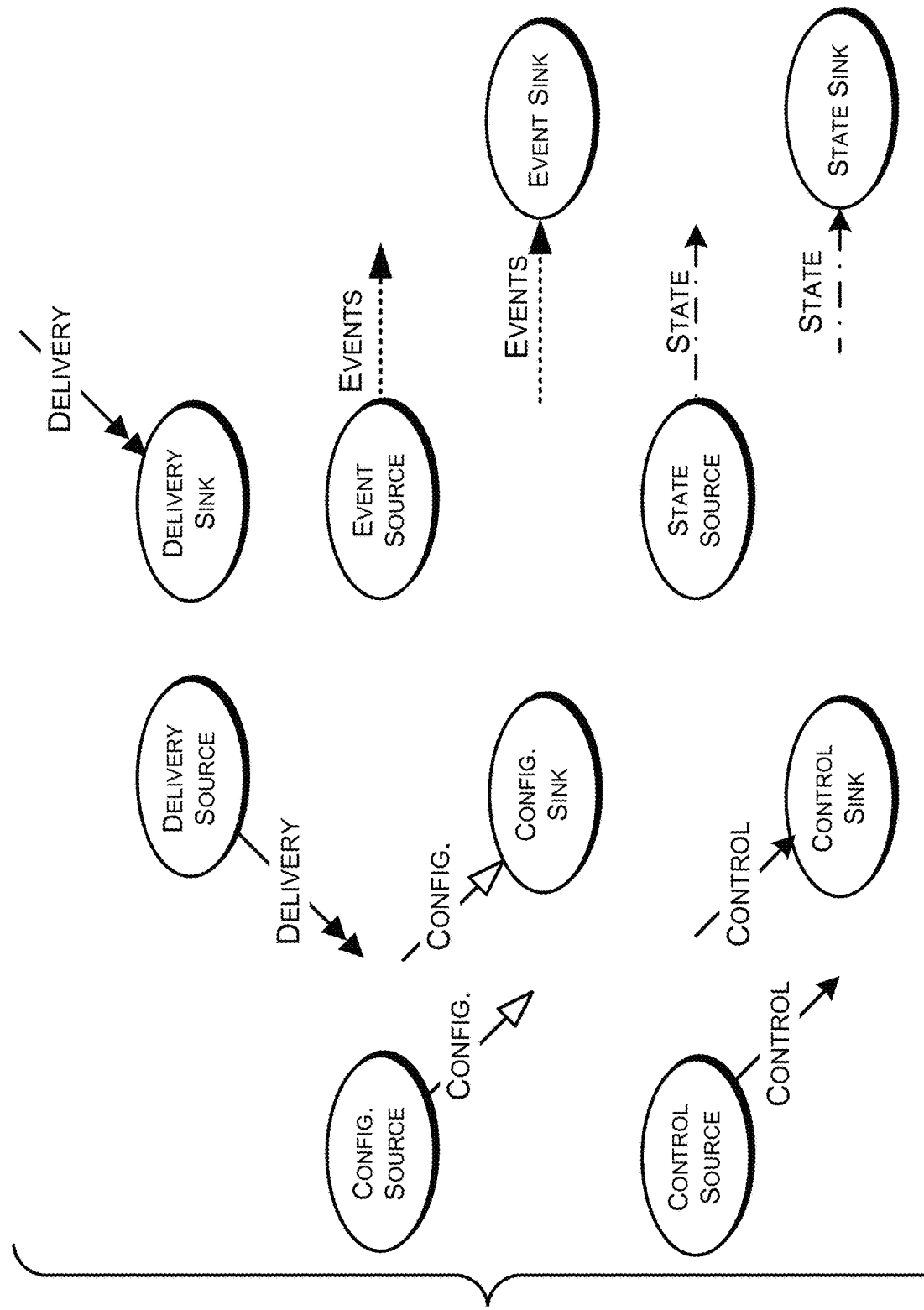
FIG. 1C shows trivial service types in accordance with an embodiment.

Considering possible combinations of information flows provides a number of different ways to categorize services. A set of trivial service types (shown in FIG. 1C) may be defined by constraining each service to have one kind of information flow in one direction (i.e., to be a source or a sink of one kind of information). The five information categories delivery, configuration, control, events, and state (Table 1 above), give the ten trivial service types shown in FIG. 1C.

Figure 1D:
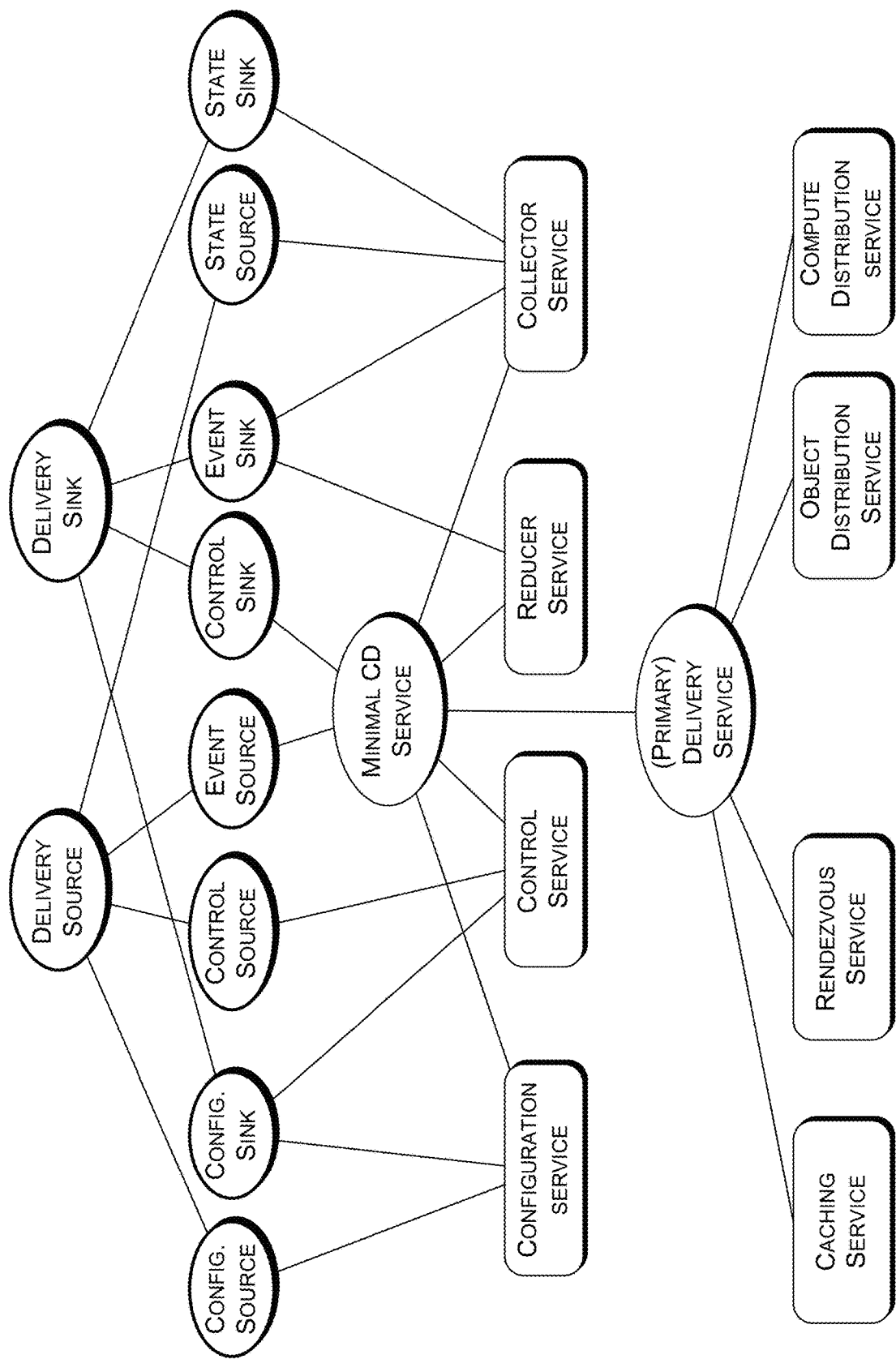
FIG. 1D shows an exemplary taxonomy of service types in a CDN in accordance with an embodiment.

Using these trivial service types (FIG. 1C) as the basis, typical combinations of flows expected to occur in CD services may be defined, leading to the exemplary definition/taxonomy of the infrastructure services and (primary) delivery services shown in FIG. 1D. As shown in the drawing in FIG. 1D, CD services may be categorized as delivery sources and/or delivery sinks. A delivery source may be a config source, a control source, an event source, and/or a state source. A delivery source that is a config source is a delivery source of config information; a delivery source that is a control source is a delivery source of control information, a delivery source that is an event source is a delivery source of event information, and a delivery source that is a state source is a delivery source of state information.

A delivery sink may be a config sink, a control sink, an event sink, and/or a state sink. A delivery sink that is a config sink is a delivery sink of config information; a delivery sink that is a control sink is a delivery sink of control information, a delivery sink that is an event sink is a delivery sink of event information, and a delivery sink that is a state sink is a delivery sink of state information.

A minimal CD service is an event source and a control sink. That is, a minimal CD service is a delivery source of event information and a delivery sink of control information.

A (primary) delivery service is a minimal CD service (and thus inherits the taxonomic properties of a minimal CD service).

Thus, a configuration service may be categorized, according to the taxonomy in FIG. 1D, as a config source, and a config sink. A configuration service may also be categorized as a minimal CD service, whereby it is also categorized as an event source and a control sink. A configuration service is a delivery source (of config information) and a delivery sink of config information.

A control service may be categorized, according to the taxonomy in FIG. 1D, as a minimal CD service (and thereby an event source and a control sink), as a config sink, and as a control source. A control service is a delivery sink of config information and a delivery source of control information.

A reducer service may be categorized, according to the taxonomy in FIG. 1D, as a minimal CD service (and thereby an event source and a control sink), and as an event sink. A collector service may be categorized, according to the taxonomy in FIG. 1D, as a minimal CD service (and thereby an event source and a control sink), and as an event sink, a state source, and a state sink.

Caching services, rendezvous services, object distribution services, and compute distribution services are each (primary) delivery services, and are therefore minimal CD services, according to the exemplary taxonomy in FIG. 1D.

As may be seen from the diagram in FIG. 1D, in some aspects to be a CD service means to be enmeshed in the network of other CDN services. The Minimal CD Service in the diagram is both a Control Sink and an Event Source, meaning that all CDN services consume control information and generate events.

Figure 1E:
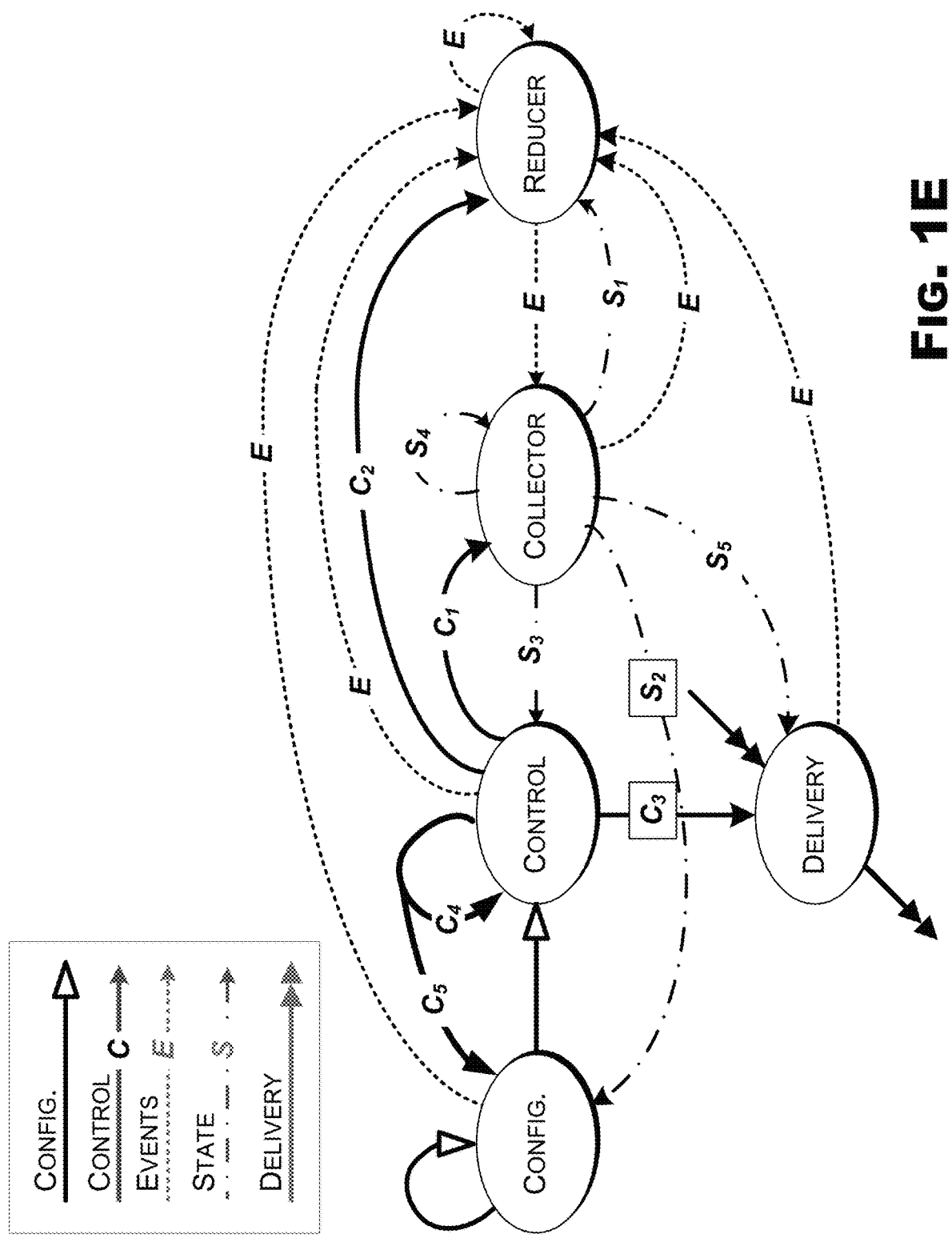
FIGS. 1E to 1F show interactions between component services of an exemplary CDN in accordance with an embodiment.

Those of ordinary skill in the art will realize and understand, upon reading this description, that this example taxonomy shown in FIG. 1D should be taken as a general guideline for naming services in useful ways that capture their essential similarities and differences, though it should not be used to limit the scope of the system in any way. While the taxonomy captures the names and definitions of idealized services, it should be appreciated that actual service implementations may stray from these constraints for practical reasons. Most actual infrastructure services will involve more information exchanges than shown above, for example. For example, control services may consume state information from collectors, and primary delivery services may consume both event streams and collector state. These variations may be considered subtypes of the versions shown earlier. A more realistic set of information flows between the basic CD service types is shown in FIG. 1E (discussed below). This set of relationships can be considered as existing between individual services or between entire subnetworks of homogeneous services (as can be seen by comparing the diagrams in FIG. 1E and FIG. 1F).

Those of ordinary skill in the art will realize and understand, upon reading this description, that several kinds of delivery services are referred to herein (as noted by the "Abstract" prefix in "(Abstract) Delivery" above). When not explicitly stated, the kind of delivery service may be determined from the context.

The (abstract) delivery service category is an umbrella term for all information exchanged by services and clients, reflecting the fact that all services deliver information. This observation leads to the taxonomy of information flows shown in FIG. 1G, where each of the other four types of information (config, control, events, and state) may be considered as special cases of (abstract) delivery information.

Unless stated otherwise or apparent from the context, in the rest of this description, however, a delivery service refers to one that is providing one of the (primary) delivery services that CDN subscribers/customers use (e.g., caching and rendezvous). Those of ordinary skill in the art will realize and understand, upon reading this description, that this distinction is arbitrary, and may change depending on the set of services offered to subscribers/customers. The offered set of services need not be limited to the current set of primary deliver services The last service variant is (controlled) delivery, referring to any service that is being controlled by the network. Those of ordinary skill in the art will realize and understand, upon reading this description, that it may sometimes be useful to distinguish the service being controlled from the services doing the controlling, even though all services in the CDN are controlled by it.

Logical and Physical Information Flows

Each information flow between two interacting services will typically have an associated direction (or two). The direction of arrows in most of illustrations here is intended to represent the primary direction in which information flows between a source and a sink, and not the physical path it takes to get there.

Figure 1F:
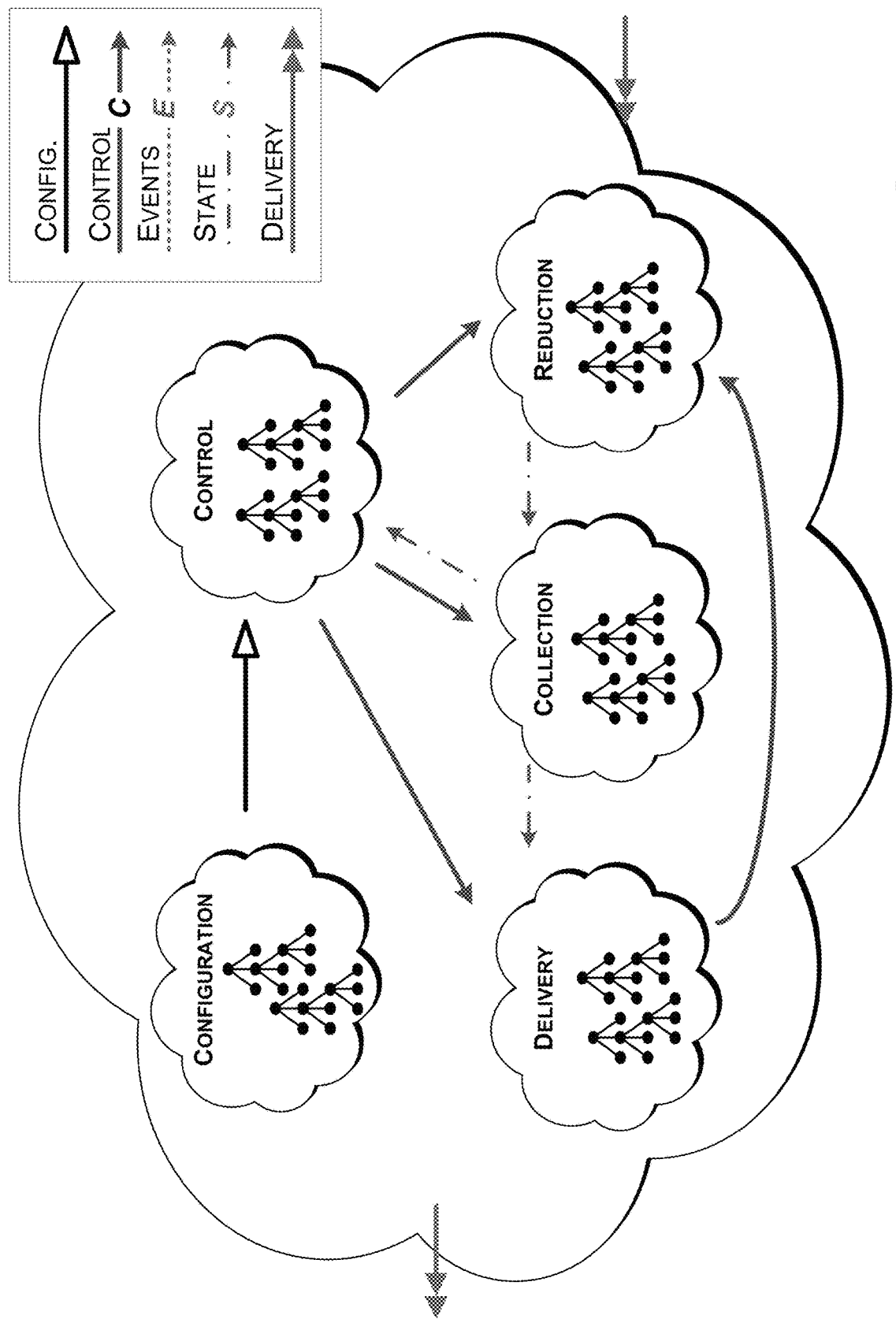
Figure 1G:
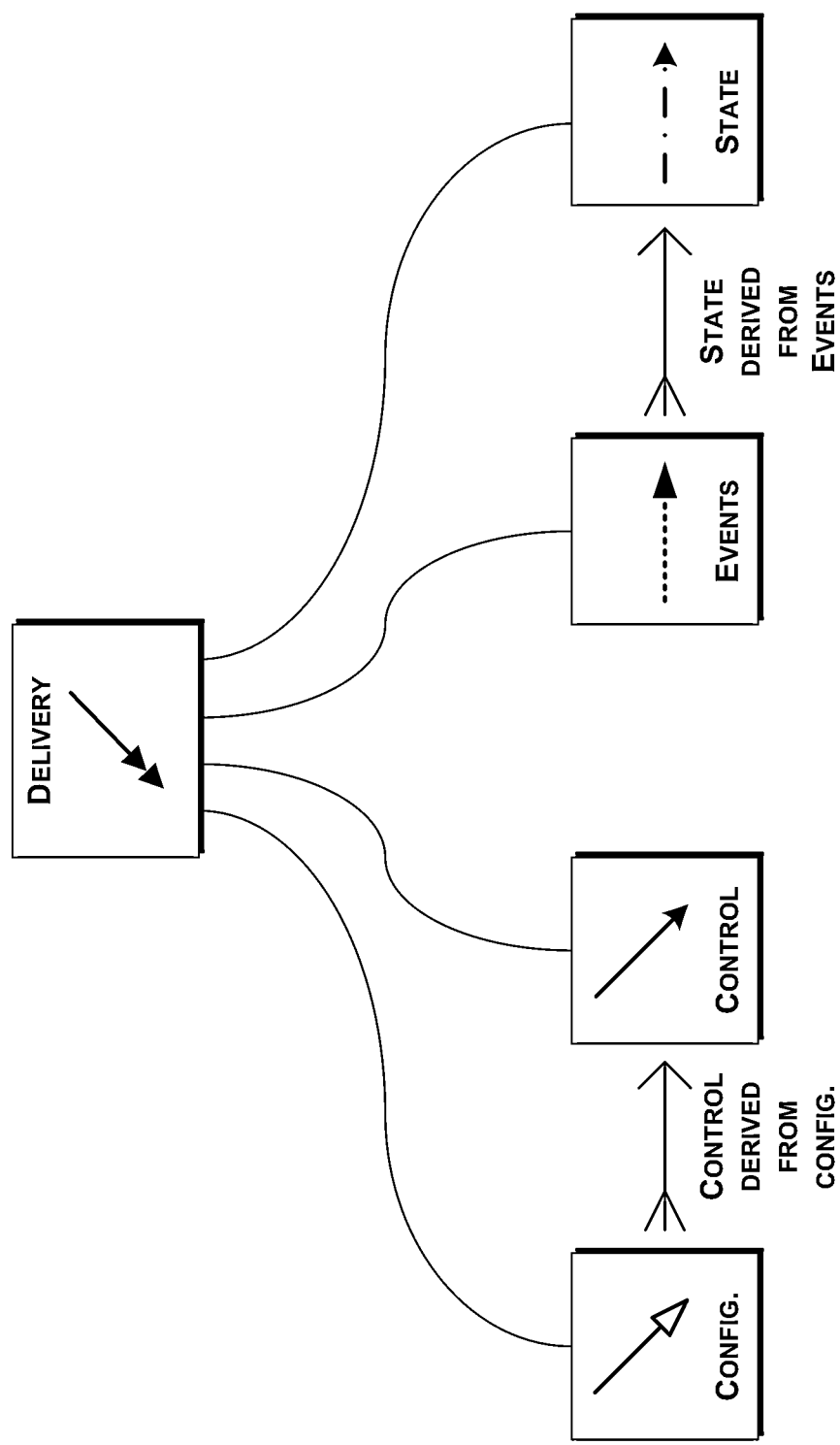
FIG. 1G shows an exemplary taxonomy of service types in a CDN in accordance with an embodiment.
Figure 1H:
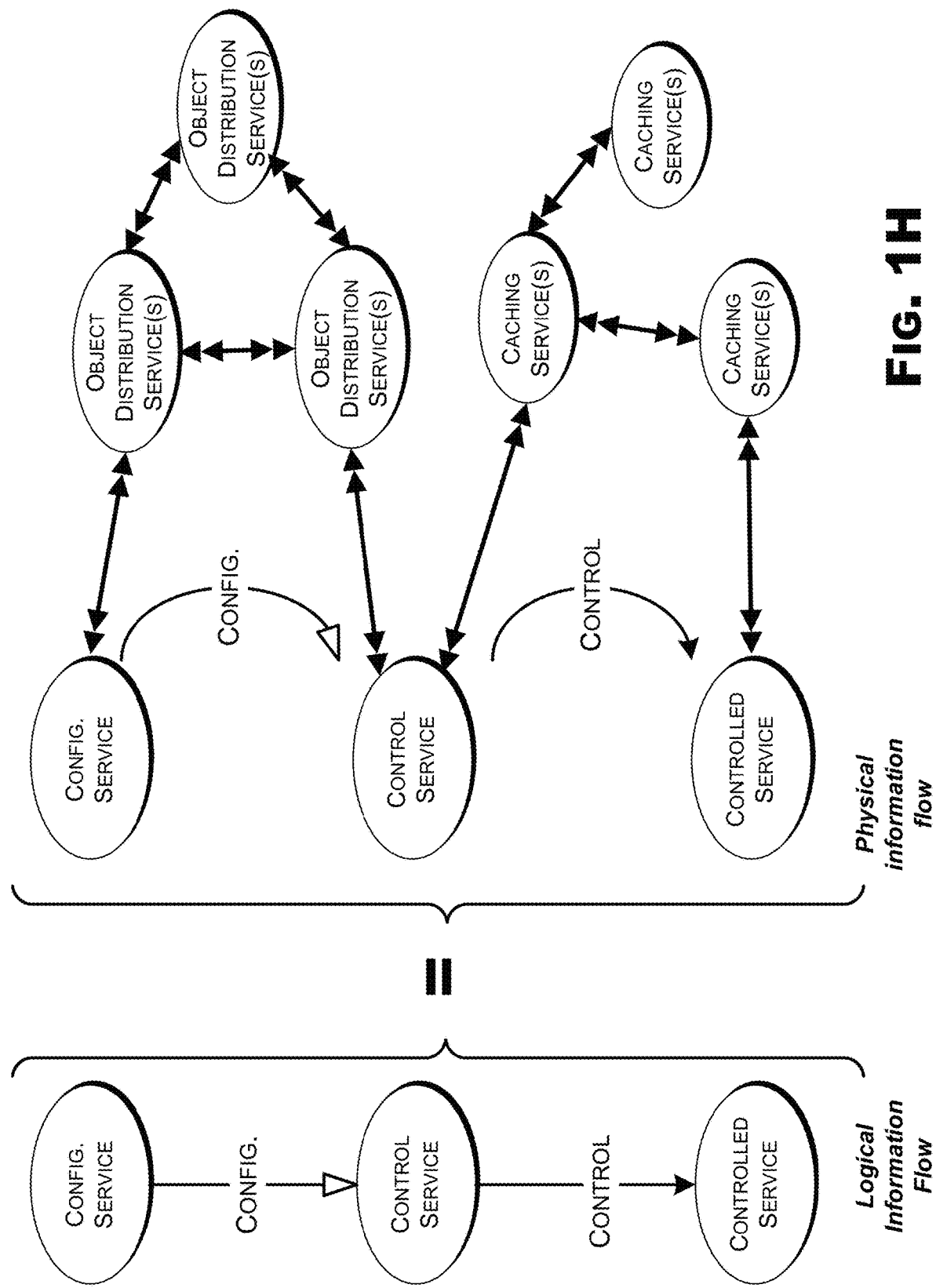
FIG. 1H depicts aspects of information flow between services in a CDN in accordance with an embodiment.

For example, the left side of FIG. 1H depicts a logical flow of information across three services (config service to control service to controlled service). It should be appreciated, however, that the flow depicted in the drawing does not necessarily imply a direct exchange of information between the various services. The right side of FIG. 1H shows an example of an actual path through which information might flow, involving intermediate delivery networks (in this example, two specific intermediate delivery networks, object distribution service(s) for the config information from the config service to the control service, and caching service (s) for the control information from the control service to the controlled service, in this example). It should also be appreciated that the level of description of the right side of the FIG. 1H is also a logical representation of the data paths for the config and control information.

In addition, those of ordinary skill in the art will realize and understand, upon reading this description, that whether logical or physical, information flow arrows usually do not specify any protocol(s) involved for the information exchange or which side initiates the conversation. Multiple protocols are conceivable and are contemplated herein, and, in many cases, the same application level protocol could be applied in multiple ways, e.g., where either side may push or pull. An exception to this is when a particular protocol is itself a defining feature of a service (for example, as may be the case with primary delivery services).

Example CDNs

In some aspects, a CDN may be considered to exist in the context of a collection of origin servers provided by (or for) subscribers of the CDN service, a set of end-user clients of the content provided by subscribers through the CDN, a set of internal tools (e.g., tools that provision, configure, and monitor subscriber properties), an internal public-key infrastructure, and a set of tools provided for use by subscribers for direct ("self-service") configuration and monitoring of the service to which they are subscribing (see, e.g., FIG. 1I). It should be appreciated that not every CDN need have all of these elements, services, or components.

For the purposes of this description, all services on the edge of and within the CDN cloud shown in FIG. 1I may be considered part of an exemplary CDN. These services may be distinguished from those outside the boundary in that they are themselves configured and controlled by other services within the CDN.

Figure 1J:
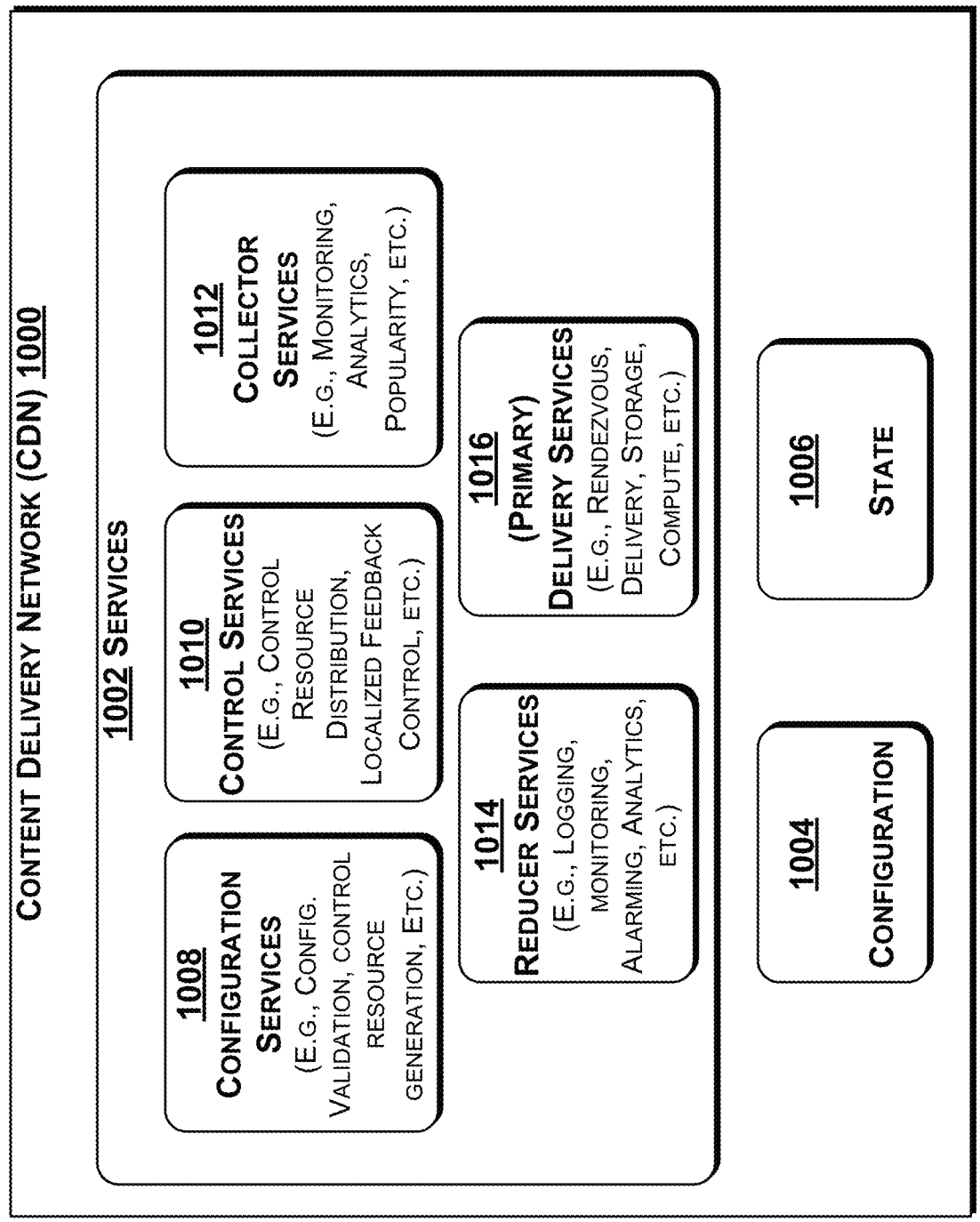
FIG. 1J depicts a logical overview of an exemplary CDN in accordance with an embodiment.

A CDN may thus be considered to be a collection of interacting and interconnected (or enmeshed) services (or service instances), along with associated configuration and state information. FIG. 1J depicts a logical overview of an exemplary CDN 1000 which includes services 1002, configuration information 1004, and state information 1006.

The services 1002 may be categorized or grouped based on their roles or the kind(s) of service(s) they provided (e.g., as shown in FIG. 1A). For example, as shown in FIG. 1J, an exemplary CDN 1000 may include configuration services 1008, control services 1010, collector services 1012, reducer services 1014, and primary delivery services 1016. Recall that, as used herein, for service type T, as used herein, the phrase "T services" refers to the collection of services of type T, regardless of whether or how those services are connected. Thus, e.g., the reducer services 1014 refer to the collection of all reducer service instances, regardless of whether the corresponding reducer service instances are actually connected, and, if connected, regardless of how they are connected.

The configuration services 1008 may include, e.g., services for configuration validation, control resource generation, etc. The control services 1010 may include, e.g., services for control resource distribution, localized feedback control, etc. The collector services 1012 may include, e.g., services for monitoring, analytics, popularity, etc. The reducer services 1014 may include, e.g., services for logging, monitoring, alarming, analytics, etc. The primary delivery services 1016 may include, e.g., services for rendezvous, caching, storage compute, etc.

Those of ordinary skill in the art will realize and understand, upon reading this description, that different and/or other categorizations of these services may be applied. In addition, those of ordinary skill in the art will realize and understand, upon reading this description, that the examples listed above for the various groups of services are merely exemplary, and that any particular category may include different and/or other services.

Roles and Flavors

The various CD services that a particular machine is running on behalf of the CDN, or the various roles that a machine may take on for the CDN, may be referred to as the flavor of that machine. A machine may have multiple flavors and, as will be discussed, a machine may change flavors.

Provisioning and configuration of machines is described in greater detail below.

In some implementations, groups of services (corresponding, e.g., to the services needed by a particular kind of CDN node) may be named, with the names corresponding, e.g., to the flavors.

The role(s) that a machine may take or the services that a machine may provide in a CDN include: caching services, rendezvous services, controlling services, collecting services, and/or reducing services.

As used herein, one or more machines running a caching service may also be referred to as a cache; one or more machines running a rendezvous service may also be referred to as a rendezvous mechanism or system, one or more machines running control services may also be referred to as a controller; one or more machines running collecting services may also be referred to as a collector or collector mechanism; and one or more machines running a reducer services may also be referred to as a reducer or reducer mechanism.

CD Service Interactions

FIG. 1E shows the logical connectivity and flow of different kinds of information (event, control, and state information) between service endpoints of the various services or kinds of services of an exemplary CDN (based, e.g., on the categorization of services in FIG. 1J). As shown in FIG. 1E, configuration service instance endpoints (corresponding to configuration services 1008 in FIG. 1J) may provide configuration information to control service endpoints (corresponding to control services 1010 in FIG. 1J).

Control service instance endpoints may provide control information ($C_1$) to collector service instance endpoints (corresponding to collector services 1012 in FIG. 1J), control information ($C_2$) to reducer service endpoints (corresponding to reducer services 1014 in FIG. 1J), and control information ($C_3$) to delivery service instance endpoints (corresponding to all delivery services, including primary services 1016 in FIG. 1J). Control services endpoints may also provide control information ($C_4$) to other control services endpoints and control information ($C_5$) to configuration service endpoints. The flow of control information is shown in the drawing by solid lines denoted with the letter "C" on each line. It should be appreciated that the letter "C" is used in the drawing as a label, and is not intended to imply any content or that the control information on the different lines is necessarily the same information.

As also shown in FIG. 1E, configuration service endpoints, control service endpoints, collector service endpoints, reducer service endpoints, and services endpoints, may each provide event data to reducer service endpoints. Reducer service endpoints may consume event data from the various service endpoints (including other reducer service endpoints) and may provide event data to collector service endpoints. The flow of event information is shown in the drawing by dotted lines denoted with the letter "E" on each line. It should be appreciated that the letter "E" is used in the drawing as a label, and is not intended to imply any content or that the event information on the different lines is necessarily the same event information.

Various components (i.e., service endpoints) may consume and/or produce state information. For example, collector service endpoints may produce state information for other service endpoints, e.g., state information $S_1$ for reducer service endpoints, state information $S_2$ for configuration services endpoints, state information $S_3$ for control service endpoints, state information $S_4$ for collector service endpoints, and state information $S_5$ for delivery service endpoints. The flow of state information is shown in the drawing by dot-dash lines denoted with the letter "S" on each line. It should be appreciated that the letter "S" is used in the drawing as a label, and is not intended to imply any content or that the state information on the different lines is necessarily the same state information.

As can be seen from the flow of information (event data, control data, and state data) in the diagram in FIG. 1E, various services or components of the CDN can provide feedback to other services or components. Such feedback may be based, e.g., on event information produced by the components. The CDN (services and components) may use such feedback to configure and control CDN operation, at both a local and a global level.

Figure 1K:
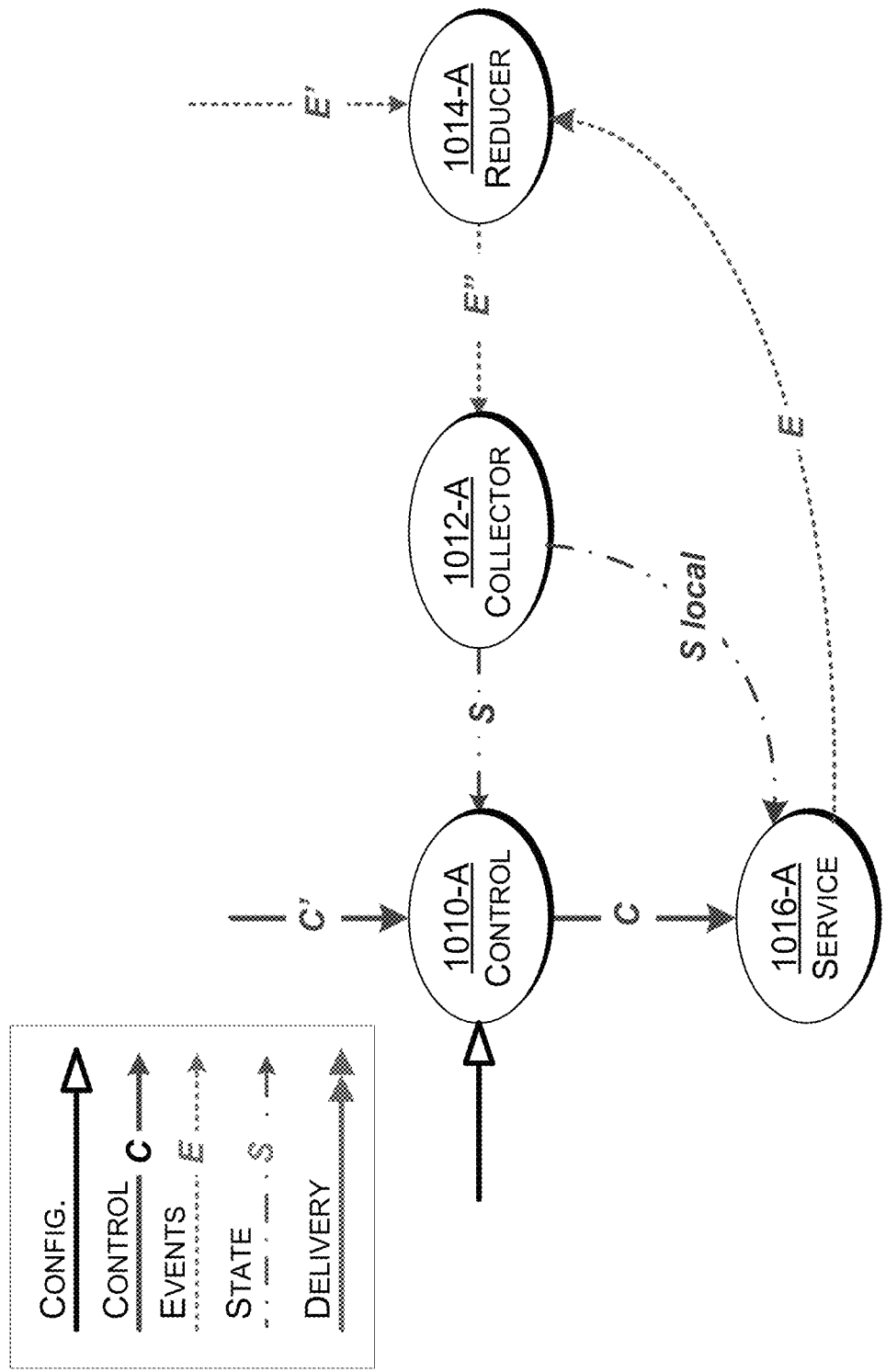
FIG. 1K shows feedback between logical service endpoints in a CDN in accordance with an embodiment.

FIG. 1K shows aspects of the flow in FIG. 1E (without the configuration services, with various flow lines removed and with some of the branches relabeled in order to aid this discussion). As shown in FIG. 1K, a particular service endpoint 1016-A may provide event data (E) to a reducer endpoint service 1014-A. The reducer endpoint service may use this event data (and possibly other event data (E'), e.g., from other components/services) to provide event data (E") to collector endpoint service 1012-A. Collector service 1012-A may use event data (E") provided by the reducer endpoint service 1014-A to provide state information (S) to a control endpoint service 1010-A as well as state information (denoted S local) to the service endpoint 1016-A. FIG. 1K shows particular components/endpoints (a service endpoint) in order to demonstrate localized feedback. It should be appreciated, however, that each type of service endpoint (e.g., control, collector, reducer) may provide information to other components/service endpoints of the same type as well as to other components/service endpoints of other types, so that the control feedback provided to the service endpoints may have been determined based on state and event information from other components/service endpoints.

Those of ordinary skill in the art will realize and understand, upon reading this description, that the information flow (and thus any feedback loops) shown in FIGS. 1E and 1K may apply equally at local and global levels, and may apply to any and all CDN services and components. Thus, as shown in FIG. 1L, information may flow between the various CDN components shown in FIG. 1J in the same manner as information flows between service instance endpoints.

Event information from each kind of service may be provided to reducer services 1014 from each of the other kinds of services. The reducer services 1014 may provide event information to the collector services 1012. Based at least in part on event information provided by the reducer services 1014, the collector services 1012, in turn, may provide state information to control services 1010, configuration services 1008, reducer services 1014, and primary services 1016. Based at least in part on state information provided by collector services 1012, the control services 1010 may provide control information to the other services.

Figure 1L:
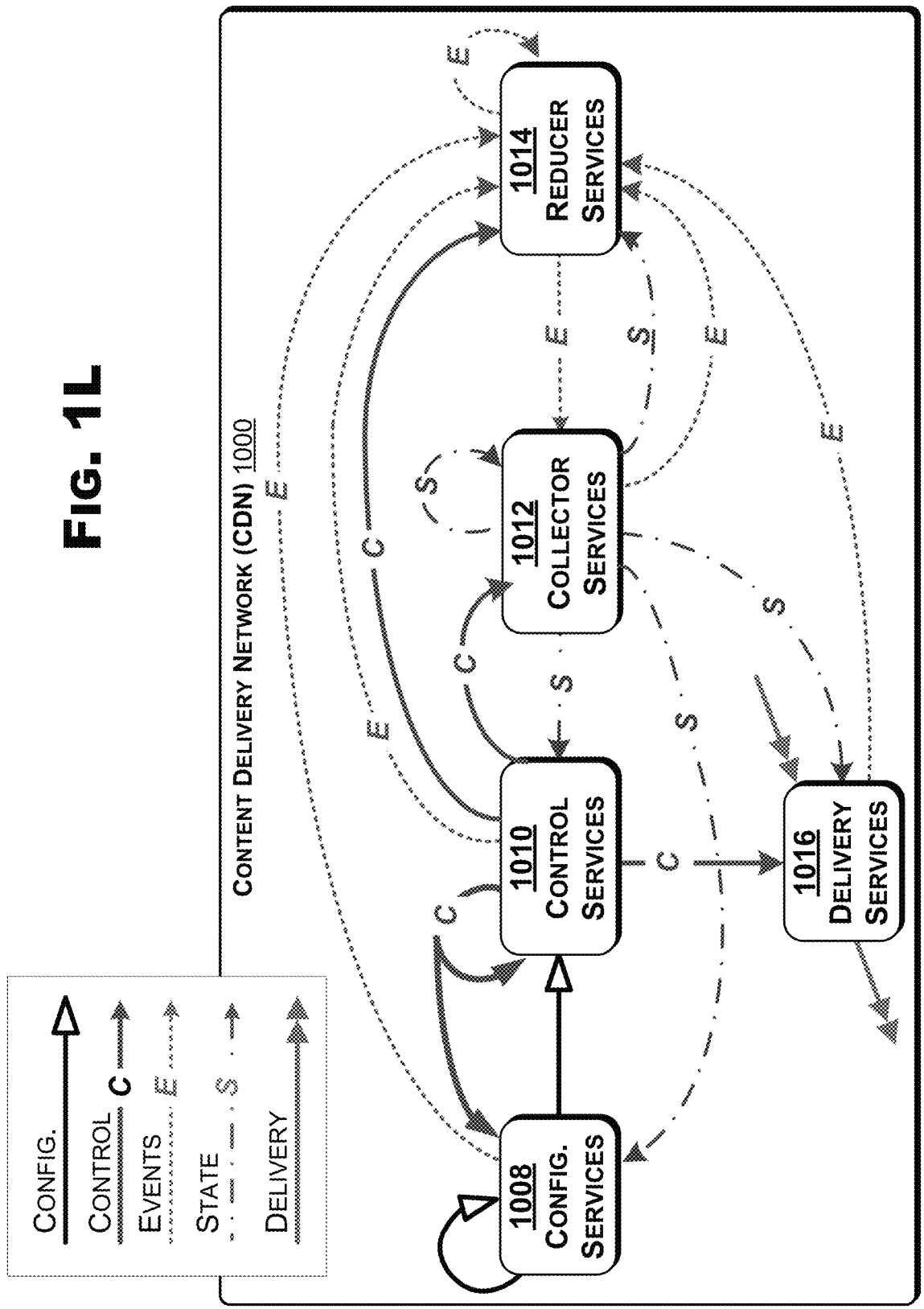
FIG. 1L depicts interactions between component services of an exemplary CDN in accordance with an embodiment.

FIG. 1E shows canonical service interactions between individual service instances of various types, whereas FIG. 1L shows interactions and information flows between groups of services of the same type or between classes of service types. It should therefore be appreciated that various boxes (labeled 1008, 1010, 1012, 1014, and 1016) in FIG. 1L may represent multiple services/components of that type.

The endpoints of each kind of service (caches, rendezvous, collectors, reducers, control) may be organized in various ways. In general, the endpoints of each kind of service form a network comprising one or more sub-networks of those endpoints. Thus, a CDN may include at least one cache network of cache services, at least one rendezvous network of rendezvous services, at least one collector network of collector services, at least one reducer network of reducer services, and at least one control network of control services. Each of these networks may be made up of one or more sub-networks of the same type of services. The configurations and topologies of the various networks may be dynamic and may differ for different services. Those of ordinary skill in the art will realize and understand, upon reading this description, that a CDN need not have all of the kinds of services listed or described here.

Each box showing services in FIG. 1L (i.e., boxes labeled 1008, 1010, 1012, 1014, and 1016) may, e.g., comprise a network (one or more subnetworks) of services or components or machines providing those services.

Thus, e.g., the box labeled reducer services 1014 may comprise a network of reducers (or machines or components providing reducer services). That is, the reducer services 1014 may comprise a reducer network (one or more subnetworks) of reducer services, being those subnetworks of the CDN consisting of all service instances of type "reduce."

Similarly, the box labeled collector services 1012 may comprise a network of collectors (or machines or components providing collector services). That is, the collector services 1012 may comprise a network (one or more subnetworks) of collector services (the collector network), being those subnetworks of the CDN consisting of all service instances of type "collector." Similarly, control services 1010 may comprise a control network (one or more subnetworks) of control services, being those subnetworks of the CDN consisting of all service instances of type "control." Similarly, config services 1008 may comprise a config network (one or more subnetworks) of config services, being those subnetworks of the CDN consisting of all service instances of type "config," and similarly, the delivery services 1016 (which includes cache services and rendezvous services) may comprise a network (one or more subnetworks) of such services. FIG. 1F shows exemplary information flows between homogeneous service-type networks.

Thus, event information may flow from any delivery service (1016) via a network of reducer services 1014 to a network of collector services 1012. Any of the reducer services in the network of reducer services 1014 may provide event information to any of the collector services in the network of collector services 1012. Any of the collector services in the network of collector services 1012 may provide state information to any of the reducer services 1014 and to control services 1010.

Thus are provided various feedback loops that, in an embodiment, operate in real time to control the various services.

Those of ordinary skill in the art will realize and understand, upon reading this description, that, as used herein, the term "real time" means near real time or sufficiently real time. It should be appreciated that there are inherent delays built in to the CDN (e.g., based on network traffic and distances), and these delays may cause delays in data reaching various components Inherent delays in the system do not change the real-time nature of the data. In some cases, the term "real-time data" may refer to data obtained in sufficient time to make the data useful in providing feedback.

Although the term "real time" has been used here, it should be appreciated that the system is not limited by this term or by how much time is actually taken for data to have an effect on control information. In some cases, real time computation may refer to an online computation, i.e., a computation which produces its answer(s) as data arrive, and generally keeps up with continuously arriving data. The term "online" computation is compared to an "offline" or "batch" computation.

Hybrid Services

Although services are generally described as having one role (e.g., delivery, rendezvous, collector, reducer, etc.), those of ordinary skill in the art will realize and understand, upon reading this description, that hybrid services may be formed by combining the functionality of various services. Hybrid services may be formed from services of different types or of the same type. For example, a hybrid service may be formed from a reducer service and a collector service. Hybrid services may be formed from one or more other services, including other hybrid services. Each device may run one or more services, including one or more hybrid services.

Events & Event Information

As noted, each service may produce information corresponding to events relating to that service (e.g., an event sequence corresponding to events relating to that service). An event is information (e.g., an occurrence) associated with an entity and an associated (local) time for that information. Thus, at a local level, i.e., at an entity (e.g., service or device or machine) that produces an event, an event may be considered as a <time, information> pair. An event stream is an ordered list of events, preferably time ordered, or at least partially time ordered. The time associated with an event is, at least initially, presumed to be the time on the entity on which that event occurred or a time on the entity on which the information associated with that event was current, as determined using a local clock on or associated with that entity. Events in event streams preferably include some form of identification of the origin or source of the event (e.g., an identification of the entity originally producing the event). Thus, outside of the entity that produces an event, an event may be considered as a tuple <entity ID; time, information>, where "entity ID" identifies the entity that produced the event specified in the "information" at the local time specified by the "time" field. Preferably the entity ID uniquely identifies the entity (e.g., a service instance) within the CDN. The time value is time at which the event occurred (or the information was generated), as determined by the entity. That is, the time value is a local time of the event at the entity. In preferred implementations, local time is considered to be coordinated universal time (UTC) for all CDN entities/services.

The information associated with an event may include information about the status of an entity (e.g., load information, etc.), information about the health of an entity (e.g., hardware status, etc.), information about operation of the entity in connection with its role in the CDN (e.g., in the case of a server, what content it has been requested to serve, what content it has served, how much of particular content it served, what content has been requested from a peer, etc., and in the case of a DNS service, what name resolutions it has been requested to make, etc.), etc. Those of ordinary skill in the art will realize and understand, upon reading this description, that different and/or other occurrences or items of information may be included in events.

An event stream is a sequence of events, preferably ordered. Streams are generally considered to be never ending, in that they have a starting point but no assumed endpoint.

Service Management

Figure 2A:
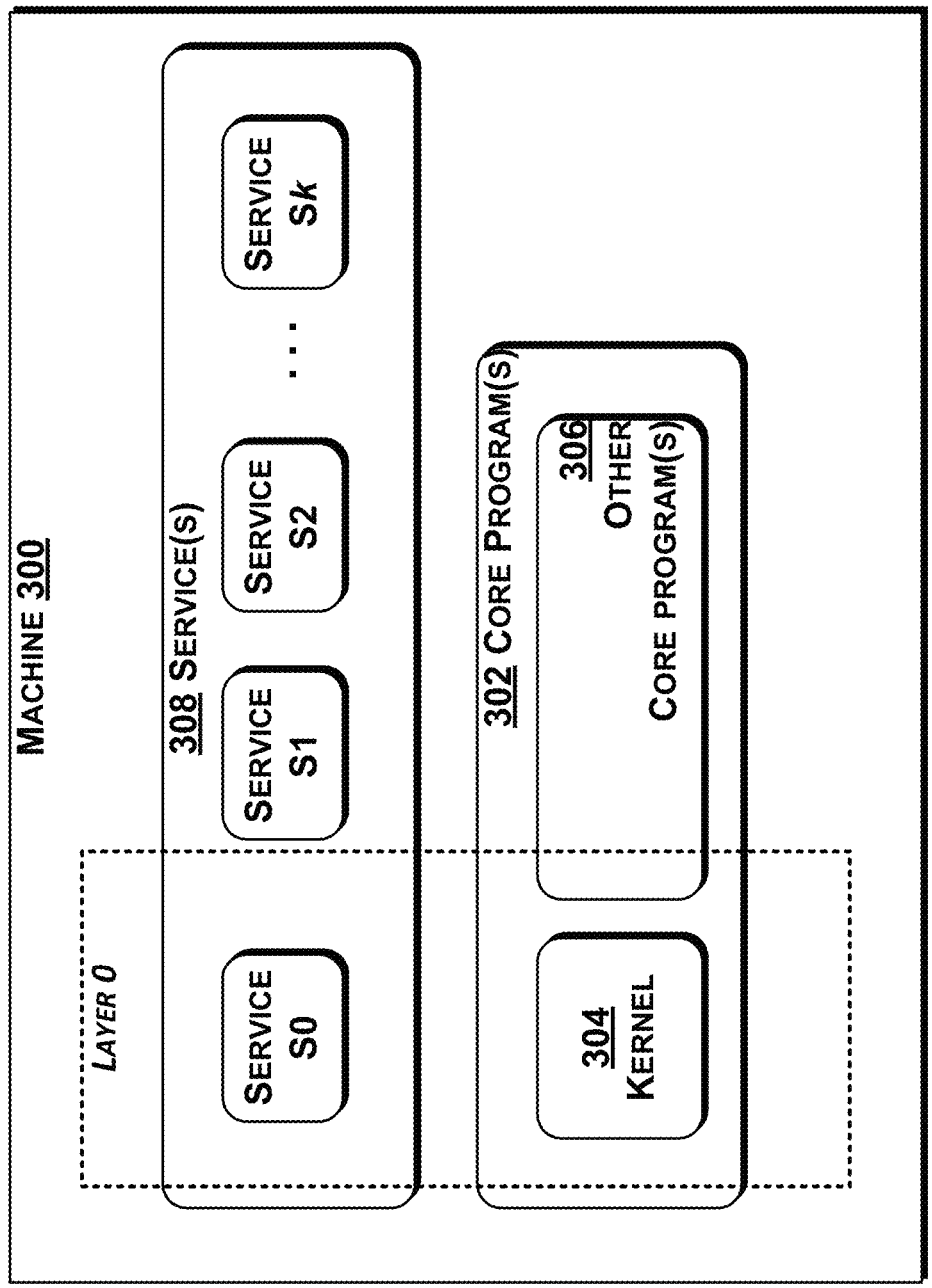
FIG. 2A depicts aspects of a machine in an exemplary CDN in accordance with an embodiment.

Service management involves a set of mechanisms through which instances of service types are installed and launched on specific machines, preferably in response to signals (control information) from the control network.
Provisioning and Configuration With reference to the drawing in FIG. 2A, a machine 300 has core programs 302 which may include an operating system (OS) kernel 304 and possibly other core programs 306. The computer 300 may run or support one or more services 308, denoted S0, S1 . . . Sk in the drawing. For example, a particular computer may run one or more of: reducer services, collector services, caching services, rendezvous services, monitoring services, etc.
Autognome and Repoman Each machine is preferably initially configured with at least sufficient core program(s) 302 and at least one provisioning service S0 (i.e., the application code for at least one provisioning service S0) to enable initial provisioning of the machine within the CDN. The provisioning service S0 may then be used to provision the machine, both for initial provisioning and, potentially, for ongoing provisioning, configuration and reconfiguration.

In some cases the configuration/provisioning service S0 may also be referred to herein as "Autognome." Autognome (S0) is a preferably lightweight service, running on all CDN machines, that provides part of a system for autonomic control of the network. The phrase "autonomic control" refers to changes in behavior that occur spontaneously as a result of stimuli internal to the network, as opposed to control driven from conscious, manual, knob-turning and the like. At the level of individual machines providing services in the CDN, autonomic control involves continuous reaction to service reconfiguration commands generated elsewhere in the network (e.g., by control nodes), and Autognome is the service that implements this reaction. It should be appreciated that while the system may use autonomic control, this does not preclude the use of manual control, e.g., by network operators. It should be appreciated that, as used here, autonomic may also refer to there being no requirement for a human to intervene on a particular machine to effect a configuration change even if the change was commanded by some human intervention elsewhere (e.g., somewhere in the control network) which causes Autognome to take the necessary actions autonomously to get into the right configuration.

The Autognome (S0) relies on another service (referred to here as "Repoman" or R0) to provide the assets (e.g., the software) Autognome needs to install. The Repoman service (R0) provides the ability to publish and retrieve the software artifacts needed for a specific version of any service type implementation, along with dependency information between services and metadata about each service version's state machine. A service version is generally defined by a list of artifacts to install, a method for installing them, and a set of other services that need to be installed (or that cannot be installed) on the same machine. The state machine defines a list of states with commands that Autognome (S0) can issue to move the service from one state to another. Most services will have at least two states reflecting whether the service is stopped or running, but some services may have more.

Service and Constellation States

Each service has a hierarchy of state values, including a single service-level state, an endpoint-level state for each unique endpoint it listens to, and a state per layer per terminal request collection (defined below) that it responds to. The value of each of these state variables is taken from a discrete set of states that depends on the type of state variable, the type of service, and the service implementation that the service instance is running.

A service can be commanded to a different state (at the service level, endpoint, or request collection level) either via an argument in the command that launches the service, via control information retrieved by the service directly from the control network, or via a command issued directly from Autognome or some other agent to the service. Service states may also change as a side effect of normal request processing. The actual mechanisms available, and the meaning of different states are dependent on the service type. Autognome, however, preferably only attempts to control service level state of a service.

The ability of Autognome to probe current states locally may be limited and depend on what has been designed into the service implementation, and in some cases the only reliable feedback loop will be from error signals based on external monitoring received via Autognome's control feed.

Service constellations may also have state machines, either defined implicitly by the set of state machines for all services in the constellation (where the state of the constellation is the vector of states for each of the services), or defined explicitly. Explicitly defined state machines at the constellation level are useful when not all combinations of sub-states make sense, and/or when there is coordination needed between state transitions across multiple services.

In general, the top-level state machine operated by Autognome may correspond to a hierarchy of state machines, each of which may be internally hierarchical and probabilistic. In the probabilistic case, commands issued by Autognome are known only to put the service in some target state with some probability, and probes update the probability distribution based on observations and the believed prior probability. Autognome tracks the state of each service as the most probable state based on its history of commands and the result of probes.

Since the services on a machine can be modified (e.g., stopped, started, etc.) on the fly, each CD service preferably accepts options to start, and stop. CD services may also accept options to restart (stop and then start), check, update, and query. The actual set of options depends on the service level state machine configured for that service implementation.

Service Constellations, Flavors, and Roles

A service constellation refers to an identifiable collection of service specifications, where each service specification defines the software artifact versions required and the state machine of the service (a list of states, executable transitions between states, and executable state probes that Autognome can use to measure and control service state). A service collection may be named.

Although service constellations can be defined on the fly, in some cases it may be useful to define them in advance and give them names. The term "flavor" is used herein to refer to such a named service constellation. A flavor may be considered to be shorthand for a symbolically named service constellation.

A service specification may also specify additional required services or service constellations. An Autognome configuration preferably specifies a list of one or more constellations, and optionally, a list of service-specific states. Autognome's job is to install all dependencies (including unmentioned but implicitly required service constellations or services), launch the necessary services, and usher them through to their specified end states.

A machine may also have multiple roles, each of which represents the machine's functional role and its relationships to other machines in one or more larger subnetworks of machines. Each role maps to a service constellation (or flavor) expected of machines performing that role in a particular kind of network. Thus a machine's flavors or service constellations may, in some cases, be influenced indirectly by the roles it performs.

While a single machine can be instructed to have multiple roles, flavors, and service constellations, it should be appreciated that roles and flavors ultimately reduce to service constellations, and that the composition of multiple service constellations is itself a service constellation. Therefore, there is one service constellation that represents the set of services running on a machine at any given time, and this service constellation is computed dynamically from the initial list of roles, flavors, and/or constellations Autognome is configured to launch. This computation may be performed partly by repoman and partly by Autognome. Due to the way service constellations are computed and the dynamic nature of the inputs, the ultimate service constellation launched on a machine may not necessarily correspond exactly to any preconfigured service constellation, role, or flavor.

Autognome's View of Services

Autognome has an abstract view of services and constellations (groups) of services. The definition of services, constellations, and their associated state machines is defined elsewhere (most likely in the configuration network, with references to specific software package bundles needed for specific services, which would be retrieved from Repoman). A state machine for a service defines a discrete set of states with commands for transitioning between specific states. In addition, routes may be defined to map indirect state transitions into direct, next-hop state transitions. Commands for state transitions would have rate-limiting delays associated with them, and an additional set of state-dependent commands would be defined to allow autognome to probe for the current value of a service state (which could result in some local action or could result in a request to a remote service, like a collector, that is observing the effects of services running on this machine).

All state probe and transition commands are assumed to be idempotent if successful, but not guaranteed to be successful. In other words, any number of commands (with appropriate delays) specified to move a service from state A to state B must either leave it in state A or put it in state B and have no effect if the service is neither in state A nor in B. Autognome should also assume that services can spuriously change state in response to other stimuli other than Autognome commands. Whether or not active state monitoring is the responsibility of an Autognome instance (or whether that monitoring is done by some other agent and the results fed back into Autognome's configuration) is variable, depending on the configuration of that Autognome instance (which might depend on the nature of the services to be monitored).

Each service's state machine as viewed by Autognome is expected to be an abstraction of a more detailed internal state, and it is a service design and implementation decision as to how much of this internal state must be represented to Autognome, how much more might be represented in internal states visible to the control network but not to Autognome, and how much variation is purely internal to the service. Thus the number of states in the Autognome view of a service is arbitrary as far as autognome is concerned but likely to be small (usually two).

As a corollary to all this, autognome does not care whether a service corresponds to a single process or many processes, since its interaction with services is done in terms of state probe and state transition commands that it is given. This also leads to the notion that a "service" could be defined as a collection of subservices, with a state machine that is based on the states of subservices. This aspect would be useful (though not necessarily) built into autognome in order to enable the probing of a certain composite state to be defined as probing a list of sub services for their individual states, and similarly for state transitions.

A Service's View of Autognome

Services may, but need not know, anything about the existence of autognome. As such, services that are developed outside of the framework may be integrated with it. A service's configuration must define the state machine abstraction of the actual service implementation along with other dependency information.

Autognome Vs. Control Services

Autognome exerts a controlling influence on the services it launches, but Autognome itself is not defined as a control service. It should be appreciated that this is a matter of definition and does not affect that manner in which Autognome or the control services operate.

Configuration Levels

Figure 2B:
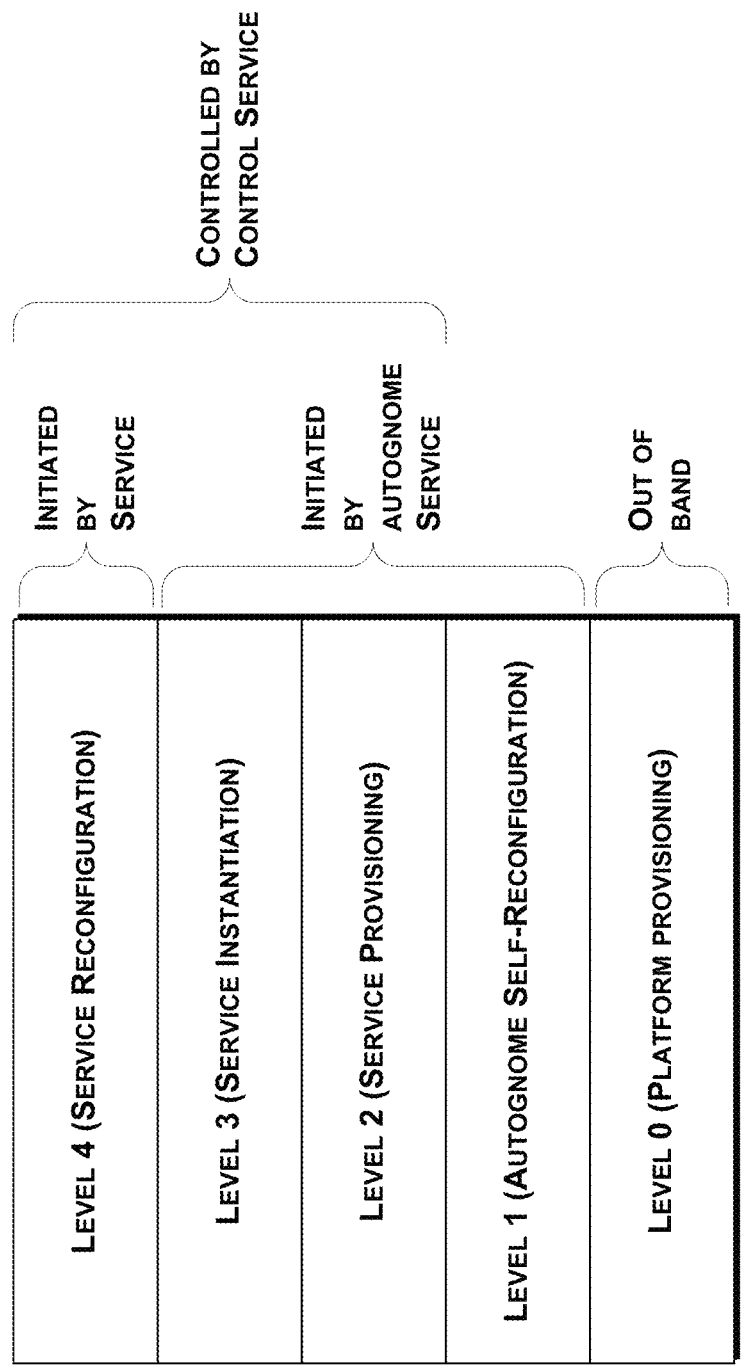
FIG. 2B depicts aspects of configuration of a machine in a CDN in accordance with an embodiment.

Configuration may occur at multiple levels on any given machine, from the relatively static platform installation (e.g., initiated out-of-band) to the highly dynamic (re)configuration of a constellation of running services. The function of Autognome (S0) may be described with respect to layers or levels of operation of a machine, and with reference to FIG. 2B.

Configuration Level 0 (Platform Provisioning)

Level 0 is assumed to exist and to have been configured in advance in the initial provisioning of the system, out-of-band with respect to Autognome (S0). The existence of some version of Autognome itself is preferably established as a service as part of Level 0 (this version of Autognome is denoted service S0 in FIG. 2A). The only requirements of Level 0 (other than the presence of some version of Autognome) are the platform facilities needed to run Autognome and any platform configurations which Autognome is not able or allowed to alter dynamically (e.g., at least some core programs 302, likely to include the base OS distribution and a particular kernel 304 and set of kernel parameters, though kernel changes could also be initiated by Autognome).

Configuration Level 1 (Autognome) Self-Reconfiguration

The set of software installation steps that constitute formation of Level 0 is essentially arbitrary, limited only by what the current installation of Autognome is able and authorized to change. Anything that Autognome is unable or unauthorized to change falls within Layer 0, with the exception of Autognome itself (which must be initially installed in Level 0 but may be changed in Level 1).

Level 1 establishes the configuration of Autognome itself. Once initially installed (established) in Level 0, Autognome can reconfigure itself to run any version older or newer than the currently installed version on the machine, and other Autognome parameters can be dynamically adjusted.

Configuration Level 2 (Service Provisioning)

Figure 2C:
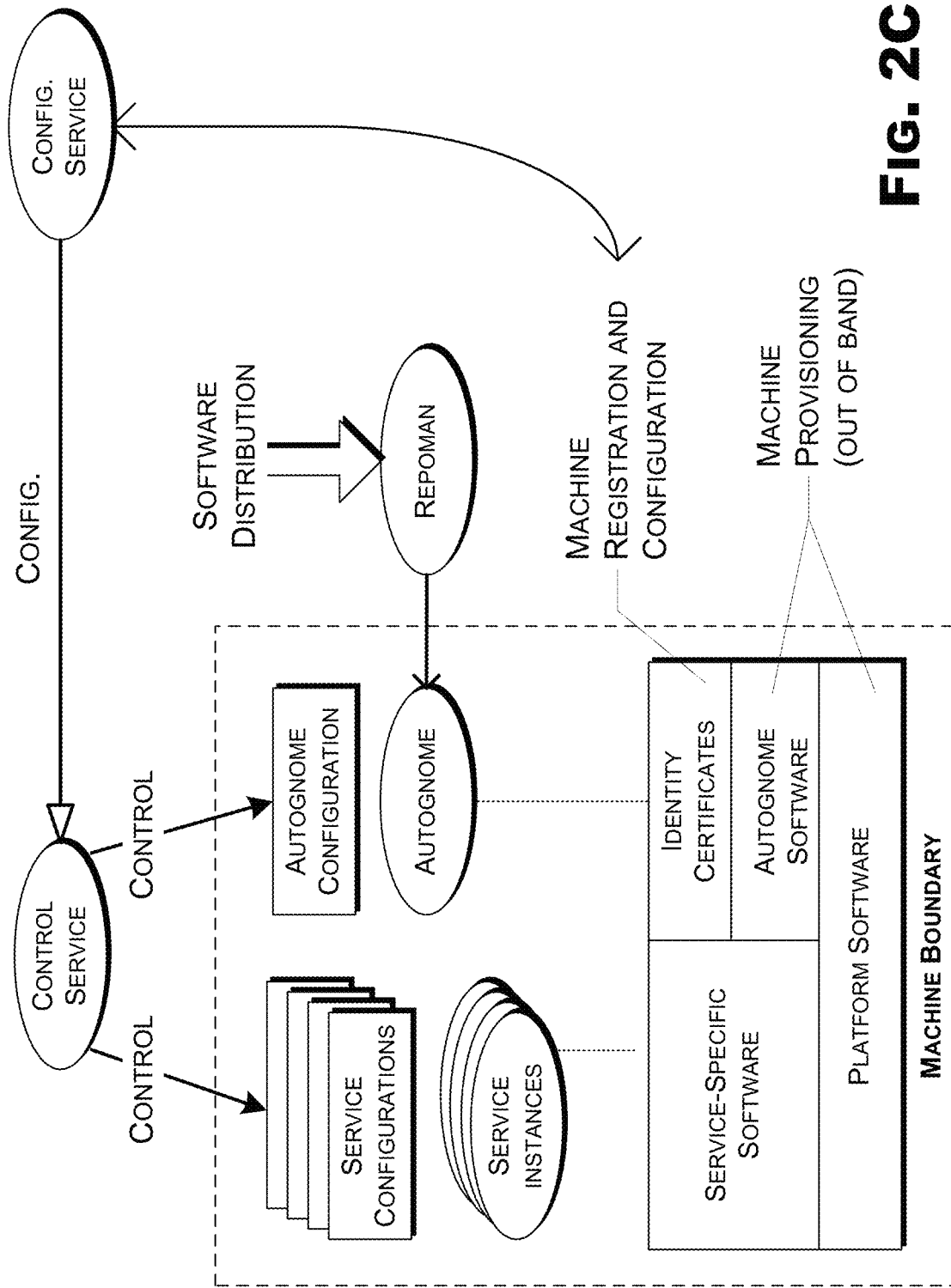
FIGS. 2C to 2D depict aspects of an exemplary autonomic service in an exemplary CDN in accordance with an embodiment.

Level 2 (Service Provisioning) establishes the other services (S1 . . . Sk in FIG. 2A) that need to be active on the machine and their initial configuration environments. Part of Autognome's configuration is also the constellation of services to run. With reference to FIG. 2C, Autognome may implement Level 2 by retrieving the necessary software artifacts or packages from Repoman and installing them on the machine Each service may have dependencies on other services and on elements of lower layers, so establishing a particular set of services may involve both destructive changes to the current configuration (stopping services, uninstalling packages) as well as constructive changes (installing packages, (re)starting services) for both the explicitly mentioned services and for other dependencies. Certain services may support additional commands that Autognome can issue without restarting the services. These commands may involve writing files or issuing direct requests (e.g., via HTTP or other protocols) to local services.

Configuration Level 3 (Service Instantiation)

In Configuration Level 3 Autognome's next responsibility is to stop and start services, provide initial service configurations to enable them to reconfigure themselves later, and guide them into their target states as specified by the service constellation.

Level 4 (Service Reconfiguration)

Level 4 (Service Reconfiguration) refers to service specific dynamic configuration that falls outside the scope of Autognome's actions in Layer 2. Services are assumed to act on additional (re)configuration commands (e.g., from control resources pulled from the control mechanism, or from other sources) as appropriate for the service. For example, a cache service may autonomously consume control resources from the control mechanism and thereby adjust its behavior dynamically, without any knowledge of or involvement from Autognome. Autognome has no role in this layer, and it is mentioned here to clarify the fact that Autognome need not be the source of all configuration information, nor need it be the impetus for all dynamic configuration changes. Autognome's focus is on the configuration of services running on a machine, and on the service-specific state of each service.

Configuration Monitoring

All Autognome actions regarding configuration state changes may be logged as events to an appropriate reducer service, provided Autognome is configured to do so. These event streams can be reduced in the usual fashion to get global, real-time feedback on the changes taking place in the network.

Health and Load Monitoring

Autognome is preferably implemented as a small service with a few simple functions—to install, start, probe, and stop services. Autognome's ability to monitor service state may be limited to its ability to execute configured probe commands that allow it to infer the state of each service on the machine at any time (or the probability of being in each state), and it reports only service level state and configuration changes. This level of monitoring is sufficient for autognome but typically not sufficient for general health and load monitoring. When more elaborate monitoring functionality is needed (as it often will be), additional services whose sole purpose is monitoring may be added to the service constellation, and autognome will take care of installing and running them. Such services will typically provide their monitoring data in the form of events delivered to reducers. In addition, each service running on the machine (including autognome) will typically provide its own event stream that can also be used as a source of monitoring data.

Figure 2D:
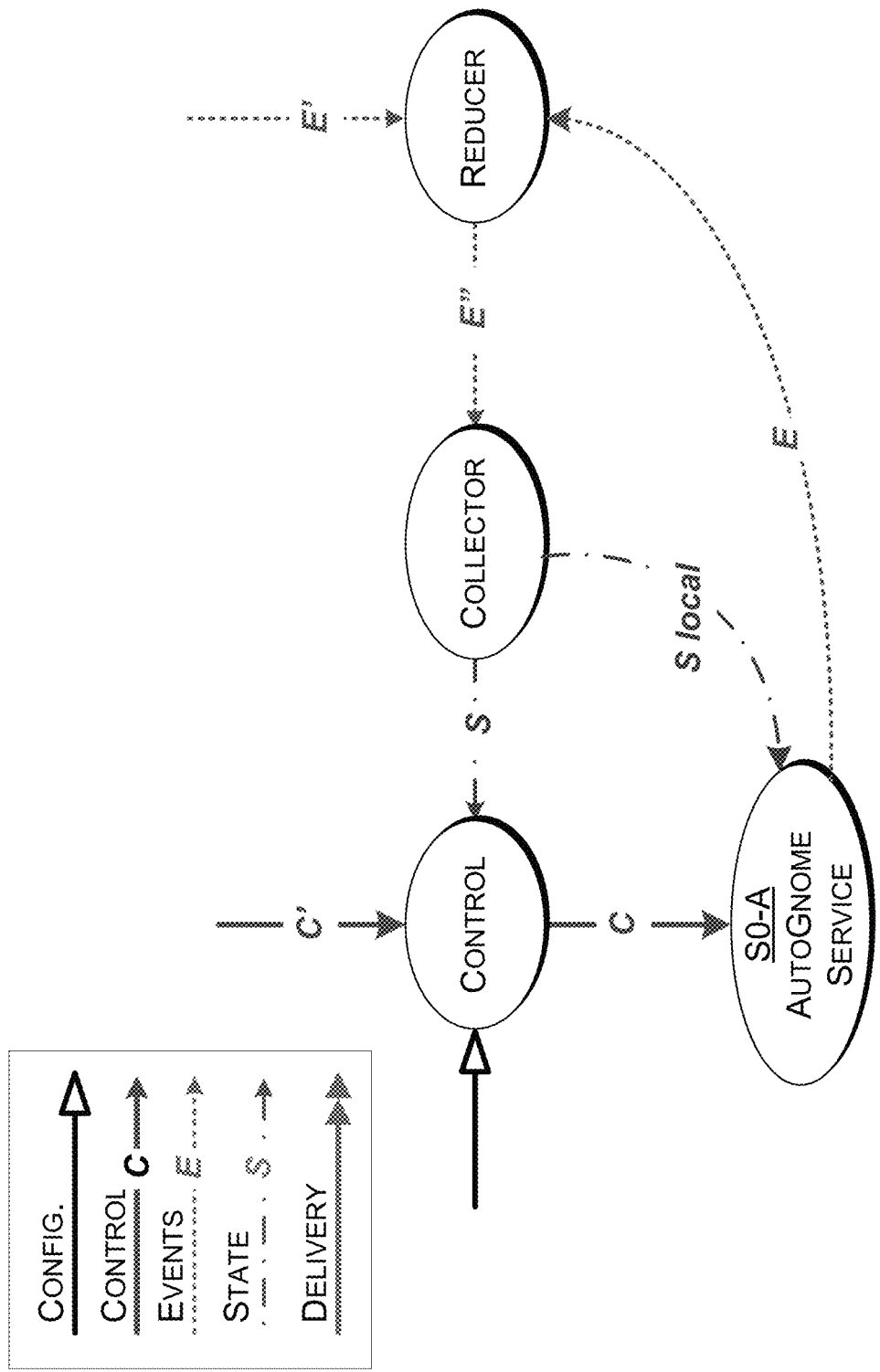

It should thus be appreciated that Autognome is itself a service instance (see FIG. 1B), and, as such may take control, state and event information as inputs, and may produce control, state and event information as outputs. Autognome corresponds, e.g., to a service 1016-A in FIG. 1K. Thus, as shown in FIG. 2D, an Autognome service (S0-A) may take as input control information (C) from control endpoints and produce event information (E) to be provided to reducer endpoint(s).

It should be appreciated that Autognome need not directly provide any additional monitoring functionality of the services it launches, other than the service state changes just described. When such functionality is needed (as it typically will be), additional services whose sole purpose is monitoring may be added to the service constellation, and Autognome will take care of installing and running them.

Auto(g)nomic Adapters

An autonomic adapter is an adapter that may be provided between Autognome and a foreign service component that does not support the interface expected by Autognome, at least with respect to the manner in which configuration updates and state changes work (a non-CD service). The adaptor makes the non-CD service look like a service to Autognome at least with respect to configuration updates and state changes. The composition of the foreign service component and the autonomic adapter results in a CD-service, thereby allowing software components that were not designed to be enmeshed as a CD-service to be enmeshed. The adapter is able to retrieve configuration updates, launch the service, and report service state changes by reading and writing files, setting environment variables, and running other commands that the foreign service component provides.

Object Distribution

Introduction to Object Distribution

The network of object distribution services provides distributed namespaces of versioned objects. An object in this context is a mapping from a key or identity in some namespace to a set of versioned values. Objects are distributed in the sense that two object service nodes (simply "nodes") may concurrently read or write the same object, and as a result, an object may have conflicting values in different parts of the network or even conflicting value versions for the same object at one location. The function of the object distribution network is to distribute object updates to all connected nodes in a way that preserves the partial order of all updates and achieves eventual consistency between all nodes, including support for implicit values, automatic conflict resolution, and derived objects.

The initial purpose of the object distribution network is to provide a substrate for implementation of other CD services (such as configuration and control services), but instances of the same service could potentially be used as delivery services for subscriber applications.

Cohorts and Namespaces

The structure of an object services network is defined by the set of cohorts and namespaces involved in the network. A cohort is a collection of nodes representing a connected graph, where there is a direct or indirect communication path from each node in the cohort to each other node in the cohort involving only nodes in that cohort. In addition, each node in the cohort knows the identity of each other cohort node in that cohort for the purpose of interpreting vector-clock based versions. Nodes may participate in multiple cohorts.

A namespace is a distributed mapping from object identifiers to versioned values. Each node is aware of some set of namespaces and may have different rights to access objects in each namespace. Each object exists in exactly one namespace and is addressable with an identifier that uniquely identifies the object in that namespace. Other distinct keys that uniquely identify the object are also possible (i.e., there may be more than one way to name the same object in one namespace).

The cohort and namespace assignments of each node are defined by the node's configuration, which may change dynamically. The set of cohort assignments at any given time implies a cohort graph, where one cohort may be connected to another via the set of nodes common to both cohorts.

Causal Buffering

To avoid having vector clock sizes grow with the total number of object service nodes in the network, vector clocks may be translated as object updates across cohort boundaries using a technique called causal buffering. In causal buffering, all of the updates originating from nodes in a different cohort look as if they were made either by one of the nodes in the local cohort or by a one of a set of nodes that is proportional in size to the number of neighboring cohorts, not the total size of the network. Nodes on cohort boundaries translate updates in a way that hides the node identifiers of nodes in remote cohorts, improving scalability. This also imposes some constraints on the interconnection topology of cohorts, to prevent the same update from arriving in one cohort from two different directions under two different aliases that might not be properly orderable.

History and Incremental Delivery

The system may provide a built-in facility for object version history, maintaining some amount of history from the current (possibly conflicting) version frontier to some older version, and using this to support incremental delivery when requested for objects that support it and when there is adequate history, otherwise defaulting to absolute delivery.

Automatic Conflict Resolution

The system may provide a built in facility for defining conflict resolution scripts based on object type. Such a facility would be used, e.g., for control and invalidation manifests (discussed below).

Derived Objects

Figure 28:
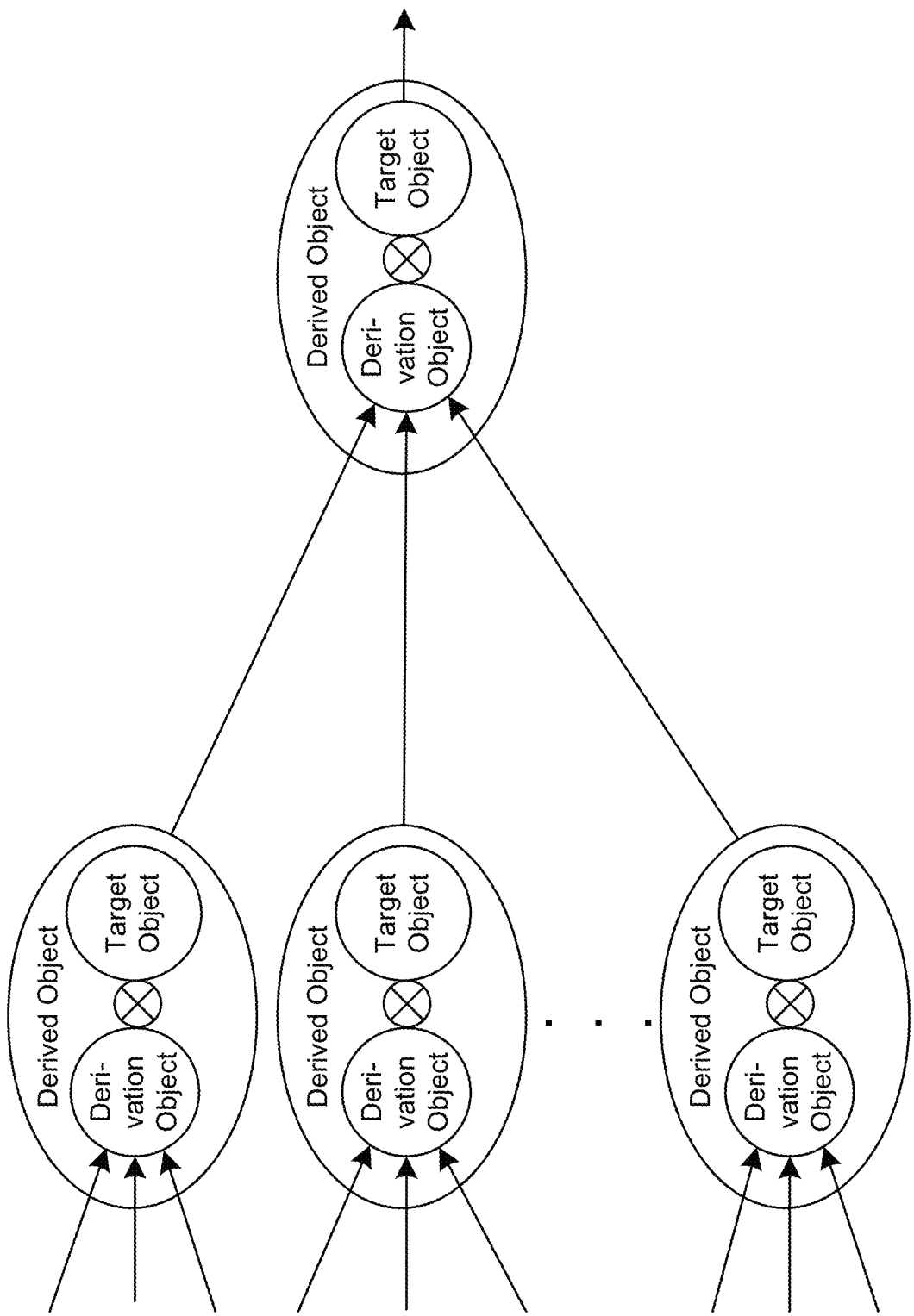
FIG. 28 shows an example of object derivation in accordance with an embodiment.

The system may provide a built in facility for configurable generation of new versions of objects based on the values of dependency object(s), with support for derivation peering across a set of object service peers. FIG. 28 shows an example of derived objects.

Trusted and Untrusted Values

The system may use knowledge about compromised nodes (where a node is believed to have been compromised from times T1 to T2) to find all object versions that are causally affected by values that originated in the compromised interval.

Compute Distribution

Introduction to Compute Distribution

The compute distribution service is a network of configurable application containers that define computations in response to requests (usually over HTTP). As with other services, request collections define mappings from actual requests to underlying behaviors. Each behavior involves the execution of some program or set of programs based on inputs derived from the request (including the environment derived from the request collection lattice as well as other attributes the scripts may themselves extract from the request). The program implied by the behavior is executed in a container according to some invocation style (which determines the invocation API and callback APIs, where the APIs may dictate either a buffered or streamed processing style, for example). In preferred implementations the programs themselves are assumed to be web resources located somewhere on the network.

Invocation Protocols

The invocation protocol for a computation defines the way in which a given request to the computation service corresponds to calls to underlying entry points in a configured computation. Rather than simply invoke a program in response to a request and expect the program to determine what it really needs to re-compute, invocation protocols may be selected that divide up the process into a number of stages, not all of which need to be run on each request. Each invocation protocol should implicitly deal with changes to the program itself, knowing enough to rerun the whole process if the program ever changes.

For example, an invocation protocol for a GET request might partition the computation involved in a request into the following that can be invoked separately when needed:
1. Computation of the set of input names based on the request (URL, query string, headers, etc.).
2. Retrieval of the set of input resource values based on the input resource names (from wherever they are supposed to come from, which could be a cache or another compute service).
3. Computation of a new output resource based on the new states of input resources.

Each invocation protocol implies a set of entry points into the program that can be executed to perform each step. At each level there may be expirations or invalidations configured to determine whether or not the previous value for something is reusable, allowing re-computations to be avoided unless absolutely necessary.

It should be appreciated that other protocols are conceivable and may be necessary, especially in cases where the computation of the output resource is best represented as a stream computation. Such other protocols are contemplated herein.

Buffered Vs. Stream Computations

In some cases computations may be configured to use a buffered vs. streamed generator/yield approach.

Engine Isolation

In some cases the system may provide facilities for controlling the degree of isolation between the execution of computations assigned to different subscribers.

Localization

It should be appreciated that, in some cases it may be useful for computations to return different results depending on the location of the compute service and/or the location of the client invoking the compute service. This can be achieved in various ways, such as via localization of the definition of the computation based on locality or direct use of location parameters computed by local collectors or other compute services in an otherwise location-invariant computation.

Control Distribution and Invalidation

Introduction to Control Distribution and Invalidation

This section describes how control information produced by control services is consumed by the services being controlled. Control information is transported via control manifests that are evaluated by controlled services to produce their control trees. Each service instance constructs a single logical control tree from a root control manifest, and this control tree either directly includes or indirectly references all control information needed by the controlled service. Periodic re-evaluation of the control tree results in a continual absorption of new information from the rest of the network.

This section discusses two related mechanisms used for the flow of information across the system. For control resources that all services must consume, control distribution is the mechanism by which control manifests are transmitted from originating control service to consuming service. For other content or resources that flow through the caching network or through other services that cache information on behalf of future requests from other consumers, invalidation is a mechanism that may be used to manage the flow. Control distribution is also the means through which invalidation manifests are themselves distributed, providing the basic signaling mechanism(s) needed to implement invalidation.

As used herein, a "control resource" refers to a representation of a controlling configuration of a service virtual machine (described below in the section on request processing) that is directly usable by a running service instance.

In general, any service, not just services specifically providing caching services, may, in effect, be caching information for later delivery to other clients, and invalidation may be a mechanism useful to manage updates to this information. Such services may be able to arrange to subscribe to invalidation manifests that govern those resources, provided there is some other service in the network that generates invalidation commands (to the configuration network) when needed, and the nature of the origin of those resources is such that the invalidation mechanism can handle it. For all other control information (including invalidation manifests themselves), subscribing to control manifests delivered via the basic control notification mechanism and pulling resources when necessary is preferable.

Implications of Distributed Configuration and Control

The design of preferred embodiments of the system for configuration and control represents a conscious choice to sacrifice consistency in order to optimize availability and tolerate network partitions. This means there are no global transactions, and concurrent updates to the "same" object in two different locations are possible. This in turn results in unavoidable conflicts that the system must detect and resolve, in most cases automatically. Subject to certain assumptions on the maximum number of concurrent component failures, the overall system can and will guarantee, however, that updates are never lost once they have entered the system, and that the evolving state of the system will respect the partial causal ordering of distributed events (which defines which updates are conflicts and which are not). Configuration objects and control resources are examples of distributed objects with distributed state subject to these very guarantees (or lack thereof).

Each service must consume control resources specifying its local configuration. A distributed sub-network of configuration and control services is responsible for managing updates to original configuration objects and transforming those objects and other data into control resources. Control services are, in effect, origin servers providing control resources to the rest of the CDN.

A controlled service may get its control resources directly from a control service origin or from an intermediate delivery agent, such as a cache. Which source it uses at any given time will be determined by the controlled service's current configuration (which is based on its past consumption of earlier control resources and may change dynamically). Control resources flowing through a caching network may be subject to invalidation, like all other resources that might flow through a caching network, but control resources are also the means through which instructions about invalidation are communicated to the caching network.

Control Notification Vs. Invalidation

The basic function of the control services network is to provide readable control resources that tell services what their configuration is. It is assumed herein that all services consume their configuration by reading a single root resource intended for them (the binding to which was established by the consumer's initial configuration and identity). The root resource represents a tree of control information containing data or metadata sufficient to lead the service to all other control resources it might need. The transfer of this information from control service to controlled service is the basic function of control notification.

Given that services are identified and registered with the control network in advance, either the controlling service or the controlled service could initiate the transfer of a new root resource. For example, the method may be one where the client initiates a request to a control service on a periodic basis, where the period is established (and changes dynamically) based on the expiration time of the root resource, or on a separate configuration period that is defined somewhere in the control resource tree.

As each service reads and consumes the tree of control resources, it interprets the control tree as a set of updates on its internal state in order to change how it should behave in the future. How this is done, what the control tree looks like, and what internal state is affected may be service specific, though all services must implement control tree evaluation to some degree as described in general terms below. The internal control state representation of the consumed control resource is referred to herein as the working control copy of that resource, though it is not necessarily a contiguous copy of the bytes of the control resource but refers to the effect of "loading" the control resource and thereby modifying the behavior of the service. A service's control tree is the working control copy of its root control manifest combined with all other control information it needs.

Caches are particular examples of content delivery services that store and forward essentially literal copies of resources from origins (or intermediate caches) to clients (which could also be other caches, other content delivery services, or external clients). Cache-invalidation is the marking of such cached literal copies stored locally at one cache for the purpose of affecting subsequent requests for that literal copy by other caches or clients. It does not affect the cache's internal control state unless the cache is also a client of (i.e., controlled by) the very same resource. In fact, a cache may have none, either, or both of the two different images of a given control resource stored in its local state, the working control copy and/or the cached literal copy.

Thus, the basic control notification mechanism determines the flow of updates through control copies, whereas cache-invalidation and other policies defined by the HTTP protocol determine the flow of updates through cached literal copies. The information to implement the latter is tunneled over the mechanism providing the former, using special control resources called invalidation manifests that are embedded directly or indirectly in the tree of control information.

Those of ordinary skill in the art will realize and understand, upon reading this description, that the distinction between basic control notification and cache invalidation is a subtle one, but the mechanisms in effect here are distinct, non-redundant, and dependent—invalidation depends on notification to be able to exist. The control notification mechanism is needed at least for the root of the control tree and may be used for additional levels of information for services that are not caches, and caches necessarily rely on the more basic mechanism for the communication of invalidation commands that represent a subtree of the overall control tree. In addition, control distribution typically involves eager consumption (refresh occurs on notification) of changed resources for a service's own behalf, whereas invalidation involves lazy consumption (resources are just marked for later refresh) on behalf of other clients.

Furthermore, neither caches nor any other controlled service should assume that the delivery mechanism for its control resources involves caches or invalidation. The tree of control information provided by notification ultimately identifies a set of resources in the most general sense, resources that must be consumed by the controlled service, along with a protocol for consuming them. The caches that might be involved in delivery of those resources from their origin to the client are determined based on which caches bind the property containing the resource and on what the results of rendezvous are for the particular client. A cache, for example, should not assume that a control resource it is supposed to consume will be part of a property that it binds (i.e., supports requests for), so consuming it via fills through its own cache may not be appropriate. Granted, nothing prevents a cache service from using its local cache to fill/store resources that it needs but it is not bound to serve to other clients, but this means that the control service will not know anything about the existence of such resources (at least as far as invalidation is concerned), because they are not contained in any bound property of which the control network is aware.

Control Trees and Manifests

Both control trees and control manifests can be considered as hierarchical dictionaries, tables mapping symbolic names (slots) to information about names, where the names have some predetermined meaning to the consuming service. The information associated with a slot in the dictionary could itself be another dictionary, or something simpler (like a number).

An initial configuration of a service specifies a root dictionary (the root control manifest) with a small number of items, and each item provides information about the configuration of the service or specifies a way to get it. The consumption of this initial resource thus leads recursively to the consumption of other resources, ultimately ending the recursion with a set of service-specific subtrees or leaf resources that have purely local interpretations and no unresolved references. At each level, the client requests the referenced information indicated only if the information is applicable to the service and has not already been consumed. The net effect of this absorption process is to update the service's working control copy of all the control resources that govern its behavior. This is how control manifests are transformed into the control tree.

Although the terms "control tree" and "control manifest" are sometimes used interchangeably, a control manifest actually refers to an external serialization of part of one control tree, whereas the control tree for a service instance refers to its internal hierarchical representation of one or more control manifests. Consider the following concrete example of a root control manifest written in one possible language (described later):

```
{
    "agent": 99,
    "control": "C0",
    "@agent-config": {
        "%host": "%(control)s",
        "get": [
            {"%resource": "/agent/%(agent)s"}
        ]
    }
}
```

This is simply a hierarchical collection of name/value settings. Certain nodes in a control manifest (like the node labeled @agent-config above) will be interpreted as symbolic references to other resources whose identities and values are resolved and merged into the control tree dynamically. The full control tree used by a controlled service is the result of constructing an initial control tree representation $T_0$ from its top-level manifest $M_0$ and continuously (periodically) re-evaluating $T_i$, recursively expanding references to referenced manifests $M_0^{(i)}, \ldots, M_{m^{(i)}}^{(i)}$ as they become known and/or change:

$$\varnothing \xrightarrow[init]{M_0} T_0 \xrightarrow[eval]{M'_0 \ldots M'_{m'}} T_1 \xrightarrow[eval]{M''_0, \ldots, M''_{m''}} T_2 \ldots \xrightarrow[eval]{M_0^{(k)}, \ldots, M_{m^{(k)}}^{(k)}} T_k \ldots$$

This process produces a new value of the control tree as a function of the previous control tree and the state of the network, and it enables the service instance to continuously absorb new information from the network as it becomes available. In general, resources incorporated into a control tree evaluation round need not be limited to control manifests originating from control services, but may also include other resources (e.g., from collectors) that are meaningful to the service.

A control tree is defined recursively as follows:

Leaf Rule: If X is a number, string, or otherwise opaque object (an un-interpreted, internal representation of some control resource that is not a control manifest), then X is a control tree.

List Rule: If $X=[X_0, X_1, \ldots, X_k]$, where each Xi is a control tree, then X is a control tree.

Table Rule: If $X=\{N_0:X_0, N_1:X_1, \ldots, N_1:N_k X_k\}$, where each name $N_i$ defines a slot in the table and each $X_i$ is the value of slot $N_i$ for some control tree $X_i$. Also assume there is metadata meta($N_i$) about the value $X_i$ (though this was not shown in the example above).

Only well-formed control trees will be considered here, and additional well-formedness constraints will be defined as needed. The most basic constraint for a useful control tree is to have a non-trivial root consisting of a table. We may also distinguish certain kinds of slot naming conventions and slot value patterns, as well as define different evaluation rules in order to implement pattern substitution and dereferencing of symbolic references. The metadata of interest contained in meta($N_i$) will be related to the expiration or version of the value X, or the identity or name of the object from which that value was retrieved.

Control Slots and Evaluation Rules

In order for control trees to be useful, it must be possible to compute a new control tree from an old one. For that evaluation rules may be defined based on the type of each part of the tree, allowing different structures to be interpreted differently. Slot evaluation is where most of the interesting work is done.

Though it is conceivable to allow different service types to define different evaluation rules, for the purpose of explaining the evaluation process concretely a particular style of slot evaluation will be assumed. In this example three slot types are assumed:

Reference slots: A slot with a name beginning with a single "@" is a reference slot. In an embodiment, its value is a reference instruction table specifying resource retrieval instructions such as protocol, host, and resource path information. These instructions will be used to expand (dereference) the reference and include the contents of the resource in the tree at that point.

Escaped reference slots: A slot with a name beginning with "@@" is an escaped reference slot. Its value should also be a reference instruction (but its dereferencing will be deferred). This is intended for the case where the evaluation of a reference wishes to return a new value of the reference that may be used to retrieve it on a subsequent evaluation round.

Pattern slots: A slot with a name beginning with "%" is a pattern slot. In an embodiment, its value is a string with embedded variable references (where each variable reference has the form % (name)s, where name must refer to a plain sibling or parent slot).

Plain slots: All other slots are plain slots.

Evaluation will be defined relative to an environment (e.g., a table), where the initial environment for a control tree evaluation is empty, and as we descend into a table the set of slot values for that table augments the environment for all slots in that table, and so on, recursively. The notation $T_1 \oplus T_2$ is used to represent the table that results from applying the slot definitions of $T_2$ to override or extend the slot definitions in $T_1$. Also assume a special slot assignment that can be used to delete a single slot, $\{S: delete\}$, and another special slot assignment that can be used to delete all slots, $\{*: delete\}$, allowing $T_2$ to represent either an absolute or incremental update to $T_1$. As a convenience a function mktable(s, X) is defined to return X if X is already a table, or $\{s: X\}$ if X is not a table.

Rules for evaluation eval(E, X) of control tree T with environment E may then be defined in two stages:

$$eval(E,X)=eval_2(eval_1(E,X))$$

Most of the work is done in the first stage, where $eval_1$ expands references that need to be (re)expanded and interpolates patterns, followed by the use of $eval_2$ in stage 2 to translate escaped references into references.

The rules for $eval_1(E, X)$ are:

A leaf node X evaluates to itself.

A list node $X=[X_0, \ldots, X_k]$ evaluates to $[eval_1(E, X_0), \ldots eval_1(E, X_k)]$.

A table node $X=\{S_0\ X_0, \ldots, S_k:X_k\}$ evaluates to $X \oplus Z_0 \oplus \ldots \oplus Z_k$, where $Z_i = evalslot_1(E \oplus X, S_i, X_i)$.

The $evalslot_1$ function provides the slot-type dependent evaluation. Assuming X is well formed based on the requirements of the type of S, the result of $evalslot_1(E, S, X)$ is defined as follows:

If S=@@s is an escaped reference slot, the result is mktable(@@s, X) (no change).

If S=@s is a reference slot, the result is mktable(s, CGET(I)), a table created from the conditional GET of the resource implied by the reference instructions I, where $I=eval_1(E, X)$. This is where the metadata associated with the current value of s is used, compared to the metadata contained in the instruction I, which could indicate that a newer version of the same object, or a different object should be retrieved for the value of slot s. Note that the result of this evaluation could return not just a new value for s but also a new value for other slots (such as @@s for the purpose of changing the reference that will be used on the next evaluation round).

If S=% s is a pattern slot, the result is mktable(s, subst(E, X)), where subst(E, X) is the string resulting from substituting the variables referenced in the pattern X with their values taken from the environment E. The effect of mktable here is to assign the interpolated string as the value of the slot s, not % s.

If S=s is a plain slot, the result is mktable(s, $eval_1(E, X)$). The value of the slot just gets re-evaluated and assigned back to itself.

Finally, to complete the evaluation rules $eval_2(X)$ is defined in order to replace all escaped references with references. The rules for $eval_2(X)$ are:

A leaf node X evaluates to itself.

A list node $X=[X_0, \ldots X_k]$ evaluates to $[eval_2(X_0), \ldots eval_2(X_k)]$.

A table node $X=\{S_0: X_0, \ldots, S_k: X_k\}$ evaluates to $X \oplus Z_0 \oplus \ldots \oplus Z_k$, where $Z_i = evalslot_2(S_i, X_i)$.

The rules for $evalslot_2(S, X)$ are:

If S=@@s is an escaped reference slot, the result is {@s: X, @@s: delete}.

Otherwise, the result is {S: X}.

Tracking Manifests

The reason why control manifests intended for a given service might contain information not applicable to the service is to allow the control network to optimize the delivery of information to a large population of services, where cacheability will depend on the specificity and update frequency of any given resource. The optimal delivery package may be a manifest that contains more than a given service needs but less than what all services need. The issue of cacheability also affects the path through which clients will be told to request resources—sometimes it makes sense to go through the caching network, sometimes it does not.

Invalidation Manifests

Invalidation manifests are examples of control resources that may be referenced in control manifests. They are the means through which caches or other services making use of the invalidation mechanism learn what to invalidate. A cache's control tree will include direct or indirect references to at least all invalidation manifests for properties that are currently bound to the cache (maybe more). Services that are not using invalidation will not have invalidation manifests in their control tree (or if they do, they will ignore them as not applicable).

Invalidation

Introduction

Invalidation is a mechanism through which information stored in a service (information that is used to derive responses to future requests) is marked as no longer directly usable for response derivation, thus indicating that some form of state update or alternate derivation path must be used to derive a response to a future request. Services making use of invalidation consume invalidation manifests delivered via the control distribution mechanism and locally execute the commands contained in the manifest.

A caching service is the typical example of a service that makes use of invalidation. A cache stores literal copies of resources and responds to future requests for the resource using the stored literal copy as long as the copy is not stale. Staleness in this case could be based on an age-based expiration of the original copy that was stored, or based on whether or not the copy has explicitly been invalidated since the copy was stored. When an invalidation command is received with the target of the command already in cache, it suffices to mark the cached copy to implement the command. When the resource is not in cache, or when the command refers to a group of many resources, additional steps must be taken to ensure that a copy retrieved later from some other cache satisfies the constraints of the last applicable invalidation command.

This section (below) defines embodiments of the invalidation mechanism with a focus on its use in cache invalidation. It should be appreciated, however, that caches are not the only service type that could make use of the invalidation mechanism, and stored literal copies in caches are not the only kinds of responses that may be affected. Those of skill in the art will realize and understand, upon reading this description, that if a service instance has stored state that affects the response to a future request, whether that state corresponds to a literal copy of the response itself or some other data from which the response will be derived on demand, and provided that validity is expressible in the form of minimum origin version constraints, then invalidation may be used.

Minimum Origin Version Invalidation

Invalidation manifests implement an approach to invalidation based on origin versions. When content is invalidated via an invalidation command to a configuration service, a minimum origin version for that invalidated content is incremented. Minimum origin version invalidation assumes each origin is a single resource namespace and non-distributed, and all invalidation commands are relative to some origin threshold event at a single origin location. This approach allows invalidation to be defined as the setting of a minimum origin version, where each cache in the system estimates the minimum origin version as content enters from origins.

To see how this works, let each origin have a minimum origin version mov and a latest origin version by in effect at any given time, where mov<boy. The minimum origin version changes as a result of invalidation commands. It should be appreciated that it is also possible to have per resource-group and per resource movs, to enable finer grained invalidations. The by is an origin specific timestamp that needs to change only when successive origin states need to be distinguished, but it can change more often. Each node in the system that receives cache fills from the origin or invalidation commands from outside the system must estimate the corresponding boy. Each peer fill request, invalidation command, or origin fill generates a new lov' for the corresponding resource scope based on the previous by and other information. In particular, on an origin fill use:

$$lov'=\max(lov,\text{clock})$$

where clock is the local clock, and on peer fill requests and invalidation commands set:

$$lov'=\max(lov,mov)$$

where mov is the constraint from the peer fill or invalidation command.

A cache learns initial mov and lov values from its property specific configuration, and learns new values from the invalidation data stream that each cache consumes to detect invalidations.

When a cache requests content directly from an origin server, the origin's updated lov is assigned as the resource origin version rov when the resource is stored in cache and is communicated via an HTTP header whenever the resource is served to another cache. The rov remains as the actual origin version of that copy of the resource wherever it goes until it is revalidated or refreshed. If a cache requests content from another cache, the client cache uses whatever rov the server provides as the rov it stores in cache.

A cache learns the minimum and latest origin versions (per property and optionally per resource or other group level) from its invalidation data stream for the property. To cause an origin level invalidation, a new minimum origin version is established for the entire property. To cause a resource level invalidation, a minimum origin version is established at the level of individual resources or groups of resources in the cache. All resource specific movs may be overridden by a new group or origin level mov, as described next.

A cached resource R is considered stale if the rov of the cached copy is less than the largest of the version minima that govern it, or, in the case of resource-level and origin-level constraints:

$$\text{stale}(R)=_{def}rov(R)<\max(mov(R),mov(\text{Origin}(R)))$$

In general, the CDN may have more than just resource level and origin level invalidations, and have invalidations in terms of arbitrary groups of resources. Each of multiple resource groups $\mathcal{G}(R)=G_0, \ldots, G_k$ could provide a minimum version constraint on each resource in the group, where G0 is the resource itself, $G_k$ is the origin, and $G_1, \ldots, G_{k-1}$ are other groups or expressions in between that contain R. This results in the generalized form:

$$\text{stale}(R)=_{def}rov(R)<\max\{mov(g)\|g\in\mathcal{G}(R)\}$$

Ignoring expressions for the moment, and considering only configured resource groups, the cache would simply have to maintain a lattice of group labels per origin that is part of the corresponding property's configuration, and each resource would be directly associated with one or more groups as defined (which could be computed dynamically based on anything about the request or response, not just the URL). The set of groups $\mathcal{G}(R)$ would then be the transitive closure of the parent group relation, and the staleness rule above would apply to that set of groups.

Ground Vs. Group, Cached Vs. Uncached

An invalidation command specifies an mov and some resource descriptor that identifies a single resource or group of resources that may or may not currently be in cache. The handling of the invalidation command may need to be different depending on whether it refers to a single cached resource or a group, and whether or not the identified resources are currently in cache.

It is assumed here that it is possible to syntactically distinguish invalidation commands based on whether they specify individual resources or groups of resources (that may consist of zero or more resources). A ground resource specifier identifies exactly one resource by name, whereas a group resource specifier identifies a group of resources by some set of constraints (on the name or other properties of the resource). Thus the set of resources identified by a group is not necessarily known in advance, but for any specified resource (or request for a resource) it is known whether it is a member of the group (i.e., what is known is a method for testing whether or not any given resource is a member of the group).

Group invalidations may need to be handled differently than ground invalidations because they may affect a large number of resources and the information stored in the cache may be insufficient to determine group membership. In such cases it may be preferable to evaluate group membership on demand as opposed to walking the caching and marking entries (that may never be requested again) at invalidation time. Invalidations for uncached resources are special because, by definition, there is no cache entry available to be marked. A ground invalidation applies to a single resource that is either in cache or not, but a group invalidation may apply to some resources in cache and other resources not in cache.

Safety and Accuracy, Invalidation Vs. Implication

When an invalidation command is processed by a cache, the effect of the invalidation command must be captured in a permanent way, such that all subsequent behavior of the cache is consistent with the constraint imposed by the invalidation command. This applies whether the command is ground or group, and whether the resources identified are in cache or not. It also applies regardless of how many times the identified resources enter and leave the cache after the identifying invalidation command was processed.

Assuming safety is a requirement (within the physically achievable limitations), and assuming there is a continuously varying stream of invalidation commands from multiple command sources identifying a continuously growing population of resources, there is a tradeoff to be made between avoiding unnecessary refreshes (accuracy) and storing an unbounded amount of information (cost). In other words, the system might store less information but as a result need to refresh more often in order to remain safe.

In particular, one possible side effect of handling invalidations for uncached resources is that it may be desirable to expand the scope of the invalidation in order to ensure the effect persists indefinitely without expecting storage to grow without bound or to grow in proportion to the size of the invalidation distribution network. As used herein, the correct processing of an invalidation command I may invalidate some resources as well as implicate a possibly larger set of resources, including but not limited to the invalidated resources. The (strictly) invalidated resources Inv(I) are those resources that were intended to be invalidated by the semantics of the command, and the implicated resources Imp(I) may additionally include resources that were not intended to be invalidated but were refreshed before their time due to the limited accuracy of the invalidation mechanism.

Thus, the safety requirement for an invalidation mechanism can be restated as the following assertion for any invalidation command I:

$$Inv(I) \subseteq Imp(I) \qquad 5$$

and the accuracy goal is:

$$Inv(I) \approx Imp(I)$$

Ideally, the implicated set is at least as big as the invalidated set, but no bigger.

The Effective mov

The effective mov of a requested resource in cache is the maximum mov of all mov constraints that apply to, or implicate the resource in question, including but not limited to the resource-level mov. Depending on the invalidation mechanisms implemented, this could be some combination of mov values tracked in multiple places (e.g., for resource groups that contain the resource in question). The resource in cache is valid if $rov \geq mov_{effective}$. If not, an origin or peer fill must be done (depending on policy), and if a peer fill is done, the mov constraint is based on the $mov_{effechve}$.

Methods for Invalidation of Uncached Resources

There are a number of possible ways to handle the invalidation of uncached resources. The approaches discussed below are all safe mechanisms that differ in accuracy and storage requirements. To illustrate the differences in accuracy that result from different implementation strategies consider two general models of implication are considered, with and without command tracking. Certain connections to the implementation of group commands are deferred to a full discussion of group (expression) based invalidation.

Figure 30A:
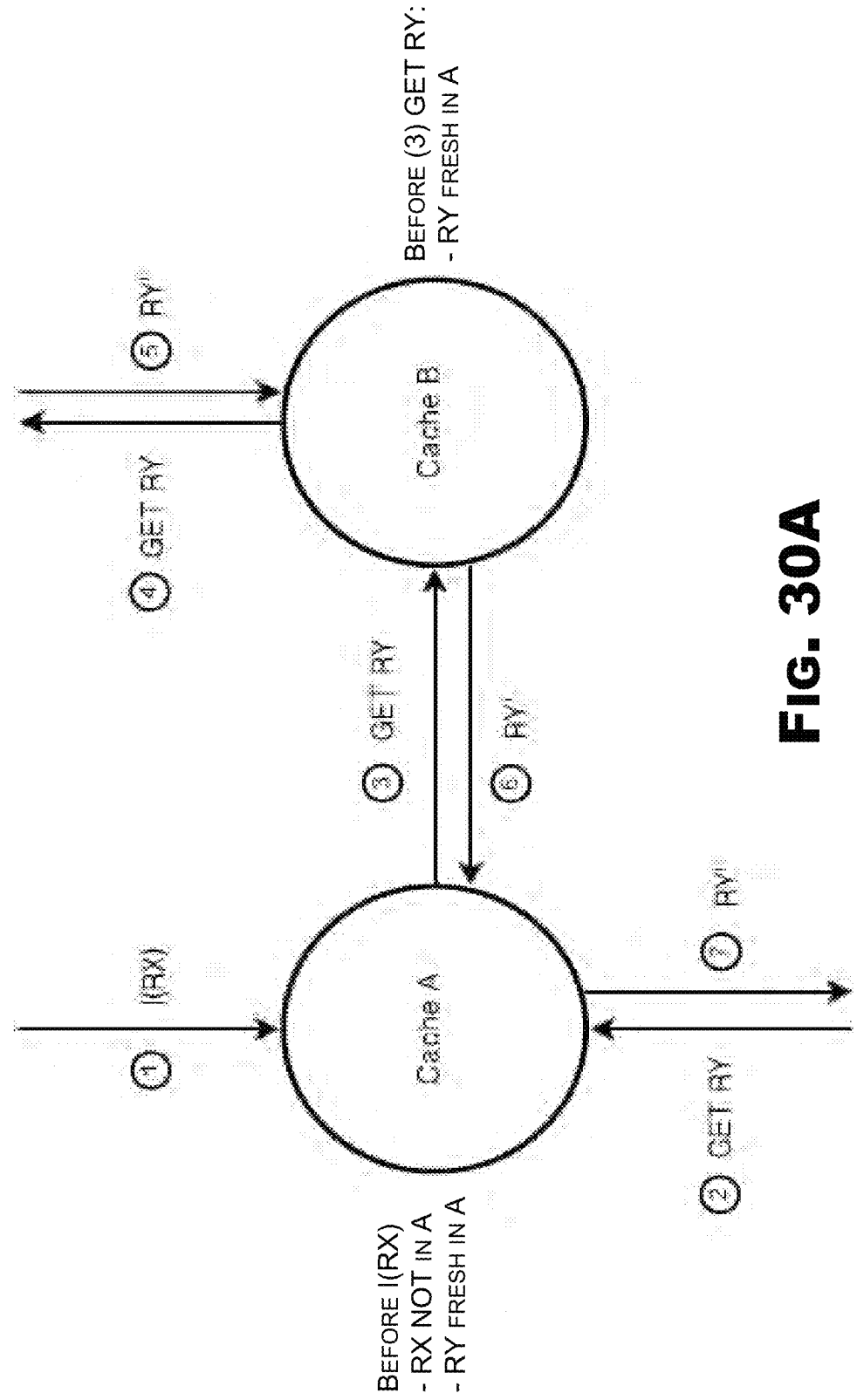

Consider the diagram in FIG. 30A showing the following sequence of events:

1. Cache A receives a ground invalidation command implicating a resource RX that is not in A's cache. Before this command was received there was another resource RY≠RX that was in cache and considered fresh at cache A.
2. Some client requests resource RY from cache A. Depending on how
A processed the invalidation command, it may have implicated resources other than RX that it does have in cache, such as RY. Assume RY was implicated, and is therefore (conservatively) considered stale by cache A.
3. Cache A then requests RY from cache B, communicating some information about its expectations to B (which were derived from I(RX)). Cache B uses these expectations to decide if its copy of RY (previously considered fresh in B) can be returned to cache A, or whether it needs to refresh. In this case, it also considers RY implicated by the constraints in the peering request, and must therefore be conservative and consider it stale.
4. Cache B requests a fresh copy of RY (RY') (e.g., from the origin).
5. The origin returns RY'.
6. Cache B returns RY' to cache A.
7. Cache A returns RY' to the client.

In this example, fresh copies of RY at both caches A and B were passed over and refreshed due to RY being implicated by an invalidation directed at the uncached resource RX.

Figure 30B:
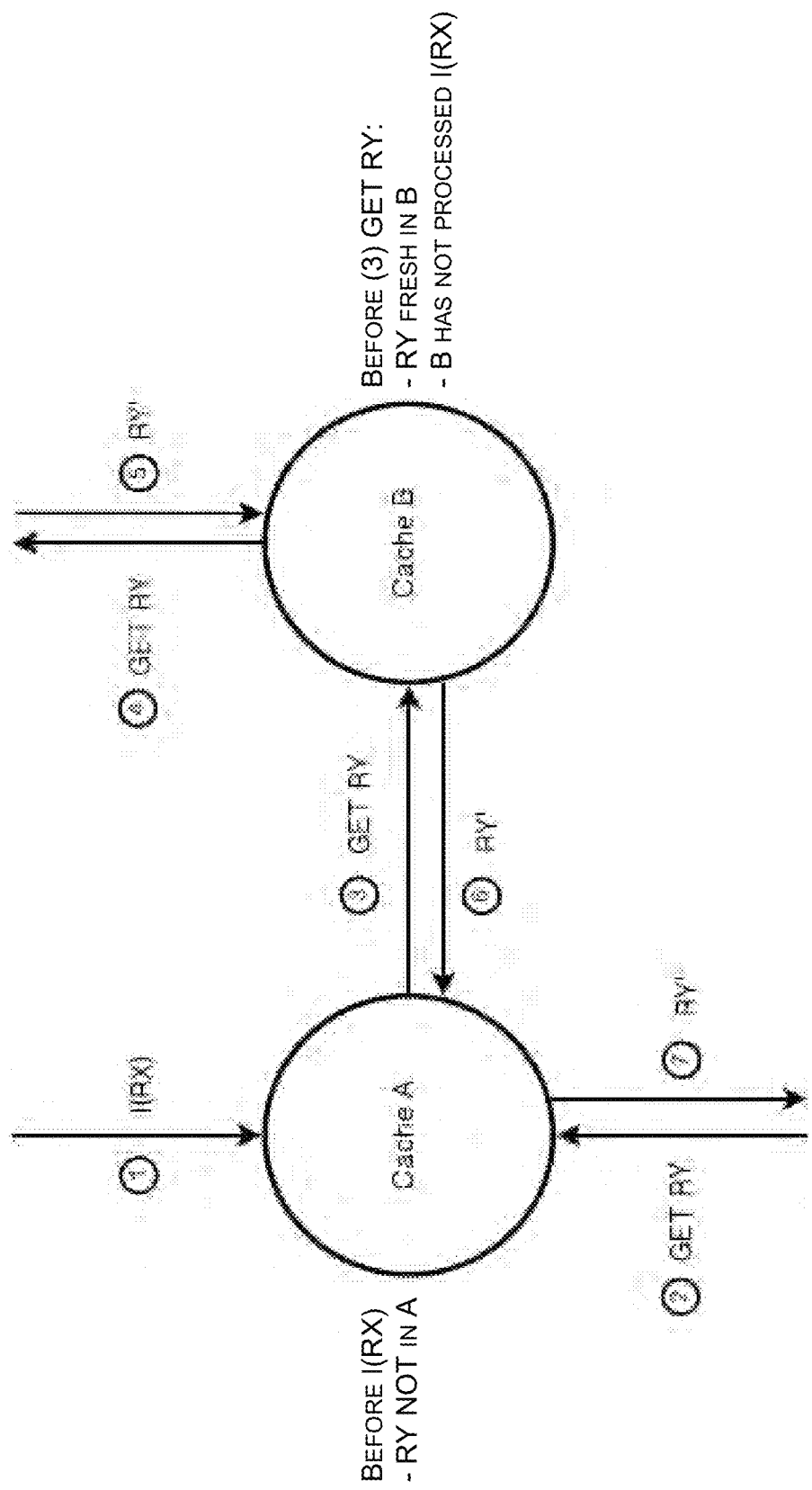

Now consider a slightly different scenario where invalidations are tracked via command tracking at some predetermined level of grouping (e.g., per property). In this case, assume RY is in cache A and B prior to the invalidation command being received at A, and assume the invalidation command affects RX but not RY (and both are in the same property group). With reference to FIG. 30B:

1. Cache A receives a ground invalidation command I implicating only a resource RX (in this case the system does not care whether RX is in cache or not). Before this command was received it was assumed that resource RY was not in cache at A, where RY≠RX. Since command tracking is being used, RY is not implicated by I(RX).
2. Some client requests resource RY from cache A.
3. RY is not in cache A, so A requests it from cache B, specifying the constraints for use in invalidation command tracking.
4. Cache B notices that, since it has not processed command I, its otherwise fresh copy of RY must conservatively be assumed stale. Cache B therefore requests a fresh copy of RY (e.g., from the origin).
5. The origin returns RY'.
6. Cache B returns RY' to cache A.
7. Cache A returns RY' to the client.

In this example, a fresh copy of RY at cache B was passed over and refreshed due to RY being included in the same invalidation tracking group as RX, and since cache B was behind cache A for that group.

Those of skill in the art will realize and understand, upon reading this description, that variations on either or both of these two scenarios may occur in just about any method, and that accuracy (avoiding unnecessary conservative refreshes) may be increased by adding storage. The following seven methods that make different storage/accuracy tradeoffs are discussed here:

1. Cache entry method (always store a cache entry);
2. Treat ground invalidation of an uncached resource as a group command;
3. Maintain an auxiliary data structure indexed by the hash of a resource;
4. Command tracking at the property or resource level;
5. MOV-based command tracking (property level);
6. MOV-based command tracking with synchronization (property level);
7. MOV-based command tracking with synchronization (approximate resource level).

Cache Entry Method

The most accurate and least space efficient way is to always generate a cache entry (empty if necessary) to hold the mov constraint associated with the invalidated resource. This stub resource can be deleted if the property-specific mov exceeds the resource-level mov. When cached objects are evicted from cache a stub for them must be retained if there was an invalidation implicating it since the last property-level mov update. The set of resource entries in this method grows with the total number of unique resources invalidated since the last property-level mov update, so additional measures may be needed to deal with this effect, and these measures could implicate additional resources.

Treat Ground Uncached as a Group

Similar to the cache entry method, the ground command may also be treated as if it referred to a group that identifies exactly one resource, and process it with all other group commands (as described later). This has storage and accuracy properties similar to just storing an empty cache entry, but provides a different way to age the effect of the command out of the cache, which in turn implicates additional resources in a different way.

UCMOV Method

Another way is to maintain an auxiliary data structure, e.g., an array called UCMOV (uncached mov), capturing a conservative mov value to use for all uncached resources. The value of UCMOV[i] is maintained such that all resources hashing to location i have had an invalidation constraint implicating them that is less than or equal to UCMOV[i], and then UCMOV[i] is used as a group mov that applies to all uncached resources hashing to location i.

This satisfies the effect of invalidation commands, but implicates unintended resources. Whenever an invalidation command I is processed for a ground resource R (not an expression) and the resource is not cached, update the conservative mov for one entry in this data structure as follows:

$$UCMOV[hash(R)] = \max\{mov(I(R)), UCMOV[hash(R)]\}$$

Then, when a resource is requested that is not in cache, the mov constraint used for that resource is UCMOV[hash(R)], and we are guaranteed that:

$$UCMOV[hash(R)] \geq I(mov(R))$$

In the extreme case where UCMOV has one entry, this is equivalent to using the maximum mov seen in any invalidation of an uncached resource for the mov constraint used for all uncached resources. This allows us to trade off storage against accuracy (a larger UCMOV array implicates fewer additional resources with each update since fewer resources hash to the same location, so a larger UCMOV increases accuracy).

When resources are deleted from cache, the state of their invalidation constraints must be rolled back into UCMOV as follows:

$$UCMOV[hash(R)] = \max\{mov(R), UCMOV[hash(R)]\}$$

The use of this UCMOV data structure is equivalent to providing an additional group command I(hash(R)) with each ground invalidation I(R), but handles the application of these special group commands differently from other group commands. There is no need with a UCMOV to collapse commands over time, the storage overhead is fixed.

Command Tracking

The known and seen tokens of coherent peering provide a means to deal with invalidation of uncached resources. This is a concrete form of command tracking, and could be used to eliminate the problem discussed earlier in FIG. 30B if it were applied at the resource level. When applied at a higher group level it will necessarily have the effect, as illustrated in FIG. 30B of conservatively implicating fresh resources when the server is behind the client in invalidation command processing. However, command tracking requires maintenance of invalidation-source based vector clocks for all invalidation sources, something that is difficult to scale, especially when applied at the resource level.

MOV-Based Command Tracking (Property Level)

It is possible to combine command tracking's unique benefits for uncached resources with some additional facts about movs and invalidation command sources in order to minimize the growth of command tracking information that needs to be maintained.

Let each cache also maintain an mov per invalidation command source that it has ever seen, per property. Call this the source level mov, or soy. Assume that, with respect to a given source of invalidation commands (a control node), invalidation commands are delivered in order and with non-decreasing mov constraints.

Each time an invalidation command from a particular source is received, the local soy for that source is changed to the maximum of the last soy and the mov of the invalidation command (per property). If the property-level mov ever exceeds the soy for a source for that property, that source's entry can be dropped from consideration until another invalidation command is received from that source.

Whenever a fill is requested from a peer because of an uncached resource, a set of constraints must be computed based on the local soy values, the property level mov, and any applicable group movs, and these constraints must be specified in a request header to the peer. Only those soy constraints that are both greater than the effective mov of the uncached resource need to be communicated. The effective mov should also be provided.

If the server has the resource in cache and has processed all the listed sources through at least the listed sovs, then it can assume the sovs' effects, if any, have been applied to the resource in cache and are reflected by the stored mov. It can then make its freshness decision based on the supplied mov constraint for the resource and its own effective mov for the resource.

This provides the benefits of command tracking for uncached resources in a more scalable way, thus avoiding the problem of FIG. 30A but still suffering from the problem shown in FIG. 30B.

MOV-Based Command Tracking with Synchronization (Property Level)

The next change may be arrived at by realizing that, for the problem illustrated in FIG. 30B, the constraints provided in the previous method can be used to catch up with invalidations for those sources which are known to have invalidation commands not yet processed. The invalidation commands that the receiving cache knows it has not processed yet (but the client has) can be requested from the invalidation command source, using the last soy as the point to start from. The catch-up processing is work that would be performed anyway, and performing it proactively allows the system to confirm whether certain resources are implicated or not by missed commands.

In cases where the source in question is not reachable it may still be desirable to conservatively assume that its invalidation commands processed by our client affect the resource the client is asking for, and refresh it.

MOV-Based Command Tracking with Synchronization (Approximate Resource Level)

Both of the previous solutions do command tracking at the property level. The use of sovs prevents the source list from growing without bound, but since sovs are tracked at the property level, caches do not know which resources are affected by a given command state and this leads to the need for conservative refreshes as shown in FIG. 30B. Note that this is only a problem for resources that are not in cache, because there is resource level mov information for entries that are in cache.

To improve the resolution of command tracking for uncached resources, the system may apply a technique similar to the UCMOV data structure. Instead, maintain a UCSOV array that is indexed by hash(R) and stores the most recent command state that affected any resource with that hash. In this case, the stored command state would be a list of sources and their soy values, together with an mov for the overall group mapping to index hash(R).

Thus, when a cache fills from a peer due to an uncached resource, it uses UCSOV[hash(R)] trimmed by any other mov constraints implicating R as the constraint it communicates to the peer. This command state is in general older than the most recent command state, so it is in general more likely to be achieved by the peer, and less likely to force a conservative refresh. The peer uses its own UCSOV[hash(R)] to determine whether or not it has processed enough commands to satisfy the request from its cache. If not, it attempts synchronization or simply fills.

Finally, the processing of a ground invalidation command now needs to update the value of UCSOV[hash(R)] to be the command state at that point, regardless of whether the resource is cached or not. Group command processing is unchanged, however—it is neither feasible nor necessary for a group command to update UCSOV for all values of hash(R) where R is a resource contained in the group. The effect of group commands on the effective mov is handled separately and in addition to soy processing.

Groups and Expressions

A group is a collection of resources defined by intension, i.e., by some set of constraints over the set of possible resources (as opposed to a definition by extension, which involves an explicit listing of resources).

The approaches described here use patterns and pattern matching. As is well known, a pattern language may be used to express patterns. Different pattern languages define different grammars for representing patterns. Some pattern languages may also express operations and interactions to be performed when patterns match (or do not match). Some pattern languages use so-called metacharacters. As used herein, a glob pattern language is any pattern language where the "*" metacharacter is used to match any sequence of characters, although other metacharacters may also exist. A glob is a pattern written in a glob pattern language. A *-glob (star glob) pattern language is a glob pattern language with only the "*" metacharacter and literal characters. A *-glob (star-glob) (or *-glob pattern) is a pattern written in a *-glob pattern language. It should be appreciated that the system is not limited in any way by the pattern matching algorithms or languages used or described herein. Nor is the system in any way limited by the particular language or program used to implement the patterns or pattern matching (or related operations) described herein. In particular, it should be appreciated that regular expressions or glob patterns defined on the request URL are just some of many possible ways to define groups. Those of skill in the art will realize and understand, upon reading this description, that different and/or other ways of describing groups are contemplated herein.

As used here, "resource" means a (potentially) cached response to a particular request, so theoretically any attributes of the request or the response may be considered to define a group. An actual implementation of a resource group based invalidation system might impose additional constraints on how groups can be defined for efficiency, but such constraints need not be imposed at the architectural level.

A group may be defined to be a set of constraints on the values of named attributes of the resource (where it is assumed to be clear in the naming of the attributes whether it applies to the request or the response). The set of resources that are members of the group is the set of all possible resources (cached or uncached) that satisfy all of the attribute constraints. In general, the constraints may be treated as an "and/or" tree of constraints over attributes. However, for simplicity of explanation, the constraint set may be considered as a flat conjunction of simple constraints on individual attribute names. Although it is possible for resource origins to declare specific named groupings in advance, this is not required in order to be able to use group-based invalidation. Groups can simply be mentioned as needed as arguments to invalidation commands.

Thus an invalidation command I(mov, $\mathcal{G}$) can be specified by a mov constraint and a constraint set $\mathcal{G}$. The denotation $[[\mathcal{G}]]$ of the constraint set $\mathcal{G}$ is the set of all resources that satisfy all of the constraints in $\mathcal{G}$. This leads to the following interpretation:

$I(mov, \mathcal{G})$=ensure $rov(R) \geq mov$ whenever $R$ in $[[\mathcal{G}]]$ where:
$R \in [[\mathcal{G}]]$ if and only if ($\forall c$ in $\mathcal{G}$)(c(R))
Some examples are provided here:
A command to invalidate everything specifies just an mov constraint and lists an empty set of additional constraints on the resources to which it applies (so it applies to all resources for the property):
{rov≥mov, Ø}
A command to invalidate a resource with a specific URL:
{rov≥mov, {url="http://foo.com/index.html"}}
A command to invalidate all resources that match a glob pattern:
{rov≥mov, {url≈$_{glob}$ "http://foo.com/*.jpg"}}
A command to invalidate all resources that match a regular expression:
{rov>mov, {url≈$_{rex}$ "http://foo.com/[0-9]+.*\.jpg"}}
A command to invalidate all varied responses on User-Agent where the agent was a certain browser:
{rov≥mov, {Vary≈$_{contains}$ "User-Agent", User-Agent≈$_{contains}$ "MSIE 10"}}

Note that the UCMOV data structure described earlier may be replaced with a group constraint. When a specific resource R is invalidated, the following group constraint may be entered:
{rov≥mov, {hash=hash(R)}}
and then rely on the fact that earlier group constraints with lesser movs on the same hash bucket will be subsumed by this one (or this one will be ignored, if it is subsumed by another command with a greater mov). As mentioned earlier, however, it still might be useful to separate the handling of the two kinds of constraints, and preserve the UCMO V array as an optimization. The choice of attribute names and the expressiveness of the value constraints have performance implications (discussed below).

Safety and Exactness of Group Handling

The safety requirement in this context is that once a cache has processed an invalidation it must respect the invalidation indefinitely in terms of how it services all resources that are implicated by the command. The effect of the command must persist in the cache indefinitely, regardless of how often implicated resources come and go.

There is a fundamental tradeoff that must be made here between implementing this exactly (i.e., achieving the safety requirement but never invalidating resources that are not implicated by an invalidation command), and implementing it efficiently, because an exact implementation requires unbounded storage, and an implementation with bounded storage is necessarily inexact. The only possible alternatives are to relax the safety constraint or use a safe but inexact solution.

Relaxing the safety constraint would relieve the cache of respecting the effect of certain invalidation commands past a certain period of time. This is not unlike the effect that ensuring the safety constraint has on the effective average time to live of items in the cache (assuming bounded storage).

Assuming again that ensuring safety is a requirement, only generalizations that achieve the safety objective with a bounded amount of storage are considered. The storage bound rules out trivial and unhelpful generalizations where the new group is defined to simply be the disjunction of the original groups. If the number of groups is unbounded, this kind of generalization also has unbounded size and is not helpful because the size of a specification with an unbounded number of groups is itself unbounded, so it is preferable to discard some information in order to bound the storage requirements. Discarding this information from the group specification has the effect of expanding the extent of resources impacted by the group, eventually reaching the entire cache (assuming a sufficiently variable and continuous stream of invalidation commands), which is what leads to a bound on the average time to live of cached resources.

Figure 30C:
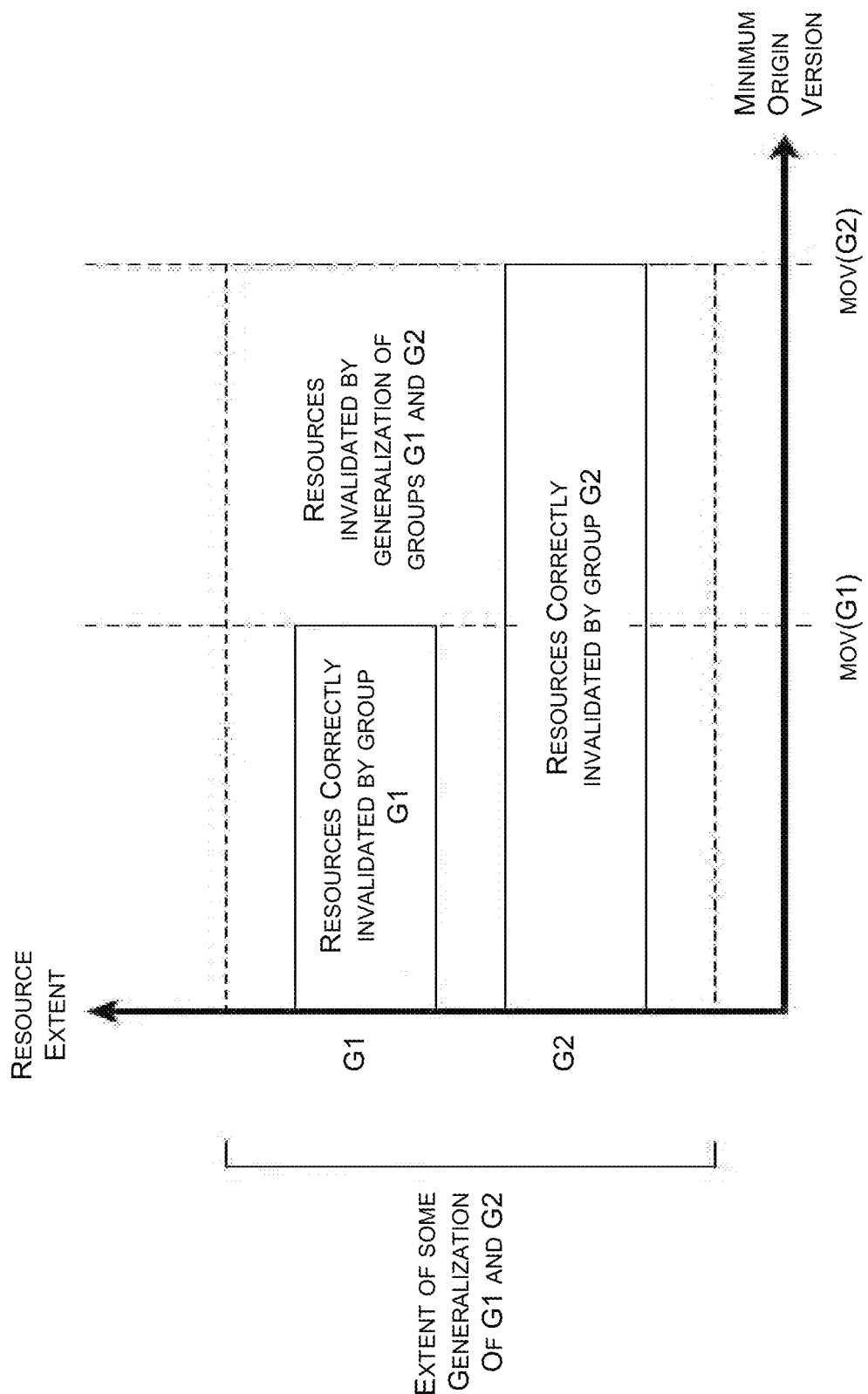

The way to safely but inexactly implement group based invalidation is to transfer the mov constraints of old invalidation commands to be constraints on larger and larger population of resources that are guaranteed to include the originally implicated resources, thereby ensuring safety but invalidating additional resources, but allowing us to forget the old invalidation commands As shown in FIG. 30C, inaccuracies due to generalization arise in both the resource extent dimension and the mov dimension.

Efficiency of Group Handling

A simplistic approach to computing the effective mov takes time proportional to the length of the list of groups that are outstanding, where a groups are outstanding if they have mov constraints that are greater than the mov constraint of the property as a whole. When the property level mov constraint advances, all outstanding groups with lesser movs can be discarded. But the property itself can be thought of as just another group, a group that anchors and subsumes all other groups, and whenever an invalidation command relative for one group (property level or otherwise) subsumes another group and has a greater mov, the subsumed group can be deleted from the list. It is not necessary to always know if one group subsumes another, but it will be useful to be able to handle certain cases.

A requested resource must be compared with each applicable group (that defines a greater mov) to determine which groups match, and the max of all their movs is taken as input to the effective mov calculation. To mitigate the effect of this processing on request handling time, a couple of strategies are possible.

First, if the request is for a resource for which there is also a cached entry with a mov constraint, then only those groups that define larger mov constraints need to be consulted, because they are the only groups that can change the ultimate effective mov.

Another strategy is to note that the group list needs to be consulted only if it has changed since the last time this resource was compared against the group list. The cache entry for the resource can store the effective mov and a purely local sequence number for the group list (such as the lov of the property at the time the group command was inserted, which is referred to as the group lov, or glov). On a subsequent request with the resource still in cache, the group list needs to be consulted only if it has changed, only the changed part needs to be consulted, and only those entries with sufficiently large movs need to be examined.

Another strategy is to have a mov that applies to all groups (but is separate from and greater than the property level mov). If the size of the group list exceeds a configurable threshold, the size can be reduced by advancing this background mov and deleting all outstanding group constraints that are less than that mov. This maintains safety and reduces the size of the list at the cost of some extra refresh fills.

Figure 30D:
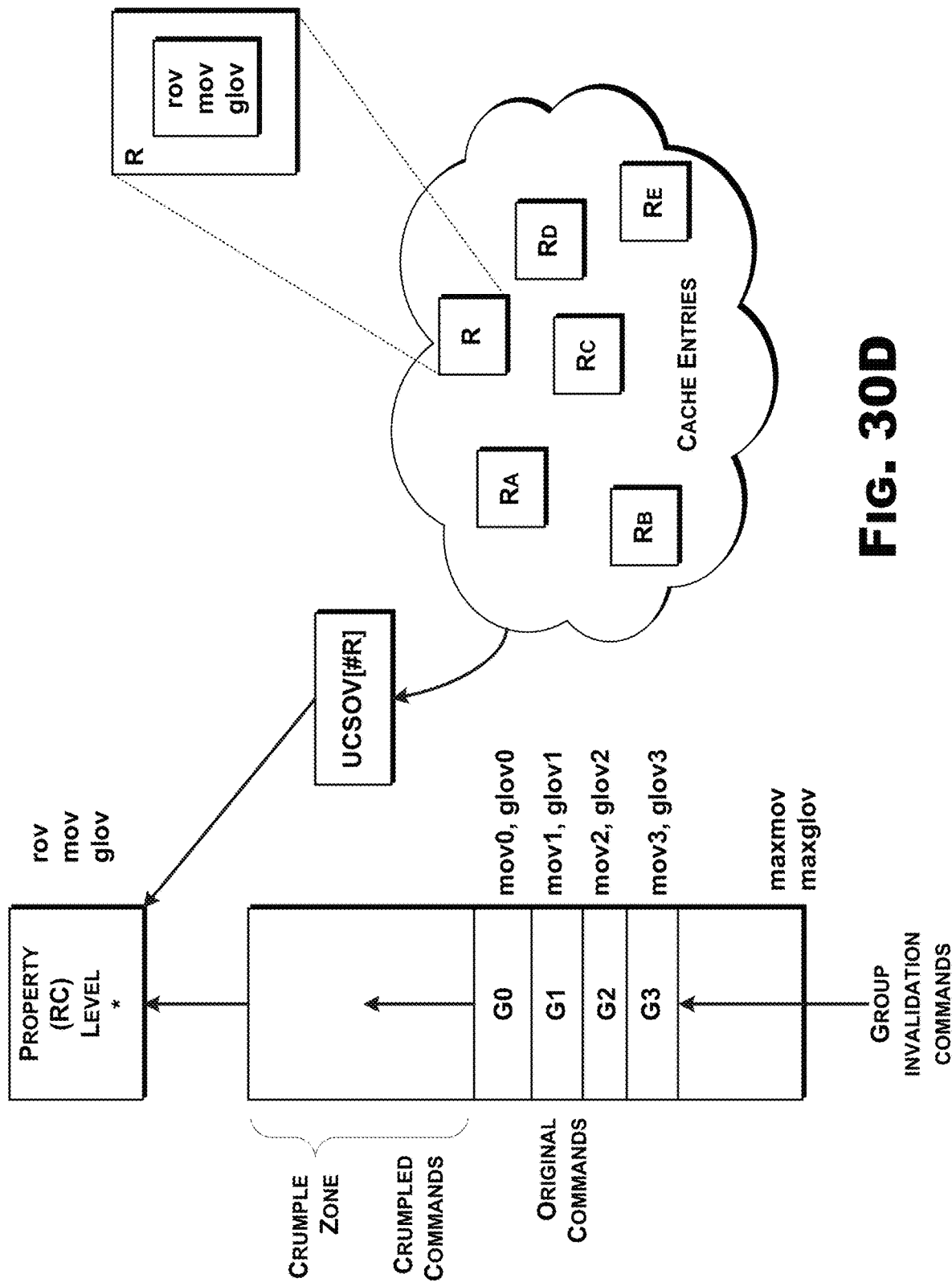

The most general strategy is to be able to collapse two or more old groups down into a single group that subsumes the older groups with an mov that it at least as large as any of the older movs, and to apply this strategy as needed to fit the invalidation command list into some limited space. This turns the oldest part of the invalidation command list into a "crumple zone," an area in which commands may be crumpled together if needed to stay within the allocated space. Combining this with the UCSOV approach for command tracking results in the approach shown in FIG. 30D. The next section describes what happens in the crumple zone in more detail.

Crumple Zones

Using crumple zones, invalidation commands may be inserted into a mov ordered list (there may also be a separate list ordered by time of arrival), and once the length of the list passes a certain threshold, the tail of the list is subject to being crumpled. Crumpling takes the oldest entry in the list, chooses an earlier entry in the crumple zone to crumple it with, and replaces the two commands with one, repeating the process as necessary until the length is reduced by some configurable amount.

With reference now to FIG. 30E, in step 1 the command list has plenty of space. By step 2 the area of original groups is full and there are commands (C0, C1, C2) overflowing into the crumple zone (but no crumpling has occurred yet). In step 3 the crumple zone hits a threshold and C0 is crumpled with C3, creating a new command C3' as shown in step 4. In this example, the new crumpled command masks an older command because it just happens to be the same as C2, so in step 5 delete command C2. Continue by crumpling the new oldest command C1 with C4 in step 6, creating a command that specifies the group "*" in step 7. This corresponds to the property level group and masks all older commands, and these commands are deleted, resulting in the state shown in step 8.

Crumpling commands requires two steps, a canonicalization step and a generalization step.

Multi-Attribute Invalidation and Crumpling

The extension of both invalidation commands and crumpling operations to the multi-attribute case is straightforward. If a single-attribute invalidation command identifies a resource or group of resources by a constraint on the value that one particular attribute must satisfy, then a multi-attribute command simply specifies a constraint for each of several attributes. A resource is implicated by a multi-attribute command if it is implicated by all of its constraints.

Crumpling of a group of multi-attribute commands is then defined as taking a subset of the intersection of attributes mentioned in all commands, crumpling the single-attribute constraints for the chosen attributes, and taking the maximum of the mov constraints.

Constraint Languages, Canonicalization, and Generalization

For many applications of invalidation, constraints expressed as patterns over strings will be adequate. Other, more general constraint languages than string patterns, are however contemplated herein, and canonicalization and generalization operations may be defined for the languages.

For example, the implicit handling of $mov$ constraints above is an example of a simple constraint language over version numbers, where each constraint states that a version must be greater than or equal to some constant. Canonicalization in this case is trivial, because all constraints have one form, rov≥M. The generalization of two mov constraints rov≥M1 and rov≥M2 is to simply to take the maximum, resulting in rov≥max(M1, M2).

For other numeric attributes, and for other data types in general, other constraint languages may be defined with their own canonical forms and generalization rules, and the invalidation mechanism can make use of them. In the next two sections, however, we focus on the example of canonicalization and generalization of constraints based on string matching Those of skill in the art will realize and understand, upon reading this description, that the system is not limited by the specific string-matching implementations described or by any examples provided.

Canonicalization Via *-Glob Translation

For constraints that are expressions on strings, the initial constraint specified in an invalidation command might be expressible in various languages, including regular expressions or globs. In order to be able to process and compare expressions, all string constraints will eventually be converted in the crumple zone into more general constraints that are *-globs, where a *-glob is defined to be a glob expression containing only constant characters and any number of instances of the "*" metacharacter (each of which matches any number of any character).

The translation to a *-glob must guarantee that all strings matched by the initial expression are matched by the translated expression, but there may be strings matched by the translated expression that are not matched by the initial expression. The goal of the translation is to canonicalize the language and produce an expression that has a length bounded by some configurable maximum length.

The translation of some expression e to a canonical *-glob proceeds as follows:
Translate all non-constant regions of the expression e to stars, combining adjacent stars into a single star ("*").
while length(e)>maximum and the number of stars >1:
  Replace the first contiguous constant string between two stars with a single star.
Now, either length(e) is less than the maximum (in which case the process is done), or the length is still too long but just one star is left.
Remove chop(length(e)−maximum, length(x)) characters from the star-side of the longest string constant x to the right or left of the star.
If length(e)>maximum then remove chop(length(e)−maximum, length(y)) from the string constant y on the other side of the star, where:

$$\text{chop (need, have)} = \begin{cases} \text{need} & \text{if have} - \text{need} > \text{MIN}, \\ \text{have} - \text{MIN} & \text{otherwise} \end{cases}$$

This assumes maximum≥1+2×MIN and is designed to take information out of the middle of the expression and retain information on the edges, where MIN is the minimum amount of a constant prefix or suffix that will be retained on the edges of the expression.

Generalization Via *-Glob Alignment

Now, equipped with canonical *-globs in the crumple zone of some maximum length, periodically need to take two globs and determine their generalization. This can be viewed as a sequence alignment problem and solved using the usual dynamic programming technique. This requires $O(n^2)$ time and space, where n is the length of an expression, and that is the reason for the maximum length in the translation described above. If the alignment cost function aligns only characters (including the "*" [star] character) that match exactly, and gaps in the alignment are translated to stars, then a generalized expression from the minimum cost alignment may be determined. This is done by following the alignment path and emitting the character for each exact match and emitting a single star for each contiguous set of gaps in the alignment, then collapsing multiple contiguous stars down to one.

Figure 30F:
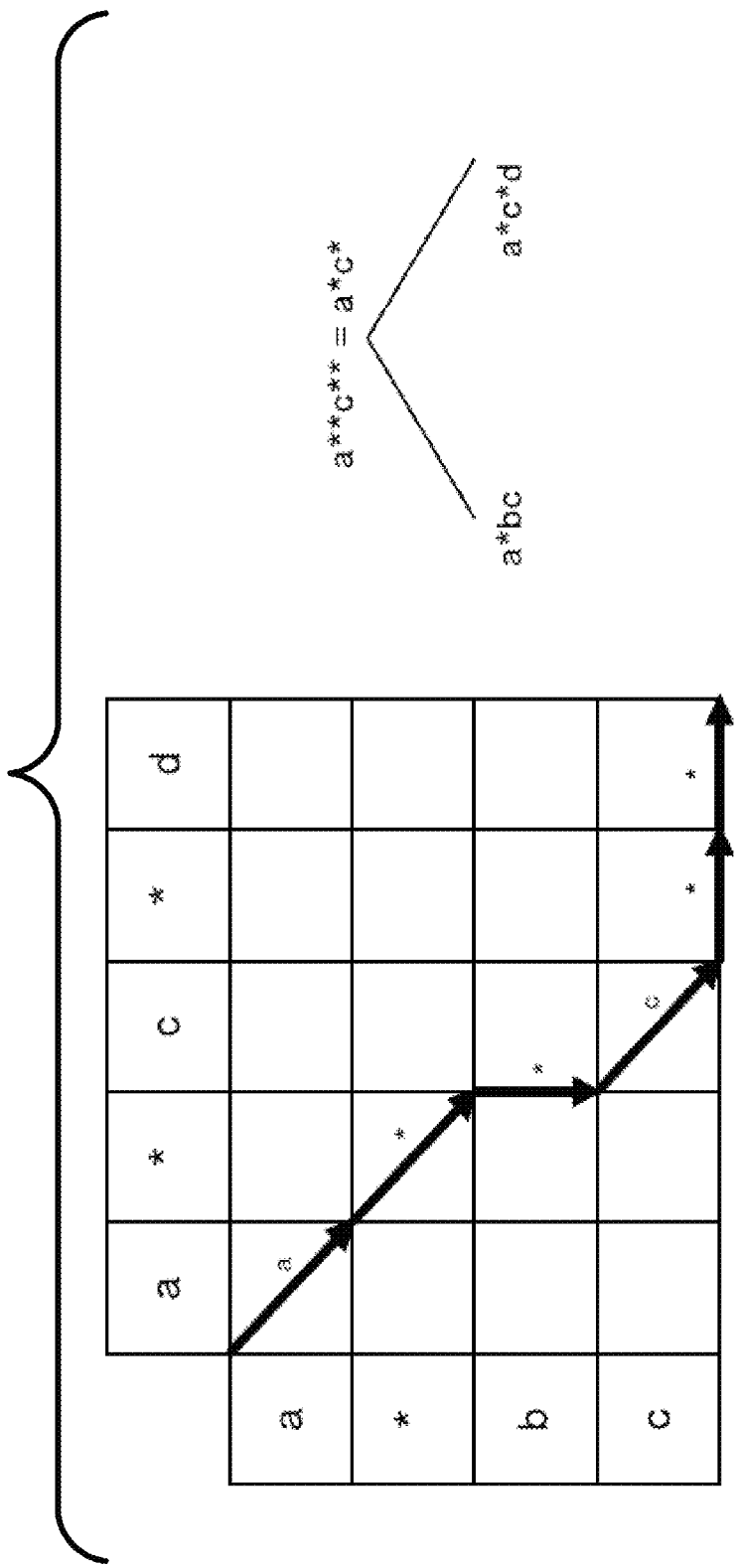

As an example, FIG. 30F shows glob alignment of "a*bc" with "a*c*d".

To bias the alignment to prefer matching material at the edges over material in the middle, the cost function may be biased such that matches take into account the position of the characters in their respective expressions relative to the edges.

Invalidation Command Affinity and Protection

The crumpling of commands has the effect that resources not implicated by any of the original commands may be implicated by the crumpled version. The extent of this expansion of the implicated resource set may be more or less severe, depending on the nature of the commands involved. Affinity captures the notion that it is preferable to combine similar commands together, and protection deals with the case that some commands should remain uncombined longer than others.

Affinity provides a static grouping mechanism. Affinity groups constrain how invalidation commands may be grouped and crumpled, but they do not directly define resource groups per se.

Let there be a set of affinity groups defined per property with symbolic names. One special affinity group is defined for the property as a whole (and has no parent group), and all other affinity groups are defined with exactly one other parent group. Affinity groups other than the property level group are optional.

Now, only commands of the same affinity group may be crumpled together.

The affinity group of an invalidation command could potentially be computed in some predetermined way from the command itself, but assume here that it is assigned by the submitter or the mechanism that submits the command to the system. The crumpling mechanism is free to further restrain itself by using other information gleaned from invalidation commands (such as constraint prefixes) in addition to the information provided by affinity groups.

Protection provides a means to throttle the crumpling mechanism. Each invalidation command can be assigned a protection value, a number in the range [0, 1] that maps to how long the command will remain uncrumpled relative to some configured time interval for the property. A protection of 0 is the minimum protection (gets crumpled earliest) and 1 is the maximum (gets crumpled the latest). At some point, assuming safety must be ensured with a bound on the invalidation command list, and assuming invalidation commands keep coming, all stored invalidation commands get crumpled down to a constraint that implicates all resources, which in effect moves the property level mov forward and thus affects the average TTL of all cached resources in the property.

These two factors modulate the behavior of the invalidation system in cases where there is room to maneuver, they don't override the need to discard and crumple invalidation commands when all affinities and protections have been taken into account and there are still too many. It just represents advice to the system.

Other Methods of Expression Based Invalidation

Expression based invalidation can be handled in several different ways (including methods described above). Either the cache implements an efficient map of cached URLs, or a separate service based on reduction of cache events can maintain an index of cached resources, and it can translate invalidation patterns into the list of cached resources per cache. This service can be used by the control network in a feedback loop that takes invalidation manifests containing patterns and localizes them for cache consumption by expanding the patterns into ground URLs.

Gradual Invalidation

Invalidations can potentially cause abrupt and large changes in fill traffic patterns, with undesirable side effects on clients and origins. Although invalidations just mark content as stale and it is subsequent requests of stale content that increase fill traffic, if an invalidation is not an emergency it might be preferable to not force the inevitable to happen too fast. Ideally it would be possible instead to request that the process take place over some minimum time interval T, such that the invalidation will complete gradually and no faster than T units of time.

To accomplish this, the definition of staleness is augmented to be a stochastic one, where the staleness of a resource is based not only on its version-based staleness but also on how much time has elapsed since the invalidation was processed at the cache. The staleness of each resource may, e.g., be based on a random number relative to a threshold that approaches zero as T ticks away. For example:

$$gstale(R, T, t_{mov}, t) \equiv$$
$$\text{if } \left(\text{random}(0, 1) \geq \left(1 - \frac{t - t_{mov}}{T}\right)\right) \text{ then stale}(R) \text{ else false}$$

where t is the current time in the cache, $t_{mov}$ is the time the cache received the applicable mov update, and T is the length of the gradual invalidation period. The value of the condition is more and more likely to be true as t gets larger, and is certain to be true if $t - t_{mov} \geq T$.

Other Methods of Expression Based Invalidation

Expression based invalidation may be handled in several different ways (including the approaches described above for minimum origin version invalidation). The cache may implement an efficient map of cached URLs, or a separate service based on reduction of cache events can maintain an index of cached resources, and it can translate invalidation patterns into the list of cached resources per cache. This service can be used by the control network in a feedback loop that takes invalidation manifests containing patterns and localizes them for cache consumption by expanding the patterns into ground URLs.

Invalidation Completion Tracking

Propagation of invalidation commands can be tracked to closure by tracking mov change events using the reduction mechanism.

System Performance and Customer Experience

Figure 30G:
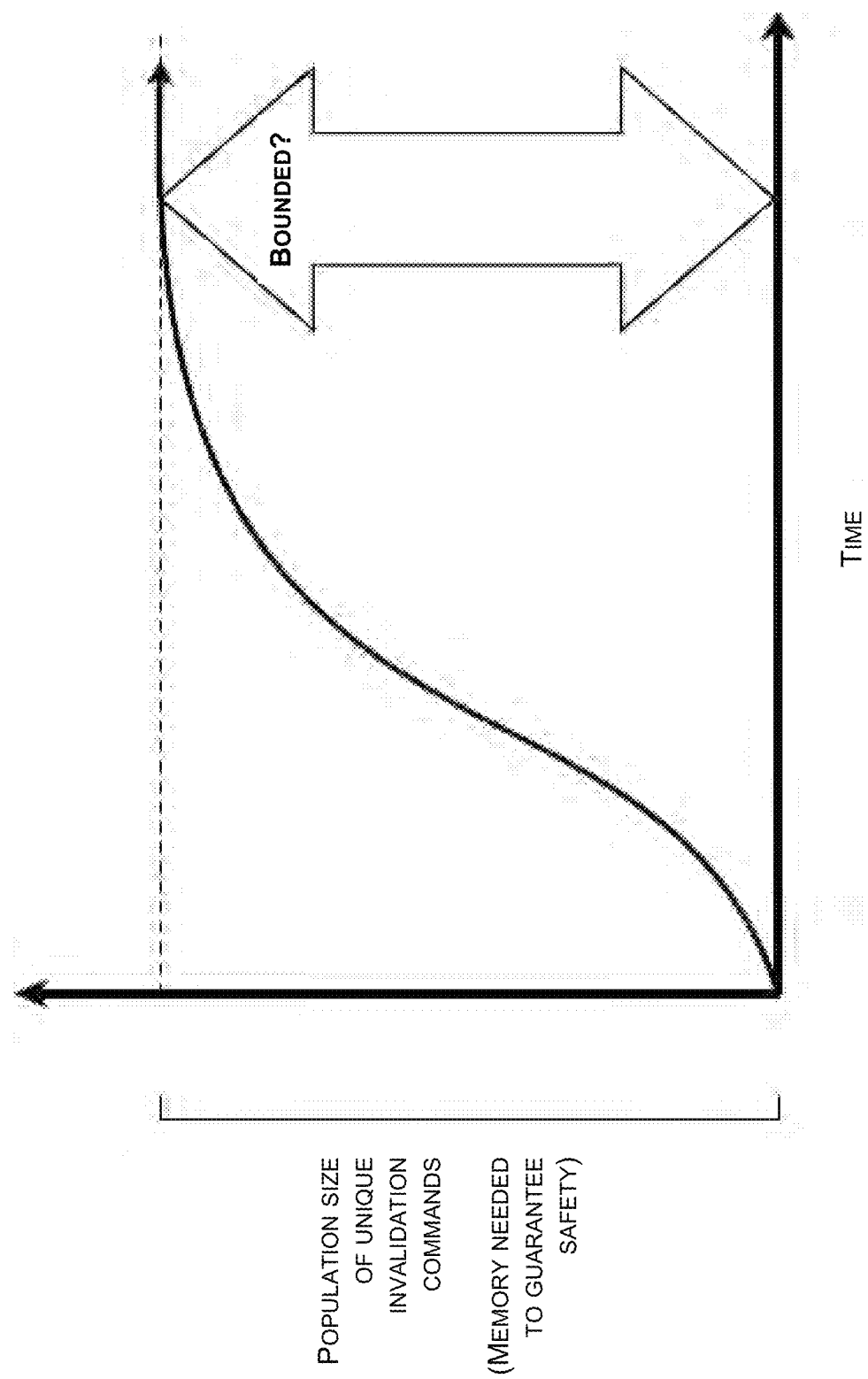

The memory required to guarantee safety depends on the number of unique invalidation commands submitted since the beginning of time for the cache. As used here, unique invalidation commands means unique resource specifiers (whether ground or group). Commands for the same group resource submitted over and over occupy only one slot in the command list, and have the effect of updating that slot's mov. So if the set of resource specifiers in invalidation commands for a property is bounded, the space needed to ensure safety is bounded. This situation is shown in FIG. 30G (which shows a bounded population of invalidation commands).

Figure 30H:
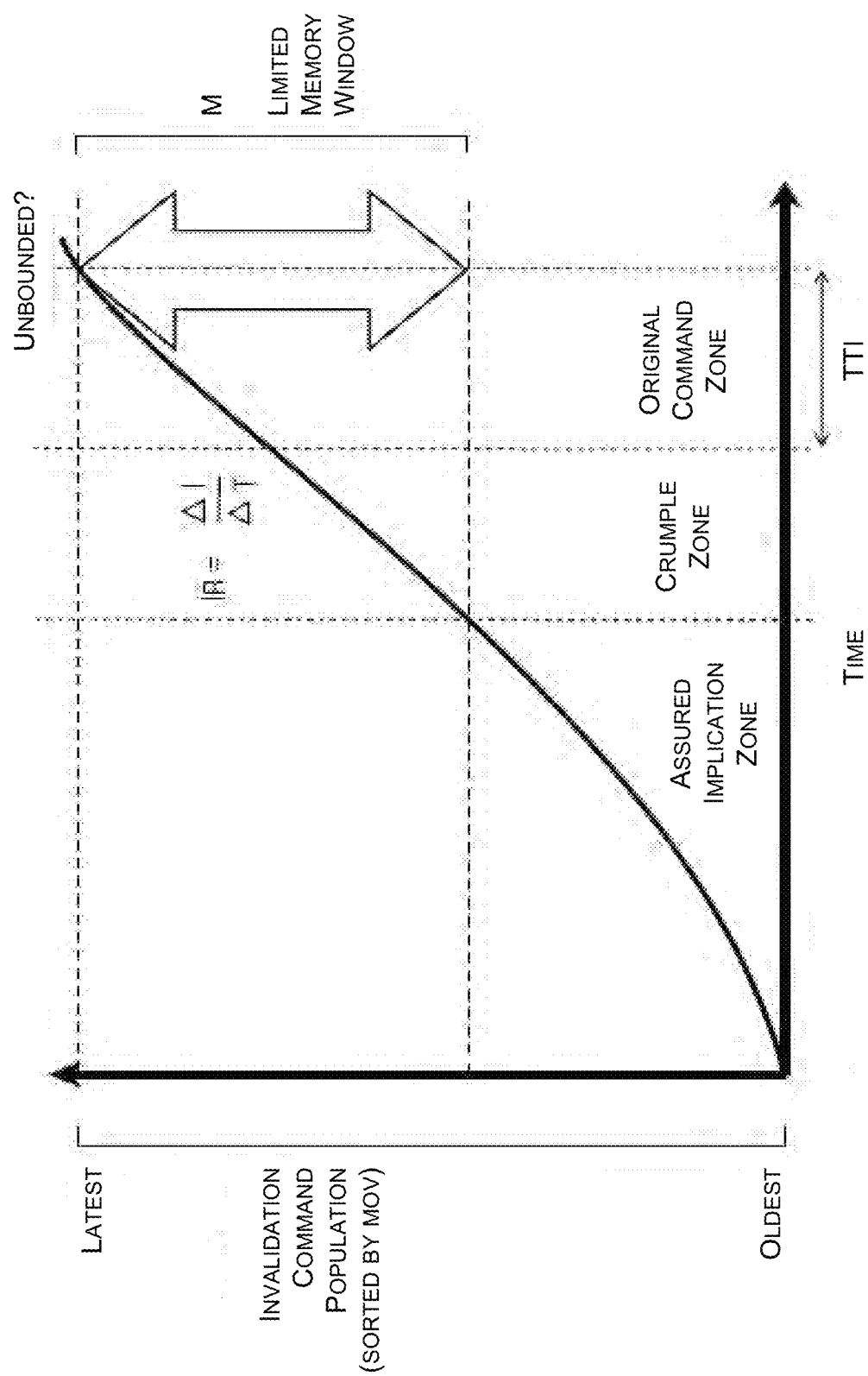

On the other hand, if the set of resource specifiers is not bounded, a different situation arises, as shown in FIG. 30H (which shows an unbounded population of invalidation commands). In this case, the number of unique resource specifiers seen in invalidation commands keeps growing without bound. Some of these commands are eventually candidates for crumpling, and by a certain time, they are assured of being crumpled. The time from the arrival of a command to the time where a crumpled version of the command might implicate other unintended resources is the time-to-implication (TTI) for this property, and it is a function of the invalidation command rate and the memory allocated to the invalidation command list, as described next.

The invalidation system imposes some configurable memory limit M on the number of unique invalidation commands that can be retained at any given time. Let IR be the average rate of submission of unique invalidation commands (i.e., commands with unique resource specifiers):

$$IR(\Delta T) \equiv_{def} \frac{\# \text{ of unique invalidation commands submitted during } \Delta T}{\Delta T}$$

This can be related to the average time-to-implication (TTI) for a resource in cache by using the value of M, the size of the invalidation command memory:

$$TTI \equiv_{def} \frac{M}{IR}$$

because as commands roll off the end of invalidation command memory (or into the crumple zone), their mov constraints may become constraints on all resources in the property in order to ensure safety.

Therefore, to avoid implicating content that would not otherwise be aging out of the system naturally, a sufficiently large TTI should be ensured based on the average age of content for the property, defined as wage(P), where:

$$wage(P) \equiv_{def} \sum_{r \in P} \frac{size_r \times age_r}{\sum_{r \in P} size_r}$$

The average age of content should be arranged to be less than the TTI:

$$wage(P) < TTI$$

and this may be achieved by constraining IR based on the allocated M and wage(P):

$$IR < \frac{M}{wage(P)}$$

In practice, wage(P) will initially be an estimate when a property is configured, and M will be determined based on an estimated peak value for IR. If the value of M exceeds the configurable limits, IR will be constrained based on some maximum M (unless it is acceptable to reduce the age). If the configured age is less than the actual age, then some fresh content will be implicated (and eventually refreshed) before it ages out. However, given a configured IR limit the ingestion of invalidation commands may be throttled to stay within this limit and thereby avoid implicating resources before their time.

Overall, this approach provides a reasonable way of predicting the resources needed to support a certain level of invalidation activity. Configuring a property to work within those resources constrains the invalidation mechanism enough to support the desired level of invalidation activity while also ensuring a predictable refresh behavior for all of the content in a property.

Alternate Invalidation Approach

An exemplary approach to resource invalidation can be found in U.S. Pat. No. 8,060,613, which is hereby fully incorporated herein by reference for all purposes. U.S. Pat. No. 8,060,613 describes a resource invalidation approach in which a server in a content delivery network (CDN) maintains a list of resources that are no longer valid. When the server gets a request for a resource, it checks whether that resource is on the list, and, if so, it replicates the resource from a content provider's content source (such as an origin server). If the requested resource is not on the list (of resources that are no longer valid), the server tries to serve a copy of the requested resource or to obtain a copy from another location in the CDN.

Such an exemplary resource invalidation approach is described in greater detail below:

A server in the CDN maintains a list of invalid resources. The server receives an indication that at least one resource is no longer valid. This indication may be received from a so-called "master server." In response to receiving this indication of invalidity, the server causes the at least one resource to be listed as invalidated.

In response to a request of the server to serve a resource associated with a content provider to a client, the server determines whether the requested resource is listed as invalidated. If the requested resource is listed as invalidated, then the server attempts to replicate an updated copy of the requested resource on the server from at least one content source associated with the content provider. The server then serves the updated copy of the requested resource to the client. If the requested resource is not listed as invalidated, then, if a copy of the requested resource is not available on the server, the server attempts to replicate a copy of the requested resource on the server from another location in the system, and, if successful, then serves the copy of the requested resource to the client. If a copy of the requested resource is available on the server, then the server serves the copy of the requested resource to the client.

The other location (from which the server attempts to obtain a copy) may be another server in the CDN or at least one content source associated with the content provider.

The indication that the at least one resource is no longer valid may be in the form of a resource invalidation message identifying one or more resources that are no longer valid. The message identifying one or more resources that are no longer valid may use an identifier/identifiers of the resource(s). The message may use one or more patterns (e.g., regular expressions) to identify invalid resources. The regular expressions may describe one or more sets of resources to be invalidated. Regular expressions are well-known in the field of computer science. A small bibliography of their use is found in Aho, et al., "Compilers, Principles, techniques and tools", Addison-Wesley, 1986, pp. 157-158.

In some embodiments, the server may send an acknowledgement message for the resource invalidation message.

In some embodiments, the server may cause the resource invalidation message to propagate to other servers in the CDN.

A resource may be considered to be no longer valid (invalid), e.g., if the resource is stale and/or if the resource has changed.

In some embodiments the server may delete at least some of the resources that are no longer valid. This deletion may occur prior to any request for the at least some of the resources.

The server may be a caching server, and the master server may be another caching server.

In another embodiment, as described in U.S. Pat. No. 8,060,613, a server receives a first message identifying at least one resource that is stale. The first message may be received from a master server. In response to the first message, the server lists the at least one resource as pending invalidation. In response to a request of the server from a client to serve a resource that has been listed as pending invalidation, the request being the first request for the resource that is received by the server after the first message has been received, the server attempts to replicate an updated copy of the requested resource on the server (e.g., from at least one content source associated with the content provider), and the server then attempts to serve the updated copy of the requested resource to the client.

In some embodiments, the server may propagate the first message to other servers in the CDN.

The first message may identify the at least one resource that is stale using an identifier of the at least one resource. The first message may identify the at least one resource that is stale using one or more patterns (e.g., regular expressions). The regular expressions may describe one or more sets of resources to be invalidated.

In some embodiments, after listing the at least one resource as pending invalidation: the server may send an acknowledgement message indicating that the particular server has listed the at least one resource as pending invalidation.

In some embodiments, the first message may be sent (e.g., by the server) to others servers in the CDN. The server may wait for the others of the plurality of servers to acknowledge the first message.

In some embodiments, if a server in the CDN fails to acknowledge the first message within a given period, that server may be disconnected from the CDN. In some embodiments, when the server reconnects, the server may be instructed to flush its entire cache.

In some cases, if a server in the CDN fails to acknowledge the first message within a given period, then the server may be instructed to flush at least some of its cache.

In some embodiments, when all servers have either acknowledged the first message or have timed out, a second message may be broadcast, the second message comprising an invalidation request to all servers to cause the servers to remove the corresponding resource identifiers from the list of resource identifiers pending invalidation.

In some embodiments, a first message is received from a server (e.g., a master server). The first message identifying at least one resource of a content provider that is no longer valid. Then, responsive to the next request from a client of a server to serve the at least one resource that has been identified as no longer valid, the server obtains an updated copy of the resource on the server from at least one content sources associated with the content provider, and then the server serves the updated copy of the particular resource to the client.

Clusters, Clustering and Peering

Clusters and Clustering

As designated intermediaries for given origin service, a CDN generally provides a redundant set of service endpoints running on distinct hardware in different locations. These distinctly addressed but functionally equivalent service endpoints provide options to the rendezvous system (discussed below). Each distinct endpoint is preferably, but not necessarily, uniquely addressable within the system, preferably using an addressing scheme that may be used to establish a connection with the endpoint. The address(es) of an endpoint may be real or virtual. In some implementations, e.g., where service endpoints (preferably functionally equivalent service endpoints) are bound to the same cluster and share a virtual address, the virtual address may be used.

In the case of an IP-based system, each distinct endpoint may be defined by at least one unique IP address and port number combination. In an IP-based system where service endpoints are logically bound to the same cluster and share an IP address, each distinct endpoint may be defined by at least one unique combination of the IP address and port number. In some cases, service endpoints that are logically bound to the same cluster may share a VIP, in which cases each distinct endpoint may be defined by at least one unique combination of the VIP and a port number. In the latter case, each distinct endpoint may be bound to exactly one physical cluster in the CDN.

It should be appreciated that not all service types will require or have multi-agent logical clusters. In such cases, the endpoint may be defined in terms of a real address rather than a virtual address (e.g., an IP address rather than a VIP). A virtual address may, in some cases, correspond to or be a physical address. For example, a VIP may be (or correspond to) a physical address (e.g., for a single machine cluster).

It should be appreciated that the term VIP is used in this description as an example of a virtual address (for an IP-based system). In general any kind of virtual addressing scheme may be used and is contemplated herein. Unless specifically stated otherwise, the term VIP is intended as an example of a virtual address, and the system is not limited to or by IP-based systems or systems with IP addresses and/or VIPs.

It should be appreciated that, as used herein to describe endpoints in a cluster, the term "functionally equivalent" does not require identical service endpoints. For example, two caching endpoint services may have different capabilities yet may be considered to be functionally equivalent.

For example, as shown in FIG. 3A, service endpoints SEP 1, SEP 2 . . . SEP n are logically bound to the same cluster and share an address. When a logical cluster is within a physical cluster (e.g., when the services are on machines behind a switch), the shared address may be a virtual address (e.g., a VIP).

A physical cluster of service endpoints may have one or more logical clusters of service endpoints. For example, as shown in FIG. 3B, a physical cluster 304 includes two logical clusters (Logical Cluster 1 and Logical Cluster 2). Logical cluster 1 consists of two machines (M0, M1), and logical cluster 2 consists of three machines (M2, M3, M4). The machines in each logical cluster share a heartbeat signal (HB) with other machines in the same logical cluster. In this example, the first logical cluster may be addressable by a first unique virtual address (address #1, e.g., a first VIP/port combination), whereas the second logical cluster may be addressable by a second unique virtual address (address #2, e.g., a second VIP/port combination).

In a typical case, a machine may only be part of a single logical cluster; although it should be appreciated that this is not a requirement.

The machines that share a heartbeat signal may be said to be on a heartbeat ring. In the example cluster shown in FIG. 3B, machines M0 and M1 are on the same heartbeat ring, and machines M2, M3, and M4 are on the same heartbeat ring.

When a service endpoint is bound to a cluster, it means that a bank of equivalent services are running on all the machines in the cluster and listening for service requests addressed to that cluster endpoint address. Preferably a local mechanism (e.g., a load-balancing mechanism) ensures that exactly one service instance (e.g., machine) in the cluster will respond to each unique service request. This may be accomplished, e.g., by consistently hashing attributes of each request to exactly one of the available machines and (and of course it is impossible to have more than one service instance listening per machine on the same endpoint). Each service instance running on machines in the cluster can be listening to any number of other endpoint addresses, each of which will have corresponding service instances running on all other machines in the cluster. Those of ordinary skill in the art will realize and understand, upon reading this description, that various mechanisms may be used to allocate/distribute service requests to service instances in a cluster. It should be appreciated that not all types of services need use the same allocation/distribution mechanisms, and that not all clusters of the same kind of service need use the same allocation/distribution mechanisms.

In some preferred implementations, each machine is installed on a physical cluster of machines behind a single shared switch. One physical cluster may be divided up into multiple logical clusters, where each logical cluster consists of those machines on the same physical cluster that are part of the same HB ring. That is, each machine runs an HB process with knowledge of the other machines in the same logical cluster, monitoring all virtual addresses (e.g., VIPs) and updating the local firewall and NIC (network interface card/controller) configurations in order to implement local load balancing across the cluster.

U.S. Pat. No. 8,015,298 titled "Load-Balancing Cluster," filed Feb. 23, 2009, issued Sep. 6, 2011 (the entire contents of which are fully incorporated herein by reference for all purposes) describes various approaches to ensure that exactly one service instance in a cluster will respond to each unique service request. In a first allocation approach, service endpoints on the same HB ring select from among themselves to process service requests. In a second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

Since, in some cases, each machine may be considered to be a peer of all other machines in the cluster, there is no need for any other active entity specific to the cluster. The database records in the configuration and control networks of the CDN are the only things that are needed to declare the cluster to exist. When cluster configurations change, machines detect the changes, e.g., via their local Autognome processes (described above). Autognome then launches all services (including HB) and communicates logical cluster changes to HB via updates to distinguished local files.

A subcluster is a group of one or more (preferably homogenous) machines sharing an internal, local area network (LAN) address space, possibly load-balanced, each running a group of one or more collaborating service instances. To external clients, i.e., those not connected to the internal LAN of the subcluster, the collection of service instances is addressed as a single service image, meaning that individual externally visible physical addresses can be used to communicate with all machines in the subcluster, though usually one at a time.

Service instances within the subcluster's internal LAN address space can preferably address each other with internal or external LAN addresses, and may also have the ability to transfer connections from one machine to another in the midst of a single session with an external client, without the knowledge or participation the client.

A supercluster is a group of one or more (preferably homogenous) subclusters, each consisting of a group of one or more collaborating but distinctly addressed service images. Different service images in the same supercluster may or may not share a common internal LAN (although it should be appreciated that they still have to be able to communicate directly with each other over some network). Those connected to the same internal LAN may use internal LAN addresses or external LAN addresses, whereas others must use external network addresses to communicate with machines in other subclusters.

Clusters may be interconnected in arbitrary topologies to form subnetworks. The set of subnetworks a service participates in, and the topology of those networks, may be dynamic, constrained by dynamically changing control policies based on dynamically changing information collected from the network itself, and measured by the set of currently active communication links between services.

Figure 31A:
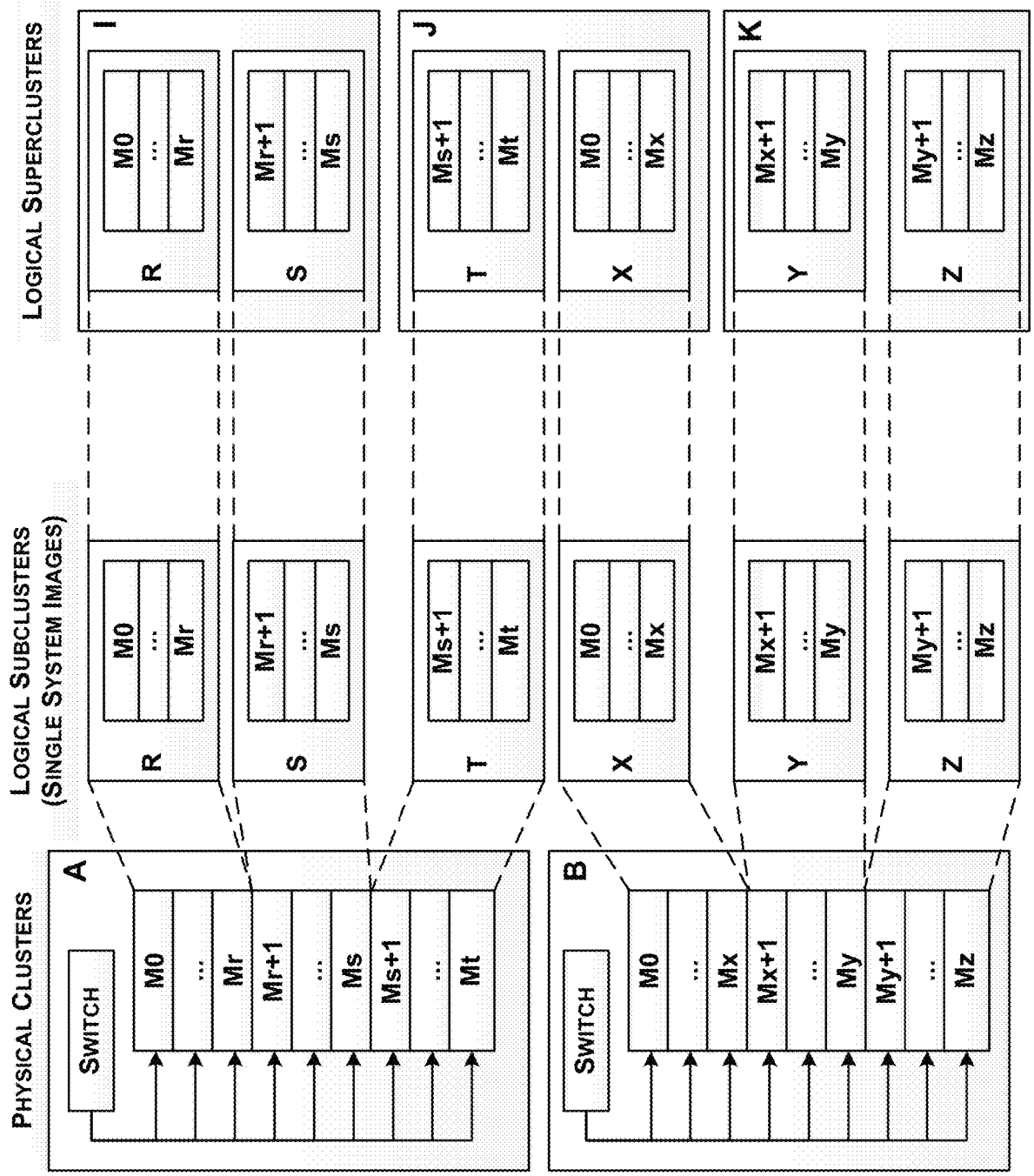
FIGS. 31A to 31B relate to aspects of clustering.

An example showing the distinction between physical clusters, logical subclusters, and logical superclusters is shown in FIG. 31A. In this example, the machines of physical clusters A and B are subdivided into groups forming logical subclusters R, S, and T from the machines of A and logical subclusters X, Y, and Z from the machines of B. These subclusters are then recombined to form logical superclusters I from R and S, J from T and X, and K from Y and Z. The number of machines that may be combined into one subcluster is limited by the number of machines in a physical cluster, but theoretically any number of logical subclusters may be grouped into one supercluster that may span multiple physical clusters or be contained within one.

Peering, Parenting, and Topology

Peering is a general term referring to collaboration between different service instances, service images, subclusters, and clusters of the same service type in some larger sub-network in order to achieve some effect, typically to improve performance or availability of the service. Though the effect may be observable by the client, the peers involved and the nature of their collaboration need not be apparent to the client.

Typically peering occurs between two or more services of the same rank in a larger sub-network, but may also be used to refer to services of similar rank in some neighborhood of the larger sub-network, especially when the notion of rank is not well defined (as in networks with a cyclic or lattice topology). Parenting is a special case of peering where a parent/child relationship is defined between services.

Figure 31B:
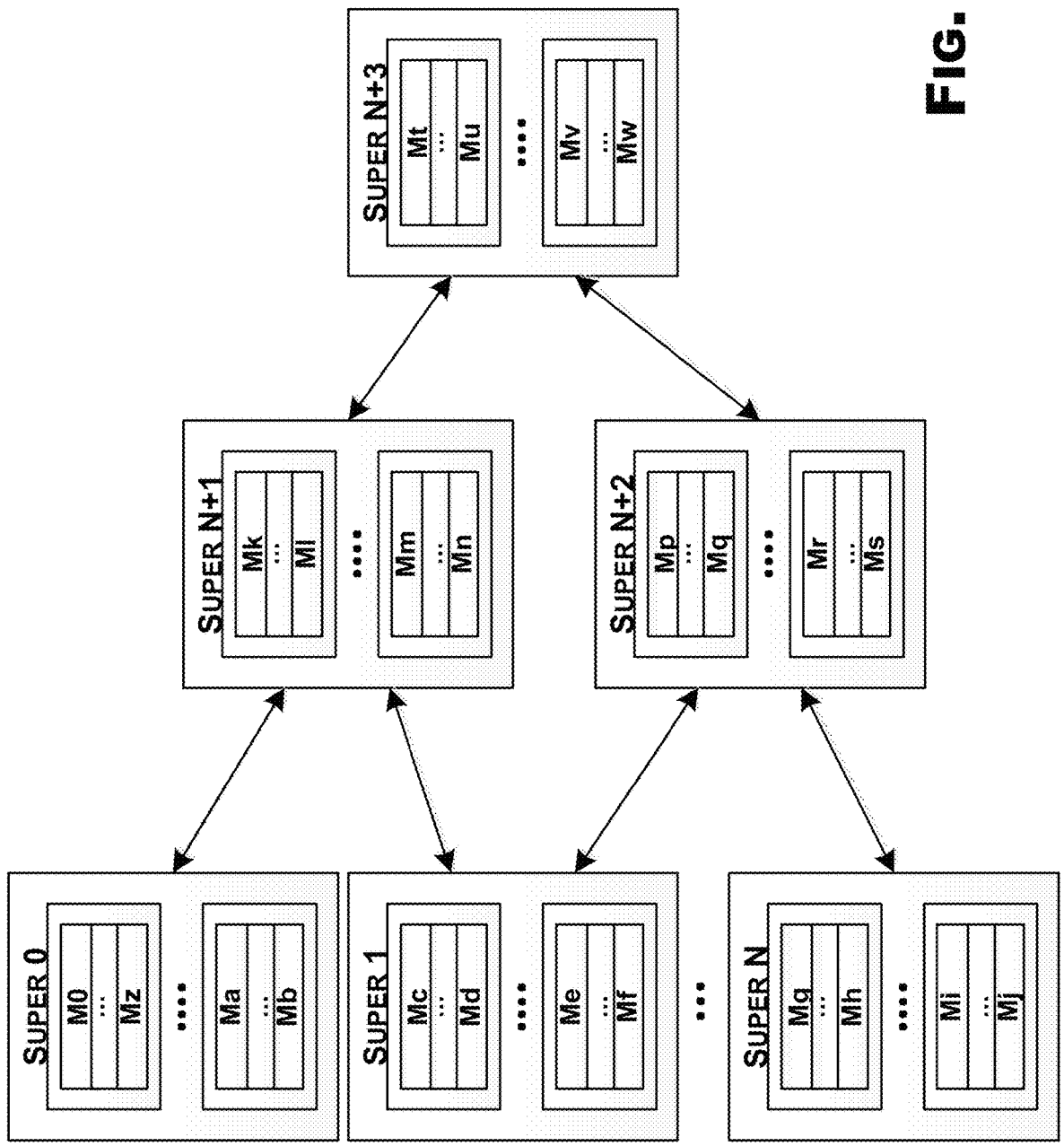

Note that the formation of logical clusters from physical elements is distinct from the formation of larger subnetworks of service instances running on the machines in a cluster. Service specific subnetworks comprised of interacting service instances may span multiple superclusters, which means the superclusters on which those service instances are running may be considered as forming a network (typically a lattice or hierarchy, see, e.g., FIG. 31B).

Clustering Assumptions

For preferred implementations, a two-level cluster architecture is assumed, where machines behind a common switch are grouped into logical sub-clusters, and sub-clusters (whether behind the same switch or on different racks/switches) are grouped into super-clusters. In some preferred implementations, using, e.g., the systems described in U.S. Pat. No. 8,015,298 titled "Load-Balancing Cluster," all machines in a logical sub-cluster are homogeneous with respect to the virtual address (e.g., VIPs) they serve (each machine serves the same virtual addresses—VIPs—as all other machines in the sub-cluster), and machines in distinct logical clusters will necessarily serve distinct (non-overlapping) sets of virtual addresses—VIPs.

A single switch may govern multiple sub-clusters and these sub-clusters need not be in the same super-cluster. It is logically possible to have any number of machines in one sub-cluster, and any number of sub-clusters in a super-cluster, though those of ordinary skill in the art will realize and understand that physical and practical realities will dictate otherwise.

Other features described in U.S. Pat. No. 8,015,298 could be made available as an optional feature of sub-clusters, enabling the transfer of connections from one machine to another in the same sub-cluster.

Recall, from above, that U.S. Pat. No. 8,015,298 describes various approaches to ensure that exactly one service instance in a cluster will respond to each unique service request. These were referred to above as the first allocation approach and the second allocation approach. In the first allocation approach, service endpoints on the same HB ring select from among themselves to process service requests. In the second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

It is assumed here that for some implementations an additional level of heartbeat-like functionality (referred to herein as super-HB) exists at the level of virtual addresses (e.g., VIPs) in a super-cluster, detecting virtual addresses that are down and configuring them on machines that are up. This super-HB allows the system to avoid relying solely on DNS-based rendezvous for fault-tolerance and to deal with the DNS-TTL phenomenon that would cause clients with stale IP addresses to continue to contact VIPs that are known to be down. It should be appreciated that a super-HB system may have to interact with the underlying network routing mechanism (simply bringing a VIP "up" does not mean that requests will be routed to it properly). For example, if a sub-cluster is to take over another sub-cluster's VIP because the second sub-cluster is completely down or has lost enough capacity that the system will consider it to be down, the routing infrastructure is preferably informed that the VIP has moved to a different switch. As noted earlier, while this discussion is made with reference to VIPs, it should be appreciated that the system is not limited to an IP-based scheme, and any type of addressing and/or virtual addressing may be used.

Heartbeat(s) provide a way for machines (or service endpoints) in the same cluster (logical and/or physical and/or super) to know the state of other machines (or service endpoints) in the cluster, and heartbeat(s) provide information to the various allocation techniques. A heartbeat and super-heartbeat may be implemented, e.g., using the reducer/collector systems. However, those of ordinary skill in the art will realize and understand, upon reading this description, that a local heartbeat in a physical cluster is preferably implemented locally and with a fine granularity. A super-heartbeat may not have (or need) the granularity of a local heartbeat.

This leads to two extreme approaches to configuring a super-cluster, one relying on the first allocation approach described above (with reference to U.S. Pat. No. 8,015,298), with optional super-HB, the other with super-HB and optional first allocation approach:

A super-cluster containing N>1 sub-clusters with 1 machines
  First allocation approach required, second allocation approach optional. A super-HB is unnecessary.
A super-cluster containing N>1 sub-clusters with 1 machine each
  First allocation approach not required, second allocation approach not supported. This requires a super-HB.

Depending on the overhead of the first allocation approach and the fail-over properties of virtual address (e.g., VIP) reconfiguration and rendezvous, it may be advantageous to actually configure a super-cluster somewhere in between these two extremes. On the one hand, the First allocation approach system described in U.S. Pat. No. 8,015, 298 provides the most responsive failover at the cost of higher communication overhead. This overhead determines an effective maximum number of machines and VIPs in a single logical sub-cluster based on the limitations of the heartbeat protocol. The First allocation approach mechanisms described in U.S. Pat. No. 8,015,298 also imposes additional overhead beyond that of heartbeat due to the need to broadcast and filter request traffic. On the other hand, a VIP-level failover mechanism that spans the super-cluster would impose similar heartbeat overhead but would not require any request traffic broadcasting or filtering.

It may be that the optimal case is to have logical clusters with at least two machines but not much more in order to provide reliable VIPs but minimize communication overhead due to the First allocation approach. The benefits of going beyond two machines would be increased capacity behind a single VIP, and the enabling of localized content striping (described in the section titled "Higher Level Load Balancing" below as Approach A) across a larger group of machines, but the costs would be increased HB overhead which increases as the size of the subcluster increases, and the broadcast and filtering overhead. Detection of down VIPs in the cluster may potentially be handled without a heartbeat, using a reduction of log events received outside the cluster. A feedback control mechanism could detect inactive VIPs and reallocate them across the cluster by causing new VIP configurations to be generated as local control resources.

General Responsibility-Based Peering

In responsibility-based peering, each node in a peer group may assume one or more discrete responsibilities involved in collaborative processing of a request across the peer group. The peer group can be an arbitrary group of service instances across the machines of a single super-cluster. The nature of the discrete responsibilities depends on the service type, and the processing of a request can be thought of as the execution of a chain of responsibilities. The applicable chain of responsibilities and the capacity behind each are determined by the peering policy in effect based on the actual capacity of nodes in the peering group and a dynamically computed type for each request. This allows different request types to lead to different responsibility chains and different numbers of nodes allocated per responsibility.

Each node has a set of capabilities that determine the responsibilities it may have, and responsible nodes are always taken from the corresponding capable set. A node's capability is further quantified by a capacity metric, a non-negative real number on some arbitrary scale that captures its relative capacity to fulfill that responsibility compared to other nodes with the same responsibility. Both capabilities and capacities may change dynamically in response to events on the machine or instructions from the control network, in turn influencing the peering decisions made by the peer group.

Each service type defines a discrete set of supported request peering types, and a discrete set of responsibilities. A configurable policy defines a mapping from an arbitrary number of discrete resource types to the request peering type with a capacity allocation for each responsibility in the request peering type. This capacity could, for example, be a percentage of total capacity across all nodes capable of fulfilling that responsibility. The policy also defines a responsibility function per request peering type that maps a request and a responsibility to a set of nodes that have that responsibility for that request. This function is expected to make use of the capacity allocation for that responsibility type, using each node's capacity for each responsibility it can handle.

There are no specific requirements on the responsibility function other than the fact that it should return responsibility sets that are largely consistent with the current node capabilities and capacity allocations over a sufficiently large number of requests.

Ideally responsibilities should change in a predictable way in the face of capability losses due to node failures, but there is a tradeoff to be made between the goals of consistency (as exemplified by consistent hashing techniques) and load balancing. Ideally, the initial adjustment to a capacity loss is consistent, but over time consistency should be relaxed in order to balance the load.

One approach is to manage a ring of nodes per capability, with some arbitrary number of slots on each ring such that Nslots>>Nnodes, and with an assignment of nodes to intervals of contiguous slots where the number of slots assigned to a node is proportional to the node's capacity for that capability, and the node's centroid on the ring is based on its node identifier's position in the sorted list of all node identifiers for available nodes (nodes with capacity greater than zero). The responsibility function would consult the ring for the responsibility in question, consistently hash the resource to a slot on the ring, and take the slot interval proportional to the capacity allocation for the resource's type. It would then return the set of nodes allocated to those slots.

In the steady state, all nodes in the peer group should compute the same assignment of responsible nodes for the same resource, and thus make the same expectations about which nodes are responsible for what. Under transient conditions, such as when capabilities and capacities change and not all nodes have yet become consistent with the same policies, different nodes may temporarily compute slightly different responsibility sets. The effect of this inconsistency is mitigated by several configurable approaches.

The first of the approaches to mitigate inconsistency depends on the implementation of the responsibility function. If chosen correctly and consistent hashing is used to connect a resource to a responsible node, then disruptions in responsibility assignments can be reduced.

The second of the approaches to mitigate inconsistency is that all capable nodes are expected to take responsibility when necessary, even when they believe they are not responsible, but no node ever asks another node to be responsible unless it believes that other node is responsible. If a supposedly responsible node is contacted that actually is not responsible, then if that node is available it must take responsibility. If it does not respond, the client should choose another node from the responsibility set until some upper limit of attempts is reached or the responsibility set is exhausted, at which point the client should take responsibility and continue on in the responsibility chain.

The third of the approaches to mitigate inconsistency is that when a new responsibility allocation is provided (due to a node becoming completely unavailable or having its capacity metric degraded), the previous allocation and the new allocation are combined over some fade interval to determine the actual responsibility set used by any node. Depending on the type of service, it may be desirable to more or less gradually adapt to the new allocation, and this adaptation is controlled by a responsibility adaptation policy that combines the output of multiple responsibility functions, a current fading function and zero or more newer emerging functions. The fading function is used with some probability that fades to zero (0) over some fade interval, otherwise the emerging function is used. If the fading function identifies a node that the emerging function claims is unavailable, the emerging function overrides the fading function and it uses the emerging function's node set. This general approach can be extended to an arbitrary number of pending emerging functions, to handle periods where the capacity allocations change faster than the length of the fade interval.

Consistency, Balance, and Hash Distributions

When a node loses capacity (completely or partially), the typical approach is to use consistent hashing to allocate just the workload that was lost (i.e., the requests that hash to the node that lost capacity) to other nodes. A consistent reallocation is one in which the amount of work reallocated is the same as the amount of capacity that was lost. In consistent hashing, where the workload (responsibility for dealing with certain resources) is allocated based on their hash, consistency may be achieved if loss of one of N nodes of capacity causes no more than K/N resources to be reassigned to other nodes, where K represents the size of the key space, in this case the number of unique request hashes.

The rationale for this is to minimize disruption, which makes sense in the short term. But minimizing disruption maximizes imbalance, which is undesirable over the long term. Therefore it is desirable to have an approach that smoothly adjusts from a consistent adaptation immediately following a capacity loss to a balanced adaptation eventually. It should be appreciated that consistent hashing alone does not achieve this.

Another issue with hashing in general, even without capacity loss, is the actual distribution of workload over a set of hash value intervals based on the actual distribution of those request parameters that factor into the hash. If this is not both stationary and uniform, balance will not be achieved. Capacity loss exacerbates the issue.

By hashing requests to slots as opposed to directly hashing them to responsible nodes, the system retains the ability to adjust a node's coverage of slots ever so slightly over time in order to balance its capacity with respect to the load represented by the slots. Assuming suitable information sources based on reductions of the actual request workload, the system can compute the actual distribution of workload (i.e. request hashes) over the slots, and use this to adjust a node's centroid and extent on the slot circle such that its current capacity covers the current estimate of load across some slot interval. This kind of adjustment improves balance at the expense of consistency, and this may be done gradually after the initial consistent adjustment to capacity loss, and eventually reach a new point where load is balanced.

Slot Circles vs. Metric Spaces

The slot circle provides a simple means to implement consistent hashing. Typically nodes are assigned to slots where the number of slots is equal to the total number of nodes, and holes (capacity dropouts) are reassigned to a neighbor. Thus the hashing of resources to nodes in this case (and to slots) is consistent.

With a number of slots much larger than the number of nodes, can consistent hashing may still be achieved if the number of slots is fixed, the position of each node on the circle is fixed, and only reassignment of holes to neighbors is dealt with. By nudging nodes around the circle, and expanding or shrinking the intervals they cover, consistent hashing to nodes is sacrificed, even though the number of slots has not changed, but this allows us to rebalance the load.

A slot circle is a simple one-dimensional approach, just one of many ways to divide up the workload, assign to capacity carrying nodes, and deal with capacity losses in a consistent fashion. In general, a finite multidimensional metric space with a suitable distance metric could replace the slot circle, provided requests hash to contiguous regions in the space, nodes cover intervals of the space, and a scheme exists for initially consistent adjustments that evolve into eventual load balance. This multidimensionality may also be useful as a means to address different load requirements in different dimensions.

Cache Peering

This section describes an example of how a set of peering policies based on the type of resource may be arranged. Those of ordinary skill in the art will appreciate and understand, upon reading this description, that different and/or other peering policies may be arranged. A responsibility based peering policy for a super-cluster determines for each resource r whether the resource is rejectable, redirectable, or serveable. Serveable resources are further subdivided into non-cacheable and cacheable types. For cacheable resources, the policy assigns each node one or two responsibilities taken from the list non-responsible, cache-responsible, and fill-responsible. Non-responsible nodes will avoid caching a resource and tend to proxy it from cache-responsible nodes; cache-responsible nodes will cache the resource but defer to fill-responsible nodes for the task of filling it remotely. Only fill-responsible nodes will issue fill requests to remote parents or origin servers. If a node is non-responsible it cannot be cache-responsible or fill-responsible, but a node that is cache-responsible may also be fill-responsible. It should be appreciated that (in this example) a fill-responsible node must also be cache-responsible This approach assumes that any two nodes in a super-cluster are potential peers with respect to filling and serving a given resource. Other than the manner in which peers address each other, it does not matter whether the peers are in the same logical sub-cluster or in two different subclusters. It is assumed that it is possible for peers in the same sub-cluster to communicate over back channel IP addresses, whereas peers in different sub-clusters can use public VIPs.

A policy does not actually assign responsibility for specific nodes in advance, but rather specifies the sizes of the various responsibility sets relative to the size of the super-cluster, where All is the set of all nodes in the super-cluster, and $N_{All}=|All|$.

$N_{CR}(r) \leq N_{All}$, the number of cache-responsible nodes in the super-cluster for r;

$N_{FR}(r) \leq N_{CR}(r)$, the number of fill-responsible nodes in the super-cluster for r;

RFT(r), the set of remote fill targets outside the super-cluster for r.

Policy types are defined in advance for each property based on thresholds for popularity, cacheability, and size of the resource being requested. The policy type governing a cacheable response is determined at request time based on estimates of the resource's popularity, cacheability, and size together with the capabilities of the receiving cluster. The node receiving the request determines its responsibility relative to the request by its membership in the following responsibility sets which are determined per request by a consistent hash of the request to the ring of nodes in the super-cluster:

CR(r) is the set of cache-responsible nodes located on the contiguous interval of $N_{CR}(r)$ nodes on the hash ring centered at the node to which r hashes.

FR(r) is the set of fill-responsible nodes on the contiguous interval of $N_{FR}(r)$ nodes on the hash ring centered at the node hashed by the request. Generally FR(r)⊆CR(r).

NR(r) is the set non-responsible nodes.

NR(r)=All−(CR(r)∪FR(r))

For each request r, the receiving node knows what degree of responsibility it has based on its membership (or not) in each of these sets (which, in the rest of this document, are referred to as CR, FR, NR, and RFT). If a node x is not cache-responsible (x∈CR), it will either transfer the connection or proxy the request to a node that is cache-responsible. If it is cache-responsible but not fill-responsible (x∈CR but x∈FR) and does not have the resource in cache, it will fill from a node that is fill-responsible. If it is fill-responsible but does not have the resource in cache, it will fill the resource from a remote fill target. See Table 2, Peering Behaviors (below). Similar variations exist when the resource is in cache but is stale. In all cases, the choice of a node to proxy or fill from is by default an unbiased, random choice of any node in the governing responsibility set.

This policy structure is self-reinforcing—it not only relies on but also ensures the fact that the system will eventually reach a state where cacheable content is most likely to be cached at all cache-responsible nodes, and (assuming rendezvous and load balancing distribute requests evenly over the super-cluster) that all cache-responsible nodes are equally likely to have the given piece of content for which they are responsible.

TABLE 2

Peering Behaviors

| Case | Policy Type | Cache | Responsibility | Action | Target Set |
|------|-------------|-------|----------------|--------|------------|
| 0 | Rejectable | — | — | Reject | — |
| 1 | Redirectable CR = FR = Ø | | | Redirect | RFT |

TABLE 2-continued

Peering Behaviors

| Case | Policy Type | Cache | Responsibility | Action | Target Set |
|------|-------------|-------|----------------|--------|------------|
| 2 | Serveable, non-cacheable CR = FR = Ø | | | Proxy | RFT |
| 3 | Serveable, cacheable Ø ≠ FR ⊆ CR | r ∉ Cache | x ∉ FR, x ∉ CR | Proxy | CR |
| 4 | Serveable, cacheable, Ø ≠ FR ⊆ CR | r ∉ Cache | x ∉ FR, x ∉ CR | Transfer | CR |
| 5 | Serveable, cacheable, Ø ≠ FR ⊆ CR | r ∉ Cache | x ∉ FR, x ∈ CR | Fill | FR |
| 6 | Serveable, cacheable, Ø ≠ FR ⊆ CR | r ∉ Cache | x ∈ FR | Fill | RFT |

Content is effectively striped across the cluster, with each node n storing only those resources which hash to a CR set that contains the node n. The number of cache-responsible nodes per resource can be set to an arbitrarily large subset of the cluster based on popularity, with more popular resources resulting in larger values of $N_{CR}$, thus increasing the chances that requests to the cluster will hit nodes which have the resource in cache.

This responsibility structure may be extended to distinguish different caching/filling responsibilities, based on different levels in the memory hierarchy.)

Configuration and Tuning of Cache Peering

It is possible to assign planned quality of service levels to a property by defining tiers, and compute the popularity and cacheability thresholds necessary to achieve it based on the properties of the library and traffic profile. The library could be divided up into tiers, where each tier corresponds to that portion of the library with expected popularity (request rate) over some threshold, and a desired performance metric (say a cache hit rate) is assigned to each tier, with special tiers for redirectable, ejectable, and non-cacheable resources. Tier boundaries could be defined based on popularity thresholds or total size of the library tier (i.e., the K most popular GB of resources, etc.).

Focusing on the cacheable resources, it is possible to estimate the CPU, memory, and network capacity needed to achieve the QoS targets per tier. Network and memory would likely be the gating factors (combining memory and disk into one category for now, considering a resource "in cache" if it is on disk or in memory).

An example of how this may be done for the memory part of the estimation, ignoring the effects of invalidations, is shown here. The memory m needed to ensure the hit rate for the given tier of the library may be estimated by:

$$HitRate = \frac{N_{CR}}{N} \times \frac{m}{LibSize(\text{tier})}$$

Imposing a minimum number of machines $N_{CR}=N_{min}$, compute an upper bound in * on the amount of memory per machine as:

$$m^* = \frac{HitRate \times N \times LibSize(\text{tier})}{N_{min}}$$

Let m* be the total size of the library tier, LibSize(tier), then estimate another lower bound on $N_{CR}$:

$$N^*_{CR} = HitRate \times N$$

Then, if $N^*_{CR} < N_{min}$ set:

$$m = m^*$$

$$N_{CR} = N_{min}$$

but if $N^*_{CR} > N_{min}$ then set:

$$N_{CR} = N^*_{CR}$$

$$m = \frac{HitRate \times N \times LibSize(tier)}{N^*_{CR}}$$

Similar computations are needed to estimate the client side, fill side, and peer-to-peer bandwidth needed to achieve the targets.

Those of ordinary skill in the art will realize and understand, upon reading this description, that the above technique is only given by way of example, and is not intended to limit the scope of the system in any way.

As actual traffic profiles change dynamically, the total size and/or popularity thresholds corresponding to the boundaries between QoS tiers will change. The same date reduction mechanism that computes popularity metadata can aggregate over the whole library to determine new popularity thresholds for a given resource data volume, and these new thresholds can be used to adjust responsibility set sizes for resources based on their new tiers.

Invalidation and Peering Protocol Issues

It is likely that in some implementations HTTP headers will be used to confirm the responsibility expected of a server by another peer in a peer to peer request and to track the peers that have been involved within the super-cluster in the service of a request, in order avoid cycles and deal with the effect of responsibilities changing dynamically. If a node receives a request for a resource with an expected responsibility that does not match its current responsibility, it is likely that it had that responsibility very recently or it will have it in the near future, so it should just behave as if it had it now.

Cached Location Indexing

The approach described above both relies on and ensures that resources will be located at certain nodes in the steady state. Since this relies on a source of popularity and cacheability metadata, it may be useful to compute and use an index of cached locations, and to use this information in choosing the fill target.

If such an index were used, the system may have to be sure that the new choices are just a refinement of the choices that could have been made by the responsibility based approach, otherwise the steady state guarantees would no longer be guaranteed. This generally means that choices of target have to be taken from the intersection of the original target sets with the location index if that intersection is nonempty, otherwise it must be taken from the original target set. For example, nodes∈CR would instead choose their proxy or transfer target from Index(r)∩CR if it is nonempty, otherwise from CR. Similarly for nodes choosing from FR.

This has no effect on performance in the steady state, since in that state:

$$Index(r) \cap CR = CR$$

$$Index(r) \cap FR = FR$$

In dynamic transitions due to new versions of content, however, the use of the index (if the latency is low enough) could cause a transient period where more of the peer transfers occur from the first targets to get the new version of the resource. This approach may not improve overall performance in the transient state.

NR→CR→FR vs. NR→FR

Similarly, in some cases it may be considered better to fill directly from FR when a non-responsible node receives a request. As defined above, it is possible for two-levels of local peering before the fill-responsible node reaches out to a remote fill target. In the steady state when a cache-responsible node is always contacted first, there is no difference between contacting a cache-responsible versus a fill-responsible node, because both will have it in cache with the same probability. In transient conditions, it is possible for two local hops to be performed.

Going directly to a fill-responsible node from a non-responsible node may resolve the transient condition more quickly for that one node, but it slows the appearance of the steady state.

Biasing the Peer Choice

The unbiased random choice of a node in a target set can be replaced with a choice that is more biased, in order, e.g., to control transient behaviors or further influence load balancing. For example, in some cases, since a machine in a sub-cluster is seeing traffic which is representative of the traffic being seen by all the other members of the cluster, then it is feasible to have each machine make its own local decision about resource popularity and therefore the size of the various responsibility sets. Since the machines are observing the same basic request stream, a decision made locally by one of them will be made approximately simultaneously by all of them without them needing to communicate with each other.

One example would be cache warming. If a new node is added to a cluster, for example, the system might want to reduce the probability with which the newly added cache would be chosen as a cache-responsible or fill-responsible node, until its cache crosses some threshold. It could even be effectively taken out of the externally visible rotation by not listening directly to the sub-cluster VIPs and just respond to indirect traffic from other sub-cluster peers through local IP addresses.

Another example is load balancing. If the load distribution that emerges naturally from the policy is not balanced, it will tend to stay that way until the traffic pattern changes. Biasing the peer choice can be achieved by choosing a node with a probability that is based the ratio of its actual load to expected load. As this ratio goes up, the probability of choosing it should go down.

Local, Distributed, and Centralized Responsibility Assignment

It is important for all peers in a peer group to use a consistent view of responsibility assignments. However, it is neither necessary nor feasible for this view to be identical, since the altruistic approach of accepting responsibility when asked ensures that each requestor gets what they ask for. The larger the differences between each node's view of responsibility assignments, however, the less efficient the system will be. In practice, the computation of responsibilities could be computed by some combination of centralized, distributed, and local computations.

For example, an external centralized source could perform some reduction on data captured from the peer group to determine popularity, and peering policies could be based on that. Nodes could also perform their own local computations, assuming the inputs to these computations are reasonably similar across different nodes (which should be true in a subcluster but may not hold across the nodes of different subclusters), and these results could be distributed to other nodes. The centralized computation could also be merged with the local computation. The advantage of including the local computation more directly as opposed to relying solely on a centralized or distributed computation is reduced latency.

Multi-Level Peering

The manner in which machines in a peer group collaborate may also be extended across distinct peer groups in a hierarchy or lattice of peer groups. The responsibility chain that governs the flow of work within one peer group may terminate with a task that involves reaching outside the peer group, and the idea of multi-level peering is to use knowledge of the target peer group's responsibility structure to make that handoff more efficient.

For example, as described in the previous section, one possible responsibility chain involves the responsibility types non-responsible (NR), cache-responsible (CR), and fill-responsible (FR), where:

NR nodes proxy to a CR node,
CR nodes fill from an FR node (unless they are also FR),
FR nodes fill from some remote fill target (RFT)

When a request enters an edge peer group from a client outside the system, it will arrive at some arbitrary node in a peer group and be handled with some subsequence of the following sequence:

NR→CR→FR→RFT where a possible subsequence must be non-empty and may omit a leading prefix or a trailing suffix (because a possible subsequence starts at any node where a request may enter, and stops at a node where the response to the request is found to be cached). The FR node's responsibility may involve reaching out to an RFT that is considered outside the local peer group at this level, and this RFT may refer either to a remote peer group or to an origin server external to the network.

A multi-level peering approach may, for example, identify the CR nodes for the resource being requested in the target peer group represented by RFT, and submit the request to one of the CR nodes directly. The manner in which this is done may depend, e.g., on the manner in which peer groups are networked together. It should be appreciated that it may or may not be possible to address individual machines in the supercluster, and it may be desirable to target just a single image subcluster via its VIPs.

If it is possible to address machines directly, individual CR nodes across the entire remote supercluster may be targeted, and hitting a node that is NR for the request may be avoided, and the rest of the supercluster's internal peering proceeds as usual. If it is not possible to address individual machines directly then subclusters need to be addressed. In this scenario, the remote supercluster's responsibility structure may be partitioned, e.g., into two levels, one of which assigns CR responsibilities for specific resources to entire subclusters, and then the usual responsibility chain within the subcluster to decide which nodes within the subcluster are going to cache and fill. Alternatively, the target CR node could be identified and its subcluster determined, and the result used. In either case the probability of hitting an NR node is reduced (although the chances of the request arriving at an NR node are not eliminated).

It should also be appreciated that the choice of a particular supercluster as the RFT for a request can be chosen dynamically from among multiple available choices based on a number of factors (what property the request is for, other resource metadata, etc.) In addition, it should be appreciated that the choice of a remote fill target supercluster can be based on feedback (i.e., reduction over request log information that results in an estimate of the relative cost to retrieving content from a particular supercluster for a specific property). The estimated cost (i.e., latency) from each client (cluster) to each server (cluster) for a specific property may be a result of a reduction, and each client (cluster) may use this to make their remote fill choices.

Domain and Binding Names

Domain and Binding Names Concepts

Domain (Host) Names

Each request reaching the CDN originates with a request to a subscriber domain name (e.g., a host or domain name that subscribers advertised to their users). That subscriber domain host name may be different from the name submitted to the CDN's rendezvous system (which will typically be the CNAME name for the subscriber's host name defined in the CDN domain).

Canonical Domain Names (CNAMEs, Supernames)

A subscriber may have one or more subscriber domain names associated with their resources/origins. The CDN may assign each subscriber domain name a canonical name (CNAME). DNS resolution of each subscriber domain name subject to CDN service must be configured to map to the corresponding CNAME assigned by the CDN for that subscriber domain name.

As an example, a subscriber may associate the subscriber domain name "images.subscriber.com" with that subscriber's resources. The CDN may use the CNAME, e.g., "images.subscriber.com.cdn.fp.net" (or "cust1234.cdn.fp.net" or the like) with the subscriber domain name "images.subscriber.com." The CNAME is preferably somewhat related to the customer (e.g., textually) in order to allow this name to be visually differentiated from those used by other subscribers of the CDN. In this example the supername is "cdn.fp.net".

In some cases the subscriber domain host name may be retained in a proxy style URL and Host header in an HTTP request that reaches the CDN.

The CNAME assigned by the CDN may be referred to herein as a supername. When a client name resolution request for a subscriber host name is directed to a CDN CNAME the name will be resolved using a CDN DNS service (rendezvous) which is authoritative for the CNAME, and the rendezvous service will return a list of VIPs in the CDN that are suitable for the client to contact in order to consume the subscriber's service (e.g., for that subscriber's content). Preferably, the rendezvous service will return VIPs that are not only available but have sufficient excess capacity and are in close network proximity to the client.

In the example above, the subscriber domain name "images.subscriber.com" will be resolved using a CDN DNS service that is authoritative for the CNAME. The DNS service that is authoritative for "images.subscriber.com" may be outside of the CDN DNS service, in which case it will typically return a CNAME record indicating the supername. From the above example, that might, e.g., be "images.subscriber.com.cdn.fp.net". Subsequent resolution of that name would then be from the CDN DNS service, and would return a list of VIPs in the CDN. Those of ordinary skill in the art will realize and understand, upon reading this description, that other methods may be employed to determine the supername associated with the subscriber domain name, and that the subscriber domain name may directly be a supername.

A similar process may apply within the CDN, when one CDN service requests resolution of the domain name of another CDN service (not necessarily a caching service). The rendezvous may return a list of VIPs directly or could redirect the resolution to a CNAME for the internal service that should be used.

Binding Names (BNAMES)

A binding name (BNAME) is the name to which a CNAME maps for the purpose of binding physical addresses. CNAMES with the same BNAME are, by definition, bound to the same physical addresses. While binding names are usually the same as CNAMEs, it is possible to have multiple CNAMES map to the same BNAME (the effect of which is to ensure that certain CNAMES will always be bound together).

A mapping or binding (BNAME) is established, mapping binding names (BNAMEs) to subsets of clusters in the CDN. Thus, each BNAME is bound to some subset of clusters in the CDN. (Clusters are discussed in greater detail below.)

It should be appreciated that the concept of a binding name (BNAME) is internal to the CDN and is not a standard DNS concept. Those of ordinary skill in the art will realize and understand, upon reading this description, that the same effect as BNAMEs may be achieved in DNS by mapping different CNAMEs to the same physical address.

When DNS-based rendezvous occurs, the CNAME in the request is mapped internally to a BNAME, for which a set of VIPs currently bound to that BNAME is defined. The rendezvous service and/or the client then selects the appropriate subset of this binding list.

Binding

Binding is the process of establishing that requests for certain subscriber services (or other internal requests) will be available at certain endpoints in the CDN. In an embodiment, each request collection lattice (described below) has an upper subset (a contiguous collection of ancestor nodes, starting with the maximal nodes in the lattice) consisting solely of domain-limited request collections (i.e., request collections that depend only on the domain name). From this subset of the lattice the binding domain of the lattice can be derived, the set of BNAMEs that all matching requests must be relative to. Binding is then accomplished in two steps, first each BNAME is bound to some subset of clusters in the CDN, and then the binding domain (BNAME) projection of the original request collection lattice is bound to each cluster based on the BNAMEs bound there. The projection of the original request collection lattice is an equivalent subset based on the subset of BNAMES (every path in the lattice that does not match at least one of the BNAMEs is removed from the projection). If the BNAME to virtual address (e.g., BNAME to VIP) mapping changes, or if the BNAME to terminal request collection mapping changes, then the effective binding from properties (terminal request collections) to virtual addresses (e.g., VIPs) changes, and this information will be reflected in the mapping used by rendezvous.

While the BNAMEs in the binding domain of a given request collection do not all have to be bound to the same physical clusters, all request collections that have a given BNAME must be bound everywhere that domain name is bound. This is preferable for correctness, because in an embodiment, the rendezvous decision is based solely on the BNAME, so the system must be sure that all clusters provided as rendezvous targets for a given domain name will have the ability to handle all request collections based on that domain name. The binding of domain projections as just described ensures that all relevant request collections will be bound, and that all irrelevant ones will not.

Finally, rendezvous services make use of the current state of BNAME bindings, and may combine this with knowledge of network weather and each endpoint's availability, load, and proximity to the client's resolver to decide how to resolve canonical domain names to endpoint addresses.

Rendezvous

Rendezvous is the binding of a client with a target service. Rendezvous may occur within and across network boundaries:

internal services may rendezvous to other internal services;
external clients may rendezvous to internal services;
internal services may rendezvous to external services; and
external clients may rendezvous to external services.

In general, rendezvous may involve several stages, some or all of which may need to be repeated on subsequent contacts to target service. While rendezvous may be DNS-based, it should be appreciated that the process need not involve a DNS-based rendezvous service:

1. A client-side service binding policy is evaluated by the client, resulting in a list of symbolic service locators and a reuse policy for the service locator list. This evaluation may use any information available to the client to determine the result.
2. The list of service locators is evaluated by a rendezvous service, resulting in a list of physically addressable service endpoints and a reuse policy for the endpoint list. The location of the rendezvous service used here is itself resolved using an earlier instance of rendezvous. The evaluation may use any information available to the rendezvous service to determine the result.
3. A client-side service binding policy is evaluated by the client, resulting in a choice of one of the physically addressable service endpoints, and a reuse policy for that endpoint. This evaluation may use any information available to the client to determine the result.
4. Any attempted contact of the rendezvous service and or the target service using the previously determined endpoint may result in a command to redirect to a different rendezvous service or target, with a new reuse policy for the result. The redirection may use any information available to the target service to determine the result, may specify the new target in terms of a new client side binding policies, service locators, or physical endpoints. Depending on the form in which the redirect command is specified, the client may need to restart the rendezvous process at an earlier step in order to re-derive a new endpoint to contact. The client's response to the redirect may also be influenced by the previously established client-side binding policy. Any finite number of redirects is possible.

For example:

The policy in step [1] could specify an explicit list of domain names or URLs, or it could specify a script to be executed locally which returns such a list, or it could specify a query to another service (e.g., a compute service, collector service, state service, or content delivery service).

The policy in step [2] could be a policy, e.g., as described in U.S. Pat. No. 7,822,871 (the entire contents of which are fully incorporated herein for all purposes), and information retrieved from other services could be information about the location of the resolving client (or the likely client on whose behalf the request is being made), and information about the state of the network (both the CDN and the underlying IP network).

The policy in step [3] could be a simple as a random choice, or another local or remote computation or collector-based query.

The reuse policies in each step specify whether the results of that step may be reused over multiple service contacts, and if reusable, the time period over which the result of that step may be reused. Time periods may be relative to the passage of real time and/or the occurrence of future asynchronous events.

In general, each service endpoint is addressable within the system so that it can be identified using the rendezvous system and so that it can be contacted and/or connected to using whatever connection protocol(s) is (are) in use. In the case of a DNS-based rendezvous system, each service endpoint is preferably addressable by one or more domain names so that it can be found using the DNS-based rendezvous. A service endpoint may be operated as a multihomed location with multiple IP addresses. Thus, when a client asks a DNS-based rendezvous server to resolve the endpoint's domain name the rendezvous system will return one or more of the addresses associated with that name. That client may then access the service endpoint at one of those addresses.

End to End

Figure 3C:
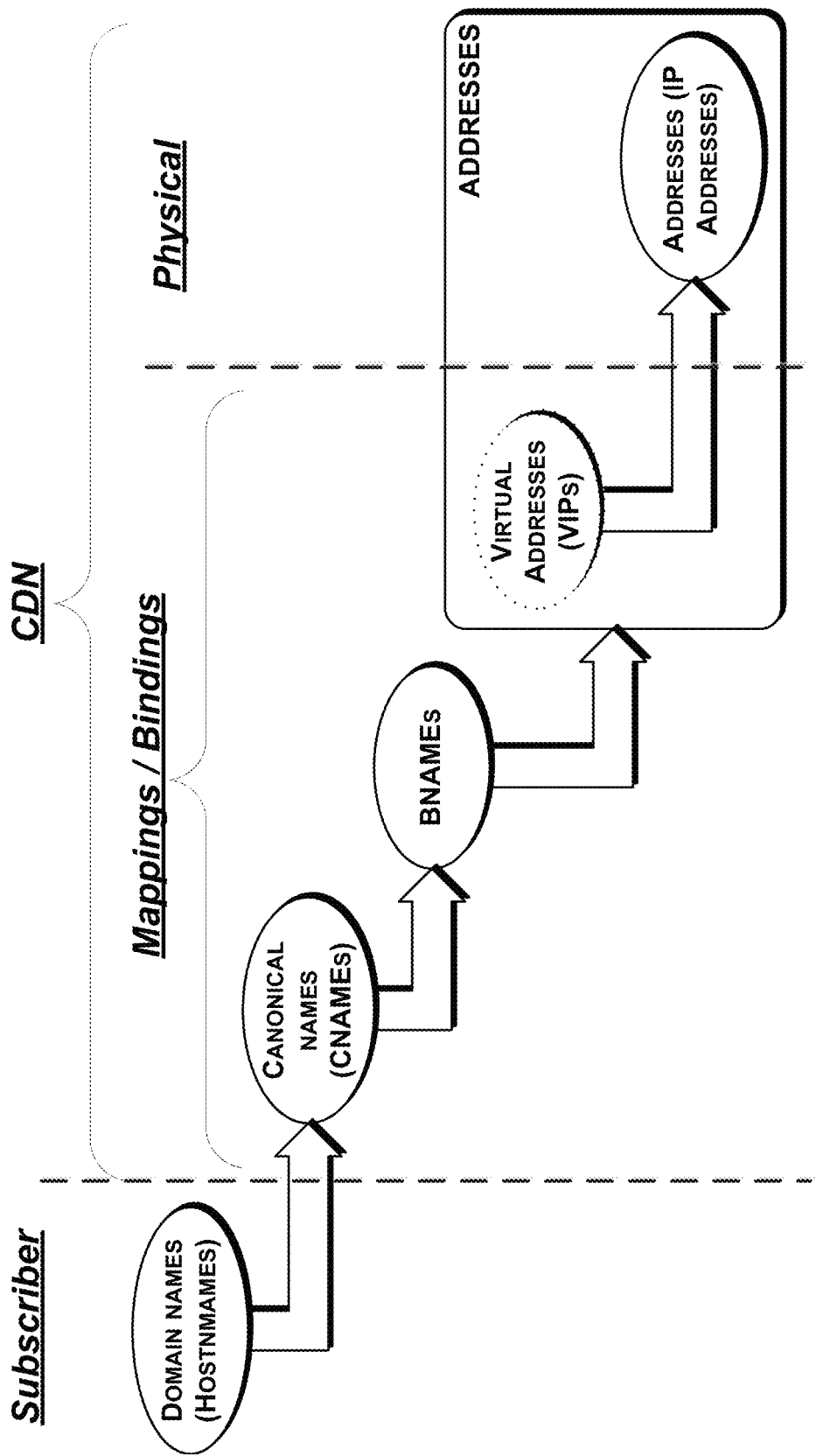
FIG. 3C depicts various aspects of exemplary bindings in an exemplary CDN in accordance with an embodiment.

As shown in FIG. 3C, binding occurs at/in many levels: subscriber domain names (hostnames) map to canonical names (CNAMEs) in the CDN. The CDN's CNAMEs map to BNAMEs that are bound/mapped to virtual addresses (e.g., VIPs) corresponding to subsets of clusters in the CDN. Each virtual address (e.g., VIP) corresponds to one or more physical addresses. It should be appreciated that in cases where the virtual addresses are actual addresses (e.g., where VIPs are actual IP addresses), the mapping from BNAMEs to virtual addresses to actual addresses is essentially a mapping from BNAMEs to actual addresses (e.g., to IP addresses).

Figure 3D:
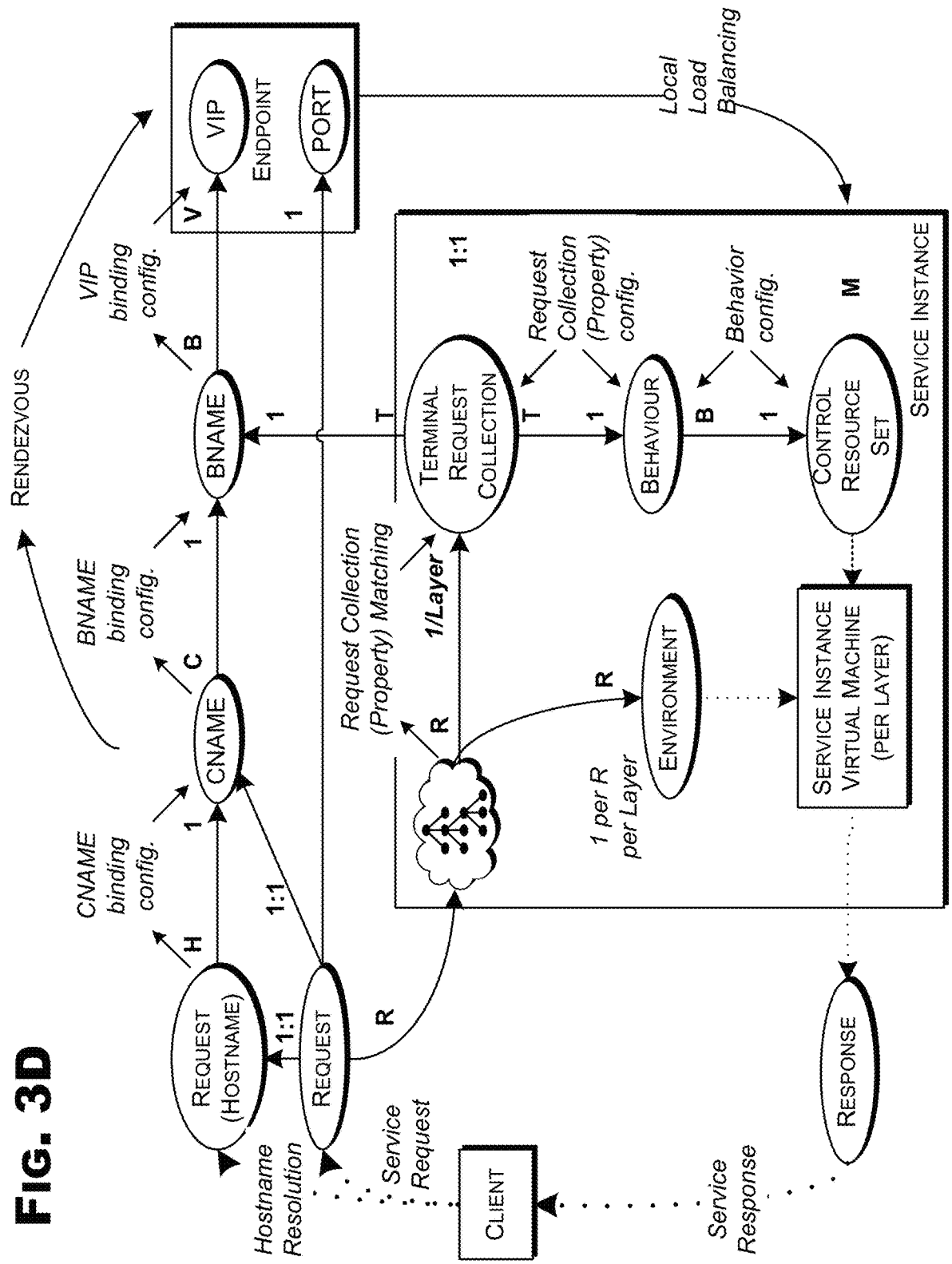
FIG. 3D depicts various aspects of binding and rendezvous in an exemplary CDN in accordance with an embodiment.

As an example (involving DNS based rendezvous), as shown in FIG. 3D, the end to end process from request to response may traverse several levels of indirection.

Request Processing

Request Collections and Binding Domains

Binding is a concept that applies to all service types, not just caching Bindings are based on request collections and their binding domains. Each request collection defines a set of matching requests to a particular kind of service based on various attributes of the request. Since each matching request implies a hostname (which implies a CNAME, which in turn implies a BNAME), the binding domain of a request collection is the set of BNAMEs implied by the set of matching requests.

When a request collection is bound to a service instance at some endpoint it means that all requests that match the request collection may be served from that service instance at that endpoint. Service types include not only caching but also rendezvous, as well as other CDN services such as configuration, control, reduction, collection, object distribution, compute distribution, etc.

Examples of request collections include regular expressions over domain names (for DNS rendezvous), and regular expressions over URLs (for HTTP services), but, as will be discussed below, other more complex characteristics of requests may be incorporated in the definition of request collections, including any information that is contained in or derivable from the request and its execution environment within and around the service processing the request. Request collections are organized into a set of lattices, one per service type per layer, as described next.

Service Configuration Layers

Each service type T defines an arbitrary but fixed number NT of configurable layers of request processing, analogous to an application-level firewall. The idea is that the processing of each request proceeds through each layer in turn, possibly rejecting, redirecting, proxying from a peer, or allowing the request to continue to the next layer with a possibly modified runtime environment.

For each layer, a mapping is defined from the request collections into behavior configurations. The bindings and behavior mappings are delivered to the service in advance via one or more layer configuration objects (LCOs) or their equivalent. As each layer is processed in turn for each request (from layer (NT-1) to layer 0), the behavior of the layer is defined by the configuration assigned to the matching request collection at that layer, and by a discrete local state variable for that request collection at that layer. The local state variable captures the service's disposition toward responding to requests of that collection (and changes in this state variable can be used to denote transitions in the service's local readiness to respond to requests in that collection). Each layer also defines a default behavior to apply to requests that do not match any node in the hierarchy.

Any given time, the design and implementation of a particular service instance may dictate a certain fixed number of layers, any number of layers up to some maximum, or an unbounded number of layers. As the implementation of that service evolves the constraints on the number of layers may change to accomplish additional degrees of freedom and levels of modularity in the configuration of that service type. Different layers of a service could also potentially be reserved for specific purposes (such as using some to handle subscriber-specific behaviors, using others to handle behaviors derived from system or service level policies).

Not all request collections in a lattice need to be the terminal result of matching a request—some are intended as preliminary matches for descendant request collections. A terminal request collection is a node in the lattice that may be the terminal result of a request match (all bottoms of the lattice must be terminal, interior nodes may be either terminal or nonterminal).

Request Collection Lattices

Each version of a service is designed to have one or more request processing layers. The configuration of a layer is defined via a request collection lattice (RCL) and a behavior mapping. The RCL is computed from the set of request collections bound to the layer (and all their ancestors), and the behavior mapping maps the behavior identifiers produced by each terminal request collection to the control resources that implement the behavior.

Each request collection specifies its parent request collections, a set of constraints on matching requests, and an associated configuration (environment settings and a behavior) to be applied to those requests. To compute the configuration applicable to a request the service layer performs a breadth first search of the hierarchy starting with the tops of the lattice, capturing information along the way, until the request matches a node that is either a bottom of the lattice or has no matching child nodes. If multiple nodes would match at a given level in the lattice, only one is chosen (the implementation may order the sibling request collections arbitrarily, search them in that order, and take the first match). Additionally, there may optionally be at most one request collection descendant of any given request collection that is defined as the collection to use if no other descendant collection is matched at that level (the "else" collection).

The mechanism for computing this function may be configurable in a number of different ways. There may be a number of discretely identifiable languages or schemes for defining request constraints based on the needs and capabilities of a particular service layer, and the configuration of a service layer specifies the scheme and the lattice of request collections to process. Some example constraint schemes might be based on glob patterns or regular expressions evaluated over attributes of the request (such as the source IP, request URL, request headers, etc. in the case of an HTTP request). Constraint schemes should be such that constraints are easy to evaluate based on information taken directly from the request or on the result of request collection processing to that point in the lattice. This is not strictly necessary, however, and it is conceivable that a constraint scheme would allow functional computation of values that depend not only on the request but on other information retrievable in the network (e.g., geographic information inferable from the request).

The effects of matching a request collection are to constrain the next set of nodes to examine and to specify one or more of the following optional attributes:
1. A control environment: (CE) (a list { . . . } of Name=Value assignments which must be constants, not functions of the request);
2. A request environment: (RE) (another list [ . . . ] of Name=Value assignments which may be functions of the request);
3. A behavior identifier: B (a string); and
4. A single layer control instruction <I> (where I is one of a small number of predefined opcodes governing the flow from layer to layer).

These attributes incrementally update a single control environment, request environment, behavior identifier, and layer control instruction that are accumulated as request collections match. In effect, each matching node inherits the settings for these attributes by the nodes which have previously matched, and may override them.

Control environments are intended as symbolic categorization labels of the requests that match to that point, whereas request environments capture information from the particular request matched. In the end, the combination of both of these environments can be thought of as a single environment of name value pairs.

Each terminal request collection (TRC) must be associated with a unique BNAME and behavior label. Once a terminal request collection is matched and none of its children matches, the accumulated control environment, request environment, behavior identifier, and request collection state completely specify the behavior of that service layer for that request.

The BNAME of a request collection may be established by an explicit constraint or implied by another Host or CNAME constraint together with the mapping:

Host→CNAME→BNAME which is known by the configuration system. To bind a BNAME to a layer of some service instance means to include the set of all terminal request collections with that BNAME (and all their ancestors) in the request collection lattice for that layer. So the bindings for a service instance are defined by the set of BNAMEs assigned to each of its layers. This request collection lattice is derived automatically from the set of all applicable request collection definitions and the current bindings, and it must respond automatically to changes in binding assignments.

The scope of BNAMES will generally be per service type, per layer (though it is also possible to reuse the same request collection lattice across multiple layers, in which case the same BNAMEs would be used, as discussed later).

Layered Request Processing

Figure 3E:
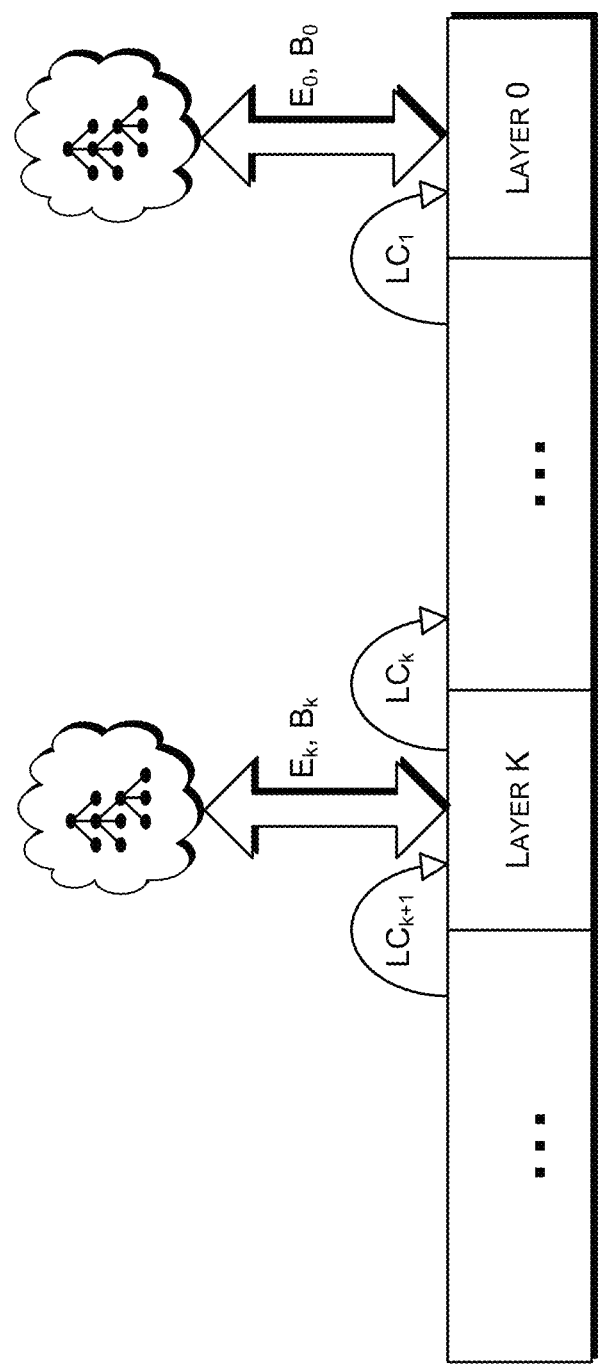
FIG. 3E depicts aspects of request processing by a service in an exemplary CDN in accordance with an embodiment.
Figure 3F:
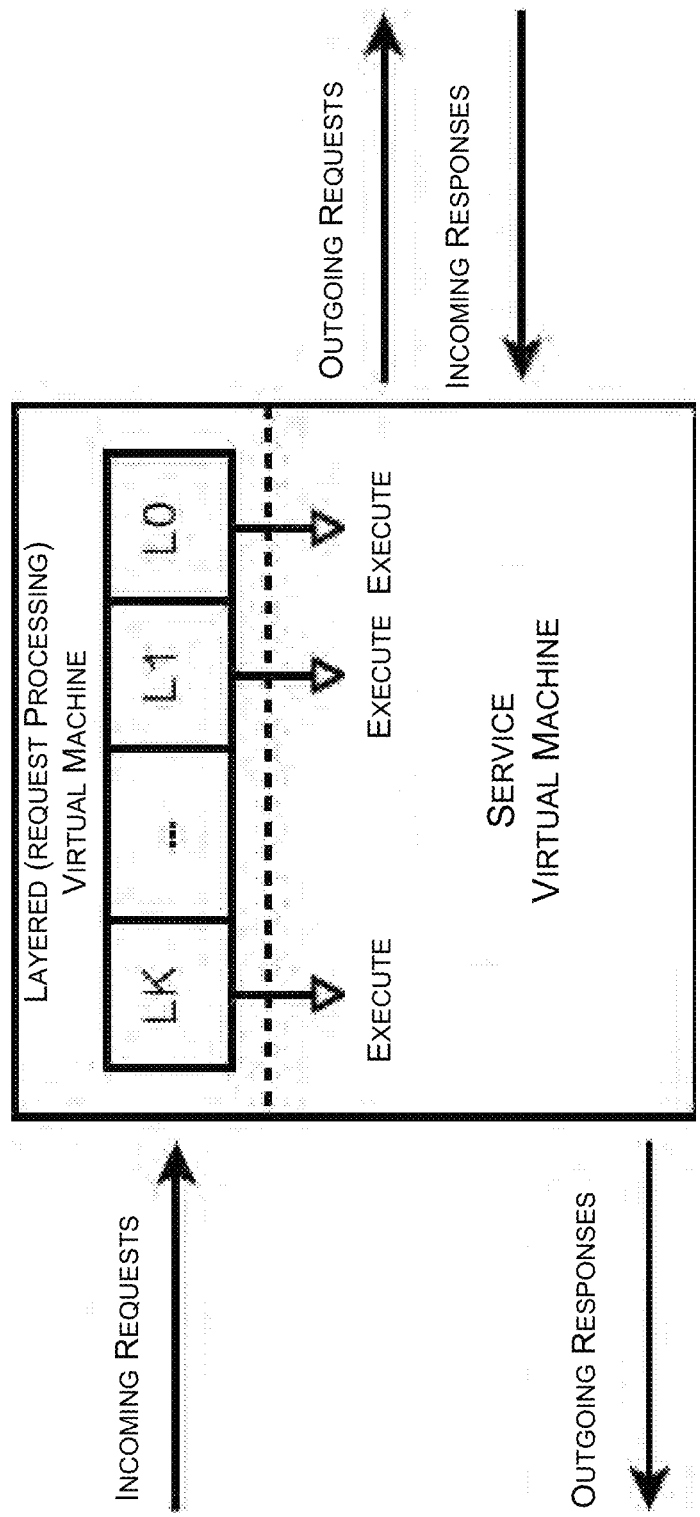
FIG. 3F depicts aspects of a general purpose and configurable model of request processing in accordance with an embodiment.
Figure 3G:
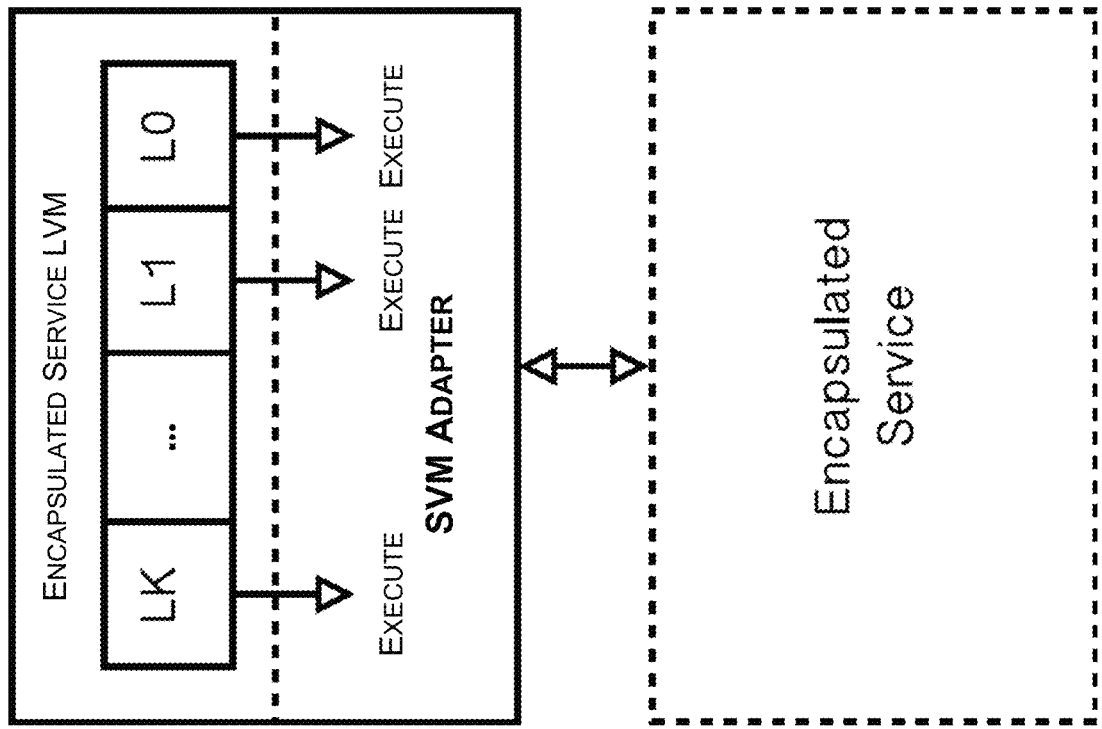
FIG. 3G depicts aspects of using the model of FIG. 3F to encapsulate services in accordance with an embodiment.
Figure 3H:
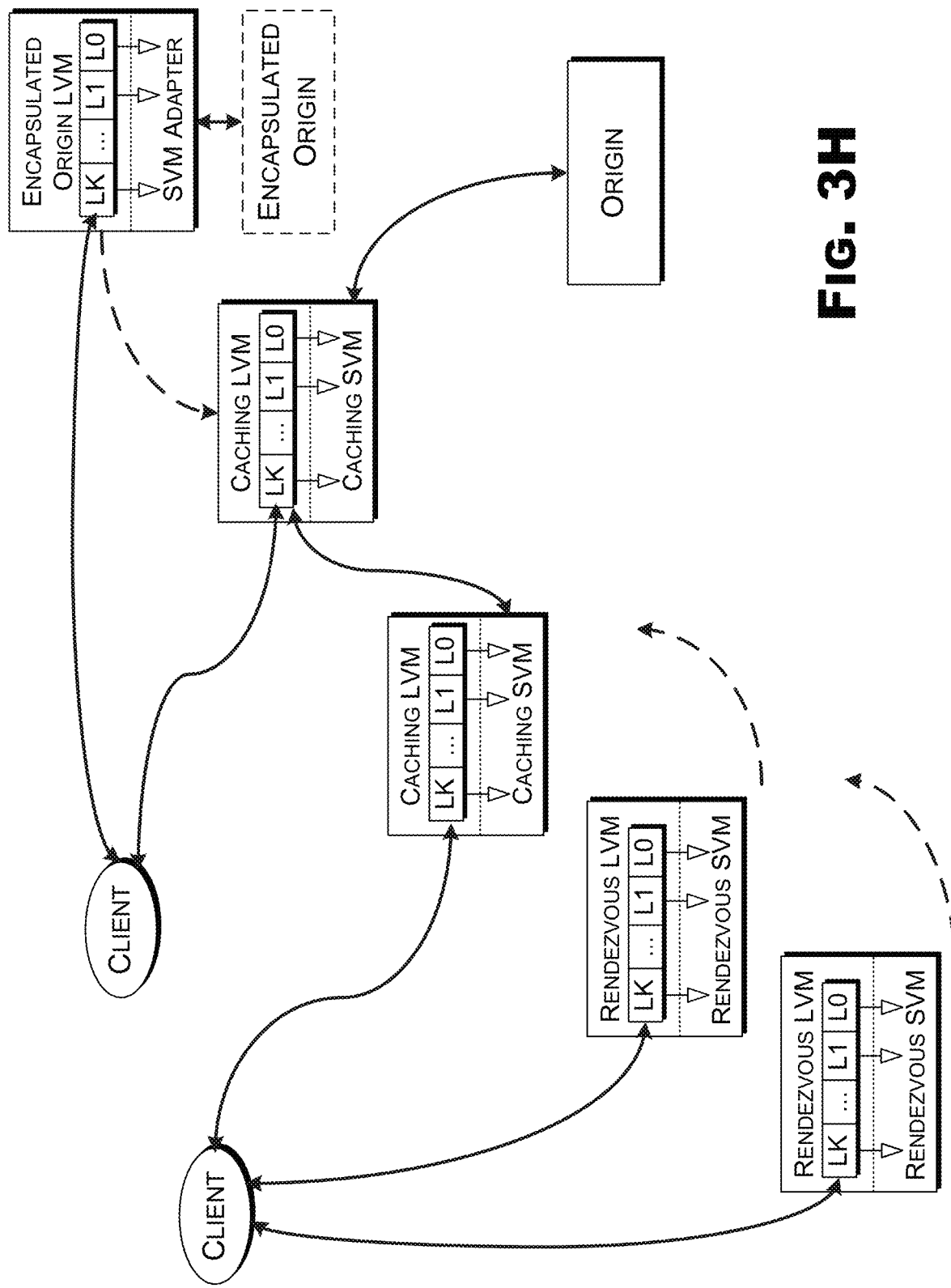
FIG. 3H depicts aspects of a layered virtual machine in accordance with an embodiment.

The general algorithm for processing a request is to compute the applicable configuration for each layer from the request collection lattice bound to that layer, apply it, and conditionally move to the next layer until the last layer is reached or a stop control is issued (see FIG. 3G). To apply the configuration means to execute the specified behavior in the context of the environment.

The effect of "executing" a behavior, as far as the layered (request processing) virtual machine (LVM) is concerned can be anything. It could add the behavior to a list to be executed later, or execute it now, it is entirely up to the service. For example, the net effect could be to augment or modify the subscriber/coserver sequence from what it might have been had the preceding layers not been executed.

The act of applying the configuration may result in various service specific side effects that are of no concern to the layered configuration flow, as well as one side effect that is relevant—the modification of versions of the original request. It is assumed that there will be one or more named, possibly modified versions of the original request, along with the unmodified original request. These are of interest to the flow only because one of them must be used when searching the request collection hierarchy of the next layer. The layer control instruction indicates not only control flow (whether processing should stop after application or continue to the next layer), but it also specifies the named request variant that should be used to index the next layer's request collection lattice in cases where the flow continues to the next layer. Thus there are essentially two variants of the layer control instruction:
  stop causes all subsequent layers to be ignored and the request processing to be considered complete, or
  next(R) which indicates that control should flow to the next layer using named resource variant R as the index of the request collection hierarchy (where if R is omitted it defaults to the same request used as the index in the previous layer).

Figure 3I:
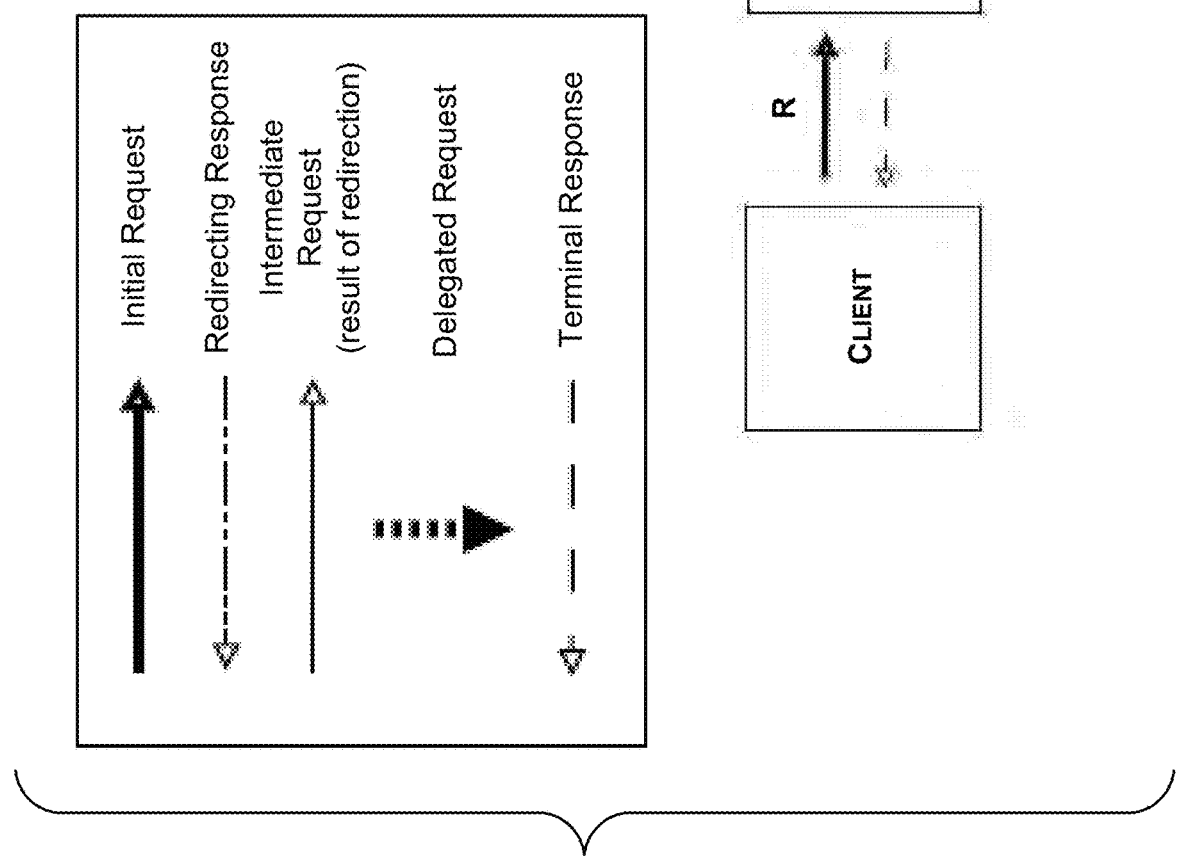
FIGS. 3I-3K depict three basic service instance interaction patterns in accordance with an embodiment.
Figure 3J:
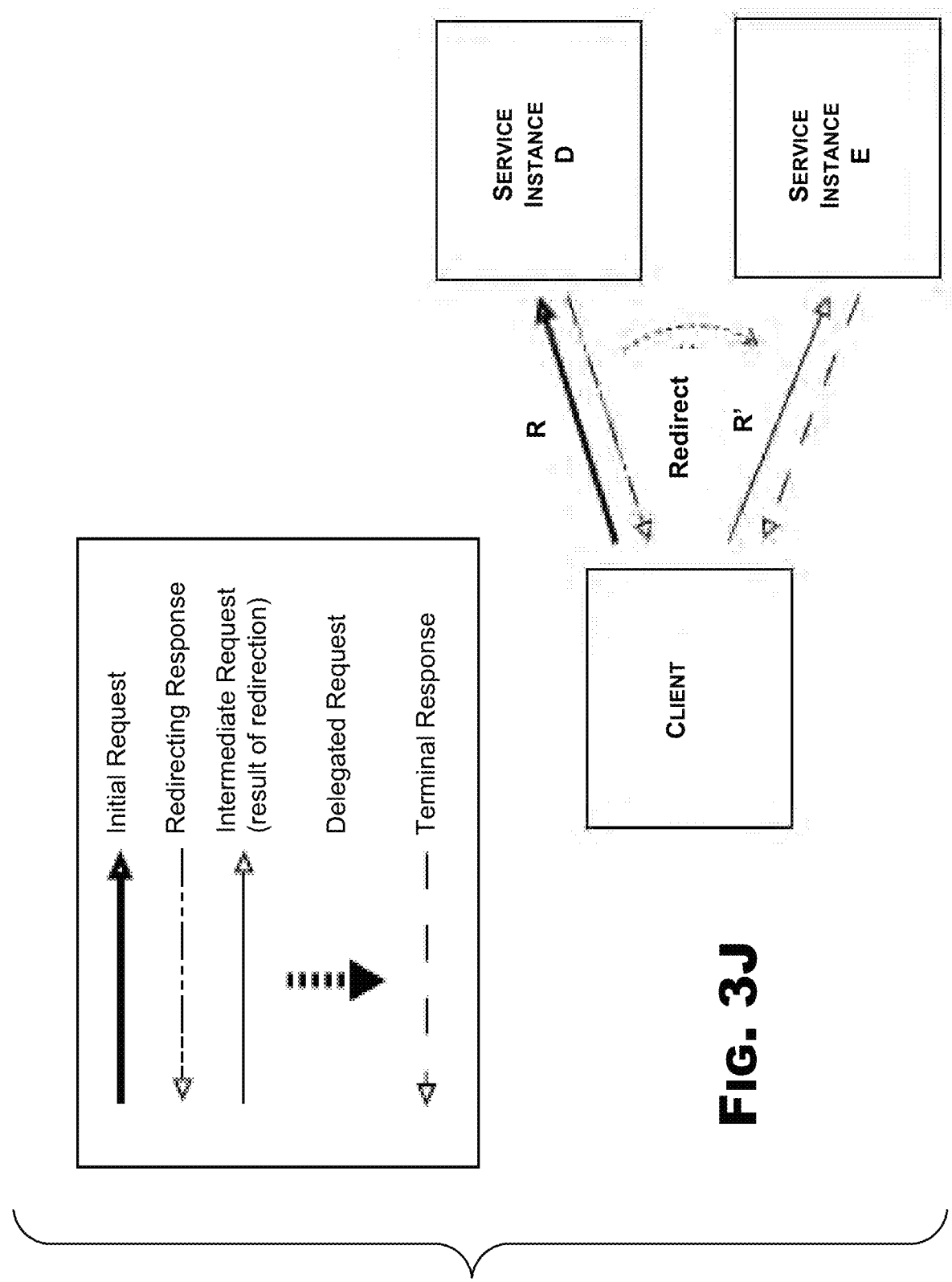
Figure 3K:
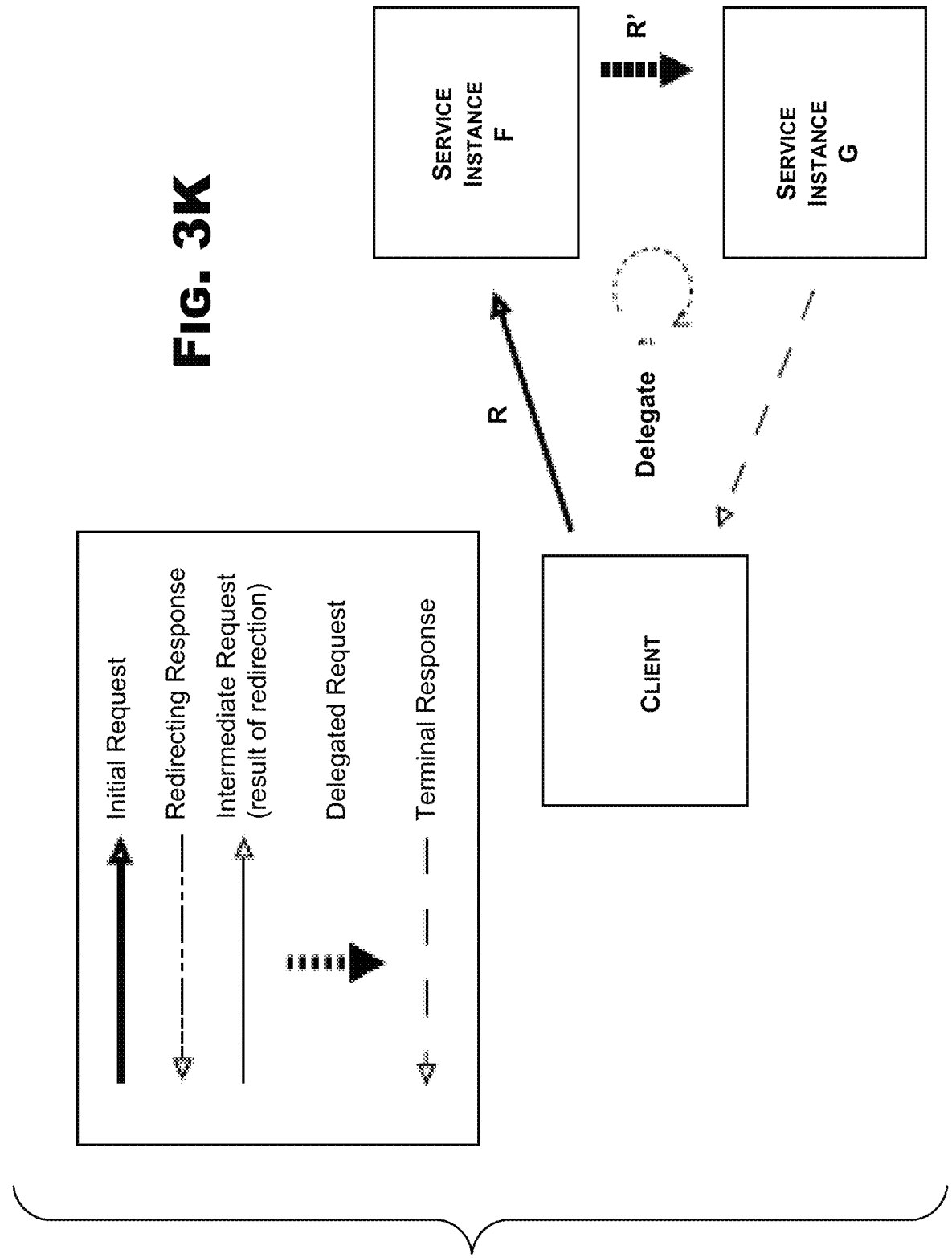
Figure 3L:
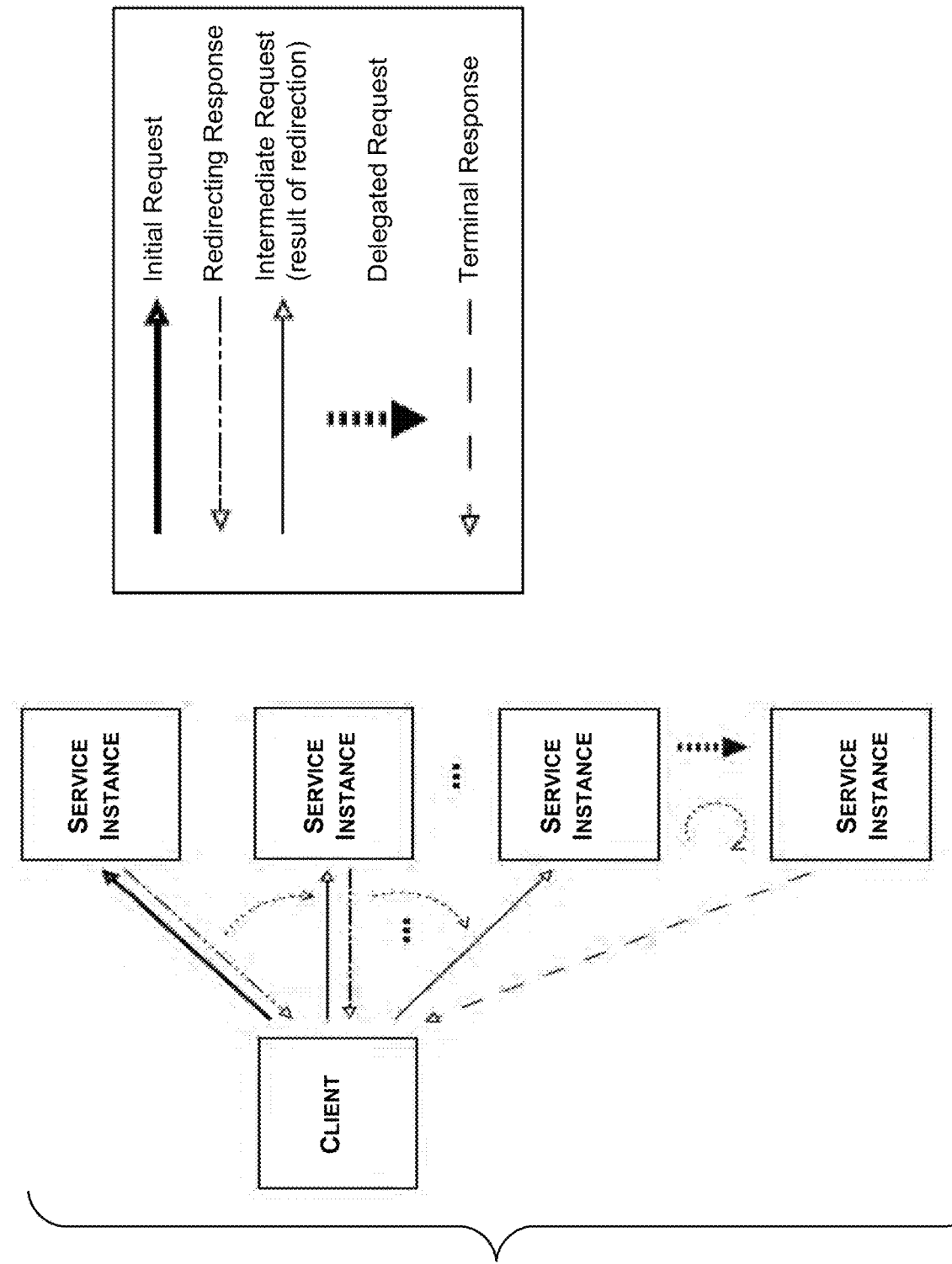
FIG. 3L depicts aspects of exemplary request processing interactions in accordance with an embodiment.
Figure 3M:
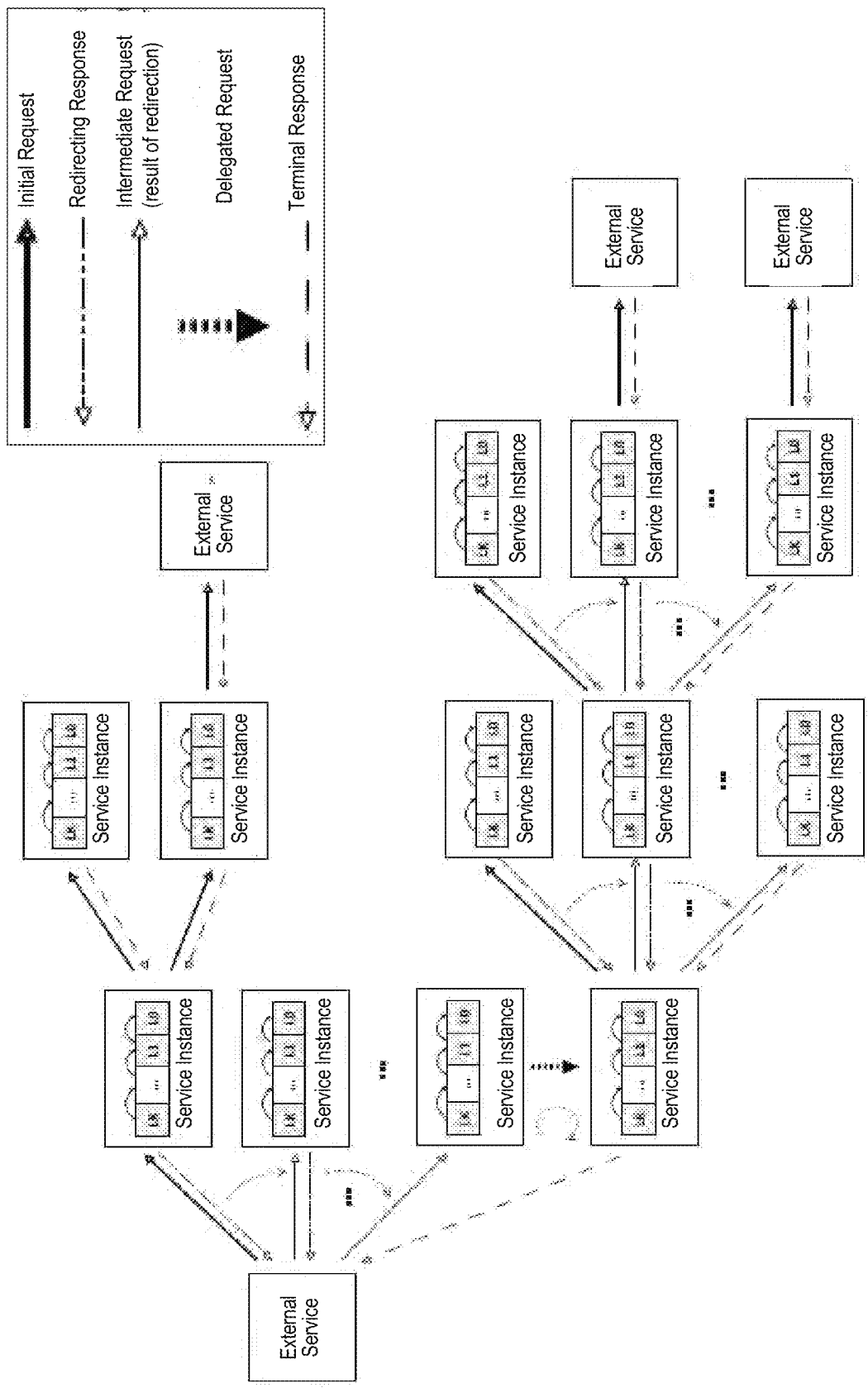
FIG. 3M depicts aspects of an exemplary distributed request processing system in accordance with an embodiment.

Thus, as shown in FIG. 3M, the LVM provides a general purpose and configurable model of request processing that can be configured and controlled in a common way across different service types, and an LVM implementation interacts with the service specific virtual machine using a common interface for executing behaviors in the context of environments. It is even conceivable that the LVM and SVM components could be distributed across two remotely located implementation components. This technique could be used, for example, to encapsulate services as layer-programmable services (see, e.g., FIG. 3N). FIG. 3-O illustrates how each service has its own LVM front-end, and external services may or may not be outfitted with an encapsulating LVM of their own.

Reuse of a request collection lattice across multiple layers can be useful to define behaviors that are dependent on or associated with a property but are not delivered to the service in the same package as the main configuration for that property. In a sense, the TRC that results from matching a request against a request collection lattice can be used to index a behavior that changes from layer to layer, and the matching process need only be done once. To implement this optimization, recognize that two layers have exactly the same bindings (though perhaps different behavior mappings), and use the same lattice for each.

One way to model what happens at a layer is the following set of statements showing the match of a request R against a request collection lattice $RCL_L$ for a given layer L, resulting in an environment $E_L$ that encodes everything needed to know about the match (static and dynamic). Then merge that environment with the environment inherited from the previous layer E, and execute the behavior implied by the environment.

$E_L$:=rclmatch($RCL_L$, R)

$E'$:=$E \oplus E_L$ $R_O$=execute($E'$, R)

In this model the rclmatch function models the process of traversing the request collection lattice, finding the matching request collection, and computing the resulting environment. The execute function abstracts the interface between the layer machine and the underlying service virtual machine.

Note that the control and request environments have been combined, and it is assumed that the behavior is identified with an environment variable. But separating out the part of the matching process which is relatively static from the part that is captured based on the request is more likely to be the way it is implemented efficiently. It is also useful to factor the behavior specification out of the environment, so that a behavior mapping can be specified separately from a request collection lattice, which also allows them to be reused independently.

In this next model, a match now returns a TRC (which has associated with it a set of attributes corresponding to the static environment of that node in the lattice, including a behavior label, TRC.B) along with a request specific dynamic environment that is computed by the matching process from the request. The dynamic state of the request collection can also be modeled as a variable in this environment. Using the matched TRC, index the layer-specific behavior mapping $Behavior_L$ to retrieve the control resource (s) that define the behavior for this layer, and execute them:

(TRC, $E_L$).=rclmatch($RCL_L$, R)

$E'$:=$E \oplus E_L$

Control:=$Behavior_L$(TRC.B)

$R'$=execute($E'$, Control, R)

In general, TRC.B may be considered as a set of any number of behavior specifying variables that are used to look up the service specific instructions to execute at this layer. In some systems, the symbolic behavior label could be identified by the subscriber and coserver identifiers which were extracted from the matching request collection node, where the request collection lattice in this case is a flat list of aliases with no environment settings (e.g., a GCO). Using the behavior labels (subscriber and coserver), look up the control resource(s) that specify the behavior implementation, resulting in the control resource (e.g., a CCS file).

The layered approach to request processing may provide for separate levels of configuration for each service. Each layer may be configured with request collection(s) (with patterns) that cause a reject, redirect, or continue to the next step (possibly with a configurable delay for throttling).

For example, some or all of the following checks may be made at various layers:

SRCIPCHECK layer {Source IP black/whitelist}

ALIASCHECK layer {Is it a bound property?}

VIPCHECK {Is it over an acceptable VIP and protocol for this property?}

CRICHECK layer {compute CRI from alias/property, path, and relevant headers (Content Encodings, languages, Vary headers), and may allow additional black/whitelist}

POPCHECK layer {popularity service check}

STRIPECHECK layer {peering (responsibility) check (may result in special instructions for the next layer e.g., proxy vs. fillPeer vs. fillSuper)}

Normal Application Level request/response processing (with a set of environment variables, a set of data, and a script).

Those of ordinary skill in the art will realize and understand, upon reading this description, that the above list is given only by way of example, and that different and/or other layers or functions may be used. In addition, some or all of the layers described in the examples above may be combined.

Service-Specific Virtual Machines

Each service implementation defines a virtual machine model of its behavior in response to service requests. This virtual machine model specifies a configurable interface, in effect making the service's behavior programmable by policies, parameters, and executable procedures defined in a configuration specified external to the service implementation. Different configurations may be in effect at different times in the same service implementation.

To enable human users to easily understand and specify behaviors for the service's virtual machine, a separate configuration language may be used to specify the desired behavior, and an original configuration expressed in this language may require translation or compilation through one or more intermediate representations, ultimately resulting in a controlling configuration defined in the language of the service's virtual machine. The controlling configuration is defined by the request collection lattices per layer, and the set of behavior mappings. Each behavior mapping relates behaviors to control resources. A behavior identifier (together with an environment) is the outcome of one layer's worth of processing described in the previous section, and the behavior mapping defines the set of control resources to "invoke" to implement that behavior.

A controlling configuration is delivered in the form of one or more control resources that may provide parameters, policies, and executable instructions to the service virtual machine, and the service's behavior for the original configuration is defined by the execution or interpretation of the control resources that were derived from it. Control resources may be self-contained or make references to other control resources available in the network.

Though the virtual machine model interface and its configurability are fixed for a given implementation of a service and each service instance executes a single implementation, the controlling configuration for a service instance may be changed dynamically in response to changes in the original configuration or changes to any other inputs to any step in the control resource translation process, including any information available to the network. A controlling configuration may also be divided up into any number of parts which are independently derived from separate original configurations, change dynamically at different times, and affect different aspects of the service's behavior. Furthermore, the relationship between original configuration objects as viewed by a configuration service, and the controlling configurations as viewed by a service virtual machine is many-to-many—changes to one original configuration object may affect the value of many derived controlling configurations, and one controlling configuration may be derived from many original configurations.

Notes on Request Processing

The request processing discussion presented two variants of what happens at a layer. The preferred of which was:

(TRC, $E_L$):=rclmatch($RCL_L$, R)
$E':=E \oplus E_L$
Control:=$Behavior_L$(TRC.B)
R'=execute(E', Control, R)

It should be appreciated that implicit here is that execute depends on the current state of the underlying service virtual machine, and may change it as a result. Note too that E' is a changed version of E, which affects the next layer's processing, as does R' (a modified version of the layer's input request). To make the service state change more explicit the execute step may be described or modeled as:

(R, S):=execute (Control, R, E', S)

This may be wrapped in a procedure (called process here) that performs one layer of processing (for layer L):

(R', E', S'):=process(L, (R, E, S))

This essentially captures all available state that can be used in the processing of a request, given that interactions of the service with other services (such as processing responses from outgoing requests) ultimately result in changes to state S.

To simplify this explanation, the opcode part (e.g., next (R) vs. stop) is omitted from this description. Those of skill in the art will realize and understand, upon reading this description, that the opcode part is included in the iteration from layer to layer.

By way of example, FIGS. 3I-3K depict three basic service instance interaction patterns (compose, redirect, and delegate, respectively).

As shown in FIG. 3I, service A constructs the response to R by composing one or more (in this case, two) sub-requests to service instances B and C together. It should be appreciated that sub-requests to service instances B and C can be invoked in any order, including in series or in parallel. It should further be appreciated that the client need not be aware of the involvement of B or C. In FIG. 3J (redirect), service D replies to the client that generated R with a redirecting response, and the client follows this redirect by issuing a request (preferably immediately) to service E. In the case of a redirecting response, the client is aware of and participates in the redirect. As shown in FIG. 3K (delegate), service F delegates the response to R via a hidden request to service G, and G responds directly to the client. In this case of a delegated response, the client need not be aware that the response is coming from a delegate service instance. As used herein, a hidden request is one not visible to the client. This interaction may also cascade over arbitrary combinations of redirect, compose and delegate steps, as shown in FIG. 3L.

As will be appreciated, the executed behavior may also cause state changes in other systems and the client. A behavior may involve returning no response, a redirecting response, or a terminal response to the client. A redirecting response may direct the client to issue another request to some other service (preferably immediately), possibly leading to further redirecting responses and ultimately leading to termination via a terminal response or non-response. Each response or non-response may affect the state of the client, possibly altering future requests issued by the client. A response received by the client can also have the effect of redirecting future independent requests to the extent that a response to an earlier request encodes information the client may use for future requests (e.g., as in HTML rewriting).

A behavior may also delegate a request to another service that will respond directly to the client, or may involve processing of responses to sub-requests issued to other services, where in each case the requests issued to other services are derived from the current values of R, E, and S (request, environment, state), which may change from layer to layer.

This interaction may also cascade over a network of service instances, ultimately terminating at service instances that do not issue any more outside requests, or at requests to external services.

FIG. 3L depicts request processing interactions, and FIG. 3M depicts aspects of an exemplary distributed request processing system according to embodiments of the system.

It should be appreciated that the interaction patterns shown in the figures here are only examples, and are not limiting. In addition, these examples focus on location interactions, whereas, as those of skill in the art will realize and understand, upon reading this description, a response may affect the manner in which subsequent requests are issued (since the state of a service or client receiving a response may be changed).

It should also be appreciated that a request directed to a CD service may have information associated therewith, and a request preferably refers to a request and at least some of its associated information. For example, in the case of an HTTP GET request, the request may be considered to include the GET request itself and HTTP headers associated with the request (i.e., the HTTP headers correspond to information associated with an HTTP GET request). As another example, a request (e.g., an HTTP POST) may have a body or payload associated therewith, and such a request may be considered to include some or all of the associated body/payload.

Applications

Configuration information may be distributed in various ways across the elements of the request processing system. Information-carrying elements of the system that may affect the processing of the request may include, without limitation:

the request itself;
the lattice of request collections bindable to a service instance at some layer;
behaviors and other identifiable configuration objects that can be referred to from requests, request collections, and configuration objects;
the service design (i.e., the particular service implementation that a service instance executes);
the state of the service at the time the request is processed.

The request, behavior, and environment that result at each layer of the matching process may be a function of any and all information available from these sources. As the request, behavior, and environment may be modeled simply as an environment (variables and their values), the term "environment" is used here as a general way to refer to all of these items.

As will be apparent to those of ordinary skill in the art, upon reading this description, the amount of information that the system may determine from a request spans a spectrum. At one end of the spectrum, a minimal amount of configuration information is received from the request itself, whereas at the other end of the spectrum the request may provide the basis for much more configuration information.

In each case, required configuration information not supplied via the request will come from the other elements.

Two example cases provided here show how information can be distributed across these elements. As with all examples herein, these are given for purposes of explanation and description only, and are not intended to be in any way limiting of the system.

Example—Case A

In this example, at one end of the spectrum, the environment resulting from the matching process receives minimal configuration information from the request itself (e.g., just the protocol, host, and a component of a URL path), along with a behavior (e.g., a CCS file) assigned to a specific subscriber property. All information needed to execute any behavior (e.g., CCS) is embedded in the design of the service, and all other information needed to specify how to serve content (e.g., resources) for this specific property is embedded in the contents of the identified behavior (CCS). The behavior has no parameters.

In the examples described here, behaviors may be expressed in CCS files. Those of skill in the art will realize and understand, upon reading this description, that different and/or other schemes may be used to specify behavior, and the system is not limited to CCS files.

The environment resulting from the matching process in this case is minimal, only specifying the behavior as the name of the behavior control resource (e.g., a CCS file), while the other information in the environment is just the representation of the (possibly modified) request itself.

In these examples, each node is defined as a set of constraints on the environment, plus a set of outputs to the environment. The set of outputs is the set of assertions that will be made into the environment if the constraints in the first set are satisfied. That is, if the constraints of a node of the request collection lattice are satisfied, then the corresponding assertions are made and processing continues. The constraints (or their evaluation) may also have side effects of capturing values into the environment, and the outputs may refer to values in the environment.

In the examples shown in the drawings the two sets (constraints and outputs/assertions) are shown in curly braces.

As used herein, "% (VAR)" in a string refers to the value of an environment variable VAR in a string, either in the capture case or the output case. The notation @func(args, . . . ) refers to values that are computed by built-in functions on the environment (and the state of the network), and these values may be used to constrain values in the environment or to define them. It should be appreciated that this is just one possible way to represent constraints used by the matching process, and that this notation is used only by way of example.

Figure 3N:
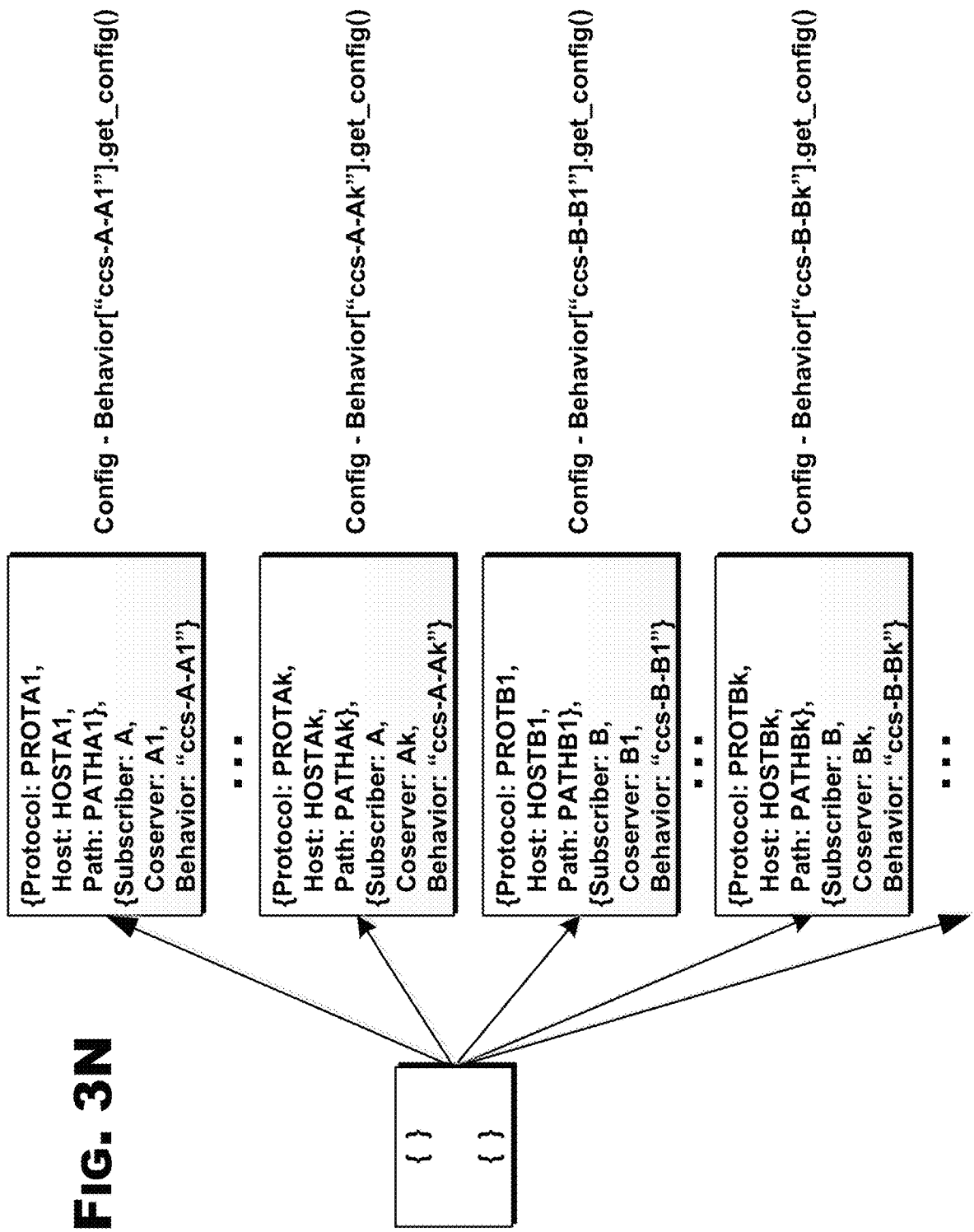
FIG. 3N shows an exemplary request collection lattice with unparameterized specific behaviors in accordance with an embodiment.

FIG. 3N shows an example request collection lattice (RCL) for case A with unparameterized specific behaviors. In the example in FIG. 3N, the request collection lattice has a number of nodes (at the same level), each having a different set of constraints. As shown in the example in FIG. 3N, in one node the constraints are
  {Protocol: PROTA1, Host: HOSTA1, Path: PATHA1}
and the corresponding outputs/assertions are
  {Subscriber: A, Coserver: A1, Behavior: "ccs-A-A1"}.
In this case "Protocol", "Host", and "Path" are determined from the request, and "Subscriber," "Coserver," and "Behavior" are environment values that are used by the request collection lattice. Accordingly, in this case, if the constraints in this node are satisfied (i.e., if the protocol is "PROTA1", the host is "HOSTA1", and the path is "PATHA1"), then "Subscriber" is set to "A", "Coserver" is set to "A1", and "Behavior" is set to "ccs-A-A1". Note that the values of the variable constraints may be constants (e.g., strings or numbers interpreted literally), patterns, or other symbolic expressions intended to determine whether the actual value is an acceptable value, possibly capturing values from the actual value that will be stored in the environment if the constraint is satisfied. When these conditions are satisfied, the configuration will be set to the behavior based on the "Behavior" variable (i.e., "ccs-A-A1"):
  Behavior["ccs-A-A1"].get_config( )

Example—Case Z

At the opposite end of the spectrum, one or more generic behaviors may be defined that accept parameters from the environment. The more generic the behavior, the more parameters it will tend to rely on. FIG. 3-O shows an example of this case—an exemplary request collection lattice with parameterized generic behaviors.

In this example, for the sake of simplicity, it is assumed that the service implementation is the same for either of these cases, is designed such that behavior files (e.g., CCS files) can be executed (e.g., via execution of a distinguished function present in all CCS files, such as get_config) with parameters from the environment, and the result of that execution will specify everything about the subscriber as constants embedded in a data structure passed to the underlying service virtual machine As shown in FIG. 3-O, a node ("Reseller with Embedded Config Entry") has the constraints:
  {Authorization: "Level3/% (Reseller) % (Principal):% (Signature)"}
and the corresponding assertions:
  {BillingID1: "% (Reseller)",
  BillingID2: "% (Principal)",
  Secret: @lookupsecret: ("% (Reseller)", "% (Principal) ")}
If the constraints are satisfied (i.e., if the value of "Authorization" matches the indicated string pattern, where the embedded references to % (Reseller), % (Principal), and % (Signature) may match any substring), then the environment values for Reseller, Principal, and Signature are assigned to those substrings captured from the value of Authorization. The secondary statements further assign the value of BillingID1, BillingID2, and Secret to new values that make use of the recently updated values of Reseller and Principal.

Note that the value of "Secret" is determined as a function (lookupsecret) of two environment variables (Reseller and Principal).

It should be appreciated that the comments in the nodes (text after the "#") are given only to aid description.

If the constraints on the node "Reseller with Embedded Config Entry" are satisfied, then the system will check the sub-nodes of that node in the RCL. If any node in the RCL reached, the environment will have values passed down (inherited) along the path in the RCL to that node.

One sub-node ("Reseller subcategory") has constraints:
  {Category: "Foo",
  Signature: @signature([V1, V2, V3])}
and corresponding assertions
  {Behavior: "Generic1"}
If this path is taken, (i.e., if the "Category" is "Foo", and the Signature is @signature([V1,V2,V3]), then the configuration will be either Config=Behavior["Generic1"].get_config(Env[V1], Env[V2], Env[V3])
or
Config=Behavior["Generic1"].get_config(Env)
depending on whether the get_config function expects the parameters to be passed as arguments, or is, itself, responsible for retrieving the parameters from the passed Environment.

Another sub-node ("#Reseller subcategory") has constraints:
{Category: "Bar",
Signature: @signature([V4, V5, V6])}
and corresponding assertions
{Behavior: "Generic2"}
If this path is taken, the behavior will be
Config=Behavior["Generic2"].get_config(Env[V4], Env[V5], Env[V6])
or
Config=Behavior["Generic2"].get_config(Env)
again, depending on how the get_config function expects the parameters to be passed as arguments.

In case A, behavior (CCS) files may be generated with embedded constants (e.g., represented as a sequence of named handler expressions, with the constants as arguments), and the distinguished function used to invoke the behavior (CCS) would take no arguments. The resulting configuration is then executed by the service virtual machine with the rest of the (possibly modified) request as an argument.

In case Z, a more generic behavior (CCS) file may be generated, where the configuration settings are not embedded as constants, but are parameters to the distinguished function that will be called to return the configuration. These parameters must therefore come from the environment.

The entire request collection lattice may be recast from case A for all properties to use this representation, or it may just be used for selected properties.

Thus the two cases are just styles of configuration that can be adopted on a property-by-property basis (or over groups of related properties), differing in the way information is distributed across the information-carrying elements.

As an example, the configuration of a case Z-style class of properties (i.e., a meta-property) may expose parameters for billing ID and origin server hostname. A suitably generic behavior (e.g., CCS) that accepts at least these two parameters with defaults for other parameters would have to exist in advance. Some other information in the request (e.g., URL or headers) could be determined in advance in order to be able to distinguish a request as a case Z-style request, e.g., a pattern on the hostname, or a pattern on an authorization value. An authorization value in the request would preferably contain a valid signature of the critical request parameters, and the presence of the authorization value may be used to indicate a case Z-style request.

A parent request collection may define a hostname constraint, and may have patterns that capture the values of the exposed parameters from the request into the environment, including a reference to the behavior that corresponds to the parameterized behavior (e.g., CCS).

A child request collection may then define a constraint on the authorization value that is a function of the values of the parameters and some secret, where the secret (or a key that can be used to look up the secret) is declared in the request collection lattice or computed as a result of the matching process, and the secret is also known by the signer of the request. Any number of these child request collections may be defined with different secrets. If there are constraints on the configuration parameters that are allowable for a given secret (e.g., ranges of billing IDs), these constraints may also be expressed at this level (or below) in the request collection lattice.

The matching process at this level applies the secret to selected values in the environment to compute the signature and compare it to the one in the request (environment) taken from the authorization value. At this point, a matching request is considered authorized if the signatures match and the environment has defined values for the exposed configuration parameters. The generic behavior may now be invoked (e.g., the generic CCS) with the extracted parameters to instantiate the configuration for this request (if not already instantiated). The matching process may also continue further down in the lattice, adding additional parameters to the environment, until it reaches a terminal request collection that matches, so different generic behaviors may be used for requests administered under the same secret.

The process may continue over a collection of subsequent requests, as derived requests are submitted to other services (e.g., external, peer, or parent services) in order to construct a response to the original request.

Note also that if the matching process fails for any reason (e.g., if the computed signature does not match the contained signature, or parameters needed for the signature are missing, such as the origin), other lattice nodes may be tried for a match, and if no match is found the request may be rejected. This is true in general for all nodes in the lattice.

As noted elsewhere herein, a rejection may be active or passive and may or may not provide an indication of the rejection. Whether a rejection is active or passive and the indication (or not) provided may be configured as part of a behavior.

The following are some variations of these non-limiting examples:

There may be multiple "meta-properties," since the concept applies to defining classes of configurations and may be useful for implementing classes of configurations (e.g., something that is common across all properties of a subscriber, or certain subscriber types).

An extreme case may involve encoding the entire behavior (e.g., a CCS file) as the value of a request attribute (parameterized by other headers in the request).

The configured meta-property behavior may be in an initial layer, the result of which is just to change the bindings in subsequent layers, possibly involving dynamic loading of new portions of the request collection lattice for those layers, allowing them to recognize properties that were not previously bound.

These various examples (and others) may be combined. For example, FIG. 3P shows an exemplary request collection lattice with mixed parameterization styles, combining sub-lattices of cases A and Z and others. Other approaches representing intermediate cases between the two extremes of cases A and Z are also possible and are contemplated herein.

Request Redirection Through Request/Response Modification

As discussed earlier, an incoming request may be modified so that subsequent processing of the request uses a modified form of the request. Similarly, the requested content may be modified during the response processing. Modified request and response processing may cause the client's request to be directed elsewhere for subsequent processing, e.g., to another instance of the delivery service, another delivery service, another CD service, another CDN, an origin server, or even some combination thereof. This can be implemented by having the client direct its (possibly modified) request elsewhere, or by directing the (possibly modified) request elsewhere on behalf of the client. As examples, a protocol specific to the service could be used (e.g., the redirect response code 302 for HTTP), or references in an HTML resource could be modified, or a client connection could be handed off to other service instance, or the (possibly modified) request could be proxied to another service instance over a different connection.

The modified content may be HTML, which may involve modifying references in the content (e.g., URLs). For example, the references may be modified so that subsequent requests associated with those references will be directed somewhere other than to the origin server, such as to one CDN or another. The modified references may refer more generally to a CD service, requiring a rendezvous step to identify the service instance, or to a specific CD service instance. Such modified references could also incorporate location information in a modified hostname for later use by a rendezvous service. E.g., the location information could be the IP address of the client, or some other location information derived from the client location and subscriber configuration.

This redirection functionality may be implemented within a CD service, or in request processing logic external to the service itself, or as a special redirection CD service.

If the redirection does not require any non-standard behavior by the client, it is referred to as transparent redirection.

For example, a request for content (e.g., a resource), may result in one or more of the following:
content is served by the delivery service.
content is modified before or while being served by the delivery service.
the request (possibly modified) is directed elsewhere.

In another example, in the case of a rendezvous service, the client request may be a request to be directed to a service instance. The rendezvous service may modify the request and then respond based on that modified request. That response may direct the client to another instance of the rendezvous service or another rendezvous service for subsequent processing.

In some embodiments, a CD service may be located in front of or at ISP caches (between client and origin server) to perform redirection of client requests made to an origin server or client requests made directly to the cache.

In some embodiments, a CD service may be located at (in front of) a subscriber's origin server to perform redirection of client requests made to the origin server.

In such embodiments, the CD service may determine which content is preferably, but not necessarily, served by the CDN instead of by the origin server, and, to cause delivery of such content by the CDN when desired. Several factors could be used to determine whether the content is preferably, but not necessarily, served by the CDN, such as, e.g., CD configuration, subscriber configurations, content popularity, and network and server load at the origin server.

CDN Structure & Topology

Figure 4A:
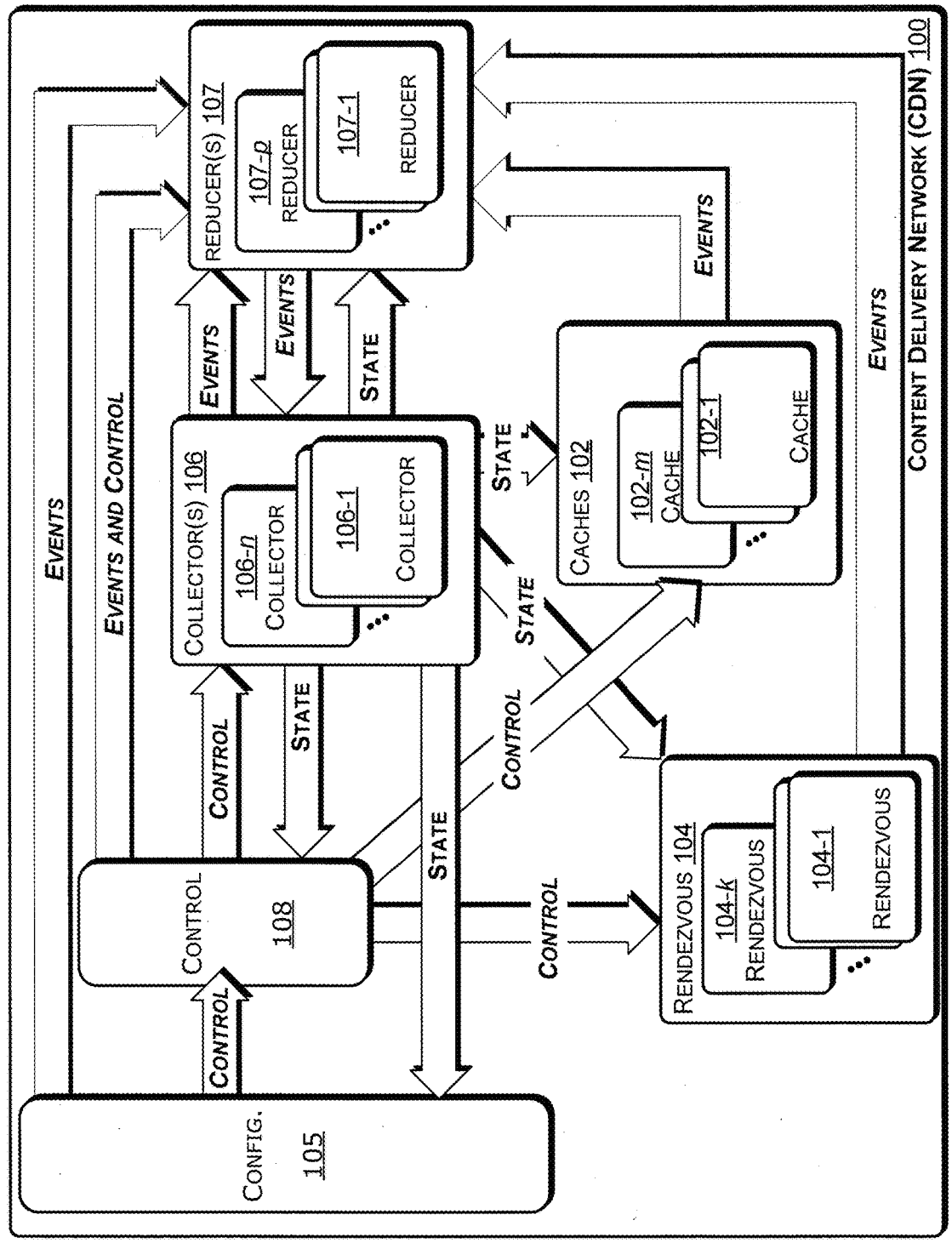
FIG. 4A to 4F show logical organization of various components of an exemplary CDN in accordance with an embodiment.

FIG. 4A shows an exemplary CDN 100, which includes multiple caches (i.e., cache services) 102-1, 102-2 ... 102-m (collectively caches 102, individually cache 102-i), rendezvous mechanisms/systems 104-1 ... 104-k, (collectively rendezvous mechanism(s)/system(s) 104, made up of one or more rendezvous mechanisms 104-j), collector mechanism/system 106 (made up of one or more collector mechanisms 106-1 ... 106-n), reducer mechanism/system 107 (made up of one or more reducer mechanisms 107-1 ... 107-p), control mechanism/system 108, and configuration mechanism/system 105. The CDN 100 also includes various other mechanisms (not shown), including operational and/or administrative mechanisms, which together form part of an operation/measurement/administration system (OMA system).

Caches 102 implement caching services (which may be considered primary services 1016 in FIG. 1J); rendezvous mechanism(s)/system(s) 104 implement rendezvous services (which may also be considered primary delivery services 1016 in FIG. 1J); collectors 106 implement collector services e.g., services for monitoring, analytics, popularity, logging, monitoring, alarming, etc. FIG. 1J), and reducers 107 implement reducer services (1014 FIG. 1J).

With reference to FIG. 4A, components of the caches 102, rendezvous system 104, collectors 106, and control system 108, each provide respective event streams to reducers 107. The event stream(s) from the collectors 106 to the reducers 107 contain event information relating to collector events. Reducers 107 provide event streams to the collectors based, at least in part, on event streams they (reducers) obtain from the other CDN components. Collectors 106 may provide ongoing feedback (e.g., in the form of state information) to the control system 108 regarding ongoing status and operation of the CDN, including status and operation of the caching network 102 and the rendezvous system 104. Collectors 106 may also provide ongoing feedback (state information) to other CDN components, without going through the control system 108. Thus, as shown in the drawing, collectors 106 may also provide feedback (e.g., in the form of state information) to reducers 107, caches 102, and rendezvous mechanisms 104. The control system 108 may provide ongoing feedback (e.g., in the form of control information) to the various components of the CDN, including to the caches 102, the rendezvous mechanisms 104, the collectors 106, and the reducers 107.

It should be appreciated that other components (not shown) may also provide event streams to reducers 107 and may also receive feedback (e.g., state information) from collectors 106 and control information from the control system 108.

Thus, as will be described in greater detail below, caches in the caching network 102 may provide information about their status and operation as event data to reducers 107. The reducers 107 reduce (e.g., process and filter) this information and provide it to various collectors 106 which produce appropriate data from the information provided by the reducers 107 for use by the control 108 for controlling and monitoring operation of the CDN. The collectors 106 may also provide state information directly to other CDN components (e.g., to rendezvous mechanisms 104, caches 102, and/or reducers 107). Similarly, entities in the rendezvous mechanism or system 104 may also provide information to reducers 107 about their status and operation. The reducers 107 reduce this information as appropriate and provide it to the appropriate collectors 106. The collectors 106 produce appropriate data from the information provided by the rendezvous system 104 via reducers 107, and provide the data in some form to the control 108 and possibly directly to the rendezvous system 104. Data provided by the rendezvous system 104 may include, e.g., load information, status information of the various rendezvous mechanisms, information about which particular requests have been made of the rendezvous system, etc.

As will be explained, data from the caching network components and the rendezvous components are preferably provided to the reducers 107 in the form of event streams. The reducers, in turn, provide event stream data to the collectors 106. The caching network components 102 will preferably pull control data from the control 108, although some control data may be pushed to the caching network components. The control 108 may pull data from the collectors 106, although some or all of the data may be pushed to the control 108 from the collectors 106. The rendezvous system 104 may pull control data, as needed, from the control 108, although data may also be pushed by the control mechanism to the rendezvous system. Data provided to the content providers may be pushed or pulled, depending on the type of data, on arrangements with the content providers, and on interfaces used by the content providers.

Figure 4B:
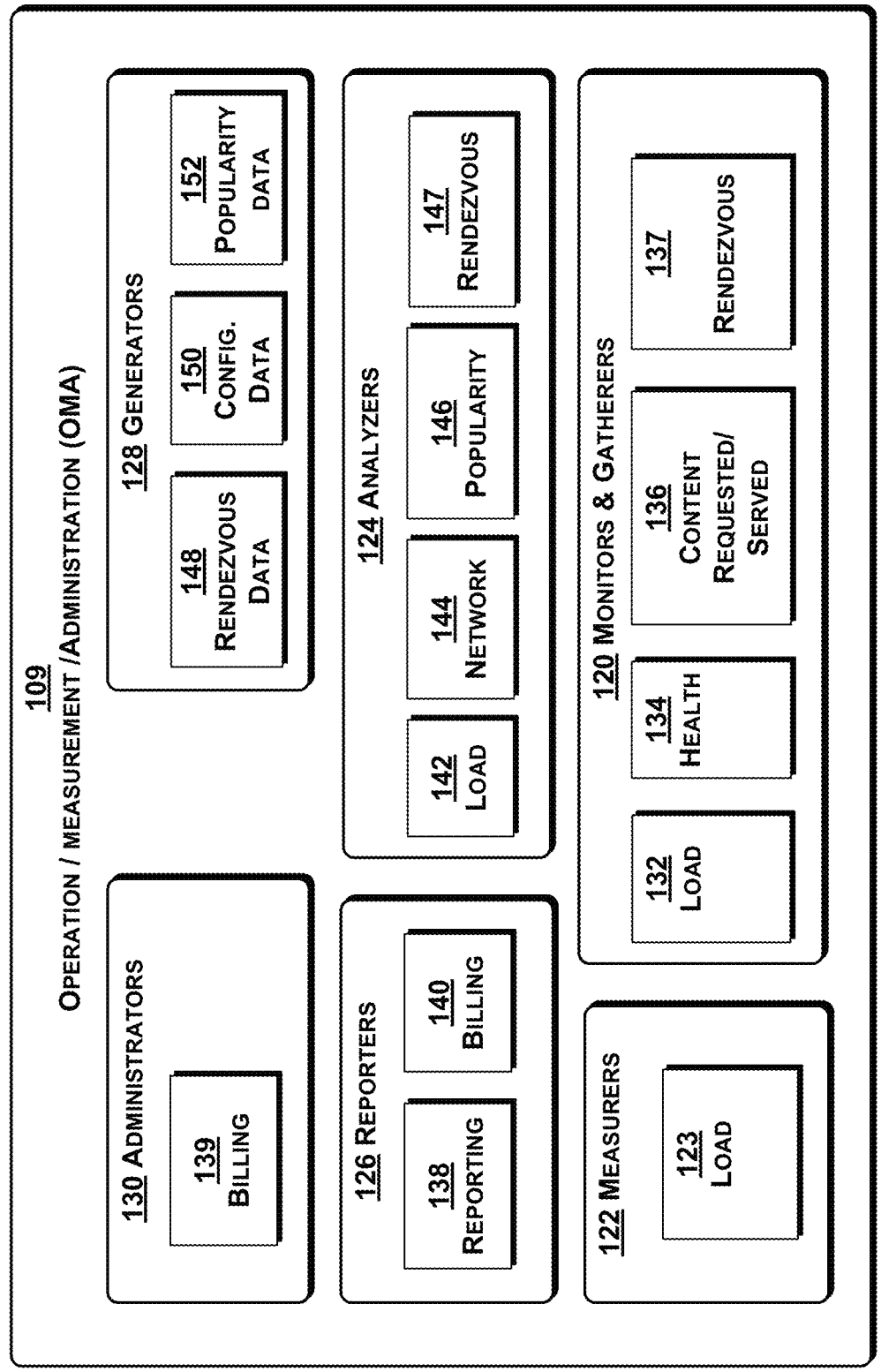

Collectors 106 may also be considered to be part of the operation/measurement/administration (OMA) system. With reference to FIG. 4B, the roles or functions of collectors (or collector services) 106 may be classified (logically) within the OMA 109 as one or more of:

monitors and gatherers 120,
measurers 122,
analyzers 124,
reporters 126,
generators 128, and
administrators 130.

Those of ordinary skill in the art will realize and understand, upon reading this description, that these logical classifications are provided merely as descriptive aids, and are not intended to limit the scope of the system in any way. In addition, it should be appreciated that some collectors or components of the OMA system may have more than one classification. While shown in the diagram in FIG. 4B as separate components, the functionality provided by these various components may be integrated into a single component or it may be provided by multiple distinct components. Thus, for example, a particular collector service may monitor and gather a certain kind of data, analyze the data, and generate other data based on its analysis.

The measurers 122 may include load measurers 123 that actively monitor aspects of the load on the network and the CDN. Measurers or measurement data generators (including load measurers 123) may be dispersed throughout the CDN 100, including at some caches, at some rendezvous mechanisms, and at network locations outside the CDN, and may provide their load information to the collectors 106 via reducers 107.

The monitors and gatherers (monitoring and gathering mechanisms) 120 may include load monitors 132, health monitoring and gathering mechanisms 134, mechanisms 136 to monitor and/or gather information about content requests and content served by the CDN, and rendezvous monitoring mechanisms 137 to monitor and/or gather information about rendezvous. Each of these mechanisms may obtain its information directly from one or more reducers 107 as well as by performing measurements or collecting other measurement data from the CDN. For example, load monitoring and gathering mechanisms 132 may gather load information from event streams coming via the reducers 107 and load information from load measurers 123. As will be appreciated, the load information from load measurers 123 may be provided to the load monitors 132 directly or via one or more reducers. When the rendezvous mechanisms are implemented using the DNS, each rendezvous mechanism may provide (as event data) information about the name resolutions it performs. The rendezvous monitoring mechanisms 137 may obtain this information from appropriate reducers.

The reporters (reporter mechanisms) 126 may include reporting mechanisms 138, billing mechanisms 140, as well as other reporter mechanisms.

The analyzers 124 may include load analyzers 142 for analyzing load information gathered by the load monitors and/or produced by the load measurers 123; network analyzers 144 for analyzing information about the network, including, e.g., the health of the network; popularity analyzers 146 for analyzing information about the popularity of resources, and rendezvous analyzers 147 for analyzing information about the rendezvous system (including, e.g., information about name resolution, when appropriate), as well as other analyzer mechanisms.

The generators (generator mechanisms) 128 may include rendezvous data generators 148 for generating data for use by the rendezvous system 104, configuration data generators 150 generating data for the control mechanism 108, and popularity data generators 152 for generating data about popularity of properties for use, e.g., by the caches 102, rendezvous mechanism 104 and/or the control mechanism 108, as well as other generator mechanisms. Those of ordinary skill in the art will realize and understand, upon reading this description, that data generated by various generators 128 may include state information provided to other CDN components or services. For example, the rendezvous data generators 148 generate rendezvous state information for use by the rendezvous system 104.

Those of ordinary skill in the art will realize and understand, upon reading this description, that different and/or other mechanisms may be used or provided in each of the categories. In addition, those of ordinary skill in the art will appreciate that new mechanisms may be added to the collectors as needed. In particular, customized collector mechanisms may be provided, as needed, to obtain and analyze information from the event streams produced or provided by the reducers.

Those of ordinary skill in the art will realize and understand, upon reading this description, that the ability to provide customized reducer and collector mechanisms for monitoring, gathering, analyzing, reporting, and generating, provides the CDN operators the ability to customize operation of the CDN with or without modification of the CDN components. That is, once CDN components have been deployed and configured, the CDN can modify its operation based on the information/event logs streamed from the CDN components (e.g., caches) without having to modify the CDN components themselves to produce such information. However, as discussed herein, CDN components may be modified in order to change their roles or flavors, and such changes may include reconfiguring the event streams produced by a CDN component.

Figure 4C:
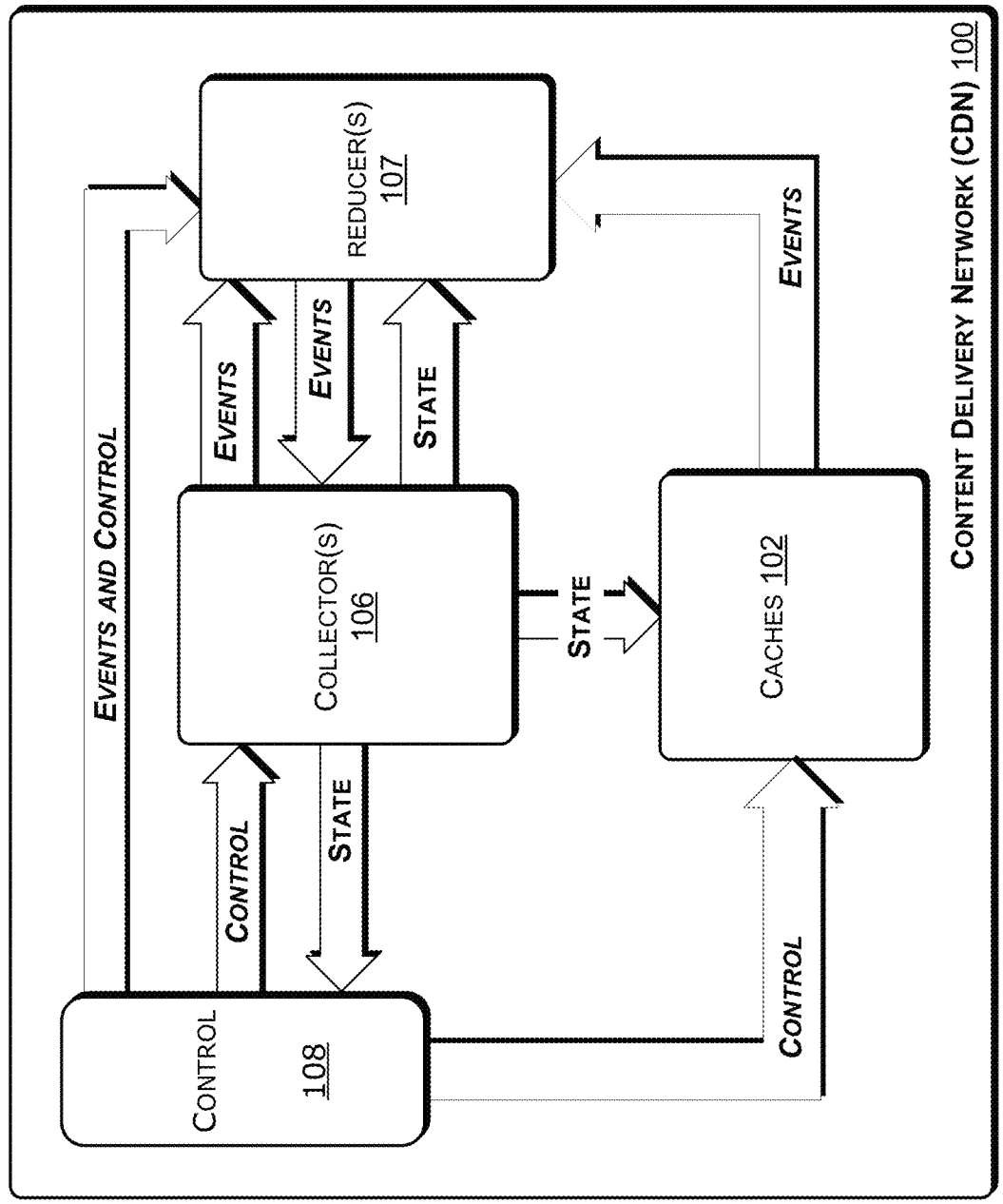
Figure 4D:
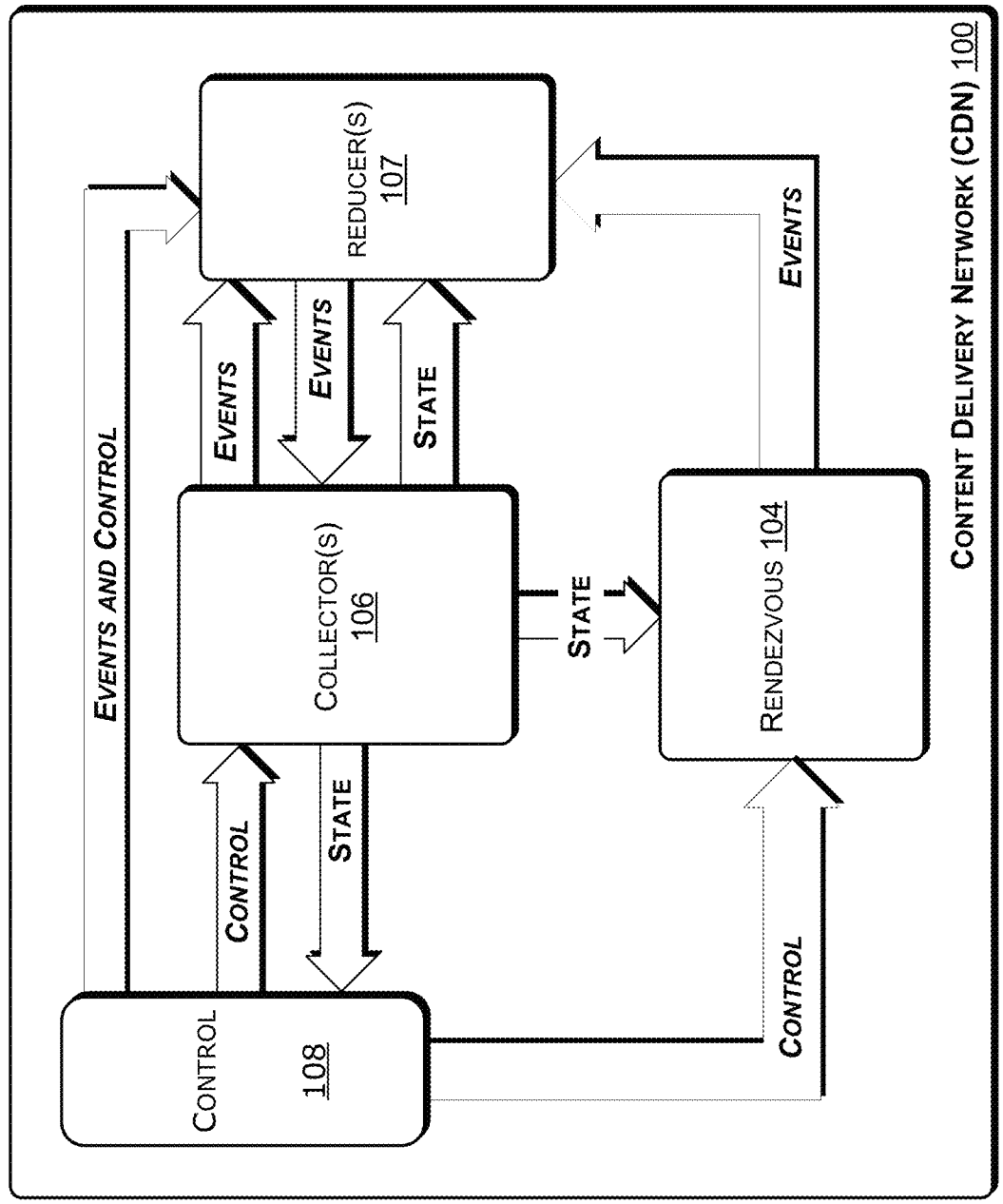
Figure 4E:
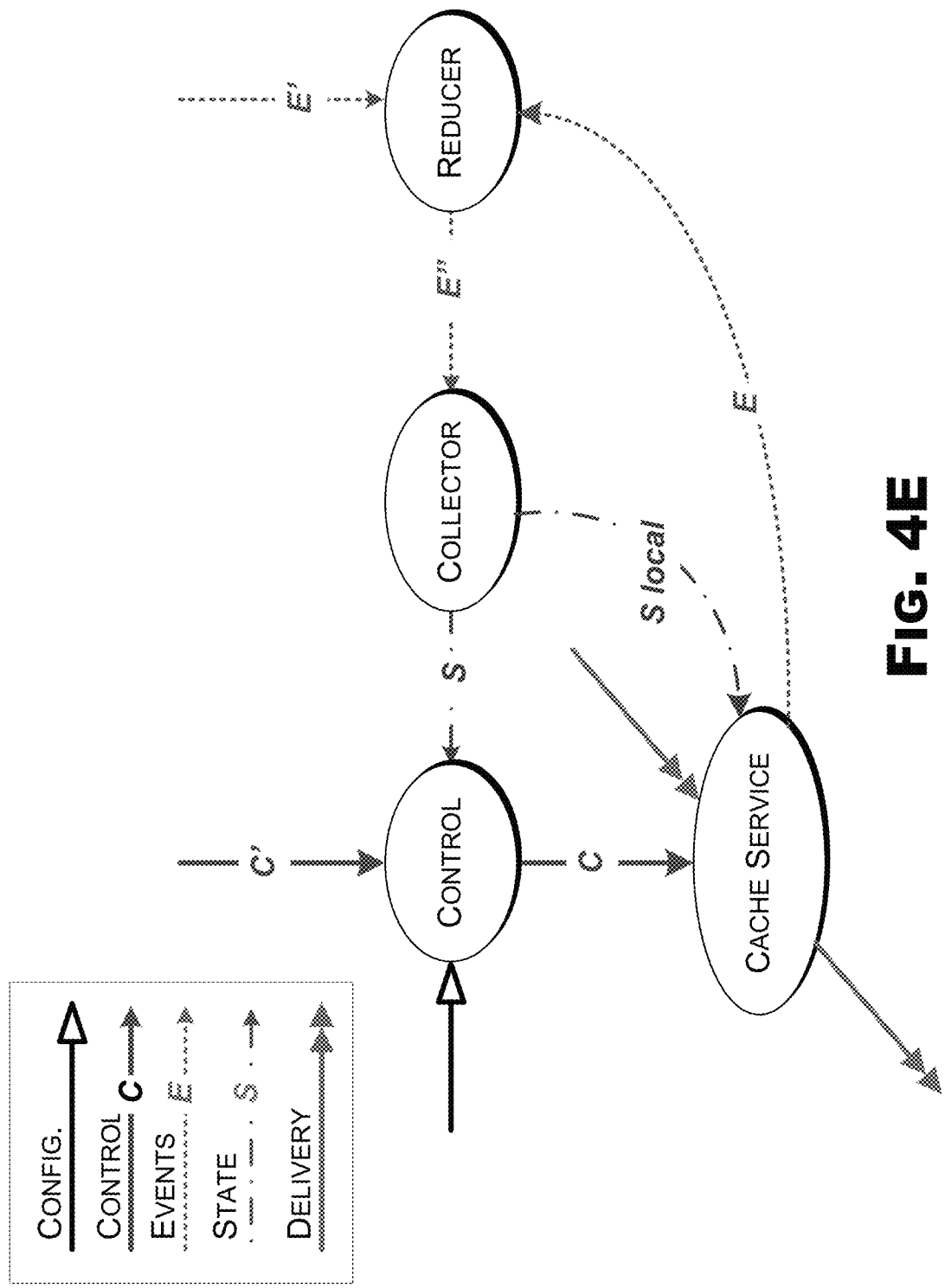
Figure 4F:
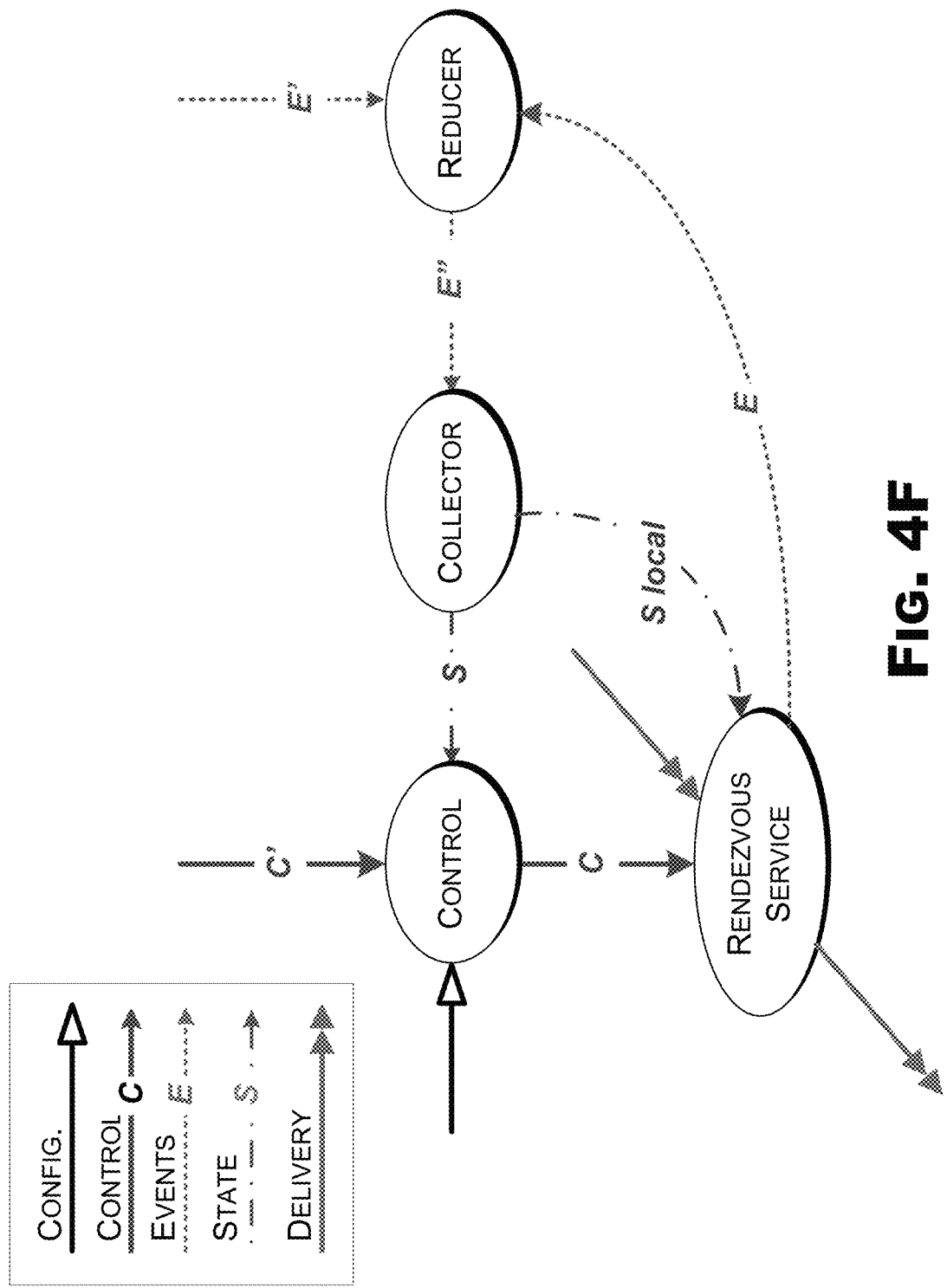

FIGS. 4C and 4D are simplified versions of FIG. 4A, showing the use of feedback and control for caches 102 (i.e., machines running cache services) and rendezvous mechanisms 104 (i.e., machines running rendezvous services), respectively. FIGS. 4E and 4F correspond to FIG. 1K, and show feedback and control of cache services and rendezvous services, respectively.

It should be appreciated that the various loggers, reducers, gatherers, and other mechanisms are able to provide and/or obtain information about components of the CDN and its operation in real-time. As noted, in some cases, collectors may also act as reducers (in that they can consume event streams directly from service instances). In those cases the feedback may be provided without reducers.

CDN Services

Various CDN services, including caches, rendezvous services, reducer services, and collector services are each described here in greater detail.

Caches and Cache Organization

Caches, Cache Clusters, Cache Cluster Sites

As shown in FIG. 5A, each CDN cache 102 may be a cache cluster site 202 comprising one or more cache clusters 204. The cache cluster site 202 may include a routing mechanism 206 acting, inter alia, to provide data to/from the cache clusters 204. The routing mechanism 206 may perform various functions such as, e.g., load balancing, or it may just pass data to/from the cache cluster(s) 204. Depending on its configuration, the routing mechanism 206 may pass incoming data to more than one cache cluster 204. FIG. 5B shows an exemplary cache cluster site 202 with p cache clusters (denoted 204-1, 204-2 . . . 204-p).

As shown in FIG. 5C, a cache cluster 204 comprises one or more servers 208 (providing server services). The cache cluster preferably includes a routing mechanism 210, e.g., a switch, acting, inter alia, to provide data to/from the servers 208. The servers 208 in any particular cache cluster 204 may include caching servers 212 (providing caching server services) and/or streaming servers 214 (providing streaming server services). The routing mechanism 210 provides data (preferably packet data) to the server(s) 208. Preferably the routing mechanism 210 is an Ethernet switch.

Those of ordinary skill in the art will realize and understand, upon reading this description, that a server 208 may correspond, essentially, to a mechanism providing server services; a caching server 212 to a mechanism providing caching server services, and a streaming server 214 to a mechanism providing streaming server services.

The routing mechanism 210 may perform various functions such as, e.g., load balancing, or it may just pass data to/from the server(s) 208. Depending on its configuration, the routing mechanism 210 may pass incoming data to more than one server 208. FIG. 5D shows an exemplary cache cluster 204' comprising k servers (denoted 208-1, 208-2 . . . 208-k) and a switch 210'. The routing mechanism 210 may be a CDN service providing routing services.

The cache cluster site routing mechanism 206 may be integrated with and/or co-located with the cache cluster routing mechanism 210.

Figure 5E:
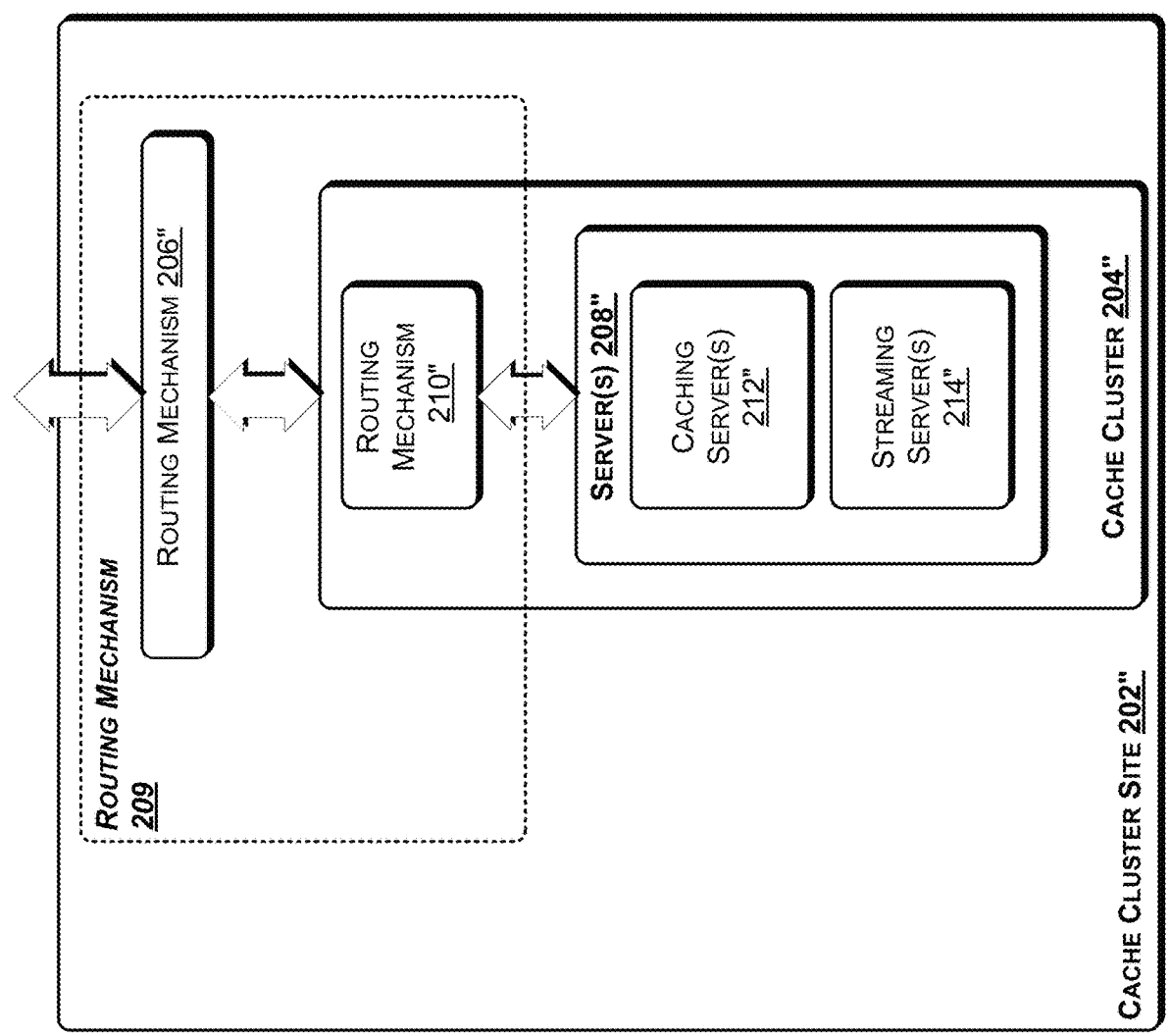
FIG. 5E depicts an exemplary cache cluster site in an exemplary CDN in accordance with an embodiment.

FIG. 5E shows an exemplary cache cluster site 202" with a single cache cluster 204" comprising one or more servers 208". The server(s) 208" may be caching servers 212" and/or streaming servers 214". As shown in the example in FIG. 5E, the cache cluster routing mechanism 210" and the cache cluster site's routing mechanism 206" are logically/functionally (and possibly physically) combined into a single mechanism (routing mechanism 209, as shown by the dotted line in the drawing).

A cache server site may be a load-balancing cluster, e.g., as described in U.S. published Patent Application No. 2010-0332664, filed Feb. 28, 2009, titled "Load-Balancing Cluster," and U.S. Pat. No. 8,015,298, titled "Load-Balancing Cluster," filed Feb. 23, 2009, issued Sep. 6, 2011, the entire contents of each of which are fully incorporated herein by reference for all purposes.

In presently preferred implementations, some of the cache cluster servers 208 that are connected to a particular switch 210 will share the same virtual IP (VIP) addresses. (Each cache cluster server 208 will also preferably have a different and unique IP address.) In these presently preferred implementations, for the purposes of CDN control, the cache cluster routing mechanism 210 and the cache cluster site's routing mechanism 206 are logically/functionally (and preferably physically) combined into a single mechanism—a switch. In these implementations the cache cluster site refers to all of the machines that are connected to (e.g., plugged in to) the switch. Within that cache cluster site, a cache cluster consists of all machines that share the same set of VIPs.

An exemplary cache cluster 204 is described in U.S. published Patent Application No. 2010-0332664, titled "Load-Balancing Cluster," filed Sep. 13, 2010, and U.S. Pat. No. 8,015,298, titled "Load-Balancing Cluster," filed Feb. 23, 2009, issued Sep. 6, 2011, the entire contents of each of which are fully incorporated herein for all purposes.

It should be appreciated that the servers in a CDN or even in a cache cluster site or cache cluster need not be homogeneous, and that different servers, even in the same cache cluster may have different capabilities and capacities.

Hypothetical CDN Deployment

Figure 29:
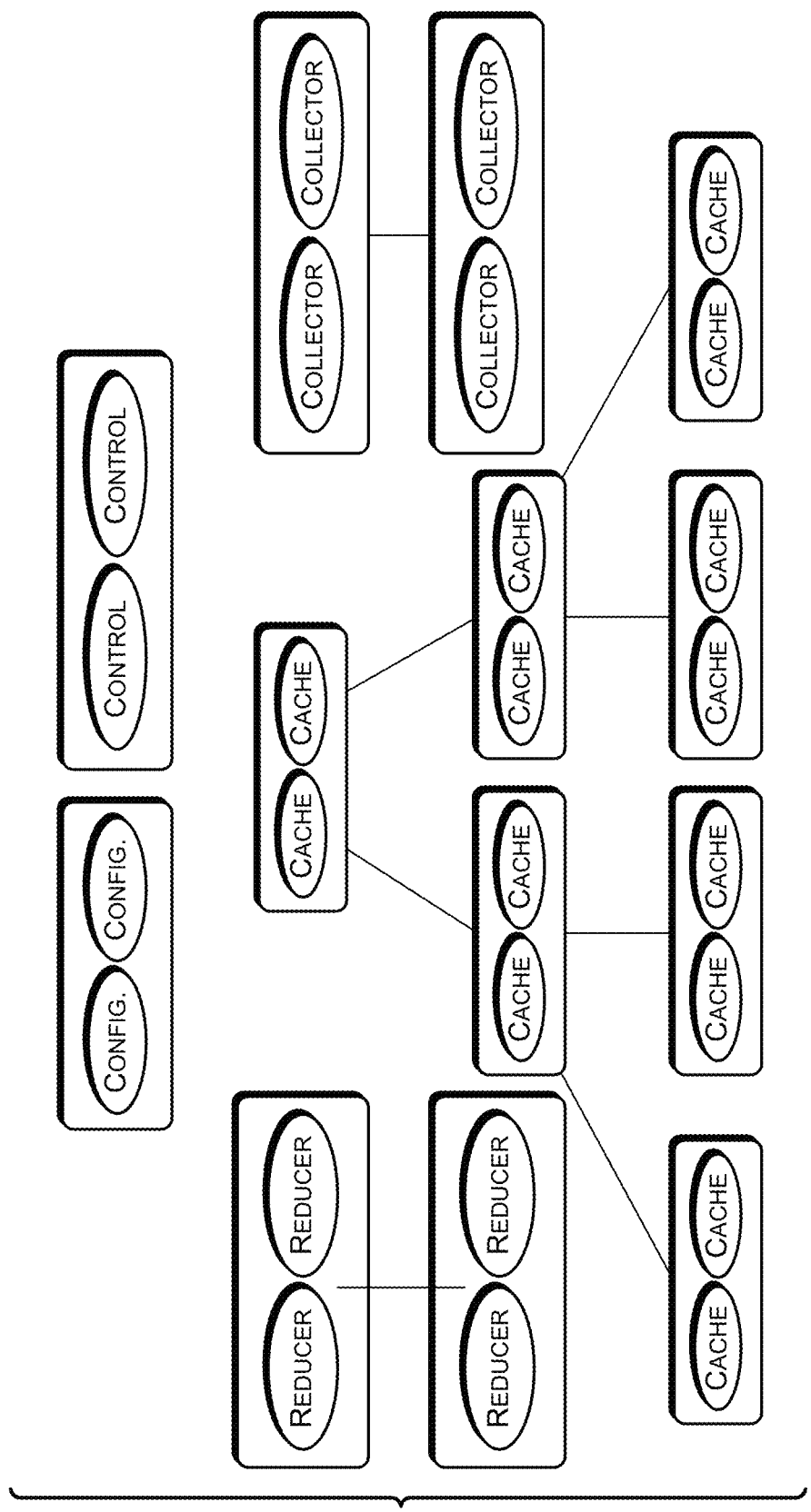
FIG. 29 shows an exemplary CDN deployment in accordance with an embodiment.

FIG. 29 shows a hypothetical CDN deployment (e.g., for a small data center).

CDN Organization—Tiers and Groups

As noted above, endpoints of each kind of service (caches, rendezvous, collectors, reducers, control) may be organized in various ways. Exemplary cache service network organizations are described here. It should be appreciated that the term "cache" also covers streaming and other internal CDN services.

A CDN may have one or more tiers of caches, organized hierarchically. It should be appreciated that the term "hierarchically" is not intended to imply that each cache service is only connected to one other cache service in the hierarchy. The term "hierarchically" means that the caches in a CDN may be organized in one or more tiers. Depending on policies, each cache may communicate with other caches in the same tier and with caches in other tiers.

Figure 6A:
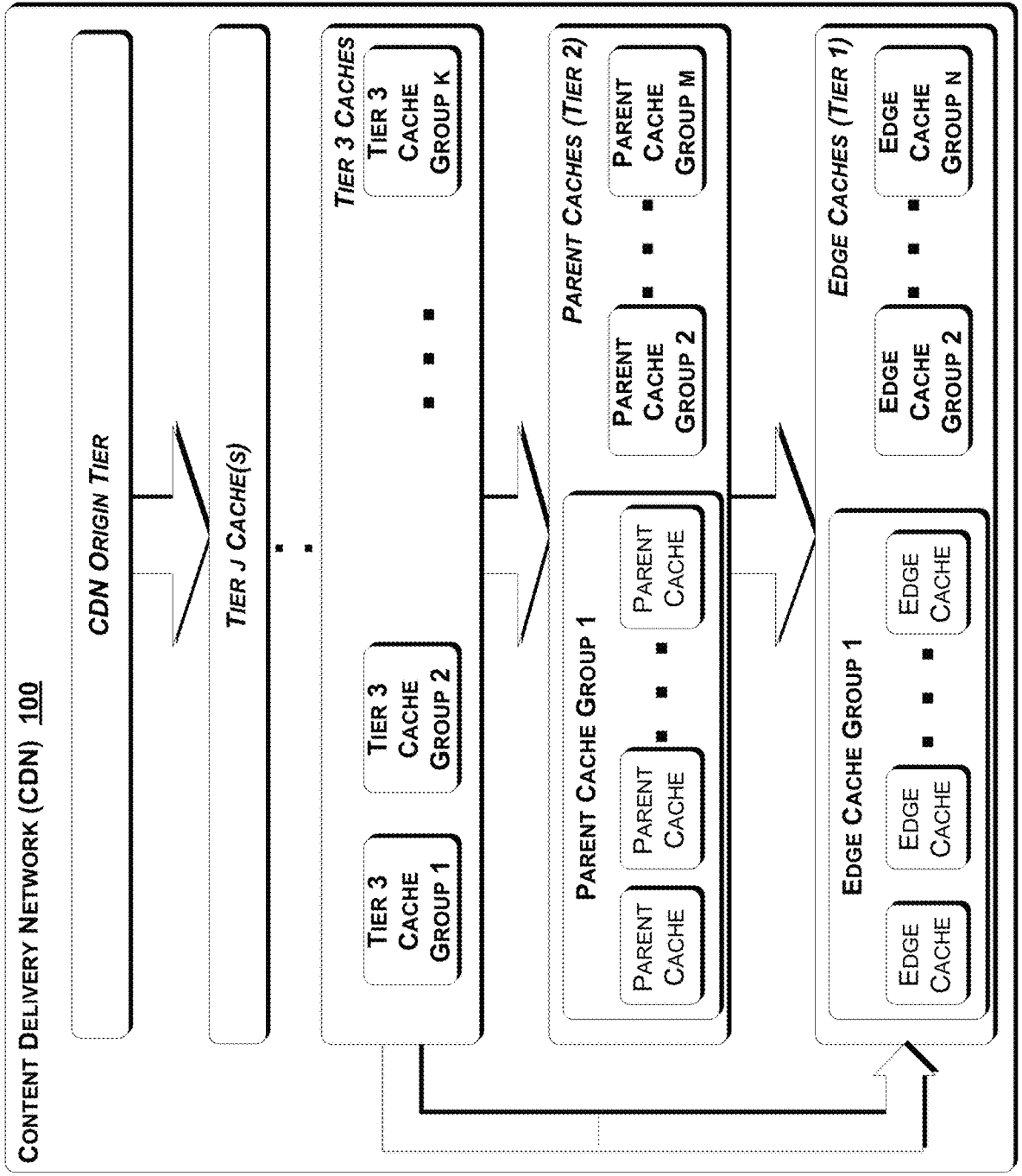
FIGS. 6A to 6F depict various organizations and configurations of components of exemplary CDNs in accordance with an embodiment.

FIG. 6A depicts a content delivery network 100 that includes multiple tiers of caches. Specifically, the CDN 100 of FIG. 6A shows j tiers of caches (denoted Tier 1, Tier 2, Tier 3 . . . Tier j in the drawing). Each tier of caches may comprise a number of caches organized into cache groups. A cache group may correspond to a cache cluster site or a cache cluster (202, 204 in FIGS. 5B to 5D). The Tier 1 caches are also referred to as edge caches and Tier 1 is sometimes also referred to as the "edge" or the "edge of the CDN." The Tier 2 caches (when present in a CDN) are also referred to as parent caches.

For example, in the CDN 100 of FIG. 6A, Tier 1 has n groups of caches (denoted "Edge Cache Group 1", "Edge Cache Group 2", . . . "Edge Cache Group n"); tier 2 (the parent caches' tier) has m cache groups (the i-th group being denoted "Parent Caches Group i"); and tier 3 has k cache groups, and so on. There may be any number of cache groups in each tier, and any number of caches in each group. The origin tier is shown in the FIG. 5A as a separate tier, although it may also be considered to be tier (j+1).

Figure 6B:
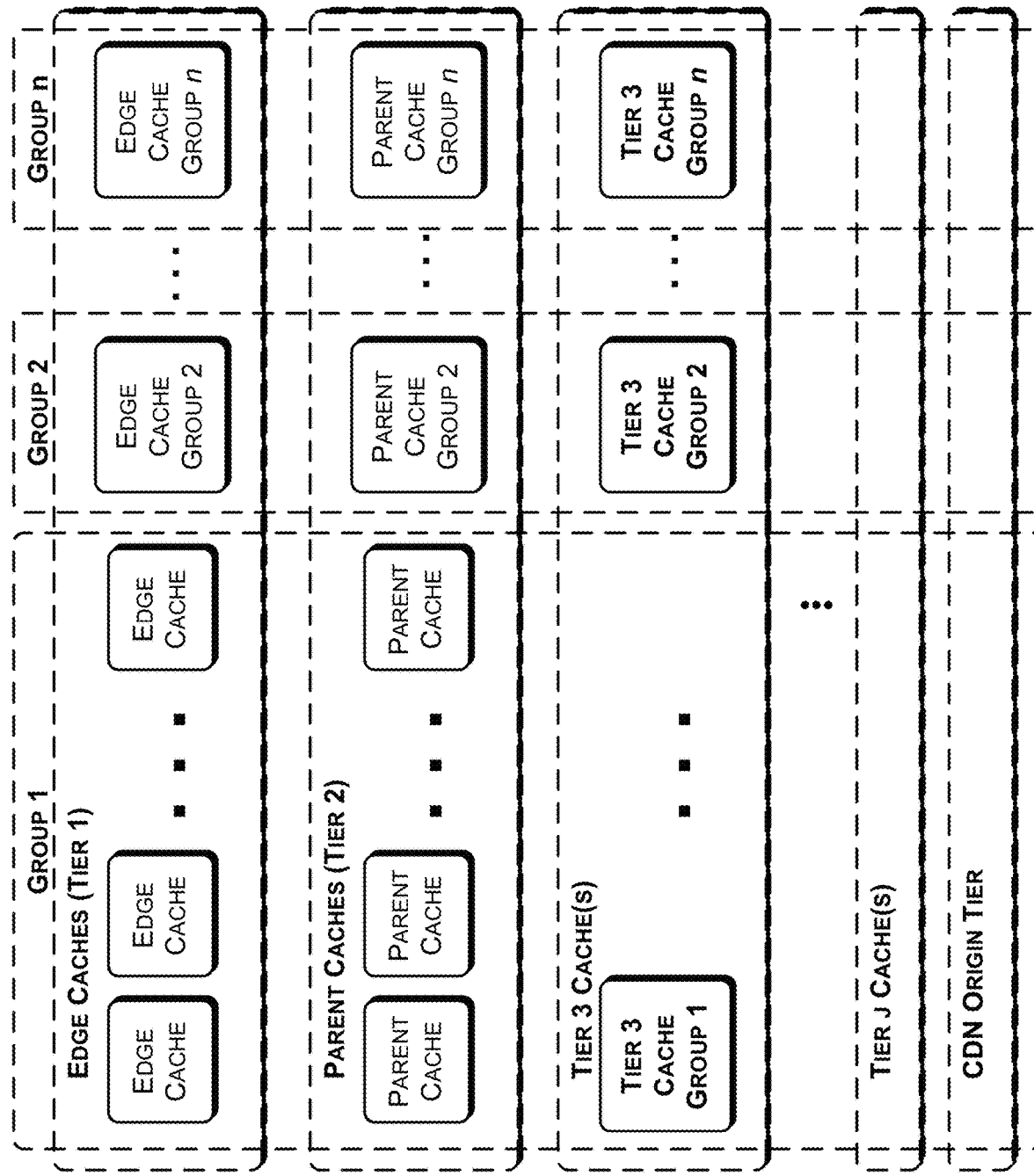

FIG. 6B shows the logical organization/grouping of caches in a CDN of FIG. 6A. In the exemplary CDN 100 of FIG. 6B, each tier of caches has the same number (n) of cache groups. Those of ordinary skill in the art will know and understand, upon reading this description, that each cache group may have the same or a different number of caches. Additionally, the number of caches in a cache group may vary dynamically. For example, additional caches may be added to a cache group or to a tier to deal with increased load on the group. In addition, a tier may be added to a CDN. It should be appreciated that the addition of a cache to a tier or a tier to a CDN may be accomplished by a logical reorganization of the CDN, and may not require any physical changes to the CDN.

Figure 6C:
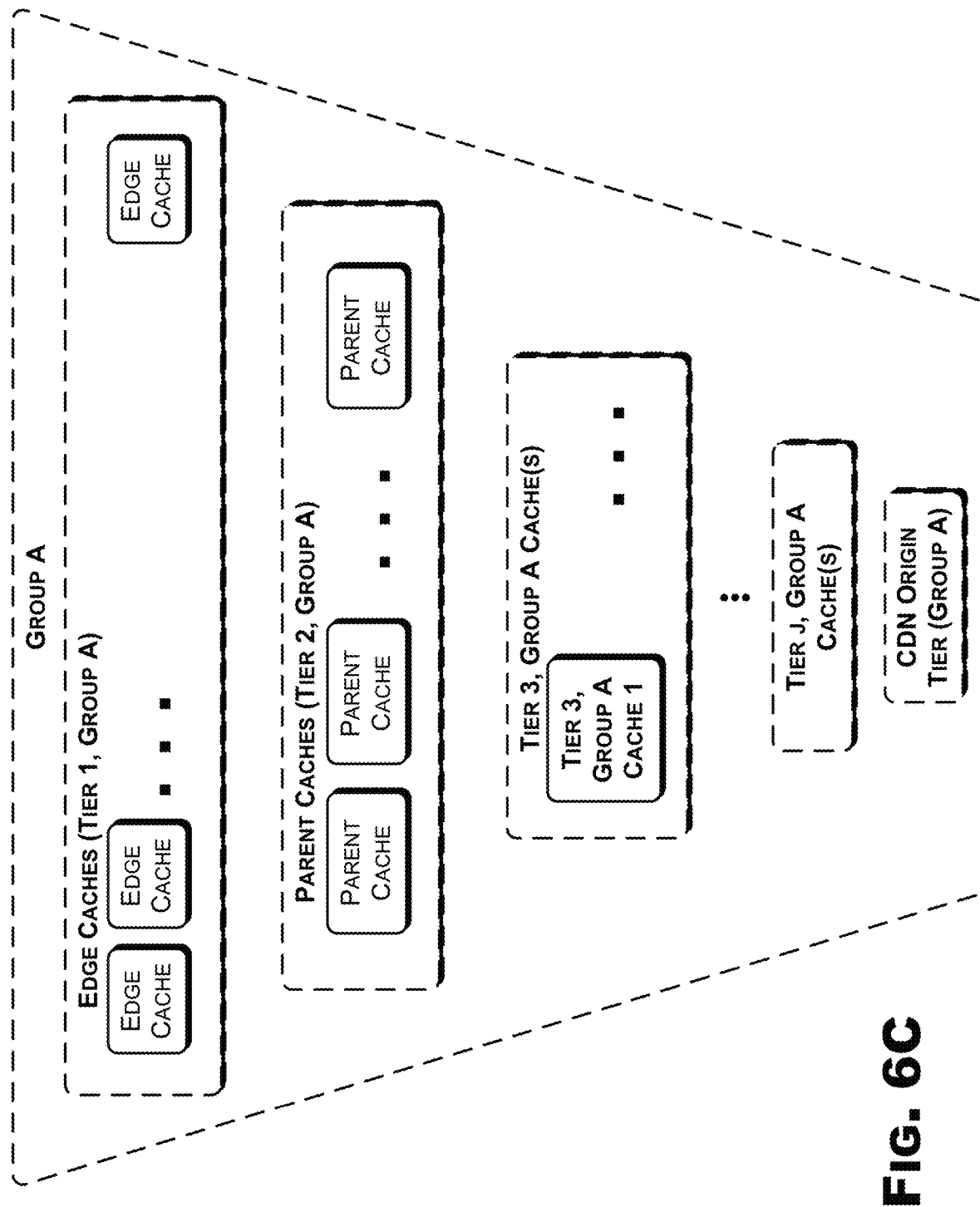

While it should be appreciated that no scale is applied to any of the drawings, in particular implementations, there may be substantially more edge caches than parent caches, and more parent caches than tier 3 caches, and so on. In general, in preferred implementations, each tier (starting at tier 1, the edge caches) will have more caches than the next tier (i.e., the next highest tier number) in the hierarchy. Correspondingly, in preferred implementations, there will be more caches in each edge cache group than in the corresponding parent cache group, and more caches in each parent cache group than in the corresponding tier 3 cache group, and so on. FIG. 6C, while also not drawn to scale, reflects this organizational structure.

The caches in a cache group may be homogeneous or heterogeneous, and each cache in a cache group may comprise a cluster of physical caches sharing the same name and/or network address. An example of such a cache is described in co-pending and co-owned U.S. published Patent Application No. 2010-0332664, titled "Load-Balancing Cluster," filed Sep. 13, 2010, and U.S. Pat. No. 8,015,298, titled "Load-Balancing Cluster," filed Feb. 23, 2009, issued Sep. 6, 2001, the entire contents of which are fully incorporated herein by reference for all purposes.

A cache may have peer caches. In some cases caches in the same tier and the same group may be referred to as peers or peer caches. In general, for each Tier j, the caches in Tier j may be peers of each other, and the caches in Tier j+1 may be referred to as parent caches. In some cases, caches in different groups and/or different tiers may also be considered peer caches. In some aspects, a peer of a particular cache may be any other cache that could serve resources that the particular cache could serve. It should be appreciated that the notion of peers is flexible and that multiple peering arrangements are possible and contemplated herein. In addition, peer status of caches is dynamic and may change. It should further be appreciated that the notion of peers is independent of physical location and/or configuration.

A CDN with only one tier will have only edge caches, whereas a CDN with two tiers will have edge caches and parent caches. (At a minimum, a CDN should have at least one tier of caches—the edge caches.)

The grouping of caches in a tier may be based, e.g., on one or more factors, such as, e.g., their physical or geographical location, network proximity, the type of content being served, the characteristics of the machines within the group, etc. For example, a particular CDN may have six groups—four groups of caches in the United States, Group 1 for the West Coast, Group 2 for the mid-west, Group 3 for the northeast, and Group 4 for the southeast; and one group each for Europe and Asia.

Those of ordinary skill in the art will realize and understand, upon reading this description, that cache groups may correspond to cache clusters or cache cluster sites.

A particular CDN cache is preferably in only one cache group and only one tier.

Various logical organizations/arrangements of caches (e.g., cache groups) may be achieved using BNAMEs, alone or in combination with CNAMEs.

In general, some or all of the caches in each tier can exchange data with some or all of the caches in each other tier. Thus, some or all of the parent caches can exchange information with some or all of the edge caches, and so on. For the sake of simplicity, in the drawing (FIG. 6A), each tier of caches is shown as being operationally connectable to each tier above and below it, and Tier 3 is shown as operationally connected to Tier 1 (the Edge Tier). In some CDNs, however, it may be preferable that the caches in a particular tier can only exchange information with other caches in the same group and/or with other caches in the same group in a different tier. In some cases, peers may be defined to be some or all of the caches in the same group. For example, in some CDNs, the edge caches in edge cache group k, can exchange information with each other and with all caches in parent cache group k, and so on.

A content provider's/customer's server (or servers) may also be referred to as origin servers. A content provider's origin servers may be owned and/or operated by that content provider or they may be servers provided and/or operated by a third party such as a hosting provider. The hosting provider for a particular content provider may also provide CDN services to that content provider. With respect to a particular subscriber/customer resource, a subscriber/customer origin server is the authoritative source of the particular content. More generally, in some embodiments, with respect to any particular resource (including those from elements/machines within the CDN), the authoritative source of that particular resource is sometimes referred to as a coserver.

A CDN may also include a CDN origin/content cache tier which may be used to cache content from the CDN's subscribers (i.e., from the CDN subscribers' respective origin servers). Those of ordinary skill in the art will know and understand, upon reading this description, that a CDN can support one or more content providers or subscribers, i.e., that a CDN can function as a shared infrastructure supporting numerous content providers or subscribers. The CDN origin tier may also consist of a number of caches, and these caches may also be organized (physically and logically) into a number of regions and/or groups. The cache(s) in the CDN origin tier obtain content from the content providers'/subscribers' origin servers, either on an as needed basis or in advance on an explicit pre-fill.

An origin/content cache tier could also be used to provide a "disaster recovery" service—e.g., if the normal subscriber origin server becomes unavailable, content could be fetched from the CDN origin server (a form of customized error responses, minimal/static version of the site, etc.). It would be useful to be able to take a periodic snapshot of content of a web site in this way.

When a cache is associated with a cache group, that cache is said to be bound to that cache group, and when a cache is associated with a tier, that cache is said to be bound to that tier. The binding of caches to groups and tiers can be modified during the normal operation of the CDN. It should be appreciated that binding/association is logical, and applies to a service running on a machine (server). That is, there may be independent logical groups overlaid on a physical set of machines (servers). These logical groups may overlap.

Mapping Properties to Caches

Each property (or coserver) may be mapped or bound to one or more caches in a CDN. A property is said to be bound to a cache when that cache can serve that property (or resources associated with that property) to clients. As used here, a client is any entity or service, including another CDN entity or service.

Figure 6D:
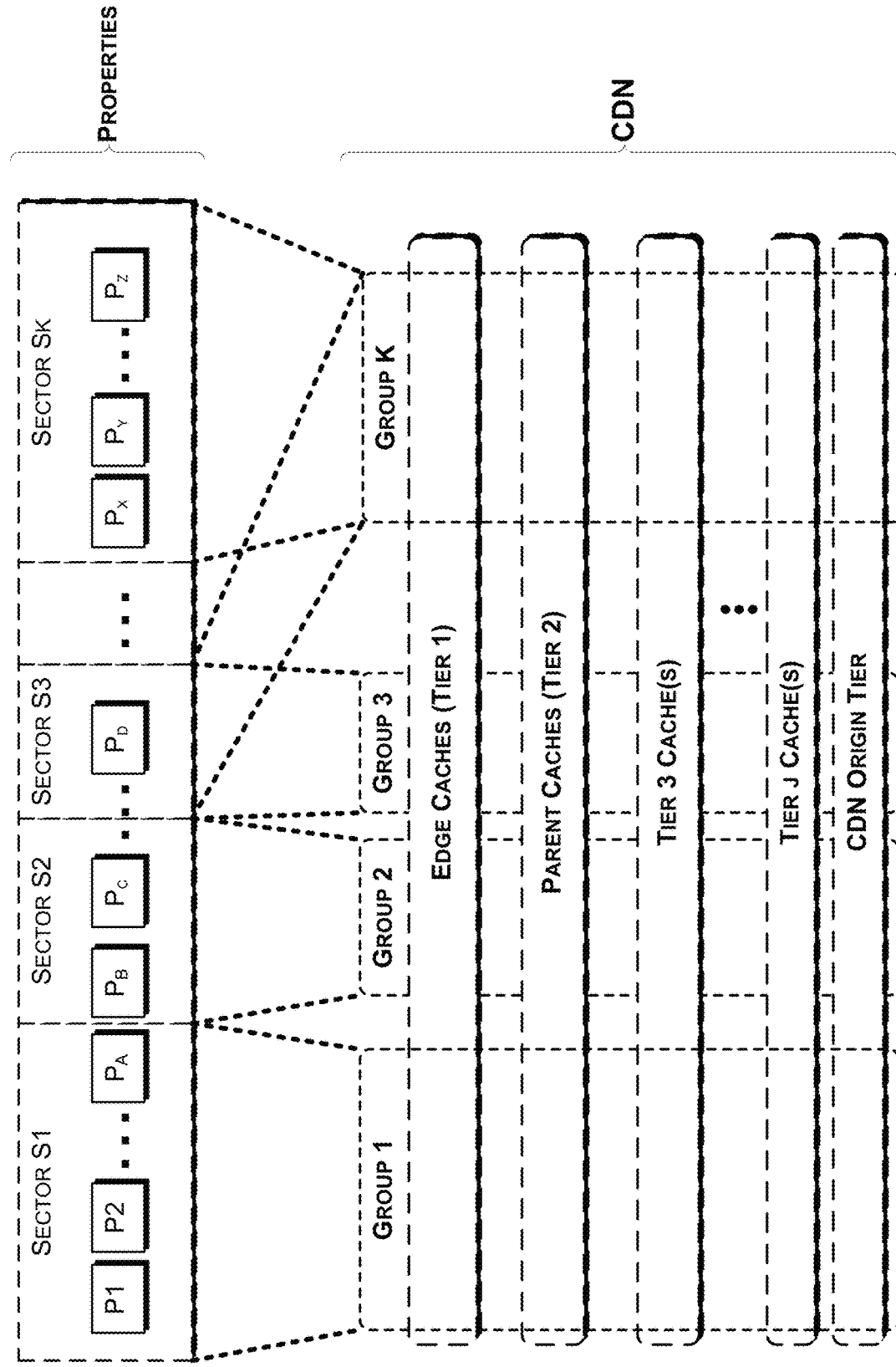
Figure 6E:
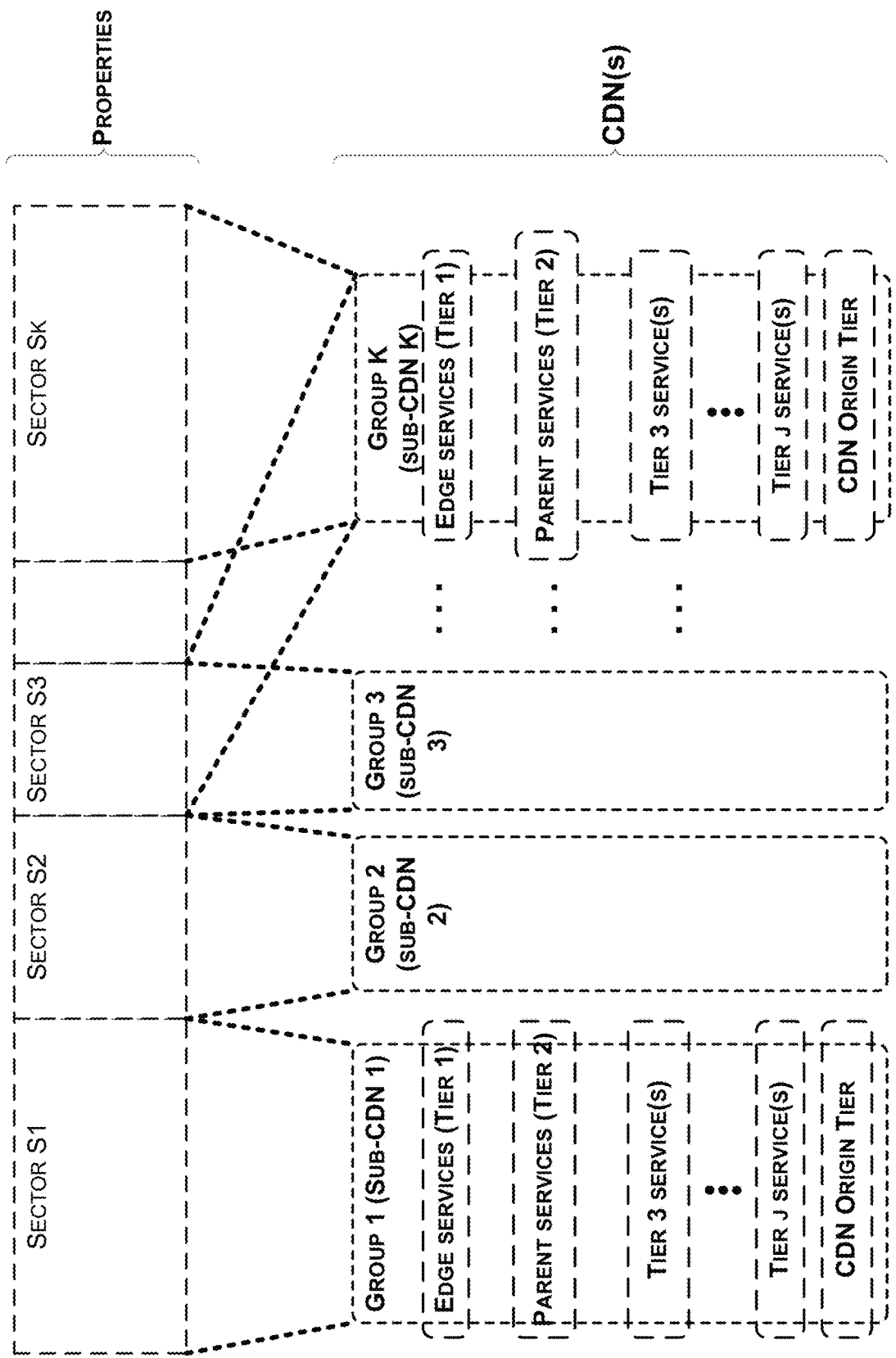

One way to map properties to caches is to impose a logical organization onto the caches (e.g., using sectors). This logical organization may be implemented, e.g., using BNAMEs and request collections. Sectors may be mapped to (or correspond to) cache groups, so that all of the properties in a particular sector are handled by the caches in a corresponding cache group. It should be appreciated that a sector may be handled by multiple groups and that a cache group may handle multiple sectors. For example, as shown in FIG. 6D, the properties in sector S1 may be handled by the caches in group 1, the properties in sector S2 may be handled by the caches in group 2, and so on. This exemplary logical organization provides a mapping from sectors (an organizational structure that may be imposed on properties) to groups in the CDN (an organizational structure that may be imposed on caches in the CDN). Those of ordinary skill in the art will realize and understand, upon reading this description, that some or all of the properties in any particular sector may be handled by more than one group, although preferentially, properties in a sector will be handled by the same group or groups. Thus, as shown in FIG. 6E, the properties in Sector 3 are handled by the services (including caches) in Group 3 and the services (including caches) in Group K. It should be appreciated that the mapping of sectors to groups may be dynamic, and may be changed during operation of the CDN.

When a property is associated with a sector, that property is said to be bound to that sector. When a sector is associated with a group, that sector is said to be bound to that group. The binding of properties to sectors and the binding of sectors to groups may be made independent of each other. The binding of properties to sectors may be modified during normal operation of the CDN. Similarly, the binding of sectors to groups may be modified during normal operation of the CDN.

Each group (or some collection of groups) can be considered to correspond to a separate network, effectively providing multiple CDNs, with each group corresponding to a CDN or sub-CDN that provides some of the CDN services and sharing some or all of the remaining CDN infrastructure. For example, the K groups shown in FIG. 6E may each be considered to be a CDN (or a sub-CDN) for the properties in the corresponding sectors for which the group is responsible. These multiple CDNs (or sub-CDNs) may fully or partially share various other CDN components such as the control mechanism, reducers, and collector infrastructure. The rendezvous system may also be fully or partially shared by sub-CDNs, and components of the rendezvous system may be partitioned in such a way that some rendezvous system components (e.g., DNS servers) are only responsible for a particular group or groups. In this manner, properties of various content providers may be segregated in order to provide greater control and security over their distribution. In some cases, each group (sub-CDN) may be unaware of the other groups (sub-CDNs) and of all other properties, other than those in its sectors.

Figure 6F:
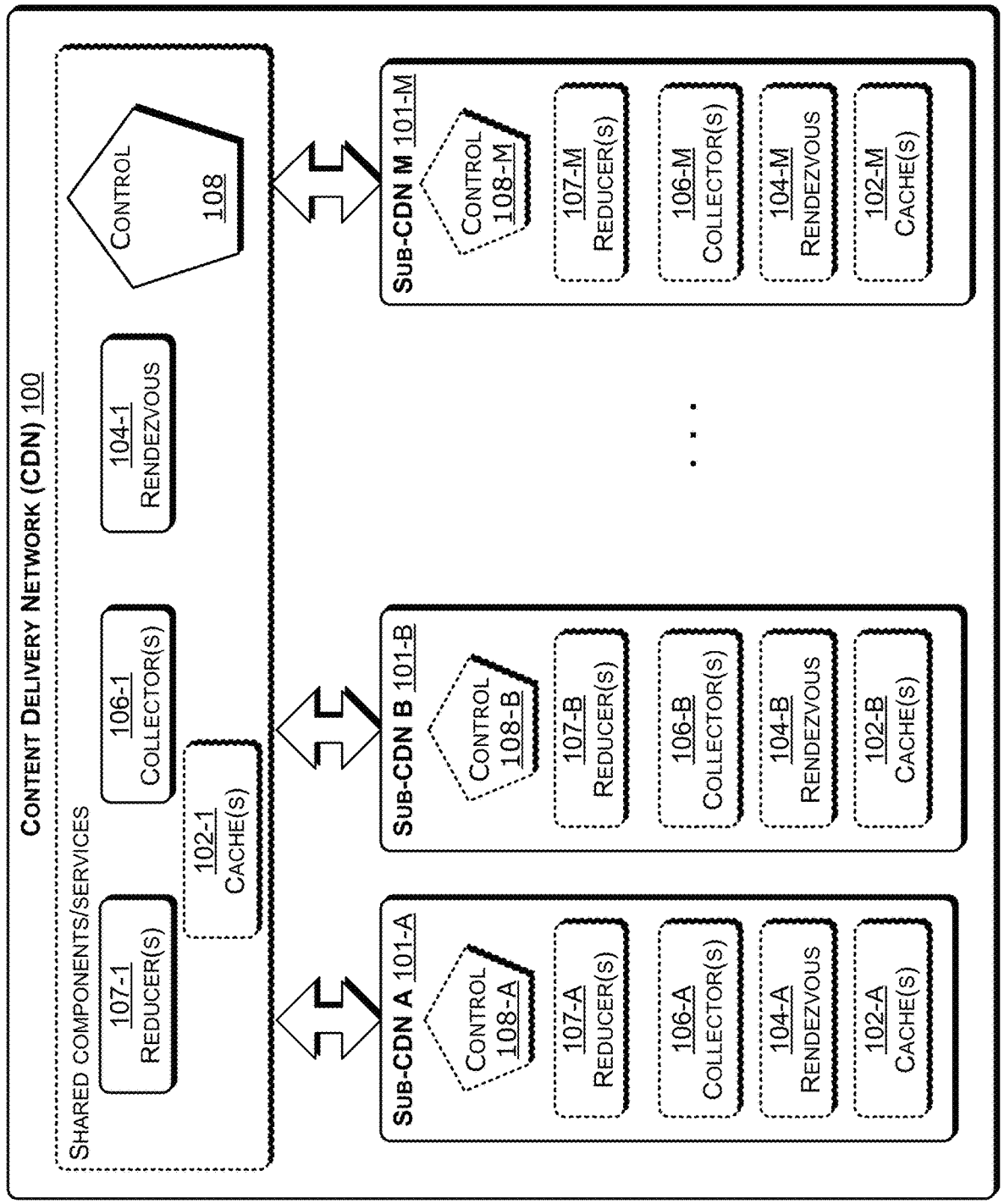

As shown in FIG. 6F, the services in the K groups of FIG. 6E are treated as separate services in separate sub-CDNs. Therefore, e.g., the edge services (including caches) in Group 1 are effectively independent of the edge services (including caches) in Group K and the other groups. Similarly, the parent services (including caches) in Group 1 are effectively independent of the parent services (including caches) in each of the other groups, and so on for each tier of services (including caches).

It should be appreciated that the configuration and topology of the services in each sub-CDN may differ from those in other sub-CDNs. For example, one sub-CDN may have a different configuration/topology for its reducer network than those of the other sub-CDNs.

Preferably, a cache's peers will be defined to only include caches in the same sub-CDN. A peer of a cache may be considered to be any element in the CDN that can provide that cache with content (or data) instead of the cache having to obtain the content from an origin server (or the control mechanism). That is, a peer of a cache may be considered to be any element in the CDN that can provide the cache with information that cache needs or may need (e.g., content, configuration data, etc.) in order for the cache to satisfy client requests.

One or more groups of caches (sometimes referred to herein as a segment) may, in conjunction with shared CDN components, form an autonomous CDN. The configuration of the CDN components into one or more sub-CDNs or autonomous CDNs may be made, e.g., to provide security for content providers.

With reference to the drawing in FIG. 6F, an exemplary CDN 100 may comprise one or more sub-CDNs (denoted in the drawing 101-A, 101-B . . . 101-M—collectively sub-CDNs 101). Each sub-CDN may have its own dedicated CDN services, including dedicated caches (denoted, respectively, 102-A, 102-B . . . 102-M in the drawing), dedicated rendezvous mechanism(s) (denoted, respectively, 104-A, 104-B . . . 104-M in the drawing), dedicated collector(s) (denoted, respectively, 106-A, 106-B . . . 106-M in the drawing), dedicated reducer(s) (denoted, respectively, 107-A, 107-B . . . 107-M in the drawing), and/or dedicated control mechanisms (denoted, respectively, 108-A, 108-B . . . 108-M in the drawing). There is, however, no requirement that a sub-CDN have any particular kind of dedicated CDN services—e.g., dedicated rendezvous mechanisms, or dedicated collectors, or dedicated reducer(s) or dedicated caches or dedicated control mechanisms. Thus, e.g., a sub-CDN may have dedicated caches and use the shared CDN services for its other CDN services. As another example, a sub-CDN may have dedicated caches, reducers, collectors, rendezvous services and control services and may use some of the shared CDN services.

The exemplary CDN 100 includes various components that may be shared among the sub-CDNs. In particular, the CDN 100 includes a shared control mechanism 108, shared rendezvous mechanisms 104-1, shared collectors 106-1, and a shared reducer(s) 107-1. A sub-CDN may rely in whole or in part on the shared CDN components. In the cases where a sub-CDN has dedicated rendezvous mechanisms, those dedicated mechanisms preferably interact with the shared rendezvous mechanisms. Similarly, in cases where a sub-CDN has dedicated collectors, those dedicated collectors preferably interact with the shared collectors, and similarly in cases where a sub-CDN has dedicated reducer(s), those dedicated reducer(s) may interact with shared reducer(s).

There is no requirement that a sub-CDN has the same components as any other sub-CDN in the CDN. Thus, for example, one sub-CDN may have its own dedicated rendezvous mechanisms while another sub-CDN does not. In cases where a sub-CDN has dedicated CDN services of some kind, that sub-CDN may have only some of the functionality of those services and may rely on the shared CDN services for other functionality of those services. For example, a sub-CDN's collector(s) may include some functionality for the sub-CDN without including some of the shared CDN's collector functionality.

Thus, e.g., an exemplary sub-CDN may have its own dedicated caches and share the remaining CDN components. As another example, a sub-CDN may have its own dedicated caches, collectors, and control mechanisms, and share some of the remaining CDN components. As yet another example, a sub-CDN may have its own dedicated rendezvous system, reducers and collectors, and share some of the remaining CDN components.

The amount and degree of sharing between sub-CDN components and shared components may depend on a number of factors, including the degree of security desired for each sub-CDN. In some cases it is preferable to prevent information from a sub-CDN being provided to any other sub-CDN 101 of the CDN 100. In some cases it would also be preferable to prevent a sub-CDN from obtaining information from any other sub-CDN. It will be appreciated that a sub-CDN may be operated as an autonomous CDN.

As noted, properties may be mapped to sectors. Each property is preferably in only one sector. Sectors may be mapped to groups. Each sector may be mapped to more than one group. One or more groups may form a CDN segment. Preferably each group is in only one segment. Each segment may be considered to be a sub-CDN, although it should be appreciated that a sub-CDN may consist of multiple segments (e.g., in the case of a CDN segment comprising multiple groups). The division of data (properties) into sectors may be used to provide efficiency to the CDN. The division of the CDN into sub-CDNs, in addition to the efficiencies provided by sectors, provides additional degrees of security and control over content delivery. As noted above, elements of the rendezvous system may also be partitioned and allocated to sub-CDNs or autonomous CDNs.

Rendezvous Services

A rendezvous service may be a service endpoint controlled by the control mechanism, and the rendezvous system is a collection of one or more rendezvous services controlled by the control mechanism. Rendezvous is the binding of a client with a target service, and the rendezvous system binds clients, both within and outside the CDN, to CD services. For example, in some implementations, for delivery requests that include domain names (e.g., hostnames), the rendezvous system maps domain names (typically CNAMEs) to other information (typically IP or VIP addresses or other CNAMEs). It is preferably, but not necessarily, noted that these CNAMEs may themselves resolve to machines outside of the CDN (e.g., to an origin server, or a separate CDN, etc.). A rendezvous service preferably reports various events to a network of reducers. The event information may be used for various reasons including for billing, report, and/or control purposes.

The rendezvous system 104 (FIG. 4A) may be considered to be a collection of rendezvous services operating on various machines in the CDN. The rendezvous services may be organized as one or more networks. As explained in greater detail below, the rendezvous system 104 is used to affect the binding of a client with a target service. A client could be any entity, including a CDN entity, that requests a resource from another entity (including another CDN entity). The rendezvous system 104 is may be implemented using and/or be integrated with the Domain Name System (DNS) and may comprise one or more DNS name servers (servers providing DNS services). In some implementations, for some kind of requests and services (e.g., HTTP requests of caching services), the rendezvous mechanisms 104-*j* preferably comprise domain name servers implementing policy-based domain name resolution services. Aspects of an exemplary rendezvous system 104 is described in U.S. Pat. No. 7,822,871, titled "Configurable Adaptive Global Traffic Control And Management," filed Sep. 30, 2002, issued Oct. 26, 2010, and U.S. Pat. No. 7,860,964 "Policy-Based Content Delivery Network Selection," filed Oct. 26, 2007, issued Dec. 28, 2010, the entire contents of each of which are fully incorporated herein for all purposes.

Control

Control Mechanism

The control mechanism 108 (FIG. 4A) keeps/maintains the authoritative database describing the current CDN configuration. A control mechanism may, in some cases, be considered, logically, as a loosely coupled collection of sites (referred to herein as control sites) which collaboratively maintain and publish a set of control resources to the CDN's components (such as to the CDN's caching network). These resources include control metaobjects which describe real world entities involved in the CDN, configuration files which affect the network structure of the CDN and the behavior of individual nodes, and various directories and journals which enable the CDN to properly adapt to changes.

The control mechanism 108 may comprise multiple databases that are used and needed to control and operate various aspects of the CDN 100. These databases include databases relating to: (i) system configuration; and (ii) the CDN's customer/subscribers. The control mechanism data are described in greater detail below.

Information in these databases is used by the caches in order to serve content (properties) on behalf of content providers. E.g., each cache knows when content is still valid and where to go to get requested content that it does not have, and the rendezvous mechanism needs data about the state of the CDN (e.g., cluster loads, network load, etc.) in order to know where to direct client requests for resources.

In some implementations, control mechanism data may be replicated across all machines in the control mechanism cluster, and the control mechanism cluster may use methods such as voting to ensure updates and queries are consistent. E.g., in some implementations (with a cluster of five machines), the commits only occur if three of the five cluster machines agree to commit, and queries only return an answer if three of the five cluster machines agree on the answer. The use of voting is given as an exemplary implementation, and those of ordinary skill in the art will realize and understand, upon reading this description, that different techniques may be used in conjunction with or instead of voting on queries. For example, techniques such as using signed objects to detect corruption/tampering may be adequate. In some cases, e.g., the system may determine that it can trust the answer from a single server without the overhead of voting.

In some embodiments the control mechanism 108 may use a distributed consensus algorithm—an approach for achieving consensus in a network of essentially unreliable processors.

The inventors realized that different degrees of consensus for different types of CDN data would be acceptable for most CDN implementations.

The control mechanism 108 controls operation of the CDN and is described in greater detail below. The control mechanism 108 is preferably made up of multiple control services 1010 (FIG. 1J) running on machines in the CDN. Physically, the control mechanism 108 may consist of a set of geographically distributed machines, preferably connected via high-speed communication links. E.g., five machines located in New York, San Francisco, Chicago, London, and Frankfurt. Logically, the control mechanism 108 may act as a single, robust data base/web server combination, containing configuration data and other data used/needed by the CDN.

Although only one control mechanism 108 is shown in FIG. 4A, it should be appreciated that a CDN may have more than one control mechanism, with different control mechanisms controlling different aspects or parts of the CDN. In addition, a control mechanism is preferably configured in a hierarchical manner, as will be described in greater detail below.

It should be appreciated that, from the point of view of other CDN components/services (e.g., caches, the rendezvous mechanisms, etc.), the control mechanism is the single source of certain required data. Similarly, the components that provide data to or for use by the control mechanism (e.g., the OMA) consider it to be a single entity. The other CDN components are therefore agnostic as to the actual implementation of the control mechanism—they need neither know nor care about the control mechanism's underlying implementation.

The control mechanism 108 is preferably addressable by one or more domain names so that it can be found using the DNS. For the sake of this description, the domain name control.fp.net will be used for the control mechanism 108. In a preferred implementation the control mechanism may consists of distinct and geographically distributed control mechanisms and may be operated as a multihomed location with multiple IP addresses. Thus, when a client asks a DNS server to resolve the control mechanism's domain name (e.g., control.fp.net) the DNS will return one or more of the IP addresses associated with that name. That client may then access the control mechanism at one of those addresses. It should be appreciated that the DNS will preferably provide the client with a rendezvous to a "nearby" control mechanism server or servers (i.e., to "best" or "optimal" control mechanism server(s) for that client), similar to the manner in which clients rendezvous with CDN servers. In other words, internal components of the CDN (cache servers, control mechanisms, etc.) may use the same rendezvous mechanisms as are used by entities outside the CDN to rendezvous with CDN components. In some cases the various control mechanisms may have the same IP address, in which cases routing tables may direct a client to a "best" or "optimal" control mechanism. This result may also be achieved using an anycast IP address.

Control mechanism configurations, exemplary architectures and operation are discussed in greater detail below.

Data Collection

The CDN preferably collects data relating to ongoing and historical operations of the CDN (i.e., of the CDN components or services) and may use that data, some of it in real time, among other things, to control various other CDN components. For example, data relating to resources requested and/or served by the various caches may be used for or by operational and/or measurement and/or administrative mechanisms. In addition, such data may be used by various analytics and monitoring mechanisms to provide information to other CD services (e.g., to the rendezvous system and to the control service). In general, any data collected and/or produced by any machine or service in the system (e.g., via event streams to the reducer system) may be used (alone or with other data of the same and/or different types) to control other aspects of the system (sometimes in real time or online—i.e., where data are used as they arrive). The following sections describe embodiments of data collection schemes.

Log Data and Event Data

Each component group of components of the CDN (i.e., each service) may produce log data for use (directly or indirectly, "as is" or in some modified or reduced form) by other components or groups of components of the CDN (i.e., by other CDN services). For example, each of the caches may produce one or more streams of log data relating to their operation.

Log data provided by each component may include any kind of data in any form, though data are preferably produced as a stream of data comprising a time-ordered sequence of events. Those of ordinary skill in the art will realize and understand, upon reading this description, that it is not possible for the multiple components of the CDN to have perfectly synchronized clocks, and, as will be explained below, such synchronization is neither required nor presumed. In preferred implementations, however, clocks are kept within a few thousandths of a second of each other (using NTP—the Network Time Protocol).

In presently preferred implementations, each CDN component provides (e.g., pushes) each stream of log data that it produces to at least one known address or location (corresponding to a reducer or collector). It should be appreciated, as will be explained below, that the address or location to which each stream is to be directed is configurable and changeable. The use of multiple locations (i.e., of multiple reducers or collectors) for redundancy is discussed below.

Service Logs

During operation, each CDN service (e.g., a cache service, a rendezvous service, a reducer service, a collector service, a control service, etc.) produces information that is used or usable by the service itself and, possibly, by other components of the CDN. The information produced may include information about the status of the service, its current or historical load, CPU or storage utilization, etc. In the case of a cache service, the information may include information about what it is serving, what it has served, what it has stored, and what is in its memory. While it may be desirable to have some of this information stored locally on the machine operating the service (e.g., as log files), it is also desirable to have at least some of this information made available (directly or in some other form) to other CDN components.

Accordingly, each CDN service produces one or more log streams (of event data) which can be obtained by other CDN components (e.g., via reducers 107 and possibly collectors 106). Preferably log data from each CDN component (e.g., service) are streamed by the component in the form of one or more continuous data streams, as explained below.

CDN Component/Service Logging Architecture

Each CDN component (e.g., service) can preferably generate multiple loggable items. These loggable items may be based on measurements and information about the component itself (e.g., its load, capacity, etc.) and/or on measurements and/or information about operation of the component within or on behalf of the CDN (e.g., information about content stored, requested, served, deleted, etc.). Loggable items are the individual values or sets of related values that are measured and emitted over time by the component. Each item has a name and a definition which explains how to interpret instances of the value (as well as how it should be measured). While the set of loggable items that a component can emit at any time may be fixed by the design of the component, it should be appreciated that the actual loggable items generated by each component may be dynamically configured and may be modified during operation of the component.

A log event is a time-stamped set of loggable item values that are produced by the component. It is essentially the assertion by the component that each of the contained log items had the given value at the given time (according to the local clock of the component). The log event may also include other independent variables defining the scope of the measurement. The grouping of loggable items into log event types is preferably fixed by the design of the component.

Each CDN component includes one or more configurable log event producers that each generates a stream of time ordered log events from the loggable items generated by the component. The log events produced by a log event producer may be consumed by one or more configurable log streams on the component. Each log stream on the component listens for certain events sent from one or more event producers and then orders and formats those events according to selected log file styles.

Figure 7A:
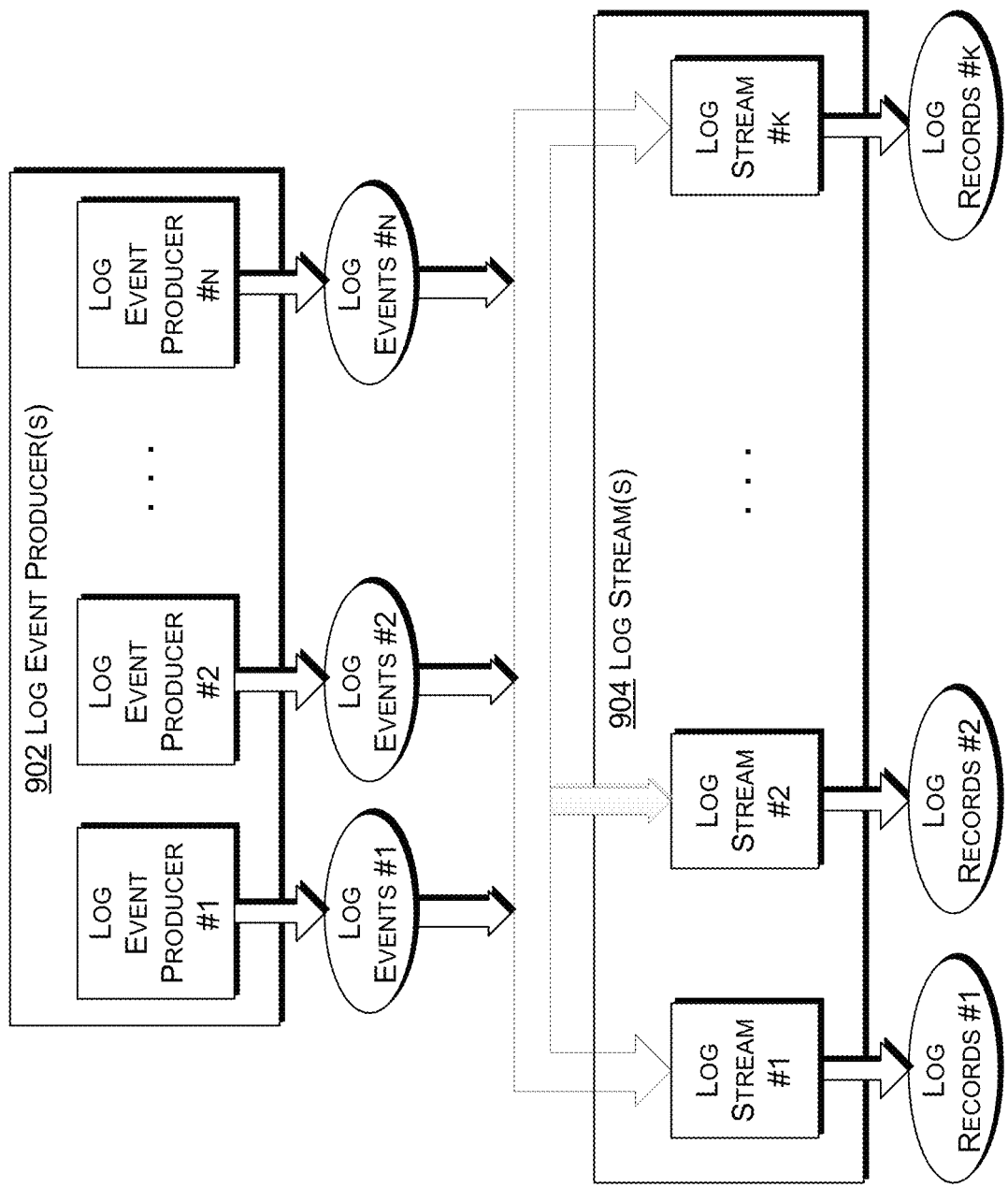

A CDN component may have multiple log event producers (e.g., one per vcore) and multiple log streams. As used herein, the term "vcore" means Virtual CPU core or simply "thread" or "thread of execution." As shown in the example in FIG. 7A, which shows parallel logging to multiple log streams, an exemplary component has N log event producers (collectively denoted 902), each producing corresponding log events (N≥1). An exemplary component also has K log streams (K≥1, collectively denoted 904), each producing corresponding log records. As can be seen in the drawing in FIG. 7A, the log events produced by each log event producer may each be provided to (and so consumed by) each of the K log streams.

The possible loggable items and events that can be generated by a CDN component (e.g., a cache server or a rendezvous mechanism) are preferably statically designed into the component, and the log event producer(s) for each component are preferably configured/selected as part of that component's initialization (initial configuration). Note that the log event producer(s) for a component need not be static for the life of the component (e.g., the component may be reconfigured using the Autognome service). The set of log streams associated with a CDN component may be initialized at component initialization time based, e.g., on per node configuration data, and may change dynamically.

Log event producers can emit events in arbitrarily large batches, and log streams must order these events.

FIG. 7B shows a single log event producer 902' in greater detail. Loggable items are generated and/or produced by various measurement and log item generator mechanisms. The log event producer 902' in the drawing includes n such log item generator mechanisms (denoted M0, M1 . . . Mn), each producing corresponding loggable items. For example, the log item generator M0 produces loggable items of type 0; the log item generator M11 produces loggable items of type 1, and so on. These log item generator mechanisms, as noted above, are preferably statically designed into the CDN component, and configured during the CDN component's initial configuration in the CDN.

Those of ordinary skill in the art will realize and understand, upon reading this description, that these various loggable item generator mechanisms may be implemented in hardware, firmware, software, or any combination thereof.

A log event is a loggable item associated with a time. A log event generator 906 in the log event producer 902' consumes loggable items from the log item generator mechanism(s) and produces a corresponding sequence of log events 908 (a time-ordered sequence of loggable items) from the loggable items and using a time from a clock 910. Thus, as shown in FIG. 7B, the sequence of log events 908 consists of a sequence of loggable items ordered by time (e.g., at times T[K] T[K+1], T[K+2], . . . ). Although the clock 910 may be common to (and therefore shared by) all log event producers on a particular cache server, there is no requirement that a shared clock be used.

A log event router 912 (in the log event producer 902') filters and routes log events to one or more currently active log streams. Thus, as shown in the drawing in FIG. 7B, log event router 912 filters and routes the log events 908 to one or more log streams. In the example shown, the log events 908 are filtered and routed asp sets of log events (p≥1, denoted 908-1, 908-2 . . . 908-$p$). It should be appreciated that any particular log event from the log events 908 may be routed to more than one log stream.

Figure 7C:
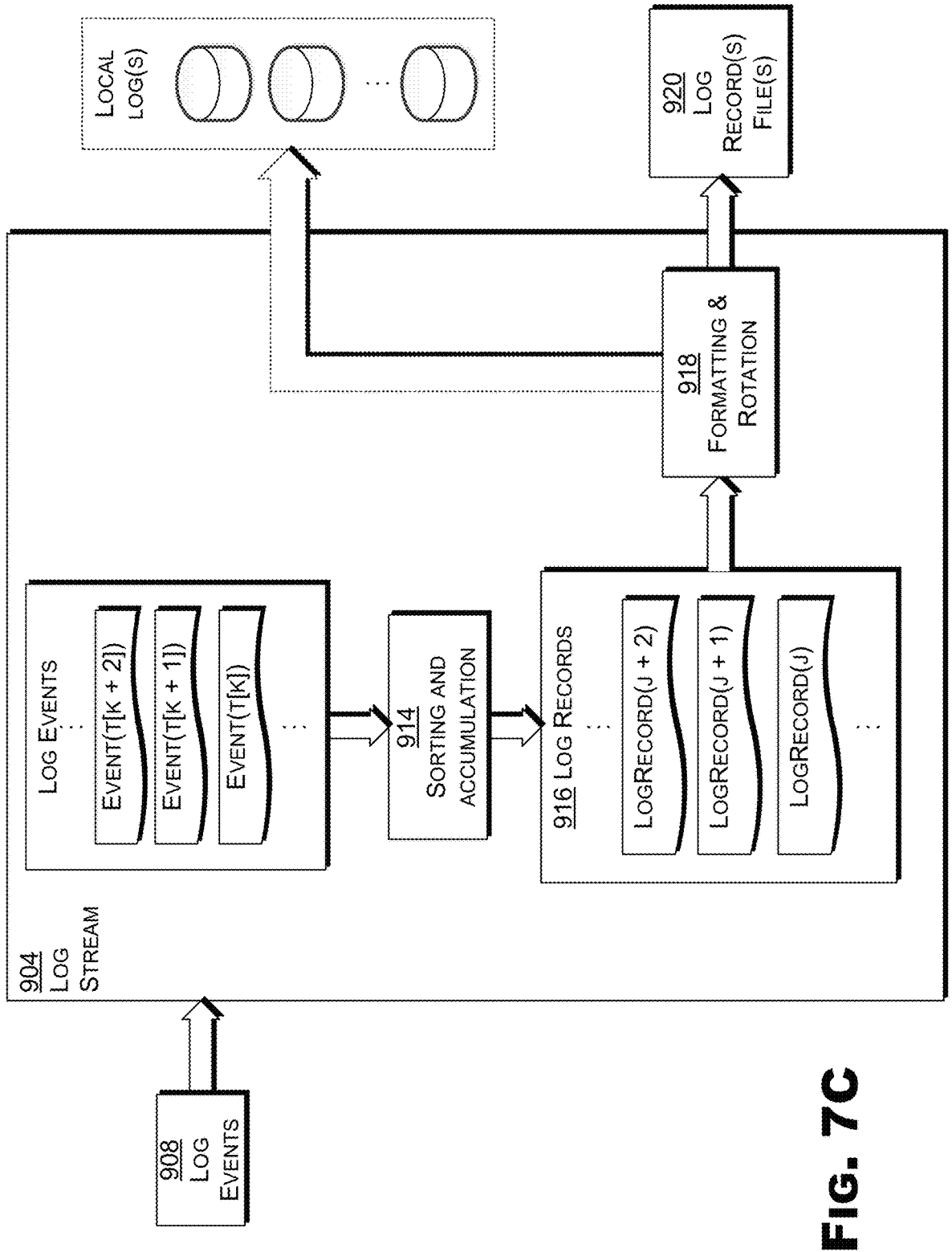

FIG. 7C shows a log stream 904. The log stream takes as input one or more time ordered sequences of log events from one or more log event producers, sorts and accumulates these log events, and produces a sequence of log records.

Preferred implementations make and rely on the following assumptions:

different vcores may (and likely will) have distinct, unsynchronized clocks;

each log stream is aware of the existence of all log producers which could send it events;

the "correct" order in a stream is defined by the timestamps, regardless of what vcore determined the timestamp and what the correspondence is between that vcore's clock and real/actual time;

for the events coming from a particular log event producer, the relative order in which events are received at a stream is the same as the relative order with which they were emitted by the producer;

producers may emit events in batches of arbitrary size, and in any time order (subject to one additional constraint described below).

In some implementations, each stream could be wrapped in an envelope that authenticated/identified the sender—rather than relying on knowing of all of them a priori.

No assumptions are made about the relative timestamp order of events received from different log event producers.

The one additional constraint is that periodically there must be a time-stamped marker event that is emitted by each log event producer (i.e. typically by each individual vcore), and the producer must guarantee that the timestamps of all subsequently emitted events will be greater than the timestamp of the marker. This constraint is considered trivial for a single vcore to guarantee. The timestamps of events between markers can be in arbitrary order, provided they are bounded by the markers on either side.

With these assumptions, the events received at the input to a log stream must be assumed to be out of order, even when considering the events from a single producer. To deal with this the system adopts an approach similar to that used in distributed discrete event simulations.

With this guarantee, each log stream $S_i$ can independently maintain a maximum processed timestamp $Tmax_p$ for each event producer p, and use this to compute its own local version of global time $Tg_s$, by taking the minimum:

$$Tg_{Si} = \min(\{Tmax_p | \forall p \in \text{Producers}\})$$

Then the stream may periodically process (order) all events received with timestamps less than or equal to $Tg_{Si}$, since it will be guaranteed that it will not receive any further events with timestamps less than or equal to $Tg_{Si}$.

With reference to FIG. 7C, sorting and accumulation mechanism 914 generates log records 916 from log events input to the log stream 904. The log records 916 produced by a log stream 904 may be stored locally on the CDN component. In addition, the log records 916 produced by a log stream 904 may be treated or considered to be one or more streaming files 920. Such files may be provided (e.g., pushed) as event streams to one or more reducers (and possible collectors) in the CDN. If the producers produce events in time order (as far as they are concerned), then this may be implemented using merging instead of sorting.

At any given time a CDN component is able to generate a predetermined set of log file types appropriate for that type of component. A log file type defines the general structure of a log file in terms of the log events that are in the scope of the log file and the rows and columns of data that may be included in an instance of that file type. There will generally be a unique code that must be designed into the CDN component in advance for each supported base type, and the base type will determine the set of configuration options that are applicable and the logical structure of the generated log records (though not their concrete format).

A log file type is a combination of a log file base type and associated parameter settings. It completely determines the logical content and structure of the output log record stream for a given input event stream.

Each base type may expect certain parameters to be set (or not) in order to configure the specific behavior of the type. Some parameters may apply to most/all types, some may be specific to specific types.

A filter is a parameter that defines the criteria that must be satisfied by the log events that are to be dispatched to the log file.

A selection is a parameter that defines the attributes of the included events that are to be included in the log file.

A log file instance is an actual log file—a particular set of data generated over some time interval according to a chosen log file type and style. A log file may be, e.g., streamed or on disk In the case of stored log files, a log file may be a current log file (still actively being appended to) or a rotated log file (no longer being appended to).

A log stream is an active entity that produces a related set of log file instances corresponding to a particular log file type and style.

A logging configuration of a CDN component is a definition of a set of log streams for that component. Each stream conceptually "listens" for certain events, selects the events and fields it cares about, time-orders the events received from different producers, and formats the stream according to the selected style to generate log file instances, rotating files as indicated by the file type.

Each stream preferably has an identifier (a symbolic name) that is useful, e.g., for debugging and also as the means to associate logging configuration changes which existing streams.

As should be apparent from the description, the measurement and log event generation mechanisms are separated and upstream from the log streams. They construct log events and forward them to an event router, with no required knowledge of what happens downstream (i.e., with no required knowledge of what log streams exist, what events matter to what log streams, or how log files will be formatted). In some cases, knowledge of what the log streams are may be made available to the log event generation mechanisms for performance reasons.

Log event routers are similarly oblivious of the upstream and downstream behaviors, other than basic knowledge of what log streams exist and which events go to which streams. Log streams consume events that have been directed to them, but they have (and need) no knowledge of what generated the events and minimal knowledge of the nature of each event source. Log streams are responsible for time ordering, item selection, item accumulation, formatting, etc.

The logical structure of a type of log files (in terms of the sequential or hierarchical structure of records they contain, etc.) is decoupled from the syntactic style with which log record content is represented on disk, allowing pluggable log file styles.

It should be appreciated, however, that log files records should contain sufficient information to identify the origin of each record. In some cases, records should include an identification of the CDN component that generated the record. In some cases, log file records should include an identification of the sub-CDN in which the record was produced. A collector in the sub-CDN may add information to a record as part of its reduce functionality in order to add sub-CDN identification information. In this manner, log file records may propagate through a sub-CDN without any such identification information, and may be added by a collector as the records leave the sub-CDN and are passed to the shared CDN components.

Reducers and Collectors

A reducer service (or reducer or data reducer) is a service that consumes, as input, one or more event streams (along with control and/or state information) and produces, as output, one or more event streams (along, possibly, with control and/or state information). As noted elsewhere, a reducer need not actually reduce the size of any input event stream. The network of reducers in a CDN may be referred to as a network of data reducers or NDR. The reducer services 1016 (FIG. 1L) may be considered to be an NDR. In preferred implementations each reducer in the NDR is an event stream processing engine with essentially no long-term state. A CDN comprises multiple reducers forming one or more NDRs.

Figure 8A:
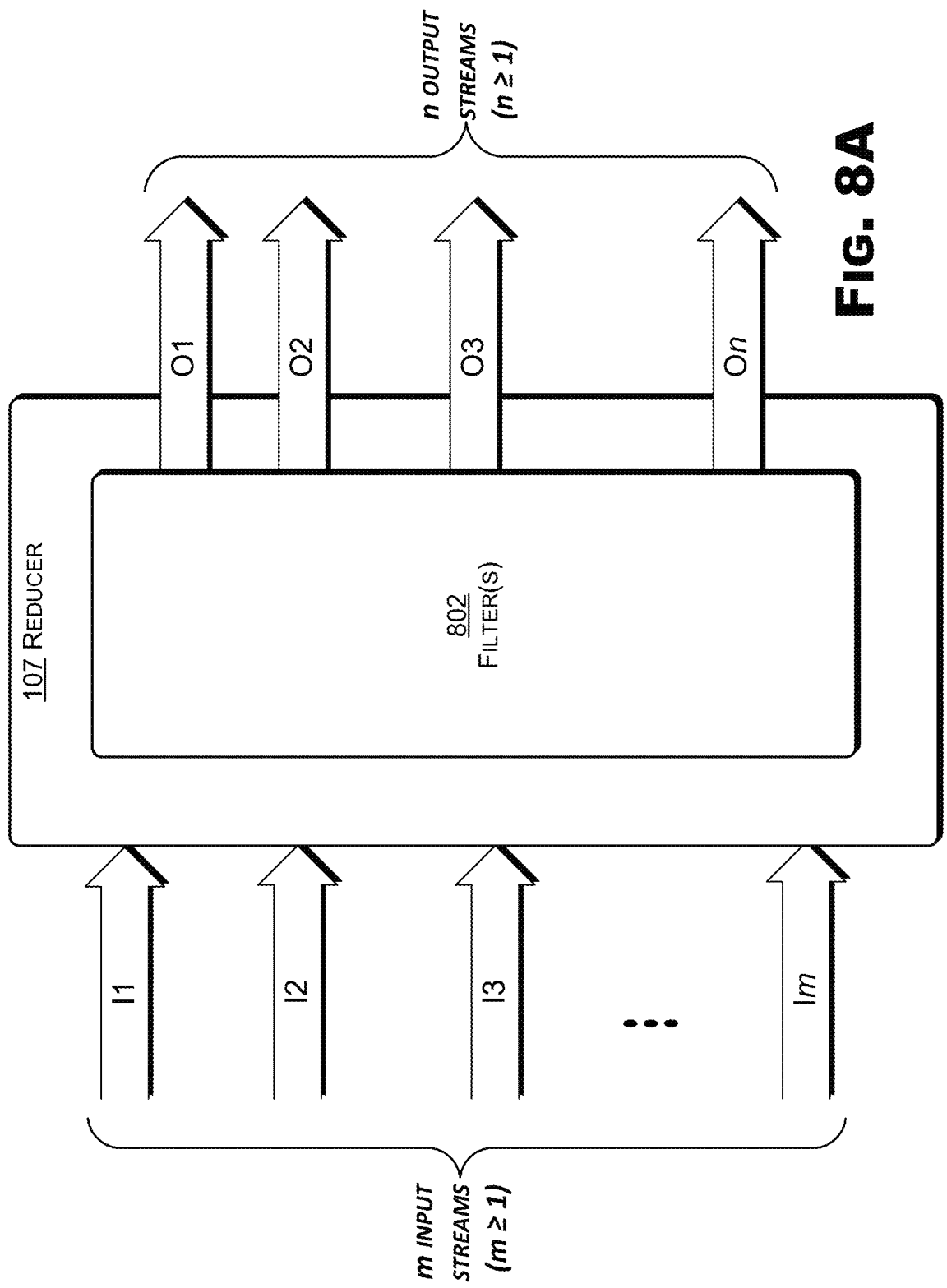

Each reducer (reducer service) 107 may take in one or more input streams and produce one or more output streams. As shown in FIG. 8A, each reducer 107 comprises one or more filters 802 to process the collector's input stream(s) and produce the collector's output stream(s). As shown in the drawing, the reducer 107 reduces the in input streams (m≥1) to n output streams (n≥1). It should be appreciated that the value of n (the number of output streams) may be greater than, equal to, or less than the value of in (the number of input streams). In other words, the number of output streams may be greater than, equal to, or less than the number of input streams.

Although the term "reducer" is used herein to describe the mechanism, it should be appreciated that a particular reducer may not actually decrease the size of the output stream streams relative to the input streams. A reducer may be, e.g., a consolidator, a combiner, a pass-through mechanism, a splitter, a filter, or any combination of these with other mechanisms that act on the one or more input streams to produce a corresponding one or more output streams. Thus, a reducer may act, e.g., to reduce an input stream into multiple output streams. As another example, a reducer may reduce multiple input streams into a single output stream. The various mechanisms that comprise the filters 802 in a reducer may operate in series and parallel or combination thereof, as appropriate.

Although, as noted, each reducer may receive multiple input streams. These input streams to a reducer need not be of the same type, and a reducer may be configured to process multiple different kinds of input streams. It should also be appreciated that the one or more of output streams may be the same type as one or more of the input streams.

The input streams to a reducer 107 may come from one or more other CDN services, including, without limitation, from other caching services, other rendezvous services, other collector services, and other reducer services.

It should be appreciated that a reducer 107 (e.g., as shown in FIG. 8A) is a CDN service and, as such, may (in addition to event streams) take as input control and state information. As shown in FIG. 1E (and FIG. 1L), a reducer service may obtain event streams from other reducers, from collectors, from control mechanisms, from configuration services and from other services. In addition, a reducer service (e.g., reducer 107 in FIG. 8A) may obtain control information (C) from the control mechanism(s) and state information from the collectors.

Figure 8B:
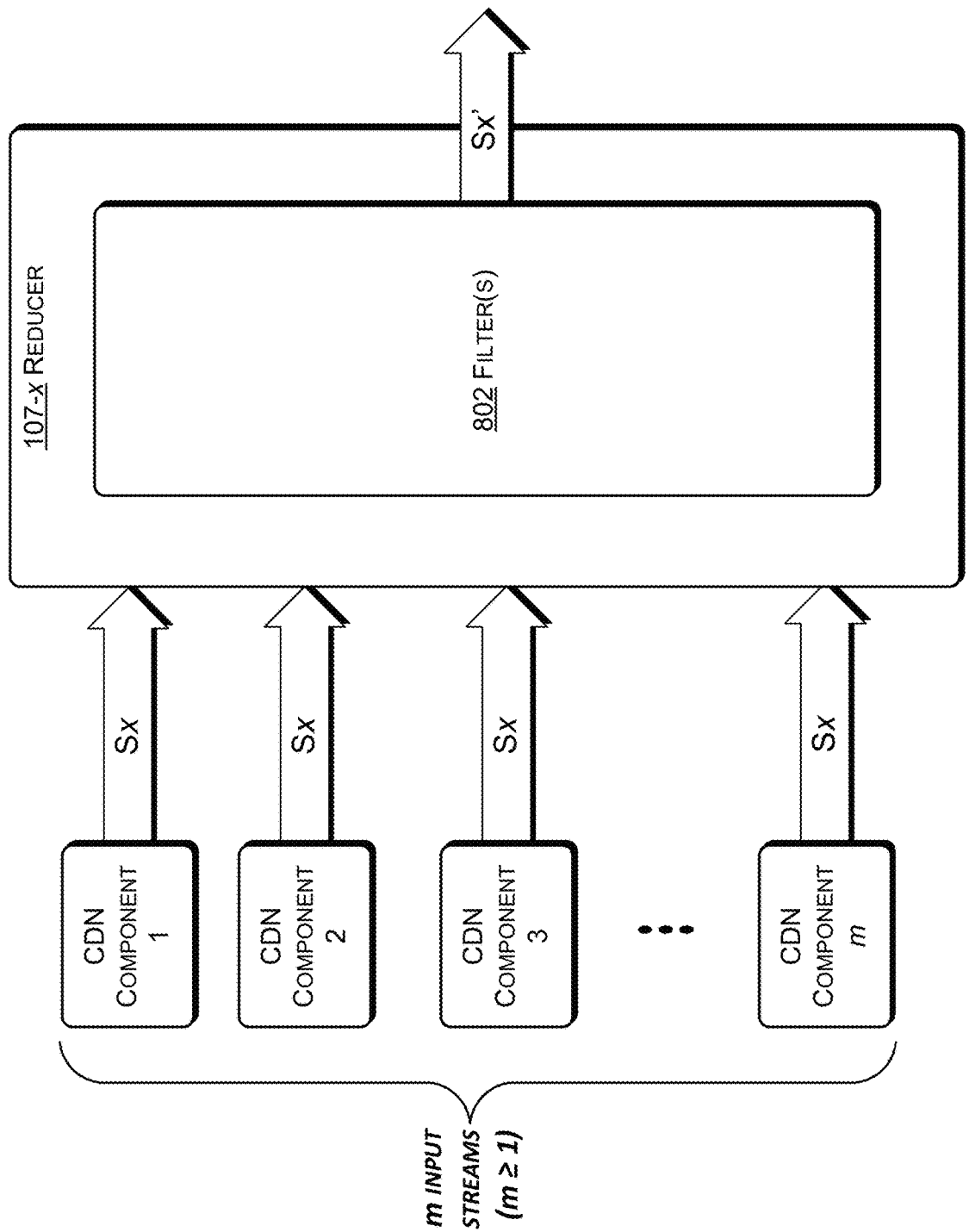

FIG. 8B shows an exemplary reducer in which multiple CDN components (or services) each produce an event stream (each denoted Sx) that is input into the reducer 107-$x$. One or more filters in the reducer 107-$x$ produce the stream Sx' from the multiple input streams Sx. The stream Sx' output by the reducer 107-$x$ may be, e.g., a time ordered combination of the events in the multiple input streams Sx. In the example in FIG. 8B, the reducer 107-$x$ reduces the m input streams (of the same type) to one single output stream.

Those of ordinary skill in the art will realize and understand, upon reading this description, that each of the multiple CDN components or services may be any component in the CDN including, e.g., a cache, a collector, a reducer, a rendezvous mechanism, the control mechanism component, etc. It should be understood that the multiple CDN components providing streams of data to a particular reducer need not all of the same type.

Figure 8C:
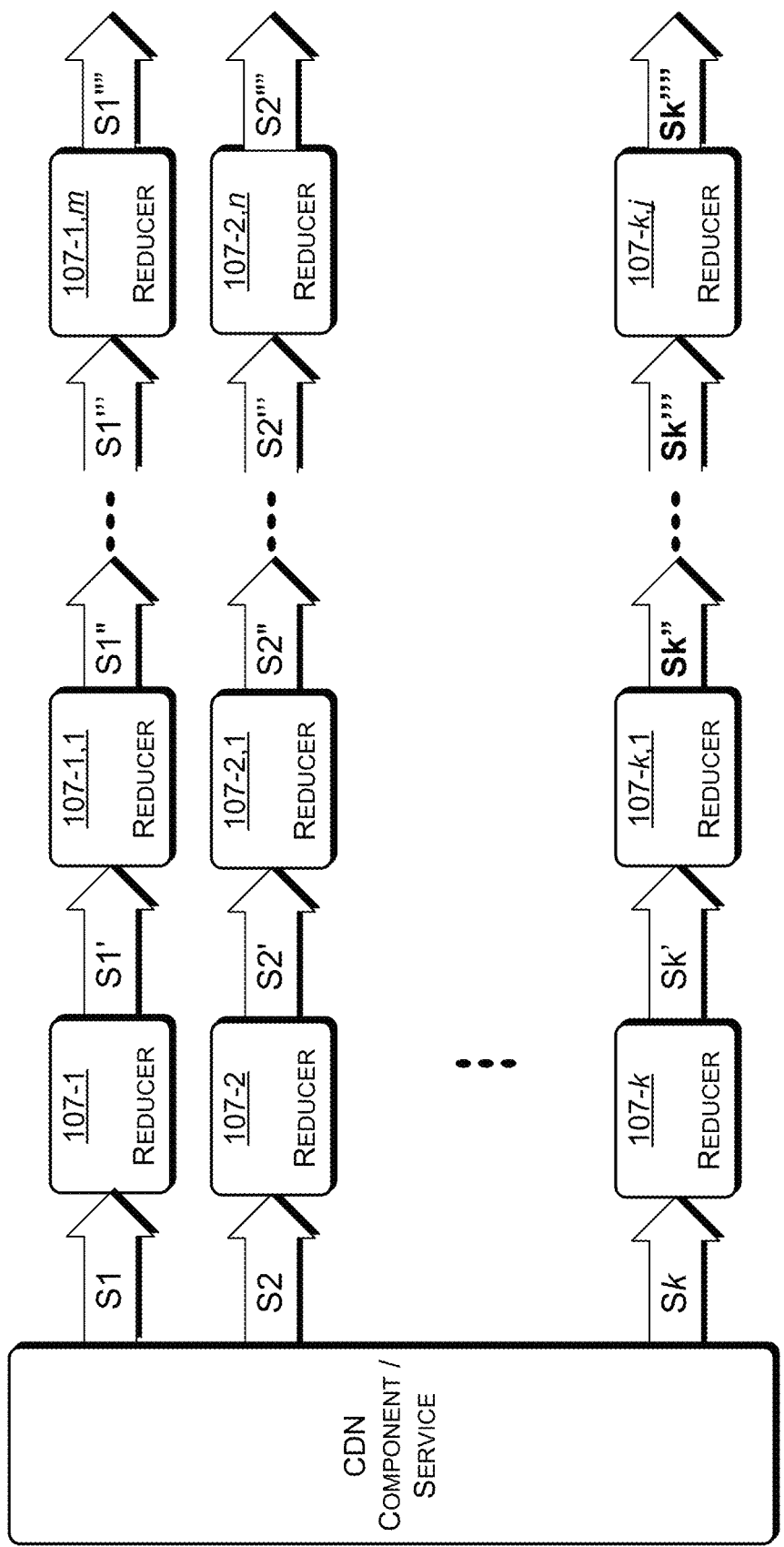

The reducers operating on a particular stream or type of stream may operate in series, each producing an output stream based on one or more input streams. For example, as shown in FIG. 8C, a particular CDN component or service produces k event streams (denoted S1, S2 ... Sk). The CDN component provides (e.g., pushes) each of k streams to at least one reducer. As shown in the drawing, stream S1 is provided to reducer 107-1, stream S2 is provided to reducer 107-2, and so on. Reducer 107-1 reduces the input stream S1 (along with its other inputs) to produce an output stream S1'. Stream S1' is provided (e.g., pushed) to reducer 107-1,1 which reduces that stream (along with its other inputs) to produce output stream S'', and so on. Eventually reducer 106-7,$m$ produces output stream S''''. Similar processing takes place for each of the other streams produced by the CDN component. Those of ordinary skill in the art will realize and understand, upon reading this description, that not every type of stream requires the same number of reducers operating in series to reduce it to the required output stream. It should be appreciated that each reducer shown in FIG. 8C may process multiple input streams (not shown in the drawing).

Figure 8D:
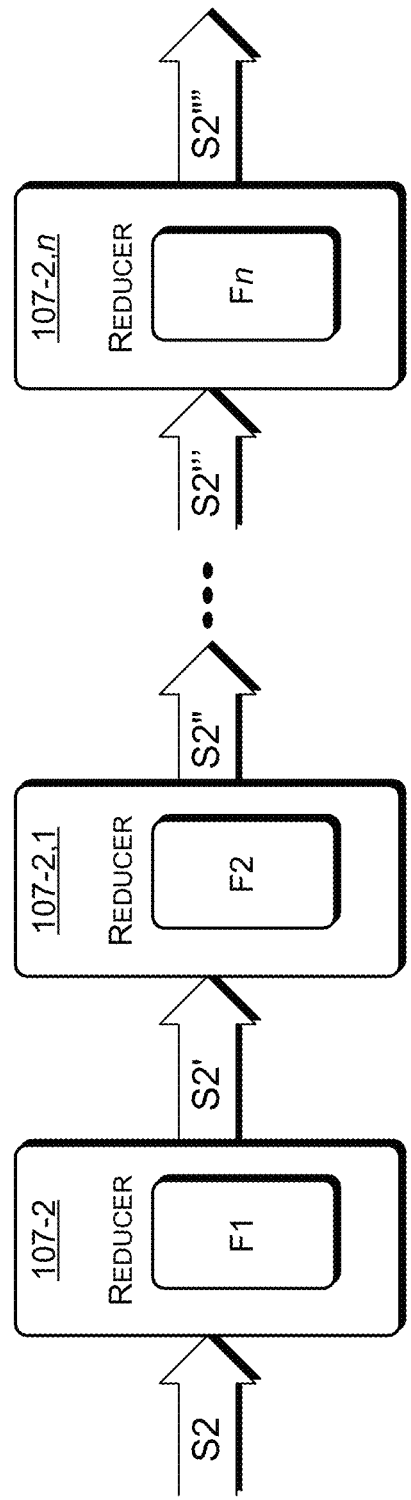

When operating in series (e.g., as with the reducers in FIG. 8C), the filter function of the series of reducers is effectively a combination of filter functions of each of the reducers, in order. For example, with reference to FIGS. 8C-8D, if the series of reducers 107-2, 102-2,1 ... 107-2,$n$ implement filters F1, F2 ... Fn, respectively, on the input stream S2, then the series of reducers effectively implements the filter Fn(Fn−1( ... F2(F1 (S2)) ... ).

The series of reducers that operate to produce a particular output stream from one or more input streams may be located or organized in the same cache hierarchy as the caches. Thus, e.g., there may be, for certain streams, reducers in each tier that reduce and/or consolidate event streams from their own tier. These consolidated or reduced streams may then be provided, e.g., pushed, to a reducer in a lower tier in the hierarchy. As noted above, however, the reducers may form a network with a topology or structure different from that of the other services.

Each entity that produces and/or consumes events or event streams is generally referred to as an agent. Thus, as used herein, an agent is a process that is producing or consuming events or event streams. A given machine on the network could have more than one agent, and a given agent could be performing multiple responsibilities (producing and consuming events, storing reduced versions of events, and providing value added services based on the history of events it has processed).

A reducer is essentially an agent that computes output event streams from input event streams. Generally, the volume of events in the output streams is reduced in comparison to the input volume, though this is not strictly necessary. The reduction process tends to group events based on their spatio-temporal attributes and accumulate their other values in some other reduction specific way.

As noted above, each CDN component may produce one or more event streams which can be obtained by other CDN components (e.g., via reducers 107 and/or collectors 106). FIG. 9A shows an exemplary CDN component, a cache, producing K streams of data and providing each of those streams as an event stream, via reducers, to an appropriate collector. The reducers reduce the streams, as appropriate, and provide their respective output stream(s) to other collectors. For example, as shown in the drawing in FIG. 9A, the data produced by stream #1 is provided as event data to the reducer(s) 107-1 which in turn provide some or all of the data (having been appropriately reduced) to two collectors. In this example, it is assumed that stream #1 produces event data relating to content pulls from the cache. These data may be used, e.g., to produce billing information as well as to collect information about the popularity of requested resources. Accordingly, in this example, the data relating to content pulls is sent (e.g., pushed) via reducer(s) 107-1 to collectors that will transform it to the appropriate billing information logs which are provided to appropriate mechanisms in the OMA system 109 (FIG. 4B). Similarly, the data produced by stream #2 are provided (e.g., pushed) via reducer(s) 107-2 through a series of collectors. In this example, is assumed that the data produced by stream #2 relates to load information about the cache. This load information may be used, e.g., by the rendezvous system in order to select caches for resource requests.

Similarly, the data produced by stream #k are provided (e.g., pushed) via reducer(s) 107-$k$ through a series of collectors. In this example, it is assumed that the data produced by log stream #k relate to health information about the cache. This health information may be used, e.g., by the rendezvous system in order to select caches for resource requests and by the control mechanism to maintain configuration information about the CDN.

Figure 9B:
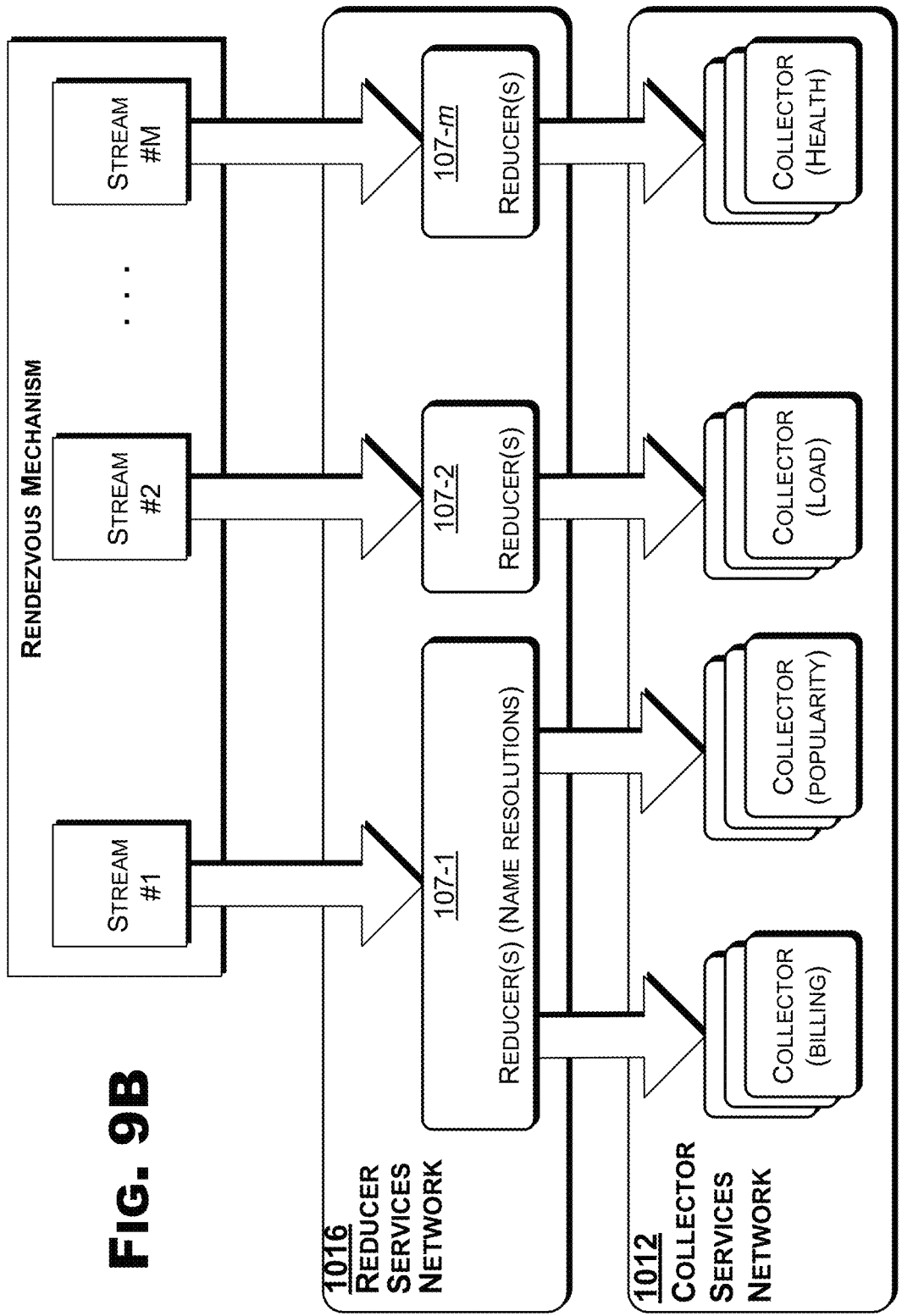

FIG. 9B shows an exemplary rendezvous mechanism/service (e.g. DNS server) producing M streams of log data and providing each of those streams via reducer(s) to appropriate collector(s).

Although shown as separate elements in the drawings, the reducer(s) denoted 107-1, 107-2 ... 107-$k$ in FIG. 9A may overlap or be the same reducer(s), as may the reducer(s) denoted 107-1, 107-2 ... 107-$m$ in FIG. 9B. The reducer(s)

denoted 107-*i* in FIGS. 9A-9B may be considered to be sets of reducers in the reducer network, and the sets may overlap.

It should be appreciated that the log streams and collectors described in the previous examples are given only by way of explanation, and are not intended to limit the scope of a system in any way. Log data produced by caches and rendezvous mechanisms and any other CDN component may include data that can be used, e.g., for billing, load assessment, health assessment, popularity measurement, status checking, etc. These log data may be used to provide information to other CDN components including the rendezvous mechanisms, the control mechanism, and various administrative mechanisms (e.g., for billing).

By monitoring log data from CDN components, the control mechanism is able to maintain a near real-time view of the health and load of the CDN, down to the resolution of a single component. In addition, log data from the CDN components may be used to provide near real-time information about demand for particular properties (which can be used to determine the popularity or relative popularity of various properties). Popularity information may be used, e.g., by the rendezvous mechanism, to pre-fill caches, and to reconfigure components of the CDN.

Log-Less Request Logging

The logging system allows for log-less request logging. Specifically, using the logging system provided by the reducer/collector services, there is no need for caches or other CDN services or components to store log files locally. Instead of (or as well as) the processing of a request by a cache resulting in generating an entry in a log file, for each entry (e.g., request) in a log file the cache may emit an event with all the same information to a log stream. Each log stream would be consumed, preferably by at least two reducer nodes whose output would eventually be merged together, resulting in reliable delivery of request events to interested consumers (e.g., analytics engines, request log generators, even subscriber applications). Those of ordinary skill in the art will realize and understand, upon reading this description, that a single reducer node could be used for each log stream, but the multiple reducer nodes provide additional reliability in case one of the reducer nodes fails.

Reducer and Collector Redundancy

Figure 10A:
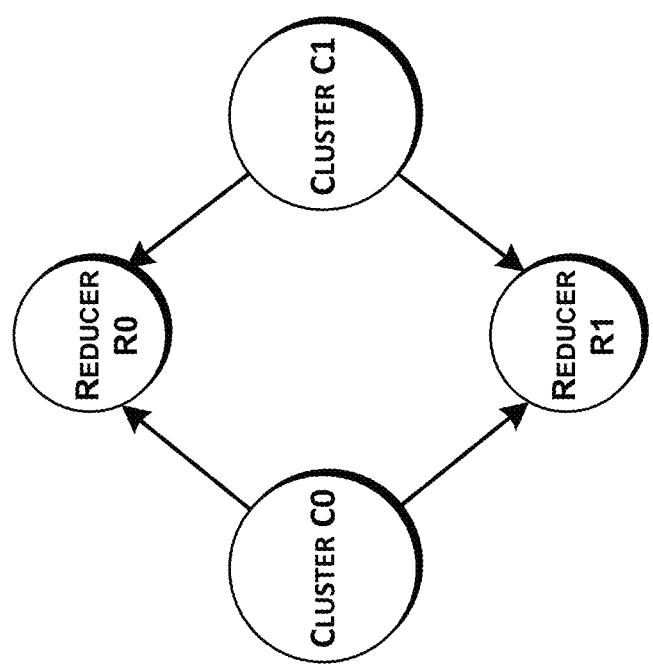
Figure 10B:
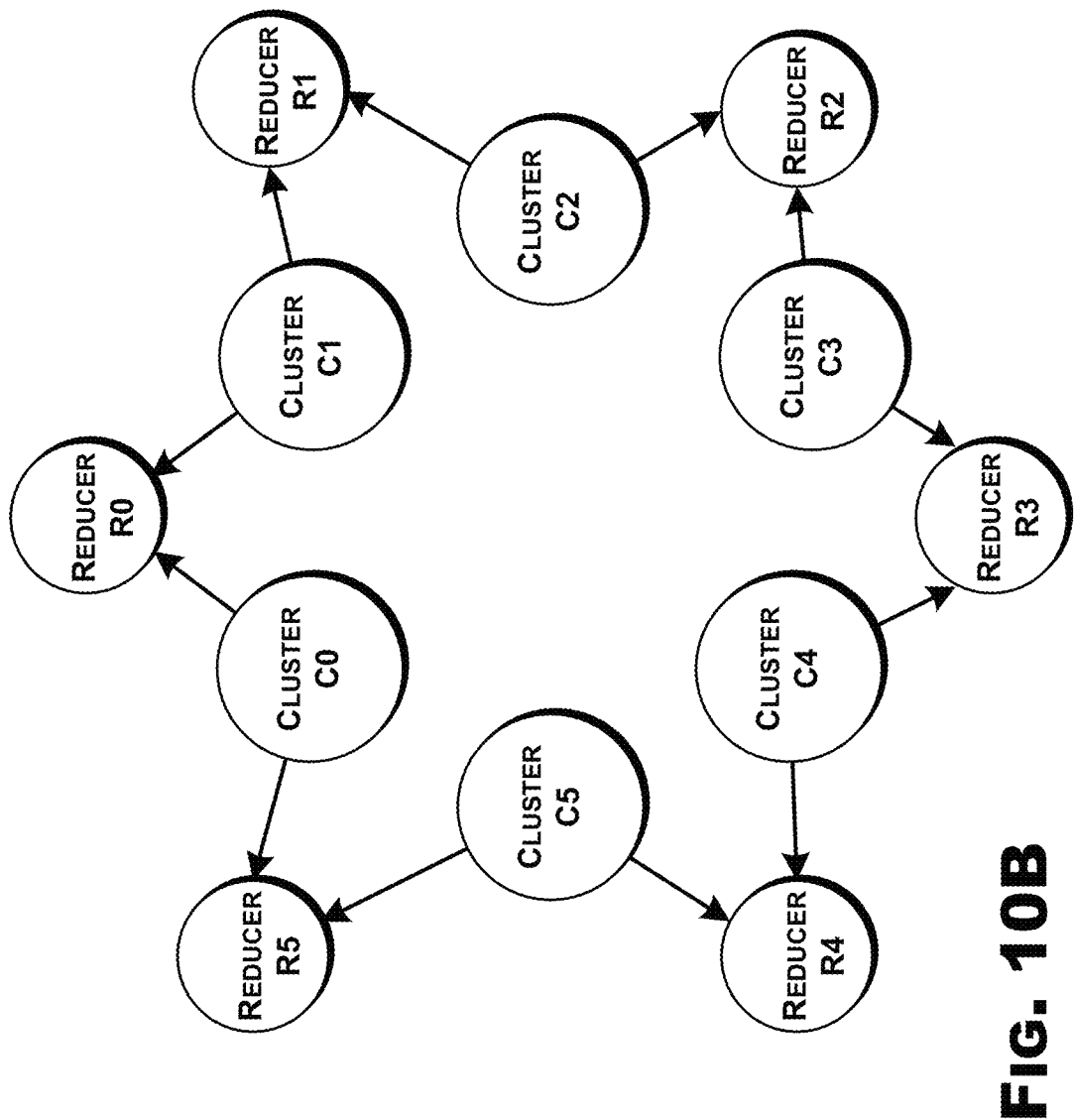

Since it is assumed that event information may not be stored locally on a physical machine associated with a service instance, service instances in the CDN are preferably assigned at least two reducers to which to send their events. Reducers can feed other reducers, in hierarchical fashion. Thus, e.g., as shown in FIG. 10A, the CDN service instances in clusters C0 and C1 each provide their event streams to both reducer R0 and reducer R1. Thus, if either one of the reducers fails, the event streams from the service instances will still be captured. FIG. 10B shows an exemplary configuration in which event streams from six clusters or service instances (denoted C0, C1, C2, C3, C4, C5) are each sent to two reducers (out of six reducers R0 to R5). Thus, event streams from cluster C0 are provided to reducers R5 and R0, event streams from cluster C1 are provided to reducers R0 and R1, and so on.

As noted, a reducer could be a local agent on the same machine as the service instance, or a remote agent. A local reducer may be used with a local collector to store information locally.

FIG. 10C shows another exemplary configuration in which the reducers are logically organized in an hierarchical manner, with reducers in multiple levels. As shown in the drawing, service instances in each cluster provide their event streams to two reducers in the first level (Level 0). The service instances in cluster C1 provide their event streams to reducers L0R0 and L0R1, the service instances in cluster C2 provide their event streams to reducers L0R1 and L0R2, and so on. The reducers in Level 0 of the reducer hierarchy each provide event streams to two reducers at the next level in the hierarchy (in this example, to reducers L1R0 and L1R1), and so on.

Figure 10D:
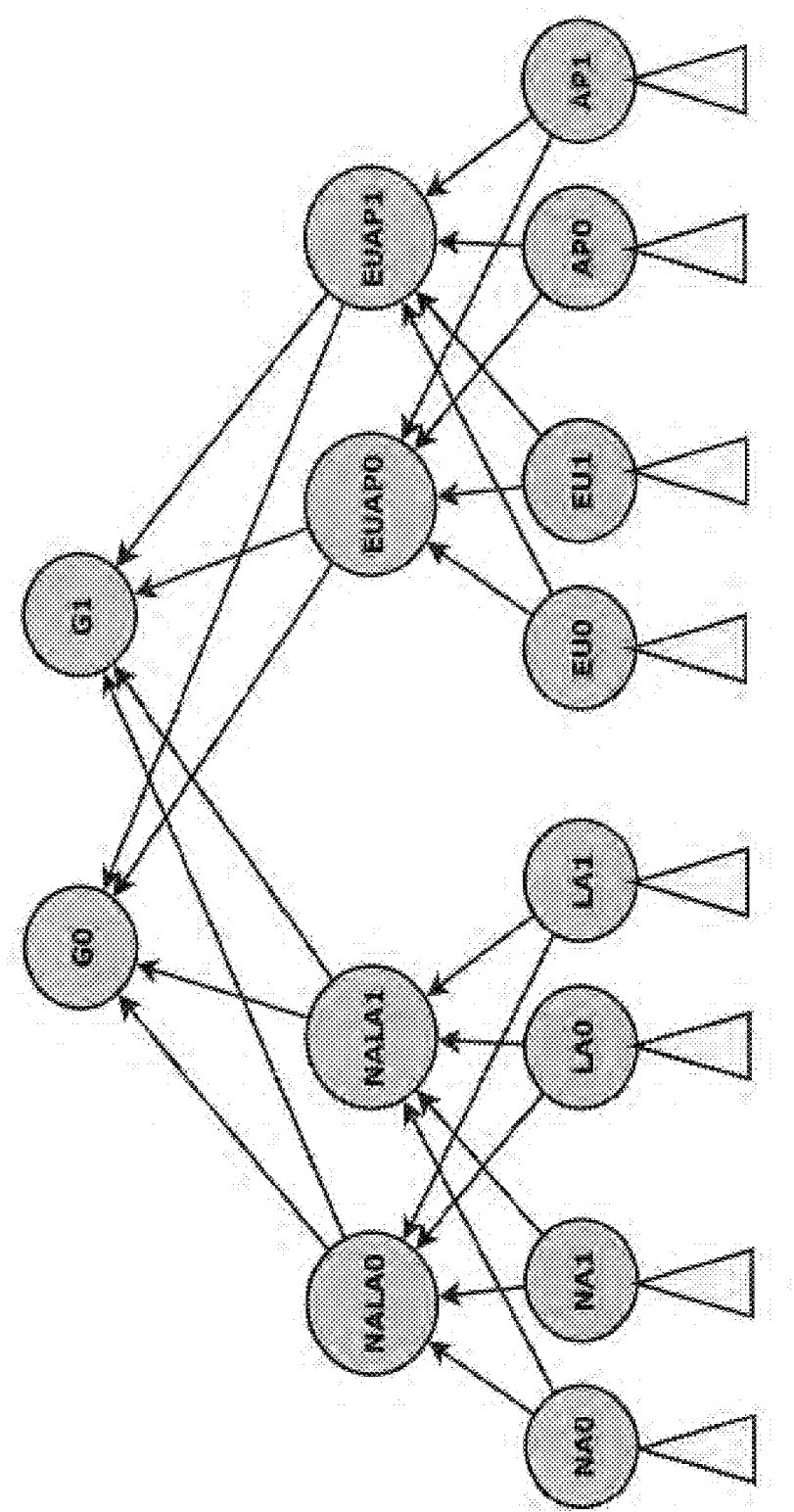

FIG. 10D shows an exemplary hierarchical configuration of reducers (or an NDR) in which the reducers are organized hierarchically (in levels) and by geographic region, with groups of reducers for North America (NA0, NA1), Latin America (LA0, LA1), Europe (EU0, EU1), and the Asia Pacific region (AP0, AP1). Service instances in the CDN will provide their event streams to appropriate reducers based on their regions. The first level reducers then provide their event streams to reducers at the next level (NALA0, NALA1, EUAP0, EUAP1), and so on. At a third level, the event streams are provided to reducers in groups G0 and G1. It should be appreciated that each of the circles in the diagram in FIG. 10D may represent a single reducer or a group of reducers. Thus, e.g., the circle labeled LA0 may be a single reducer or it may comprise multiple reducers. Similarly for each of the other circles in the diagram.

It should be appreciated that the instances or clusters of service instances shown in the diagrams may be any kind of service instance.

As noted earlier, with reference to FIG. 1L, the reducer service instances may form a network (NDR), a reducer services network comprising one or more sub-networks of those reducers. Various topologies and configurations of the reducer service instances network and sub-networks are shown here, although it should further be appreciated that the configurations shown in FIGS. 10A-10D are provided by way of example, and that different and/or other configurations may be used within a CDN. In addition, the configuration and/or topology of the network(s) of reducer service instances may be dynamic and may change during operation of the CDN. For example, the NDR or part thereof may change based on control information provided to various service nodes. This control information may have been determined based, at least in part, on feedback from service nodes in the CDN, provided to the control system via the NDR and the collectors.

As noted, a service instance may produce multiple different event streams, each relating to different kinds of events. Those of ordinary skill in the art will realize and understand, upon reading this description, that a service endpoint may provide different event streams to different reducers. Furthermore, those of ordinary skill in the art will realize and understand, upon reading this description, that different degrees of redundancy may be used for different event streams. It should be understood that each reducer produces at least one output event stream based on its operation as a CD service.

As described here, a service or component provides event data to another service or component (e.g., to a reducer or a collector). Event data may be provided by being pushed to the recipient component(s). Preferably the recipient of an event stream from a source is aware of the identity of that source, and preferably some form of authentication is used to authenticate the sender of the event stream.

Redundant duplicate collectors may also be provided, in a similar manner to reducers, to avoid lost data.

Figure 10E:
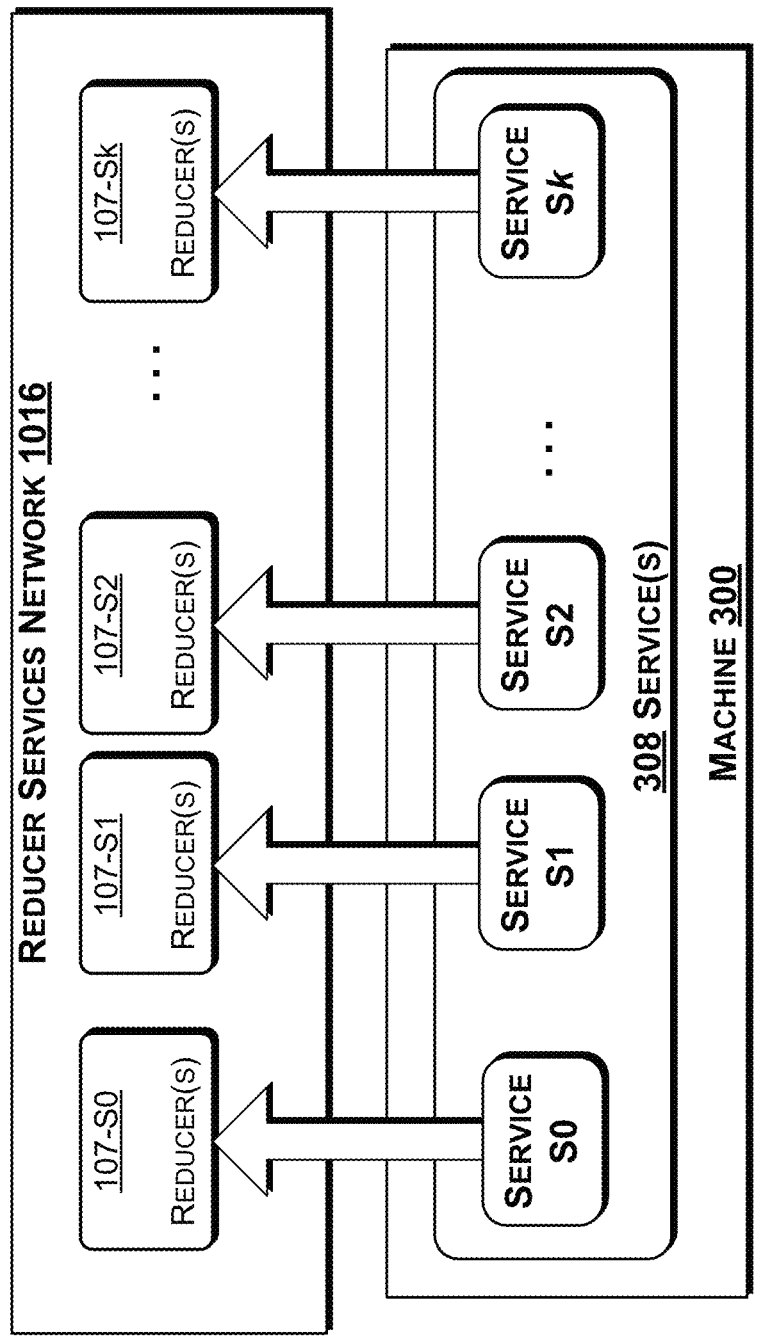

FIG. 10E shows an exemplary machine 300 running k services 308 (denoted S0 . . . Sk). Each service Sj on the machine provides its events to a corresponding set of reducers 107-Sj in the reducer services network 1016. It should be appreciated that the sets of reducers 107-Sj may be distinct, although some or all of the sets of reducers 107-Sj may overlap. Thus, e.g., the reducers in the set of reducers 107-Sp may be completely distinct from those in the set of reducers 107-Sq, for each p, q$\in[0 \ldots k]$, or some or all of the sets of reducers 107-Sp may overlap (i.e., be the same as) those in the set of reducers 107-Sq, for at least some p, q$\in[0 \ldots k]$.

Reducer and Collector Implementations

This section provides generic implementation models of reduction and collection and then provides examples of reducers and collectors, showing first how they are specified in terms of the generic implementation models.

The generic implementation models are useful for understanding and implementing reducers and collectors. In presently preferred implementations, generic reducers and generic collectors are provided, whilst specific reducer and collector specifications are deployed to the generic engines via their configurations. It should be appreciated that these specifications may be just service configurations that may change dynamically, as with all services.

A pure reducer is a service that consumes input events and generates a stream of reduced output events, where the output events generally summarize the input events by aggregating over space and time. Pure reducers do not store anything more than they need to buffer in order to compute their output events, and they provide no queries over events they may have read or generated—they just generate events as they compute them.

A pure collector, on the other hand, consumes input events and aggregates them into one or more tables which can be queried ad hoc, but pure collectors produce no output events (other than the event streams that they produce as CD services, e.g., event streams relating to health, utilization, activity, etc.).

Although only pure reducers and collectors are described here, those of ordinary skill in the art will realize and understand, upon reading this description, that there is nothing that should prevent an actual service implementation (and perhaps even the generic reducer/collector engine) from combining the facilities for reduction and collection.

Generic Reducer

A generic reducer R consumes one infinite event stream e and generates another infinite event stream E in real time:

$$e: \langle e_0, e_1, \ldots \rangle \xrightarrow{R} E: \langle E_0, E_1, \ldots \rangle$$

Each event $e_i$ or $E_j$ is assumed to be an arbitrarily long tuple of three kinds of components: a timestamp, a set of keys, and a set of values. Those of ordinary skill in the art will realize and understand, upon reading this description, that in implementations there may be other tuples for stream identifiers, agent identifiers, etc.

$$e_i = (t_i, \vec{k}_i, \vec{v}_i) = (t_i, k_{i0}, \ldots, k_{in}, v_{i0}, \ldots, v_{in})$$

$$E_j = (T_j, \vec{K}_j, \vec{V}_j) = (T_j, K_{j0}, \ldots, K_{jp}, V_{j0}, \ldots V_{jq})$$

The actual content of events and ordering of tuple components may be arbitrary, and relies on a function project to define the input projection and a function compose to define the output composition:

$$(t_i, \vec{k}_i, \vec{v}_i) = \text{project}(e_i)$$

$$E_j = \text{compose}(T_j, \vec{K}_j, \vec{V}_j)$$

Input events $t_i$ are consumed in timestamp order and output events are generated with monotonically increasing timestamps $T_j$ and with bounded delay (hence the "real-time" claim). It is possible to have many events in the input stream with the same timestamp, and many events in the output stream with the same timestamp. The resolution of $T_j$ must be less than or equal to the resolution of $t_i$. A generic reducer is further defined by two Boolean filtering functions:

receive?$(t_i, \vec{K}_i, \vec{v}_i)$ send?$(T_j, \vec{K}_j, \vec{V}_j)$

These two functions determine which input events will be consumed and which output events will be sent. The following four key/value transformation functions complete the definition of the reducer:

$$T_j = \text{warp}(t_i)$$

$$\vec{K}_j = \text{map}(\vec{k}_i)$$

$$(\vec{V}_j)_0 = \text{init}(T_j)$$

$$(\vec{V}_j)_{i+1} = \text{reduce}((\vec{V}_j)_i, \vec{v}_i)$$

where warp defines how high resolution input timestamps are aggregated into lower resolution output timestamps, map defines how input keys map to output keys, and the two functions init and reduce define an incremental folding of input values into aggregated output values. This is in effect a standard map/reduce computation, but applied incrementally in time-sequenced manner as opposed to a batch computation on previously collected data.

Note that the input and output timestamps could have equivalently been defined as part of the keys, but they were explicitly separated because they defined the buffering behavior of the reducer. Output events for a given output timestamp are generated in order, at some point after the point where all relevant input events for that output timestamp have been consumed.

---

Algorithm 1 Generic Reduction

Procedure INPUT(e)
    $(t, \vec{k}, \vec{v}) \leftarrow \text{project}(e)$
    If receive? $(t, \vec{k}, \vec{v})$ then
        consume$(t, \vec{k}, \vec{v})$
    end if
End procedure INPUT
Procedure CONSUME$(t, \vec{k}, \vec{v})$
    $T \leftarrow \text{warp}(t)$
    $\vec{M} \leftarrow \text{map}(\vec{k})$
    $\vec{A} \leftarrow \text{accum}\{T, \vec{M}\}$
    If undefined $\vec{A}$ then
        $\vec{A} \leftarrow \text{accum}\{T, \vec{M}\} \leftarrow \text{init}(T)$
    end if
    accum$\{T, \vec{M}\} \leftarrow \text{reduce}(\vec{A}, \vec{v})$
End procedure CONSUME
Procedure PRODUCE$(T, \vec{K}, \vec{V})$
    If send?$(T, \vec{K}, \vec{V})$ then
        E = compose$(T, \vec{K}, \vec{V})$
        OUTPUT(E)
    end if
end procedure PRODUCE

---

The reducer maintains an input clock representing the last input timestamp for which all input events have been consumed. The implementation of the event transport provides a mechanism for an event source to guarantee to an event sink that events earlier that a given timestamp will no longer be generated, and this mechanism is used to advance the reducer's clock. Whenever the input clock advances from $t_i$ to $t_{i+1}$ the output clock may also need to advance, depending on whether warp($t_i$)=warp($t_{i+1}$). If the output clock advances, the reducer may generate all reduced values collected for all output timestamps up to but not including warp($t_{i+1}$).

Generic Collector

A generic collector C consumes an event stream and generates updates to a table, while asynchronously responding to ad hoc queries over the table:

$$e: \langle e_0, e_1, \ldots \rangle \xrightarrow{C} \text{Table: } [Col_0, Col_1, \ldots]$$

The collector's TABLE is specified in the collector as a set of columns, and a key function defines how to compute the key used to lookup a row in the table from a given input event (usually as a projection of each input event).

Input events are just like the inputs to reducers, and are consumed in timestamp order. The key corresponding to each input event determines a row which may or may not already exist. The specifications of update? and/or update functions determine when, where, and how updates occur:

If update?(e) is true, the event should cause an update (otherwise the event is ignored).

If the row for key(e) exists in the table, then update(e, row) returns the new value to store in that row.

If the row for key(e) does not exist in the table, then update(e) returns the initial value for a new row.

Periodic updates to the table may also be defined to occur asynchronously with the event stream (where the period is a configuration parameter). In this case, conditions are defined on existing rows without regard to events, and rows are updated or deleted if those conditions are true:

When update?(row) is true, the row's new value is set to update(row).

When delete?(row) is true, the row is deleted.

Pseudo columns may be defined to represent the ordering of a row with respect to the sort order imposed by a particular column (and possibly other values that are computed periodically based on the overall table state). The value of this column may then be used to filter out rows past a certain position in the sort order in order to implement a top-N retention policy. Other aggregate values computed over multiple rows may be referenced in selectors. (Pseudo columns and aggregate values can also be implemented via separate event streams, though less conveniently so.)

As should be apparent to those of ordinary skill in the art, upon reading this description, collectors and reducers consume the same kind of event streams in accordance with an embodiment. As a consequence, not every collector will need intervening reducers in order to consume and process event streams.

Collectors and the Operation/Measurement/Administration (OMA) System

A Network Data Reducer (NDR) generally refers to the system of reducers across the global CDN, including not just the individual stream reducers but also the entire system for configuring and deploying the reducers to various places in the network. Preferably the NDR does not actually store anything for any length of time, it just makes data streams available to processes.

Reducers thus provide event streams (possibly via other reducers in an NDR) to collector services (or collectors). Collectors are a heterogeneous collection of services that transform reduced event streams into useful services, possibly storing large amounts of historical state to do so.

The Network Data Collector (NDC) refers to the set of processes that consume events and store them in some way in order to provide additional non-event-stream services to other parts of the network. As described, certain of the event consuming applications may also provide feedback services (possibly even source additional events).

With reference to FIGS. 1L and 11, the reducer services 1016 comprise an NDR, and the collector services 1012 comprise an NDC.

The reducer/collector services may provide a source of local or global data (e.g., in real time) for analytics, monitoring, and performance optimization. Data are detected, reduced, and preferably used as close to the source as necessary. Aggregation over multiple nodes in a neighborhood means nodes can get near real-time access to information that is not directly computable from purely node-local information.

The use of event streams, in conjunction with appropriate reducer and collector services means that CDN service endpoints, e.g., caches, DNS name servers, and the like, need not create or store local log information. Information that may be needed globally (e.g., for feedback, control, optimization, billing, tracking, etc.) can be provided in real time to other services that need (or may need) that information. It should be appreciated that the use of event streams, reducers and collectors does not preclude the local storage of log information at event generators, although such storage is generally not required.

Certain event data, however, may be more important than other event data (e.g., event data that may be used for accounting or billing purposes), and such data, referred to here as precious data, may be stored locally at its source as well as sent as an event stream to the NDR. Those of ordinary skill in the art will realize and understand, upon reading this description, that the reducer(s) to which a service sends an event stream could include a local agent on their machine, or a remote agent. Similarly, a collector service may be a local service/agent. Thus, a service may use a local reducer, alone or with a local collector, on their machine, to create local log data related to the local event stream.

Each collector may provide some or all of one or more of the services associated with the OMA 109 (FIG. 4B). Thus a collector service may be used as one or more of: a monitor and gatherer 120, a measurer 122, an analyzer 124, a reporter 126, a generator 128, and an administrator 130. That is, a collector service may use the input stream(s) (event stream(s)) obtained from one or more reducers to provide, in whole or in part, services associated with the OMA.

For the purposes of this description, a collector providing a particular OMA service may be referred to by the description of that OMA services. For example, a collector 106 providing service as a load analyzer 142 may be referred to as a load analyzer 142 or a load analyzer collector, etc. Those of ordinary skill in the art will realize and understand, upon reading this description, that a particular collector may provide multiple OMA services or functionality. Thus, it should be appreciated that a collector may combine the functionality of various aspects of the OMA. For instance, gathering, measuring, analyzing and reporting may all be combined into a single collector.

Various examples of uses of the reducer/collector system (the NDR and NDC) are provided here. Some of these examples show implementation of reducers and/or collectors using the generic/pure reducer/collectors described above. In the following description, reducers shown with arguments T, L, C, and/or A actually represent families of multiple reducers, where a single reducer in the family is defined by the selection of the function parameters T, L, C, and/or A.

The reducers covered here are listed in Table 3.

TABLE 3

Reducers

| Reducer | Name | Input Event | Output Event |
|---|---|---|---|
| 1 | RequestCounter ($\mathcal{T},\mathcal{L},C$) | (t, l, c, r, s) | (T, L, C, r, s, N) |
| 2 | Usage($\mathcal{T},\mathcal{L},C$) | (t, l, c, r, s, N) | (T, L, C, N, B) |
| 3 | Billing($\mathcal{T},\mathcal{L},C$) | (t, l, c, $\vec{r}$u) | (T, L, C, $\vec{R}$U) |
| 4 | Load($\mathcal{T},\mathcal{L}$) | (t, l, $\vec{m}$) | (T, L, $\vec{M}$) |
| 5 | Analytics($\mathcal{T},\mathcal{L},C,\mathcal{A}$) | (t, l, c, r, N) | (T, L, C, A, N) |

Example Reducer 1: Basic Request Counting

This reducer merely counts requests, producing an output event stream containing the resource size and total request count per output time interval T for each unique resource observed, where t is the cache system clock when resource r of size s was requested from caching location l and processed according to request collection c.

| Reducer 1: RequestCounter(T, L, C) | |
|---|---|
| Input: | (t, l, c, r, s) |
| Output: | (T, L, C, r, s, N) |
| | warp (t) = T(t) |
| | key (t, l, c, r, s, e, h) = (l, c, r) |
| | map (l, c, r) = (L(l), C(c), r) |
| | value (t, l, c, r, s) = (s, 1) = (s, N) |
| | init (t) = (0, 0) |
| | reduce (($s_1$, an), ($s_2$, n)) = ($s_2$, an + n) |

Thus the output stream will contain one event $$\left(T, L, C, r, s, N = \sum_{L, C, r, t \in T} 1\right)$$

for each unique value of (L, C, r) per minute T, where s is the most recently received size value.

Example Reducer 2: Throughput and Bandwidth Usage

To compute throughput and bandwidth consumption, sum the product of request counts and resource sizes.

| Reducer 2 Usage(T, L, C) | |
|---|---|
| Input: | (t, l, c, r, s, N) |
| Output: | (T, L, C, N, B) |
| | warp (T) = T(t) |
| | key (t, l, c, r, s, N) = (l, c) |
| | map (l, c) = (L(l), C(c)) |
| | value (t, l, c, r, s, N) = (N, N * s) = (N, B) |
| | init (T) = (0, 0) |
| | reduce ((an, ab), (n, b)) = (an + n, ab + b) |

Example Reducer 3: Billing

To compute billing information sum resource utilization counts.

| Reducer 3 Billing (T, L, C) | |
|---|---|
| Input: | (t, l, c, $\vec{r}$u) |
| Output: | (T, L, C, $\vec{R}$U) |
| | warp (T) = T(t) |
| | key (t, l, c, $\vec{r}$u) = (l, c) |
| | map (l, c) = (L(l), C(c)) |
| | value(t, l, c, $\vec{r}$u) = ($\vec{r}$u) = ($\vec{R}$U) |
| | init (T) = ($\vec{0}$) |
| | reduce (($\vec{a}$n), ($\vec{n}$)) = ($\vec{a}$n + $\vec{n}$) |

Example Reducer 4: Load

To perform load monitoring, compute average load metrics. In this case assume $\vec{m}$ consists of a set of additive metrics at some measurement location l, and all locations in the input stream are equally weighted. For example, a metric might be CPU utilization and locations could refer to different machines with the same number of cores each. The average load per location can then be computed from each output event by $\vec{M}/N$.

| Reducer 4 Load (T, L) | |
|---|---|
| Input: | (t, l, $\vec{m}$) |
| Output: | (T, L, $\vec{M}$, N) |
| | warp (T) = T(t) |
| | key (t, l, $\vec{m}$) = (l) |
| | map (l) = (L(l)) |
| | value(t, l, $\vec{m}$) = ($\vec{m}$, 1) = ($\vec{M}$, N) |
| | init (T) = ($\vec{0}$, 0) |
| | reduce (($\vec{a}$m, an), ($\vec{m}$, n)) = ($\vec{a}$m + $\vec{m}$, an + n) |

Example Reducer 5: Analytics

To compute analytics sum request counts by resource groups.

| Reducer 5 Analytics (T, L, C, A) | |
|---|---|
| Input: | (t, l, c, r, N) |
| Output: | (T, L, C, A, N) |
| | warp (T) = T(t) |
| | key(t, l, c, r, N) = (l, c, r) |
| | map (l, c, r) = (L(l), C(c), A(r)) |
| | value (t, l, c, r, N) = (N) |
| | init (T) = (0) |
| | reduce ((an), (n)) = (an + n) |

Collectors

The example collectors described here are listed in Table 4.

TABLE 4 example collectors

| Collector | Name | Input Event | Output Table |
|---|---|---|---|
| 1 | CacheIndex | (t, node, r, cached) | CacheIndex (node, r, cached) |
| 2 | TopN | (t, r, N) | TopN (r, N, rank) |
| 3 | UpTime | (t, x, a) | UpTime (x, a, first, last, ust, dst, utot) |
| 4 | Popularity | (t, r, ca, sz, rate) | Popularity (r, t, ca, sz, rate, rank) |

Collector 1: A Caching Index Collector

A collector may be used to track where each resource is cached from among a set of caches. From each cache consume a variant of the request stream including events from the asynchronous cache management part of each cache, in effect receiving a sequence of events telling us when resources are added to or removed from a given cache's in-memory or on-disk cache.

To simplify the discussion, assume each cache just has an in-memory cache. A fill inserts a resource into cache, an eviction or purge deletes it from cache. In this version, invalidation does not change anything (though this could easily be extended to index cached resources by minimum origin version). Given an input stream of events:

(t, node, r, cached)

this collector (see collector CacheIndex below) retains rows of the form (node, r, cached), where cached=1 means that node has a copy of r in cache. The collection is defined such that (node, r) is a key, so each (node, r) combination has one value of cached representing the latest state of node's cache with respect to resource r.

| Collector 1 CacheIndex | |
| --- | --- |
| Input: | (t, node, r, cached) |
| Table: | CacheIndex |
| | columns ≡ (node, r, cached) |
| | key ≡ (node, r) |
| | update ?(e) ≡ true |
| | delete ?(row) ≡ (row.cached == 0) |

This updates with a new cached value for each event, then deletes rows for resources which are not cached.

Collector 2: Top-N Request Collector

Given a request count event stream, a collector may be defined (see collector 2—TopN) that captures the most popular resources over some amount of time in the recent past, and then allows the captured data to be queried.

| Collector 2 TopN | |
| --- | --- |
| Input: | (t, r, count) |
| Table: | TopN |
| | columns ≡ (r, count, rank : sort(count)) |
| | key ≡ (r) |
| | update ?(e) ≡ true |
| | delete ?(row) ≡ (row.rank > N) |

This inserts every event, projecting just the (r, count) fields and adding a rank column, and then deletes rows with insufficient rank.

Collector 3: Uptime Collector

An uptime collector captures events indicating the availability $a \in \{0,1\}$ of entity x at time t:

(t, x, a)

where a=0 if the entity (machine, service, VIP, etc.) is unavailable, a=1 if it is available, and use this information to compute the total time the entity has been available. Such a collector is shown in collector 3 (Uptime), which maintains for each entity x the last availability value a along with the first and last time any event was received for a given entity, the last time the entity went from down to up (ust=up start time), the last time the entity went from up to down (dst=down start time), and the total uptime and downtime (utot and dtot). Total downtime can be computed from (last−first−utot.

| Collector 3 Uptime | |
| --- | --- |
| Input: | (t, x, a) |
| Table: | UpTime |
| | columns ≡ (x, a, first, last, ust, dst, utot) |
| | key ≡ (x) |
| | update ?(e) ≡ true |
| | update (e) ≡ (e.x, e.a, e.t, e.t, e.t, e.t, 0) |
| | update (e, r) ≡ case |
| | e.a > r.a → (r.x, 1, r.first, e.t, e.t, r.dst, r.utot) |
| | e.a < r.a → (r.x, 0, r.first, e.t, r.ust, e.t, r.utot + (e.t − r.last)) |
| | e.a = 1 → (r.x, 1, r.first, e.t, r.ust, r.dst, r.utot + (e.t − r.last)) |
| | e.a = 0 → (r.x, 0, r.first, e.t, r.ust, r.dst, r.utot) |
| | update?(r) ≡ (r.a = 1) and age(r.last) > $MaxAge_1$ |
| | update (r) ≡ update (r, (now, r.x, 0)) |
| | delete?(r) ≡ (r.a = 0) and age(r.last) > $MaxAge_2$ |

The last part of this collector deals with entries in the collection for which no new information has been received. It the current state is declared up and the time since the last received event is greater than $MaxAge_1$ then the entity is declared down at that time. If an entity has been declared down and the time since the last received event (or the time it was assumed down) is greater than $MaxAge_2$ then the entity is deleted from the collection.

Collector 4: Resource Popularity, Cacheability, and Size Collector

A collector may be used to keep track of the popularity, cacheability, and size of a resource in order to inform the peering policy of a set of peer caches from an event stream of the form:

(t, r, ca, size, rate)

where r is a resource identifier, $ca \in [0,1]$ is the cacheability of the resource (where 0 means non-cacheable and 1 is maximally cacheable), size is the number of bytes in the response, and rate is the instantaneous request rate (as measured by the reducer producing this event stream, which would be averaged over some time period).

| Collector 4 Popularity | |
| --- | --- |
| Input: | (t, r, ca, size, rate) |
| Table: | Popularity |
| | columns ≡ (r, t, ca, size, rate, rank : sort(rate)) |
| | key ≡ (r) |
| | update ?(e) ≡ true |
| | update (e, row) ≡ (row.r, e.t, e.ca, e.size, e.rate) |
| | update ?(row) ≡ age(row.t) > MaxAge |
| | update (row) ≡ (row.r, now, row.cs, row.size, row.rate/K) |
| | delete ?(row) ≡ (row.rank > N) |

In this case keep t but not as a key—use it as a timestamp of the last time a resource was updated, and then use this to both decay the request rate over time and eventually remove resources that have not seen any activity for $MaxA_ge$ units of time.

The reducer and collector implementations given above show examples of the use of the pure reducer and collector functions to develop arbitrarily complex reducers and collectors. These examples are given for purposes of description and explanation only, and are not intended to limit the scope of the system or any actual implementation. Those of ordinary skill in the art will realize and understand, upon reading this description, that different and/or other implementations of reducers and collectors are possible, and those are contemplated herein.

Various examples of the use of reducers/collectors are provided here. It should be appreciated that each of these examples may be implemented, in whole or in part, using the generic reducer/collector described above.

Load

The OMA's load mechanisms include load measurers 123, load monitors 132, and load analyzers 142 (with reference to FIG. 4B). Load measurers 123 may actively monitor aspects of the load on the network and the CDN. Mechanisms dispersed throughout the CDN 100, including preferably at some caches, provide load-related information to the OMA 109 (i.e., to collectors 106 acting as load monitors and/or load analyzers) via reducers 107 (i.e., via an NDR).

Figure 12A:
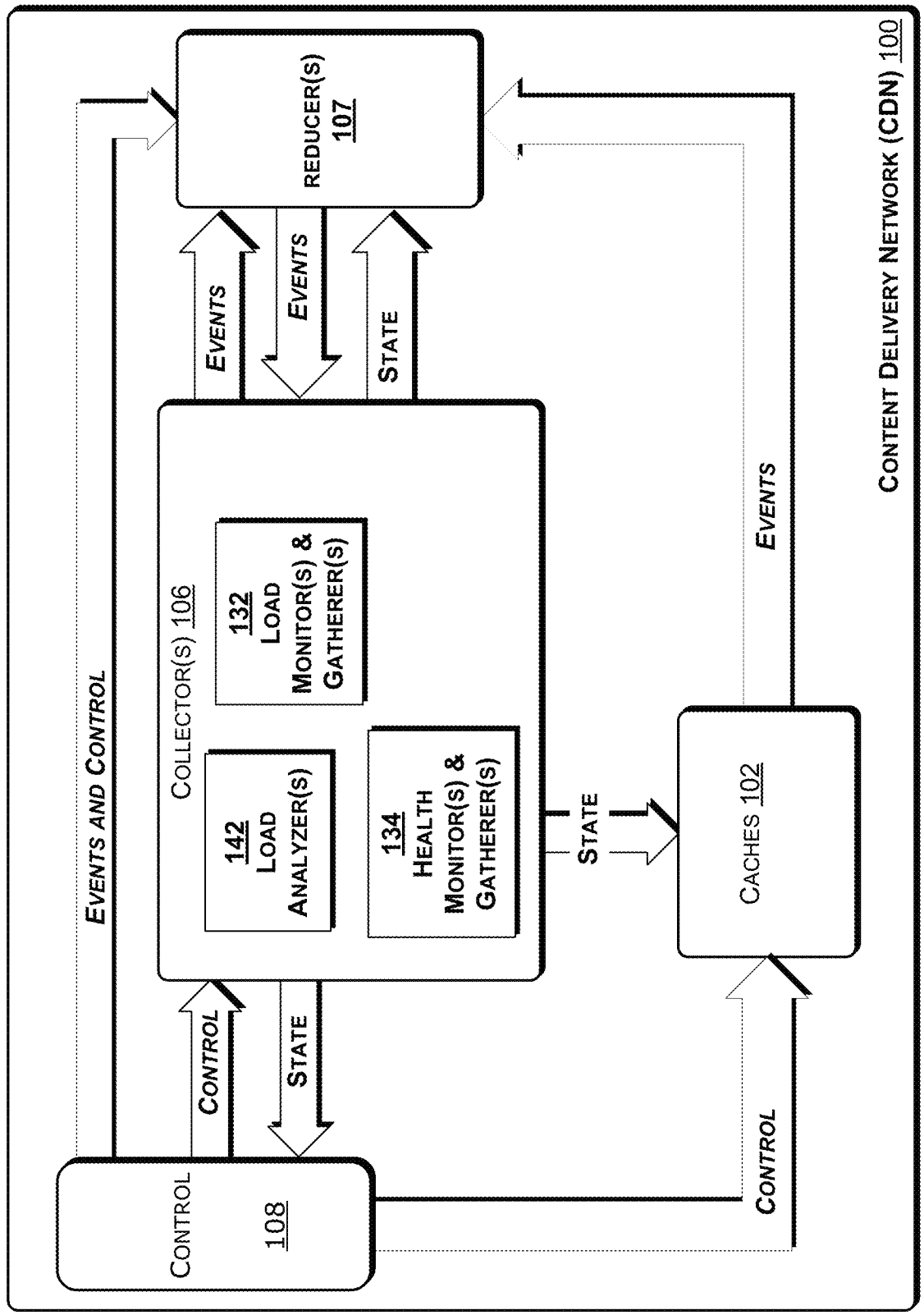

For example, as shown in FIGS. 12A-12B, caches 102, produce and provide (e.g., push) events streams (including, e.g., load information and/or information from which load information can be derived, and health information and/or information from which health information can be derived) to appropriate reducers 107. The reducers 107 reduce and consolidate the information in the event streams, as appropriate, and provide it to the CDN's appropriate collectors 106 (e.g., collectors providing services as load monitors and gatherers 132, collectors providing services as health analyzers 134, and collectors providing services as load analyzers 142). The load monitors and gatherers 132 in turn provide gathered/collected load information to load analyzers 142 which, in turn, provide load information to various generator mechanisms 128. The load information provided to the generator mechanisms 128 may be used, alone, or in conjunction with other information (e.g., health information) to provide information to the control mechanism 108. The control mechanism 108 may then provide control information, as appropriate, to the rendezvous mechanisms 104 and to other CDN components (e.g., the caches 102). The collector(s) 106 may also provide state information to the caches 102.

Note, as shown in the drawing (FIG. 12A), the collector(s) may also provide state information directly to the caches 102, so that cache operation may be controlled directly and not only via the control 108. This state information may correspond to the "S local" state information shown in FIG. 4E.

Load information may be used (alone or in conjunction with other information such as, e.g., health information), e.g., to configure or reconfigure aspects of the CDN. For example, load information may be used (alone or in conjunction with other information, e.g., network load information and information about the health of the network and the various caches) to allocate caches to CDN regions or segments and/or to set or reset caches' roles.

When health information is used by one of the generators 128, that information may be obtained using an appropriate health monitoring and gathered from/by appropriate collectors.

The load mechanisms may use the load reducer described above.

Popularity

Content analytics reductions provide all that is needed for popularity evaluation of specific resources. This data may be provided back to the caches and/or the rendezvous system and may be used to implement popularity-based handling of requests.

Figure 12C:
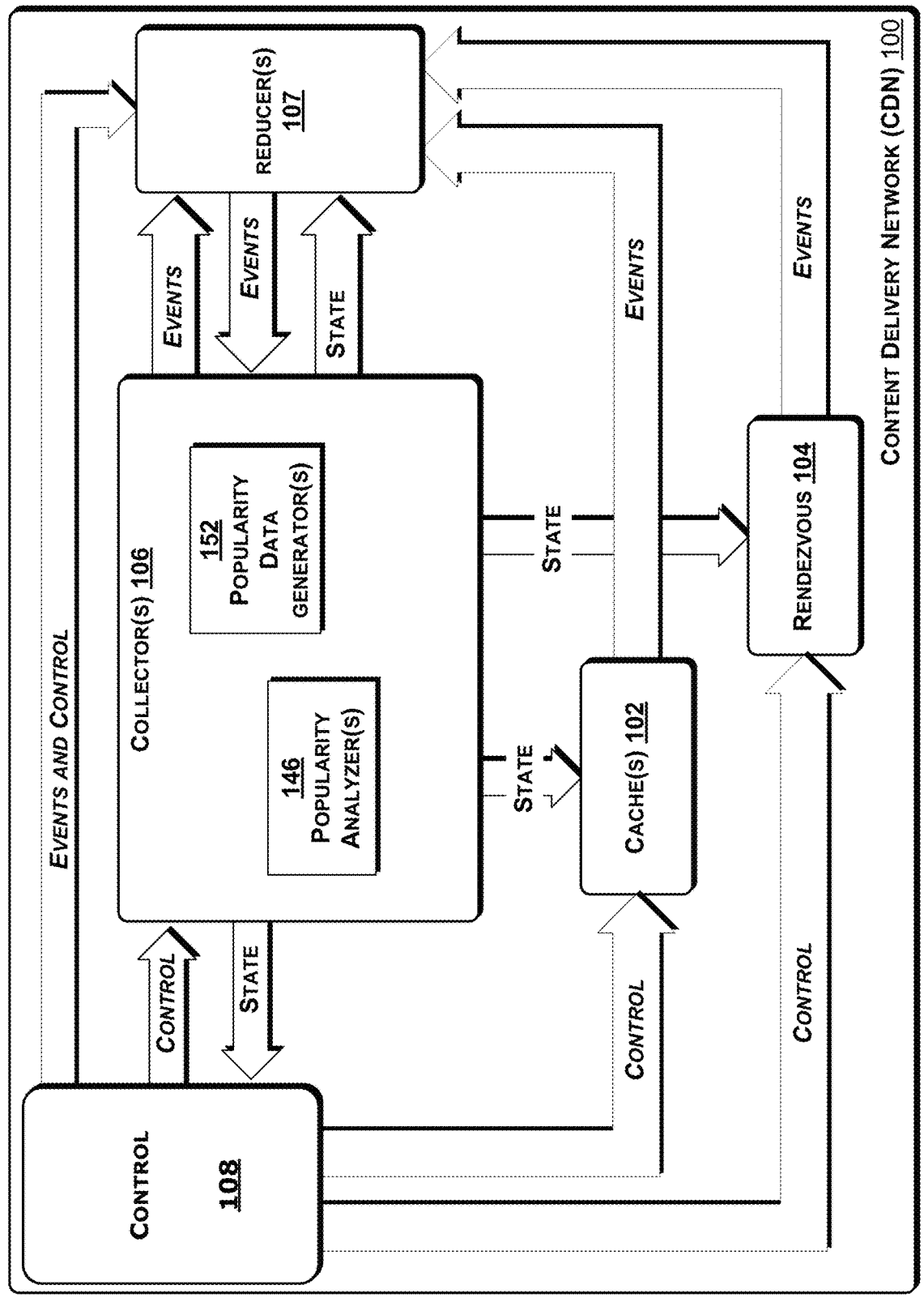

With reference to FIG. 12C, the CDN's caches 102 and possibly other services may produce log data (e.g., as an event stream) relating to resources requested and served on behalf of the CDN. This log information is preferably provided (e.g., pushed) by caches, via reducer(s) 107, to appropriate collectors 106 that can function as popularity analyzer(s) and/or popularity data generators 152. Popularity data generators 152 may generate data for use by the caches 102 (e.g., for use in pre-populating caches, and/or for redirecting resource requests). In addition, popularity data generators 152 may also generate data for use by the rendezvous system 104 (e.g., for use in directing resource requests to appropriate locations).

The rendezvous mechanisms 104 may produce log information relating to rendezvous requests and/or rendezvous made. When the rendezvous system includes a DNS system, the log information produced by the rendezvous system may include name resolution information, including, e.g., the names provided to the rendezvous mechanism by resolvers and the results of name resolutions. Name resolution information may be gathered by the rendezvous monitor and gatherer 137 and may be analyzed by the rendezvous analyzer 147. Rendezvous information (e.g., name resolution information) may be used alone or in combination with resource request information to determine aspects of resource popularity. This information may be particularly useful when a resource may be requested using multiple URLs having different hostnames associated therewith. In such cases, the rendezvous information in the form of name resolution information can be used to determine which of the URLs is being used to request the resource.

In preferred implementations there are two ways to address popularity using some separate source of information about the popularity of a resource.
(1) Alter the responsibility computation to include popularity, making more nodes responsible for popular resources than for unpopular (non-popular) resources.
(2) Handle popularity separately before responsibility. Redirect for unpopular objects (without regard to responsibility computation), apply usual responsibility-based peering only if popular.

These approaches can be combined, allowing more than just a redirect-or-follow approach. In some cases the CDN can vary the number of nodes which will store the resource as a function of popularity, size, etc.

The CDN can also use local feedback for tuning of the popularity service based, e.g., on performance of the cluster. Reducer also ensures that cache hits will still affect popularity, though with some time lag.

Rendezvous using resource popularity is described, for example, in U.S. Pat. No. 7,822,871 titled "Configurable Adaptive Global Traffic Control And Management," filed Sep. 30, 2002, issued Oct. 26, 2010; and U.S. Pat. No. 7,860,964 titled "Policy-Based Content Delivery Network Selection," filed Oct. 26, 2007, issued Dec. 28, 2010, both of which have been fully incorporated herein in their entirety for all purposes.

A popularity-based system may use the popularity collector described above.

Billing

As noted, the CDN's caches 102 may produce log data (e.g., as an event stream) relating to resources requested and served on behalf of the CDN. The log data may be used to determine not only which resources were requested, but also information about whether/how the requested resources were served. This log information is provided (e.g., pushed) by the caches, via reducer(s) 107, to appropriate collectors 106 that can function as gatherer mechanisms 136 and/or as billing reporters 140 in the OMA 109 to produce customer billing information.

Figure 12D:
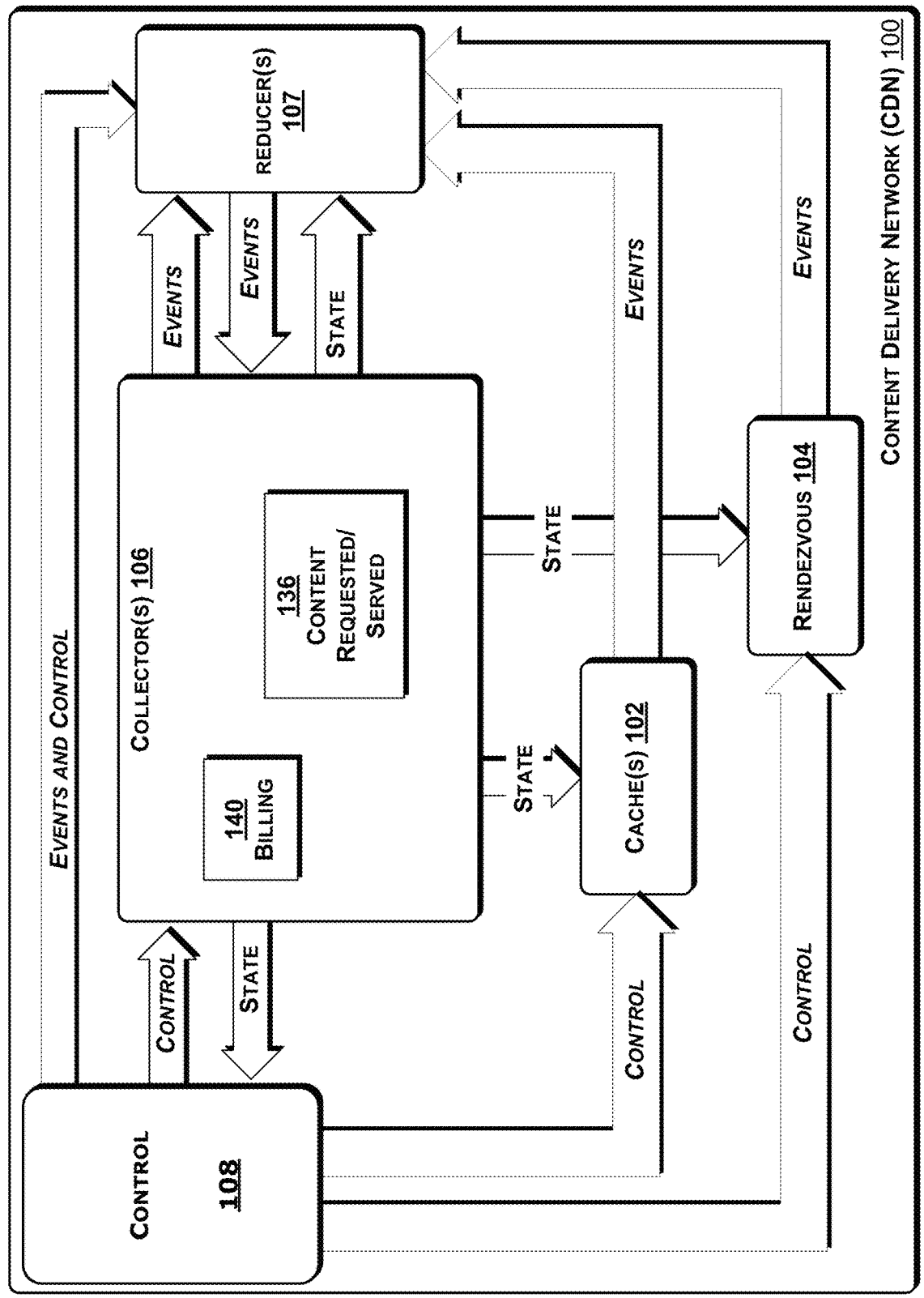

Those of ordinary skill in the art will realize and understand, upon reading this description, that billing information may be generated based on different and/or other factors. For example, as shown in FIG. 12D, in some cases rendezvous data may also be used to generate billing data information.

The OMA billing mechanisms may use the billing reducer described above.

Reporting

Figure 12E:
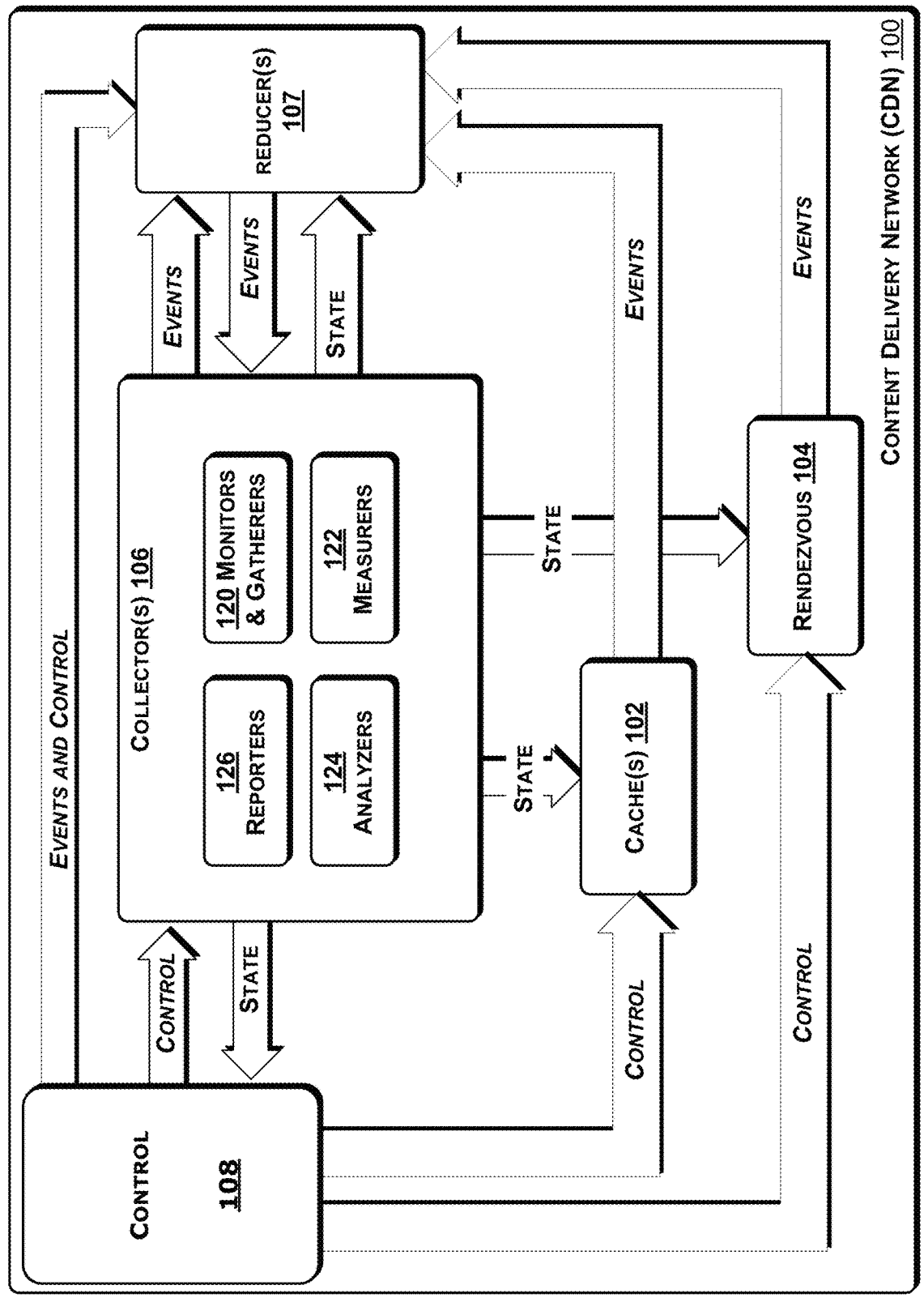

CDN services may produce log data (e.g., as event streams) relating to various aspects of their operation. E.g., caches 102 may produce log data (e.g., as an event stream) relating to resources requested and served on behalf of the CDN; rendezvous services 104 may produce log data (e.g., as an event stream) relating to name resolution requests on behalf of the CDN, etc. This log information may be provided (e.g., pushed) by the various services via reducer(s) 107 to the appropriate collectors 106, which, in turn, function to gatherer, measure, analyze and report this information. For example, as shown in FIG. 12E, log data (as event streams) may be provided to monitors and gatherers 120, measurers 122, analyzers 124, reporters 126.

For example, collectors may report information about which resources have been requested and/or served, information about load on the system, information about popularity of resources, etc.

Reports (or reporting) may be provided directly to customers and may be used within the CDN to maintain records and analyze CDN operation. The term "reports", as used herein, includes reports in any form (including graphical and/or textual), including reports provided in real time.

It will be appreciated that customers will only be able to see reports about their own properties. The system may provide for report customization and summary information. The system may also provide report information about the quality of service associated with a customer's contents' delivery.

As noted, a collector may combine the functionality of various aspects of the OMA. Thus, e.g., the functionality associated with gathering, measuring, analyzing and reporting may be combined into a single collector.

BUA (Bandwidth Use Analysis) Logging

All of the information needed by BUA logging is derived from or could be contained within the request event stream. Therefore, a separate set of BUA events can be generated by a reduction on the request event stream, thereby obviating the need for in-cache accumulation of usage counters and avoiding the need to generate and merge additional BUA log files. For measurements that are not appropriate to generate with each request, services can generate additional events when appropriate, and reduce these.

Content Analytics Logging

Reductions on request event streams can be used to compute various content analytics results, such as the most popular N resources per property for any given time period, or the request count for various groups of resources (defined by URL patterns). These may be computed globally as well as according to different geographical regions. These may be implemented using the Analytics reducer described above.

Load and Availability Monitoring

Each cache could generate events to track availability of VIPs, load, and local resource consumption as a function of time. In addition, external monitoring services could test the externally perceived availability of other services and generate events. These events could be reduced to produce aggregate availability, load, and resource consumption metrics for clusters, data centers, metropolitan areas, etc., and derived streams could be defined to generate alarm events when values at specific times and locations go out of tolerance. Monitoring applications, as well as the control mechanism itself, could then subscribe to these alarm streams to generate alerts and other response actions. These may be implemented using the Load reducer described above.

Invalidation Monitoring

The completion of an invalidation command can be recorded as an event, and the sequence of invalidation events can be reduced to provide feedback to the invalidation portal as to whether or not the invalidation command has been completely processed or not.

Resource Request Prediction and Prefetching (Site Optimization)

The sequence of requests that will likely follow a request to any given resource could be computed (estimated) using an unsupervised learning algorithm, such as a priori, generating for any given resource a short list of likely future resources to prefetch. Unlike some approaches to site optimization, this computation does not involve introspection of the resources themselves, is not dependent on assumptions that resource references will be based on static HTML links, and can take locality into account (the prefetch list computation may vary from one locality to another).

Media Resource Storage and Management

A similar analysis to the resource request prediction and prefetching described above can be used to group resources optimally on disk. See, e.g., U.S. Pat. No. 8,140,672, filed Apr. 26, 2010, issued Mar. 20, 2012, titled "Media Resource Storage And Management," publication No. US 2010-0325264 A1, the entire contents of which are fully incorporated herein for all purposes. A common file (a so-called multi-file) may be created for certain content (e.g., a media resource) based, e.g., a measure of popularity of the content or on other behavior patterns relative to the content.

Real-Time Application-Specific Analytics

Applications could be allowed to define their own analytics reductions, for example, to map specific resources to resource roles, and sequences of requests could then be reduced into sequence of these resource roles (like [showPageA1, buyProductX]). Metrics regarding the frequency of these sequences could then be used in the request/response processing to generate requests for, e.g., the page that is most likely to result in a purchase in this particular location.

Global Hierarchical and Localizable Cached Resource Index

Assuming that substantially each cache fill and each cache eviction generates an event, the streams of these events from all caches in the network may then be reduced to determine an estimate of which machines (or arbitrary groups of machines) contain which resources (or arbitrary groups of resources) in cache.

The index could then be queried to determine where to find a resource in cache. Assuming a hierarchy of indexes, roughly corresponding to the hierarchy of reducers that produce the inputs to the indexer, a request to find a resource in a nearby cache could be issued to the indexer responsible for the smallest area containing the requesting cache, and then bumped up to higher levels if not found.

Assume the events have the following form:
(node, time, resource, action)

Each request results in zero or more of the following event actions to occur for the requested resource (ignoring actions which do not change to location of a resource in the machine's cache hierarchy):
  fill from remote source to local disk
  copy within machine from local disk to local memory In addition, other resources may be moved or removed as a result, causing zero or more of the following events to occur for some number of other resources:

evict from memory to local disk evict from local disk

The first order reduction of this event stream would therefore just maintains a cache hierarchy location for each resource that is somewhere in cache at a node, and higher order reductions just maintain a count of the number of nodes at which a resource is cached at some level on the group of machines in the scope of the reduction. This reduction generates updated cache location states for resource groups and machine groups which can be consumed by an indexer. Processing a count of 0 is a deletion, processing a count >0 is an insertion or update for a resource at some location. The reduction would also reduce events over time intervals, showing the net effect of a sequence of events for the same resource within a given time interval as a single event.

Applying some elements of applications discussed earlier, this reduction and indexing work could be conditionally applied only to those resources whose popularity exceeded some threshold, for example, or only for certain types or resources, or resources that matched patterns, or belonged to certain properties.

Now, with the index available, the cache can actually query the local indexer on cache misses to determine where to go to get the resource. The indexer could present its information to the caches in the form of resources which are themselves cacheable, so the cache would maintain a local cache of the indexers results for the resources about which it cares (relying on sectoring and sequence numbers). In essence, for most remote fills, the cache uses its local cache of the "directory" for where to get resources (which could be a hierarchy of resource patterns), updating it only on expiration or explicit invalidation. Invalidations could be generated automatically by the indexer, and would only travel to the local caches which are storing copies of the localized index results. The system could also provide conversion of wildcard invalidations to a set of front-door invalidations using this data.

It should be appreciated that there is a delay between a change in the state of a resource at a cache node, and the reflection of that state change in the reductions and indexes, so the index just provides an indication of where the resource might be based on where it was recently. In a worst case, the cache will request the resource from the place the index told it to request it from, but the resource will not actually be there. In this case there will need to be an appropriate response (such as the requested cache getting it from a parent or origin, or it responds to the requestor with a redirect or error response).

Index of Resource Metadata

The index of the previous section could also be extended to store additional resource metadata, like the size and popularity of the object. So even if the index says it is not cached, the system may want to keep the index entry around to be able to know what kind of object its dealing with so that it can handle the fill (or redirect) in the appropriate way. For example, something that has been seen before (say in the last day) but is nowhere in cache might be an unpopular object that the cache can deal with by redirecting.

Adaptive Capacity Allocation

Assume each cache cluster is bound based on the set of sectors it is expected to serve (which is determined somewhere upstream and relayed to the machines in the cluster via the control mechanism 108). This sectoring limits the set of properties that any given machine is expected to know how to serve, which further constrains the services which must be configured on the machine, as well as the set of invalidations which the machine may need to process.

This binding also constrains the set of machines which are available to serve a given property globally. Preferably the system monitors and manages that set of machines, perhaps with some allowance for steering by operators. Accordingly, the control mechanism 108 and the NDR/C collaborate in an automatic, closed-loop, feedback control system.

The NDR/C is just one of several parts of this feedback system. Via suitable reductions the system could find out whether the load due to resources in a sector (or a property) was too much or too little for the machines currently configured to serve those resources. If this is too much or too little, an adjustment can be ordered. This adjustment could be constrained by predefined policies, but would otherwise proceed automatically. A suitable control algorithm which takes both the latency of measurements and the latency of actions and their effects would be required in order to react to changes without overreacting.

An example of a simple adjustment is moving a cluster from one sector to another (or adding a new cluster to a sector from a pool of available clusters, and removing a cluster from service and putting it back into an unused pool). Assuming this does not require any software changes (just possible reconfiguration of the software that is already there); the control mechanism 108 would update or invalidate the control resources which tell the cluster which sectors it should care about, removing one and adding another. It might also be useful to direct the cache to purge all resources from the old sector and to prefetch all the most popular resources from the newly added sector before the rendezvous system is updated to start directing clients to it for properties in that sector.

Adaptive Deployment

Control and/or state information can be used by a CDN component (e.g., machine) to re-configure services already installed on that machine. In addition, using the Autognome service (described above), the constellation of services running on a machine can be partially or completely changed based on control and/or state information. Thus, using feedback from any aspects of the CDN, a machine's role may be changed to meet capacity needs in the CDN. For example, a machine that was providing caching services may be re-allocated to act as a rendezvous mechanism or a reducer or a collector.

It should be appreciated that in order to reallocate capacity it might be necessary to install or uninstall specific kinds or versions of services that do not normally run on all flavors of machines Peering and Parent Selection Reducers/collectors may be used for peering and/or parent selection. Peering may make use of reductions of, e.g., popularity, cacheability, and size to determine which peering policy is preferably, but not necessarily, used for a given resource based on a match between the resource's popularity, cacheability, and size and the corresponding thresholds defined for each policy. Parent selection may be based on a reduction of the cost/performance of retrieving certain resources or properties from certain parents by certain client caches, and the parent that delivers the best results for a given client may be chosen.

Configuration Information

As shown in FIG. 1J, the CDN includes configuration information 1004 and state information 1006. Preferably the control mechanism 108 (FIG. 4A) maintains at least some of the control and state information. In an embodiment, the CDN maintains the following (with reference to FIG. 13A):

Customer information: includes information about which entities are customers of the CDN, information about customer properties, etc. The information about a customer's properties may include information about customer-specific or property-specific handling of resource requests for that customer's properties. Since a customer's properties may be handled by caches in a particular sector, the customer information may also include information about which sector or sectors are responsible for which properties, i.e., about the binding of properties to sectors. The information about a customer's properties may also include invalidation information regarding those properties. Note that the CDN (and each sub-CDN) may be considered to be a CDN customer. Thus, the CDN maintains information about CDN properties, including property-specific handling requests and invalidation information for those properties.

Configuration information: includes information about the manner in which services (e.g., caches and other services) are configured within the CDN and information about and for the rendezvous system. The configuration information may include static (i.e. relatively static) information which may include information about sub-CDNs, groups, tiers, sectors, peers, caches' roles, flavors, etc. It should be appreciated that the CDN is a dynamic entity and that the CDN configuration may be changed during its normal operation. For example, a component's role(s) may be changed if needed (e.g., a cache may be allocated to a different group or sector; a cache's peers may change, etc.). The term "relatively static" is used here to refer to information that may not change in any particular time interval of appropriate resolution (e.g., 1 min., 5 min. and the like). The CDN configuration information may be set by the CDN operator and/or, in some cases, by CDN customers. In addition, the CDN configuration (and therefore the CDN configuration information) may be changed (e.g., using Autognome) based on feedback provided by the reducer/collector services.

Status information: includes information about the status (e.g., health) of the various components of the CDN, the load on the components of the CDN, load on the network, etc. Status information is typically dynamic information in that it typically changes in any particular time interval of appropriate resolution (e.g., 1 second, 5 seconds, and so on). Status information may be obtained, e.g., via the reducer/collector services. The status information may be information that has been produced by some other mechanism (e.g., in the OMA) and may be provided in a state or form that is useful for the CDN components (e.g., the rendezvous system).

Resource information: this includes information about properties, including which properties have already been served or requested, and the validity of resources. Those of ordinary skill in the art will realize and understand, upon reading this description, that there is no reasonable way for the CDN to know in advance of all possible resources that it may be requested to serve. A CDN should, however, know in advance enough about the resources it has been configured to serve in order to accept requests for those and reject others. (Although a CDN could be aware of all possible resources that it may be requested to serve in the future, such a limitation would severely limit the benefits of a CDN.) The CDN can, however, know about the resources that it has already been requested to serve and that may therefore be resident on one or more caches in the CDN. The resource information thus preferably includes invalidation information regarding resources that the CDN has served or has been requested to serve (this includes CDN resources as well as a customer or subscriber resources).

The information that the CDN knows is preferably maintained, at least in part, in one or more control mechanism databases. Various CDN components/services may obtain needed information from the control mechanism 108.

Services' Configuration Information

In an embodiment, each CDN service includes some configuration information in order to operate within the CDN. The kind of configuration information needed depends, at least in part, on the kind of service. In an embodiment, each service knows its identity and a location from which control and configuration information can be obtained.

The Primary Delivery Services' Configuration Information

With reference now to FIG. 13B, each primary delivery service (e.g., caching, streaming, compute) knows information about the customers and properties for which it is responsible in accordance with an embodiment. Each primary delivery service also preferably knows information about its role in the CDN, which services are its peers, and where it is supposed to send event information. The information about the customers for which a delivery service is responsible may be provided to the delivery service as a CDN resource that lists sufficient information for the delivery service to determine whether or not it should try to handle any particular resource request. When delivery services (e.g., caches) are organized as sectors and/or as sub-CDNs, each service preferably only knows about (i.e., is only provided with information about) those customers and properties associated with its sector and/or sub-CDN.

In some cases a delivery service may be told (e.g., at configuration time) what its role is to be and which other delivery services, if any, are its peers. A delivery service may also attempt to determine peer services based, e.g., on the delivery service determining its position in a cluster. It should be appreciated and understood that even though a service may have peer services, various policies (including, e.g., customer specific request handling policies) may determine how each delivery service interacts with its peers and what information a delivery service may obtain from or will provide to its peers.

The Rendezvous Services' Configuration Information

As noted above, rendezvous is the binding of a client with a target service. For example, in the case of a DNS-based rendezvous system, the Rendezvous system maps domain names (typically CNAMEs) to IP (or VIP) addresses or to other CNAMEs. In an embodiment, each rendezvous mechanism (or service) knows the properties for which it is responsible and have sufficient information to provide the rendezvous service for the properties for which it is responsible.

Figure 13A:
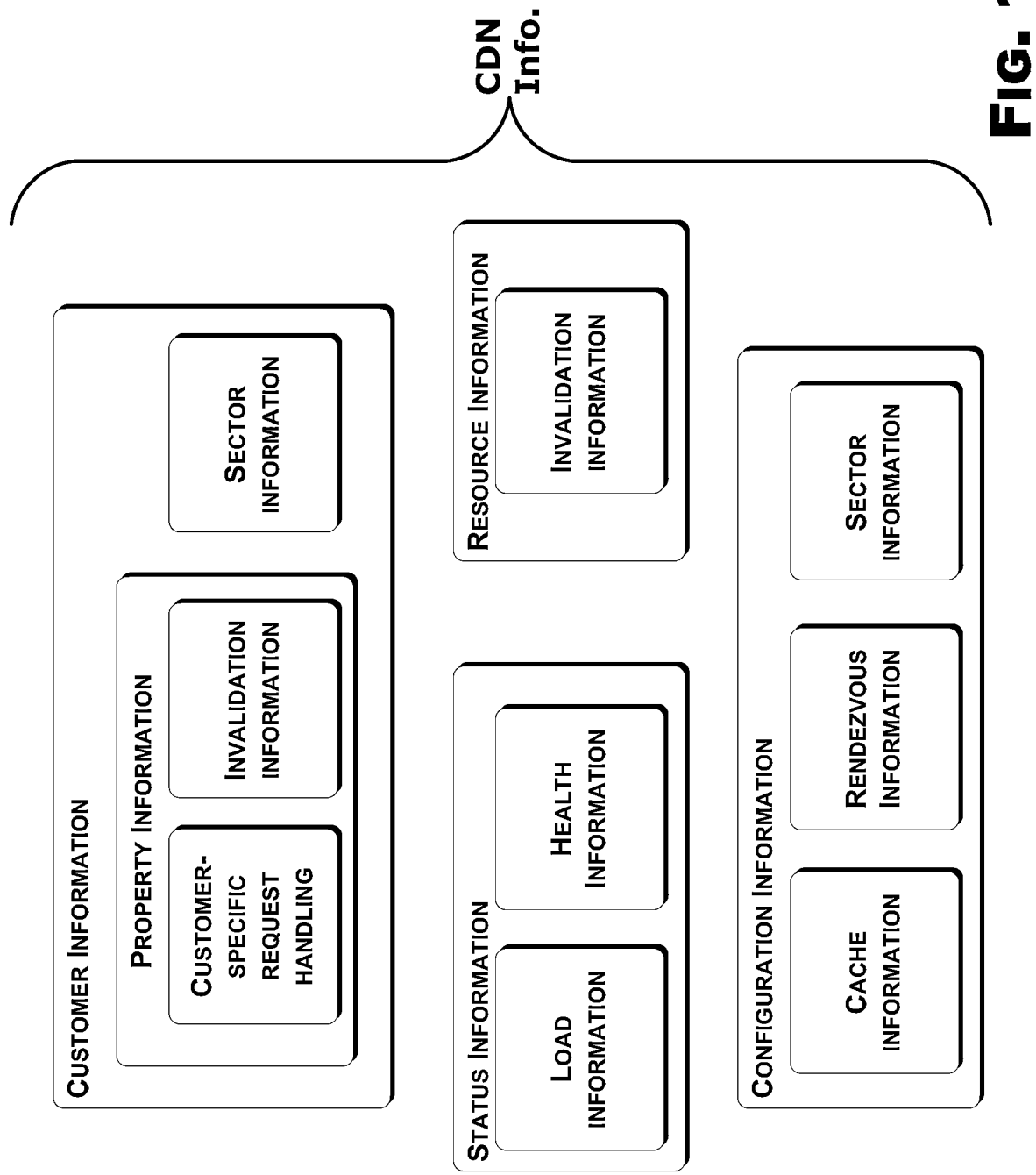
Figure 13C:
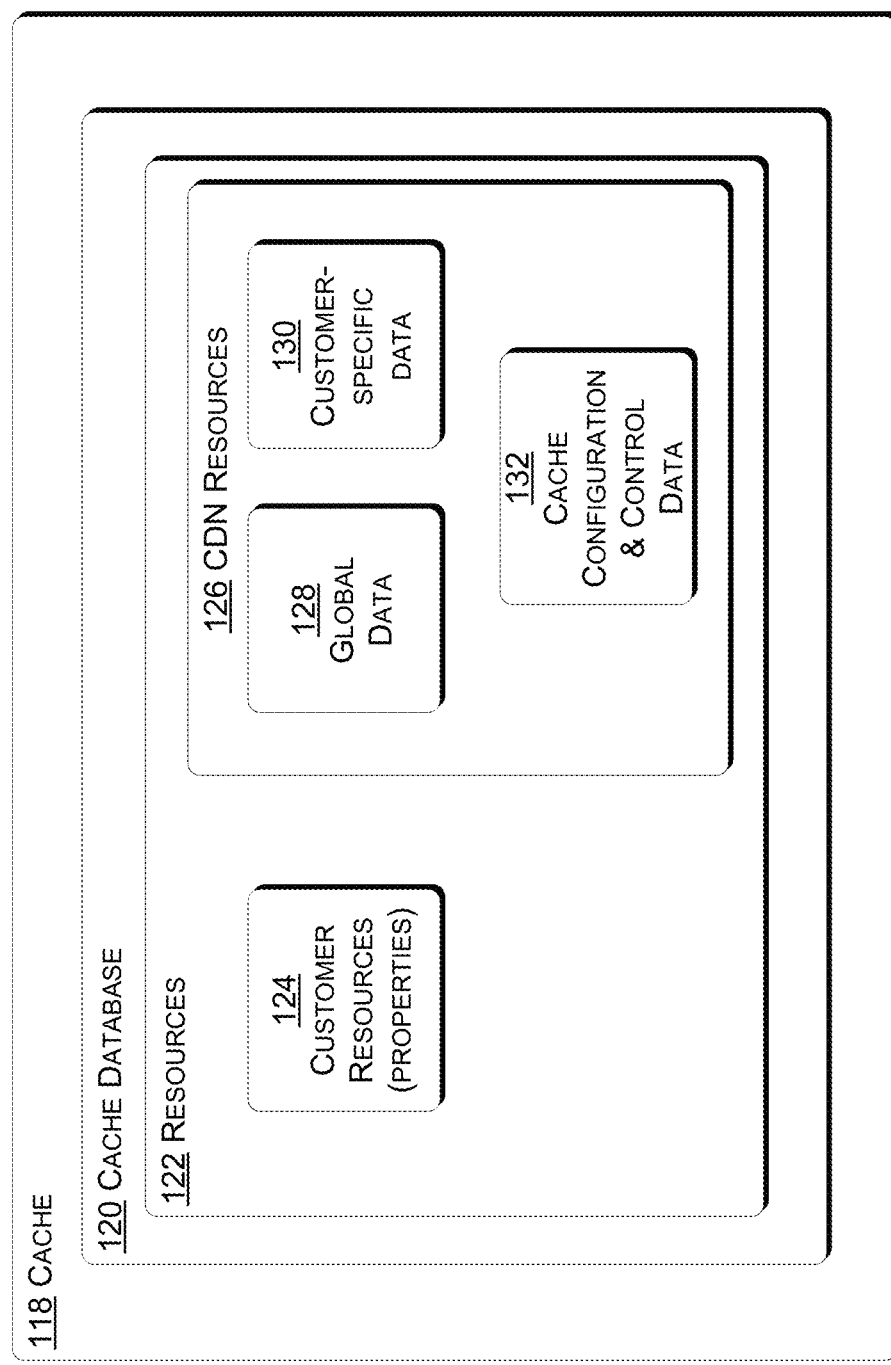
Figure 13F:
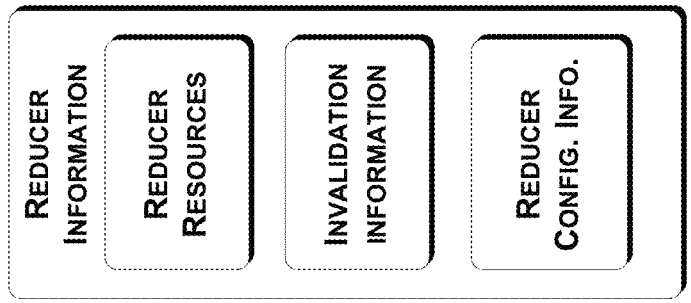
Figure 13E:
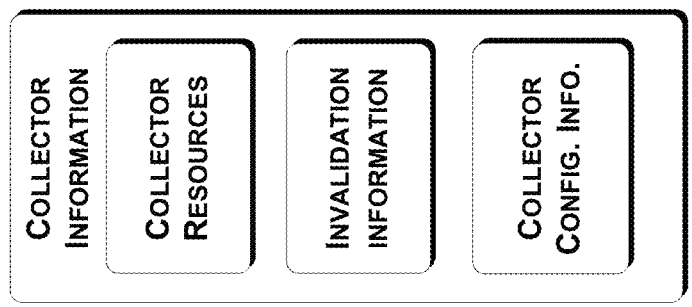
Figure 13D:
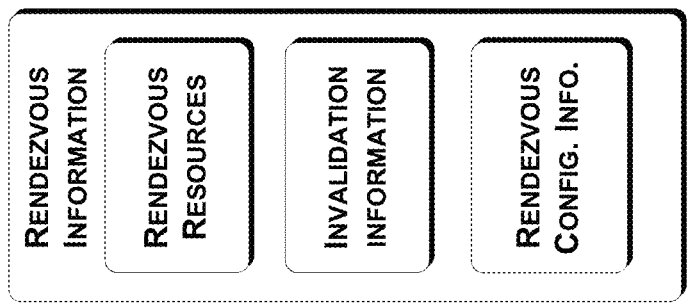

The information needed by a rendezvous service to perform this mapping is part of rendezvous information in FIGS. 13A and 13D.

The rendezvous information (FIGS. 13A and 13D) is a CDN property that may be resident on or available to the rendezvous service and controlled via control resources with the usual update/invalidation approach described herein.

Beyond the names associated with the set of properties, and the set of VIPs assigned (bound) to each, in some cases a rendezvous service knows the relative load (and capacity) of the service end points and connectivity data showing network distance from each such end point to the requestor.

The Collectors' Configuration Information

In preferred implementations, the information used by a collector service (with reference to FIG. 13E) includes where the event streams are coming from, what the history for each needs to be (i.e., how to perform the 'collection' process); what data to make available; and where to provide that data.

The Reducers' Configuration Information

In preferred implementations, the information used by a reducer service (with reference to FIG. 13F) includes information about where the event streams are coming from, where they should go to, and the reduction process for each stream type.

Control Mechanism Architecture

As shown in FIG. 1A, services types in a CDN include configuration and control services. FIG. 1F shows a network of configuration services providing configuration information to a network of control services, and, as described with reference to FIG. 1J, an exemplary CDN 1000 may include configuration services 1008, control services 1010. FIG. 4A shows a control mechanism 108 made of control services 1010.

The following sections describe various organizational structures and implementation options for the control mechanism. It should be appreciated that these descriptions are given only by way of example, and are not intended to limit the scope of the system in any way. Those of skill in the art will realize and understand, upon reading this description, that a particular implementation may use a different approach or may use some of the features described here.

Exemplary Control Mechanism

Alternate Embodiment

An exemplary control mechanism 108 for an alternate embodiment is described here. As shown, e.g., in FIG. 14A, the control mechanism 108 can be considered to consist of two loosely coupled sub-clouds, the director cloud 702 and the control cloud 704. The director cloud 702 includes one or more director sites (director server sites) 706 (in the director cloud 702 shown in FIG. 14A there are ND director sites $DS_1, DS_2, \ldots, DS_{ND}$, respectively denoted 706-1, 706-2 . . . 706-ND). The control cloud 704 includes one or more control servers 708 (in the control cloud 704 shown in FIG. 14A there are NCS control servers, $CS_1, CS_2, \ldots, CS_{NCS}$, respectively denoted 708-1, 708-2 . . . 708-NCS).

Figure 14A:
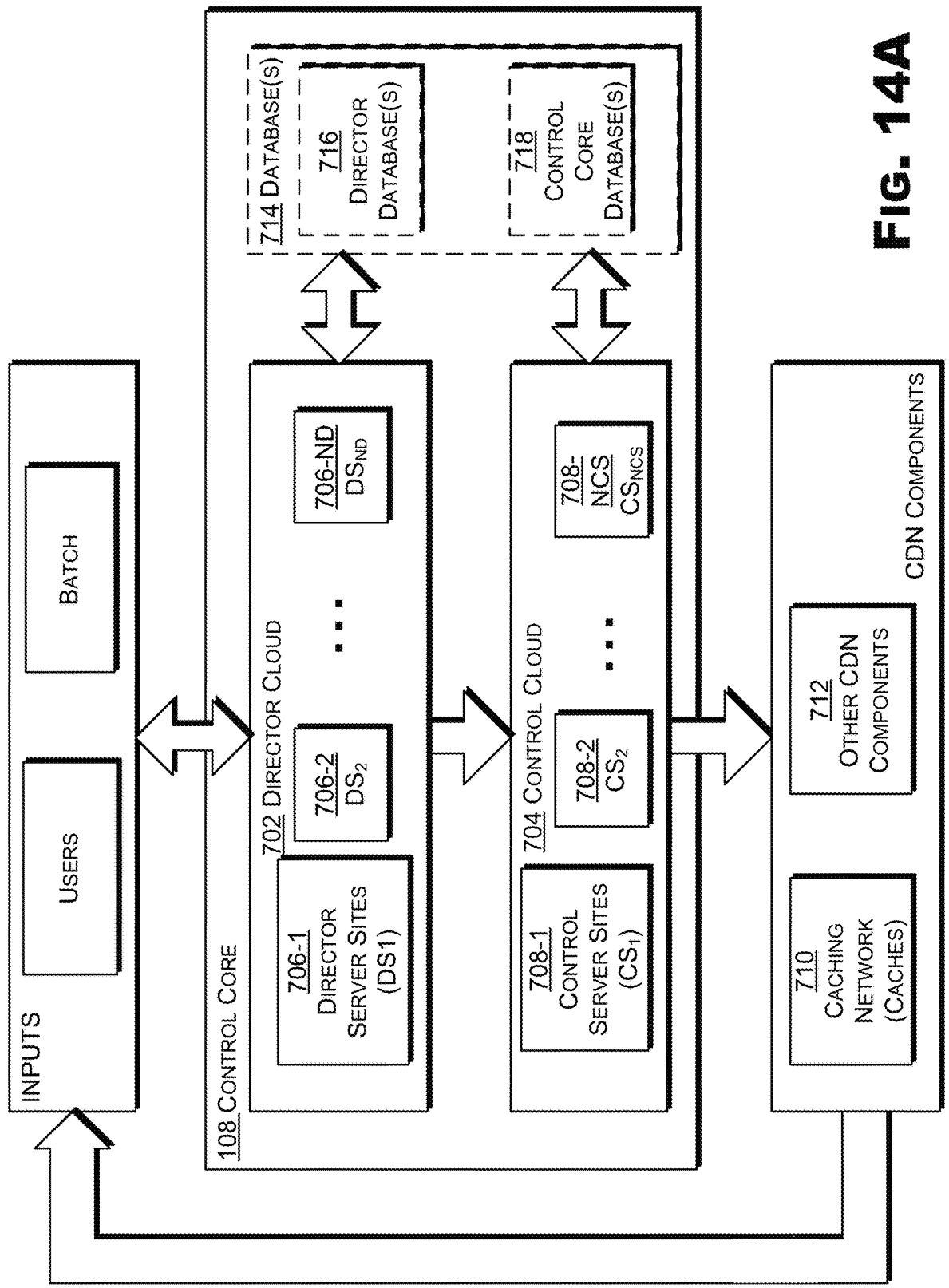
Figure 14B:
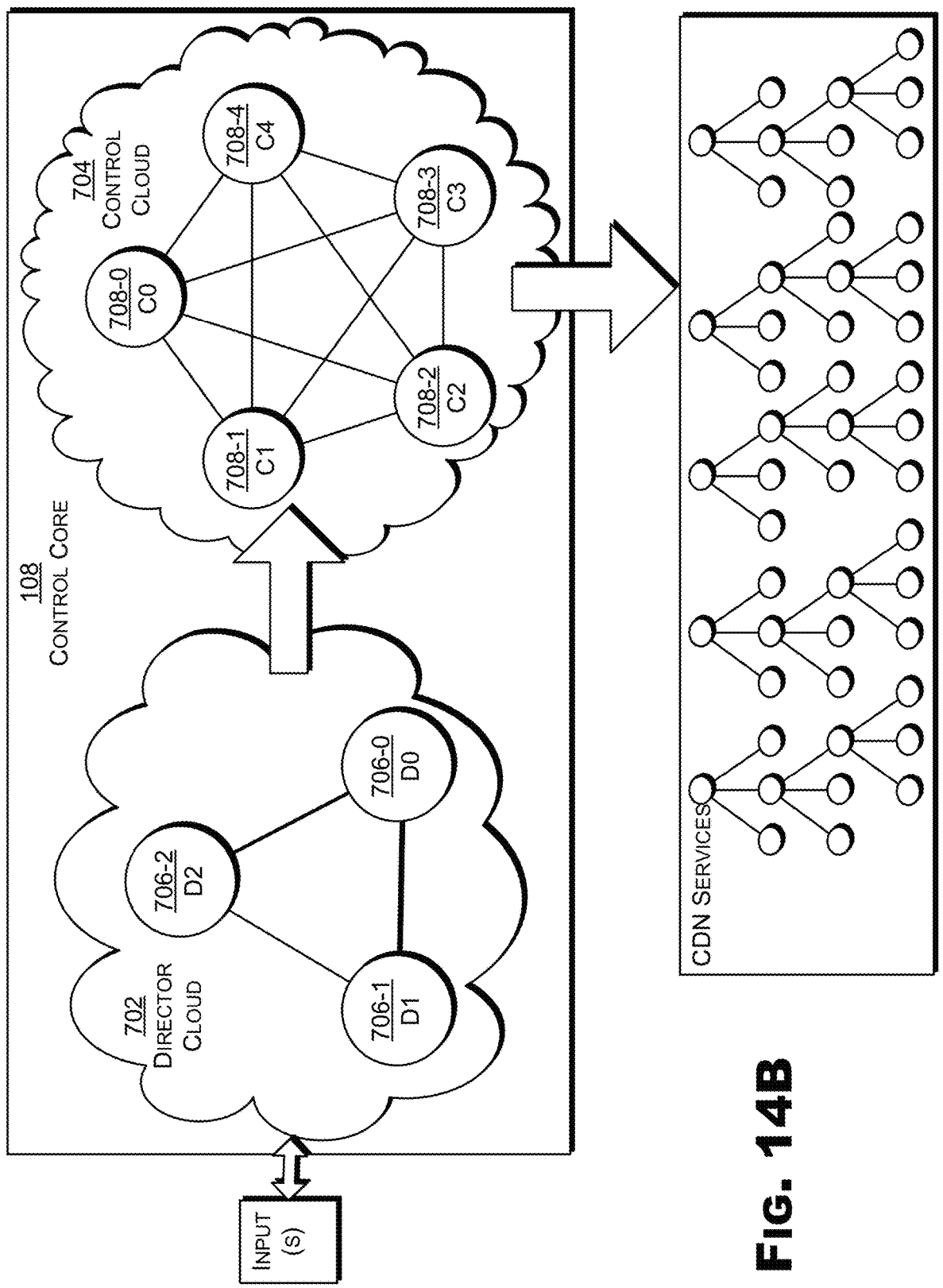

By way of example, FIG. 14B shows an exemplary control mechanism 108 with three director sites (D1, D2, D3) and five control sites C1 . . . C5. As shown in FIG. 14B, data are provided by (e.g., pushed from) the director cloud to the control cloud (i.e., from director sites to control sites). Data from the control cloud (control sites) are provided to (e.g., pulled by) the caching network.

The director cloud 702 processes transactions from interactive users and batch systems and transfers updated control data to the control cloud 704, which in turn provides the same data (or some version or transformation or subset thereof) to the caching network 710 (corresponding to caches 102 in FIG. 4A) and/or to other CDN components 712.

The clouds may communicate with each other and with additional systems via, e.g., so-called RE presentational State Transfer (REST) web services.

Each cloud is preferably, but not necessarily, a globally distributed system with high-availability, but loose coupling between the clouds allows each to be designed and scaled independently to take advantage of their unique requirements. Director sites 706 are preferably optimized to provide read/write access involving moderately complex queries for a relatively small collection of users (perhaps hundreds), whereas control sites are preferably designed to provide read-only access involving very basic queries to a large network of tens of thousands of high-performance caching nodes. Since the director cloud 702 pushes data into the control cloud 704, and control sites cache data for each other, increased load on the control sites 708 does not spill over as load on the director sites 706. As the granularity of resources served by the CDN changes (e.g., from a small number of large properties, to a large number of small properties) the effects on the two systems will be different and can be handled separately. The reliability, availability, and performance characteristics of the two sub-clouds are largely isolated.

As noted earlier, the control mechanism 108 may comprise multiple databases that are used and needed to control and operate various aspects of the CDN 100. These databases 714 may include director database(s) 716 and control mechanism database(s) 718. Although shown as a single collection of database(s) 714, it should be appreciated that multiple versions of each database may be (and typically will be) present in the control mechanism 108 (for this reason the databases 714, 716, and 718 are shown with dashed lines in the drawing in FIG. 14A). From the outside, the control mechanism 108 should present a view of what appears to be a single and current version of each database, while internally there may be differing versions of the databases. Each director server 706 preferably maintains a local version of at least some of the databases 714. Thus, as shown in FIG. 14C, director server $DS_1$ (706-1) has a local version 714-DS1 of the databases 714; director server $DS_2$ (706-2) has a local version 714-DS2 of the databases 714; and so on. Similarly, each control server 708 has a local version of at least some of the databases 714. Thus, as shown in FIG. 14C, control server $CS_1$ (708-1) has a local version 714-CS1 of the databases 714; control server $CS_2$ (708-2) has a local version 714-DS2 of the databases 714; and so on. As shown in the drawings, the control servers may only require or use local versions of the control mechanism database(s) 718.

Control sites 708 are the control mechanism 108 servers contacted (typically directly) by CDN components/computers, e.g., the caching network 710 for delivery of metadata, configuration files, invalidations, etc. (collectively referred to here as control resources), and director sites 706 manage a director database of control resources and direct the flow of updates into the control mechanism. Updates typically begin with the invocation of director site services on behalf of users of interactive portal applications. The director site service then commits the changes to the director database 716 and then reliably transfers the updates to selected control sites 708. Finally, control site updates diffuse across the rest of the control mechanism 108 and into the caching network 710.

Figure 14D:
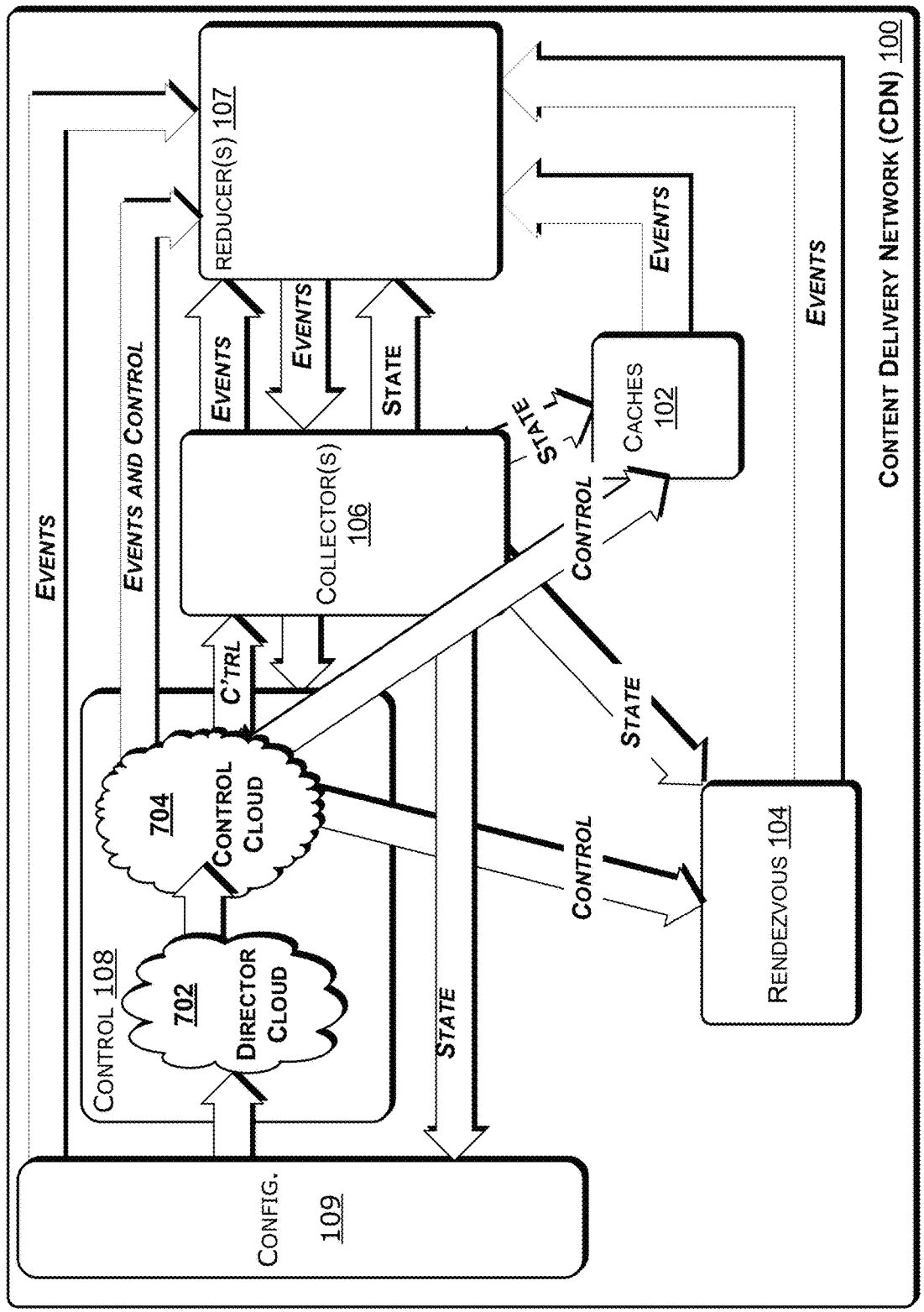

FIG. 14D shows aspects of the feedback loop (see, e.g., FIGS. 1E, 1F and 1L) in which data from the CDN services (e.g., from event streams) are collected (by collectors 106 via reducers 107) and then used to generate control data. The director cloud 702 obtains data from the collector(s) 106 and provides appropriate data to the control cloud 704. Components of the CDN 100 (e.g., caching network 102 and the rendezvous system 104) obtain (e.g., pull) data from the control cloud 704.

As noted above, origin resources served by the CDN are preferably treated as properties, with each property corresponding roughly to the resources of a single origin server. In order to take advantage of the expected spatial locality of reference, the set of properties is preferably partitioned into sectors. Each property is preferably contained entirely within one sector, but a sector may contain any number of properties.

Each sector (or the information associated with each sector) is preferably replicated by multiple control sites at any given time, and each control site 708 may replicate any number of sectors at one time (see FIGS. 14A-14B). All updates to information within a sector are reliably transmitted from a director site 706 to all the replicas for that sector (i.e., to all sites having replicas of that sector). The set of control sites replicating the data of a given sector is referred to herein as the cohort for that sector.

Site and Group Identifiers

For any given configuration of the control mechanism 108 there is a maximum number (ND) of director sites, maximum number (NCS) of control sites, and a maximum number (NS) of sectors. These maxima determine the range of acceptable site and sector identifiers, as follows:

DirectorSiteIDs={0, . . . , (ND−1)}
ControlSiteIDs={0, . . . , (NCS−1)}
SectorIDs={0, . . . , (NS−1)}

For implementation purposes, these various IDs range from zero (0) to some maximum value (e.g., 0 to ND−1). However, for the sake of this description the ranges may be specified as having a first value of one (1), e.g., 1 to ND). The identifier for a given director site, control site, or sector is fixed. Each director and control site also has a statically defined peer group which may be based on a fixed function of the site ID. The function may be arbitrary, as long as it is fixed in advance and all sites use the same function. For example, the function $f(s)=\{p|p \bmod N = s \bmod N\}$ for fixed N divides the sites up into groups of N. It should be appreciated that peer groups are used for primary initialization and recovery and are not the same thing as neighborhoods, which may change dynamically.

Sequence Numbers

Sequence numbers may be used to provide relative order information about update and invalidation events. A sequence number may be considered to be a virtual and scale-free timestamp, a monotonically increasing integer where the higher the number the more recent the event (at least within a single sequence number domain, as comparisons of sequence numbers are only meaningful within the same sequence number domain). Each sequence number is relative to a local virtual clock for some scope at some location. Furthermore, although sequence numbers are monotonically increasing, they do not increase on a uniform periodic basis, only when something changes.

It should be appreciated that a particular implementation may not have sequence numbers at the level of the master directory/journal.

Control sites may have two levels of sequence number domains, the sector level and the property level. A sector increases its sequence number whenever the sequence number of a property governed by the sector is incremented. Properties increase their sequence numbers whenever any resource contained in the property is updated or invalidated. Sector level sequence numbers also change when properties migrate across sectors.

Although individual resource invalidations could result in new sequence numbers for each individual resource invalidation, the system allows for the possibility that the effect of multiple invalidations on the sequence number could be batched together, so an increment from sequence number N to N+1 could potentially involve any number of involved changes at any level. This could be caused by batch invalidations, or by other aspects of the way the control site user interface interacts with the underlying database.

Timestamps

Sequence numbers do not use timestamps, and there is generally no need for any global clock synchronization. However, in some cases it may be useful to have approximate and low-resolution timestamps which provide coarse ordering information that can be used to improve efficiency. Generally, with bounded clock skew and low enough resolution the system can arrange such that anything that is marked as having an approximate timestamp T2>T1 can be assumed to be newer than something with a timestamp T1, but this cannot be relied upon for correctness.

Directories and Journals

Invalidation journals are lists of resources marked with sequence numbers. Such invalidation journals indicate which resources have been invalidated and when they were invalidated. Caches or other CDN entities may use invalidation journals to decide which of their locally cached resources to invalidate. Although journals may be generated or updated as a result of human operator-driven events, one invalidation command issued by a human may result in a flurry of invalidation requests, and the cumulative effect of ongoing operations can sometimes result in loads of many thousands of invalidation requests per second. The content of these resources may be represented, e.g., in JSON (JavaScript Object Notation).

Master Journal

A master journal is a list of control mechanism metadata along with sector and control site descriptors. The sector descriptors define the current sector sequence number and sector cohort for each sector, and the control site descriptors define the replicated sectors and control site neighborhood for each control site. Listing the replicated sectors is redundant with the sector cohorts, but is provided for convenience. In JSON, a complete master journal might look like the following (see also, e.g., FIG. 14E):

```
{
    seq: N,
    numDirectorSites: NDS,
    numControlSites: NCS,
    numSectors: NS,
    sectors: [
        { id: 0, seq: S0, cohort: [1,3,4] },
        { id: 1, seq: S1, cohort: [2,3,4] },
        ...
    ],
    controlSites: [
        { id: 0, seq: CS0, nbhd: [9,11,12,19] },
        { id: 1, seq: CS1, nbhd: [8,11,13,17] },
        ...
    ]
}
```

In the example above, the sector with Sector ID 0 has cohorts 1, 3, and 4. That is, control sites 1, 3, and 4 are replicating sector 0. The sequence number for Sector 0 is S0. The sector with Sector ID 1 has cohorts 2, 3, 4. That is, control sites 2, 3, and 4 replicate sector 1. Sector 1 has sequence number S1. As also shown in the above, control site 0 has neighborhood sites 9, 11, 12, and 19; and control site CS1 has neighborhood sites 8, 11, 13, and 17. The sequence number for control site 0 is CS0, and the sequence number for control site 1 is CS1.

Sequence numbers represent the current sequence number of the given scope as viewed by the provider of the journal at the time the journal was provided. An incremental master journal would be a list of partial specifications of a master journal, as in:

```
[
  {
    seq: N1,
    sectors: [
      { id: J, seq: SJ, cohort: [ . . . ] },
      . . .
    ]
  },
  {
    seq: N2
    controlSites: [
      { id: K, seq: CSK, nbhd: [ . . . ] },
      . . .
    ]
  }
]
```

It should be appreciated that the "master journal" is not really a journal in the database sense of the term. It may also be referred to herein as a manifest.

Sector Journal

A complete sector journal lists the current sector sequence number and information about all the properties in the sector (see also, e.g., FIG. 14F):

```
{
  seq: N,
  props: [
    { id: PID0, seq: PS0 },
    { id: PID1, seq: PS1 },
    . . .
  ]
}
```

In the example above, property PID0 has sequence number PS0 and the property PID1 has sequence number PS1.

An incremental sector journal is an array of partial sector specifications, showing only the changes of each specification in the sequence relative to the complete specification of the previous sequence number.

Sector Directory

Sector directories are control resources that specify what properties live in what sectors. Sector directories are provided to enable caches and control sites to correct their notion of what properties live in what sectors. Whenever a property is moved to another sector or deleted from a sector, the involved sectors are invalidated. Such an invalidation increases the sequence number of the sector but does not necessarily generate any invalidations of other resources in the sector, other than for the sector directory's deletion journal, /sector/SID/directory/deletions. When a sector directory invalidation occurs at sequence number N, the new sequence number becomes M=N+1, and a request to:

GET/sector/SID/directory/deletions?seq=K for some value K≥M will return a list of the deleted properties and the moved properties (along with their new sector homes). Additions will not be shown. The invalidation journal for the sector will also show that the resource /sector/SID/directory/deletions was/were invalidated at sequence number M.

From a caching perspective there is really no need to keep track of additions to a sector (because such additions could not have been previously cached), but the system may do so anyway for the benefit of other tools, via /sector/SID/directory. So while the value of the /sector/SID/directory resource can be used to list all properties, this resource is never explicitly invalidated, it just expires, because, in preferred implementations, the system never wants to force a cache to request a sector journal just because of a new property addition. Additions of properties to the sector will silently cause new properties to show up in the directory on the next request, but the deletion journal will not be changed and a sector directory invalidation will not occur.

Property Journal

A property journal lists the sequence number of the property and the list of resource descriptors for the resources that were invalidated with that property sequence:

```
{
  seq: N,
  invalidated: [
    { uri: "foo.com/folder/thing" },
    . . .
  ]
}
```

Configuration Files and Other Control Resources

Configuration files define configuration settings which may affect the dynamic behavior of both the control mechanism and the nodes in the caching network. Operators of the control mechanism may use customized tools to generate and publish such configuration files to the control mechanism. Other than the association of configuration files to certain sectors and properties, the control mechanism need have only minimal knowledge about the structure, file naming conventions, automatic generation process, and content of these files—as far as the control mechanism is concerned, they are opaque resources.

Control metaobjects are used to describe the existence and basic properties of real-world entities, such as CDNs, customers, properties, control sites, director sites, etc. These metaobjects are expected to be relatively static, changing at the frequency of human-controlled administrative events. The content of these resources may be represented in JSON or some other such language.

Upon receipt of a directory update, each replica site merges the update with the state it already has for that sector. Sequence numbers can be used to ensure that no updates are applied out of order and no updates are missed. Each control site 708 also periodically pulls and merges sector data from selected neighboring control sites. The effect of this cache diffusion combined with director updates is that each control site is eventually consistent with every sector in the director database.

The distinction between caching a sector and replicating a sector is important. All control sites may cache information for any sector, but each control site is considered a replica site for some limited set of sectors (i.e., the cohorts for those sectors). When a control site is replicating a sector, that means it will receive reliable updates pushed from directors to the entire cohort of a sector, and the director will monitor the success of these messages and retry until enough sites succeed. Caching, on the other hand, involves the periodic pulling of possibly older copies of sector information indirectly from other control sites. In both cases, new data are merged with old data based on sequence numbers to ensure that no updates are ever missed. A master directory defines sector cohorts (for replication) and control site neighborhoods (for cache diffusion).

Director sites 706 receive update commands from other systems, and these updates translate into a sequence of changes to the director database 716 for given sectors, which should preferably then be distributed to control sites 708. When distributing updates, directors should preferably collaborate to ensure that all updates to a given sector will be presented to the control site replicas as if they were coming from a single responsible director agent, one at a time, after each update has been committed to the director's database. Each update defines a new sequence number, and the director keeps track of which sector updates have been successfully transferred to which control site replicas, being sure to transfer them in the right order. But the protocol between the director and the control sites for a transfer is a simple push and response with retry until enough succeed—there is no multi-phase commit or other distributed consensus protocol required. The director has already decided unilaterally that the changes are to be made and has committed them to the director database, and it is just notifying the control sites of its decision. It just needs to make sure that each decision is acknowledged by enough of the replicas before moving onto the next one.

Control sites which fail and restart should preferably first perform local recovery to get back to a certain sequence number for each sector (based on information written previously to stable storage), then recover the latest master directory from the peers in their group (which depends only on control site ID). After that, the control site's neighborhood and the set of sectors it is responsible to replicate are defined, so it then recovers sector updates from each sector cohort, and then begins refreshing its cache of other sectors from its neighborhood. Control sites preferably do not contact directors for recovery. When a control site receives an update for one of its sectors, the update either succeeds or fails. It fails if the control site is down (the director's request will time out) or if the control site has not yet caught up to the sequence number being proposed. It will respond with failure but inform the director where it is in the sequence. Success means the control site has either just applied the change successfully and could restore it if the site subsequently fails, or it had already previously applied the change. The minimum size of any sector cohort will be set to ensure that even when the worst case number of sites fails (as specified by the requirements), at least some minimum number of sites will successfully receive an update from a director. It should be appreciated that although the director's behavior may be adjusted to have it detect failures of all control sites, in that case the director would have to be involved in the recovery of at least one member of the cohort.

If an entire director site goes down, there is no effect on the ability of the control sites to continue to serve control resources to the caching network. The only affect is that updates to the resources contained in its sectors will not be possible until the director site recovers, but the control sites will continue to serve their most recent and consistent view of the resources in those sectors. Director sites can be made arbitrarily robust through the usual means as long as per-sector updates appear as if they are being generated by a single agent from the perspective of the control sites.

Sector Cohort Management

Each sector is replicated across a cohort of control sites, configured such that at least one control site is guaranteed to be functional at any given time, even in the face of up to k concurrent failures (for some k specified by the requirements). Sites can be added to or removed from a cohort at any time, provided the minimum cohort size is not violated. Reasons for adjusting the cohorts for a sector might be persistent changes in geographical load distribution, persistent failures, or some combination thereof.

All changes to cohort membership are initiated by directors. It may be in response to a request from a human operator, or in response to automatic health monitoring and load balancing. As far as the control sites are concerned, cohort membership changes can occur at any time.

This means that some control sites may receive directed replication requests for sectors they did not realize they were supposed to replicate, and some sites will stop receiving such requests for sectors they thought they were replicating. Neither of these situations is problematic.

In the former case (an unexpected replication command), the control site will adjust its view of sectors it replicates and will begin replicating the new sector automatically. Each replication request indicates the current cohort membership for the sector being replicated, along with the sequence number of the update. As described above, the recipient will respond with failure if its cache is not caught up to the sequence number (and it will initiate a catch-up recovery with the other members of the cohort). In the latter case (absence of expected replication commands), the control site will eventually learn from a newer version of the master directory that it is no longer a member of the cohort from which it was expecting replications.

For reasons of efficiency, directors may notify control sites when they are supposed to stop replicating, but that is not strictly necessary. Ultimately, as far as the control sites are concerned, they replicate what they are told to replicate, and knowledge of cohorts is only used to forward requests that cannot be answered with the local cache.

Health Monitoring

Directors monitor the health of control sites in several ways. The primary method is the firsthand knowledge each director site has of the ability of each of its replicas to keep up with directed replication commands. Sites that repeatedly fail may be called out as suspect, even though the cohort as a whole has enough functional sites to function correctly.

The second method is to periodically poll each site for its master journal (and possibly other subordinate journals), just like a cache node would, but in this case for the purpose of evaluating the skew of the control site's view of the master journal, sector by sector.

Finally, a director can consult the control site more directly for information about its load (e.g., via some resource /cs/CSID/load), presumably with more information about the control site's interactions with its neighbors, to find out how well the distribution of replicas and the neighborhood settings are affecting that control site's locality of reference.

These latter resources could be delivered through the cache but probably should not be. In the case of the load resource, it would suffice to deliver it directly from the control site, update it only when large enough changes occur, no more frequently than some minimum period (say once every 5 minutes), and no less frequently than some maximum period (say once per hour), and use ETag headers for efficiency.

Load Balancing

Using the techniques described above, director sites can monitor the health and load of each control site (and may also want to use information collectible from the NDC), and from that decide whether or not any changes should be made to the set of properties contained in any sector, or the set of control sites replicating any sector.

Control Sites

Under normal, steady-state operation, a control site should execute three basic behaviors:
Receive director updates (to update local replicas);
Request resources from neighbors (to refresh local caches); and
Receive resource requests (for journals and other control resources) from neighboring control sites and the caching network.

Directed Replication

A director update request specifies a new incremental change for some sector (or sectors) which the control site is currently replicating. If the specified sequence number range does not start with the next sequence number expected by the control site, the control site will return a response indicating that the update has not been successfully applied, along with its current sequence number.

Cache Diffusion

Each control site periodically consults its neighboring control sites (as specified in the master journal), retrieves each neighbor's view of the master journal, and merges them to produce its own view. Whenever a neighbor control site or cache node requests a master journal, the local merged version of the master journal is provided in the response.

| Cache Diffusion Algorithm |
|---|
| procedure CACHEDIFFUSION<br>  A(k, s) ← 0 for each (k, s)<br>  loop<br>    WAIT(T)<br>    MERGENEIGHBORS<br>    for each updated sector s do<br>      for each neighbor k do<br>        if k updated s then<br>          A(k,s) ← λ+ (1 − λ)A(k,s)<br>        else<br>          A(k,s) ← (1 − λ)A(k,s)<br>        end if<br>      end for<br>    end for<br>  end loop<br>end procedure |

The merge process generates a list of sectors that were updated, along with the set of neighbors for each sector that provided an update relative. This list is used to maintain an affinity score $A(k, s)$ for each neighbor k and sector that is used to make cache miss routing decisions. The affinity is an exponential moving average based on some constant factor $0 \leq \lambda \leq 1$. When a cache miss occurs, rather than forward the request directly to one of the replicas, the system forwards the request to one of the neighbors based on their past history of providing updates for that sector.

Cache Request Processing

Each control site is expected to be able to retrieve a version of any control resource at any time in response to a request from a cache node or another control site. If the resource exists locally with the right sequence number it is provided in a response, otherwise a cache miss occurs. On a cache miss, the site should preferably request the resource from a neighboring control site, update its cache, and return the response to the requestor.

For example, when a client requests a sector journal the site executes GetSectorJournal(s, N, L) for sector s, sequence number N and level L.

| Get Sector Journal |
|---|
| function GetSectorJournal(s,N,L)<br>  if cache contains sector journal s at sequence n ≥ N then<br>    return sector journal s for [N, n]<br>  else<br>    if level L ≤ MAXLEVEL then<br>      k ← BestNeighbor(s)<br>    else<br>      k ← ChooseCohort(s)<br>    end if<br>    return FillSectorJournal(k, s, N, L + 1)<br>  end if<br>end function |

Requests from the caching network always set L=0, but control sites will increase the level at each forwarding step within the control mechanism. If the level is below a threshold MAXLEVEL, a best neighbor control site will be chosen using the affinity score for that sector. Otherwise, a member of the cohort for that sector will be chosen. This approach allows intermediate control sites to act as caches for other control sites without any predetermined topology, and it avoids endless forwarding loops, without requiring members of the cohort to serve all cache misses across the control mechanism.

Individual Control Site Architecture

At any given time an individual control site may have sole responsibility for some set of sectors, so the control site is preferably free of single points of failure. Standard techniques for this are adequate—e.g., a load-balanced tier of web application servers (e.g., based on nginx or Apache), backed by an optional memcached tier, backed by a replicated database (e.g., MySQL master/slave, MySQL cluster, or a NoSQL variant such as MongoDB or CouchDB) should be more than enough. Sectors and properties provide convenient keys which enable control resources to be sharded (partitioned) over separate database instances.

Each control site is expected to run exactly the same core application software as all other control sites (at least as far as control-control and control-cache interfaces are concerned), but the actual deployed configuration can vary from one site to another. The REST-ful web service interface exposed by each control site is the same interface it assumes of other control sites, and the details of the internal implementation of a particular control site are hidden.

Caching Network Interaction with Control

This section describes the caching network's interaction with the control mechanism. Those of ordinary skill in the art will realize and understand, upon reading this description, that the same implementation may be used by other CDN services to interact with the control mechanism.

Initialization and Network Formation

Cache's (and other CDN services) discover the IP addresses of available control sites automatically on startup, preferably using the CDN's rendezvous services (e.g., using a preconfigured domain name for the control mechanism, e.g. control.fp.net).

Pulling the Master Journal

Periodically, according to some configurable control synchronization period (preferably around once per minute), the cache (or other service) retrieves the master journal using its current approximate timestamp T:

GET /journal/master?tval=T

This request returns an absolute journal, a complete list of all sectors and their sequence numbers, as viewed by the journal provider at approximate timestamp T (which is expected to have a resolution derived from the expected synchronization period that cache nodes will use, e.g., minutes, relative to a distinguished time zone). Caches are expected to request this resource no more often than the resolution of the timestamp provides, though they may request it less often. This resource is delivered from the control mechanism to the cache node like any other cached resource—through the network of cache nodes.

As is apparent, an absolute journal with an approximate timestamp is used instead of an incremental journal with a sequence number. A low-resolution timestamp is used to facilitate caching without incurring the global synchronization and latency costs that a sequence number would impose on the system. This in turn means that a complete journal must be used instead of an incremental one in order to ensure that if there is ever any news about a particular sector, the cache will eventually hear about it and not miss it indefinitely.

Pulling Sector and Property Journals

Each cache needs to keep track of the sectors and properties for which it currently has cached content, along with the latest sector-level and property-level sequence number for each. Upon receipt of a new master journal, the cache checks the sequence numbers of sectors in the journal against its own sequence number for cached sectors. If the master journal indicates a more advanced sequence number for any cached sector, the cache node should preferably then issue a request for that sector's journal, specifying its current sequence number Ns for that sector:

GET /journal/sector/S?seq=Ns

This request returns a list of all known properties in the journal that have been updated since sequence number Ns, annotated with the actual sector sequence number Ns'>Ns as well as the current property level sequence number Np (as of sector sequence Ns'). If the sector level journal indicates a more advanced sequence number for any cached property, the cache node should preferably then issue a request for that property's journal, again specifying its current sequence number Np for that property:

GET /journal/property/P?seq=Np

This request returns a log of all known resource invalidations in that sector since sequence number Np, annotated with the actual sequence number Np'>Np. This process is repeated for each sector and property the cache cares about.

Sequence Number Rules for Invalidation

Since origin servers do not provide sequence numbers or other mechanisms that can be used to synchronize their content updates with the invalidation requests that arrive via other channels, there is the potential for a race between the two effects on the state of the caching network. Therefore, for each resource in the cache, the cache tracks and uses the property-level sequence number according to the following rules:

(1) When a cache receives new content for a previously uncached resource, it sets the sequence number equal to zero (0). This conservatively ensures that any invalidations of this content that arrive after this event will have the effect of invalidating the resource (assuming all sequence numbers are greater than zero), even though the cache has no information on the relative ordering between the next invalidation and the refreshed content.

(2) When a cache retrieves a new property journal, and sees a sequence number N>0 in the journal for a resource that the cache already has in its cache marked with sequence number M, then:

if N>M, then the cache must invalidate the resource and set the sequence number to N;

otherwise N≤M and the cache ignores the invalidation, leaves the sequence number at M, and leaves the invalidation state of the resource in the cache unchanged (it may be valid or invalid).

(3) When refreshing possibly stale (but otherwise valid) content, the cache optimistically maintains the same sequence number, N. Maintaining the sequence number prevents invalidations that are known to have occurred after event(N) from re-invalidating the resource, since the system requires event(N) to have occurred before event(M) for all M>N, but the system has no information about the relative ordering between event(M) and the refreshed content.

Certain control resources may need to be automatically refreshed upon invalidation, because the content of the resource may affect the ongoing behavior of the cache. For example, per-request processing in the cache may be governed by handlers which are initialized according to customer configuration scripts that are loaded on first use only, and not re-consulted. Just invalidating such resources does not have the desired effect, because there is no GET request to force a cache fill, and even a cache fill would not be enough—in the case of Lua scripts, for example, the content would need to be re-executed to cause any changes in the configuration to take effect.

Master Journal Caching

Each master journal is time stamped approximately, so a receiver of the journal only knows that it is some control site's view of the sequence number of sectors in the system at some approximate time. Although different observers of master journals do not have synchronized clocks, and since master journals are re-requested periodically and define complete views of all sector sequence numbers, the system allows any view of a journal with time value T2>T (assuming common resolution) to be used to satisfy any request to:

GET /journal/master?tval=T

This means a cache with one clock may cache a master journal response under some timestamp T2 (even though it was provided by some other node with a different clock), and the system may provide this cached response to other nodes that make the request for any timestamp T<T2, even though the requestors have different clocks, too.

For this to be maximally useful the system can prearrange to have cache nodes far from the control mechanism to have greater skew (at least as far as the way they compute T values from their local clock value), with nodes close to the control mechanism having smaller skew, so that for any given T, a request for /journal/master?tval=T is likely to be requested by parents before their children. The net effect is a more or less orderly diffusion of newer journals from the control mechanism to the edge.

Sector Journal Caching

Each sector journal request has a sequence number N which indicates the last sequence number the client had received. A correct response to the request:

GET /journal/sector/SID?seq=N is any contiguous incremental journal which contains the one-step incremental journal for sequence N+1. It may contain sequence numbers less than N, because the client will know to ignore them. It cannot start at a value M>N+1 because this would lose possible updates that occurred at sequence numbers {N+1, N+2 . . . M−1}. It may stop at any P>N+1, where P might not be the most recent sequence number based on the current state, because the requestor is expected to eventually re-request the resource starting at sequence P.

This means that caches may cache a sliding window subset of the actual sector journal, and use this window to satisfy multiple distinct URL requests. If the sliding window is sequence number interval [A, B] then any request for sequence number K∈[A, B] can be served with the slice [K+1, B] from the cache. (Note: this means that, if K=B, the response would be empty.)

Sector Prefetch in Parent Cache Nodes

Each time a cache node refreshes its master journal, it notes all of the sectors mentioned in the master journal that have newer sequence numbers than those of the sectors that it has cached, and it immediately requests newer sector journals, and similarly for property journals, until it reaches the level of individual resource invalidations. In an embodiment, this behavior is common to all cache nodes, regardless of what level in the caching hierarchy they reside, and the set of journals that will be retrieved is a function of the set of resources actually cached at a particular node.

Parent cache nodes may go beyond this basic behavior and learn the broader set of sectors and properties needed by their children, and prefetch them when indicated by a change in some higher level journal. For this to work, parent caches could be generalized to include not just the leaf resources in the parent's local cache but also indicators of the sectors and properties for which child nodes may have resources cached. This "extension" of the local cache can be treated as if it were a separate, LRU cache, with each child request of a resource for a given property and sector resulting in a use of that sector or cache with respect to the extension cache. Then, when the parent pulls a new master journal, the sector journals it requests in response should include not only those indicated by its local cache but also those indicated by the extension cache.

It should be appreciated that to get the most out of this, parents should also realize when requests for new sector journals from a child overlap with pending requests for sector journals from the next level parent, and not re-issue redundant requests but fill the request from the pending request (but this is a general behavior expected of the cache for all resources, not just a characteristic of prefetching)

Analysis

A system using a control mechanism as described herein should satisfy one or more of the following:

Data are distributed through the system, from control site to control site, and from control mechanism to the edge, primarily in pull fashion. The main exception occurs in the distributed consensus protocol used in the director core.

In an embodiment, every piece of information exposed by the control mechanism, and everything the cache needs to implement its configuration and invalidation schemes, is exposed as a web resource. The control mechanism's URI scheme represents a REST-ful web service abstraction of the control mechanism's underlying database and services.

In an embodiment, every piece of information exposed by the control mechanism is preferably cacheable by the caching network. Control site nodes also cache information from other control site nodes.

Sectors provide a way to partition the space of control information and distribute it as close as possible to the neighborhood of the resources which will likely need it, enabling locality of reference. Invalidations are not broadcast to the entire caching network, they are just distributed to those who care about the sector they live in.

The core is designed as a set of peer control sites which dynamically and fault-tolerantly self-organize into an inner (director) and outer (control) core, with no single point of failure. Individual control sites also have no single points of failure, using standard techniques for the construction of high-availability web sites.

Although each control site is expected to be able to communicate with every other functional control site, the expected communication pattern does not require this. The number of sites in the control mechanism can be increased to scale with increased number of sectors and properties handled by the caching network, and the size of the inner core can be separately scaled to accommodate the size and update frequency of the inner control state (which grows much more slowly).

Most data are managed in eventually consistent fashion, and a minimal collection of variables are managed in a strongly consistent way in the inner core. Furthermore, given the read-dominated and low-update frequency of the information in the inner control mechanism, the consistency needed can be provided with a distributed consensus method that is simpler and less complex than a Paxos-based implementation.

Exemplary Control Mechanism Using Strong Consistency Requirements

An implementation of the control mechanism has been described that relaxes some consistency requirements, based on an understanding of the nature of the CDN. In some implementations however, the core mechanism may make use of the stricter Paxos algorithm of Lamport and Gray as its distributed consensus algorithm. Implementations of this distributed consensus algorithm are described, e.g., in one or more of: U.S. Pat. No. 7,856,502, titled "Cheap Paxos," U.S. Pat. No. 7,797,457, titled "Leaderless Byzantine Consensus," U.S. Pat. No. 7,711,825, titled "Simplified Paxos," U.S. Pat. No. 7,698,465, titled "Generalized Paxos," U.S. Pat. No. 7,620,680, titled "Fast Byzantine Paxos," U.S. Pat. No. 7,565,433, titled "Byzantine Paxos," U.S. Pat. No. 7,558,883, titled "Fast Transaction Commit," U.S. Pat. No. 7,555,516, titled "Fast Paxos Recovery," U.S. Pat. No. 7,249,280, titled "Cheap Paxos," U.S. Pat. No. 6,463,532, titled "System And Method For Effectuating Distributed Consensus Among Members Of A Processor Set In A Multiprocessor Computing System Through The Use Of Shared Storage Resources," the entire contents of each of which are hereby incorporated herein for the purpose of describing the Paxos algorithm. It should also be appreciated that a particular embodiment may use a partial Paxos implementation.

Various commercial implementations of the Paxos algorithm exist and are available. For example, Google uses the Paxos algorithm in their Chubby distributed lock service (see, e.g., The Chubby lock service for loosely-coupled distributed systems, Burrows, M., OSDI'06: Seventh Symposium on Operating System Design and Implementation, Seattle, Wash., November, 2006) in order to keep replicas consistent in case of failure. Chubby is used by Google's Bigtable (Bigtable: A Distributed Storage System for Structured Data, Chang, F. et al, in OSDI'06: Seventh Symposium on Operating System Design and Implementation, Seattle, Wash., November, 2006) and other products. Microsoft Corporation uses Paxos in the Autopilot cluster management service from its Bing product. Keyspace, an open-source, consistently replicated key-value store uses Paxos as its basic replication primitive.

Those skilled in the art will realize and understand, upon reading this description, that other approaches and algorithms may be used instead of or in conjunction with the Paxos algorithm.

Control Mechanism Requirements

An exemplary control mechanism for a CDN has been described. Modifications of the control mechanism are within the scope of this disclosure, and this section outlines the requirements of an exemplary control mechanism as a guide to such modifications. It should be appreciated that a particular control mechanism may not satisfy all of these requirements.

The control mechanism acts as a distributed origin service for all control information needed by the CDN. Preferred configurations of the control mechanism should satisfy the following requirements for given parameters NI, Linv, TCR, TCP, kR, kU, LU, and LR. (These parameters are described below. It should be appreciated that although various parameters are named and used here, these named parameters are only provided to support this description and are not intended to imply any actual parameters in any actual implementation or embodiment of a control mechanism or a CDN.)

| | |
|---|---|
| Update | Provide read/write access at human interaction speeds for up to NI concurrent administrative users and other interactive origin systems at any number of distinct physical locations around the world for review and update of metadata, configuration files, and invalidations. Batch operations are possible and may ultimately generate Linv (many thousands of) individual resource invalidations per second. Other control resources may also be required but are expected to change much less frequently. |
| Read Latency | Provide world-wide, low-latency (t < TCR) read access to control information for all nodes in the caching network. The latency is preferably well below the expected polling period of the caching network (TCR« TCP). The manner in which control information is published for initial consumption by the control interface of the caching network should facilitate caching of whole and partial control resources inside the caching network. |
| Update Notification Latency | When control data are updated, the notification of that update should preferably be available in all parts of the control mechanism with expected latency of about the same order of magnitude as the polling period of the caching network. |
| Update Read Latency | When control data are updated, a consistent version of the updated data should preferably be available to the caching network with a slightly larger expected latency (compared to the latency of the notification). It is further expected that in preferred implementations spatial locality of reference will ensure that only a small subset of the caching network will request the updated resources, and these requests can be satisfied by control sites as soon as they have received the update (they do not need to wait for the rest of the control mechanism to absorb the update). |
| Consistency | At any given time, the view presented by a control site to the caching network should preferably correspond to a collection of consistent views of any independent portion of control state, as measured separately for each portion of state at some point in the past. In other words, every site in the control mechanism is eventually consistent with every other site. |
| Read Availability | The control mechanism should provide a view of control state that effectively never goes down. Correct operation of the system should be preserved even in the face of up to kR concurrent site failures, for some fixed kR. |
| Update Availability | The update service of the control mechanism may have separate and lower availability requirements than the view service of the control mechanism (e.g., tolerate up to kU concurrent site failures, for some fixed kU > kR. |
| Network Partition | The system should have redundant network links to mitigate the risk of a network partition. In the event of a network partition, however, the disconnected components should preferably continue to provide consistent read access to cache nodes that can still reach them, but it is allowable to discontinue update access to isolated nodes until the partition can be corrected. It should be appreciated, however, that there is risk with such a situation; the responses from the isolated (subset) components should indicate to the requestor that it is isolated and suggest an alternate location from which to retrieve data. If the edge can connect to that alternate control location (and if such is not also in a minority), then the data from that alternate site is preferably used. Here the 'alternate' location is part of the same control mechanism, but a target believed outside the isolation that includes this control site. |
| Automatic Recovery | The system should preferably automatically recover whenever no more than the maximum sites fail at the same time. This is really just a corollary to the above availability requirements, but worth stating explicitly. Recovery of individual failed sites may |

-continued

| | |
|---|---|
| | require manual intervention in some cases, but is separate from the automated recovery of the remaining functional nodes in the system. |
| Throughput Capacity | The system should preferably be able to process up to LU read/write requests per second from administrative/operational clients, and up to LR read requests per second from the caching network, for some fixed load maximum loads LU and LR. |
| Automatic Load Balancing | The control mechanism should preferably be able to automatically balance the load of control resource requests from the caching network. Overloaded control sites will be detected and a portion of their workload will be transferred to other less busy control sites without manual intervention. |

In addition, the architecture of the control mechanism should preferably satisfy the following requirements which address how the properties of any given instance or configuration of the control mechanism may be changed via incremental reconfiguration:

| | |
|---|---|
| Linear Throughput Scalability | Throughput should preferably be able to scale linearly with the scale of the CDN by adding new directors and control sites and reconfiguring, without affecting the resulting control mechanism's ability to satisfy its latency requirements. For example, doubling the worldwide number of properties or doubling the worldwide invalidation rate is preferably, feasible to handle by approximately doubling the number of directors and/or control sites in the control mechanism, without reducing performance of any of control mechanism's operations as perceived by read/write users or the caching network. |
| High Availability | The control mechanism should provide a view of control state that effectively never goes down. Specifically, it should be possible to configure the system in advance so that an arbitrarily large number of control mechanism nodes can fail at once without affecting the correct operation of the system as expressed by the requirements above, with the exception of throughput capacity (which may be temporarily reduced by site failures). |

Operation

Request-Response Processing

In operation, the various CDN caches (and other services) receive requests for resources, processes those requests, and provide responses (which may include, e.g., the requested resources, error messages, or directions to find the resources elsewhere).

Figure 15:
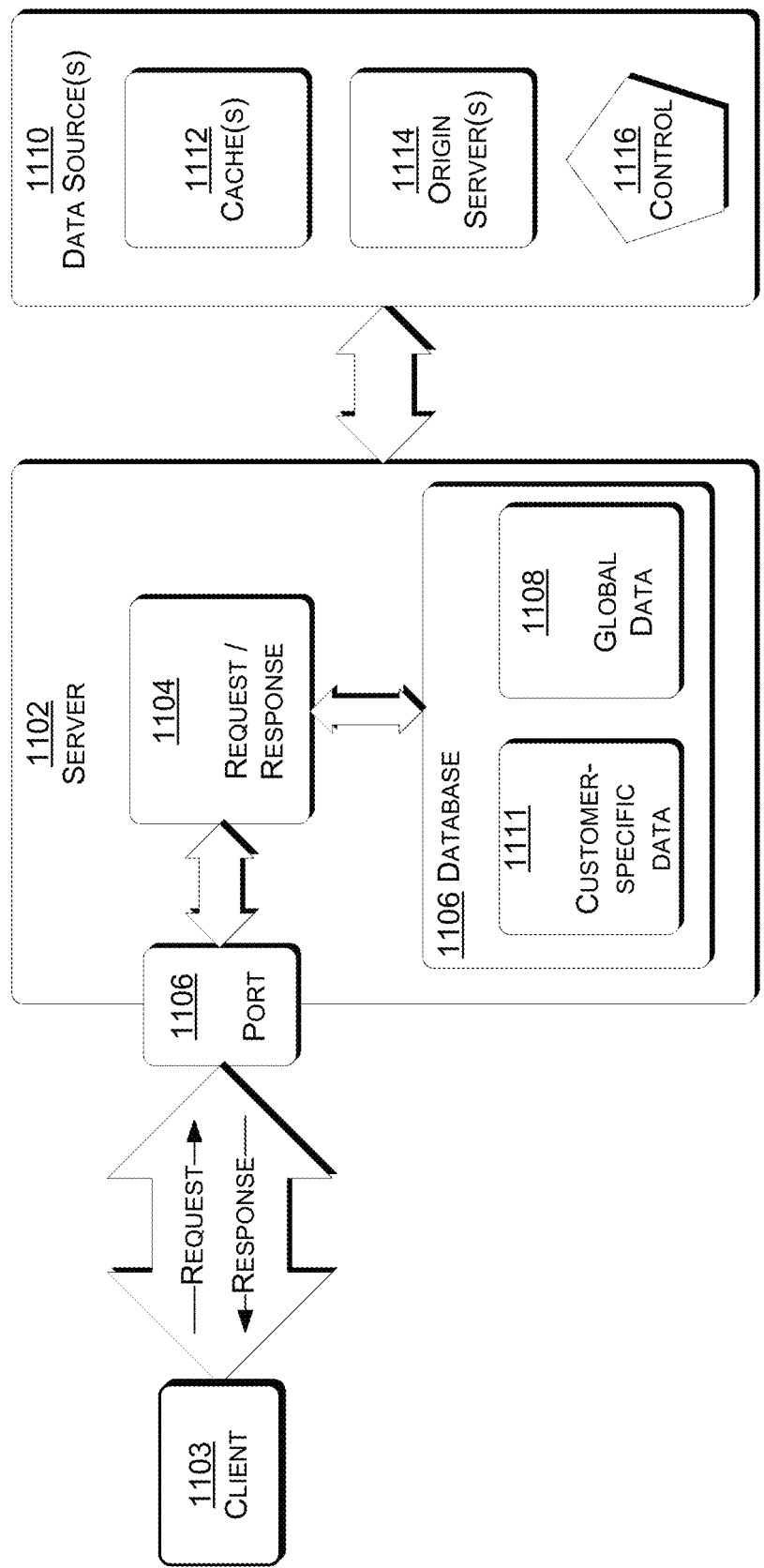
FIG. 15 shows aspects of exemplary request-response processing in exemplary CDNs in accordance with an embodiment.

FIGS. 3E and 15 show the request-response operation of an exemplary CDN component 1102. Although component 1102 is denoted "Server" in the drawing, it should be appreciated that component 1102 may be a cache server or any other component or service of the CDN that performs request-response processing. As shown in the drawing, client 1103 makes a request for a resource of server 1102, and receives a response to that request. In processing that request, as explained below, the server 1102 may obtain information from one or more other data sources 1110. Some of these data sources 1110 may be other CDN components (e.g., caches 1112 or control mechanism(s) 1116). The data sources 1110 may also include origin server(s) 1114 that may or may not be part of the CDN. It should be appreciated that the client 1103 may be another CDN component (e.g., a cache) or it may be a client entity that is external to the CDN. Thus, with reference again to FIG. 13C, the requested resource may be a customer resource 124 or a CDN resource 126.

The server 1102 preferably supports HTTP/1.0, and HTTP/1.1, and HTTPS requests, although it is not limited to those protocols or to any particular version of any protocol. HTTP/1.1 is defined in Network Working Group, Request for Comments: 2616, June 1999, "Hypertext Transfer Protocol—HTTP/1.1," the entire contents of which are fully incorporated herein by reference for all purposes. HTTPS is described in Network Working Group, Request for Comments: 2818, May 2000, "HTTP Over TLS," the entire contents of each of which are fully incorporated herein by reference for all purposes. Unless specifically stated otherwise, "HTTP" is used in this description to refer to any version or form of HTTP request, including HTTP and HTTPS requests. Those of ordinary skill in the art will realize and understand, upon reading this description, that HTTPS may be preferred in situations where additional security may be required. It should also be appreciated that when an HTTP request is referred to herein, some other protocols, including possibly proprietary protocols, may be used while still leveraging the CDN and using URLs to name the objects.

The server 1102 includes a request/response mechanism 1104 (preferably implemented by software in combination with hardware on the server 1102). The request/response mechanism 1104 listens for connection requests on multiple configured addresses/ports, including port 1106.

It should be appreciated that there are two types of requests described here. First, the server 1102 listens for connection requests from other devices (e.g., from client 1103). These requests are used to establish a connection (e.g., a TCP/IP connection) between the client 1103 and the server 1102. The second type of requests is those made by the client over the established connection (e.g., HTTP requests or the like).

Once a connection from a client is established, the request/response mechanism 1104 waits for a resource request (e.g., an HTTP request) on that connection. When a resource request is made, the request/response mechanism 1104 tries to identify a customer associated with that request. As used here, a "customer" is an entity that is authorized to have its content served by the server 1102. The customer may be an external entity such as, e.g., a subscriber to the CDN, or the customer may be another CDN component. In effect, the request/response mechanism 1104 needs to determine if the requested resource belongs to a property for which the system is configured to provide service.

In order to determine whether or not the request is associated with a customer of the CDN (or the CDN itself), the server 1102 needs at least some information about the CDN's customers. This information may be stored as global data 1108 in a database 1106 on the server 1102 (global data 1108 corresponds to global data 128 in the cache database 120 in FIG. 13C). The global data 1108 should include sufficient data to allow the server 1102 to either reject the request (in the case of a request for a resource that is not associated with a customer), or to serve the requested resource to the client 1103, or to direct the client to another source from which the requested resource may be obtained or served. If the server 1102 does not have the required global data 1108 at the time of the client request, it may obtain the needed global data 1108 from a data source 1110, preferably from a control mechanism 1116 or from another cache 1112. In effect, for certain internal CDN data, the control mechanism is considered an origin server or coserver.

As explained below, the request/response mechanism 1104 may perform customer-specific processing as part of the request/response processing. In order to perform customer-specific processing, the request/response mechanism needs certain customer-specific data 1111 (which corresponds to customer specific data resources 130 in the cache database 120 in FIG. 13C). If current customer-specific data 1111 are not available in the request/response mechanism's database 1106, the server 1102 may obtain the needed customer-specific data 1111 from a data source 1110, preferably from a control mechanism 1116 (although customer-specific data may also be obtained from another cache 1112 in the CDN).

Request collections (described above) may be used to implement aspects of request-response processing.

Those of ordinary skill in the art will realize and understand, upon reading this description, that the database 1106 may be in any form, including one or more tables stored in one or more files, preferably in the server's memory.

Objects, Sequencers and Handlers

In some implementations, the processing performed by request/response mechanism 1104 may use various kinds of objects, including a Notes Object, a Session Object (sxn), and a Transaction Object (txn). With reference to FIG. 15A, a Notes Object 1204 is a generalized string key/value table. (A Notes Object may also be referred to as a Properties Object.) FIGS. 15B-15C show a Session Object (sxn 1206) and a Transaction Object (txn 1208), respectively. A session object 1206 contains information about a particular client session, e.g., a client connection or an internally launched (or spawned) session. A Session Object 1206 may contain allocation context information for a session. A Transaction Object (txn 1208) is usually associated with a session and contains information about an individual request. During a session, multiple transactions may be performed, and information about each transaction is carried in a separate transaction object. E.g., a transaction object carries the request to be satisfied, room for the response, information about where the response body is coming from (e.g., response channel id, defined below), etc.

Figure 15D:
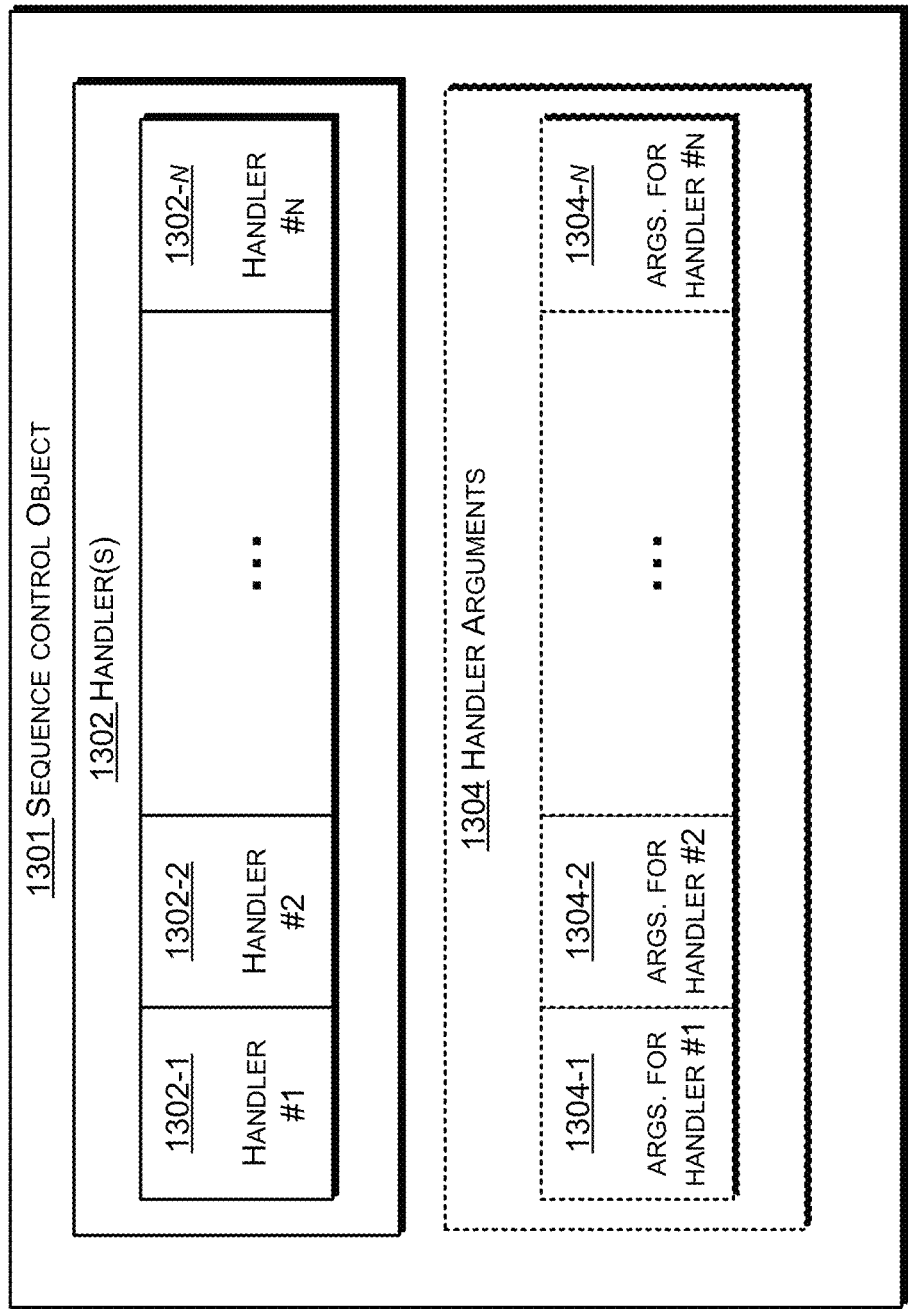

A sequencer is essentially a task. A sequencer uses a sequence control object made up of an ordered list of one or more handlers and handler argument(s). FIG. 15D shows an exemplary sequence control object 1301 comprising handler(s) 1302 and handler argument(s) 1304. The handler(s) 1302 comprise the ordered lists of handlers 1302-1, 1302-2 . . . 1302-*n*, and the argument(s) 1304 are per handler (denoted 1304-1, 1304-2 . . . 1304-*n*). It should be appreciated that not all handlers require arguments (the arguments are shown in dashed lines in the drawing in FIG. 15D). It should also be appreciated that some handlers may obtain some or all of their arguments from other locations. It should also be appreciated that a sequence control object may have only a single handler (i.e., a sequence control object may consist of a single step).

Figure 15E:
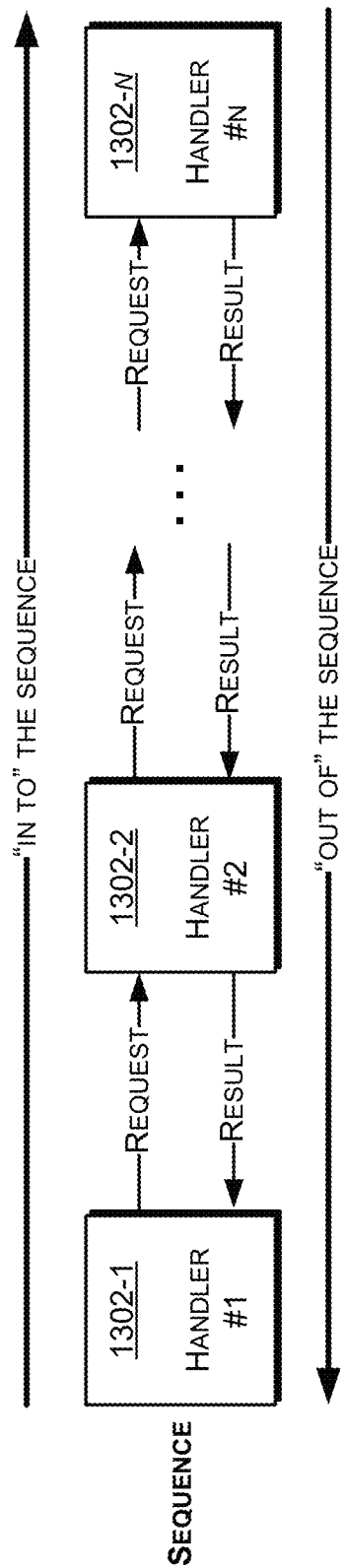

When running, a sequencer invokes its handlers (essentially, processing modules) in order. By default, sequencers are bidirectional, so that the sequencer's handlers are called (invoked) in order on the way "in" and in reverse order on the way "out". Handlers can modify the sequence, thereby providing flexibility. FIG. 15E shows the execution of the sequence of handlers 1302 from sequence control object 1301 (of FIG. 15D). As shown in FIG. 15E, the sequencer invokes the handlers in the order "Handler #1," "Handler #2," . . . "Handler #n" into the sequence and then in the reverse order out of the sequence. So "Handler #1" makes a request of "Handler #2", and so on, until "Handler #n", and then results are passed back, eventually from "Handler #2" to "Handler #1". Each handler is invoked with its corresponding arguments (if any).

Handlers may be synchronous or blocking. Handlers may inspect and modify the sequence to which they belong, and handlers may launch their own sequencers (or sequences). There are two forms of this process: one is where a handler launches a "subsequence". That subsequence runs in the same sequencer as the handler and the sequence the handler is in is suspended until the subsequence is complete. Another example occurs when a handler launches a complete sequencer. In that case, the sequencer is a separate, independent task. A powerful aspect of that model is that a handler could launch such a sequence on the way in to the sequence, allow processing to continue, and then pick up the result (waiting if necessary) on the way out of the sequence. FIG. 15F shows an example of a first sequence ("Sequence 1") in which a handler (Handler #2, 1302-2) launches (or spawns) another sequence ("Sequence 2", consisting of Handler #2,1 1302-2.1 . . . Handler #2,k 1302-2.*k*). If Sequence 2 runs in the same sequencer as the handler #2, then handler #3 (of sequence 1) will not begin until sequence 2 is complete (i.e., until handler #2,k is done and the response returned to handler #2). If, on the other hand, sequence 2 is launched as an independent and separate task, sequence 1 can continue with handler #3, etc. without waiting for sequence 2 to complete.

Figure 15G:
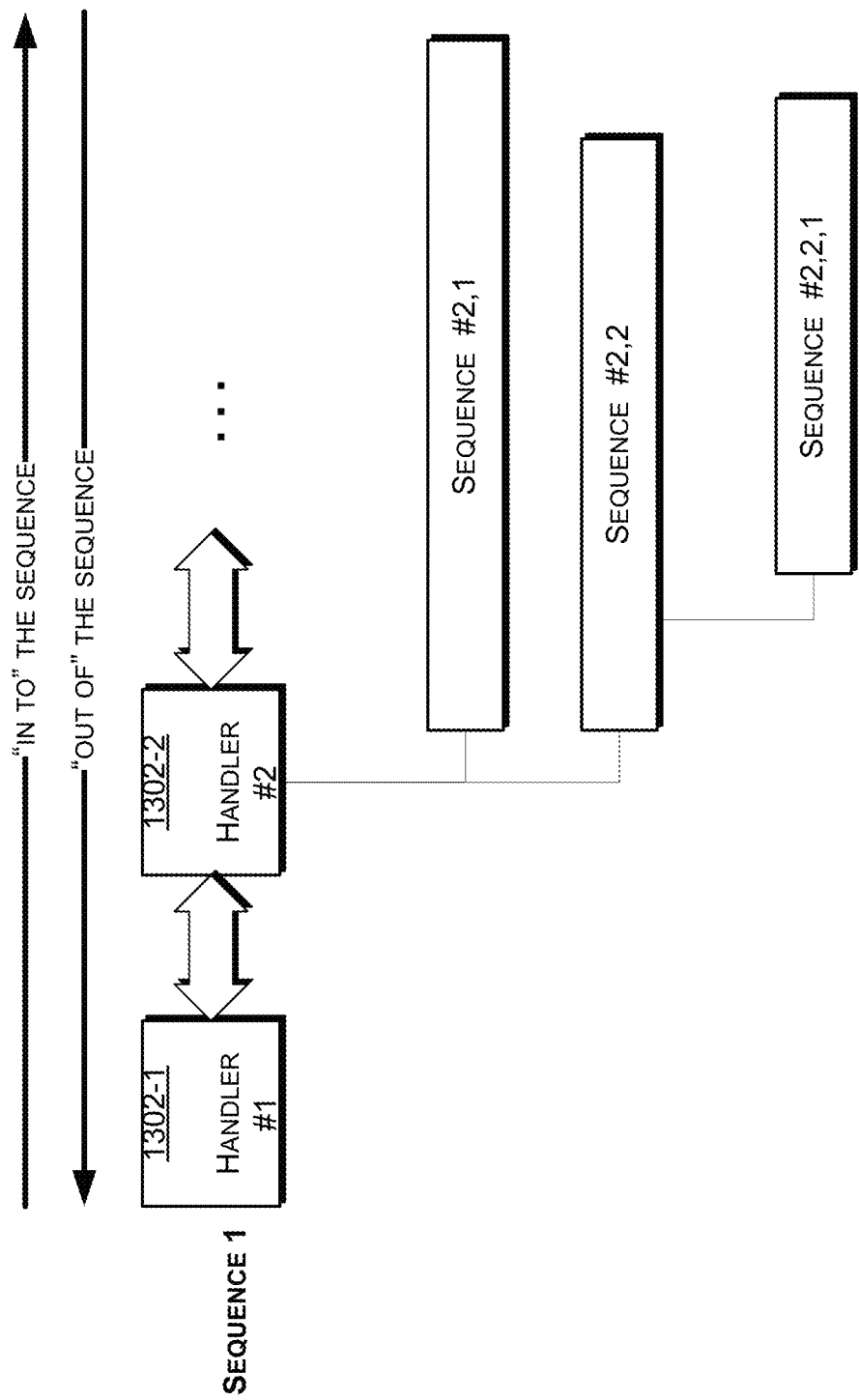

FIG. 15G shows an example of a first sequence ("Sequence 1") in which a handler (#2) launches two other sequences (Sequence #2,1, and Sequence #2,2). The Sequence #2,2 launches a subsequence #2,2.1. Sequence #2 may have to wait for the launched sequences (#2,1 and/or #2,2) to complete or it may continue and pick up the results of those sequences on the way back out of the sequence.

A handler's behavior may be classified into three broad groups (or types):

One-shot: The handler is removed from sequence when done.
Intelligent: The handler may manipulate the sequence.
Persistent: The handler is called on the way "in" and "out".

These labels are used as descriptive shorthand for basic types of handler behavior, and it should be appreciated that this type is not used by the sequencer, and nothing needs to enforce a handler's "type," and a handler may act differently depending on circumstances.

Handlers may be named, and it is useful to name them to correspond to the functions that they are to perform (e.g.: "ssl", "http-conn", "http-session", "strip-query", "proxy-auth", etc.).

A sequence control object may be stored in compiled form for re-use, so there is no need to constantly look up handler names.

The following is an example of a sequence specification for an HTTP listener:

```
listener = {
    address = "*.80",
    sequence = "http-conn, http-session"
}
```

Figure 15I:
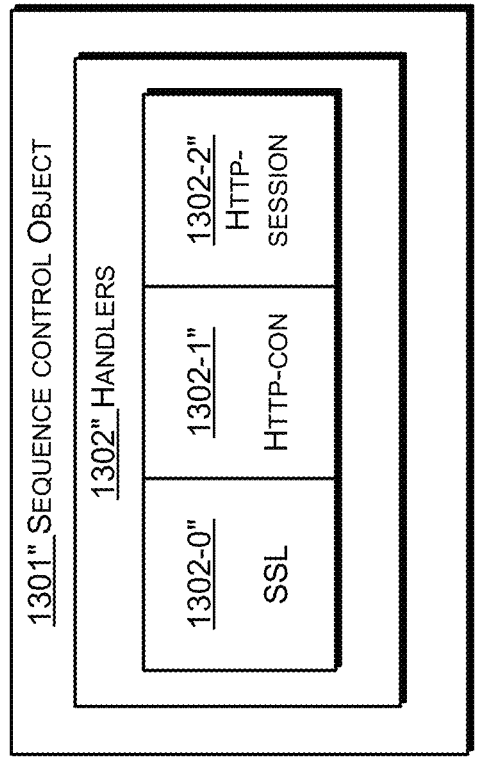
Figure 15H:
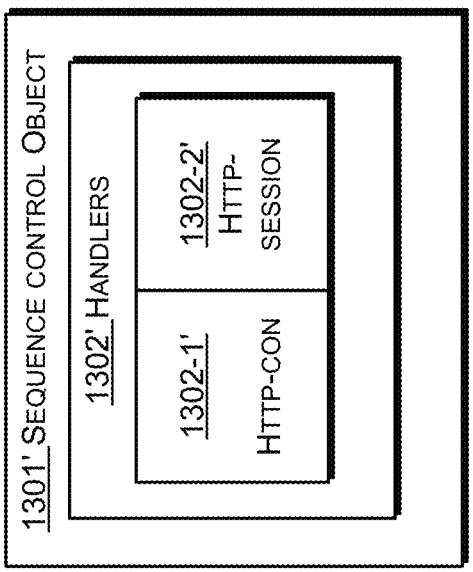

In this example, the handlers are "http-conn" and "http-session", and the parameter for the listener task is "address='*.80'". A sequence control object 1301' corresponding to this listener sequence is shown in FIG. 15H. This listener task provides a bare TCP or cleartext connection. The first handler ("http-conn") is a one-shot handler which creates an HTTP connection from a cleartext connection. The second handler ("http-session") is an intelligent handler that takes the HTTP connection (as already created by the "http-conn" handler), creates a session object and handles the entire session. It should be appreciated that the listener is just providing the communication channel to the client, and the same basic listener code could be used with different handlers to implement protocols other than HTTP (e.g., FTP).

As another example, the following sequence specifies a general SSL listener:

```
listener = {
    address = "*.443",
    sequence = "ssl, http-conn, http-session"
}
```

In this example, the handlers are "ssl", "http-conn" and "http-session", and the parameter for the listener task is "address='*.443'". A sequence control object 1301" corresponding to this SSL listener sequence is shown in FIG. 15i. The listener task accepts a connection and then launches whatever sequence was specified for the listener. This sequence is similar to the HTTP listener (above), except that the SSL handler first creates an SSL channel on the bare (encrypted) connection, suitable for the http-conn handler. Although the SSL handler is a "one-shot" handler, it needs to block since it must perform the SSL negotiation. That is, the "ssl" handler must complete before the next handler can begin. The SSL handler is responsible for instantiating an SSL channel. It should be appreciated that although the SSL channel is persistent, the handler which sets it up does not need to be persistent. The "ssl" handler instantiates an SSL channel on top of the cleartext channel. Once that is done, the SSL channel (which does the decryption and encryption) persists until the connection is finished, even though the "ssl" handler itself is gone from the sequence. So the "ssl" handler is not performing the SSL operations itself, it is just enabling them by instantiating the necessary channel.

FIGS. 16A-16D show examples of sequencers and handlers.

As shown above, a sequence may be used to interpret a request and get to the point that a response is available to be pumped. The same basic sequencing mechanism can be used to implement a programmable pump/filter, although of course the handlers themselves are now performing a different task. FIG. 16A shows a bidirectional sequence that is part of a pump/filter. The pump task uses "direct delivery" requests, e.g., sendfile( ), because it does not need to see the data itself. It should be appreciated that sendfile( ) is not the request, it is just one way a direct delivery request may be implemented by the channel involved. The delivery sequence consists of two handlers:
- delivery-monitor (account bytes delivered, monitors performance); and
- chan-submit (submits request to a channel, waits for response). The channel may be, e.g., an object channel, downstream channel, etc.

If the process requires, e.g., computation of a message digest (such as MD5) of the pumped data, the sequencer can be set up with an MD5 handler in the path (e.g., as shown in FIG. 16B). The MD5 handler can be used to snoop or verify the data as it passes.

Figure 16C:
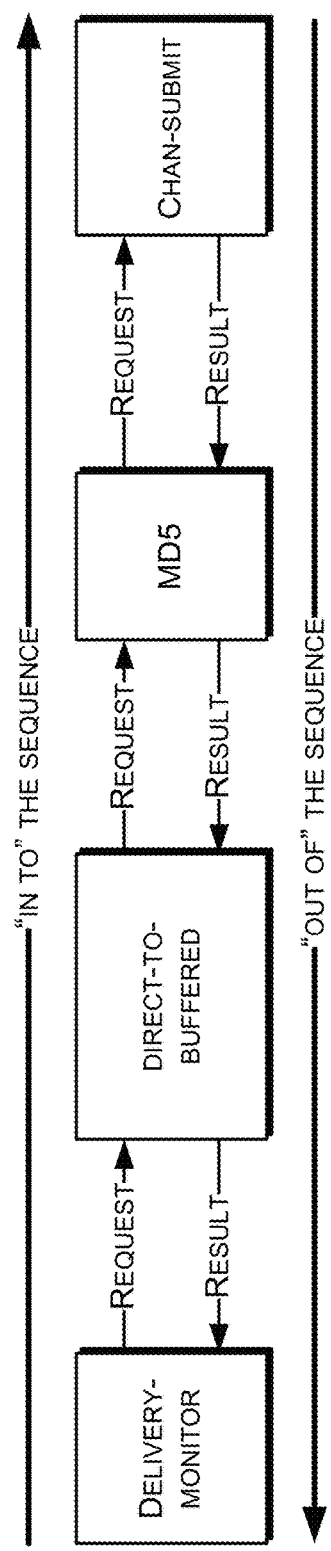

An example of a self-modifying sequence is shown in FIG. 16C. The pump task is using direct delivery requests, so the data are not available in user space. The MD5 handler sees the request on the way "in" to the sequence and inserts a new handler ("direct-to-buffered") handler to the "left" of the MD5 handler so that it runs before the MD5 handler. The "direct-to-buffered" handler translates direct delivery to buffered read/write.

Figure 16D:
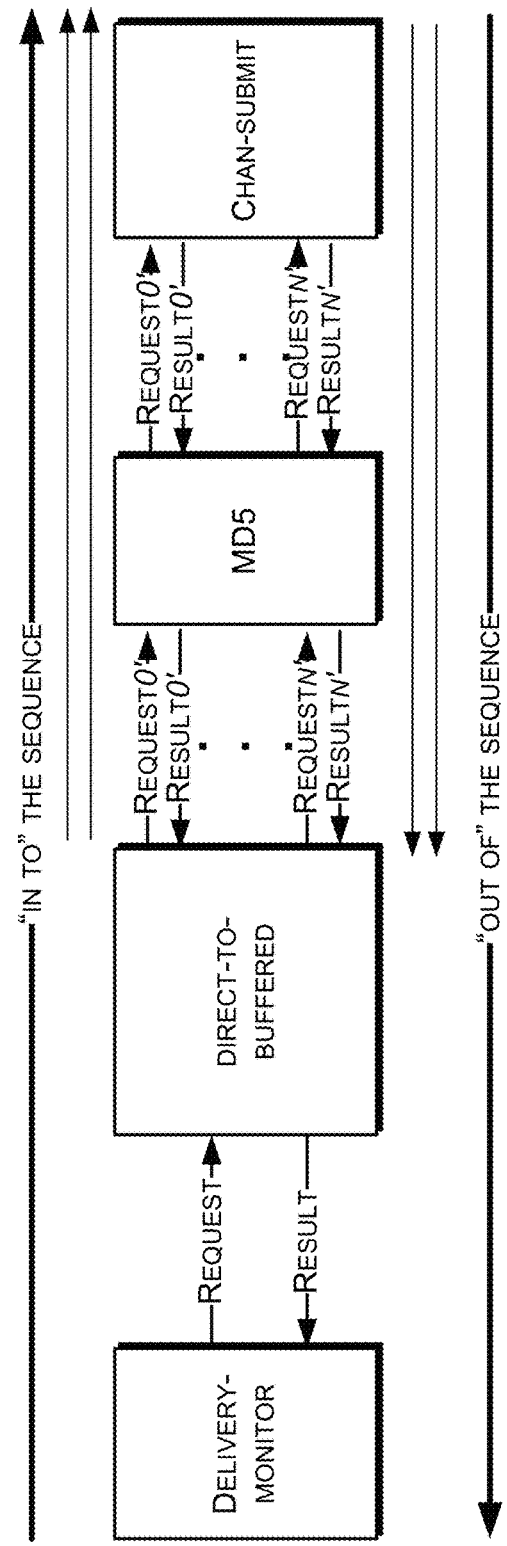

A sequence can be modified to change direction of the order of operations. For example, in a case where direct delivery requests can be too large for a single buffered read/write, the "direct-to-buffered" handler can change the sequence direction to perform multiple operations on one side of the sequence (e.g., as shown in FIG. 16D). Handlers to the left of the "direct-to-buffered" handler still see what they expect to see, while handlers to the right of the "direct-to-buffered" handler perform multiple operations.

Scripts and Customer-Specific Control

As noted, the request/response mechanism 1104 (FIG. 15) may perform customer-specific and/or property-specific processing as part of its request/response processing. The request/response mechanism needs certain customer-specific data 1111 in order to perform the customer-specific processing.

Preferably the system has a default mode in which it will perform request/response processing without any customer-specific handlers. That is, there is preferably a standard or default request/response sequence that a content provider may use. The request/response mechanism 1104 may allow customer-specific handlers (or sequences) to be included at various locations (or hooks) during the request/response processing sequence. Customer-specific sequences and/or handlers and/or rules may be stored in the database 1106 on the server 1102 as part of the customer specific data 1111. These customer-specific handlers may perform operations on the request and/or response paths. The customer-specific scripts that are to be used to process a customer's requests are referred to herein as Customer Configuration Scripts (CCSs), and are associated with the customers, e.g., via customer ids. With reference again to FIG. 13C, a CCS may be considered to be a customer specific data resource 130. Preferably the system has a default mode in which it will perform request/response processing without any customer-specific handlers. That is, preferably customer-specific handlers are optional.

It should be appreciated that scripts are not the same as sequences. A script is used to specify the sequences to be used to handle requests for a particular customer. The script may perform whatever operations it needs (including making its own HTTP requests, etc.) to determine what the sequences should be. For example, a script may also use a different sequence depending on the local environment. However, once the script has done that job, the resulting sequences are used (preferably without rerunning the script) until something happens (e.g., the script is invalidated and reloaded) which indicates different sequences are now needed. Note, however, that a given handler may be implemented as a request/response script in the same language as the configuration script, but performing a different job.

Customers may provide handlers, parameters for existing handlers, or routines to be invoked by handlers at certain stages of the processing.

It should be appreciated that since, as noted, the client 1103 may itself be another component of the CDN (e.g., a cache or a control mechanism, etc.), the CDN itself may have CCSs associated therewith. That is, from the point of view of request/response processing, the CDN may be considered to be a customer of itself.

With reference again to FIG. 15, in order to process the request, the server 1102 will need the CCS for the customer associated with the request from the client 1103. The CCS is stored in the database 1106, corresponding to at least some of the customer-specific data 1111. If the server does not have that customer's CCS stored locally at the time it is processing the client's request, the server 1102 will attempt to obtain the CCS from another data source 1110, typically from a control mechanism 1116 or a peer (e.g., one or more of the caches 1112). If a CCS is found, any customer-specific handlers (or sequences) specified in the CCS will be included in the appropriate locations (hooks) during request/response processing.

In summary, the CCS generally is run once (unless invalidated or purged). The CCS defines the customer-specific sequences, which are then cached in the server 1102 in their compiled form. If those sequences are present and valid, they are used without re-running the CCS (see the "Valid sequences?" decision in the flow chart in FIG. 20A, discussed below).

Figure 17:
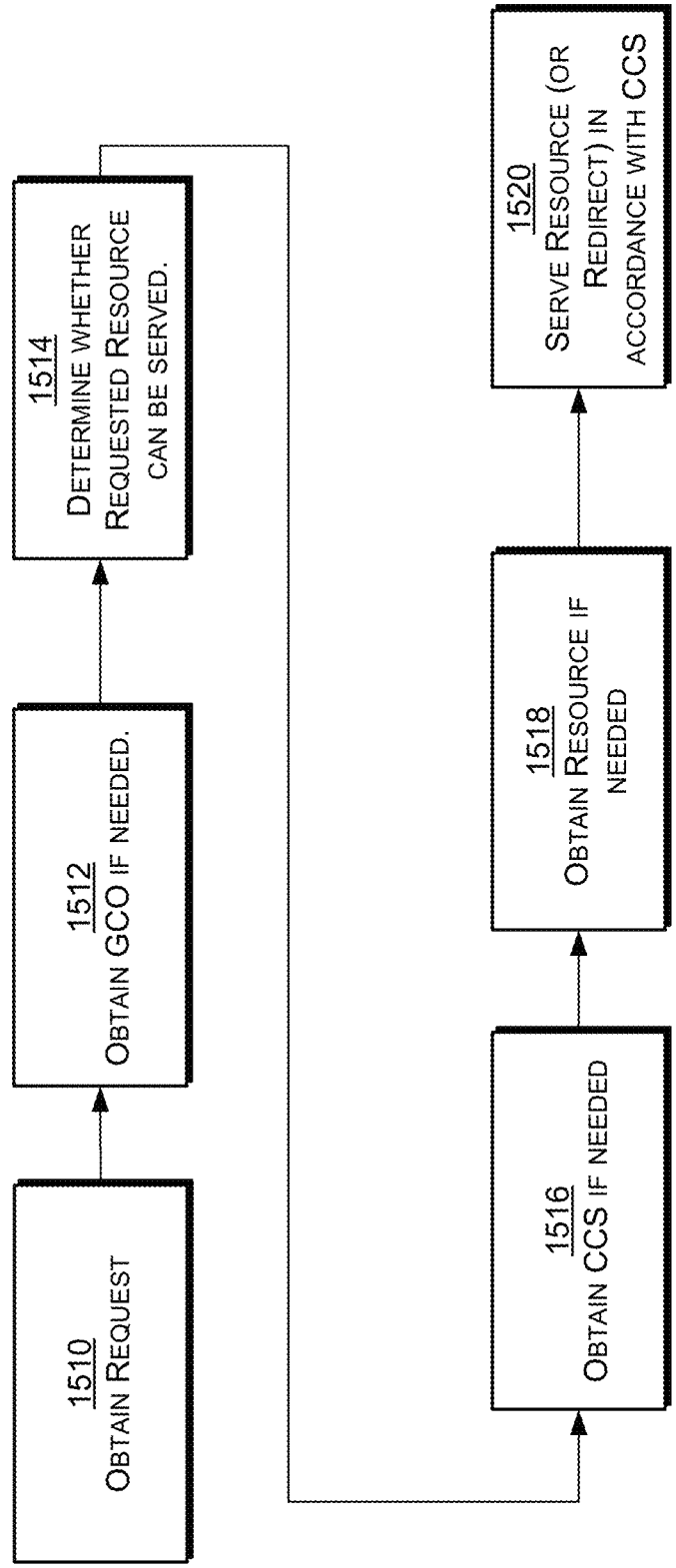
FIG. 17 is a flow chart showing exemplary request-response processing in exemplary CDNs in accordance with an embodiment.

A CDN component's handling of a resource request is described with reference to the flowchart in FIG. 17. It should be appreciated that the CDN component may be any entity in the CDN, including a cache (e.g., an edge cache, a parent cache, an origin cache, a control mechanism, etc.), and the requested resource may be any resource, including resources requested by clients external to the CDN on behalf of customers or subscribers to the CDN and resources that are requested by other CDN components and comprise CDN data (e.g., log files and the like).

Figure 18:
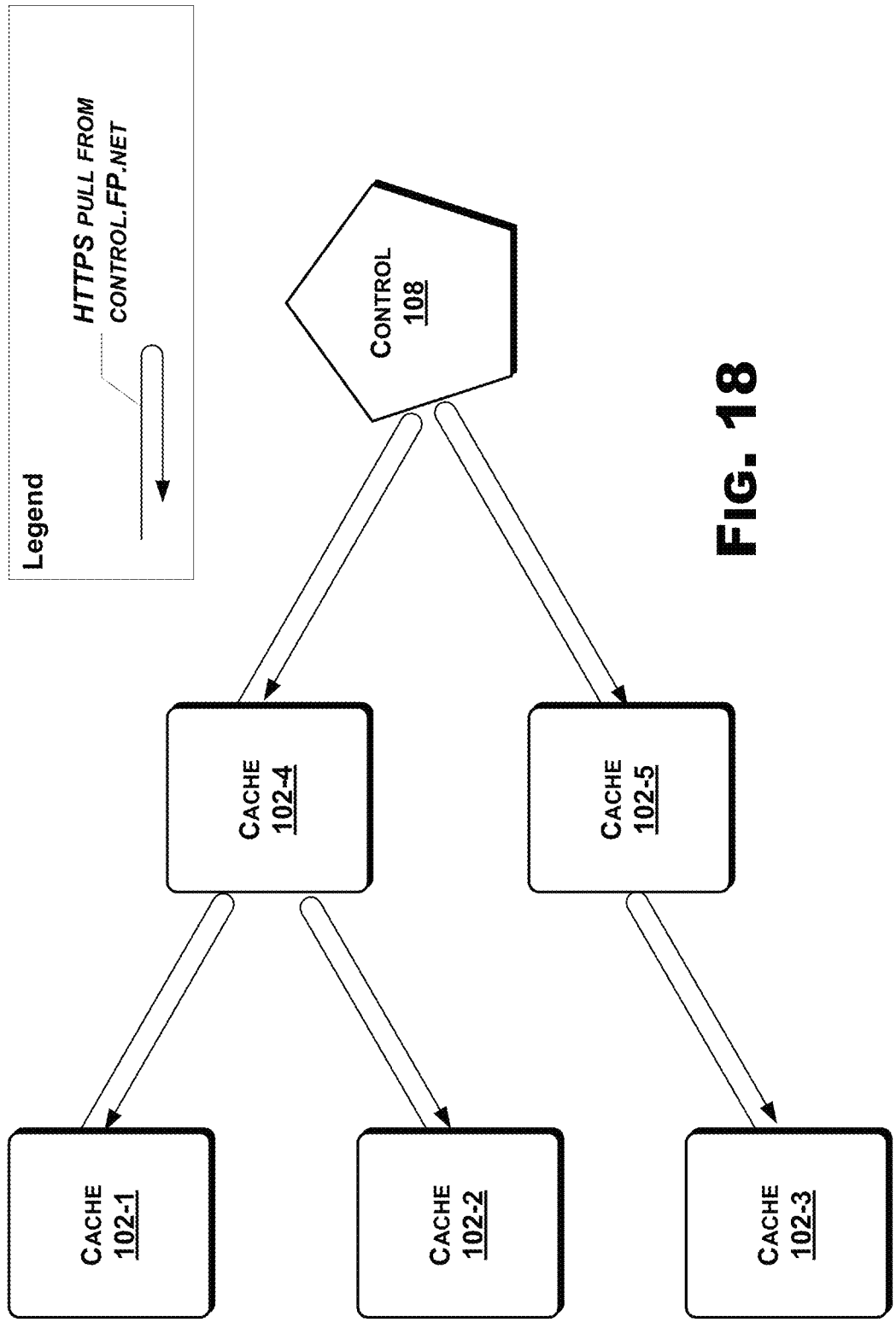
FIG. 18 shows interaction between components of an exemplary CDN in accordance with an embodiment.

First, the cache obtains a resource request (at 1510). The request may be using an HTTP request, and include information in an associated HTTP header. The cache needs information in order to determine whether the requested resource can be served. This information is available from the GCO. The GCO includes information that will allow the cache to determine whether the requested resource corresponds to a resource of a customer of the CDN (or to a CDN resource). Essentially the cache may use the GCO to determine whether the requested resource belongs to a property configured to use the CDN. The cache therefore obtains a current version of the GCO, if needed, (at 1512) and determines (at 1514) whether or not the resource can be served. If the cache needs the GCO or other information from the control mechanism, the cache can request that information using appropriate HTTP (or FTP) request(s), and the cache may obtain the GCO and/or other needed information from the control mechanism and/or other caches or other locations in the CDN. For example, FIG. 18 shows various caches (102-1, 102-2 . . . 102-5) pulling data from the control mechanism 108 using an HTTPS pull. In order to initiate such a pull, a cache would make an HTTPS request for the data (using a URL of that data) and identifying the control mechanism 108 as the source of the data.

In the example shown in FIG. 18, caches 102-4 and 102-5 pull a CDN property from the control mechanism 108, whereas caches 102-1, 102-2, and 102-3 pull the CDN property from other caches (102-4 and 102-5).

The cache server should serve a particular customer's resource to a client in accordance with the processing requirements (e.g., scripts, etc.) set by that particular customer, the cache therefore needs the CCS (if any) associated with that customer. The CCS may specify processing requirements etc. on a per property basis. Accordingly, at 1516, the cache server obtains the CCS (if any) associated with the requested resource (i.e., with the customer on behalf of whom the requested resource is being served). It should be appreciated that the CCS is preferably, but not necessarily, pulled prior to obtaining the resource (since the CCS must be processed before in order to retrieve the resource).

If the cache determines (at 1514) that the requested resource can be served (i.e., that the cache is authorized to serve the resource), the cache may need to obtain a copy of the resource (at 1518). The CCS (and possibly information associated with the request, e.g., HTTP header information) should provide the cache with sufficient information for it to locate a copy of the resource, if needed. The cache server may obtain the requested resource from another cache (e.g., a peer) or from an origin server. In some embodiments the cache server may redirect the client to another location from which to obtain the content.

Having obtained the appropriate CCS (if one exists), the cache server then serves the resource (at 1520) using information in the CCS. As explained, the CCS preferably runs before the cache even obtains the resource to serve, since the CCS may program handlers at hook points which affect the request itself, and therefore which affect which resource is going to be served.

It should be appreciated and understood that the CCS for a particular customer is not run on every request associated with that customer. Unless or until invalidated, a particular CCS is only run once in a cache to set up the required sequences for processing that customer's properties. A CCS configures the cache to process an associated customer's properties, and those processes need not be reconfigured unless the CCS changes or expires or is invalidated.

Component Roles

Certain components of the CDN system may act as clients of the CDN and/or as content providers to the CDN. For example, as noted above, the core control cluster maintains information used/needed by the caches in order for them to deliver content to clients. When caches obtain control-related content (resources) from the control mechanism cluster, the control mechanism cluster is acting as a content provider and the caches are acting as clients. Similarly, when a collector mechanism obtains log and other information from a cache cluster, the collector mechanism is acting as a client and the cache cluster is acting as a content provider. In addition, when the control mechanism cluster obtains information from a collector mechanism, the control mechanism cluster is acting as a client and the collector mechanism is acting as a content provider. When content is being delivered by the CDN to clients on behalf of a content provider, the caches obtain that content from origin server sites associated with the content provider. In some cases, as noted above, a cache server site may try to obtain requested content from another cache server site (e.g., from a peer cache server site or from a parent cache server site). In those cases the peer (or parent) cache server sites are acting as content providers.

Hierarchy

The CDN preferably uses tree-like hierarchical communication structures to pull data from the control mechanism and origin servers to the edge, and to pull data from the edge to specialized gatherers and monitors (reducers and collectors). These tree-like structures are preferably dynamic, i.e., they can change with time, requirements and circumstances. These structures are preferably also customized, i.e., different communication operations can use different hierarchies, and different instances of a communication operation may use a different hierarchy (e.g., different parents for different origin servers).

For pulling data to the edge, each node preferably knows its parent or parents. For pulling data to the root, each node also preferably knows it's children. Lists of parents or children can themselves be resources. Using domain names instead of IP addresses for parents and children allows the rendezvous system to be leveraged.

Executable Resources, Customization Hooks and scripts

Caches 102 in the CDN 100 are able to process and deliver (serve) executable resources, and CDN users (e.g., content providers, the CDN itself) are able to provide extensions to resources via these executable resources. Executable resources provide a general and useful extension that may replace and/or enhance several ad hoc mechanisms and HTTP extensions in a CDN. Executable resources allow suitably authenticated HTTP servers to respond to an HTTP request with a new type of reply (possibly identified by an extension status code such as "600 Exec" or a new Content-Type, e.g., say "application/x-fp-exec"). The contents of such a reply are a script to be executed by an interpreter in the response path of the cache, in order to generate the actual reply. Examples of things the interpreter may do are:

Fill the request from an alternate location.
Fill the request from multiple locations and merge the results.
Perform authentication.
Pre-fill one or more other resources.
Perform manipulations on the body of a resource (e.g., compression, transcoding, segmentation, etc.)

If the reply is cacheable, it may be retained by the cache, and executed each time the resource is requested.

The NDC may use this feature to gather logs.

The system provides a way to distinguish between requesting the script itself, and requesting the result of executing the script. Scripts are subject to pinning, expiration, invalidation and revalidation just like any other resources.

Customer-specific code can be added at numerous hook points in the processing. Such customer-specific code may be used, e.g., for:

request manipulation after parsing;
calculation of cache key for index lookup;
coarse and fine details of authentication;
content negotiation choices, variants, and encodings;
policies for range handling;
deciding which peers to contact or migrate to;
which host(s) to contact for fills;
contents of fill request;
manipulation of fill response;
handling of origin server errors;
caching policy;
manipulation of response to client;
logging effects.

A wide variety of hook points enable CDN users (customers) to modify existing algorithms; pre- or post-process algorithms; and/or completely replace algorithms. In a presently preferred embodiment, these are the customer-specific sequences which are set at various hook points by the CCS. It should be appreciated that the hook points need not be hard-coded into the system. They may be considered in some cases, to exist conceptually when reasoning about where to place handlers in the compiled sequence, but they are an artifact of a particular way of coming up with the processing sequence, and not necessarily the only way.

In a present implementation, scripts can be used for:
Configuration
Customer-specific event handling and HTTP rewriting
Network Data Collection operations
Rapid prototyping of new features Scripts are preferably cached objects (like other objects in the CDN). They are preferably compiled into byte code and executed in a sandbox by a virtual machine Scripts are preferably measured for CPU usage and are effectively preemptible.

In a presently preferred implementation scripts are implemented using the Lua scripting language. Lua compiles into bytecodes for a small register-based (as opposed to stack-based) virtual machine Lua's primary data type is a table (which is implemented as a hybrid between a hash table and an array), but it also has other types (string, number, Boolean, etc.). Lua's interface to the rest of the system is via various function bindings which are a means for a Lua function call to cause a system function (instead of another Lua function) to be called. The details of a particular binding, including the data it operates on and the results it returns to the Lua script, are specific to the binding in question and may involve tables (e.g., hash table objects) or other types of objects.

Those of ordinary skill in the art will realize and understand, upon reading this description, that a different scripting language could be used. However, it should be appreciated that any scripting language should run (e.g., be interpreted) quickly with a small interpreter, have a relatively small implementation, be lightweight (have a small memory footprint and be easily sandboxed for secure execution) and provide sufficient control to allow customer-derived scripts to be used. It should be noted that "script" does not necessarily imply interpreted at run time, but rather it is used in a broader sense to mean loadable code.

It should be appreciated that basic cache functionality requires no scripts, and the CDN will operate without them to serve content. Hooks allow script execution at various points in the cache's processing path and may be used (if permitted) to enhance and modify content delivery.

Hooks may be either:
Customer-visible. Monitored, accounted, billable.
Ops-visible. Monitored.
Development-visible. Minimally restricted.

At hook points, one can specify either:
A canned (predefined) algorithm name; or
An expression (e.g., an in-line script or an expression in the script language); or
A handler or series of handlers; or
The name of a script In some implementations, scripts used in request processing may:
Inspect the request
Modify the request
Generate a response (including replacing an already generated response)
Provide a short static body
Provide a function to incrementally generate longer response body Provide a function to filter a response body
Inspect an already generated response
Modify an already generated response
Launch any number of helper requests
  Synchronously—wait for and inspect response
  Asynchronously—"fire and forget"
  Cacheable or non-cacheable Configuration variables similarly support script execution, e.g., a variable can have an immediate value, be a parameter reference, or determined by an inline expression. For example, the variable fill_host is shown here with different types of values:

fill_host="origin.customer.com"—immediate value
fill_host=$host1—parameter reference
fill_host="origin".domain($request_host)—inline expression
fill_host=http://origin.customer.com/scripts/pick_origin.lua—reference to a script It should be appreciated that these values are given only by way of example of the type of values. These expressions will preferably be in the script language (e.g., Lua).

Cache Organization

Figure 19:
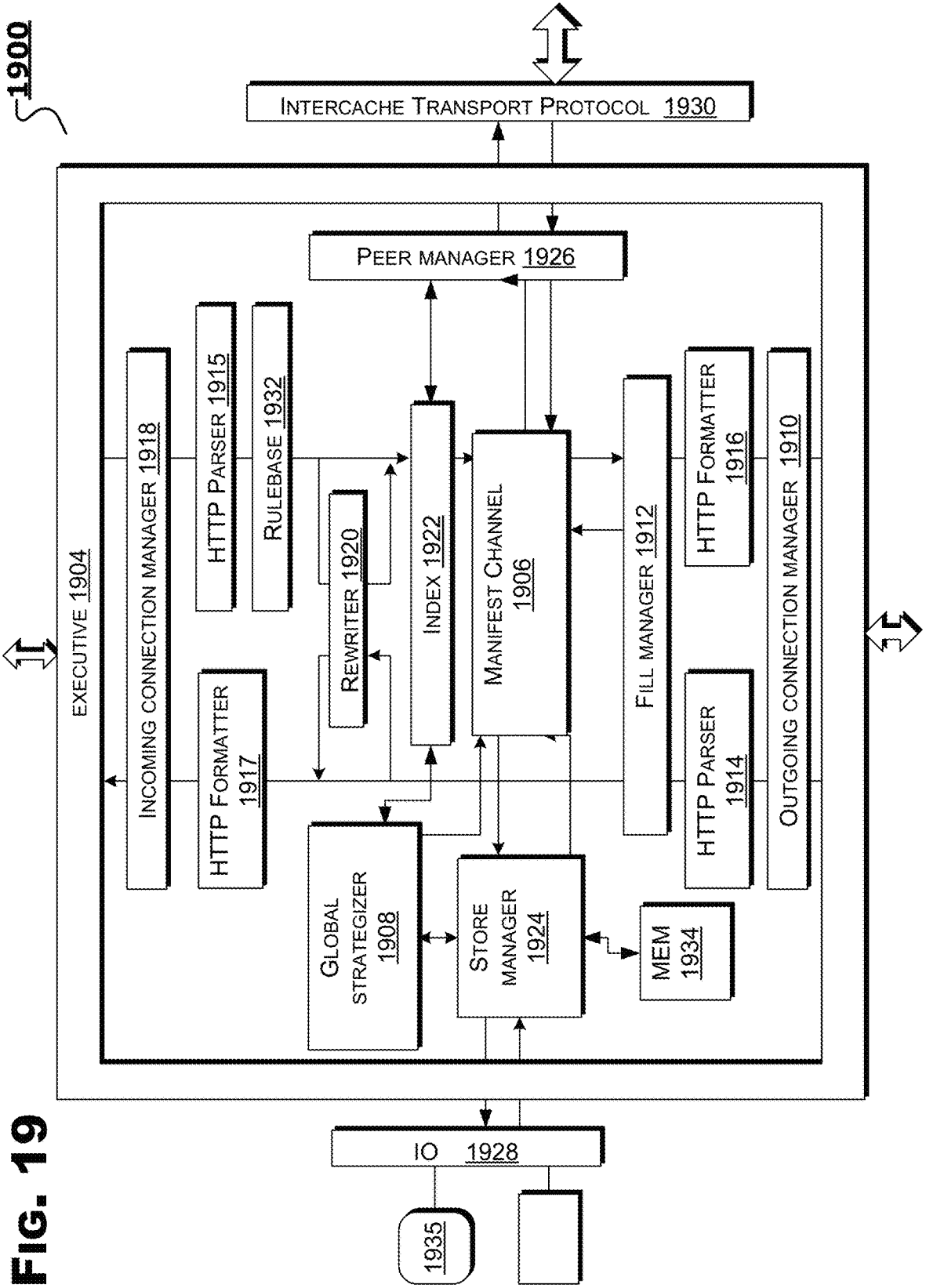
FIG. 19 shows the logical structure of aspects of a typical cache in exemplary CDNs in accordance with an embodiment.

FIG. 19 is a block diagram showing the major functional modules (collectively 1900) in an exemplary cache service. These modules include Executive 1904, manifest channel 1906, global strategizer 1908, outgoing connection manager 1910, fill manager 1912, HTTP parsers 1914, 1915, HTTP formatters 1916, 1917, incoming connection manager 1918, rewriter 1920, index 1922, store manager 1924, peer manager 1926, IO 1928, inter-cache transport protocol 1930, and rulebase 1932. These modules and their operational connectivity are shown by way of example, and It should be appreciated that a cache may include different and/or additional modules, and that the modules in a cache may have different operational connectivity.

The Executive 1904 is the basic executive controlling all activities within the cache. The Executive's responsibility is to maintain a prioritized list of runnable tasks, and execute them in a priority order. A high-priority "system" task repeatedly checks for ready file descriptors, and moves their waiting "user" tasks onto the run list. The Executive may also support abstracting a task or group of tasks as an asynchronous service called a channel, and may provide a clean way for tasks and channels to communicate. Cache subsystems discussed below are implemented as tasks and channels.

When a new client connection is detected on one of the listener file descriptors, the Incoming Connection Manager 1918 assigns a client task to handle it, and coordinates the process of accepting the connection, completing any TLS (Transport Layer Security) handshake, and assigning a priority and connection-level policy. The Incoming Connection Manager 1918 continues to monitor and manage the connection throughout its lifetime.

Although the Incoming Connection Manager 1918 is described here as a single component, it should be appreciated that this is merely one logical depiction of functionality in the cache. E.g., in a present implementation there is a listener task which, after receiving a new connection, runs a sequence of handlers which are configured for that particular listener. Those handlers may apply policies, perform a TLS upgrade if appropriate, etc.

The client task invokes the HTTP Parser 1915 to read data from the connection, locate the message boundaries, and parse the HTTP into a request object with a convenient internal format. Messages may remain in this internal format as long as they are within the cache system (the CDN), even if they are migrated to another cache. It should be appreciated that cache-to-cache messages may be in other formats, e.g., in some cases, messages may be sent from cache-to-cache in their standard text format.

The request object may next be processed by the rulebase 1932, to assign customer-specific handling policies and normalize the URL associated with the request. The policy might indicate, e.g., that the request requires manipulation by a customer-defined script. In that case, the request rewriter 1920 executes the script. In a present implementation a table (the GCO) is used, in conjunction with the apparent target of the request, to decide whether or not it is worth it to continue further processing at all (i.e., whether the request is associated with a valid customer). At this point, the system checks whether there is a programmed sequence of handlers appropriate for that customer. If not, the system retrieves and runs the Customer Configuration Script (CCS), whose function it is to program the sequence of handlers. Then the handlers are run to process the request.

The next step is to determine if the cache has any information about the requested object. The request is presented to a manifest channel which then inspects the request and uses the information it has internally (a manifest) to determine how best to handle the request, including by providing a reference to a cached object, requesting a fill or a refresh, etc. The manifest channel maintains the manifest data and also provides the intelligence to use the manifest data. The URL is looked up in the cache index 1922, which is essentially a database listing the objects already in the cache. The result of the index lookup is either null, or a manifest listing all the data, metadata and ongoing activities that might be relevant in responding to the request.

At this point, the request processing engine has a set of request-specific information, comprising the parsed request, a set of policies for handling the request, and a manifest of pertinent cache information. As noted, a manifest channel 1906 is responsible for determining how to respond to the request. In general, the decision will depend on the request-specific information, the object-specific information, the current state of the machine, the global state of the CDN, and the set of capabilities implemented in the cache. There may be one strategizer instance running for each actively referenced manifest in the cache, and that strategizer handles all clients and activities referencing that manifest. In a current implementation the strategizer is the manifest channel.

The manifest channel 1906 has at its disposal a variety of modules, implementing services, the services including the storage service, fill service and peering service. Other modules may be available for error message generation, authentication, logging, throttling, etc. The role of the strategizer is to orchestrate these services to construct a reply to the request, and preferably to fully process the request (since logging is part of the processing but not necessarily part of the reply).

The manifest channel 1906 contains much of the intelligence in the cache. New capabilities may be added and special handling provided in the manifest channel 1906 for new classes of resources. For this reason, the architecture is designed to provide clean separation of mechanism and policy. Machinery/mechanisms implementing individual services are encapsulated into separate modules, and the manifest channel 1906 essentially acts as a conductor, supervising the construction of a response.

The most common scenario is expected to be a simple cache hit, where the cache has an easily accessible copy of the requested object. In this case, the manifest channel 1906 invokes the storage service (store manager 1924) to retrieve the object, which may be in memory (generally denoted 1934), or on solid-state or hard disk (generally denoted 1935). In the process, the manifest channel 1906 may also provide guidance to the storage service (store manager 1924) on what type of future access is expected, so that the object can be optimally placed in the appropriate type of store.

Another common scenario involves a dynamically-generated response, such as a response to a control command, a statistics report, or an error message.

When a request is received, an initial sequence of handlers is assembled to handle the request (based on the target of the request and the listener it came in on). The handlers either generate a response because the request is directed at them, add some value by performing a request or response manipulation, or take themselves out of that instance of the sequence because they are not relevant to the request at hand. A handler may be a script handler, and that script can perform any number of functions (as outlined previously) to generate a response or to manipulate a request or response. The "manifest channel" is one component used by a series of handlers, but it is concerned with dealing with cacheable resources. It is generally not involved in determining whether, e.g., pre-authentication needs to be performed (which could be handled by a handler in the cli-req hook or similar).

As noted earlier, an important aspect of the architecture is that essentially all data items, including machine configuration, customer policies, logs, billing data and statistics, are simply web objects, which appear in the index and are retrieved through the strategizer just like customer web resources. As critical resources, they do have policies engaging specific authentication, persistence and prefilling services, but the machinery of these services is also available to ordinary resources when necessary.

A feature of Unix file I/O is that read and write operations on standard files are synchronous, and will block the calling thread if the data needs to be physically retrieved from or written to disk. Since the cache likely has plenty of other work to do while disks are being accessed, the IO library 1928 provides a way for the cache to hand off disk I/O to a separate thread that can block without holding up the cache activities. In addition, the IO library 1928 provides a richer, more efficient API to the physical disks than the normal open/read/write/close interface.

If the request is not a cache hit, the manifest channel 1906 will typically invoke the peering service (peer manager 1926) to see if a nearby cache has the requested object. Since other services may also need to communicate with neighboring caches, and it is inefficient to open or operate multiple TCP connections to multiple neighbors, an inter-cache transport protocol module 1930 multiplexes various types of inter-cache communication over a single general-purpose link. For instance, the peering service might offer to migrate the client connection to a neighbor that has the resource; the strategizer could choose to use this option, in which case it would invoke the migration service, which would use the inter-cache transport protocol to transfer the client connection state. As before, it should be appreciated that one or more handlers perform this function.

If the request is not a hit, or internally serviced or migrated, the resource needs to be fetched via the network, and the fill service (fill manager 1912) is invoked. The fill manager's role is to balance and prioritize the outgoing network activity between all strategizers, and operate protocol handlers for the supported set of protocols. In particular, for HTTP fills, the strategizer will create an HTTP fill request in internal format, and the fill service will format that request using the HTTP formatter 1916, send it to the appropriate target host, and manage the data transfer. For efficiency, connections are created and managed by an outgoing connection manager 1910, which maintains a pool of connections to frequently accessed hosts, tracks responsiveness, implements traffic shaping, etc. In a current implementation, the manifest channel creates the fill request.

Some fill operations will be peer fills from other caches, and these likely constitute the main class of inter-cache communication not using the Inter-cache Transport Protocol. Such fills may use the internal message format and bypass unnecessary HTTP formatting and parsing steps.

Fill responses arriving from the network are handed back to the manifest channel 1906, which decides whether to cache the object, and how to process it before replying to waiting clients.

It should be appreciated that the manifest channel 1906 would not invoke a "reply rewriter." Rather, such a rewriter (if any) would exist at one of the hook points on the response path, e.g., client-resp, and would be used regardless of whether a manifest channel was involved in generating the response. Such a rewriter may inspect the response to determine if it came from cache, however it is not up to the manifest channel to invoke this rewriter. The manifest channel would not generally be involved in a request which was a priori known to be non-cacheable. On the other hand, a "reply rewriter" may well be involved in such a request.

As on the input path, the manifest channel 1906 invokes appropriate services to do the actual work, and supports optional processing by a reply rewriter 1920 just prior to final formatting and output to the client. Those of ordinary skill in the art will realize and understand, upon reading this description, that this type of processing (final formatting, etc.) is performed by one or more handlers on the way "out" of the processing sequence.

The manifest channel 1906 is responsible for handling a single URL, and optimizing the experience of the clients currently requesting the resource associated with that URL. The global strategizer 1908 is responsible for optimizing the overall cache behavior, and the behavior of the CDN as a whole. The global strategizer 1908 comprises a set of permanently running background tasks and services that monitor and manage the cache, performing operations such as discarding old objects, prefetching latency-sensitive objects, and enforcing quotas. Like the manifest channel, global strategizer is preferably architected to cleanly separate policy and mechanisms, thereby allowing for future enhancement and adjustment.

The global strategizer 1908 influences the manifest channel 1906 by adjusting a variety of modes and levels which the manifest channels consult when making their decisions. In turn, the global strategizer monitors the effects of the mode and level changes, and adjusts them as necessary to achieve the desired global conditions. Thus, the global strategizer is the module in charge of the various feedback loops in the cache. For instance, by adjusting the maximum allowed object age, it can control the amount of data in the cache, and by adjusting the maximum size of objects allowed in the memory store, it can influence the amount of memory in use. In some implementations there may be no global strategizer and the storage system will manage its own resources, etc.

Implementations and embodiments of various components are described in greater detail below. Those skilled in the art will realize and understand, upon reading this description, that the details provided below are exemplary and are not intended to limit the scope of the invention.

The Manifest Channel 1906

The manifest channel 1906 handles issues related to a single resource. Its job is to deliver an optimal response to each client based on various factors such as, e.g., request details, policy settings, cache contents, state of devices, peer caches, origin server, network, etc. The manifest channel 1906 consists of an extensible collection of efficient mechanisms, e.g., for retrieval from disk; connection migration; filling from origin; checking peers, etc. A control module orchestrates the mechanisms, using canned algorithms for common situations and providing hooks for introducing variations to these canned algorithms. The manifest channel 1906 may be completely scriptable, if necessary. The manifest channel 1906 may provide clean separation of mechanism and policy and may be more general than a pipeline. In a present implementation, the manifest channel 1906 is sequence (a pipeline of sorts), although each of the steps of the sequence may be arbitrarily intelligent (including being a script). In a present implementation, the manifest channel is part of the storage library and is used by a "cache handler" which is present in the process sequence. In this particular implementation the manifest channel itself is not implemented as a sequence.

At any moment, there is one instance of the manifest channel 1906 running for each manifest being actively accessed. The role of the manifest channel is to coordinate all activities associated with the manifest, ensure that each client requesting the object is sent an individualized response meeting the policy constraints, and that this is done as efficiently as possible and without violating other constraints imposed by the global strategizer. Essentially the role of the manifest channel is to deal with the caching of resources, construction of fill requests, coordination of client requests with available responses, etc. The manifest channel preferably implements RFC2616-compliant caching logic. (RFC2616 refers to Network Working Group, Request for Comments 2616, Hypertext Transfer Protocol—HTTP/1.1, the entire contents of which are fully incorporated herein by reference for all purposes).

Other Handlers

Various handlers (e.g., in a customer-specific sequence) may include mechanisms with associated logic to perform some or all of the following (this is essentially a potential list of "handlers."). These handlers may or may not include a "cache handler" which uses the manifest channel.

| Mechanism | Functionality |
|---|---|
| Authentication | Performs authentication handshakes with the client and queries internal databases or external servers as necessary for permission to serve the resource to the client. These are typically synchronous operations. Internal databases are cached web objects, and may also need to be refreshed periodically. |
| Referrer Checking | Handles cases where the reply depends on the HTTP referrer header. General functions in the rulebase and rewriter will classify the referrer, and this module implements the consequences of that classification (this is essentially an example of authentication) |
| Browser Identification | Handles cases where the reply depends on the HTTP User-Agent header and potentially on other headers. |
| Hot Store | Allow objects to be identified as high-popularity and worth keeping in fast storage such as application memory, the OS page cache or solid-state disks, and for communicating that fact to the storage manager. |
| Cold Store | Allow objects to be identified as low-popularity and suitable for archiving to more extensive but higher latency un-indexed mass storage. |
| Peering | Checking for information about which peers are likely to have an object, and for directly querying peers via the peering service. |
| Migration | Deciding when to migrate a connection to a neighboring cache, and for marshaling the state to be transferred. |
| Connection Splicing | Handling non-cacheable traffic such as PUT requests, by delegating further interaction with the client to the operating system, so that it can efficiently relay raw data between the client and the remote server. Also monitor the progress of such relays for logging and diagnostic purposes. |
| Longtail | Dealing with resources making up working sets that exceed the size of the cache. The module includes counters for determining the popularity of such resources, and support for special types of filling and redirection that allow the CDN to handle them efficiently. |
| Fill Target Selection | Support for filling resources in a flexible way, e.g., from load balanced clusters, from various locations, or with a variety of protocols. |
| Range | Dealing with range requests, for deciding whether it is worth fetching the entire object, and for formatting HTTP Partial Content (206) replies. |
| Partial Object Handling | Assembling separately-fetched parts of the same object into a complete object, either logically or physically. |
| Error Message Construction | Formatting of informative and appropriate HTTP error messages for the client when the request fails in some way. |
| Redirection | Efficiently redirecting clients to other locations. |
| Command | Acting upon requests to the command, monitoring and logging |

-continued

| Mechanism | Functionality |
|---|---|
| Handling | subsystems, and for constructing a variety of internally generated responses. |
| Vary | Content negotiation is defined in Network Working Group, Request for Comments 2616, Hypertext Transfer Protocol - HTTP/1.1 (hereinafter "RFC2616"), the entire contents of which are fully incorporated herein by reference for all purposes.<br>The Vary field value indicates the set of request-header fields that fully determines, while the response is fresh, whether a cache is permitted to use the response to reply to a subsequent request without revalidation. For uncacheable or stale responses, the Vary field value advises the user agent about the criteria that were used to select the representation. A Vary field value of "*" implies that a cache cannot determine from the request headers of a subsequent request whether this response is the appropriate representation. RFC2616 section 13.6 describes the use of the Vary header field by caches. According to RFC2616, an HTTP/1.1 server should include a Vary header field with any cacheable response that is subject to server-driven negotiation. Doing so allows a cache to properly interpret future requests on that resource and informs the user agent about the presence of negotiation on that resource. According to RFC2616, a server may include a Vary header field with a non-cacheable response that is subject to server-driven negotiation, since this might provide the user agent with useful information about the dimensions over which the response varies at the time of the response. According to RFC2616, a Vary field value consisting of a list of field-names signals that the representation selected for the response may be based, at least in part, on a selection algorithm which considers only the listed request-header field values in selecting the most appropriate representation. According to RFC2616, a cache may assume that the same selection will be made for future requests with the same values for the listed field names, for the duration of time for which the response is fresh. The field-names given are not limited to the set of standard request-header fields defined by the RFC2616 specification. Field names are case-insensitive and, according to RFC2616, a Vary field value of "*" signals that unspecified parameters not limited to the request-headers (e.g., the network address of the client), play a role in the selection of the response representation. According to RFC2616, the "*" value must not be generated by a proxy server; it may only be generated by an origin server.<br>In some cases it may be desirable to have a communication channel between the CDN and the origin server, in order to ingest policy information about variant selection performed at the origin so that the same can be directly replicated within the CDN rather than being inferred from a series of responses from the origin. |
| Content Encoding | Content negotiation as defined in RFC2616. |
| Transforms | Transforming (distinct from content negotiation), includes, e.g., video transmux, rewrapping, image conversion/compression etc. |
| Logging | Controlling the amount and type of logging information generated by the request processing, and for saving that information in internally generated objects for later retrieval by special HTTP requests and/or performing remote logging. |
| Tracing | Enabling diagnostic tracing of the processing, either globally or for a specifiable subset of requests or resources. |
| Billing | Collecting a variety of billing-related information while the request is being processed. |
| Throttling | Allow certain types of actions to be delayed based on advice from the global strategizer. |
| Keepalive | Checking various factors that influence the decision to allow connections to persist, and methods for conveying or delegating the final decision to the connection manager. |
| Transfer Encoding | Deciding what transfer encoding to apply, and for applying it. |
| Shaping | Deciding on what bandwidth to allocate to a network activity, and for conveying this information to the connection managers. |
| Prefetch | Allows a request for one resource to trigger prefetching of other resources, from disk, peers or the origin. |
| Refresh | Implementation of the HTTP "GET If-Modified-Since" etc., and "304 Not Modified" mechanism, as well as the background refresh feature. |

| Mechanism | Functionality |
|---|---|
| Retry and Failover | Allow failed fills to be retried from the same or a different fill target. |
| Cacheability | Decides if, where and for how long an object should be cached by the Storage Service. |
| Script execution | Execute requests and replies that are CDN internal scripts. |
| Replacement | Decide which objects in the manifest are no longer sufficiently useful and can be destroyed. |

Global Strategizer 1908

The global strategizer 1908 is the subsystem responsible for overseeing the operation of the cache as a whole, and the cache's relationship to other parts of the CDN. The global strategizer is preferably running at all times, and keeps track of extrinsic parameters such as the amount of storage used, the number of clients, etc. In turn, it controls operation of the cache by adjusting intrinsic parameters like the LRU (Least Recently Used) Aggression and the listener poll and accept rates.

Invalidation.

The global strategizer is responsible for fetching, preferably roughly once per second, updates to the primary invalidation journal from the CDN control mechanism, fetching updates to any secondary journals that the primary indicates have changed, and invalidating the resources that the secondary journals indicate have been invalidated. It should be appreciated that the control mechanism for customer invalidations may not be the same control mechanism as used for configuration data (and invalidations associated with it). Different groups of customers may be put onto different such control mechanisms for invalidation. Invalidation is discussed in greater detail separately.

Automatic Refresh.

This mechanism allows selected resources to be refreshed even when they are not being requested externally, so that they are always up to date. The invalidation journal mechanism is essentially a special case of this.

Load Metrics.

The global strategizer is in charge of measuring the total load on the machine, and responding to requests for load status.

Platform Configuration and Control.

Mechanism to act upon configuration information from the control mechanism.

Listener and IO Event Rate Control.

Controls the rate at which new connections are accepted, and the rate at which file descriptors are polled for readiness.

As with the other components/mechanisms described herein, the functions described here are not necessarily performed by a single entity or mechanism but by multiple tasks or sequences. However, those of ordinary skill in the art will realize and understand, upon reading this description, that the set of tasks which perform these functions could be considered as making up the "global strategizer."

Control Mechanism Data

Figure 20:
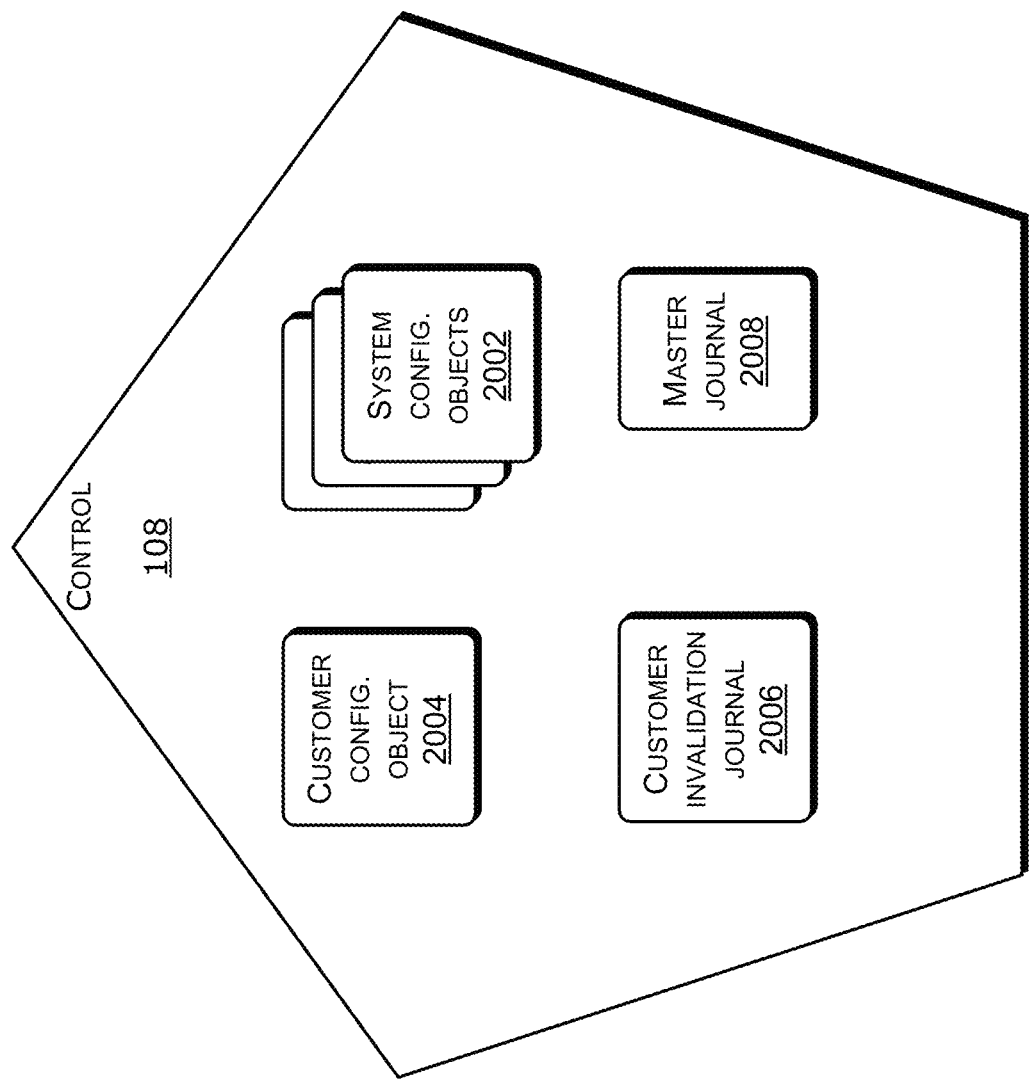
FIGS. 20 to 21 depict various tables and databases used by a CDN in accordance with an embodiment.
Figure 21:
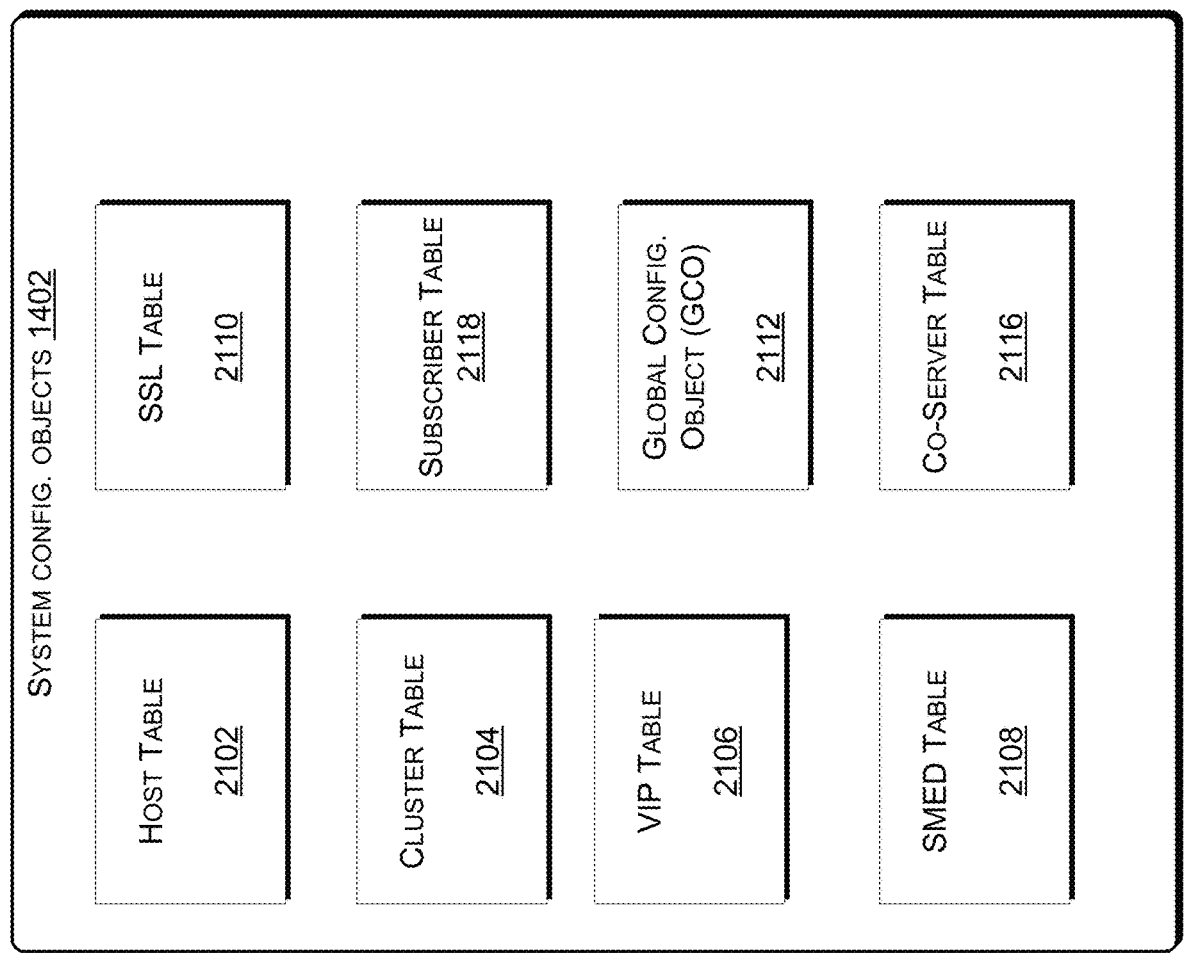

As noted above, the control mechanism 108 maintains the authoritative database of the current CDN configuration and of information needed to operate the CDN. The database includes various interconnected tables that are used to describe and/or manage the CDN. With reference to FIGS. 20-21, the database includes system configuration objects 2002, customer configuration objects 2004, a customer invalidation journal 2006, and a master journal 2008. Those of ordinary skill in the art will realize and understand, upon reading this description, that different and/or other objects may be maintained in the database.

In a presently preferred implementation, the control mechanism 108 maintains and stores some or all of the following information (as part of the system configuration objects 2002 or customer configuration objects 2004), some of which may be used for rendezvous, and some of which is used by cache machines Global Configuration Object (GCO) (2112)

The GCO is described in connection with request response processing.

Customer Configuration Scripts (CCSs)

Customer Configuration Scripts are described in connection with request response processing.

HostTable (2102)

The HostTable 2102 is a list of all machines in the network. This list is maintained in a table (HostTable) that includes, for each machine, its network address (IP address), and preferably its bandwidth capacity.

The HostTable preferably stores a Bandwidth Capacity value (BWcap). A BWCap value is also stored in the ClusterTable, described below. An actual value for Bandwidth Capacity value is derived from these two values according to the following table in which clusterBW represents the bandwidth capacity value set on the cluster, hostBW represents the bandwidth capacity value set on the cache and nhosts represents the number of machines in the cluster:

| clusterBW | HostBW | BandwidthCapacity |
|---|---|---|
| 0 | 0 | 0 |
| >0 | 0 | clusterBW/nhosts |
| 0 | >0 | hostBW |
| >0 | >0 | min(clusterBW/nhosts, hostBW) |

While it should be sufficient to use just one of these tables to set BandwidthCapacity, as described here, this is not always the correct approach. Specifically, the calculated BandwidthCapacity variable is preferably not used by the server selector (SS) mechanism (of the rendezvous mechanism), rather the server selector directly uses the value from the ClusterTable for shedding based on cluster-total bandwidth, and the value from the HostTable for shedding based on per-host bandwidth. The BandwidthCapacity is set in both tables, since the HostTable entry tracks the uplink from host to switch whilst the BandwidthCapacity at the cluster is the uplink from switch into the network fabric.

The reason that the server selector does not use the calculated per-host BandwidthCapacity is that it is generally wrong for purposes of controlling shedding to avoid saturating a per-host uplink. That is, if BandwidthCapacity is set only in the ClusterTable, then the system calculates a per-host value as clusterBW/nhosts (see above table). But e.g., if there are twenty machines sharing a 10G uplink, that value is 0.5G, which is too small: each machine is preferably, but not necessarily, able to individually burst to 1G (or higher, depending on the connection from each server to the switch) before causing shedding (assuming the overall cluster uplink is not saturated, i.e., not all machines using 1G at the same time). Alternatively, e.g., if there are five machines sharing a 10G uplink, the system would calculate 2G, which would be too large if the individual machines only have a 1G link.

Therefore the BWcap values should generally be set both in the HostTable and ClusterTable.

As there is preferably an entry in the HostTable for every machine in the network, non content-serving machines should have their BWCap value set to zero.

In an embodiment, each type of machine at a location is preferably grouped into one or more clusters, with a corresponding entry in the ClusterTable (2104).

SMED Table (2108)

The SMED Table 2108 is a list of "measurement equivalent" caches in a table (SMEDTable). In practice, this list equates to a rack of hardware; i.e., the set of machines plugged into a single router. Each entry includes one or more clusters.

Cluster Table (2104)

The Cluster Table 2104 describes each cluster. Recall that a cluster is not the same as a site (all of the machines that are plugged into a given switch), but the subset of those machines that share the same set of VIPs. As such, there may be multiple ClusterTable entries for a given site. The Cluster Table stores information about the region(s) that each cluster is in.

Each cluster contains a number of HostTable entries, one for each physical machine, and one or more VIPs (each of which is represented by an entry in the VIPTable).

In an embodiment, all machines on the network are preferably represented in this ClusterTable (and directly in the HostTable). To be able to identify which are content serving machines, there is a flavor column in the ClusterTable.

As with the HostTable, non content serving clusters should have BWCap set to zero. Having these machines represented in these tables allow for infrastructure components such as the measurement components to make use of processes on non-content serving machines VIP Table 2106

A VIP is the locally load-balanced address, handed out as the target of rendezvous. If this VIP is used for secure traffic, it contains a reference to a node in the SSLTable.

As such, there is one entry for each VIP address in the network. Non content-serving clusters do not need to have VIPs defined.

SSL Table 2110

An entry in the SSLTable describes one "secure" property; it identifies the mapping between super-name and certificate.

Flavors Table

The Flavors Table 1912 describes characteristics that are shared by all machines of a certain flavor (e.g., content serving). The term "flavor" is used here to distinguish between machines that perform different functions within the CDN (e.g., content serving, etc.).

CoServers Table 2116

As used herein, a coserver, with respect to a particular resource, is an origin server—the authoritative source of the particular resource. The CoServers Table contains descriptions of all CoServers (origin servers) and Alias Nodes defined in the system. This table holds information about all customer origin servers registered with the CDN. This table is used to associate incoming requests to these entries, and describes how, and from where, the resource needed to satisfy that request is to be retrieved. Note that as CDN objects are also handled by the CDN, some CDN servers may function, at times, as coservers.

In some implementations, alias Nodes may be associated with a Base CoServer, and provide a way to separately report and log traffic associated with a particular alias attached to a CoServer without needing to cache the same resource multiple times.

The CoServers table preferably includes the following fields:

| Field | Description |
| --- | --- |
| IsActive | Flag indicating whether or not the entry is considered to be active. |
| SubID | A numerical subscriber ID number; a key into the Subscriber Table (1918). |
| CosID | The unique ID number associated with this entry (this value is also a key into this table). |
| Port | The port number over which the origin server associated with this entry is preferably, but not necessarily, contacted for cache fill purposes. |
| Alt WebRoot | The Alternate Web Root, the location within the content tree of the origin server where the 'root' associated with this property is configured to be. That is, when performing a cache fill the value of this is prepended to the incoming URI path on the request (see Extended Aliases). Defaults to '/' (although any trailing '/' on this value is removed during the conversion process, making the default effectively ''). |
| Hostname | The name of the origin server associated with this entry. Can be specified as either a FQDN or as an IP address. |
| Protocol | Which protocol to use when contacting the origin server associated with this entry. In presently preferred implementation, options are 'HTTP', 'HTTPS' and 'FTP'. |
| AliasList | A list of aliases associated with this entry. An incoming request is compared to the list of these aliases when determining which entry is associated with that request. As such, each alias needs to be unique, and so these form an additional key. |

Subscriber Table 2118

The Subscriber Table 2118 includes information about subscribers to the CDN (e.g., the CDN's customers).

As noted above, a control mechanism may maintain and store only some of the tables and other information listed above. In some implementations some of the tables or information may be combined or omitted. A presently preferred implementation includes a host configuration file for each host (which defines listeners, etc.), a GCO, and a CCS for each property.

Aliases

An Alias is a name by which a CoServer is known to the network, and is used to identify that CoServer during request processing. The term alias can refer to both the format of this identifier, as well as certain attributes of the identifier. A list of ways that the term is used follows:

| Term | Meaning |
| --- | --- |
| Simple Alias | a FQDN (Fully Qualified Domain Name); the value of the Host: provided to the CDN by the client, e.g., fp.example.com |
| Extended | an alias may include one or more top-level directories, in which case |

| Term | Meaning |
| --- | --- |
| Alias | a match requires that both the presented Host: header and initial path element match the alias, e.g., fp.example.com/dir. This allows behavior to be specified for different top-level directories of URLs presented to the CDN; for instance, a particular directory could be filled from a different origin server. |
| Wildcard Alias | the initial element of the hostname portion of an alias can be a '*' in which case it will match any subdomains. e.g., *.example.com will match fp.example.com and fp.subdir.example.com, as well as the unadorned example.com.<br>Note: that a Wildcard Alias may also be an Extended Alias; e.g., *.example.com/dir.<br>The wildcard character has to be a complete hostname element; i.e., it is not possible to have *fp.example.com.<br>Concrete aliases may exist alongside wildcard ones preferably take precedence over them. |
| Request Processing | See description above.<br>The complete set of active aliases (i.e., those associated with active CoServers), be they Simple or Extended, are used to populate a lookup table (e.g., a hash table) within the agents of the network. This table provides a mapping from each alias to the CoServer ID associated with that alias. When a request is received, the first path element of the request is joined to the value of the Host: header, and a lookup into this hash table performed. If no match is found, a second lookup(s) is(are) performed of just the Host: If a match is then found, processing completes since the appropriate CoServer has then been found. The initial lookup is preferably done with the Host: header only, and if an extended alias exists, a flag is set that indicates so and then a second lookup performed. If no match is found, then a second hash table is inspected, which contains down cased versions of the directory element of each extended alias (the Host: value always being processed down case). If a match is then found, and this CoServer is flagged as using case insensitive paths, then a match is declared, and processing completes. Preferred implementations should start with just the hostname; look for exact match and if none found then deal with wildcard match. Once a match is found, the start on paths to find the best match If however no match is yet found, a search for a possible Wildcard Alias match then begins. The most significant two hostname elements (e.g., example.com) are looked for in another hash table; if an entry there exists, then the next hostname element is added and another check performed. This continues until an entry marked with an hasWildcard flag is set, indicating that a matching Wildcard Alias exists.<br>If the matching entry is marked as having a directory extension, then a check of the top-level path element from the URL is then made, similar to the processing for a normal Extended Alias. If no such match is found, then a match on the Wildcard Alias is only declared if a Simple Wildcard Alias is defined. |

Request-Response Processing

FIG. 19 showed the logical structure of a cache and its various components. The processing performed by some or all of these components may be performed by sequencers. A sequencer uses a sequence control object which is made up of an ordered list of handlers. In a presently preferred implementation, a sequencer is an Executive task (preferably a channel), and the handlers associated with a sequencer (task) are implemented by events. It is necessary for the task to be an Executive channel so that it can use the submit (potentially asynchronous) model.

Request-Response Processing Flow

Figure 22B:
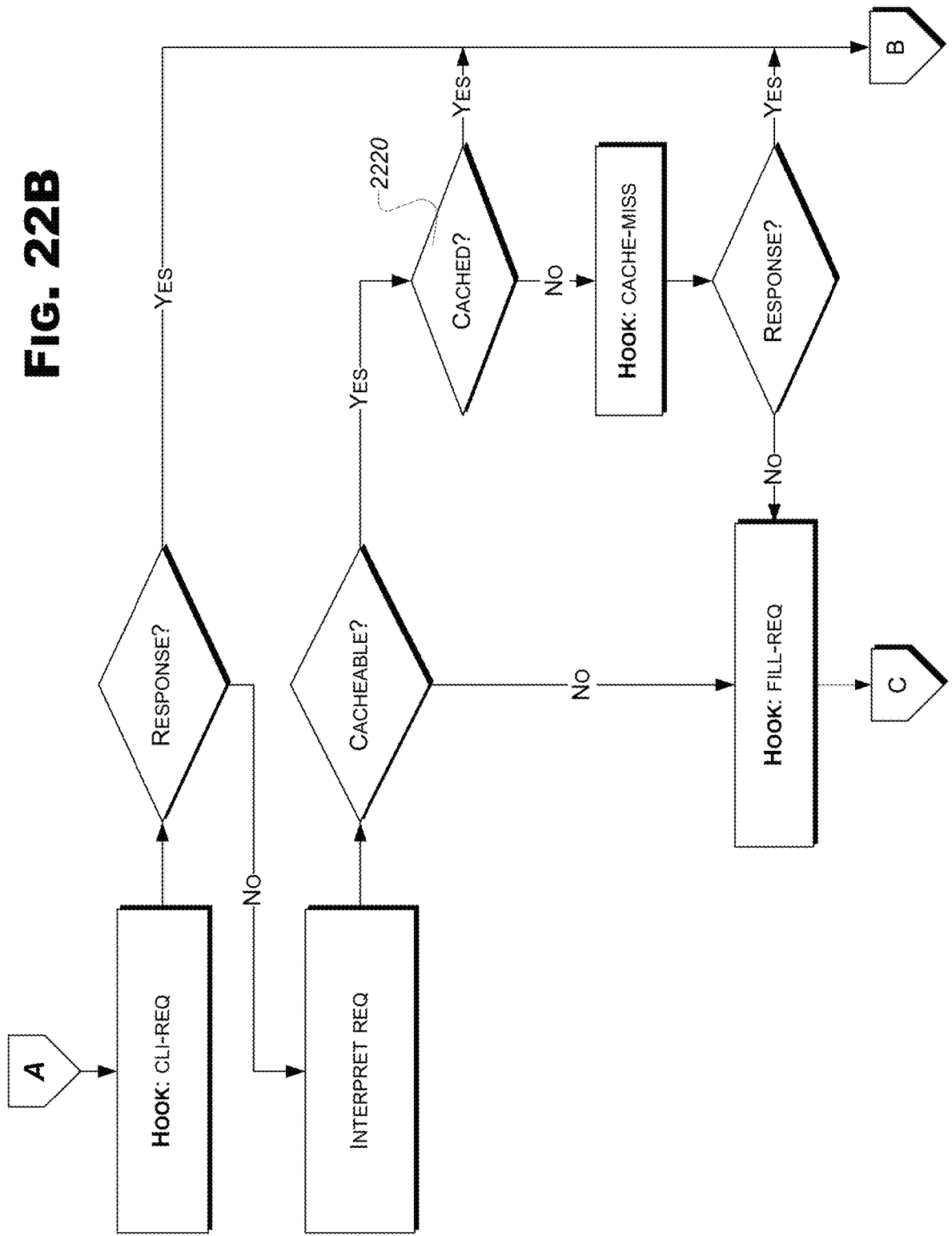
Figure 22C:
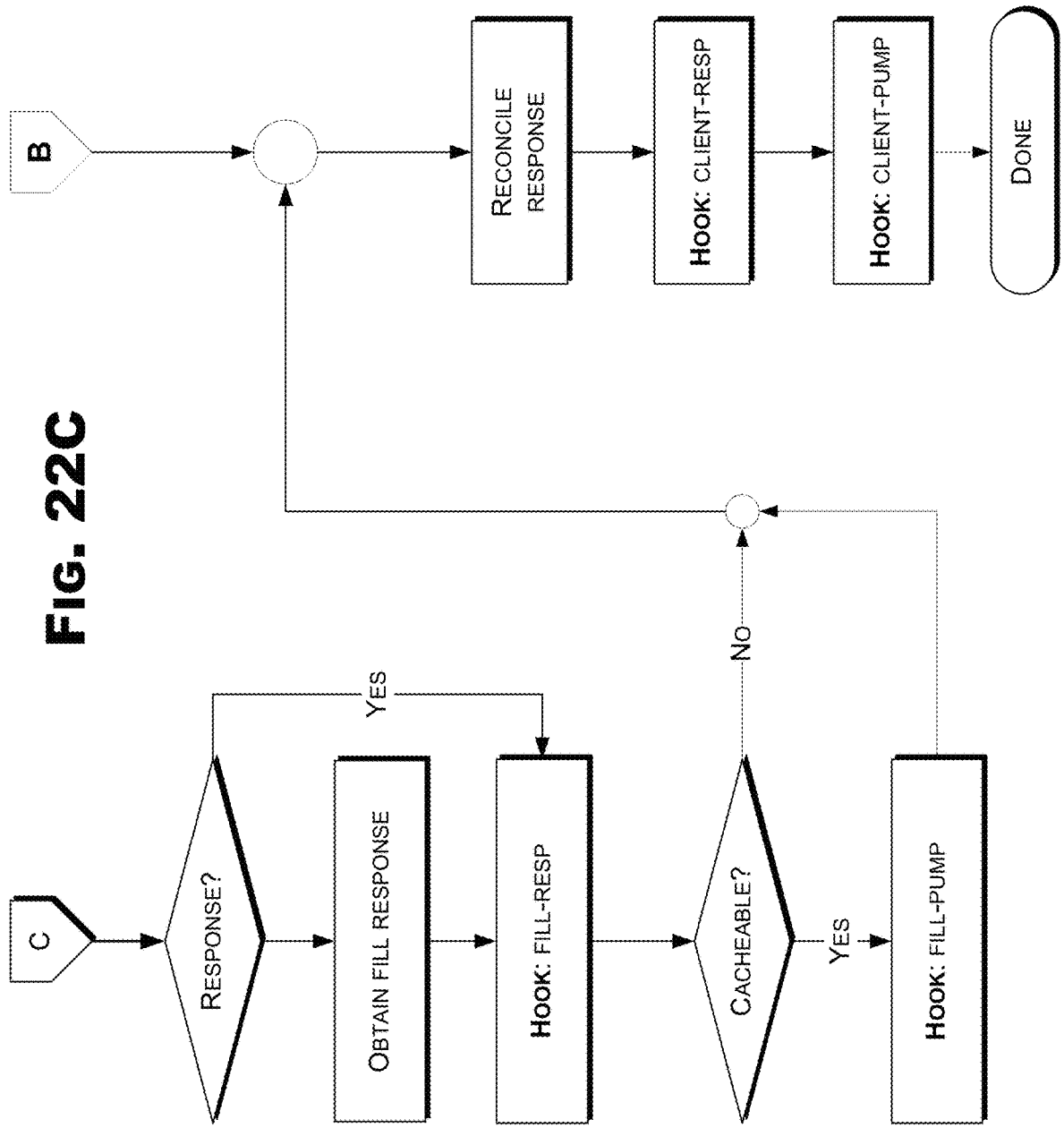

Request-response processing flow is described now with reference to FIGS. 22A-22C. For the purposes of this description, assume that the processing is being handled by a cache server such as server 1102 (FIG. 15) in a CDN.

The cache server obtains data (an incoming connection) at a port and parses sufficient incoming data (at 2202) to determine that the data correspond to an appropriate type of request (e.g., HTTP). The incoming data will include sufficient information to allow the cache to determine whether or not it can serve the requested resource. E.g., in the case of an HTTP request, the incoming data will include HTTP header information, including (a version of) the URL that was used to make the request.

In order to determine whether or not it can serve the request, the cache server needs to compare information associated with the request with information in the global configuration object (GCO). The cache server therefore needs to determine whether it has a valid GCO (at 2204). If necessary, the GCO is retrieved by the cache from the control mechanism (at 2206). If the current GCO is valid then it can be used, otherwise the GCO must be validated or a new one obtained. It should be appreciated that if the cache is unable to obtain a valid GCO after some predetermined number of tries then it should not serve the requested content and should fail (and take itself out of rotation for selection until it is able to retrieve a valid GCO). It should also be noted that the GCO is likely considered a candidate for pre-fetch.

In a current implementation the GCO acts as a "white list" carrying valid protocols, hostnames and path prefixes. In some cases, for certain reseller properties, customer identification can also be performed based on the VIP on which the request came in. Such a technique may also be used to provide a simple transparent proxy implementation. The GCO maps the protocol, hostname and path prefix to a customer identifier (Customer ID). The following table shows an example GCO (the numbers in the left column are provided for purposes of description, and are not intended to be limiting in any way.)

|    | String | Customer ID |
|----|--------|-------------|
| 1  | http://customer1.com/ | 1.1 |
| 2  | http://customer2.com/ | 2.1 |
| 3  | http://*.customer3.com/ | 3.1 |
| 4  | http://*.special.images.customer3.com/ | 3.2 |
| 5  | http://*.images.customer3.com | 3.3 |
| 6  | http://images.customer3.com | 3.4 |
| 7  | http://customer4.com/ | 4.1 |
| 8  | http://customer4.com/topd1/ | 4.2 |
| 9  | http://customer4.com/topd1/subd/ | 4.3 |
| 10 | http://customer4.com/topd2/ | 4.3 |
| 11 | http://customer5.com/ | 5.1 |
| 12 | https://customer5.com/ | 5.2 |
| 13 | *://customer6.com/ | 6.1 |
| 14 | http://customer7.com/ | 7.1 |
| 15 | http://customer7.com:8080/ | 7.2 |

The string in a GCO is some or all of a URL. Wildcards may be used, but are limited. Recall that (for the purposes of this description) a URL has the form:
   <<protocol>>://<<domain>>/<<path>>
where <<protocol>> may be, e.g., "http", "https", "ftp", and so on; <<domain>> is a fully qualified domain name (FQDN) and path specifies a location. A formal URL description is given in RFC 1738, Uniform Resource Locators (URL), by T. Berners-Lee et al., URIs are described in Network Working Group RFC 2396, "Uniform Resource Identifiers (URI): Generic Syntax," by T. Berners-Lee et al., August, 1998, the entire contents of each of which are fully incorporated herein for all purposes.

The "protocol" may be replaced with a label for the listener on which the request came in. The reason is that a given customer may have a dedicated SSL listener which presents their server certificate, so the cache will only want to satisfy requests for that particular customer on that listener. In that case, the GCO may have, e.g., "https-CUST" (e.g., if CUST is a customer with a customer SSL VIP) as the "protocol."

In the GCO, the protocol may be replaced by an "*" (a wildcard character), indicating all supported protocols map to the same Customer ID (see, e.g. no. 13 in the table above). A wildcard character (e.g.,"*") may also be used as part of the first component of the hostname (e.g., nos. 3, 4, 5). Thus, "http://a1.customer3.com" and "http://a2.customer3.com" will both match entry number 3 in the table above. In order to simplify the rules for resolving ambiguities, in some implementations wildcards may not be used anywhere else and may be the entire first component of the hostname.

Having completed the raw parse (at 2202), the cache knows the URL that was used to make the request.

Once the cache has a valid GCO it tries to find a match for the input URL in the GCO (at 2208). Preferably a "Best match wins" strategy is used. The hostname is checked first, and an exact match wins, otherwise, a wildcard match is used with greatest number of literal matches wins. For example, for customer3.com: the string "special.images.customer3.com" maps to 3.2 (more literal matches than 3.3); images.customer3.com maps to 3.4 (exact match). Next the port and protocol are looked up, then, longest path prefix wins.

The flow chart in FIGS. 22A-22C shows a potential loop from the GCO-Exception hook if no response is generated. To prevent a loop from occurring the system may only try the GCO lookup a limited number of times, e.g., up to two times. The point of the GCO-Exception hook is to allow inspection/correction of the request such that it can be found in the GCO. However, the system preferably only gets one shot at correction.

Each customer may have corresponding scripts (sequences) that are to be used to process that customer's requests. These Customer Configuration Scripts (CCSs) are associated with the customer ids, and, if the request (the URL) relates to a valid customer (at 2210) (based on the lookup in the GCO), then processing continues to determine (at 2212) whether there are CCS (Customer Configuration Scripts) corresponding to that customer. The CCS, if present, is checked for validity (at 2214) and a new CCS is fetched (from the control mechanism) if needed (at 2216). As noted previously, the CCS is used to assemble sequences, which are then cached and used until they become invalid (due, e.g., to a new CCS being retrieved). It should be appreciated that scripts and sequences are not the same thing, although as mentioned previously, a particular handler may invoke a script to perform its function.

In presently preferred implementation the CCS is a Lua script retrieved from the Control mechanism. The name of the script may be based on the customer's ID, e.g., for Customer ID 4.2 the script may be obtained at: https://core.fp.net/ccs/ccs-4.2.luac The script sets up customer-specific subsequences at various hook points in the main processing sequence. Results of this setup are preferably cached, and the CCS is not run on every request. It is re-run if the script is reloaded or if conditions change. For example, if results of the script are cached persistently, then agent revision could change. The compiled script is an object consumed by the caches, but the script itself is generated from customer configuration description in a database.

Once the CCS is configured (loaded and validated) (at 2218), processing continues (FIG. 22B) with a hook (denoted "cli-req"—client request) to handle any corresponding custom processing. That is, "cli-req" is a hook point where a subsequence of customer-specific handlers (which may include a script) is inserted. As an example, suppose that a certain customer requires:
   Set www.customer1.com as canonical hostname
   Strip sessionid parameter from all query strings
These actions may be taken in cli-req (client request) hook, for which exemplary CCS source would be:
   hook["cli-req"].add("set-host('www.customer1.com')")
   hook["cli-req"].add("strip-query('sessionid')")
where both set-host and strip-query are simple one-shot handlers, inserted into a larger sequence.

As another example, suppose the customer has the same client-side requirements as above, but also wants to set the fill target to be origin.customer1.com
   The corresponding CCS source would be:
   hook["cli-req"].add("set-host('www.customer1.com')")
   hook["cli-req"].add("strip-query('sessionid')")
   hook["fill-req"].add("set-target('origin.customer1.com')")
where set-host, strip-query, and set-target are simple one-shot handlers, inserted into a larger sequence.

This CCS adds an action to the fill-req (fill request) hook.

As another example of a configuration script, suppose that a customer requires proxy authentication using auth.customer1.com for remote authentication. The customer's CCS would include:

hook["cli-req"].add("proxy-auth('auth.customer1.
    com')")

The proxy-auth handler launches a sequence of its own to perform the actual authentication request and waits for the response. This is an example of a blocking handler which launches a helper request. Based on the response to the authentication request, the proxy-auth handler may generate an HTTP 401 response immediately or allow processing to continue.

Another way to handle this with CCS (if a native proxy-auth handler is not always available) may be:

```
if handlers["proxy-auth"] == nil then
    hook["cli-req"].add(
    "lua-txn('proxy-auth.luac', 'auth.customer1.com')")
else
    hook["cli-req"].add(
    "proxy-auth('auth.customer1.com')")
End
```

Preferably, however, a missing handler is preferably, but not necessarily, handled in a manner that does not require such an interaction with the CCS builder. E.g., there is always a proxy-auth handler—if there is no native one, the processing of the CCS will cause a library to be inspected/pulled which will provide a scripted version of it. One benefit of this sort of approach is that the CCS is then independent of the version of software running on the edge, and hence can be shared amongst peers of different generations. It should be understood and appreciated that the fact that the CCS is specified as a script and can make decisions about the sequence to generate based on inspection of its local environment is sufficient to allow CCSs to be shared across the network.

This logic is part of CCS builder, not the configuration writer. A single network-wide CCS can make these decisions based on local environment. CCS can use arbitrarily complex logic to assemble the building blocks for the customer, including making additional requests, etc. "Native" handlers could also be built-in scripts behind the scenes, but preferably native handlers are expected to be efficient C code. It should be appreciated that the CCS is a per-customer object. It should also be appreciated that a human configuration writer does not need to deal with this detail; they just need to know that they want authentication. In addition, it should be appreciated that the CCS should not be run on every request (unless it is invalidated).

Rather, the CCS is used to configure the agent to handle a given customer's requests by setting up the appropriate handlers at the various hook points. Those handlers themselves may invoke a script or scripts, but they do not have to and it is expected that a typical customer's requests will be handled without using scripts (e.g., Lua) at all in the main request processing path. The fact that the CCS is a script rather than a simple list of handlers to install at hook points means it can be flexible in inspecting its surroundings to determine the proper handlers for the environment (software revision, region, etc.) in which it is running.

As can be seen from the flow diagram in FIGS. 22A-22C, hooks are available at numerous points in the processing sequence. There may be hooks available for, amongst other things, some or all of:
  client requests
  cache fills
  GCO exceptions
  cache misses
  fill responses
  fill pump
  client responses
  client pump Those of ordinary skill in the art will realize and understand, upon reading this description, that different and/or additional hooks may be available and used in a particular implementation.

As noted earlier, default processing is available, and the cache will service requests without any customer-specific sequences, provided the customer is valid (e.g., found in the GCO) and requires no customer-specific processing.

As the various elements of the CDN are themselves potential clients (and sources of resources), the CDN may provide a CCS for CDN resources. From an implementation perspective, the CDN may be treated as a customer, with entries in the GCO and with its own CCS(s).

Load Balancing and Peering

The goal of local load balancing in a cluster (i.e., cluster-level load balancing) is to evenly distribute load across the nodes of the cluster, and to ensure that each connection gets handled by as few nodes as possible, preferably by only one node, even in the presence of failures. In some systems, cluster local load balancing may be accomplished using the techniques described U.S. Pat. No. 8,015,298 titled "Load-Balancing Cluster," filed Feb. 23, 2009, issued Sep. 6, 2011; and U.S. Published Patent Application No. 2010-0332664 titled "Load-Balancing Cluster," filed Sep. 13, 2010, the entire contents of each of which have been fully incorporated herein by reference for all purposes.

Figure 23A:
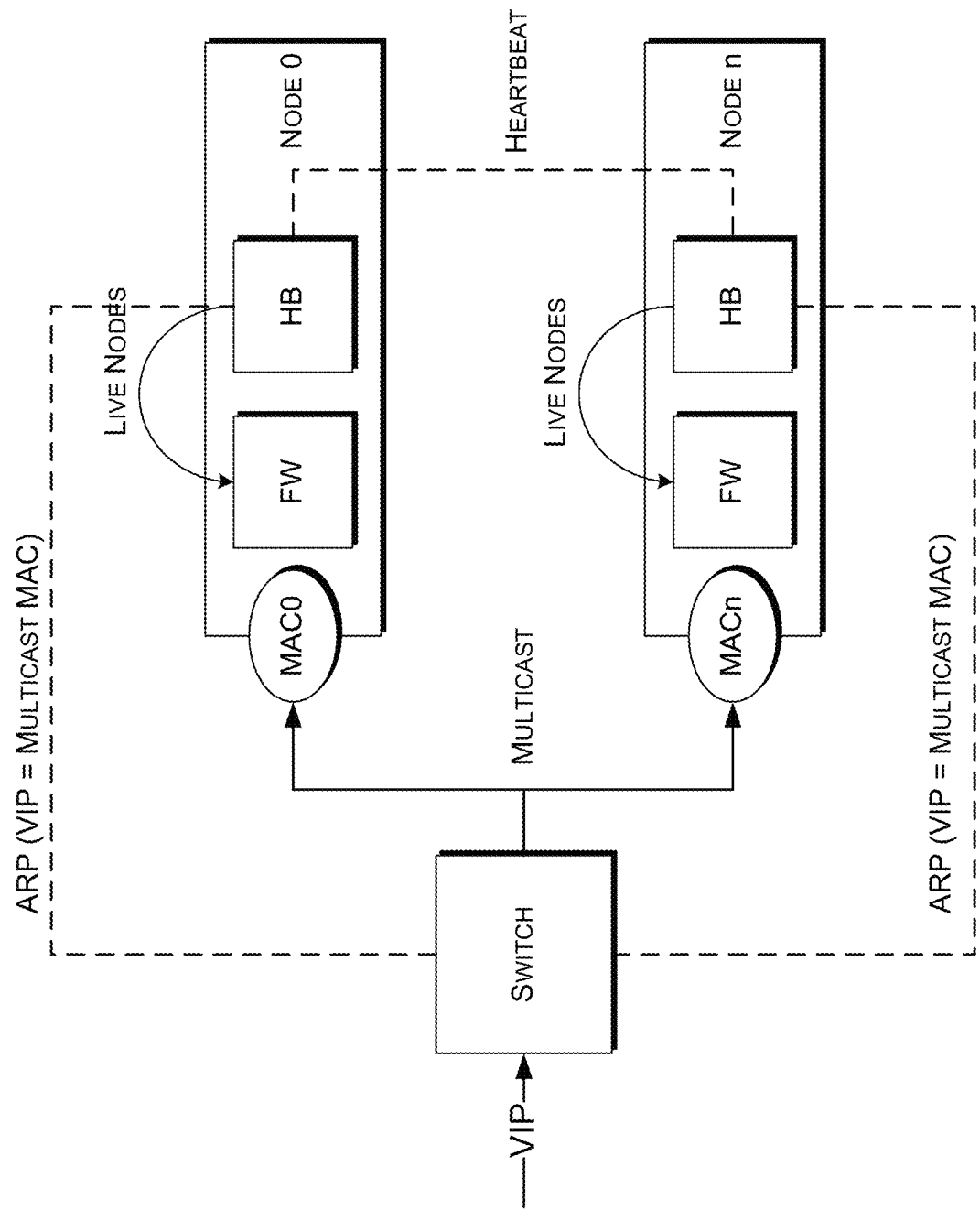
FIGS. 23A to 23I depict aspects of peering and load balancing in exemplary CDNs in accordance with an embodiment.

An example of such a system is shown in FIG. 23A, in which a request associated with a VIP is multicast via a switch (preferably a dumb switch) to all live nodes in the cluster. The nodes use local firewalls to block/accept traffic. These systems may not, strictly speaking, be load balancers, since some load is transmitted to each node in the cluster for each packet received at the switch. These systems move some of the load spreading functionality into the firewall of each individual node. Such techniques allow the use of a dumb switch instead of an expensive load balancing appliance.

Higher Level Load Balancing

Some systems, e.g., as described in U.S. Pat. No. 8,015,298, provide for request-based migration of TCP connections. In a system described in U.S. Pat. No. 8,015,298, referred to herein as Approach A, migration is performed on each request, and the connection may be moved back and forth between multiple machines in a cluster during its lifetime. When a server accepts a connection it uses the HTTP request on that connection to decide which machine (i.e., which cache in the cluster) should handle the request. The server then migrates the connection, plugging and poking firewall holes as needed to ensure the target of the migration accepts further traffic and the source drops it. The attributes of the request used to make the migration decision are configurable (e.g., URL, Host header, other headers, etc.), as are the number of machines to be involved in the target selection process (via various parameters). In some implementations, these are per-coserver configuration settings.

Peering

In some cases, e.g., in some of the systems just described, when a cache miss occurs (e.g., at 2220 in FIG. 22B), all peers in the cluster and neighboring clusters may be queried to determine if any peer has the resource cached. If one is found, the local cache may be filled from that peer. If none is found, the local cache may be filled from a pre-configured parent.

The load balancing solutions described above work for IPv4 traffic, but IPv6 traffic may require a different approach due to the lack of ARP in IPv6. One solution to the lack of ARP in IPv6 is to apply the same strategy as described above to the protocols that IPv6 provides. For example, the IPv6 Neighbor Discovery Protocol (NDP) may be used by each node in the cluster to detect the liveness of all other nodes in the cluster, and this information may be used to update the firewall. A stateful firewall and a simple switch handle the rest, as in the IPv4 system.

High-Level Load Balancing and Peering

In addition to or instead of the above approaches, the CDN 100 may provide application-level load balancing which also addresses local and remote peering. TCP/IP connection transfer is an optional component of this approach that may be used within a cluster, but is not required (and may be unnecessary).

Resource Striping and Capacity Allocation

Within the context of a single cluster, some information about the property of each request (e.g., the request URL) is mapped, e.g., via hashing, to a unique slot s in a circular array of NS slots. At any given time, each node in the cluster is assigned responsibility for some (preferably contiguous) interval of slots. The slot ranges of the cluster nodes may be assigned arbitrarily as long as the number of nodes responsible for a slot is always within some prescribed [min, max] range of nodes per slot (a node is said to be responsible for a slot s if its interval covers s, i.e., if s is in the range).

For example, suppose there are five (5) nodes in a cluster and 1,000 slots (numbered 0 to 999). One possible slot configuration that is consistent with [min, max]=[1,2] is the following:

[0, 99], [50,149], [100, 500], [200, 800], [700, 999]

For any given slot configuration, all requests will be served by nodes responsible for the corresponding slot. Additional constraints on slot intervals, and on changes to slot intervals, may also be imposed in order to avoid unnecessarily large shifts in responsibility, to enable distributed computation of slot intervals, to increase fault tolerance, and to simplify the slot allocation algorithm.

Capacity allocation may be implemented by allocating a different [min, max] range to different intervals of the slot circle, and by hashing URLs for different properties to different intervals of the slot circle. The total capacity corresponding to a slot interval is the area of the slot interval divided by the total area of the entire slot range. A property's capacity allocation is its relative capacity per slot (based on the number of other properties mapped to the same slot) times the actual capacity of each slot to which it is allocated.

Slot-Based Load Balancing

Slot intervals determine which resources get handled by which nodes in the cluster, and a hashing function determines which resources map to which slots. It should be appreciated that although the hashing function(s) that control the distribution of resource names across slots can be arbitrarily complex, the function(s) cannot guarantee that the actual load of requests over time has any particular distribution. For example, a given sequence of requests over some time interval might result in a relatively high load across small slot intervals on the circle, depending on how the resources for those requests are named.

To account for this, the system preferably dynamically adjusts the position and width of slot intervals such that areas of higher load have a higher density of nodes per slot. The capacity allocation provides constraints on the solution to this adjustment, and the total number of slots limits the resolution with which such changes can be made. Periodically (e.g., every minute), the slot interval for each node may be reassigned based, e.g., on the following information:

node liveness;
load on each node;
the previous (or default) sector range values.

Nodes may have their slot interval expanded, contracted, or shifted by a high-level local load balancing algorithm, the result of which is to change the density of nodes per slot to meet the capacity allocation constraints and compensate as much as possible for actual load distribution within those constraints.

When a node fails, the density of nodes per slot in the node's area of previous responsibility will drop (potentially to zero, depending on the previous slot configuration). Two strategies may be adopted to deal with this:

When computing a new slot configuration, always allocate a minimum density of two nodes per slot.
Run the load re-balancer whenever a node failure is detected.

With this approach, assuming no more than one failure per load rebalancing interval, no slot should ever be left uncovered.

Client Request Handling

Figure 23B:
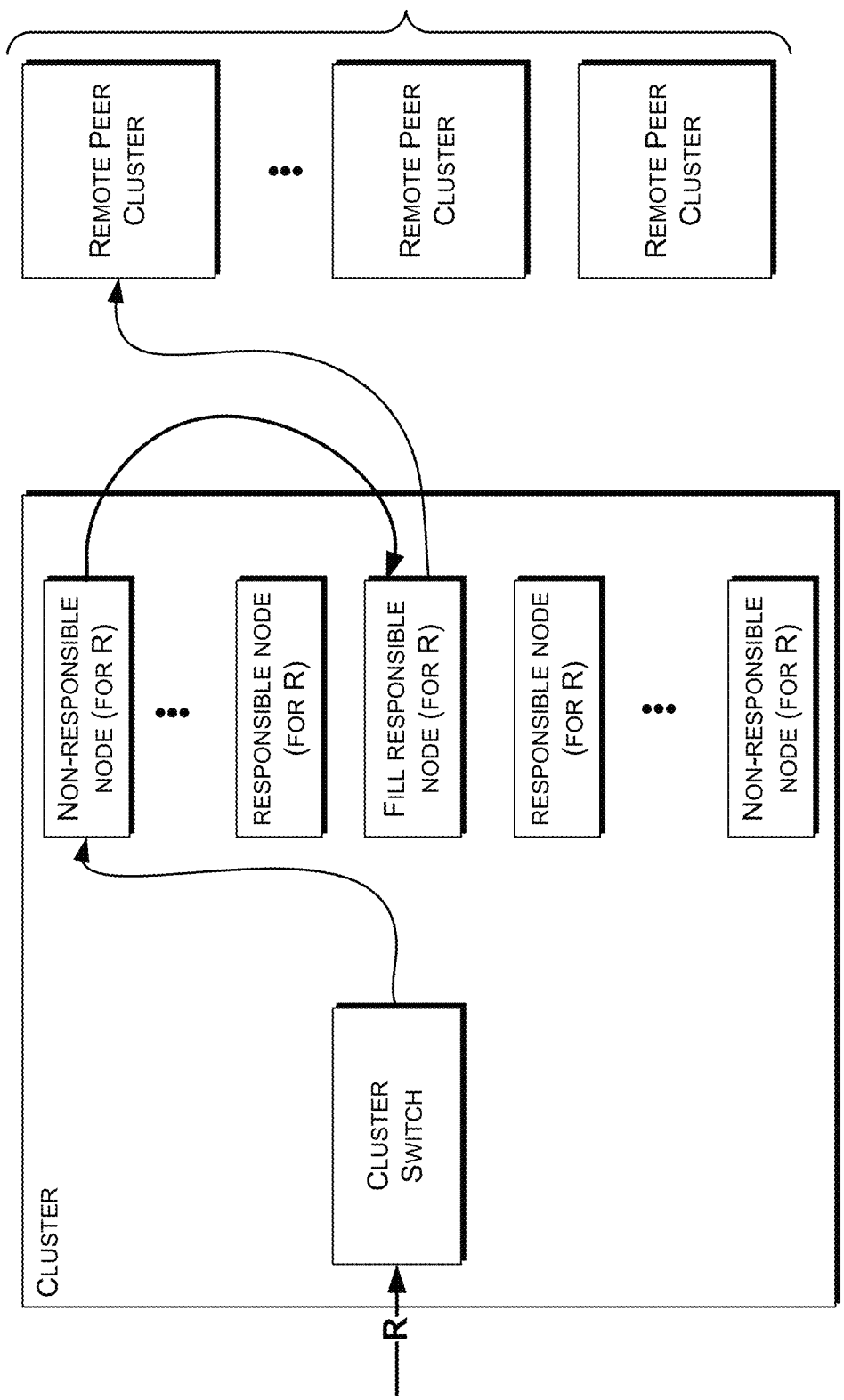

The basic approach, elaborated incrementally here, leads to three roles for nodes in a cluster which distinguish their varying degrees of responsibility with respect to caching and remote filling of particular resources (see FIG. 23B). These roles need not be fixed per node, but may depend on the request context.

For example, in some cases three degrees of node responsibility for any given resource may be used, based, e.g., on hashing. These different degrees of responsibility may be used to provide separate control over how many nodes will cache a resource and how many will reach out to a remote node (e.g., a parent node) to fill a request. For example:

Non-responsible (will not cache but will proxy only to a Super-Responsible peer)
Responsible (will cache, and will fill only from a Super-Responsible peer)
Super-Responsible (will cache and will fill from a parent ("remote peer")) (Preferably there are no nodes which are only fill responsible, as such a setup would perform rather poorly because m/m requests would end up being proxied from the origin server [n is number of fill-responsible-only nodes, m is cluster size] without being cached.)

Those of ordinary skill in the art will realize and understand, upon reading this description, that a different number of roles for nodes in a cluster may be used for different degrees of responsibility, with different cache and remote-fill approaches for each.

It should also be appreciated that a node's degree of responsibility for particular resources may be determined on a continuous scale and need not necessarily be discrete.

The slot allocation scheme determines which resources a given node is considered to be "responsible" for, and this responsibility implies a more aggressive approach to caching the resource than other "non-responsible" nodes.

Figure 23C:
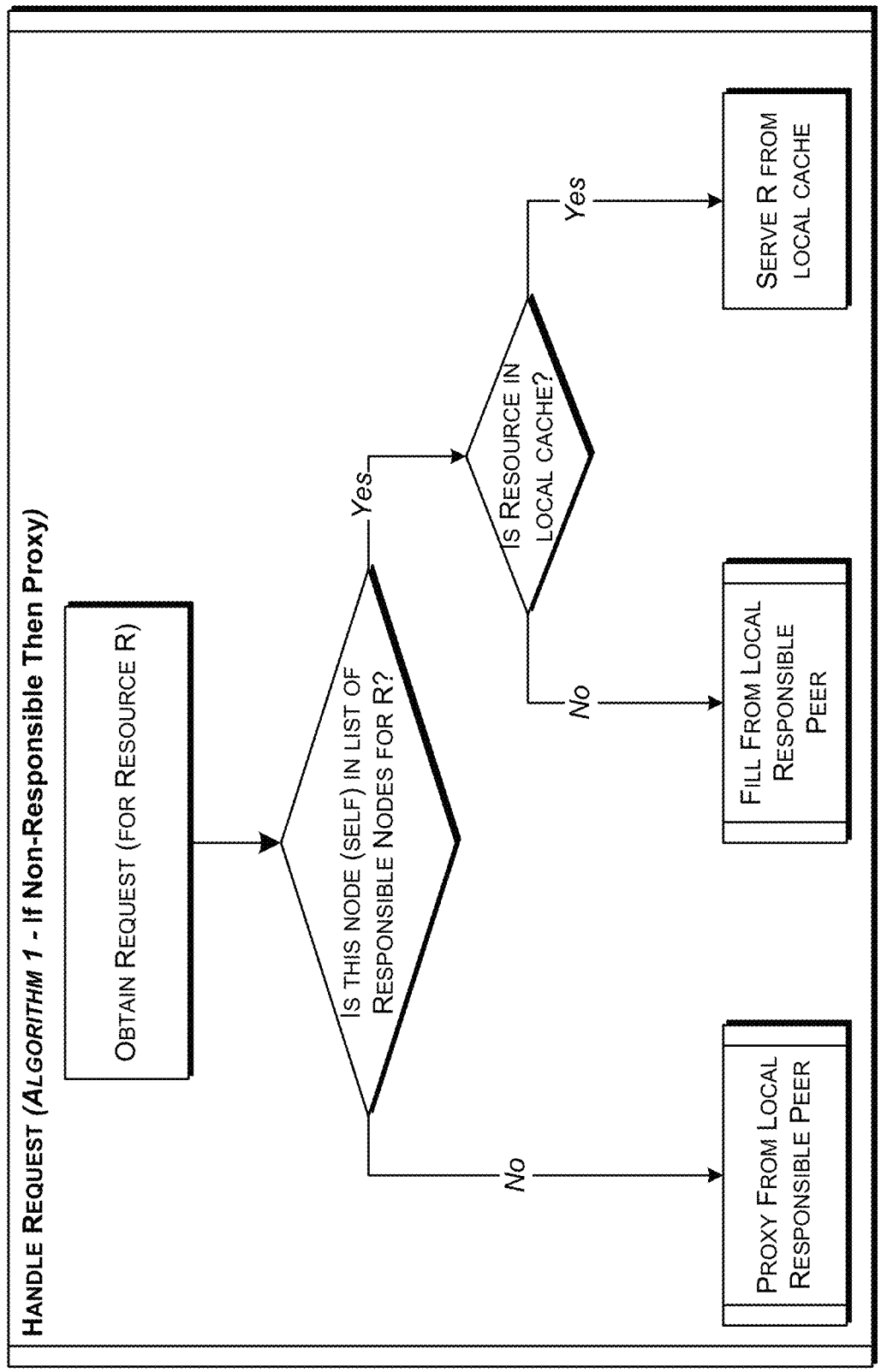

In the first approach (see algorithm 1 below and FIG. 23C), upon receiving an (external) client request (for resource R), the node determines if it is responsible for the resource. If the node determines that it is responsible for the resource, it consults its cache and responds from there or it fills from a super-responsible peer. If it is not responsible, it proxies from a super-responsible peer but does not update its local cache. The idea behind avoiding a local fill and just proxying in the case where the node is not responsible is that the node will never be asked by another local peer to provide that resource. Using this approach would let the responsible local peers handle the fill and storage, and avoid the storage and disk I/O costs associated with filling resources for which local peers will never ask.

---
Algorithm 1 Handle Request-1 (If Non-Responsible Then Proxy)
---
```
function HandleRequest( R )
    R.slot ← slot ← SLOT(R)
    nodes ← ResponsibleNodes(slot)
    if self ∈ nodes then
        if R ∉ localCache then
            FillFromPeer(R, nodes - {self})
        end if
        return localCache(R)
    else
        return ProxyFromLocalPeer(R, nodes)
    end if
end function
```
---

Figure 23D:
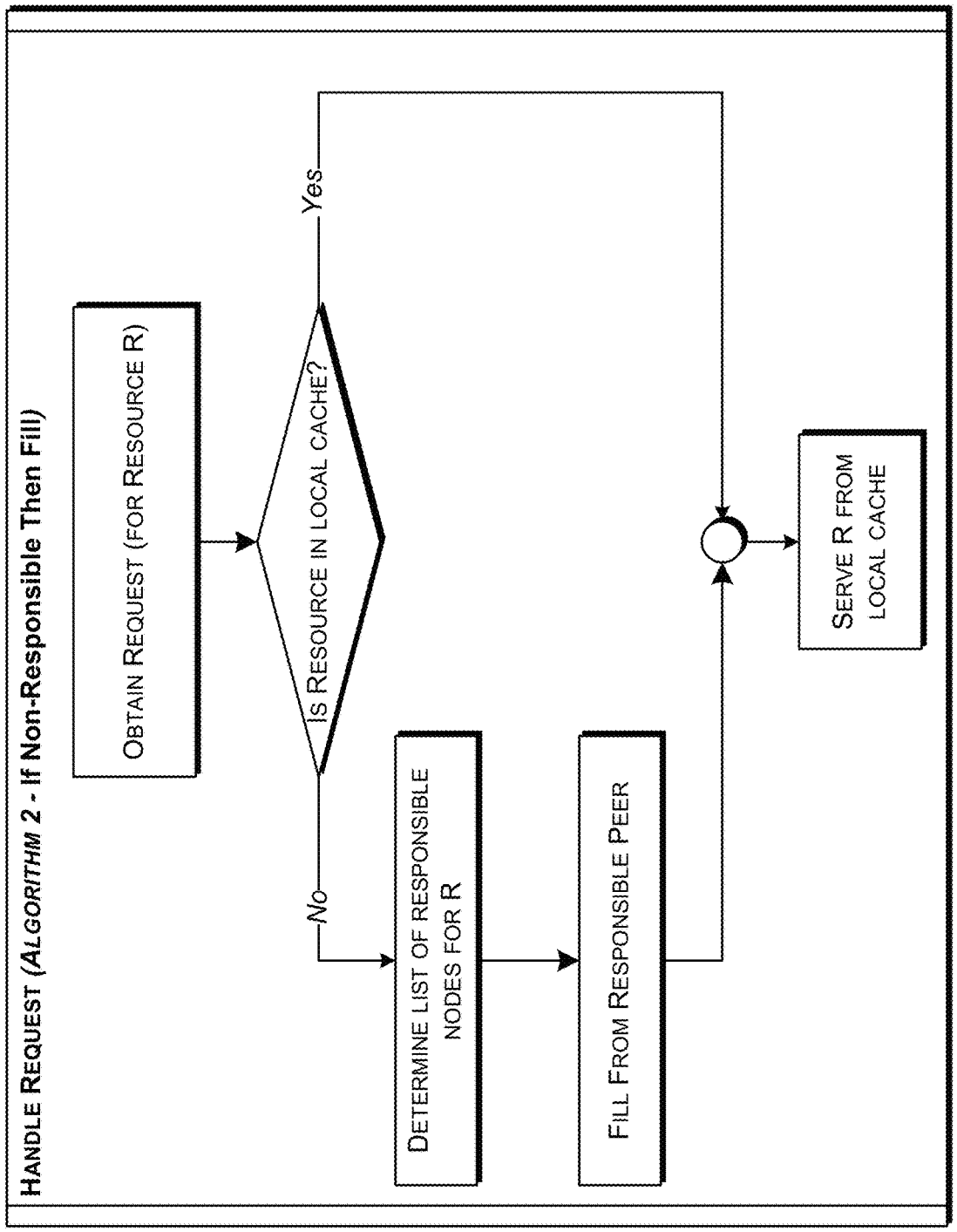

This approach (Algorithm 1) may provide lower latency for the current request than filling locally, but the problem is that subsequent external requests to this node for the same resource will always proxy through other nodes. Alternatively (see algorithm 2 and FIG. 23D), the system may adopt a more opportunistic approach and allow nodes to cache resources they are not responsible for, provided they favor the resources they are responsible for in terms of their cache eviction policy.

---
Algorithm 2 Handle Request-2 (If Non-Responsible Then Fill)
---
```
function HandleRequest ( R )
    if R ∈ localCache then
        return localCache(R)
    end if
    R.slot ← slot ← SLOT(R)
    nodes ← ResponsibleNodes (slot)
    FillFromPeer (R, nodes - {self})
    return localCache(R)
end function
```
---

Local Peer Proxy and Fill

Figure 23E:
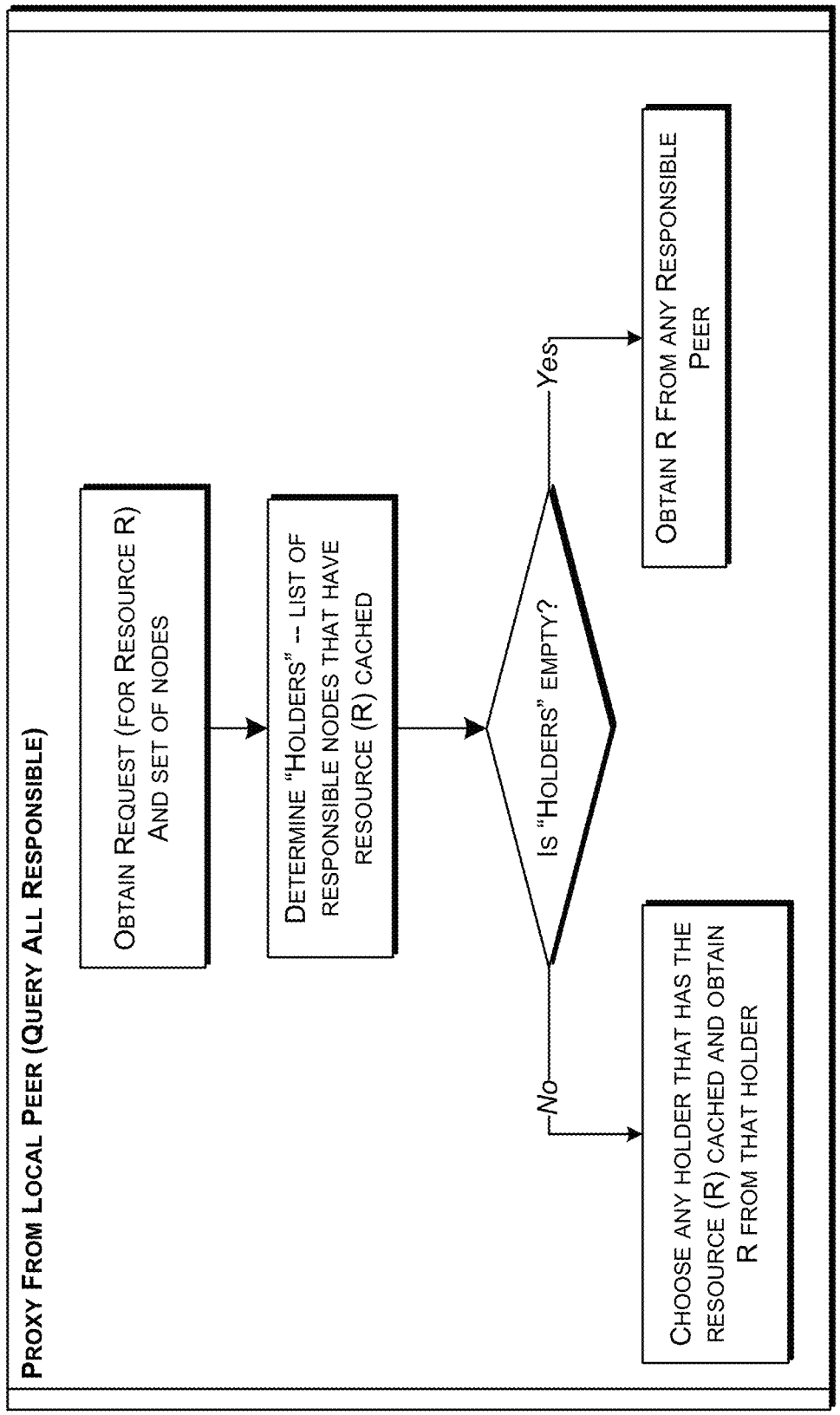

To proxy from a local peer (see algorithm 3 and FIG. 23E) the system may determine the set of responsible nodes and ask them if anyone has the resource cached. If one or more local peers have it, the system arbitrarily chooses one and requests from there. Otherwise the system chooses any responsible peer and requests from there. The idea is that the system requests through a responsible peer even if it knows it does not have it (rather than filling from a remote peer) because the local responsible peer is likely to need it more than the current node. This reduces the possibility of remote fills for the same resource coming from different nodes on the same cluster, which makes better use of bandwidth to remote peers.

---
Algorithm 3 Proxy From Local Peer (Query All Responsible)
---
```
function ProxyFromLocalPeer( R, nodes)
    holders = QueryLocalPeers(R, nodes)
    if holders ≠ Ω then
        choose h ∈ holders
    else
```
---

-continued

---
Algorithm 3 Proxy From Local Peer (Query All Responsible)
---
```
        choose h ∈ nodes
    end if
    return RequestFrom (R, h)
end function
```
---

Note that ProxyFromLocalPeer is invoked in Algorithm 1 using a set of responsible nodes.

Figure 23F:
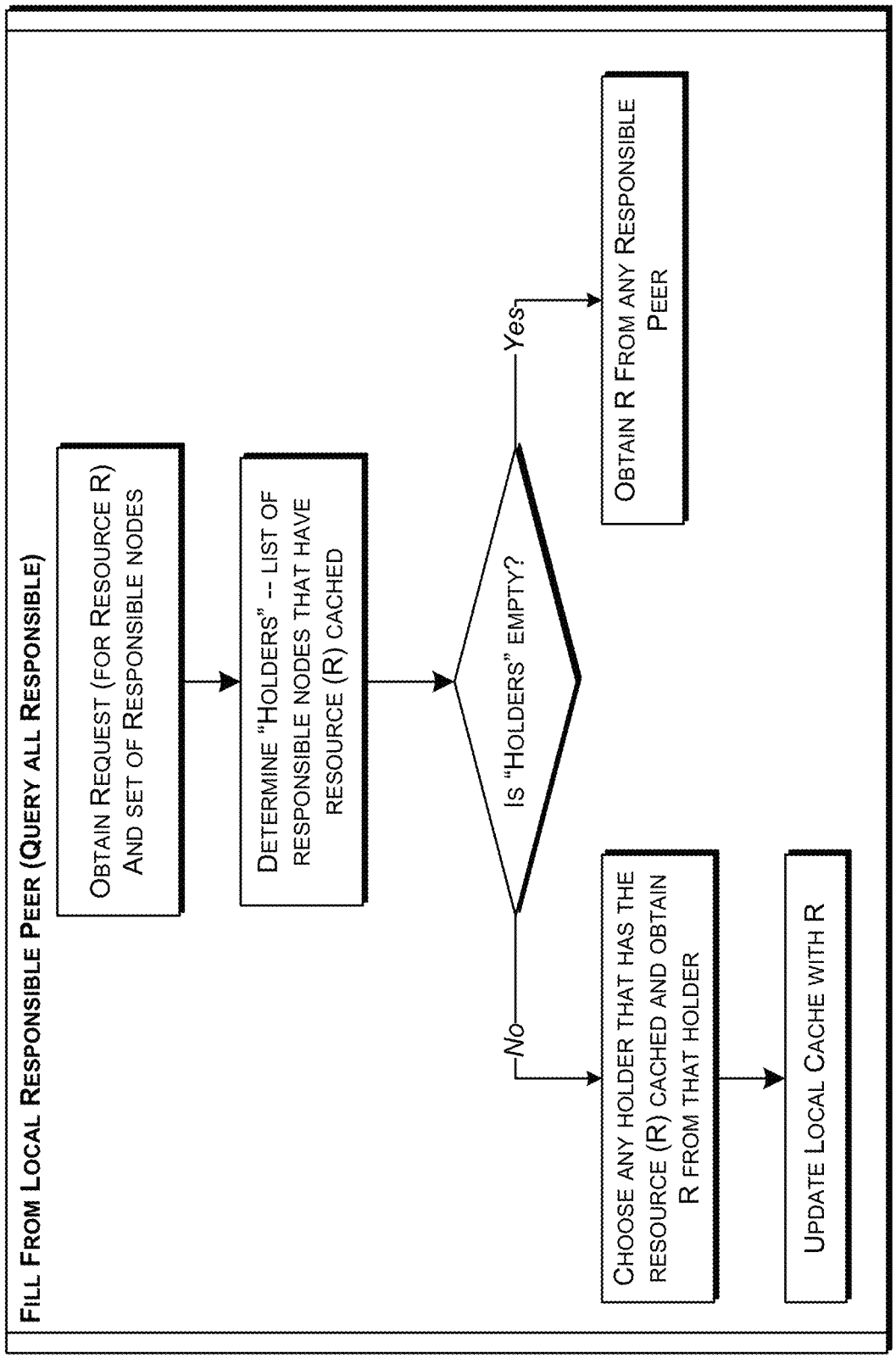

Filling (see algorithm 4 and FIG. 23F) is similar to proxying in the query-all-responsible approach, with the addition of updating the local cache.

---
Algorithm 4 Fill From Local Peer (Query All Responsible)
---
```
procedure Fill From Local Peer( R, nodes)
    holders = Query Local Peers(R, nodes)
    if holders ≠ Ω then
        choose h ∈ holders
        localCache(R) ← request from(R,h)
    else
        Fill From Remote Peer(R)
    end if
end procedure
```
---

Note that the same principle that non-responsible peers use to delegate to responsible peers can be used within the set of responsible peers for a resource in order to decide who should do a remote fill. The system may put a bound on the number of peers who will attempt a remote peer fill for a given resource, as it could be more efficient for the system as a whole for a small number of local peers to fill a given resource from a remote peer, and then have the local peers get it from each other. This would require two kinds of "responsible" peers, plain responsible peers, and "remote-fill-responsible" (super-responsible) peers (where the latter do remote fills, the former do not).

To achieve this, the system further partitions the set of responsible nodes as follows. First sort the set of N responsible nodes by their unique node IDs to produce an array, then split this array into K parts, and index each part with the hash of the resource key to determine up to K nodes that will be responsible to fill. Since all nodes are assumed to have the same knowledge of what nodes are responsible for what resources, this computation can also be done in distributed fashion (each node computes it independently and they all arrive at the same result).

With this the system can dispense with the querying part, and with the assumption that K will usually be very small (say 1 or 2), the system just randomly chooses one of the fillers and expects it to either have the resource or fill it remotely. This achieves load balancing of the remote fill workload within the set of responsible peers for any given resource and bounds the number of remote requests from a given cluster for the same resource. Assuming Filler-Peers determines the K nodes responsible for remote fills as just described, this leads to the no-query version of the fill from local peer algorithm (see algorithm 5).

---
Algorithm 5 Fill From Local Peer (No Query)
---
```
procedure FillFromLocalPeer( R, nodes)
    fillers = FillerPeers(R, nodes)
    choose f ∈ fillers
```

```
Algorithm 5 Fill From Local Peer (No Query)

localCache(R) ← RequestFrom(R, f )
end procedure
```

A similar no-query version of the fill from local peer algorithm may be used for the proxying case, and the system could also apply the query approach within the now even smaller set of filler peers. But at this point the system has reduced the set of nodes to consider so far already (from the whole cluster, to the responsible nodes within the cluster, to the responsible fillers within the responsible nodes), that it is probably not worth it, especially if doing so requires implementation of a completely different request/response protocol than just simple peer-to-peer HTTP requests.

Remote Peer Fill

Once a node has decided to fill from a remote peer it simply determines the name of a remote peer and fills from it (see algorithm 6). The term "remote peer" is used here instead of parent in order to emphasize the remoteness and to de-emphasize any presumed parent-child relationships. In this approach there is no single hierarchy in the CDN, and even a single node in a cluster may refer to multiple remote peers, depending on the context of the request and the state of the network. The only guarantee expected is that a remote peer must always be one step closer to the origin than the local requestor or the remote "peer" may even be an origin server. This results in a dynamic overlay lattice instead of a static tree structure.

```
Algorithm 6 Fill From Remote Peer procedure FillFromRemotePeer( R, nodes)
    server ← RemotePeerName(R, R.peerLevel + 1)
    localCache(R) ← RequestFrom (R, server)
end procedure
```

Remote peer name selection may be based, at least in part, on some local configuration data that is retrieved as resources from the control mechanism which can be invalidated and refreshed, and partly on the rendezvous system. For each property served by a cluster node, a method of choosing a remote peer name for a resource is specified, and this method is used to compute the name of the server to contact. The RemotePeerName procedure (see algorithm 7) uses the configured method to return the server name to the request-handling algorithm when needed.

This provides a simple means of load balancing of requests across multiple remote peers for given collections of requests. Different name selection methods enable different strategies for doing so, and also allow different divisions of responsibility between control mechanism configuration, cache nodes, and the rendezvous system, without making any significant changes to the cache implementation beyond configurable name selection.

It is assumed that the cache's consumption of control resources could result in the definition of named configuration variables. These named variables might define numeric constants, single names, ordered lists of names, or lists of lists, and they exist to provide input data to various remote peer name selection methods. The choice of remote peer name selection method is assumed to be an indication of one of several predefined methods that the cache provides, and RemotePeerName is just a wrapper that invokes the appropriate virtual function. One other aspect is the remote peer level, which is assumed to be zero (0) for requests received from clients, and is incremented at each hop to a remote peer via a suitable request header. If the level exceeds a threshold (which could be property specific), the name of an origin server is returned instead of a remote CDN peer.

```
Algorithm 7 Remote Peer Name Selection function RemotePeerName ( R, level )
    if level >maxpeerlevel (R.propertyID) then
        return OriginName (R)
    else
        M ← rpnsmethod(R.propertyID)
        return M(R, level)
    end if
end function
```

Example methods that could be used for computing remote peer names include:

(1) Return a constant remote peer name for all requests, provided in the configuration under variable rpname:
RPN←rpname (2) Get a list of remote peer names (rpnlistbyagent), and index it by the hash of the local node's agent ID (or perhaps the cluster ID):
rpnlist←rpnlistbyagent
RPN←rpnlist [hash (agentID) mod rpnlist.size]

(3) Generate a name based on properties of the request (e.g., certain bits of the sector, property ID, resource hash, etc.) and let the rendezvous system do the load balancing work.

(4) Get a list of peer names by sector from the configuration (via variable rpnlistbysector), and index it by the hash of the property ID:
rpnlist←rpnlistbysector(R.sector mod rpnlistbysector.size)
RPN←rpnlist [hash (R.propertyID) mod rpnlist.size]

While different algorithms/approaches have been described here for load balancing and peering, and for what to do when a cache miss occurs, it should be appreciated that these approaches may be used alone or in various combinations within a CDN. Furthermore, the approach(es) adopted may be configured within the CDN based on various factors. For example, the approach(es) to load balancing and peering may be property specific (e.g., they may be specified as part of a CCS). It should also be appreciated that the approach(es) may be modified (e.g., by modifying a CCS for a property) during operation of the CDN.

Probabilistic Customizations

At several points in the above algorithms decisions are made on where or how to get something:

Does a non-responsible node proxy or fill when it retrieves from a peer?

When it fills, does a non-responsible node fill from a remote peer or a local peer?

When it fills from a local peer, is it any local responsible peer, or a local fill-responsible peer?

When a responsible node fills, does it fill from a remote peer or from a local fill-responsible peer?

Figure 23G:
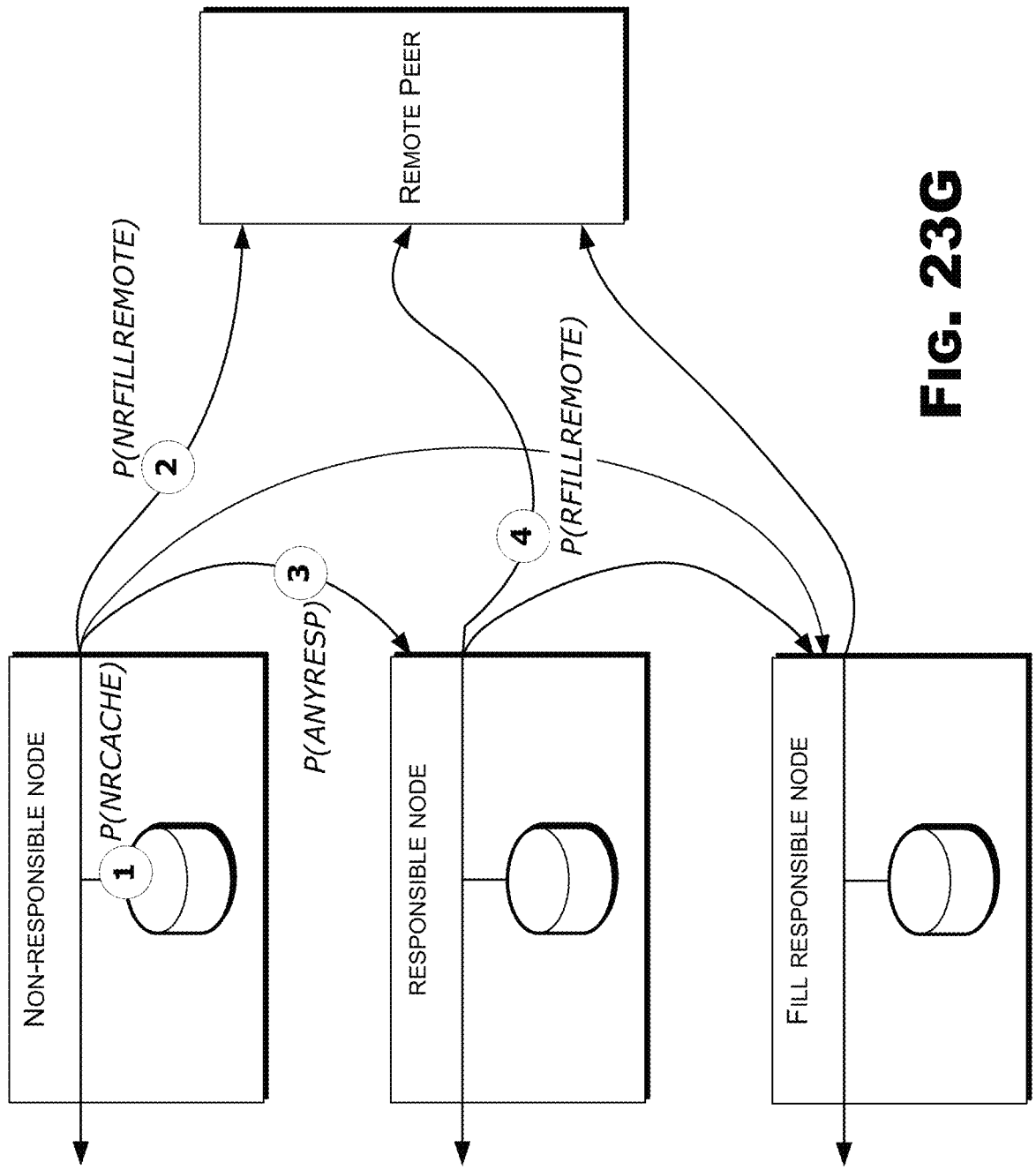
Figure 23H:
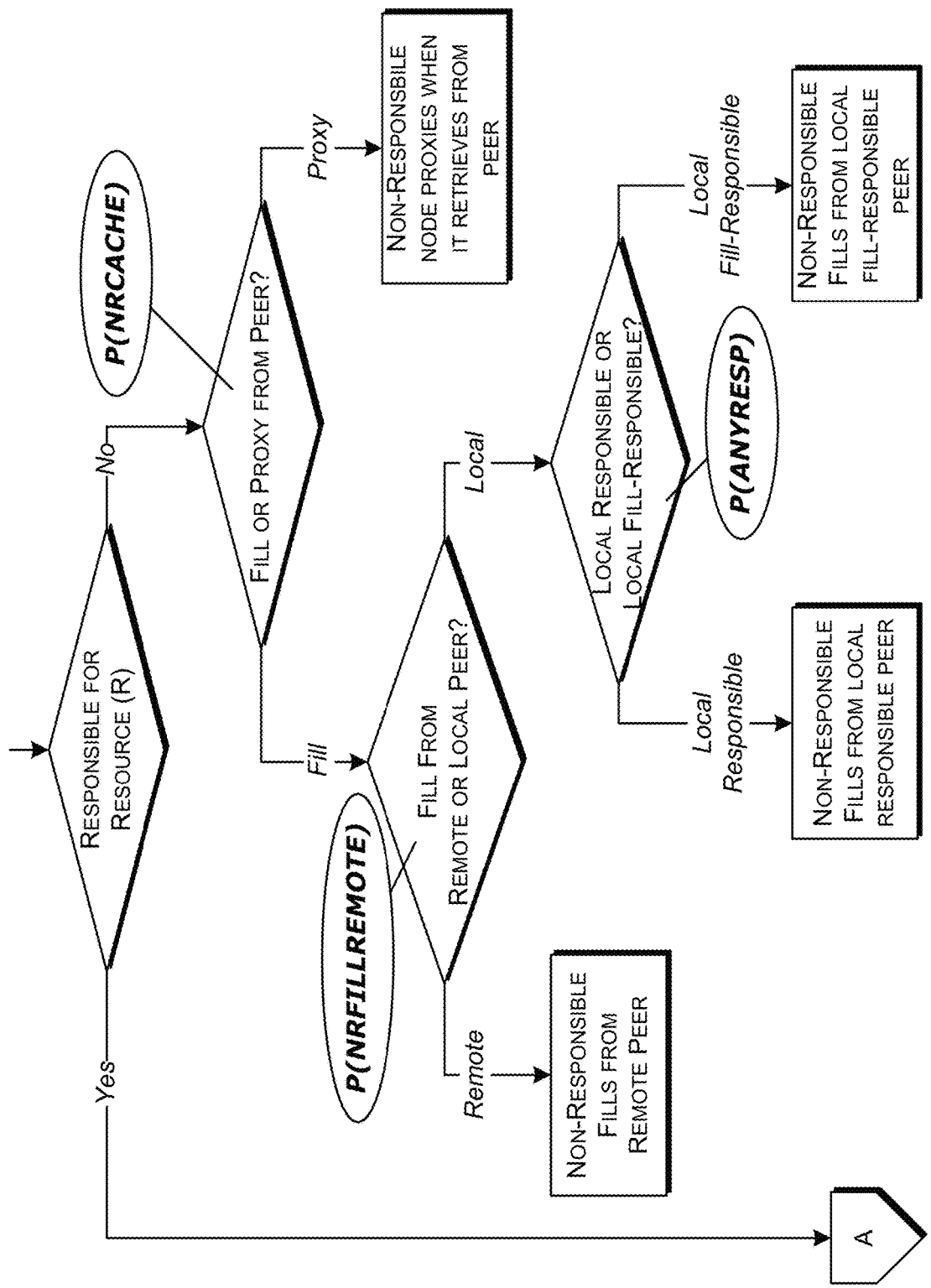
Figure 23I:
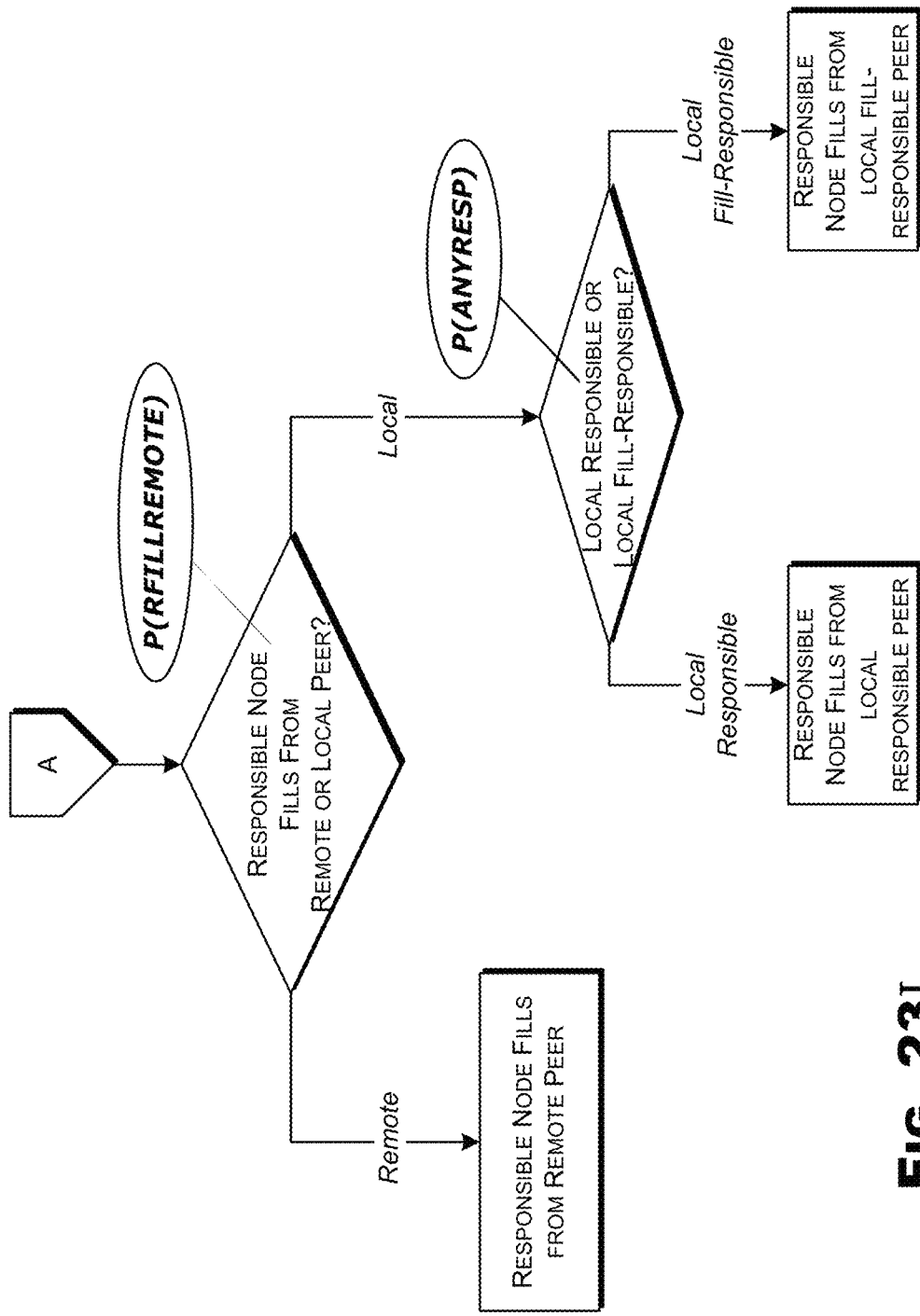

Rather than hardwire specific choices for these into the algorithms, these decisions may be made according to specified probabilities that may be used to weight decisions (see FIG. 23G and the flowchart in FIGS. 23H-23I showing caching and peer filling choices). Exemplary such probabilities may include:

1. P(NRCACHE)—the probability that a non-responsible node will cache instead of just proxy.
2. P(NRFILLREMOTE)—the probability that a non-responsible node will fill from a remote peer, given that it fills from somewhere.
3. P(ANYRESP)—the probability that a non-responsible node will fill from any responsible local peer (as opposed to a fill-responsible peer), given that it is going to fill locally.
4. P(RFILLREMOTE)—the probability that a responsible node (but not a fill-responsible node) will fill from a remote peer, given that it fills.

These probabilities may have preferred defaults of zero that may be changed on a per property basis.

Extending Local Peering Across Clusters

The notion of peers is not limited by network organization or location. Thus, e.g., nodes closer to the origin have been referred to herein as remote peers even though they are not necessarily on the same cluster. We may also refer to local peers that are not on the same cluster. An arbitrarily large cluster of clusters may be treated as a single logical cluster as long as the nodes can address each other as independent nodes and can run a failure detection and slot allocation algorithm across the entire node collection. The fact that different subgroups are behind different switches does not make any difference.

As the collection gets arbitrarily large, however, it may become impractical to do the failure detection and slot allocation algorithms in a flat way across the entire node set, so there is probably a maximum practical size to a logical cluster (say 2 to 3 physical clusters) unless a more scalable technique is applied. The essential difference between local and remote peering is that when one local peer delegates to another, it does so with the knowledge of exactly what node it is delegating to, and what responsibility that node has with respect to the caching and remote-filling of the resource. In other words, the two nodes share knowledge about slot responsibility. The key then, would be to convert the flat slot allocation into a more hierarchically structured one. One approach would be as follows:

Each physical cluster is assigned a unique subinterval of slots.

Each physical cluster locally determines its set of live nodes, and a leader communicates this set (and the load and slot assignments of each live node) to leaders in the other clusters.

Given such a partitioning, most of the work to determine failure detection and slot assignments occurs locally within a cluster, and the only price paid is an extra level of coordination at the logical cluster level, and some loss in flexibility in allocating capacity across the slot circle, since each cluster is responsible for a fixed subinterval of the circle.

The latter problem can be fixed as follows: instead of pre-allocating non-overlapping subintervals to each cluster and then trivially merging the result of running N instances of the algorithm, run the algorithm recursively and produce the physical cluster interval assignments as an output of the algorithm instead of just as an input. To do this, run the algorithm as if each cluster were a single node, but with a capacity weight equal to the number of live nodes in the cluster, which could be greater than one in the general case. The algorithm takes the cluster's current interval as an input and potentially adjusts the cluster's coverage as an output, and cluster intervals are allowed to overlap in this case. Then, after the initial version of slot coverage at the cluster level is done, take the actual interval assignment for the cluster and use it as the starting point for running the algorithm again locally on each cluster to determine actual node-level intervals, this time treating each node within the cluster as an individual with a weight equal to one. Although a weight of one is used in this example, it should be understood that a system may have different weights per node, depending on capability. In preferred implementations, all nodes in a cluster have equivalent capability.

It will be appreciated that this approach applies not just to one level of physical-to-logical clustering, but to an arbitrary number of levels of clustering. Those of ordinary skill in the art will realize and understand however, upon reading this description, that at some point the benefit of logical clustering reaches a maximum with respect to remote peering, and remote peering is preferably used instead.

Invalidation

This section further discusses the mechanisms of invalidation internal to a CDN service (e.g., a cache node). From the point of view of the CDN service, it is assumed that the control mechanism publishes (i.e., makes available) information about what resources should be invalidated, and the CDN service obtains (e.g., pulls) this information at an appropriate time. These mechanisms are described elsewhere herein. What is described here is what can be specified in an invalidation command and how this command may be executed by the CDN service (whether via the backdoor pull of invalidation commands from the control mechanism, or via a front-door management command directly to the CDN service). It should be appreciated that the front-door mechanism (as the term is being used here) is strictly for local control, and it would not be used in normal operation. It might be used, e.g., by an operator trying to get a resource out of a particular cache (e.g., for troubleshooting).

A simplified model of what invalidation attempts to achieve is used here for the purposes of this description. The goal of invalidating a resource is to prevent that resource from being used without revalidation. Practically, invalidating a resource marks it such that the resource in CDN service at the time of invalidation (if any) will not be used without revalidation. Other variations on this theme made in actual practice are important but do not fundamentally affect the degree of difficulty of finding and marking the right resources, and they are ignored.

Invalidating individual resources for which the URL is specified in the invalidation command is simple. For example, hash the URL, look it up in an index, find the object, and mark it (essentially the same as the lookup process when serving the resource). The URL does not have to be stored in the index (typically a hash table or tree of some sort) for this to work.

Invalidating groups named by a pattern is much harder. The pattern in this case could be as simple as a URL prefix that all implied URLs are expected to have, a case-independent version of the matching URLs, or as complex as an arbitrary regular expression. In all of these cases there is no single URL known in advance that the cache can use to look anything up (and the number of possible matches could be unbounded), instead the cache needs to iterate over the entries in the index and find the ones that match the pattern. Achieving this requires that the URL be known for each entry visited in the iteration. This feature may be referred to as "expression-based invalidation."

A naive extension of the hash table approach might be to store URLs in the table entries, but this is expensive in terms of space and very inefficient in time, since the system would have to traverse the entire index and test the invalidation patterns on each URL to find which ones to invalidate. Using a sorted map data structure (like a binary tree) does not help either for URL patterns in general. Furthermore, even if the matching objects could be found efficiently, it could take a really long time to mark all the metadata corresponding to each one if they are on disk and not in memory.

If invalidations are launched from one of a handful of portals and then broadcast to the entire CDN, this can result in a large volume of invalidations flooding the network at any given time, which in turn could lead to the performance of unnecessary work at each cache node. The control mechanism solves part of this problem by arranging for invalidations to travel only to the CDN service nodes that care about them (e.g., with sector resolution). Therefore, it can be assumed that the invalidations received at a CDN service (e.g., cache) are more likely to apply to the resources currently cached at that node. Beyond that, the system needs three things to deal with the efficiency challenges local to the CDN service (cache):

(1) an efficient way to find all nodes corresponding to a URL pattern,
 (2) an efficient way to mark all nodes corresponding to a URL pattern, and
 (3) some general limits (on the number of nodes that can be invalidated at once) to ensure bad things never happen, since URL patterns can refer to an unbounded number of resources.

A modification of a trie data structure concept is used to provide an efficient way to look up URLs.

As is well known, a trie, or prefix tree, is an ordered tree data structure used to store an associative array where the keys are usually strings. In a trie, no node in the tree stores the key associated with that node; instead, a node's position in the tree defines the key with which it is associated. All descendants of a node have a common prefix of the string associated with that node, and the root is associated with the empty string. Values are normally not associated with every node, only with leaves and some inner nodes that correspond to keys of interest. A trie provides a way to lookup a key in time proportional to the length of the key. In other words, using a trie allows finding the value corresponding to a key in about the same time it would take just to compute a hash. A trie is just a tree where each key string in the trie corresponds to a path in the trie, and the branching at each level in the tree may be based, at least in part, on the alphabet over which the keys are defined. Whole keys are not actually stored directly in the tree, but they are implied for each node by the path to the node. This compresses the storage space required for keys when URLs have common prefixes, as is typical.

The challenge with the traditional approach to tries is still space efficiency for the structure of the tree besides the implied key information. Typically each node carries the information for one character and represents a string corresponding to the characters on the path from the root to the node. Each node has no more than one direct descendant for each unique character in the alphabet of the keyspace. This "child-map" could use an array covering the entire alphabet, and the system could index this array to find the link to the descendant for each character, but this would have a huge cost in space (which would be exponential in the depth of the tree).

A number of techniques may be applied to optimize the space used by the trie while retaining the same time complexity:

(1) Use the fact that URLs consist of about 85 legal characters, and never use a child-map longer than this (this requires mapping the actual URL characters statically to the range 0 to 84).
 (2) Position the URLs in the static index map, so that characters most frequently used have smaller indices, and allow the size of the child map to be based on the actual range of indexes used by a node's immediate children. This further reduces the expected average size of the child maps in a trie.
 (3) Allow the child map to be a simple list of a small maximum size (to be searched instead of indexed), and convert to an indexed array only if the number of children exceeds the size threshold.
 (4) Allow nodes to jump multiple characters. If all the children of a node have a common prefix relative the node's current path in the tree, then the single character of the node can be expand to a string of arbitrarily length. This reduces the number of nodes it takes to advance a certain distance in a URL.

In a prototype implementation in which all of these techniques were used except for the frequency based approach, a population of about 57,000 unique URLs taken from actual CDN logs from three binding groups were inserted into a trie. The actual number of characters consumed by the URLs was about 7.3 M, or about 127 characters per URL. After insertion into the trie the space of the trie nodes and associated strings was about 7.4 MB, whereas the size it would have taken to just store all the keys as MD5 hashes in a hash table would have been about 2.3 MB. If the MD5 hashes were replaced with the actual URLs for keys instead, it would have taken 8.8 MB.

Though the trie's space utilization can probably still be improved somewhat, and though the actual space utilization is also highly dependent on the actual URLs, it may be reasonable to expect that the space utilization of the trie described here is better than the naive hash-table approach, though still about three times more expensive in space than the MD5 hash approach, although at least as fast. The space gap would be narrowed if using SHA-256 (which would have consumed 3.2 MB) or SHA-512 (5.1 MB) instead of MD5. What has been achieved is something that provides structural information that can be used to more efficiently search the space of URLs for patterns.

This approach generalizes to patterns.

Realizing that each pattern corresponds to a finite state machine which recognizes matching strings, the task of finding all strings that match a given pattern is reduced to a trie-traversal, where all subnodes of a given node where there is a transition in the state machine from the current state to some other state based on the character corresponding to the subnode. In the general case (which will be restricted later), there needs to be a check of all paths from each node where there is a transition. This relies on the fact that the state in the finite state machine is uniquely determined at each node in the trie, and it allows an incremental evaluation of the state transitions instead of having to run the state machine from the start state ≥N times to find N matches. This is an optimal search, since for a given pattern and corresponding state machine, the approach executes the least possible number of state transitions needed to evaluate all URLs in the tree or rule them out. Entire subsections of the tree are ruled out as non-matches at the first failing transition.

This approach extends to the parallel matching of multiple patterns. Given a set of K patterns in their initial state, a traversal of the tree as described above can be performed, maintaining one state for each of the K patterns. The traversal to a subnode continues if any of the state machines accepts the transition (and for those machines that do not, they are ignored from that point on in that sub-tree). The search along a particular path stops when there is no machine that can make a transition, and the sub-tree of that path is ruled out. Some implementations may choose to perform some or all of the searches in parallel.

A solution to the second challenge builds on the solution to the first. It would be desirable to just mark the trie in a small number of places to indicate that all nodes below the marked points are invalidated. For arbitrary regular expressions, there is in general no single node below which all nodes are matches and all matching nodes are contained beneath that node. Therefore, in the general case there is a need to find a collection of nodes that cover all matching nodes and only matching nodes. The size of this collection may be close to the size of the matching set, so in the general case there may not be much gain by finding it.

Patterns that end with a wildcard, however, will tend to produce a smaller cover, and if the pattern is a constant string terminated by a wildcard, then the pattern corresponds to a unique node in the trie, below which all nodes are matches. This is ideal.

In general, whenever it is known that all nodes below a given node are matches for the invalidation pattern, the traversal can stop and mark the node in a way that says "everything in the sub-tree rooted here is invalidated at time T." Then, whenever a resource is looked up in the index, it is possible to keep track of the invalidation markers as the tree is traversed, computing the most recent invalidation time along the path to the node. This invalidation time is compared to the actual timestamp on the resource, and if it is older, it is considered invalid. If it is newer, that means it was refreshed or revalidated sometime after the most recent invalidation marker applying to it was set in the tree.

Note that as resources are filled and revalidated, their timestamps are recorded but the system does not need to attempt to clean up the tree's invalidation markers. The actual invalidation state of the resource is computed when it is accessed. This assumes that all access paths to the resource will go through the trie, and there will be no attempts to use the resource without also consulting the trie.

Assuming that not all properties will need the capability to do pattern oriented invalidation, and since hashes are useful for many things, the approach above may be best applied as an option for certain properties, implemented via an auxiliary URL index in addition to the MD5-based hash table. For properties with the feature enabled, all requests for resources in that property will go through the auxiliary index, and all invalidations will walk the tree, as described. For other properties, all invalidations will be matched per URL, by computing the hash and looking it up in the MD5 hash table.

The types of expression patterns should preferably be further constrained to be those that result in some maximum number of trie nodes as the cover for the matching set. The actual number of URLs in the matching set does not matter. This requires a fixed prefix in the invalidation; in order to support suffix invalidations (e.g., "*.jpg") additional such indexes would be needed.

Machine and CDN Configuration

Recall that a service (e.g., a caching service, a reducer service, a collector service, a rendezvous service, a control service, etc.) may be considered to be a mechanism (e.g., software and/or hardware, alone or in combination) that runs on a machine, where a "machine" refers to any general purpose or special purpose computer device including one or more processors, memory, etc. Recall too that a particular machine may run multiple CDN services, i.e., services on behalf of a CDN. As discussed above, the various CDN services that a particular machine is running on behalf of the CDN, or the various roles that a machine may take on for the CDN, may be referred to as the flavor of that machine A machine may have multiple flavors and a machine may change flavors.

This section describes how machines and services are provisioned and configured.

In all of the flows described here it is assumed that events are being generated and reported (as event streams) from the machine Starting a Service (S)

Figure 24B:
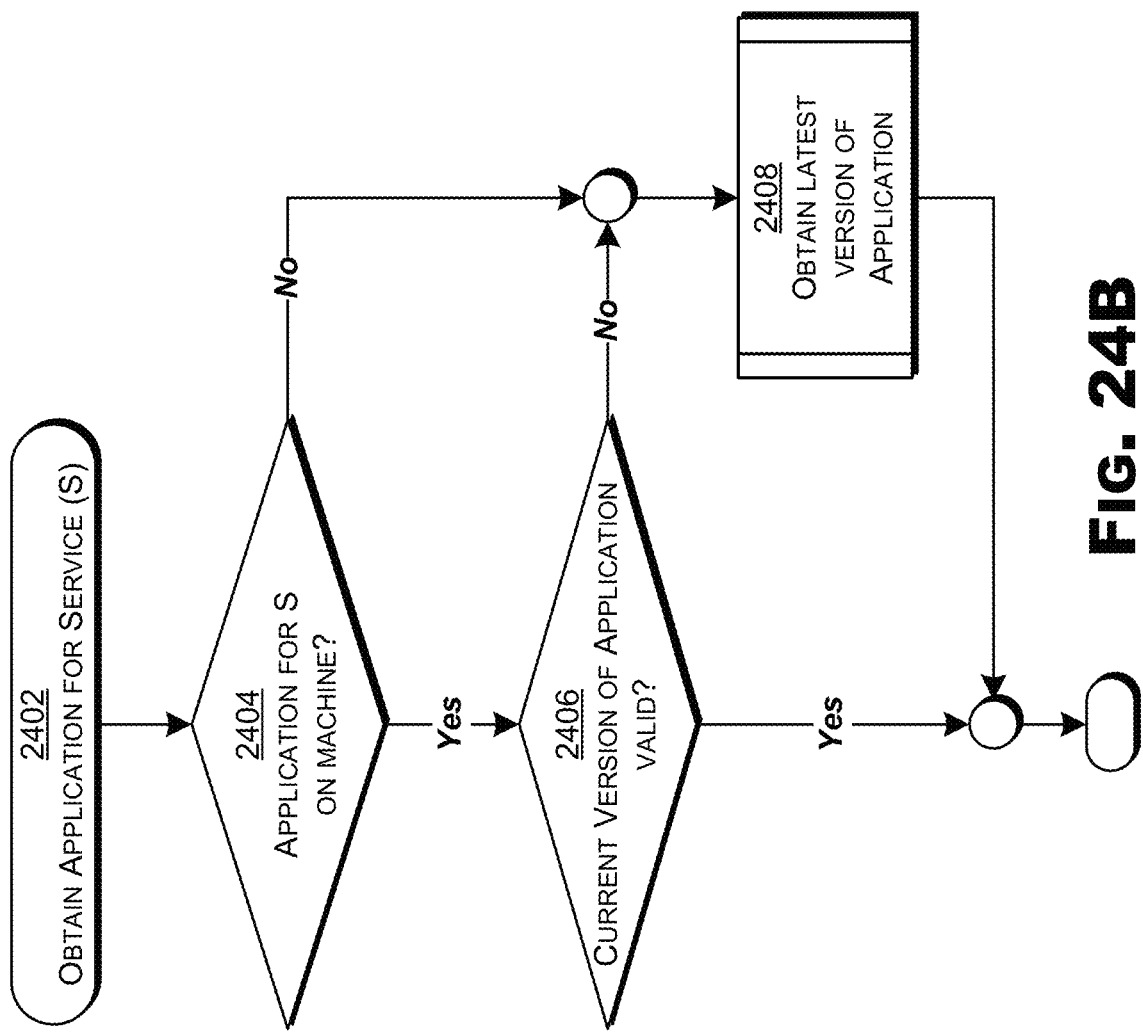

It is first useful to describe the process of starting a service (an arbitrary service) on a machine. In order to start running a service (S) on a machine, with reference to the flow chart in FIG. 24A, first obtain the application (code) corresponding to service S, i.e., to provision the service S (at 2402). Recall that the code (software) corresponding to a service may be referred to as the application for that service and that the application for a service may be treated as a CDN property or resource. Thus this check for application code may correspond to determining whether or not there are resources on the machine corresponding to the required code for the service S. Since the application code for service S comprises one or more resources (CDN properties), the application code may be invalidated in the same manner as other resources. With reference to FIG. 24B, to obtain the application (code) corresponding to service S (at 2402), first check to determine if the code is already on the machine (at 2404). If there is no code (determined at 2404), or if the current version of the code is not valid (determined at 2406), then the machine obtains the latest version of the application for the service S (at 2408).

Figure 24C:
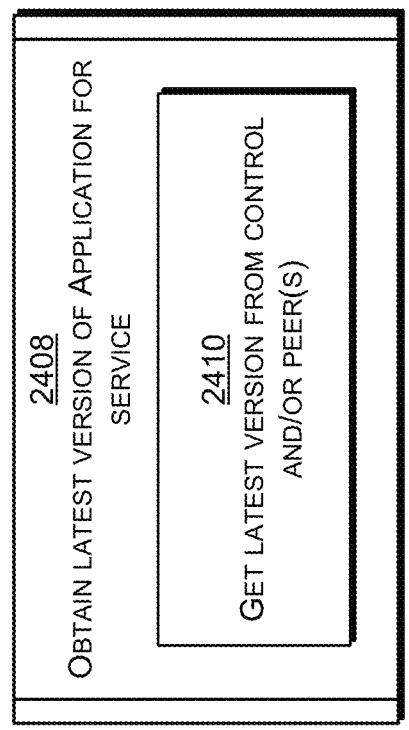

With reference to FIG. 24C, the machine may obtain the latest version of the application (at 2408) by obtaining it from the control mechanism and/or from a peer (at 2410). Since an application may comprise more than one resource, it may not be necessary to obtain all of the resources comprising the application. That is, it is only necessary to obtain the invalid or missing resources.

With the latest version of the application (either already present or obtained at 2402), the machine then obtains configuration information for the service (at 2412). That is, with the application for the service provisioned, the machine then configures the service. With reference to the flow chart in FIG. 24D, in order to obtain configuration information for the service (at 2412), the machine determines whether it already has configuration information for service S (at 2414), and, if so, whether or not that configuration information is valid (at 2416). If the computer does not have current/valid configuration information (as determined at 2414, 2416), then it obtains the latest version of the configuration information for the service S (at 2418). The machine may obtain the configuration (at 2418) by obtaining it from the control mechanism (at 2420, FIG. 24E).

Figure 24D:
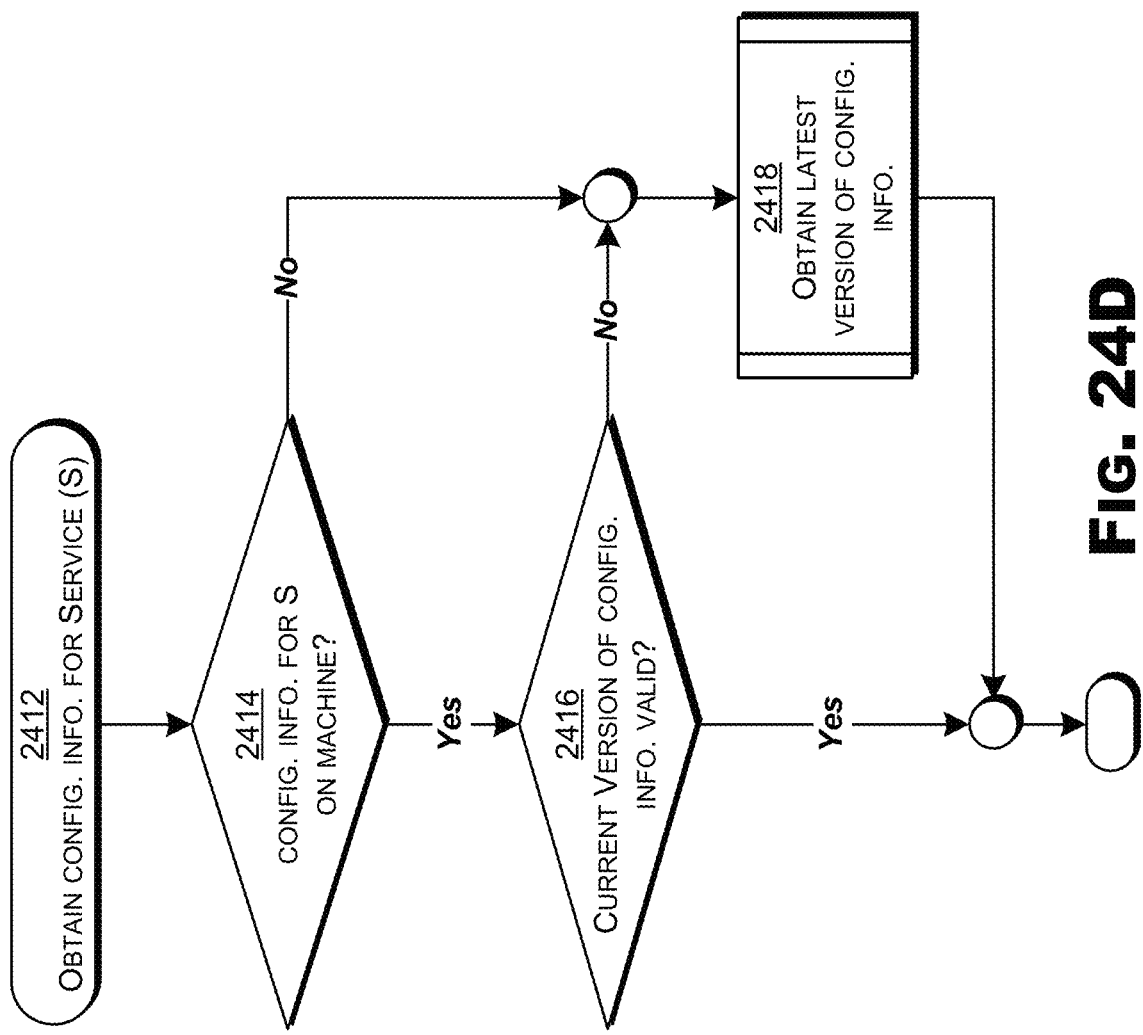
Figure 24E:
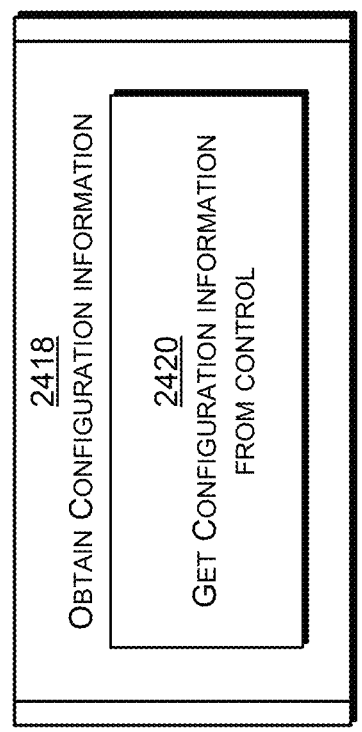

Those of ordinary skill in the art will realize and understand, upon reading this description, that the flow charts in FIGS. 24B and 24D have the same structure. As with the application (code) for a service, the configuration information for a service is preferably made up of one or more resources (CDN properties) on the machine. Therefore the same approach may be used by the machine to obtain the configuration information. It should be appreciated that although two flow charts are used here to describe the process, the same underlying mechanisms may be used to obtain current versions of these resources (whether they be application code or configuration information).

With reference again to the flowchart in FIG. 24A, having obtained the application for service (S) (at 2402) and the required configuration information for service S (at 2412), the system then needs to determine whether a version of this service is already running on the machine (at 2422). As noted earlier, a machine may run multiple services, and some of these services may be of the same type. For example, a machine may run multiple reducer services, alone or along with other kinds of services. Preferably there is only one Autognome (S0) service per machine If it is determined (at 2422) that a version of this service (S) is already running on the machine then the system determines (at 2424) whether the new version of the service is to replace the old version or whether they are to both run on the machine. If the new version is to replace the old version (as determined at 2424), then the system halts the old version (at 2426) and then starts the service (S) (at 2428).

If it is determined (at 2422) that this service (S) is not already running on the machine, or if there is an old version and it is not to be replaced (as determined at 2424) then the system starts the service (at 2428).

Halting a Service

With reference to the flowchart in FIG. 24F, when a running service is to be halted (e.g., "Halt Running Service" at 2426 in FIG. 24A), then the system should determine (at 2430) whether the service should stop immediately (a hard stop) or whether it can wind down. If the service should make a hard (immediate) stop (as determined at 2430), then the service is terminated (at 2432). On the other hand, if the service should first wind down (as determined at 2430), then the service winds down its activities (at 2434) before terminating (at 2432).

Winding down a service (at 2434) is service dependent and may include one or more of the following:
1. Stop accepting requests (at 2436)
2. Flush the system (at 2438)
3. Finish current processing (at 2440)

It should be appreciated that the various wind-down activities may be performed in any appropriate order, including in series or in parallel. No order is implied for these three activities in the diagram in FIG. 24F. Flushing the system may also (or instead) take place after the service is terminated (at 2432).

As an example, a cache service may wind down by taking no more requests; and completing servicing of its current requests. As another example, a reducer service may wind down by no longer accepting incoming event streams and finalizing its processing on the event streams that it already had. A rendezvous mechanism may wind down by no longer accepting incoming rendezvous request (e.g., name resolution requests) and by finalizing and processing its outstanding requests. A collector mechanism may wind down by no longer accepting inputs and by completing processing on the data it already has. Normal winding down activity may be curtailed to allow for halt processing in cases that prefer to avoid an immediate halt but require an expedited halt.

Those of ordinary skill in the art will realize and understand, upon reading this description, that different and/or other wind-down processing may occur.

Startup Service (S) [2428]

Some services may depend on one or more other services and may require the one or more other services to be running before they can begin. Each service may start its dependent services (at 2441 in FIG. 24G) as part of its startup process.

In order to start its dependent services (at 2441), with reference to FIG. 24H, the system first determines the list of dependent services (at 2450) and then starts each of them (at 2452) using the same "start service" process described with reference to FIGS. 24A-24I. It should be appreciated that dependent services may, themselves, have dependent services.

Prior to starting, a service may need to be configured and conditioned (at 2443). Some configuration may need to take place before the service is started. For example, typically each service is configured to produce certain log information.

The configuration and conditioning of a service (at 2443) may also include certain administrative tasks. Preferably each service registers with control mechanism (at 2454, FIG. 24I). A service may also register (at 2456) with various other services (e.g., with reducers and/or collectors to which it has been configured to send event streams). The service preferably also starts event logging and streaming (at 2458).

A service may start immediately or it may warm up before starting. Accordingly, with reference to FIG. 24G, when a system starts a service (e.g., at 2428 in FIG. 24A), the system first determines (at 2442) whether the service is to start immediately or whether it should first warm up. If the service should start immediately (as determined at 2442), then system starts running the service (at 2444). On the other hand, if the system should first warm up (as determined at 2442), then the system performs a warm startup (at 2446).

For a warm startup the system performs one or more warm up strategies (2448-1 . . . 2448-k). As with winding down, warming up is service dependent, and there are various warm-up strategies that can be adopted for each kind of service. As shown in FIG. 24G, the various warm up strategies (2448-1 . . . 2448-k) may be performed in any order(s), including fully or partially in parallel. No order is implied by or should be read into the order in which the activities are presented in the drawing.

Autognome

For any machine on (or to be added to) the CDN, the setup of Layer 0, should minimally ensure that Autognome (S0) is installed and will be run as a service, along with a minimal configuration file that defines the agent ID, a list of initial control mechanism names to contact for further instructions, and possibly some keys and certificates. Preferably no other setup is required.

Figure 24K:
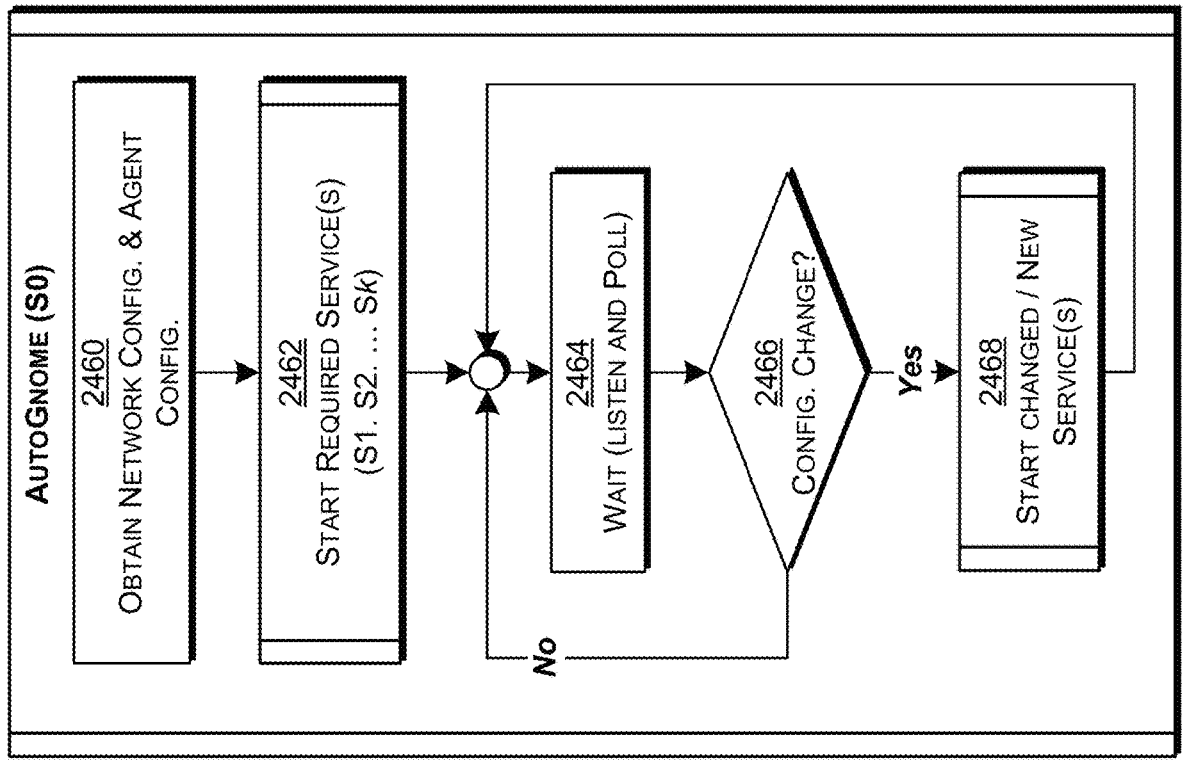
Figure 24J:
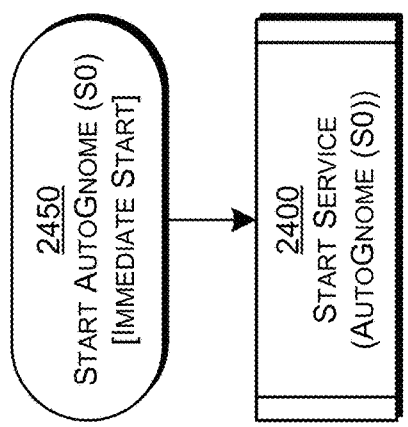

Autognome may be started as with any other service. Thus, with reference to FIG. 24J, Autognome may be started (at 2450) using the start service processing described with reference to FIGS. 24A-24I. Preferably Autognome (S0) is started with an immediate start.

When such a minimal system is (re)started, Autognome will read the minimal configuration file and also detect where it last left off on this machine, e.g., by looking for some persistent state (which will be reapplied if necessary). Using knowledge of its identity, Autognome (S0) will then contact the control mechanism (using information in the initial minimal configuration file) for its network configuration and its agent configuration (at 2460, FIG. 24K). The network configuration may define, e.g., the actual control node(s), NDR node(s), and application code repositories it should communicate with. The agent configuration defines the desired state of services to be run on the local machine. After retrieving the agent configuration, Autognome (S0) establishes the desired service state, loading RPMs as needed from its assigned repositories and logging its state changes via events to the NDR nodes (and to its local persistent store) (at 2462).

From that point on Autognome (S0) listens for additional commands (e.g., over HTTP) and polls the control mechanism for updates to its agent and network configuration every so often (say every 10 minutes) (at 2464), and retrieves/reapplies such configurations when necessary (at 2466, 2468). It should be appreciated that process of starting changed/new services (2468 FIG. 24K) may use the start service process (2400 of FIG. 24A), and may include shutting down unneeded services.

In preferred implementations Autognome (S0) will be idle most of the time.

Preferably steps in configuration state changes at a local agent that are applied by Autognome (S0) are logged as events to the appropriate NDR agent(s). These event streams may be reduced in the usual fashion to get global, real-time feedback on the changes taking place in the network. Individual Autognome services can also be queried directly for status information via HTTP requests.

When Autognome starts multiple services (e.g., at 2462 and possibly at 2468 in FIG. 24K), those services may be started in any order (unless the system imposes some ordering). Thus, multiple services may be started in series, in parallel, or in some combination thereof.

Autognome can be used for monitored and controlled deployment of new versions of CDN software. This deployment, under control of the control mechanism, need not be applied to all machines. For example, suppose a CDN operator wants to deploy a new version of CDN software (e.g., caching software) to some subset of clusters that meet certain criteria, and that this new version is backward compatible (i.e., the service can be restarted and the cache will still be valid). The CDN operator also wants to do this gradually and with minimal disruption, view the status of the change as it happens, and be able to back it out if something goes wrong.

The control mechanism knows the version(s) of CDN software that each machine should run. This version information may be defined, e.g., in the agent configuration. Changes in a machine's agent configuration file may cause changes in the software running on that machine The control mechanism can apply arbitrary rules to pick some of the machines to be updated. For example, the control mechanism may deploy a new version of CDN caching software on all clusters with cluster IDs divisible by 4 in a particular data center. A rule in the data center level agent configuration template may be modified to use the new version of the CDN software when clusterID mod 4=0. A new version of the agent configuration file would then be detected at the next control pulse, and the change would be initiated.

When a machine (via Autognome's consumption of the new agent configuration) learns that it needs to run a different version of CDN software it issues a stop command to the services that need to be stopped (at least the service being updated, possibly others), it installs the proper version of the RPMs needed, and then restarts the required services. The machine (perhaps via Autognome) then runs a local health check to determine whether or not the change was successful. If unsuccessful, the change is undone. If the undo fails, the machine will attempt a recovery (as defined by the agent's configuration, and may involve a restart of the machine). Such reconfiguration would generally be performed by machines coordinating the activity amongst themselves. For instance, when a cluster is notified that it is preferably, but not necessarily, upgraded to a new version of software, this will typically be performed as a rolling upgrade across the machines in the cluster; a first machine is selected and the upgrade applied to and the second only begins to perform its upgrade once the first has been verified as successfully upgraded. This reduces impact to the network as a whole by minimizing the number of machines that are winding down at any given time.

At each step of the way, events are generated to enable remote monitoring of the actual status of the machine during the deployment. Such events can also be used to influence the rendezvous system. For instance, when performing an upgrade of cache service software on a cluster of machines, new client requests may be directed to alternate locations until that process has completed (either bringing up the new version of the cache service software on the cluster being upgraded, or after having been successfully rolled back if a problem is encountered). Alarms can be set up based on collection of these events in NDR to detect systems that are stuck in failed attempts at reconfiguration (e.g., it tried a restart but never came back). Such systems may require manual intervention.

Using Autognome for Automatic Binding Reconfiguration

Bindings establish the mapping between groups of properties and a set of machines provisioned to serve those properties in a particular way. Changing bindings involves (1) recognizing that the current bindings are over or under provisioned, (2) deciding what a better binding would be, and (3) making the necessary changes. This all needs to be done in a globally stable manner (in the control systems theoretic sense of stability). Collaboration between the NDR and the control mechanism provide the means to implement (1) and (2), and Autognome provides the mechanism for (3).

For (3) to be possible even with Autognome, there is preferably either a pool of available machines that can be rebound on demand, or binding changes need to be zero sum (capacity removed from one binding group must be allocated to another one). If the pool of available capacity is modeled as a binding group of its own (or perhaps several), then all changes can be considered as being zero sum. These binding pools may be defined by geography and/or by the kind of hardware their machines have in common. Other active binding groups may then be defined to be linked with one or more of these virtual binding pools. The pools are then the source when additional capacity is needed in a binding group, and they are the destination of capacity when a binding group has overcapacity.

To bring new systems into a binding group and to take systems out, it may be preferable for additional service specific commands to ramp a service up (e.g., warm/prefetch an edge cache) or ramp a service down (e.g., drain an edge cache). These operations must be accounted for in the command set that Autognome can issue to specific services.

Adding a Component or Service to the CDN

Adding a Machine to the CDN

When a new CDN machine is added to a CDN, the CDN (the control mechanism) determines what role(s) that machine should take within the CDN (i.e., the control mechanism determines what flavor the machine should have). This role/flavor determination may be based, at least in part, on information provided by the machine to the control mechanism. The new machine will then provision and configure the appropriate services for its role(s). Different services will have different configuration requirements and options.

Those of ordinary skill in the art will realize and understand, upon reading this description, that a new machine may be one that has never been connected to the CDN before or one that has been disconnected from the CDN for some reason.

Addition of a new machine to a CDN is described here in greater detail. For the sake of this description, and with reference again to FIG. 2A, a "new" CDN machine is a machine 300 configured with at least sufficient core program(s) 302 and at least one provisioning service S0 ("Autognome") to enable initial provisioning of the machine within the CDN. As part of its configuration, the machine 300 is preferably configured with a hostname of the CDN's control mechanism (e.g. control.fp.net), and upon being connected to a network (e.g., the Internet), the machine contacts the control mechanism and performs some initial registration. This process may allow the control mechanism to determine whether the machine is authorized to participate in and be a part of the CDN. The registration process is preferably automated and performed by programs or services (e.g., Service S0) running on the machine and on the control mechanism.

In presently preferred implementation, a new machine may be added to a CDN by starting the Autognome service (S0) on the machine as described above (FIG. 24J).

The machine may include information (e.g., certificates) to enable the control mechanism to perform authentication as part of the initial registration.

Prior to provisioning and configuration of other services, the initial service (Service S0) preferably confirms that it is up to date. If not, S0 updates itself and the machine starts running the updated version of S0 (terminating the prior version). It may be necessary for the machine to reboot itself one or more times in order to be running the most current version of S0. In general, service S0 ("Autognome") always checks that it is running the latest version of itself before proceeding with any provisioning or configuration.

Once a current version of Autognome (S0) is running it contacts the control mechanism to obtain configuration information. The machine (via Autognome (S0)) preferably also provides the control mechanism with information about the machine itself (e.g., its capabilities, hardware, etc.). This information may have been provided as part of the registration process.

Although the machine was preconfigured with a hostname of the CDN's control mechanism (e.g. control.fp.net), the control mechanism may provide the machine with a different address to use once registration has taken place.

The control mechanism determines what role(s) the machine should take within the CDN. This determination may be based, at least in part, on one or more of the following factors:
  (1) information provided by the machine (e.g., capabilities, hardware, etc.),
  (2) a network location of the machine (as determined by the control mechanism),
  (3) current needs of the CDN,
  (4) load on components of the CDN;
  (5) health of components of the CDN.

Those of ordinary skill in the art will realize and understand, upon reading this description, that different and/or other factors may be used to determine the flavor of a machine. In addition, it should be understood that operator intervention may be used to override control mechanism decisions about a machines role(s).

Some of the information used to determine a machine's role(s) (e.g., load and health information) may have been determined by the control mechanism using the reducer/collector networks.

Once Autognome (S0) knows the role(s) that the machine is to play, it may provision and initiate the services corresponding to each of those roles. For example, if the machine is to be a cache server (i.e., run caching services), then Autognome (S0) provisions and initiates the appropriate caching services. Similarly, if the machine is to be a reducer (i.e., run reducer services), then Autognome (S0) provisions and initiates the appropriate reducer services, and so on for collector services, rendezvous services, etc. These services correspond to services 308 (S1 . . . Sk) running on the machine 300. Recall that a machine may run multiple services of different kinds, so that, e.g., a machine may run cache server services and reducer services and collector services.

The machine may be shipped with software code for each of the services that a CDN machine is likely to run, or Autognome (S0) may download the code, as needed (e.g., using Repoman, described above). If the code for a service is already available on the machine, then its validity will need to be checked. The machine may treat software code for the various services as CDN resources, and then use the CDN's invalidation process to determine whether or not to update the code for any particular service.

Thus, for each role that the machine will take (as instructed by the control mechanism), Autognome (S0): obtains/updates the code for the service(s) associated with that role; and then configures and initiates the service(s) associated with that role.

As discussed above, each service may also produce certain log information. As part of its initial configuration, each service's log events are configured. Since log events are preferably sent to one or more reducers, the addresses of those reducers need to be provided to the services. Each service should preferably register with the reducers to which it is to send event streams, so that the reducers know to expect the streams and the services can ensure that at least one reducer is getting their streams.

Once a service is initialized it may begin its operation within the CDN. In some cases, as discussed below, delayed or modified startup may be used in order to "warm up" the service.

Adding a New Cache Service to the CDN

When a new cache service is to be added to the CDN (i.e., a new cache service is to be started on a machine in the CDN), the control mechanism needs to get information about that new cache (e.g., what group/region it is in, its IP address, its VIP, some capacity information, etc.). Similarly, in order to operate within the CDN, the new cache machine needs to get the current customer configuration data and other configuration data from the control mechanism.

Preferably a new cache service is started using the process for starting a service described with reference to FIGS. 24A-24I.

A cache service may be pre-configured so that when it connects to the network (e.g., to the Internet) it sends a request to the control mechanism for the resources that it needs. These requests can be made of the control mechanism using standard HTTP requests. The new cache service may, e.g., request a single configuration object from the control mechanism, and that configuration object may, itself, include the URLs of other configuration objects needed by the cache service. The control mechanism may be configured to similarly request configuration data from the new cache service, also in the form of one or more HTTP requests, although preferably the new cache provides needed information to the control mechanism as part of one of its requests. It should be understood that appropriate security and encryption may be used to prevent unauthorized connection to a CDN. Once the new cache has sufficient customer data (global data 1108 in FIG. 15), it can begin to function as a CDN cache service.

In some cases the new cache service may go through a warming phase (corresponding to "Warm Startup" 2446 in FIG. 24G) in which it may query its neighbors or peers and preemptively pull the GCO (Global Configuration Object) and some CCS data (e.g., of popular customers at the neighbor) before accepting any incoming client connections (corresponding to a warm-up strategy 2448 in FIG. 24G). The cache service may, in some cases, pre-fetch popular content (corresponding to another warm-up strategy 2448 in FIG. 24G). In some cases the new cache service may also influence local load balancing, so that for a period of time it may get less traffic than other members of the cluster (e.g., until its cache miss rate is substantially the same as the rest of the cluster of which it is a member) (corresponding to another warm-up strategy 2448 in FIG. 24G).

The addition of a cache service to a CDN is summarized here: a cache service newly added to the CDN preferably first registers with the control mechanism.

Once registered, the cache service obtains configuration data from the control mechanism. The cache may request the configuration data using one or more HTTP requests. In some cases, e.g., as noted above, the new cache service may request a single configuration object from the control mechanism, and that configuration object may, itself, include the URLs of other configuration objects needed by the cache.

In some cases, when a cache service is added to a CDN, the cache service may provide information to the CDN (i.e., to the control mechanism) about the cache's capabilities and/or capacities.

The CDN (via the control mechanism) may allocate the cache a specific role (or roles) within the CDN. Such role allocation may be based, e.g., at least in part on information provided to the CDN from the cache server. For example, the CDN may assign a newly added cache server the role of serving certain classes of resources/properties (e.g., by size, by type, by owner). The CDN may assign a newly added cache service a set of peers. This peer assignment may be based, e.g., on location information (e.g., an IP address) associated with the new cache server. The CDN may allocate a cache service to a group or sector. Existing members of the cache service group or sector may need to be notified of the addition, in order to accept peering requests from the new server.

A cache server may also determine its peers by determining its location (e.g., behind a switch in a cache cluster).

It should be appreciated that the registration may be combined with the process of obtaining the configuration data.

Some of the configuration data obtained during this process may correspond to some or all of the global data 1108, and preferably include the GCO. Since the CDN components essentially serve content to each other (e.g., the control mechanism serves CDN configuration content to the new cache (and vice versa)), from the point of view of the CDN components, as noted, the CDN may sometimes be considered a customer. As such, the CDN may itself have one or more CCSs associated therewith. Preferably the configuration data obtained from the control mechanism by the cache service includes one or more CCSs associated with the CDN. These CDN CCSs will allow the cache to perform the appropriate processing when serving CDN content to other CDN components.

The control mechanism may obtain data from the new cache. While the cache may provide some information to the control mechanism during the initial registration process, the control mechanism may also obtain additional information from the new cache after registration. This information may include information, e.g., relating to the capacity and type of the new cache.

The new cache will also preferably verify that it is up to date as far as system/application software. This may require a bootstrap process to pull new software packages, e.g., in the form of RPMs from caches/control mechanism, verifying them, installing them and restarting (up to and including rebooting the server to pick up new operating system components for instance).

At this time the new cache is ready to begin serving content on behalf of the CDN. However, it may be desirable in some cases for the new cache to "warm up" by obtaining information from other caches. In particular, the new cache may obtain customer data (e.g., CCSs) from nearby or peer caches in anticipation of serving content on behalf of those customers. Preferably the new cache will query members of the cluster it is in to obtain the popular CCSs and popular content that those cluster members know of. A cache may consider other caches to be nearby based on various factors, e.g., some measure of network distance, whether the other caches are part of the same cache cluster or cache site, etc.

It should be appreciated that since the cache is using a hostname to connect to the control mechanism, the CDN rendezvous mechanism can rendezvous the cache to a control mechanism machine or component that is "best" or "optimal" for that cache. In some cases, once the cache has discovered (or been told) which other caches are members of its cluster and its peers, it may issue requests destined for the control mechanism to them as well, or instead. This may reduce direct load on the control mechanism and accelerate retrieval of such data.

New Cache Warm Up (Corresponding to "Warm Startup" 2446 in FIG. 24G)

When a new cache service is added to a CDN, it may begin processing CDN requests as soon as it has been recognized by the CDN (i.e., as soon as it has registered with the CDN), and obtained sufficient information about the CDN. The minimal amount of sufficient information that a new cache needs before it can begin handling requests includes some global information. This minimal information will allow the cache to at least know where to go to get additional information needed to handle requests.

In preferred cases, a new cache service should obtain at least a copy of the GCO before starting to accept and handle resource requests. Once a cache has the GCO, it can at least determine whether requests are for properties (i.e., for resources associated with CDN customers). To actually serve a request on behalf of a particular CDN customer, the cache also needs a certain amount of customer-specific data, including, specifically, the CCS(s) for that customer.

There are various degrees to which a newly added cache can warm up before handling resource requests. At one extreme, the newly added cache can go online (i.e., begin handling requests) as soon as it has the minimum information needed (e.g., the GCO). In those cases, the cache will pull required CCSs as needed, effectively on demand. In such cases, the initial request response time for that cache will be relatively slow (since it has to essentially configure itself for each customer).

The newly added cache service may also look to its peers or to other caches in the same cluster or cache site to determine additional configuration information that it might beneficially have. For example, as noted above, the cache may obtain and process CCSs from peers or other nearby caches on the assumption that it will be serving content on behalf of the same customers as those other peers and caches. In these cases, since the new cache has already pre-processed CCSs from various customers, once it goes online it will not have any delays relating to those customers.

At another level, as discussed above, the cache may also look at the actual content (properties) that its peers and/or other nearby caches are serving, and may choose to pre-populate its cache storage with that content. In some cases, the new cache may pre-populate its cache storage with known popular content that is being served by its peers and/or other caches.

In addition to (or instead of the above), a new cache may also warm up (i.e., preload certain information and/or content) based on information or instructions received from the control mechanism during registration. For example, the control mechanism may advise a new cache that it might be serving a certain type of content on behalf of certain content providers. In these cases, the new cache can preload the CCSs and possibly some of the content for those content providers.

Since the new cache may serve content to other CDN components (e.g., to peers), the CDN may preload the CDN's CCS(s) as part of a warm-up process.

Adding a New Reducer Service to the CDN

In addition to registering with the CDN, a reducer service preferably knows where to send its event streams (its own log streams), where to send the output of its processing (i.e., which collectors), and which services are sending it event streams. In an embodiment, a reducer also knows what filter function(s) to apply to its inputs.

Adding a New Collector Service to the CDN

In addition to registering with the CDN, a collector service preferably knows where to send its event streams (its own log streams), where to send the output of its processing (e.g., to the control), and which reducer services are sending it event streams. In an embodiment, a collector also knows what function(s) to apply to its inputs.

Adding a New Rendezvous Service to the CDN

In addition to registering with the CDN, a collector service preferably knows where to send its event streams (its own log streams). A rendezvous service also needs to obtain the latest version of the rendezvous information (e.g., the mapping of supernames (CNAMES) to BNAMES, BNAMES to VIPs) as well as where to retrieve load and connectivity data from (e.g., rendezvous collectors).

Example

Figure 24L:
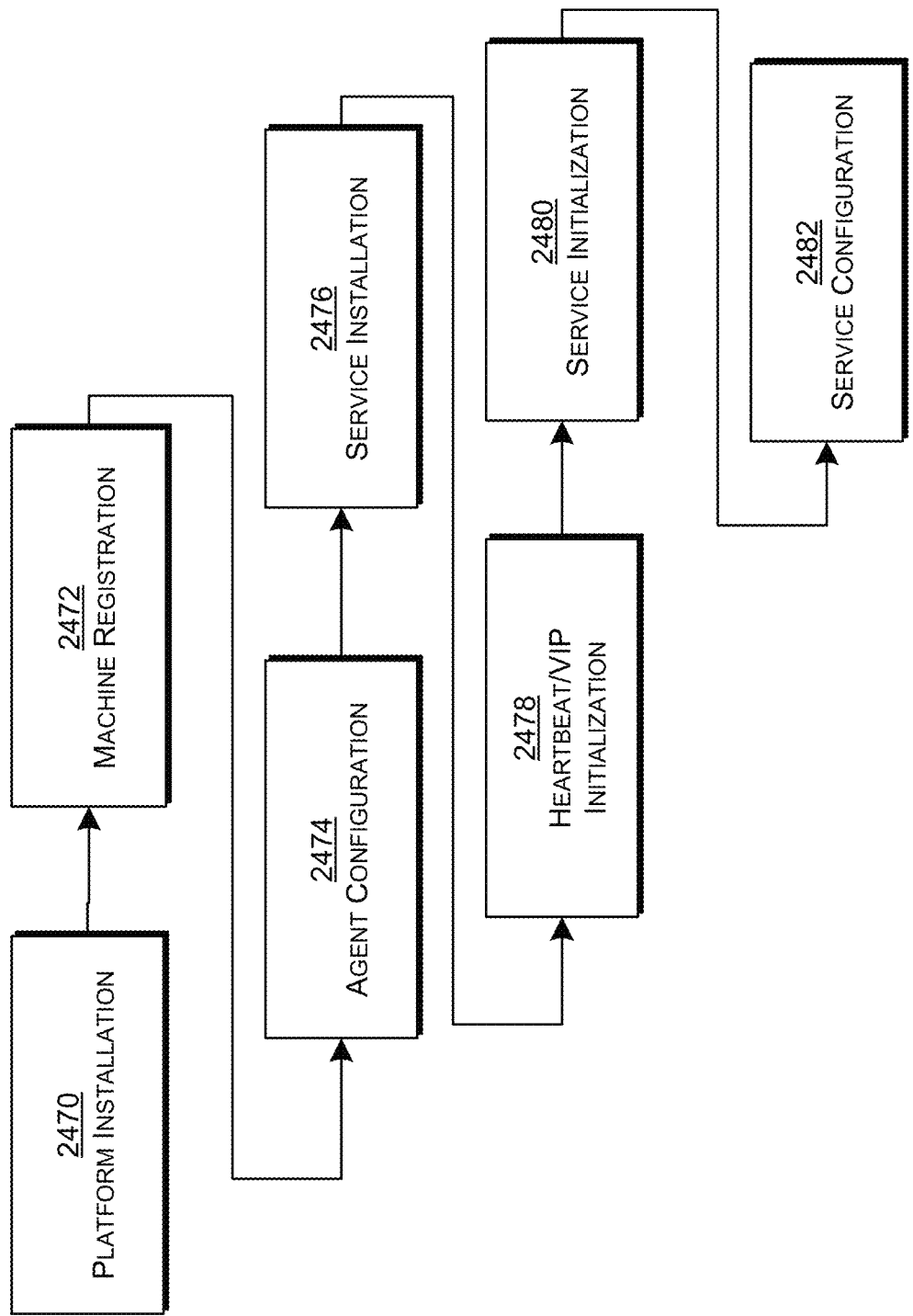
FIG. 24L is a flow chart showing an exemplary process of adding a new machine server to an exemplary CDN in accordance with an embodiment.

Exemplary initialization of a new machine joining an existing CDN may be accomplished through the following steps (with reference to the flowchart in FIG. 24L):

1. (Platform Installation 2470) An authorized user gets access to the machine and installs the minimal configuration (e.g., a Linux distribution, kernel, and Autognome setup), establishes the globally unique physical identity of the machine, and configures the IP addresses of the machine's management NICs.

2. (Machine Registration 2472) The authorized user runs an Autognome command on the machine to register it with some control network (specified by the user). The user is authenticated, and then the machine's physical identity is registered, an agent ID is assigned, and a client certificate for the agent is distributed to the machine from the control network. The control network to contact for further instructions may also be changed at this step.

3. (Agent Configuration 2474) Once registered, the machine is initially in a "drone" state, a lone member of the CDN just running the OS and Autognome. Autognome begins making regular contact with the control network, authenticating itself each time with its assigned client certificate, pulling the configuration of the agent and changing its state accordingly. This configuration specifies, e.g.:
   the control nodes to contact for future instructions;
   the event reducers to which to send agent configuration state change events;
   a manifest of control resources with version information. This manifest lists separately retrievable control resources that specify:
      the service versions to run and what state they should be in;
      the cluster to join and the VIPs and ports to configure;
      the client certificate to use for future control contacts.

4. (Service Installation 2476) Queries a remote RPM repository for the RPMs needed to run the assigned service versions, and installs them.

5. (Heartbeat/VIP Initialization 2478) The Heartbeat (HB) service is started, which reads the cluster and VIP configuration information from a set of local files generated by Autognome, configures NICs and host firewalls (e.g., iptables) for the assigned VIPs and port numbers, and begins monitoring the status of VIP/ports on all machines in the cluster, continuously updating NICs and/or the firewall as VIP availability changes or configuration changes are received via changes detected in the local files.

6. (Service Initialization 2480) Starts all other assigned services, providing configured service identifiers and launching each service into a particular target state.

7. (Service Configuration 2482) Each service may initiate further contact with the control network for service specific bindings and other configuration information (such as service specific reducers to use). Services which accept requests will begin listening on VIPs, which the HB ring will detect and respond to with corresponding firewall changes.

8. (Steady State) Eventually all machines in the cluster will converge to a consistent view of VIPs that are up, with all configured services in the desired state and listening to the right VIPs.

Machine Reconfiguration

Once configured the first time, a machine's Autognome may periodically poll one of its assigned control nodes for configuration changes. Changes could include one or more of:
   Assignment to different control nodes or reducers;
   Allocation of a different client certificate;
   Assignment to a different cluster;
   Allocation of different VIPs;
   Allocation of different services, different service versions, or state changes for existing services.

Autognome will detect changes in control resources and retrieve new ones only when changed, and when new control resources are consumed it will detect those aspects of the new configuration which are different from its current state, and apply only the changes. First, items that are not part of the new configuration are brought down (which may involve a wind-down phase):

If the cluster changed, then there may be agents from the old cluster that are no longer members of the new cluster and these will be deleted from the set of agents that the local HB will monitor.

Current VIPs/ports not in the new configuration will be shut down (they will be deleted from the configuration files read by HB and other services will be notified that certain VIPs/ports are no longer active and they will stop listening to them).

Currently running service versions which are not in the new configuration will be stopped.

At this point the machine is in a state reflecting the intersection of the old and new state. What remains is to add new items that were not in the old state.

New agents are added to the list of agents monitored by HB by writing to the file that HB uses to detect cluster changes.

New VIPs/ports are configured by HB by writing to the file that HB uses to define the VIPs in the cluster.

New services are launched into their target state and existing services may be moved into new states by running service specific commands (or Autognome may leave it to the services to detect their new target states).

It should be appreciated that the process of moving from the old configuration to the new may follow a different order, for instance starting new services prior to taking down old ones, due to the specific requirements of the service and the state of the network.

Services

Service States

Each service has a service-level state, a VIP/port level state for each unique VIP/port, and a state per request collection. The value of each of these state variables is taken from a discrete set of states that depends on the type of state variable and type of service.

The service can be commanded to a different state (at the service level, VIP/port, or request collection level) either via an argument in the command that launches the service, via a configuration retrieved from the control network, or via a management command. The actual mechanisms available, and the meaning of different states are dependent on the service type.

New Service Initialization

Each service instance will be launched with arguments specifying a service identifier, a control node to contact, and a target initial state. Once launched, the service will contact the control node for its configuration, which will contain:

the control nodes to contact for future instructions;

a new target state;

the event reducers to which to send service state change events;

a manifest of other control resources with version information, listing separately retrievable control resources that specify:

VIPs/ports to listen to for connections;

layered request configurations (an LCO per layer), which may lead to a large number of other configuration objects being retrieved based on the requests this service is supposed to handle;

the client certificate to use for future control contacts;

Potentially many other things, depending on the nature of the service the cluster is to join and the VIPs and ports to configure.

Service Reconfiguration

Once initially configured, a service instance will periodically poll its assigned control node for configuration changes. Additionally, some services may provide management interfaces through which configuration changes can be pushed to the service. The net effect of either of these is that the service will detect differences between its current (old) configuration and its new one, and it will apply only the changes.

Modifying the Flavor of a Machine

As discussed above, a machine may have multiple flavors and a machine may change flavors. In general, as part of a flavor change for a machine, any and all of the services running on that machine (except for the Autognome service (S0)) may be terminated, and any possible CDN services may be initiated. For example, a machine that is running a caching service may be modified to also run a reducer service. As another example, a machine that is running multiple reducer services may be modified to run an addition reducer service. As yet another example, a machine that is running caching services may be modified to run rendezvous services (and no caching services).

The flavor change of a machine may be initiated by the control mechanism interacting with the Autognome service (S0) running on that machine, whereby the control mechanism tells the machine what services it should be running. As described above, Autognome is a service that runs on all CDN machines and determines (at 2464-2462, FIG. 24K) whether configuration changes (i.e., service changes) on a machine are required. For example, having received instructions from the control mechanism (at 2464), Autognome will terminate services, as needed, and will initiate needed new services (at 2462). New services may be initiated in the same manner as for new machines (discussed above with reference to FIGS. 24A-24H). In some cases the new services may be started while the machine is still running. In other cases, the machine may have to be restarted before the new services can begin their operation.

Instructions to the Autognome service (S0) to modify a machine's flavor may be obtained from the control mechanism. The control mechanism may determine that a machine should change its flavor (run different and/or other services) based on information determined from event streams processed by the CDN. For example, as shown in FIG. 2D, the Autognome service (S0-A) receives control information (C) from the control services. That control information may have been determined from event streams from any/all other CDN services. For example, the control may determine, based at least in part on event information, that a particular rendezvous service is not active. In that case the control mechanism may determine that one of the other machines in the CDN should provide rendezvous services. The control mechanism selects a machine (e.g., a machine currently providing caching services) and instructs the Autognome service (S0) on the selected machine to change that machine to run rendezvous services. The machine may be selected, e.g., based on its load. For instance, a lightly loaded caching service may be terminated without much loss of effective network capacity. The Autognome service (S0) on the selected machine terminates the caching service that was running on that machine and starts up a rendezvous service on that machine. As noted, service termination may follow certain protocols based on the type of service and on the urgency of the change. In some cases the rendezvous service may be started before the caching service is terminated.

Termination of Services

As discussed above, with reference to FIG. 24F, when a machine is instructed to terminate certain services, that machine may need to perform a clean shut-down process (i.e., a wind down 2434). For example, the machine may need to continue some or all of those services in order to satisfy current and ongoing requests. Timeout(s) or thresholds may be used to constrain the wind down period, based in part on the type of service and the desired state of the machine after service termination.

The Executive

It is anticipated that in a CDN a cache machine with a 10 Gb/sec link, serving about 1 Mb/second per client, should be able to serve on the order of 10,000 concurrent clients, with about ten (10) activities per client. This requires on the order of 100,000 concurrent activities. The inventors realized that in order for a cache machine (and thus a CDN) to operate efficiently and to take advantage of new multi-core computer architectures, the cache machine would have to implement some efficient form of concurrency.

More specifically, and based on their experience with CDNs, the inventors realized and understood that network applications (e.g., serving and distributing content in a CDN) typically involved long wait periods. They therefore realized that it would be useful to perform many small jobs in order to be efficient (i.e., in the case of a CDN cache, it would be beneficial to do tens or even hundreds of thousands of things concurrently). They also realized that it would be useful and beneficial to keep all processors (CPUs) active simultaneously. The inventors realized that the handling of an individual request in this type of application generally consists of small amounts of computation separated by relatively long wait times (long here being relative to the speed of modern CPUs). Therefore, while requests are in the waiting stage, other requests can be in the compute stage, thereby keeping the CPUs busy. However, not all requests require long wait times, and that a concurrency scheme that assumed that there would always be long wait times would disadvantage those requests where there were no long wait times.

A concurrency scheme used in caches could take advantage of the type of work that caches were expected to perform in order to improve performance. For example, most network applications have similar structure and most network operations take on the order of milliseconds. A cache could perform useful operations while waiting for relatively slower network operations or disk operations to complete. (Disk operations sometimes take longer than milliseconds.) In addition, networking (and the timing in large networks such as the Internet) is inherently and largely unpredictable and unreliable. To deal with these aspects, a preferred concurrency scheme should support asynchrony (to deal with unpredictable timing) and organized exception handling (to deal with lots of potential failure modes and unreliability of networks).

The inventors considered approaches such as one thread per client to be too limiting for challenges of real-world caches in operational CDNs. In a thread-per-client model each client consumes an inordinate amount of system resources while spending most of its time waiting (e.g., for network or disk I/O).

Those of ordinary skill in the art will realize and understand, upon reading this description, that these other approaches to concurrency may work for smaller caches or CDNs, but they do not scale well. Thus, while the disclosed executive approach is preferred, other approaches are contemplated and may be used.

The presently preferred version of the Executive assumes a 64-bit CPU with 64-byte cache lines. Basic data structures are all cache-line sized and aligned. While this approach improves efficiency with respect to retrieving data, moving it around, and storing it, it may force some overloading of data fields within data structures. Those of ordinary skill in the art will realize and understand, upon reading this description, that other implementations may be used.

Tasks, Events, and Vcores

Figure 25B:
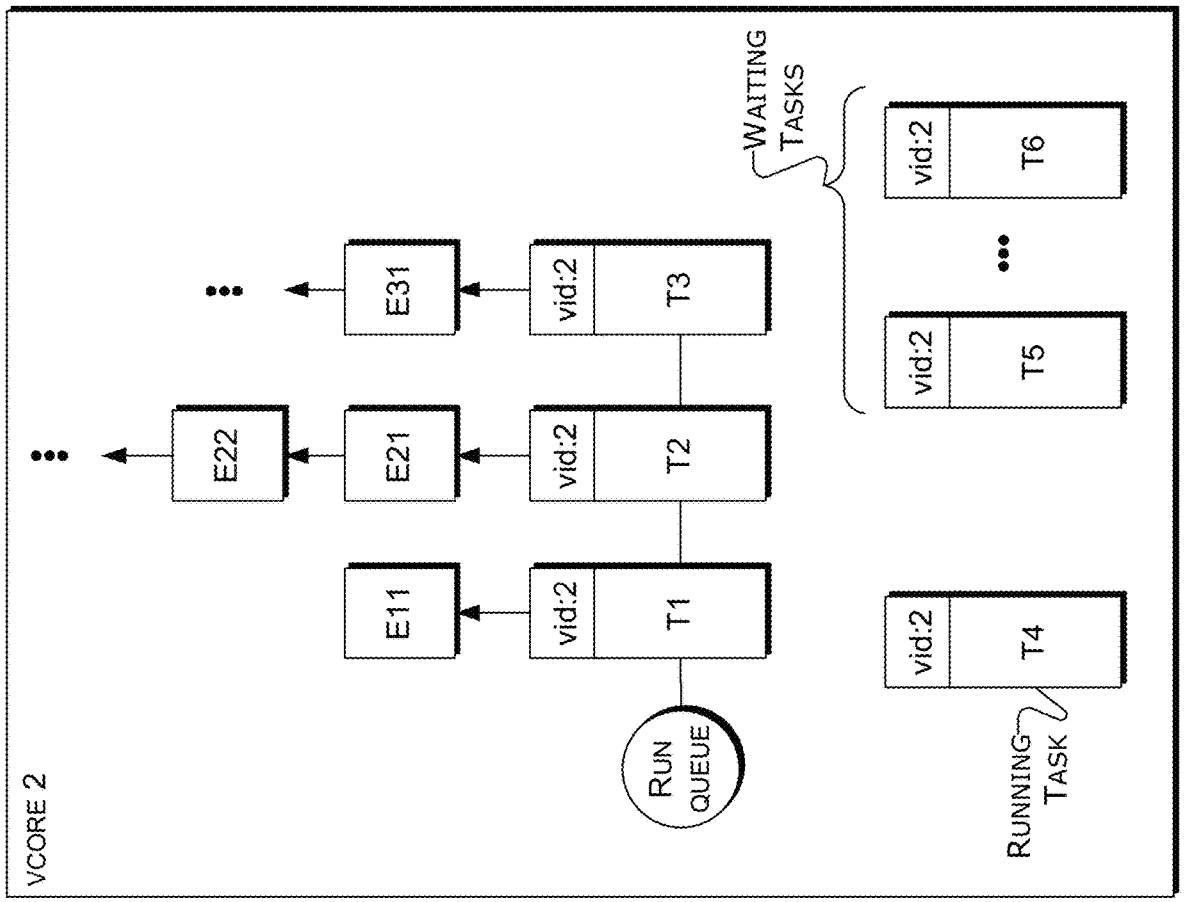

The basic objects in the Executive are tasks, events, and vcores (Virtual CPU cores). FIGS. 25A-25B show relationships between the Executive's tasks, events and vcores.

A virtual CPU core (or vcore) may be considered, in some aspects, to be like a pthread with some data. There may be any number of vcores, although the Executive is expected to be most efficient when there is one vcore per physical core, with each vcore bound to or associated with a fixed physical core.

In order to support synchronization, each vcore is assigned a vcore identifier (vid), and each task has a vid field that specifies the vcore to which that task belongs.

Each task has a corresponding input event list. For example, as shown in FIG. 25A, the task block T has a list of three events (denoted E1, E2, E3 in the drawing).

Each vcore has a prioritized list of tasks called its run queue. E.g.,

FIG. 25B shows vcore no. 2 with a run queue comprising a number of tasks (denoted T1, T2, T3), each with a corresponding event list (E11 for task T1, E21 and E22 for task T2, and E31 for task T3). One task (T4) is currently running, and a number of tasks (T5 . . . T6) are waiting. The task block T in FIG. 25A is shown with VID=2 (i.e., that task is associated with vcore no. 2).

Figure 25C:
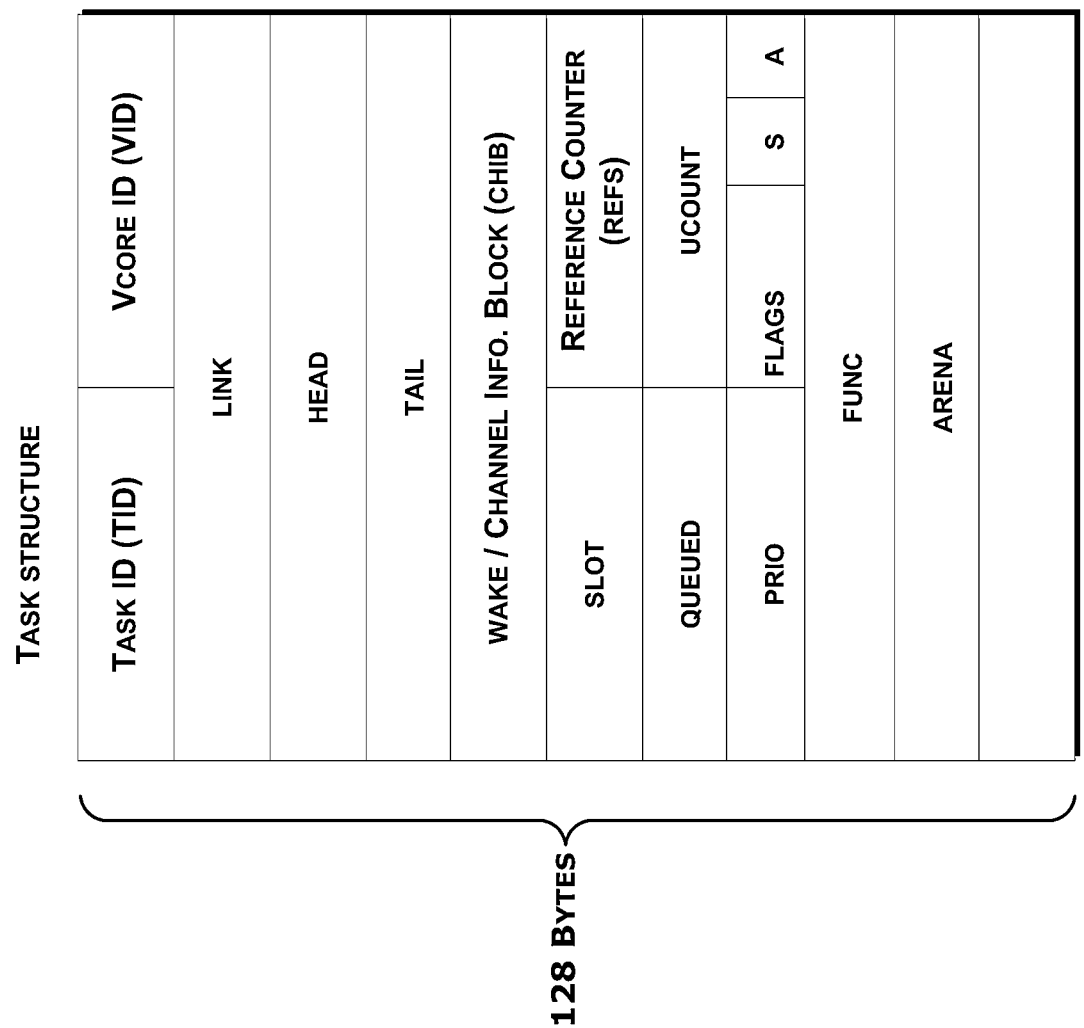

An Executive task is described by a function pointer (n, a data pointer (d), and some other (e.g., task accounting) information. A task may be run by invoking the function on the data (e.g., f(d)). Each task has a task identifier or handle (tid). With reference to the exemplary task structure in FIG. 25C, preferably a task is packed into a 128-byte structure, and is identified by a 4-byte integer task handle ("tid" or task id).

Channels are a special type of Executive task. A channel task contains pointer to "Channel Information Block" (chib). Each chib is channel-type-specific, and contains methods for:

dropoff (asynchronous), submission (maybe synchronous) and return (deliver) of events (where the events being returned are being returned to a channel from another channel)

timeout close, destroy migrating create entry point and various others.

Channels have flags set and have the wake/chib field points to a chib. User tasks have no flags, whilst the wake/chib field points to the wakeup predicate (this is an example of the field overloading referred to earlier). Prio determines where a task gets placed on the run queue.

The channel types may include some or all of the following:

Network
  serv (passive listener)
  conn (active connection)

udp (datagram)
resolv (DNS resolver)
SSL Channel
General buffer channel
Connection channel
Async I/O
    aios (aio slave)
    aio (aio master)
HTTP
    fpnsh_conn (HTTP parser and formatter)
Application Specific, e.g., for cache:
    the sequencer channel (manages running of handlers)
    various Lua-related channels (handle dealing with Lua engines and running them)

In some embodiments, the Async IO channels may be performed by the IO library. An aios and aio channel may not be used, and a separate non-Executive library (libfpio) will handle asynchronous I/O.

As used herein "cid" refers to a "channel id" and "tid" means a "task id". In practice, the "cid" field may be used as the "to" address and the "tid" field is used as the "from" address of an event. There are cases of both task-to-task and channel-to-channel communication where a "cid" may actually be a task id, and vice versa.

The task structure is preferably cache line aligned. In the drawing (FIG. 25C), the function pointer is denoted func. A task structure may have additional space for use as scratch space. In an implementation, a task structure is 128 bytes, of which 48 bytes free for task use, although a given task is always free to allocate more memory for itself and keep track of it by placing a pointer in the task structure.

Every task contains a reference counter (refs), and a task dies if it is dispatched with its reference counter set to zero (refs==0). A reference (also known as "cid" or channel id, also known as "tid") is a copy of the integer id of a task and is created when the task is created, or when a task itself calls ns_tid_alloc( ). A reference is destroyed when returned to the task during close or discard or the task itself calls ns_tid_free( ). Those of ordinary skill in the art will realize and understand, upon reading this description, that the function names are provided here by way of example only, and are not intended to limit the scope of the system in any way.

Reference are capabilities that should not be duplicated or destroyed and should be carefully tracked. They are used in the tid and cid fields of events.

The Executive uses counting references to prevent stale references (they are an Executive analog of locks).

An event is a message block (preferably 128 bytes, including 64 bytes for scratch space) and contains two task references (two tids), one for the initiator task (tid) and the other for the target task (cid). The 64-byte scratch space may be divided into internal and external scratch space. Events may be linked.

In operation, each vcore thread runs an endless loop and:
    retrieves (e.g., pops) the highest priority task t from its run queue;
    calls t->f(t);
    calls ns_dispatch(t) to requeue, destroy or abandon the task t.

The following two rules should ensure memory consistency:
    Access rule: If another task has the same vid as you, you can safely access its data.
    Migration rule: Only vcore n can change a vid value to or from n.

The Executive is started on a host by creating an appropriate number of vcores for that host and then starting the first task. E.g., to start the Executive with n vcores, call:
    ns_begin(first_task_func, n);

The first task creates and launches more tasks and channels, e.g., as follows:

```
first_task_func( )
{
t = ns_task( );
ns_launch(t);
cid1 = ns_chan(foospec, 0);
...
}
```

Tasks and channels create events and communicate with each other:

```
e = ns_event( )
e->cid = cid1
ns_dropoff(e)
```

Tasks, channels and events are created and die as necessary.
    ns_task( ); ns_chan( ); ns_event( ); return ns_die( );

In a preferred implementation, the Executive will exit when the last task exits.

There are two styles of communication within the Executive, namely guaranteed asynchronous communication and potentially asynchronous communication.

Guaranteed asynchronous communication puts an event on the input queue of a destination task, and wakes the destination task, i.e., puts it on the run queue. The destination task runs (later) and an event arrives back on the input queue of the source task. It should be appreciated that the source task may choose to send the event "anonymously" (that is, without a tid), in which case no response will return. Another option is for the source task to provide the tid of some third task to which the event will be delivered once the destination task is done with it. This type of communication is lightweight and non-blocking. E.g., ns_event_dropoff(e) uses e->cid as destination; ns_event_deliver(e) uses e->tid as destination. Basically, ns_event_dropoff is used by tasks to drop an event off to a channel, and ns_event_deliver is used by tasks to return events to whoever sent them.

Potentially asynchronous communication is invoked, e.g., by
    e=ns_submit(e).
This approach works as follows:

| S1 | Passes event to destination task |
|---|---|
| S2 | Suspends current task |
| S3 | Executes destination task instead |
| S4 | Event pointer returned as function return value |
| S5 | Resumes current task. |

Potentially asynchronous communication can go asynchronous by returning null pointer in step S4, and delivering the event later.

Communication reverts to asynchronous if, e.g., the destination task is not on the same vcore, or there is too much work to do in one run, or the task needs to wait for internal asynchronous operations. It should be appreciated, however, that synchronous operation may, in some cases, be achieved even if the destination is a different vcore.

The destination does not know/care if it was called via dropoff( ) (i.e., as Guaranteed asynchronous) or submit( ) (i.e., as Potentially asynchronous). Events always arrive on the input queue, which is accessed via ns_next_event( ). Events are returned by channels using ns_event_deliver( ). If the destination is a channel, it can know whether an event was dropped off or submitted, since these are separate chib entry points which can be overridden.

Events can be transferred, e.g., using the following code:

```
ns_event_t *e = ns_event( );
e->tid = ns_tid( );
e->cid = some_cid;
some_cid = 0;
e->opcode = Executive_OP_READ_BUFFER;
e->timeout = 5.0;
e->ns_buf_arg = malloc(1024);
e->ns_buf_count = 1024;
e = ns_submit(e);
```

This example demonstrates care about reference counting. Since some_cid represents a reference and that reference has been transferred to e->cid, the value of some_cid gets zeroed.

This event transfer may be wrapped in a function, e.g., as:

```
ns_event_t *e = ns_event( );
e->tid = ns_tid( );
e->cid = some_cid;
e = ns_submit_1k_read(e, 1024);
```

Event Driven Programs

The following code shows a basic "loop-switch" skeleton for an Executive task function presented in a 'C' like language:

```
task_func(t)
{
    while((e = ns_next_event( ))) {
        switch(event_type(e)) {
            case TYPE0:
            ...
            break;
            ...
            case TYPEn:
            ...
            break;
        }
        ns_return(e);
    }
    return ns_wait( );
}
```

The following example code shows a basic "loop-switch" skeleton for an Executive task function with submit( ):

```
task_func(t)
{
    e = 0;
    while(e || (e = ns_next_event( ))) {
        switch(event_type(e)) {
            case TYPE0:
            e = submit(e);
            continue;
            ...
            case TYPEn:
            ...
            break;
        }
```

```
        ns_return(e);
    }
    return ns_wait( );
}
```

Figures 25D, 25E:
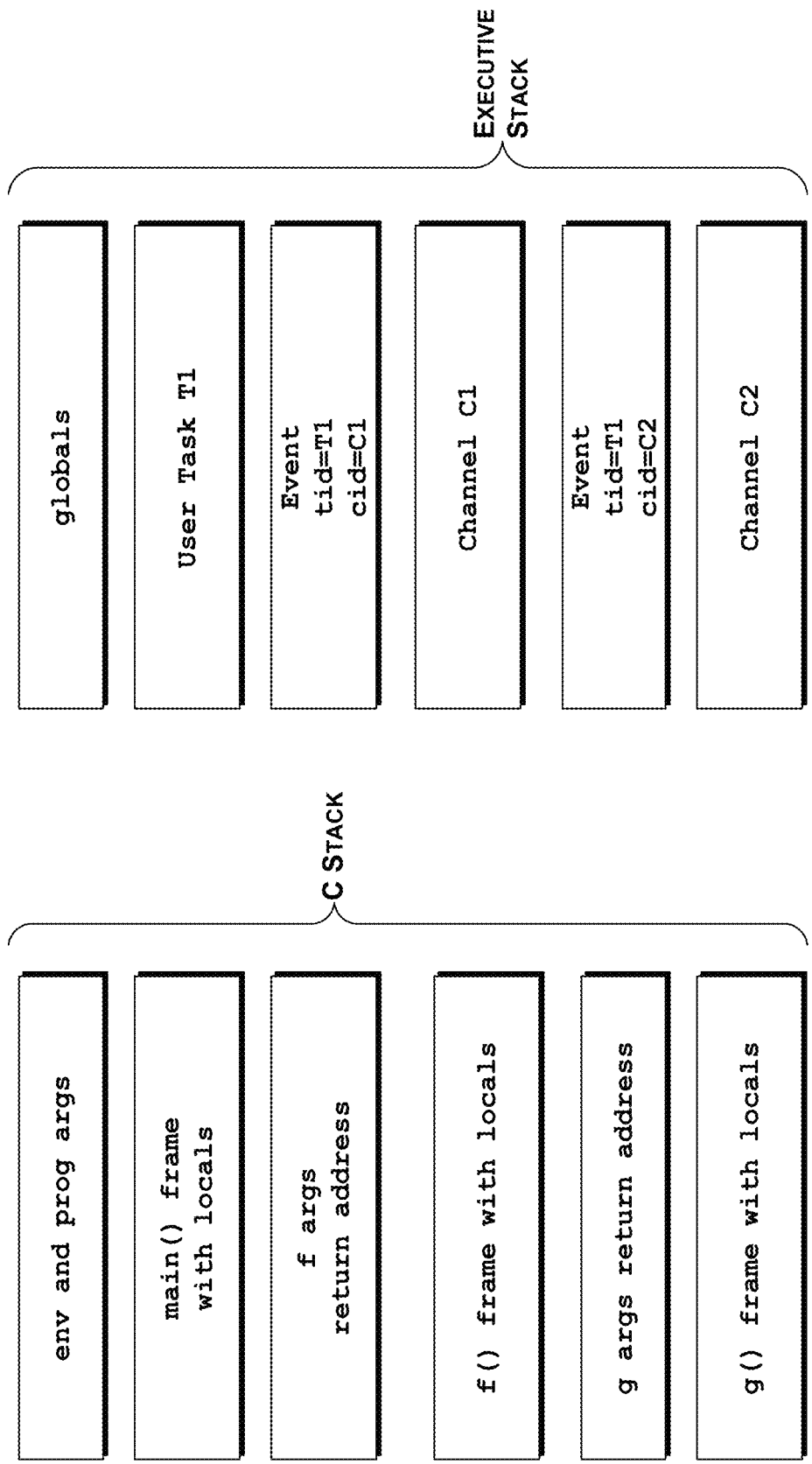

FIGS. 25D-25E compare the Executive stack of the Executive submit operation to that for C procedure calls. The Executive Submit operation (e=submit(e)) is analogous to a C procedure call, with the important difference that there is the option to go asynchronous when an event is submitted. The Executive's task blocks are analogous to C stack frames. The Executive's event blocks are analogous to C's arg and return address areas; and the Executive's tid & tag are analogous to C's return address.

However, in the Executive multiple calls can be active simultaneously and frames can live on after the call. This allows writing a potentially asynchronous hook, e.g., e=submit_op_foo(e, args);

Channels may be created using a parameter block called a spec, e.g.:

```
ns_foo_t *spec = ns_foo( );    /* create spec for foo channel */
spec->param1 = val1;           /* set parameter */
spec->param2 = val2;           /* set parameter */
cid = ns_chan(spec, 5);        /* create foo chan, return 5 refs*/
ns_foo_(spec);                 /* destroy spec */
```

A channel may be closed by returning the refs, e.g.:

```
ns_close_cid(cid, 4);/* Explicit close, 1 + 4 refs */
ns_discard_cid(cid, 1);/* Return 1 + 1 refs */
ns_discard_cid(cid, 2);/* Return 1 +2 refs, implicit close */
```

A channel will not be destroyed until all refs have been returned.

Figure 25F:
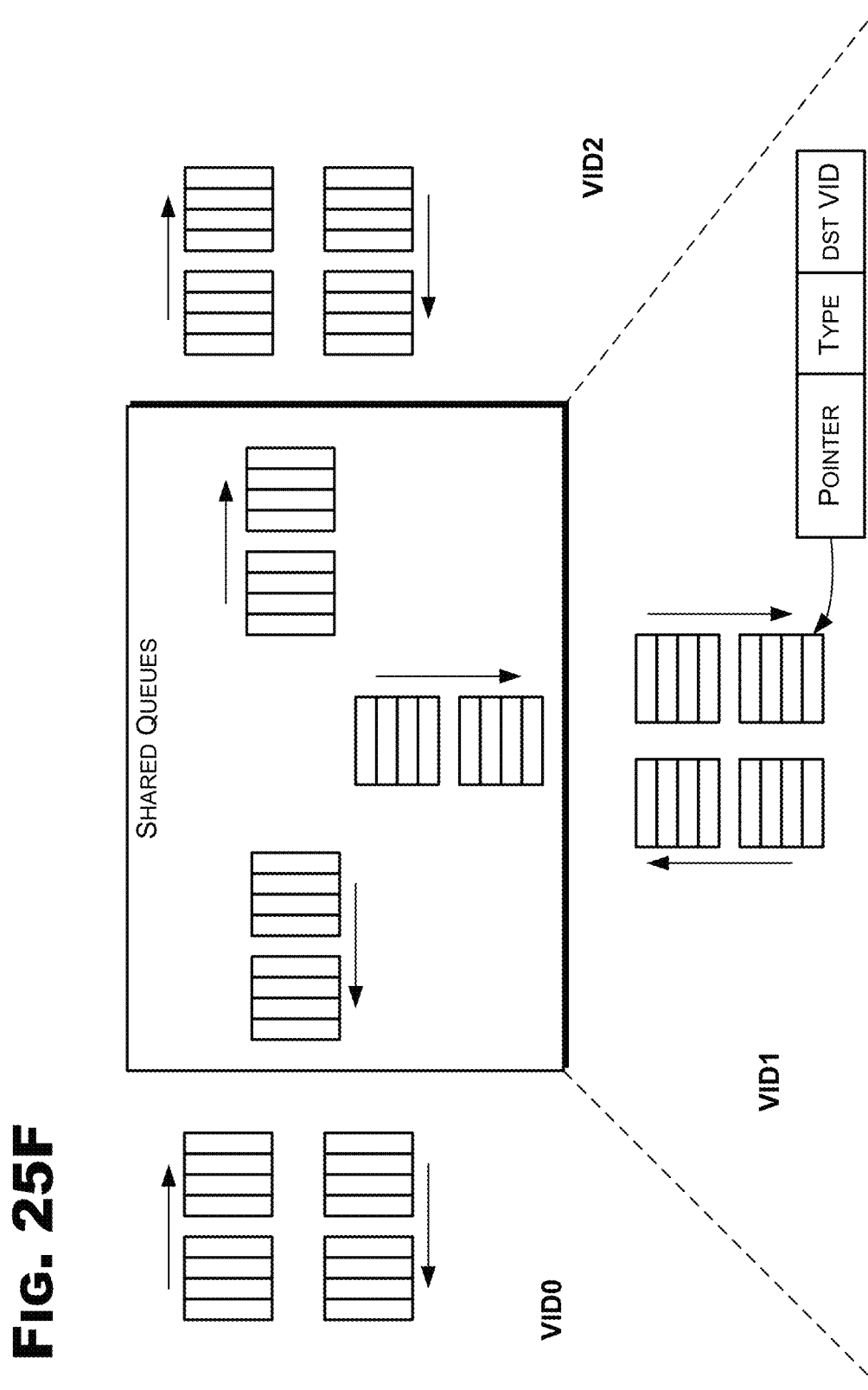

A global exchange (e.g., as shown in FIG. 25F) may be used to transfer pointer ownership between vcores. Typed pointers are packed into cache lines which are used to transfer the pointers efficiently, via mutex-protected queues. While various techniques are used to make the global exchange efficient, e.g., amortization of lock cost by transferring multiple messages with a single lock transaction, lock-free inspection of a queue to see if there may be data (only need the lock if data is seen), etc., it should be appreciated that a "direct exchange" is preferable, and that the queues involved may be created using lock-free techniques.

The following example shows synchronization in task migration. In this example, task t wants to migrate from vid=2 to vid=3.

Initially t->vid=2.

t func sets t->vid=1003 and returns Executive_RUN.

ns-dispatch( ) notices t->vid≠2 and puts (t, RUN, 3) on global exchange.

Global exchange transfers the triple to vcore 3.

Vcore 3 sets t->vid=3 and adds task to its run queue.

Note that t->vid is initially set to 1003 and then set to 3. Recall that if a task observes that another task has the same vid as it does, then it is then safe for that task to look at the other task's data. However, in the migration case, the migrating task cannot just set its vid to the target vid because then there will be a time when it has not yet migrated but its vid equals the vid of a vcore on which it is not yet running. Accordingly, in this example, temporarily setting the vid to "1003" acts as a signal to the dispatcher to migrate to vcore 3 without actually setting the vid for that task to 3 ("1003" does not match any valid vid value, and indicates a migration request to dispatcher). Once the migration is complete (and the task is running on vcore 3), the "1000" is removed and the vid becomes 3.

The Executive provides a multi-core solution in which each processor (CPU) has a queue of tasks which can run on that processor (in a vcore—virtual core on that processor). Processes can check if other processes are running on the same core and then determine/share information with those processes.

In some embodiments, a vcore migration technique (also referred to as a "vcore walk") may be used to coordinate read/write access to shared data to avoid the overhead of traditional locking techniques. In these embodiments, a set of pointers to the data structure is maintained, one pointer per vcore, and whenever a task wishes to access the data structure, it uses the per-vcore pointer for the core on which it is running. Tasks are not allowed to separately hold per-vcore pointers (e.g., cannot put a copy of those pointers into their own states). Then, when a task wishes to change the shared data structure, it creates a new data structure (e.g., by copying the existing data structure and modifying it), arranges to be migrated to all the vcores, and then changes each of the per-vcore pointers to point to the new data structure. Once the migration (and "vcore walk") is complete, it is safe for this task to free the old data structure (since no task is allowed to hold on to the pointer to the old data structure).

This technique does result in a short period where tasks running on different vcores will not see the same data structure; however, that should rarely be an issue, and is application-specific.

A variation of this technique involves a case where the per-vcore pointer points to a reference-counted data structure. In that case, a task can grab a reference and safely hold on to the pointer until it drops the reference.

In prior concurrency/parallel processing systems, tasks or processes get spawned off and return when they are complete. An important aspect of cache processing, especially in the context of a CDN, is that some tasks may be able to complete right away. In those cases there is no reason to delay the return. In other words, if the system knows that a task might complete its processing right away (i.e., relatively quickly), the system can have that task provides its result without delay.

One example of the use of this technique is when a Lua script is executed: in many cases, the script may perform such a small operation that it can complete essentially right away, which saves the overhead of needing to schedule it as a task unless that becomes necessary. Another example of this technique is in the sequencer channel: If a series of handlers runs quickly, then calling the sequencer is essentially a function call. Only if a handler needs to wait for data or if too much computation needs to get done will the sequencer become a scheduled task.

This may be achieved by the following:

```
if(event = submit(event)) == null)
    return ns_wait( );
// if non-null then done, otherwise wait.
```

This approach (do it right away if you can, otherwise give me the answer later) provides a potentially asynchronous solution to cache specific problems.

Additionally, programming in a "potentially asynchronous" style means that if it is later determined that some feature or aspect (which was synchronous previously) needs to go asynchronous, this can be done without having to rewrite other code. Those of ordinary skill in the art will realize and understand, upon reading this description, that there are costs/risks to this approach, e.g., if only the synchronous path is taken in a given situation, the asynchronous path may be untested or the performance of the application may degrade if a previously synchronous operation becomes asynchronous. However, these risks can be mitigated, e.g., by forcing everything to be asynchronous for testing purposes.

In some preferred embodiments, the Executive is implemented using a system sometimes referred to as Shell or NetShell. It should be appreciated that the Executive and NetShell described herein are unrelated to any products or tools of any other entity. In particular, as used herein NetShell does not refer to Microsoft Corporation's scriptable command-line tool, nor does executive or NetShell refer to a Unix shell-like user interface.

Computing

The services, mechanisms, operations and acts shown and described above are implemented, at least in part, by software running on one or more computers of CDN 100.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 26A:
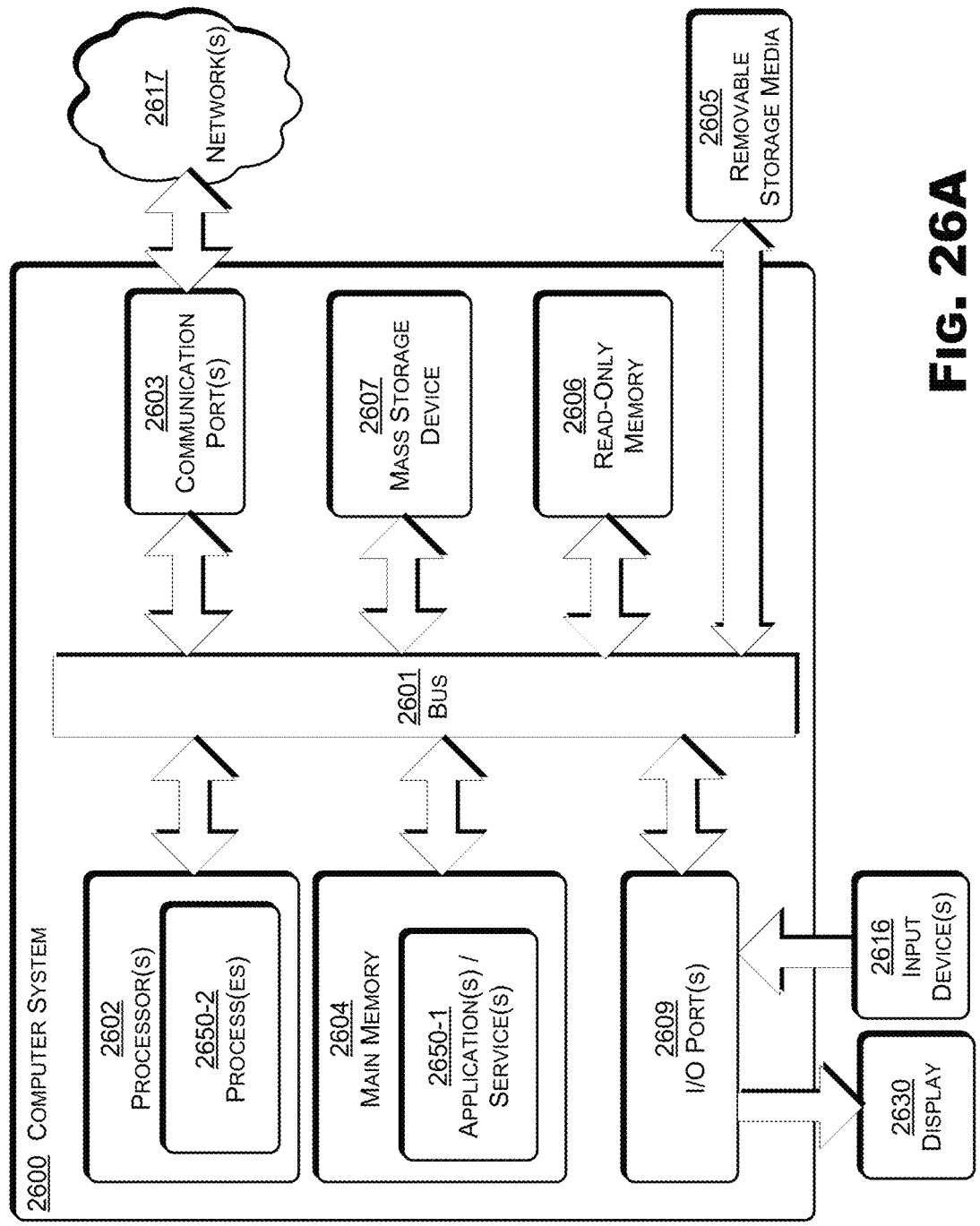

FIG. 26A is a schematic diagram of a computer system 2600 upon which embodiments of the present disclosure may be implemented and carried out.

According to the present example, the computer system 2600 includes a bus 2601 (i.e., interconnect), one or more processors 2602, one or more communications ports 2603, a main memory 2604, removable storage media 2605, read-only memory 2606, and a mass storage 2607. Communication port 2603 may be connected to one or more networks 2617 by way of which the computer system 2600 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 2602 can be any known processor, such as, but not limited to, an Intel® Itanium® or Itanium 2® processor(s), AMD® Opteron® or Athlon MP® processor (s), or Motorola® lines of processors, and the like. Communications port(s) 2603 can be any of an RS-232 port for use with a modem based dial-up connection, a 10/100

Ethernet port, a Gigabit port using copper or fiber, or a USB port, and the like. Communications port(s) 2603 may be chosen depending on a network such as a Local Area Network (LAN), a Wide Area Network (WAN), a CDN, or any network to which the computer system 2600 connects. The computer system 2600 may be in communication with peripheral devices (e.g., display screen 2630, input device(s) 2616) via Input/Output (I/O) port 2609.

Main memory 2604 can be Random Access Memory (RAM), or any other dynamic storage device(s) commonly known in the art. Read-only memory 2606 can be any static storage device(s) such as Programmable Read-Only Memory (PROM) chips for storing static information such as instructions for processor 2602. Mass storage 2607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 2601 communicatively couples processor(s) 2602 with the other memory, storage and communications blocks. Bus 2601 can be a PCI/PCI-X, SCSI, a Universal Serial Bus (USB) based system bus (or other) depending on the storage devices used, and the like. Removable storage media 2605 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 2604 is encoded with application(s) 2650-1 that supports the functionality as discussed herein (the application 2650-1 may be an application that provides some or all of the functionality of the services described herein, e.g., a control service, collector service, reducer service, rendezvous service and/or caching service). Application(s) 2650-1 (and/or other resources as described herein) can be embodied as software code such as data and/or logic instructions (e.g., code stored in the memory or on another computer readable medium such as a disk) that supports processing functionality according to different embodiments described herein.

For example, as shown in FIG. 26B, application(s) 2650-1 may include Autognome application(s) 2681-1, control service(s) applications 2680-1, collector service(s) applications 2682-1, reducer service(s) applications 2684-1, rendezvous service(s) applications 2686-1 and/or caching service(s) applications 2688-1.

During operation of one embodiment, processor(s) 2602 accesses main memory 2604 via the use of bus 2601 in order to launch, run, execute, interpret or otherwise perform the logic instructions of the application(s) 2650-1. Execution of application(s) 2650-1 produces processing functionality of the service related to the application(s). In other words, the process(es) 2650-2 represent one or more portions of the application(s) 2650-1 performing within or upon the processor(s) 2602 in the computer system 2600.

For example, as shown in FIG. 26C, process(es) 2650-2 may include Autognome process(es) 2681-2, control service(s) process(es) 2680-2, collector service(s) process(es) 2682-2, reducer service(s) process(es) 2684-2, rendezvous service(s) process(es) 2686-2 and/or caching service(s) process(es) 2688-2.

In other words, when the application(s) 2650-1 include control service(s) applications 2680-1, the process(es) 2650-2 may include control service(s) process(es) 2680-2, when the application(s) 2650-1 include collector service(s) applications 2682-1, the process(es) 2650-2 may include collector service(s) process(es) 2682-2, and so on.

Since a machine (computer) may run multiple CDN services at the same time (depending on its flavor), the applications 2650-1 and the corresponding processes 2650-2 may include applications and processes corresponding to more than one kind of CDN service.

With reference again to FIG. 2A, the application(s) 2650-1 preferably includes the applications for services S0 (Autognome), S1 . . . Sk, and the applications 2650-2 include the corresponding services running on the computer.

It should be noted that, in addition to the process(es) 2650-2 that carries(carry) out operations as discussed herein, other embodiments herein include the application 2650-1 itself (i.e., the un-executed or non-performing logic instructions and/or data). The application 2650-1 may be stored on a computer readable medium (e.g., a repository) such as a disk or in an optical medium. According to other embodiments, the application 2650-1 can also be stored in a memory type system such as in firmware, read only memory (ROM), or, as in this example, as executable code within the main memory 2604 (e.g., within Random Access Memory or RAM). For example, application 2650-1 may also be stored in removable storage media 2605, read-only memory 2606, and/or mass storage device 2607.

Those skilled in the art will understand that the computer system 2600 can include other processes and/or software and hardware components, such as an operating system that controls allocation and use of hardware resources. For example, with reference again to FIG. 2A, the core programs including the kernel 304 and other core programs 306 may be processes on the computer system.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CDN Virtualization, Interconnection, Delegation, and Federation

The ongoing proliferation of CDNs demands the means to interconnect them. As shown above, in some cases a CDN may be treated as sub-CDNs. Those of ordinary skill in the art will realize and understand, upon reading this description, that a CDN as described here can be configured to handle various modes of CDN interconnection.

Basic Mechanisms

Hierarchical Partitioning of Virtual CDNs

A single autonomous CDN can be partitioned into multiple virtual CDNs organized into a hierarchy with varying degrees of overlap. The configuration interfaces are used to create the CDN hierarchy, allocate separate physical clusters, configure services, and bind properties to the services in each CDN. A parent CDN may grant privileges to each of its child CDNs. In other words, a user with the authority to configure the parent CDN configures it such that it grants specific privileges to its children, or not. Grantable privileges include the authority to:

run specific service types;
manage specific hardware resources (machines, clusters);
bind specific properties to specific service types;
use services inherited from the parent (for requests related to certain properties);
grant specific privileges to other descendant CDNs.

These privileges are subject to expiration, revocation, and renewal. The net effect of allocating resources and granting privileges to a CDN is to provide it with a set of service types it can run, a set of machines it can run them on, a set of properties that can be bound to each service type, and a set of rules constraining interactions with its parent.

Defining a virtual CDN puts a physical boundary on the resources used to deliver content for a set of properties, constraining the set of binding assignments that can be made (properties allocated to the CDN must be bound to resources allocated to the CDN). Allocating services to machines and binding properties to services is then the responsibility of the individual CDNs (or whatever CDN was allocated the responsibility of running the configuration service for the CDN's pool of resources).

When a child service or an external client attributable to the child issues a request to a parent service, the parent may be configured to handle the request, proxy the request to some other service, or redirect the request to some other service (where the other service could be in the child or in another accessible CDN). The exact nature of the proxying or redirection depends on the service type.

When a parent and child both have instances of the same service type, the option exists for those instances to collaborate across CDN boundaries. For example, considering the rendezvous service type:

A DNS rendezvous request to the parent could respond with a VIP in the parent or child CDNs, or it could redirect (via a CNAME and NS records) to the rendezvous service of the child, which then decides on the VIP. The same could happen in the other direction (child DNS request is redirected to the parent), or one side could proxy the request to the other.

This same interaction pattern exists for requests of most other service types, too, including configuration updates, control resource retrieval, event stream delivery, collector service requests, and, of course, cache requests. If the service type only exists at one side or the other of the CDN boundary, then there are fewer options. Again taking rendezvous as an example:

If the parent has rendezvous but the child does not, clients of the child must be configured to use the parent's rendezvous, which must be able to route requests to either the parent or child CDN. If the child has rendezvous but the parent does not, the same thing applies.

In both of these latter cases it is as if the parent and child are one CDN, at least as far as the service type in question is concerned.

Peer-to-Peer Interconnection of CDNs

A simple adaptation of the principles described in the previous section can be applied to implement peer to peer interconnection. In this case, one peer grants authority to use certain services for certain properties to another peer, and vice versa. In this case there is no allocation of physical resources, just mutual service collaboration. The desire to interact can be initiated by either side, handled either via a grant/accept or a request/grant protocol.

Peer-to-Peer Interconnection with Foreign CDNs

Peer-to-peer interconnection of heterogeneous CDNs, at least as defined by the IETF CDN Interconnection model (CDNi), is less general than the allocation and sharing mechanisms described in the previous section and more focused on content peering. In the CDNi model there is no attempt to share services, heterogeneous CDNs just exchange information between peer services of the same type.

Given that we are only interested here in how a CDN might interact with a foreign CDN, all that is needed is to bridge the capabilities described above and elsewhere to integrate with similar capabilities in a foreign CDN. No fundamentally new capabilities are required.

The CDNi view of collaboration between two autonomous CDNs is as follows. Given two CDNs A and B and one original content provider P, and assuming A is the authoritative (upstream) CDN for provider P, the idea is that an end user E's request to A could be redirected to B if A thinks that B is in a better position to serve P's content to E and a CDN interconnection agreement is in place between A and B. This redirection could theoretically happen at the DNS and/or HTTP level. If a redirection occurs, B may in turn request the content back from A anyway if it doesn't have it cached, and A then requests the content from P. In this case, the authoritative CDN A acts both as the initial rendezvous layer and as a parent cache layer for requests to provider P from clients of CDN B. CDN A needs access to B's logs because it wants to be able to bill P for content that was delivered from B's cache without A's knowledge. Each of these interactions is analogous to the service sharing scenarios described earlier.

For this to work, some control and metadata exchange interfaces between the two CDNs need to be established. The same goes for log data exchange.

For the rendezvous and content delivery parts of the integration, a straightforward approach might be to model the foreign CDN as a virtual CDN with either an unknown set of resources or knowledge of the specific resources but no control over their bindings, and grant the necessary privileges back and forth to enable exchange of binding information, DNS redirection, and cache filling to occur across CDNs Product Deployment Options Internet Localization and Deep Edge Caching Deep Edge Caching is currently the deployment of caching equipment in ISP networks to provide Content Localization services (i.e., to minimize the need for content to move into the ISP customer's network and thereby reduce transport costs). Rendezvous is customized based on information provided about the ISP's DNS resolvers and associated client IP addresses, and the machines are initially manually configured over a remote connection. The machines are normally configured to only deliver content to the ISPs customers.

A Deep Edge Cache is a child CDN which relies on its parent for configuration, control, log collection, and rendezvous.

Delegation

Delegated CDN is the integration of ISP-owned and operated caching equipment in ISP networks. The caching equipment in this case could be a licensed version of a cache, or a 3rd party cache that has been integrated with a CDN. A delegated CDN would be configured similarly to a deep edge cache, but the work would be performed by the ISP.

This is the same as Deep Edge Caching if the equipment is not foreign equipment. If the equipment is foreign, use the virtual child CDN with unknown resources, and let the foreign (child) CDN use its parent's services.

Federation and Exchange

CDN Federation is just multilateral CDN interconnection, and in that sense it is just a collection of pairwise CDN interconnections. A CDN Exchange is a special case of CDN Federation (with a distinguished CDN acting as the exchange between multiple other CDNs).

Trust and Security

The various machines/services that form a CDN or part thereof need to trust each other. For example, each service that provides data (e.g., event, state, control, configuration, etc.) to another service preferably needs to trust that the service to which it is providing the data is a trusted service. Similarly, each service that receives data from another service preferably needs to trust the service that is providing it data.

Various techniques may be used to provide sufficient degrees of trust within a CDN and with entities external to the CDN. For example, CD entities may exchange information in order to authenticate themselves within the system. The control mechanism, in conjunction with a PKI system, may be used by machines/services to authenticate themselves within the CDN. Recall that each machine may include information (e.g., certificates) to enable the control mechanism to perform authentication as part of the machine's initial registration with the CDN. The control mechanism preferably maintains information about each machine in the CDN and about each service running on each machine Those of skill in the art will realize and understand, upon reading this description, that different and/or other methods may be used to achieve trust/security within a CDN, and the system is not limited by a PKI-based system. It should also be appreciated that different degrees of trust/security may be used for different aspects/components of a CDN. For example, control information may require a higher degree of security (possibly with encryption) than other types of information.

External Communication

In cases where a CDN component (e.g., a service) provides information to or receives information from an external component, additional or different trust/security mechanisms may be required. For example, when information is received from a component/service outside the control of the control system (e.g., in a delegated system), additional mechanisms may be used to determine that the outside component can be trusted.

In addition to trust models that are used to authenticate CDN components (internal or external), various mechanisms may be applied to verify data received from external components. For example, a third party CDN entity may be providing only caching/delivery services (e.g., via sub-CDN), and may be using the CDN for control and billing purposes. It is important to verify that the third party CDN entity was is correctly reporting delivery of traffic sent to them. This is important because the CDN may not want to send traffic to delivery components beyond its direct control unless it is confident that (a) they are up and working, and (b) their event streams come back to the CDN for settlement/billing functions. Rather than rely on month-end reporting to find out that something is amiss (either failed components, or third-party cheating), the reducer-collector network can track and reconcile information sent to the external component(s) with information received from the external component(s). In this manner discrepancies can be caught and dealt with when they occur.

For example, if a third party external CDN delivery service is failing, there will be a discrepancy between requests sent to that service by the CDN's rendezvous system and content served from that service.

It should be appreciated that mechanisms used to maintain system integrity may also be used within the CDN.

Configuration and Control

Bidirectional, Declarative, Modular, and Localizable Configuration Maintenance Introduction to Bidirectional, Declarative, Modular, and Localizable Configuration Maintenance The CDN's control system (formed from the various control services) may be referred to as the control core or control mechanism. The control mechanism consists of two sides, a side dedicated to accepting and managing the configurations provided by users, and a side dedicated to controlling endpoint services (such as caches) based on established configurations. This section outlines how configuration information may be structured and transformed from one side of the control mechanism to the other.

Figure 27A:
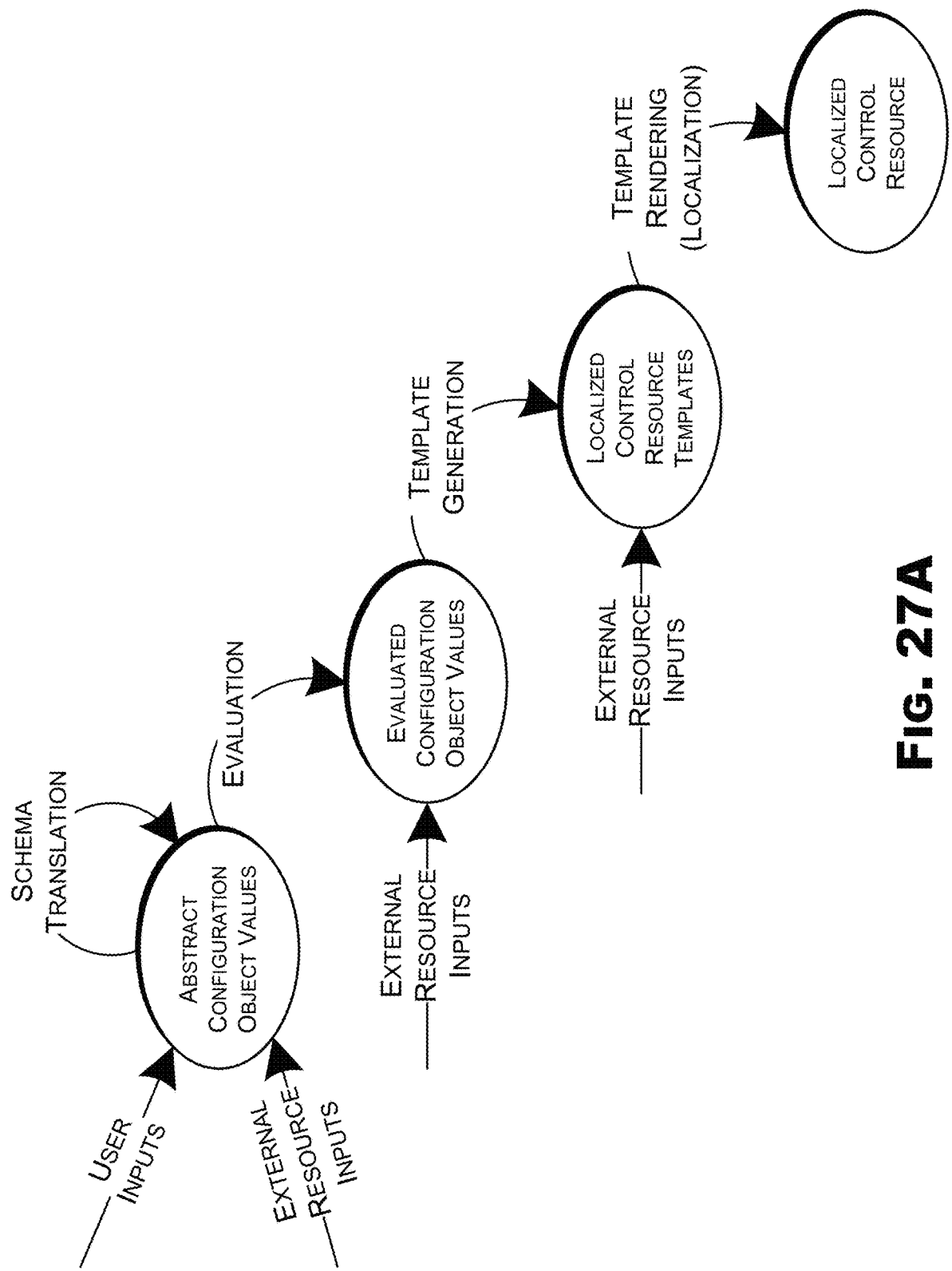
FIG. 27A depicts aspects of configuration of exemplary CDNs in accordance with an embodiment.

The control mechanism's information model involves configuration objects with per-schema values that are evaluated, translated into control resource templates, and localized into final control resources (see FIG. 27A, Configuration and Control Model). Abstract configuration objects are the entities manipulated directly by humans using configuration tools, and localized control resources are the entities consumed directly by endpoint services. Configuration objects have user-defined, often declarative values that may be structured in general and flexible ways involving value inheritance, inclusion, and transformation. Value expressions (the literal values of configuration objects) are evaluated to expand references and perform initial variable substitutions to produce control resource templates. A final parameter substitution step is performed to render and localize templates into resources that service endpoints can use. External resources (defined outside of the control and configuration realm) may be referenced to provide additional values at each step in the process from configuration to control, including values that define transformation scripts.

Allowing multiple schemas with translation between them allows a given configurable object to have different values reflecting the way a user's intent is expressed differently from one schema to another. Possible examples of configuration object schemas include a declarative schema. Separating configuration objects from control resources and translating between them allows the former to remain declarative and user-intent oriented, with the latter focused on expression in the language of endpoint services. Finally, use of templates modularizes the control resource generation process and compacts the resources distributed from the configuration to the control side of the control mechanism, and allows localized changes to be applied to control resources based on dynamically changing local contexts.

Configuration Objects

The database of configurations consists of a set of configuration objects, with types and values defined relative to a set of metaschemas and schemas.

A metaschema defines the set of object types that exist, and defines the namespaces of object identifiers. Every configuration object has a type defined in the metaschema and an identifier that distinguishes it from all other objects of the same type. Examples of types in the metaschema include subscribers and properties (or coservers).

A schema is a set of rules for defining configuration values for typed objects, and there may be any number of schemas for a given metaschema. The schema defines what value expressions are legal for what types of objects. Each unique configuration object has multiple values, one per schema.

The value of an object in a schema may be defined explicitly via a value expression, or implicitly via defaulting or derivation from the object's value in some other schema. A value of an object may be a scalar value, an array of values, or a structure containing name/value pairs (recursively). Value expressions may also include references to multiple base values at any point in the value expression hierarchy, providing a powerful form of modular value sharing across objects. The schema determines the general rules for deriving values from other schemas on a type by type basis. For example, the value of an object in schema B may be defined to be a transformation of the object's value in schema A, unless the object explicitly defines a local value in schema B.

The literal value expression of an object in a schema is distinct from its evaluation in that schema. Evaluation is the process of generating a ground (that is, reference-free) value expression for an object in some schema by expanding value references, performing default substitutions, and invoking schema transformations.

Control Resource Generation

The evaluated values of configuration objects may be interpreted as abstract values with declarative or procedural semantics, depending on the schema. An abstract value is transformed into an endpoint-consumable control resource via two additional steps:

1. Template generation is the process of generating a template and localizable parameter set representing a family of control resources.
2. Template rendering is the process of rendering a template with a set of actual parameter values to produce a ground (i.e., reference-free) control resource directly consumable by a target service.

Template generation occurs in the configuration service, and localizable templates are distributed to control services for the final localization step (which may occur repeatedly in the same local context, if the parameters of the localization change dynamically). "Local" here means local in the most general spatio-temporal sense, where parameters may vary not just by property, client location, and service location, but also in time.

Control Distribution

Figure 27B:
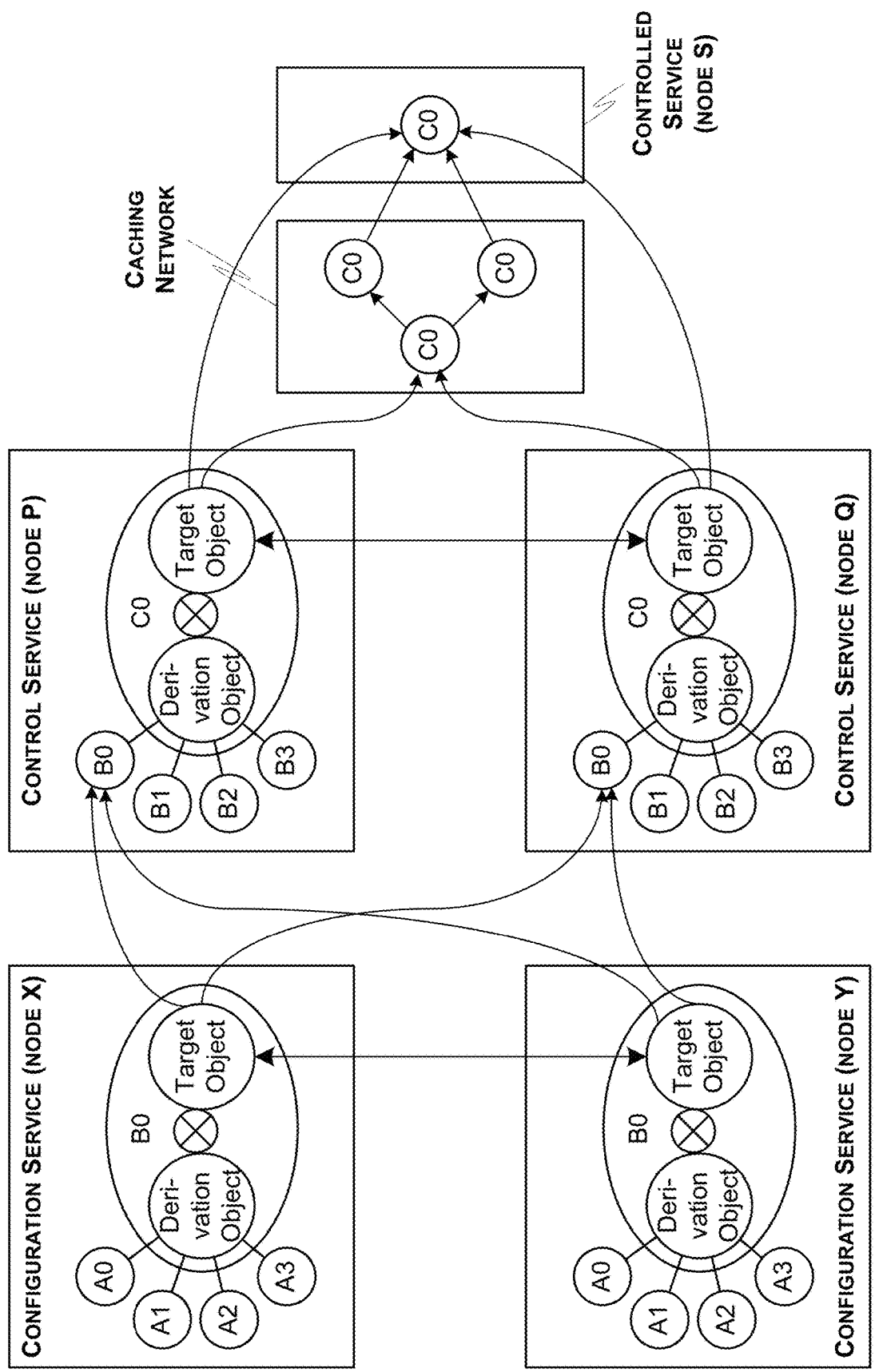
FIG. 27B shows an example of control resource generation and distribution in an exemplary CDN in accordance with an embodiment.
Figure 27C:
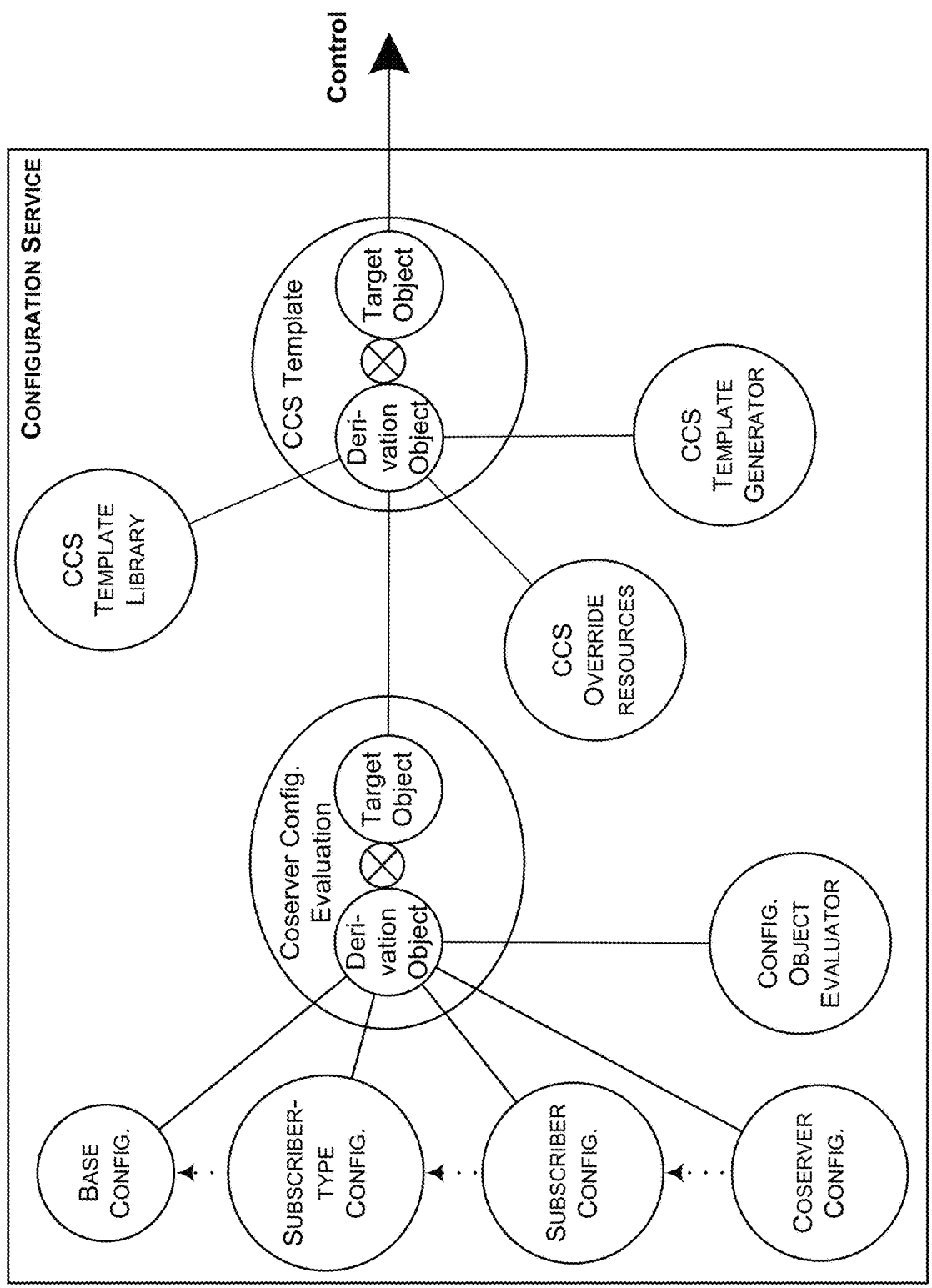
FIG. 27C shows an example of template distribution in an exemplary CDN in accordance with an embodiment.

FIG. 27B shows an example of control resource generation and distribution, and FIG. 27C shows an example of CCS template derivation.

Rendezvous Localization Via Automatic Client IP Estimation

This section provides an example of the use of the CDN architectures data reduction (reduce/collect) facilities. It should be appreciated, however, that the approach may be implemented without the data reductions facilities described herein.

Introduction to Rendezvous Localization Via Automatic Client IP Estimation

When the CDN rendezvous system (RVS) uses DNS (as in preferred implementations), the RVS responds to DNS requests for recognized domain names (CNAMEs) with a list of VIPs that are known to provide service for the property associated with the domain name. The decision preferably takes into account the actual availability, load, and network locality of the set of possible VIPs in order to determine a smaller list of VIPs best suited based on the source IP address of the DNS request. However, the DNS request typically comes from an intermediate resolver, and the actual client who will use the domain name to VIP binding for subsequent HTTP requests may well be located somewhere else in the network, making the resolver IP-based network locality aspect of rendezvous suboptimal. This section describes a method for on-line learning of approximate client IP locations based on the data reduction facilities of the CDN architecture.

The basic idea is to route a portion of DNS requests to probe VIPs based on the source resolver IP (i.e., resolver IP address), rotate the assignments of resolver IPs (resolver IP addresses) to probe VIPs, and incrementally compute an increasingly accurate view of the set of client IPs (client IP addresses) that appear to be using each resolver IP that have been seen. This view is then used to compute a centroid or center of mass of the client IP set to produce a pseudo client IP (pseudo client IP address) that can be used as a better estimate of the actual client IP (client IP address) than the resolver IP itself when responding to DNS queries.

This approach is useful only if the client IP to resolver IP association is relatively static, that is, if it changes more slowly than the algorithm converges. The approach is also improved by (though it does not depend on) tighter constraints on the use of domain names by subscriber properties, where each property is expected to use a domain name that is unique to the property, and no two properties are allowed to use the same domain name (something which the CDN binding architecture can arrange to ensure). Reliance on this constraint enables property-specific localization, which can increase the network localization accuracy.

The following sections describe details of the basic algorithm and then describe some variations which are more computationally expensive but provide additional benefits.

Notational Conventions

The following notational conventions are used in this description:

A fuzzy set $\hat{X}$ is a pair (X, m) consisting of an underlying set of possible members X and a membership function m: $X \rightarrow [0, 1]$ which maps each possible member $x \in X$ to its degree of membership in $\hat{X}$, a real number in the range [0, 1].

Variables beginning with c or $\hat{C}$ refer to client IP addresses and fuzzy sets of client IP addresses, respectively.

Variables beginning with r or $\hat{R}$ refer to resolver IP addresses and fuzzy sets of resolver IP addresses, respectively.

Variables beginning with p refer to probe IP addresses.

Variables beginning with t refer to time interval identifiers.

Basic Algorithm

The basic algorithm proceeds in discrete intervals, computing for each time interval a new estimate of the pseudo client IP address to associate with each resolver IP. Each time period RVS assigns to each unique (RIP, Name) a list of probe IP addresses (PIP). Some small portion of requests to the RVS will be responded to with this list of PIPs, though most will be responded to normally with a list of non-probe VIPs based on the usual load, availability, and network locality analysis. RVS logs its PIP assignments to a log stream, with events of the following form:

(t, r, Name, List(p))

where each such event indicates that during time interval t, all probed requests for Name from r were assigned to the PIPs in List($p_j$). It should be appreciated that this assignment only applies to the sample of requests that were assigned to a probe.

During each time period, each PIP also knows the time period identifier it must use to log requests (or, alternatively, it logs events in its log stream that indicate changes to time period identifiers, so readers of the stream can associate requests with time intervals). It learns this either by retrieving it via a control resource or being told via a direct management interface command. The time period identifier is recorded in the request log stream in one of the two methods described, thereby associating a CIP c with (Name, p) for each resource request. Thus, a stream of the following events can be reduced from the log stream of each service behind a PIP:

(t, c, Name, p, N)

where each event indicates that during time interval t, the client at c made N requests for resources in property Name from p. The services listening on p could be configured to either service the request normally or redirect to some other VIP that will service the request (depending on whether or not redirects are allowable).

The two streams above (call them streams a and b) can then be joined where $t_a = t_b$, Name$_a$ = Name$_b$, and $p_b \in List(p_j)$, resulting in events of the form:

(t, c, Name, p, N)

Moreover, since RVS knows which RIPs are assigned to each PIP p in each time interval, this stream may be transformed further into:

(t, c, Name, p, N, List($r_k$))

But since the same client may request resources from any number of different properties over time, there is also a need to include streams from other PIPs, ultimately resulting in the same kind of events (with each event identifying a single CIP and PIP but multiple RIPs). It may be desirable to reduce this further to collapse down to a single event per CIP with a sum of all the N values and a list of PIPs, like this:

(t, c, Name, List($p_j$), ΣN, List($r_k$))

What happens next depends on whether the desired result is one global assignment of pseudo client IP per resolver, or one that varies from property to property, and on what factors should be considered when deciding how to combine the information from multiple time intervals. In all cases the goal is to compute on-line a fuzzy set of client IPs (or multiple fuzzy sets of client IPs) for each known resolver IP, and use the center of these sets as the client IP estimate for future DNS queries to RVS.

Algorithm Variations

There are two dimensions of variation to the basic algorithm:

Whether to compute one client IP center per resolver (the global approach) or one client IP per resolver per property (the property-specific approach), and Whether to treat all time intervals the same (the unweighted interval approach) or whether to weight the time intervals based, e.g., on the volume of requests seen during the interval (the weighted interval approach).

These dimensions are largely orthogonal, resulting in (at least) four possible algorithms. The section below first describes the global/unweighted case and then describes how to modify the first variation to support weighted and property-specific cases.

Global Client Localization with No Time Interval Weighting

The simplest approach to client localization is to determine the best RIP to assign to each CIP, and then compute one center of all CIPs assigned to each RIP. This center would then be used as the substitute CIP for all requests to RVS, regardless of what property they are for.

In this case the event stream discussed above would be reduced to the form:

(t, c, List($r_k$))

where each event means that during time interval t, client c issued one or more probed requests for properties that were resolved by some r ∈ List($r_k$). It is not known which requests should be charged to which resolvers, but it is known that they all came from resolvers in this list (the description below will discuss why this is true, even in the presence of DNS caching).

Begin by assigning a weight to each r based solely on the size of the list it occurs in:

$$w_{c,t}(r) = \begin{cases} \frac{1}{|L_t(r_k)|} & \text{if } r \in L_t(r_k) \\ 0, & \text{otherwise} \end{cases}$$

Using this weight it is possible to arrange to incrementally compute a fuzzy set $\hat{R}_{c,t}$ based on the set of all known ResolverIPs and a membership function:

$\hat{R}_{c,t}$=(ResolverIPs,$m_{c,t}$:ResolverIPs→[0,1])

At each time interval t the membership function $m_{c,t}(r)$ for each r is updated as follows. First, compute a moving average version of the member function $m^*_{c,t}(r)$, based on some constant α∈(0, 1).

$m^*_{c,t}(r)=\alpha \cdot w_{c,t}(r)+(1-\alpha) \cdot m_{c,t-1}(r)$ and then define the actual membership function to be a thresholded version of the moving average using some threshold $\lambda_t \in (0, 1)$:

$$m_{c,t}(r) = \begin{cases} m^*_{c,t}(r) & \text{if } m^*_{c,t}(r) > \lambda_t \\ 0, & \text{otherwise} \end{cases}$$

where λt might be computed, e.g., based on the minimum membership value of the top M membership values in the set. The net effect of this is to compute something similar to the fuzzy intersection of all the resolver IP lists seen in the stream up to time interval i (and it would be exactly that if certain elements had not been discarded using the threshold). The thresholding allows for a fairly low bound on the size of the resolver IP set that needs to be maintained from step to step.

At this point there is preferably a small number of resolver IPs r with $m_{c,i}(r)>0$, and hopefully there is a unique r with a maximum membership value, but neither of these situations is guaranteed. There could be a large number of resolver IPs with a maximal membership value, though whether this is likely is not clear at the moment.

The next step is to compute the inverse relationship using the membership functions across all client IPs, identifying for each resolver IP r a fuzzy set of client IPs, Cr, based on the relationship:

c∈$\hat{C}_r$ ⇔ r∈$\hat{R}_c$ which means, with a little abuse of notation, that c's membership in $\hat{C}_r$ should be the same as r's membership in $\hat{R}_c$, in other words:

$\hat{C}_r$=(ClientIPs, $m_r$)

with $m_r(c)=m_c(r)$ for all r and c. This membership function, and by extension the fuzzy set it implies, can be computed incrementally, essentially for free based on the computation of mc. All that is needed is to maintain a table associating (r, c) pairs with a membership value that can be used either as $m_r(c)$ or $m_c(r)$.

Finally, the pseudo client IP $\hat{c}_i$ for each resolver IP r can be computed as the center of mass of $\hat{C}_{r,i}$ where each client IP is considered a position in some metric space and its membership value is its mass. In practice, the pseudo client IP $\hat{c}_i$ (depending on how the network distance metric space works) may have to be related back to a nearest actual client IP, which then could act as a representative of $\hat{C}_{r,i}$ from which actual network distances to candidate VIPs could be computed.

Weighting Time Intervals

Time intervals used by the RVS may differ in their length in real time and in the number of requests handled during the interval. The previous section weighted each interval equally when computing membership functions, but it may be useful to weight intervals differently. While the length in real-time of each interval probably does not really matter, the number of requests handled during the interval probably does.

The key is to be cognizant of each resolver IP r's weight used to compute its membership function based on the number of requests assigned to each event. So in this case the considered event stream is reduced to the form:

(t, c, List($r_k$), N)

A weight function is needed that increases and decreases with N but is always in the range [0, 1]. For this it is possible to define a moving average $\tilde{N}$ of N values:

$\tilde{N}_i=\alpha \cdot N_i+(1-\alpha) \cdot \tilde{N}_{i-1}$ and then use this to normalize the latest value of N, producing weight δi:

$$\delta_i = \frac{N_i}{N_i + \tilde{N}_i}$$

Now change the weight function used in the previous section to include a multiplier $\delta_i$:

$$w_{c,i}(r) = \begin{cases} \frac{\delta_i}{|L_i|} & \text{if } r \in L_i \\ 0, & \text{otherwise} \end{cases}$$

Property-Specific Localization

The global approach may be extended to compute a property specific client estimate for each resolver.

A property-specific localization requires separate maintenance of state per property, but the computation for each property only needs to take a subset of the event stream into consideration. It should be appreciated that in some cases it may be worthwhile to do a property specific computation, and then compute a global result based on the property specific results.

The benefit of the property specific approach is that the center of mass of client requests may vary from property to property, and therefore a property specific computation will produce a more accurate result.

Other Considerations

Time Intervals and DNS Caching

For the above approach to work there needs to be some assurance that client requests to probe IPs are using information they received from RVS through particular resolver IPs. With DNS caching, ensuring this requires that there is control of the pace of change to resolver IP mappings to probe IPs and sequence their changes in a way that takes some reasonable upper bound on DNS time-to-live values.

The state of RVS and a given probe IP with respect to the assigned resolver IPs and whether or not requests to the probe will be associated with the resolver IPs must be sequenced through the following cycle (representing one time interval for the PIP):

In active probe mode, during which all requests to the probe IP will be associated with assigned resolver IPs, and RVS will actively respond to queries with the probe IP, In passive probe mode, during which RVS will no longer respond to queries with the probe IP, but the probe will still respond to requests and they will still be associated with the assigned resolver IPs, In normal mode, where RVS will not send probe requests there and there will be no association between requests and resolver IPs, Back to active probe mode, but assigned to a possibly different set of resolver IPs, etc.

RVS must manage available probe IPs and ensure that the real-time length of a probe IP's time in passive probe mode must be greater than or equal to some multiple of the DNS TTL threshold. Straggler requests based on stale resolver IP assignments may still be received and would be counted incorrectly, but the volume of these requests can be driven arbitrarily low with a sufficiently large TTL threshold, and the fuzzy set computation is robust to such perturbations.

Computing Resolver IP Assignments

The previous section described constraints on how resolver IP assignments must be scheduled, but did not say anything about what resolver IP assignments to use at each interval. For rapid convergence it is possible to use a heuristic approach based on separating resolver IPs that need to be distinguished. Whenever there is a value of $\hat{R}_c$ that has multiple maximal resolver IPs in it, these should ideally be split apart in future assignments. Requests from client c will eventually fall into one or the other of the new assignments, allowing an inference to be drawn that c is associated with the resolver associated with the assignment that it followed.

This cannot be done client by client, but instead there needs to be determined a global (or property-specific) affinity measure between resolver IPs, and this affinity is preferably used to determine which resolvers to split apart in future assignments. The higher the affinity between two resolver IPs, the lower the likelihood of being able to distinguish their clients, and the higher the need to assign them differently in future intervals.

One measure for affinity could be the statistical correlation between resolver IP membership functions, say the sample Pearson correlation coefficient. In other words, imagine a table with client IP as a key (x value) and a column for each resolver IP, with the value of each resolver IP column equal to its membership in the client's fuzzy resolver set ($y_r = mc(r)$). Compute the correlation coefficient between the membership values for pairs of resolvers across all client IPs, possibly throwing out data points where both are 0.

Time Interval Synchronization

Allocation of Probes

The number of probes that can be used will depend on how different a probe behaves than a regular service, and how expensive it is to collect probe information. The more probes are like regular services, and the simpler the collection, the more probes can be used and hence the faster the convergence to an accurate view of client localization. It may or may not be necessary to have only a small number of probes, it could be that all services are capable of being probes, and probe data collection could be a simple addition to log stream processing.

Accuracy Estimation and Feedback

The choice of which resolver IPs to reassign in subsequent intervals could also be driven by an estimate of the accuracy of the resolver's client pool. Computing the fuzzy intersection of the client pools might be one way, but it is not clear if this would add any more information than the resolver IP correlation discussed above.

Another way would be to directly test resolver hypotheses by providing a separate pool of probe-like IPs, called test IPs (TIPs), but with the constraint that each is assigned to exactly one resolver IP at a time. Doing this for every resolver would be too expensive, but it could be used selectively.

While various embodiments have been described herein, other manners are contemplated. For example, a service may be used to re-write URLs included in electronic resources and/or to redirect end user requests. Such a service may be located at subscribers' origin servers or elsewhere and/or can be operated off-line or on-line with respect to end user requests. An example of a reflector embodying aspects of such services can be found in U.S. Pat. No. 6,185,598 and U.S. Application Publication No. 2011-0219120, each of which are hereby fully incorporated by reference for all purposes.

As used herein, the term "reject" refers to the denial of a request based on some level of consideration and/or analysis and/or evaluation. In one embodiment, a rejection includes a reply or response indicating, directly or indirectly, or otherwise suggesting that a request is denied. As examples, such a rejection may include a reply containing an error indication or may be signaled response, e.g., at the transport layer, e.g., by closing a connection. Some rejections, however, may be silent or otherwise provide no feedback to the requestor. For example, a request for invalid content may be rejected by a non-response.

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, e.g., boxes labeled 2454, 2456, 2458 in FIG. 24I, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, in a content delivery network (CDN), said CDN comprising a plurality of computers, each computer comprising hardware including memory and at least one processor, each computer configured to run at least one content delivery (CD) service of a plurality of CD services, wherein said CDN comprises a plurality of clusters, each cluster comprising at least some said plurality of CD services, wherein said CDN serves content on behalf of subscribers to the CDN, said computer-implemented method operable on a device comprising hardware including memory and at least one processor, the method comprising:

(A) maintaining, in one or more data structures in said memory on said device:

(A)(1) first mapping data from one or more canonical names to corresponding binding names, wherein each of said one or more canonical names is a name associated with a subscriber to the CDN, and wherein said canonical names are visible outside the CDN, and (A)(2) second mapping data from binding names to corresponding virtual address information, wherein each binding name is bound via said second mapping to a subset of clusters in the CDN, and wherein said corresponding virtual address information for a given binding name comprises virtual address information for a subset of said clusters in the CDN bound to said given binding name, and wherein the binding names are internal to the CDN, and (A)(3) maintaining, in said one or more data structures, third mapping data from said virtual address information to physical address information;

(B) by a CDN rendezvous service, and in response to a request from a client for a CD service, using said first mapping data in said one or more data structures to map a canonical name to a binding name, wherein said canonical name was determined based on a hostname associated with said request for a CD service; and then (C) said CDN rendezvous service using said second mapping data in said one or more data structures to map said binding name to corresponding address information corresponding to a particular subset of said clusters; and then (D) said CDN rendezvous service using said third mapping data to map said corresponding address information to at least one physical address corresponding to at least one cluster of said particular subset of said clusters; and then (E) by said CDN rendezvous service, providing said corresponding address information from act (C) to said client in response to said request from said client; and then (F) modifying said second mapping data, wherein modified second mapping data are used by a subsequent request for a CD service.

2. The method of claim 1 wherein said request in (B) for said CD service originates outside the CDN and wherein the corresponding address information in (C) corresponds to address information of one or more service endpoints in the CDN suitable for said client to contact for said CD service.

3. A computer program product comprising non-transitory computer-readable media and having computer readable instructions stored on said non-transitory computer-readable media, the computer readable instructions including instructions for implementing a computer-implemented method, said method operable in a content delivery network (CDN), said CDN comprising a plurality of computers, each computer comprising hardware including memory and at least one processor, each computer configured to run at least one content delivery (CD) service of a plurality of CD services, wherein said CDN comprises a plurality of clusters, each cluster comprising at least some said plurality of CD services, wherein said CDN serves content on behalf of subscribers to the CDN, and wherein said plurality of CD services comprise one or more rendezvous services, said method operable on a device comprising hardware including memory and at least one processor and running a CD service on said hardware, said method comprising:

(A) said one or more rendezvous services maintaining, in one or more data structures in said memory on said device:

(A)(1) first mapping data from one or more canonical names (CNAMEs) to corresponding binding names (BNAMEs), wherein each of said one or more canonical names is a name associated with a subscriber to the CDN, and (A)(2) second mapping data from BNAMEs to corresponding virtual address information, wherein each binding name is bound via said second mapping to a subset of clusters in the CDN, and wherein said corresponding virtual address information for a given binding name comprises virtual address information for a subset of said clusters in the CDN bound to said given binding name, wherein said binding names are internal to the CD network, and (A)(3) third mapping data from said virtual address information to physical addresses;

(B) in response to a request for a CD service, said request for said CD service being from a client, said one or more rendezvous services using said first mapping data in said one or more data structures to map a particular canonical name to a particular binding name, wherein said particular canonical name was determined based on a hostname associated with said request for a CD service; and then (C) said one or more rendezvous services using said second mapping data in said one or more data structures to map said particular binding name to corresponding particular virtual address information corresponding to a particular subset of said clusters; and then
(D) said one or more rendezvous services using said third mapping data to map said corresponding particular virtual address information to at least one physical address corresponding to at least one cluster of said particular subset of said clusters; and then
(E) said one or more rendezvous services providing said at least one physical address to said client; and
(F) modifying said second mapping data, wherein modified second mapping data are used by a subsequent request for a CD service.

4. The computer program product of claim 3 wherein (i) said canonical names are visible outside the CDN, and wherein (ii) the binding names are internal to the CDN.

5. A device in a content delivery network (CDN), said CDN comprising a plurality of computers, each computer comprising hardware including memory and at least one processor, each computer configured to run at least one content delivery (CD) service of a plurality of CD services, wherein said CDN comprises a plurality of clusters, each cluster comprising at least some said plurality of CD services, wherein said CDN serves content on behalf of subscribers to the CDN, said device comprising:
  (a) hardware including memory and at least one processor, and
  (b) one or more CD services running on said hardware, wherein said one or more CD services comprise one or more rendezvous services, and wherein said one or more rendezvous services:
    (A) maintains, in a one or more data structures in said memory:
      (A)(1) first mapping data from one or more canonical names (CNAMEs) to corresponding binding names (BNAMEs), wherein each of said one or more canonical names is a name associated with a subscriber to the CDN, and
      (A)(2) second mapping data from BNAMEs to corresponding virtual address information, wherein each binding name is bound via said second mapping to a subset of clusters in the CDN, and wherein said corresponding virtual address information for a given binding name comprises virtual address information for a subset of said clusters in the CDN bound to said given binding name, wherein said binding names are internal to the CD network, and
      (A)(3) third mapping data from said virtual address information to physical addresses;
    (B) uses said first mapping data in said one or more data structures to map a particular canonical name to a particular binding name, wherein said particular canonical name was determined based on a hostname associated with a request for a service, said request for said CD service being from a client; and then
    (C) uses said second mapping data in said one or more data structures to map said particular binding name to corresponding particular virtual address information corresponding to a particular subset of said clusters; and then
    (D) uses said third mapping data to map said corresponding particular virtual address information to at least one physical address corresponding to at least one cluster of said particular subset of said clusters; and then
    (E) provides said at least one physical address to said client; and
    (F) modifies said second mapping data, wherein modified second mapping data are used by a subsequent request for a CD service.

6. The device of claim 5 wherein (i) said canonical names are visible outside the CDN, and wherein (ii) the binding names are internal to the CDN.

7. In a content delivery network (CDN), said CDN comprising a plurality of computers, each computer comprising hardware including memory and at least one processor, each computer configured to run at least one content delivery (CD) service of a plurality of CD services, wherein said CDN comprises a plurality of clusters, each cluster comprising at least some said plurality of CD services, wherein said CDN serves content on behalf of subscribers to the CDN, and wherein said plurality of CD services comprise one or more rendezvous services,
  a computer-implemented method on a device in said CD network, said device comprising hardware including memory and at least one processor, the method comprising:
    (A) said one or more rendezvous services maintaining, in one or more data structures in said memory on said device:
      (A)(1) first mapping data from one or more canonical names (CNAMEs) to corresponding binding names (BNAMEs), wherein each of said one or more canonical names is a name associated with a subscriber to the CDN, and
      (A)(2) second mapping data from BNAMEs to corresponding virtual address information, wherein each binding name is bound via said second mapping to a subset of clusters in the CDN, and wherein said corresponding virtual address information for a given binding name comprises virtual address information for a subset of said clusters in the CDN bound to said given binding name, and wherein said binding names are internal to the CD network, and
      (A)(3) third mapping data from said virtual address information to physical addresses;
    (B) in response to a request for a CD service, said request for said CD service being from a client, said one or more rendezvous services using said first mapping data in said one or more data structures to map a particular canonical name to a particular binding name, wherein said particular canonical name was determined based on a hostname associated with said request for a CD service; and then
    (C) said one or more rendezvous services using said second mapping data in said one or more data structures to map said particular binding name to corresponding particular virtual address information corresponding to a particular subset of said clusters; and then
    (D) said one or more rendezvous services using said third mapping data to map said corresponding particular virtual address information to at least one physical address corresponding to at least one cluster of said particular subset of said clusters; and then
    (E) said one or more rendezvous services providing said at least one physical address to said client, and then
    (F) modifying said second mapping data, wherein modified second mapping data are used by a subsequent request for a CD service.

8. The method of claim 7 wherein said physical addresses comprise Internet Protocol (IP) addresses.

9. The method of claim 7 wherein act (B) is performed by a CDN domain name system (DNS) service.

10. The method of claim 9 wherein the DNS service is authoritative for the particular canonical name.

11. The method of claim 7 wherein multiple canonical names map via said first mapping data to said particular binding name.

12. The method of claim 7 wherein said acts of using said first mapping data in (B) and using said second mapping data in (C) are performed in association with said request for a service.

13. The method of claim 12, wherein said request is from a first service for a second service, and
wherein said particular binding name is associated with virtual address information of one or more services suitable for said first service to contact for said second service.

14. The method of claim 13 wherein said first service is an internal CDN service.

15. The method of claim 14 wherein said virtual address information of one said one or more services comprises virtual address information of services internal to said CDN.

16. The method of claim 15 wherein said virtual address information of one said or more services comprises virtual address information of services internal to said CDN.

17. The method of claim 14 wherein said address information of one said or more services comprises address information of services external to said CDN.

18. The method of claim 13 wherein said first service is associated with a client outside the CDN.

19. The method of claim 18 wherein said address information of one said or more services comprises address information of services external to said CDN.

20. The method of claim 7 further comprising:
modifying said first mapping data.

21. The method of claim 7, wherein said canonical names are visible outside the CDN.

22. The method of claim 7, wherein said request in (B) is a client request for a particular CD service with a corresponding service endpoint, and wherein the client request originates outside the CDN and wherein the corresponding particular virtual address information in (C) corresponds to address information of one or more service endpoints in the CDN suitable for said client to contact for said particular CD service.

23. The method of claim 7, further comprising:
a CDN rendezvous service providing said at least one physical address in (E) to said client in response to said request.

24. The method of claim 7, wherein said first mapping data maps a particular multiple CNAMES to the same particular BNAME.

25. A system, operable in a content delivery network (CDN), said CDN comprising a plurality of computers, each computer comprising hardware including memory and at least one processor, each computer configured to run at least one content delivery (CD) service of a plurality of CD services, wherein said CDN comprises a plurality of clusters, each cluster comprising at least some said plurality of CD services, wherein said CDN serves content on behalf of subscribers to the CDN, the system comprising a plurality of devices, at least one of said device comprising:
(a) hardware including memory and at least one processor, and
(b) one or more CD services running on said hardware, wherein said one or more CD services comprise one or more rendezvous services, and wherein said one or more rendezvous services:
(A) maintains, in a one or more data structures in said memory:
(A)(1) first mapping data from one or more canonical names (CNAMEs) to corresponding binding names (BNAMEs), wherein each of said one or more canonical names is a name associated with a subscriber to the CDN, and
(A)(2) second mapping data from BNAMEs to corresponding virtual address information, wherein each binding name is bound via said second mapping to a subset of clusters in the CDN, and wherein said corresponding virtual address information for a given binding name comprises virtual address information for a subset of said clusters in the CDN bound to said given binding name, wherein said binding names are internal to the CD network, and
(A)(3) third mapping data from said virtual address information to physical addresses;
(B) uses said first mapping data in said one or more data structures to map a particular canonical name to a particular binding name, wherein said particular canonical name was determined based on a hostname associated with a request for a service, said request for said CD service being from a client; and then
(C) uses said second mapping data in said one or more data structures to map said particular binding name to corresponding particular virtual address information corresponding to a particular subset of said clusters; and then
(D) uses said third mapping data to map said corresponding particular virtual address information to at least one physical address corresponding to at least one cluster of said particular subset of said clusters; and then
(E) provides said at least one physical address to said client; and
(F) modifies said second mapping data, wherein modified second mapping data are used by a subsequent request for a CD service.

* * * * *